US008157174B2

(12) United States Patent
Kotlarsky et al.

(10) Patent No.: US 8,157,174 B2
(45) Date of Patent: Apr. 17, 2012

(54) DIGITAL IMAGE CAPTURE AND PROCESSING SYSTEM EMPLOYING AN IMAGE FORMATION AND DETECTION SYSTEM HAVING AN AREA-TYPE IMAGE DETECTION ARRAY SUPPORTING SINGLE SNAP-SHOT AND PERIODIC SNAP-SHOT MODES OF IMAGE ACQUISITION DURING OBJECT ILLUMINATION AND IMAGING OPERATIONS

(75) Inventors: Anatoly Kotlarsky, Churchville, PA (US); Xiaoxun Zhu, Marlton, NJ (US); Michael Veksland, Marlton, NJ (US); Ka Man Au, Philadelphia, PA (US); Patrick Giordano, Blackwood, NJ (US); Weizhen Yan, Clementon, NJ (US); Jie Ren, Suzhou (CN); Taylor Smith, Haddon Township, NJ (US); Michael V. Miraglia, Hamilton, NJ (US); C. Harry Knowles, Hanover, NH (US); Sudhin Mandal, Ardmore, PA (US); Shawn De Foney, Haddon Heights, NJ (US); Christopher Allen, Plainsboro, NJ (US); David M. Wilz, Sr., Sewell, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 618 days.

(21) Appl. No.: 12/012,206

(22) Filed: Jan. 31, 2008

(65) Prior Publication Data

US 2008/0277473 A1 Nov. 13, 2008

Related U.S. Application Data

(63) Continuation of application No. 12/001,758, filed on Dec. 12, 2007, now Pat. No. 7,841,533, which is a continuation-in-part of application No. 11/640,814, (Continued)

(51) Int. Cl.
*G06K 7/10* (2006.01)
(52) U.S. Cl. ......... 235/462.07; 235/462.01; 235/462.09; 235/462.41
(58) Field of Classification Search ............. 235/462.07, 235/462.01, 462.09, 462.41
See application file for complete search history.

(56) References Cited

U.S. PATENT DOCUMENTS 3,867,041 A 2/1975 Brown et al.
(Continued)

FOREIGN PATENT DOCUMENTS

WO WO 99/49787 10/1999
(Continued)

OTHER PUBLICATIONS

U.S. Appl. No. 60/190,273, filed May 29, 2001, Thomas J. Brobst.
(Continued)

*Primary Examiner* — Ahshik Kim
(74) *Attorney, Agent, or Firm* — Thomas J. Perkowski, Esq., P.C.

(57) ABSTRACT

A digital image capture and processing system including a housing having an imaging window, and an image formation and detection subsystem, disposed in the housing, having an area-type image detection array supporting a single snap-shot mode of image acquisition and a periodic snap-shot mode of image acquisition during object illumination and imaging operations. The system also includes an illumination subsystem, with an illumination array, for producing a field of illumination within the FOV, and illuminating the object detected in the FOV, so that the illumination reflects off the object and is transmitted back through the light transmission aperture and onto the image detection array to form the 2D digital image of the object. By virtue of its single and periodic snap-shot modes of operation, the digital image capture and processing system of the present invention has the capacity to support pass-through as well as presentation type methods of digital image capture and processing at demanding POS environments without the use of traditional video modes of image acquisition.

20 Claims, 169 Drawing Sheets

Related U.S. Application Data filed on Dec. 18, 2006, now Pat. No. 7,708,205, and a continuation-in-part of application No. 11/880,087, filed on Jul. 19, 2007, and a continuation-in-part of application No. 11/305,895, filed on Dec. 16, 2005, now Pat. No. 7,607,581, and a continuation-in-part of application No. 10/989,220, filed on Nov. 15, 2004, now Pat. No. 7,490,774, and a continuation-in-part of application No. 10/893,800, filed on Jul. 16, 2004, now Pat. No. 7,273,180, and a continuation-in-part of application No. 10/893,797, filed on Jul. 16, 2004, now Pat. No. 7,188,770, and a continuation-in-part of application No. 10/893,798, filed on Jul. 16, 2004, now Pat. No. 7,185,817, and a continuation-in-part of application No. 10/894,476, filed on Jul. 16, 2004, now Pat. No. 7,178,733, and a continuation-in-part of application No. 10/894,478, filed on Jul. 19, 2004, now Pat. No. 7,357,325, and a continuation-in-part of application No. 10/894,412, filed on Jul. 19, 2004, now Pat. No. 7,213,762, and a continuation-in-part of application No. 10/894,477, filed on Jul. 19, 2004, now Pat. No. 7,360,706, and a continuation-in-part of application No. 10/895,271, filed on Jul. 20, 2004, now Pat. No. 7,216,810, and a continuation-in-part of application No. 10/895,811, filed on Jul. 20, 2004, now Pat. No. 7,225,988, and a continuation-in-part of application No. 10/897,390, filed on Jul. 22, 2004, now Pat. No. 7,237,722, and a continuation-in-part of application No. 10/897,389, filed on Jul. 22, 2004, now Pat. No. 7,225,989, and a continuation-in-part of application No. 10/901,463, filed on Jul. 27, 2004, now Pat. No. 7,086,595, and a continuation-in-part of application No. 10/901,426, filed on Jul. 27, 2004, now Pat. No. 7,278,575, and a continuation-in-part of application No. 10/901,446, filed on Jul. 27, 2004, now Pat. No. 7,428,998, and a continuation-in-part of application No. 10/901,461, filed on Jul. 28, 2004, now Pat. No. 7,320,431, and a continuation-in-part of application No. 10/901,429, filed on Jul. 28, 2004, now Pat. No. 7,243,847, and a continuation-in-part of application No. 10/901,427, filed on Jul. 28, 2004, now Pat. No. 7,267,282, and a continuation-in-part of application No. 10/901,445, filed on Jul. 28, 2004, now Pat. No. 7,240,844, and a continuation-in-part of application No. 10/901,428, filed on Jul. 28, 2004, now Pat. No. 7,293,714, and a continuation-in-part of application No. 10/902,709, filed on Jul. 29, 2004, now Pat. No. 7,270,272, and a continuation-in-part of application No. 10/901,914, filed on Jul. 29, 2004, now Pat. No. 7,325,738, and a continuation-in-part of application No. 10/902,710, filed on Jul. 29, 2004, now Pat. No. 7,281,661, and a continuation-in-part of application No. 10/909,270, filed on Jul. 30, 2004, now Pat. No. 7,284,705, and a continuation-in-part of application No. 10/909,255, filed on Jul. 30, 2004, now Pat. No. 7,299,986, and a continuation-in-part of application No. 10/903,904, filed on Jul. 30, 2004, now Pat. No. 7,255,279, and a continuation-in-part of application No. 10/712,787, filed on Nov. 13, 2003, now Pat. No. 7,128,266.

(56) References Cited

U.S. PATENT DOCUMENTS

| | | |
|---|---|---|
| 4,045,813 A | 8/1977 | Jones |
| 4,053,233 A | 10/1977 | Biene et al. |
| 4,291,338 A | 9/1981 | Thomas |
| 4,317,622 A | 3/1982 | Metzger |
| 4,338,514 A | 7/1982 | Bixby |
| 4,427,286 A | 1/1984 | Bosse |
| 4,471,228 A | 9/1984 | Nishizawa et al. |
| 4,528,444 A | 7/1985 | Hara et al. |
| 4,535,758 A | 8/1985 | Longacre, Jr. |
| 4,538,060 A | 8/1985 | Sakai et al. |
| 4,547,139 A | 10/1985 | Havens et al. |
| 4,632,542 A | 12/1986 | Whiteside |
| 4,703,344 A | 10/1987 | Hisano et al. |
| 4,741,042 A | 4/1988 | Throop et al. |
| D297,432 S | 8/1988 | Stant et al. |
| 4,766,300 A | 8/1988 | Chadima, Jr. et al. |
| 4,805,026 A | 2/1989 | Oda |
| 4,816,916 A | 3/1989 | Akiyama |
| 4,818,847 A | 4/1989 | Hara et al. |
| 4,819,070 A | 4/1989 | Hynecek |
| 4,835,615 A | 5/1989 | Taniguchi et al. |
| D304,026 S | 10/1989 | Goodner et al. |
| 4,894,523 A | 1/1990 | Chadima, Jr. et al. |
| D308,865 S | 6/1990 | Weaver et al. |
| 4,952,966 A | 8/1990 | Ishida et al. |
| 4,972,224 A | 11/1990 | Thompson |
| 4,978,981 A | 12/1990 | Satoh et al. |
| 4,996,413 A | 2/1991 | McDaniel et al. |
| 5,019,714 A | 5/1991 | Knowles |
| 5,025,319 A | 6/1991 | Mutoh et al. |
| 5,034,619 A | 7/1991 | Hammond, Jr. |
| 5,063,460 A | 11/1991 | Mutze et al. |
| 5,063,462 A | 11/1991 | Nakagawa et al. |
| 5,083,638 A | 1/1992 | Schneider |
| 5,109,153 A | 4/1992 | Johnsen et al. |
| 5,111,263 A | 5/1992 | Stevens |
| 5,144,119 A | 9/1992 | Chadima, Jr. et al. |
| 5,153,585 A | 10/1992 | Negishi et al. |
| 5,155,345 A | 10/1992 | Ito |
| 5,170,205 A | 12/1992 | Satoh et al. |
| 5,202,907 A | 4/1993 | Yonemoto |
| 5,231,293 A | 7/1993 | Longacre, Jr. |
| 5,231,634 A | 7/1993 | Giles et al. |
| 5,233,169 A | 8/1993 | Longacre, Jr. |
| 5,235,198 A | 8/1993 | Stevens et al. |
| 5,235,416 A | 8/1993 | Stanhope |
| 5,256,863 A | 10/1993 | Ferguson et al. |
| 5,262,871 A | 11/1993 | Wilder et al. |
| 5,270,802 A | 12/1993 | Takagi et al. |
| 5,272,538 A | 12/1993 | Homma et al. |
| 5,281,800 A | 1/1994 | Pelton et al. |
| 5,286,960 A | 2/1994 | Longacre, Jr. et al. |
| 5,288,985 A | 2/1994 | Chadima, Jr. et al. |
| 5,291,008 A | 3/1994 | Havens et al. |
| 5,291,009 A | 3/1994 | Roustaei |
| 5,294,783 A | 3/1994 | Hammond, Jr. et al. |
| 5,296,689 A | 3/1994 | Reddersen et al. |
| D346,162 S | 4/1994 | Bennett et al. |
| 5,304,786 A | 4/1994 | Pavlidis et al. |
| 5,304,787 A | 4/1994 | Wang |
| 5,308,962 A | 5/1994 | Havens et al. |
| 5,309,243 A | 5/1994 | Tsai |
| 5,319,181 A | 6/1994 | Shellhammer et al. |
| 5,319,182 A | 6/1994 | Havens et al. |
| 5,331,118 A | 7/1994 | Jensen |
| 5,340,973 A | 8/1994 | Knowles et al. |
| 5,345,266 A | 9/1994 | Denyer |
| 5,349,172 A | 9/1994 | Roustaei |
| 5,352,884 A | 10/1994 | Petrick et al. |
| 5,354,977 A | 10/1994 | Roustaei |
| 5,378,883 A | 1/1995 | Batterman et al. |
| 5,396,054 A | 3/1995 | Krichever et al. |
| 5,399,846 A | 3/1995 | Pavlidis et al. |
| 5,410,141 A | 4/1995 | Kkoenck et al. |
| 5,410,225 A | 4/1995 | Ishii et al. |
| 5,410,348 A | 4/1995 | Hamasaki |
| 5,418,357 A | 5/1995 | Inoue et al. |
| 5,420,409 A | 5/1995 | Longacre, Jr. et al. |
| 5,426,282 A | 6/1995 | Humble |
| 5,430,285 A | 7/1995 | Karpen et al. |

| | | | |
|---|---|---|---|
| 5,450,291 A | 9/1995 | Kumagai | |
| 5,457,309 A | 10/1995 | Pelton | |
| 5,463,214 A | 10/1995 | Longacre, Jr. et al. | |
| 5,468,951 A | 11/1995 | Knowles et al. | |
| 5,479,515 A | 12/1995 | Longacre, Jr. | |
| 5,484,994 A | 1/1996 | Roustaei | |
| 5,489,769 A | 2/1996 | Kubo | |
| 5,489,770 A * | 2/1996 | Kadota et al. ............ 235/472.01 | |
| 5,489,771 A | 2/1996 | Beach et al. | |
| 5,491,330 A | 2/1996 | Sato et al. | |
| 5,495,097 A | 2/1996 | Katz et al. | |
| 5,504,317 A | 4/1996 | Takahashi | |
| 5,519,496 A | 5/1996 | Borgert et al. | |
| 5,521,366 A | 5/1996 | Wang et al. | |
| 5,532,467 A | 7/1996 | Rousatei | |
| 5,541,419 A | 7/1996 | Arakellian | |
| 5,545,886 A | 8/1996 | Metlitsky et al. | |
| 5,546,475 A | 8/1996 | Bolle et al. | |
| 5,550,366 A | 8/1996 | Roustaei | |
| 5,555,464 A | 9/1996 | Hatlestad | |
| 5,561,526 A | 10/1996 | Huber et al. | |
| 5,572,006 A | 11/1996 | Wang et al. | |
| 5,572,007 A | 11/1996 | Aragon et al. | |
| 5,591,952 A | 1/1997 | Krichever et al. | |
| 5,610,654 A | 3/1997 | Parulski et al. | |
| 5,621,203 A | 4/1997 | Swartz et al. | |
| 5,623,137 A | 4/1997 | Powers et al. | |
| 5,631,976 A | 5/1997 | Bolle et al. | |
| 5,635,697 A | 6/1997 | Shellhammer et al. | |
| 5,637,851 A | 6/1997 | Swartz et al. | |
| 5,646,390 A | 7/1997 | Wang et al. | |
| 5,659,167 A | 8/1997 | Wang et al. | |
| 5,659,761 A | 8/1997 | DeArras et al. | |
| 5,661,817 A | 8/1997 | Hatlestad et al. | |
| 5,677,522 A | 10/1997 | Rice et al. | |
| 5,702,059 A | 12/1997 | Chu et al. | |
| 5,710,417 A | 1/1998 | Joseph et al. | |
| 5,717,195 A | 2/1998 | Feng et al. | |
| 5,717,221 A | 2/1998 | Li et al. | |
| 5,719,384 A | 2/1998 | Ju et al. | |
| 5,723,853 A | 3/1998 | Longacre, Jr. et al. | |
| 5,723,868 A | 3/1998 | Hammond, Jr. et al. | |
| 5,736,724 A | 4/1998 | Ju et al. | |
| 5,739,518 A | 4/1998 | Wang | |
| 5,747,796 A | 5/1998 | Heard et al. | |
| 5,754,670 A | 5/1998 | Shin et al. | |
| 5,756,981 A | 5/1998 | Roustaei et al. | |
| 5,773,806 A | 6/1998 | Longacre, Jr. et al. | |
| 5,773,810 A | 6/1998 | Hussey et al. | |
| 5,777,314 A | 7/1998 | Roustaei | |
| 5,780,834 A | 7/1998 | Havens et al. | |
| 5,783,811 A | 7/1998 | Feng et al. | |
| 5,784,102 A | 7/1998 | Hussey et al. | |
| 5,786,582 A | 7/1998 | Roustaei et al. | |
| 5,786,583 A | 7/1998 | Maltsev | |
| 5,786,586 A | 7/1998 | Pidhirny et al. | |
| 5,793,033 A | 8/1998 | Feng et al. | |
| 5,793,967 A | 8/1998 | Simciak et al. | |
| 5,801,370 A | 9/1998 | Katoh et al. | |
| 5,808,286 A | 9/1998 | Nukui et al. | |
| 5,811,774 A | 9/1998 | Ju et al. | |
| 5,811,784 A | 9/1998 | Tausch et al. | |
| 5,815,200 A | 9/1998 | Ju et al. | |
| 5,821,518 A | 10/1998 | Sussmeier et al. | |
| 5,825,006 A | 10/1998 | Longacre, Jr. et al. | |
| 5,831,254 A | 11/1998 | Karpen et al. | |
| 5,831,674 A | 11/1998 | Ju et al. | |
| 5,834,754 A | 11/1998 | Feng et al. | |
| 5,837,985 A | 11/1998 | Karpen | |
| 5,838,495 A | 11/1998 | Hennick | |
| 5,838,536 A | 11/1998 | Miyazawa | |
| 5,841,121 A | 11/1998 | Koenck | |
| 5,841,889 A | 11/1998 | Seyed-Bolorforosh | |
| 5,883,375 A | 3/1999 | Knowles et al. | |
| 5,886,336 A | 3/1999 | Tang et al. | |
| 5,900,613 A | 5/1999 | Koziol et al. | |
| 5,912,700 A | 6/1999 | Honey et al. | |
| 5,914,476 A | 6/1999 | Gerst, III et al. | |
| 5,914,477 A | 6/1999 | Wang | |
| 5,920,061 A | 7/1999 | Feng | |
| 5,929,418 A | 7/1999 | Ehrhart et al. | |
| 5,932,862 A | 8/1999 | Hussey et al. | |
| 5,942,741 A | 8/1999 | Longacre, Jr. et al. | |
| 5,949,052 A | 9/1999 | Longacre, Jr. et al. | |
| 5,949,054 A | 9/1999 | Karpen et al. | |
| 5,949,057 A | 9/1999 | Feng | |
| 5,950,173 A | 9/1999 | Perkowski | |
| 5,965,863 A | 10/1999 | Parker et al. | |
| 5,978,610 A | 11/1999 | Aoki | |
| 5,979,757 A | 11/1999 | Tracy et al. | |
| 5,979,763 A | 11/1999 | Wang et al. | |
| 5,986,705 A | 11/1999 | Shiboya et al. | |
| 5,986,745 A | 11/1999 | Hermary et al. | |
| 5,992,744 A | 11/1999 | Smith et al. | |
| 5,992,750 A | 11/1999 | Chadima, Jr. et al. | |
| 6,000,612 A | 12/1999 | Xu | |
| 6,005,959 A | 12/1999 | Mohan et al. | |
| 6,006,995 A | 12/1999 | Amundsen et al. | |
| RE36,528 E | 1/2000 | Roustaei | |
| 6,015,088 A | 1/2000 | Parker et al. | |
| 6,016,135 A | 1/2000 | Biss et al. | |
| 6,018,597 A | 1/2000 | Maltsev et al. | |
| 6,019,286 A | 2/2000 | Li et al. | |
| 6,032,860 A | 3/2000 | Brian | |
| 6,044,231 A | 3/2000 | Soshi et al. | |
| 6,045,047 A | 4/2000 | Pidhirny et al. | |
| 6,060,722 A | 5/2000 | Havens et al. | |
| 6,062,475 A | 5/2000 | Feng | |
| 6,064,763 A | 5/2000 | Maltsev | |
| 6,081,381 A | 6/2000 | Shalapenok et al. | |
| 6,095,422 A | 8/2000 | Ogami | |
| 6,097,839 A | 8/2000 | Liu | |
| 6,097,856 A | 8/2000 | Hammon, Jr. | |
| 6,098,887 A | 8/2000 | Figarella et al. | |
| 6,109,526 A | 8/2000 | Ohanian et al. | |
| 6,119,941 A | 9/2000 | Katsandres et al. | |
| 6,123,261 A | 9/2000 | Roustaei | |
| 6,123,263 A | 9/2000 | Feng | |
| 6,128,049 A | 10/2000 | Butterworth | |
| 6,128,414 A | 10/2000 | Liu | |
| 6,141,046 A | 10/2000 | Roth et al. | |
| 6,149,063 A | 11/2000 | Reynolds et al. | |
| 6,151,073 A | 11/2000 | Steinberg et al. | |
| 6,152,371 A | 11/2000 | Schwartz et al. | |
| 6,158,661 A | 12/2000 | Chadima, Jr. et al. | |
| 6,159,153 A | 12/2000 | Dubberstein et al. | |
| 6,161,760 A | 12/2000 | Marrs et al. | |
| 6,164,544 A | 12/2000 | Schwartz et al. | |
| 6,173,893 B1 | 1/2001 | Maltsev et al. | |
| 6,173,894 B1 | 1/2001 | Olmstead et al. | |
| 6,177,926 B1 | 1/2001 | Kunert | |
| 6,179,206 B1 | 1/2001 | Matsumori | |
| 6,179,208 B1 | 1/2001 | Feng | |
| 6,184,981 B1 | 2/2001 | Hasson et al. | |
| 6,191,887 B1 | 2/2001 | Michaloski et al. | |
| 6,195,127 B1 | 2/2001 | Sugimoto | |
| 6,209,789 B1 | 4/2001 | Amundsen et al. | |
| D442,152 S | 5/2001 | Roustaei | |
| 6,223,986 B1 | 5/2001 | Bobba et al. | |
| 6,223,988 B1 | 5/2001 | Batterman et al. | |
| 6,234,395 B1 | 5/2001 | Chadima et al. | |
| 6,244,510 B1 | 6/2001 | Ring et al. | |
| 6,244,512 B1 | 6/2001 | Koenck et al. | |
| 6,246,642 B1 | 6/2001 | Gardner, Jr. et al. | |
| 6,250,551 B1 | 6/2001 | He et al. | |
| 6,254,003 B1 | 7/2001 | Pettinelli et al. | |
| 6,264,105 B1 | 7/2001 | Longacre, Jr. et al. | |
| 6,266,685 B1 | 7/2001 | Danielson et al. | |
| 6,275,388 B1 | 8/2001 | Hennick et al. | |
| 6,278,490 B1 | 8/2001 | Fuduka et al. | |
| 6,298,175 B1 | 10/2001 | Longacre, Jr. et al. | |
| 6,298,176 B2 | 10/2001 | Longacre, Jr. et al. | |
| 6,328,214 B1 | 12/2001 | Akel et al. | |
| 6,330,974 B1 | 12/2001 | Ackley | |
| 6,336,587 B1 | 1/2002 | He et al. | |
| 6,340,114 B1 | 1/2002 | Correa et al. | |
| 6,345,765 B1 | 2/2002 | Wiklof | |
| 6,347,163 B2 | 2/2002 | Roustaei | |

| Patent No. | Date | Inventor |
|---|---|---|
| 6,357,659 B1 | 3/2002 | Kelly et al. |
| 6,360,947 B1 | 3/2002 | Knowles et al. |
| 6,363,366 B1 | 3/2002 | Henty |
| 6,367,699 B2 | 4/2002 | Ackley |
| 6,371,374 B1 | 4/2002 | Schwartz et al. |
| 6,373,579 B1 | 4/2002 | Ober et al. |
| 6,375,075 B1 | 4/2002 | Ackley et al. |
| 6,385,352 B1 | 5/2002 | Roustaei |
| 6,390,625 B1 | 5/2002 | Slawson et al. |
| 6,398,112 B1 | 6/2002 | Li et al. |
| 6,431,452 B2 | 8/2002 | Feng |
| 6,435,411 B1 | 8/2002 | Massieu et al. |
| 6,469,289 B1 | 10/2002 | Scott-Thomas et al. |
| 6,473,126 B1 | 10/2002 | Higashihara et al. |
| 6,478,223 B1 | 11/2002 | Ackley |
| 6,489,798 B1 | 12/2002 | Scott-Thomas et al. |
| 6,491,223 B1 | 12/2002 | Longacre, Jr. et al. |
| 6,497,368 B1 | 12/2002 | Friend et al. |
| 6,499,664 B2 | 12/2002 | Knowles et al. |
| 6,502,749 B1 | 1/2003 | Snyder |
| 6,527,182 B1 | 3/2003 | Chiba et al. |
| 6,538,820 B2 | 3/2003 | Fohl et al. |
| 6,539,422 B1 | 3/2003 | Hunt et al. |
| 6,546,203 B2 | 4/2003 | Hofer |
| 6,547,139 B1 | 4/2003 | Havens et al. |
| 6,550,679 B2 | 4/2003 | Hennick et al. |
| 6,560,029 B1 | 5/2003 | Dobbie et al. |
| 6,561,428 B2 | 5/2003 | Meier et al. |
| 6,565,003 B1 | 5/2003 | Ma et al. |
| 6,570,147 B2 | 5/2003 | Smith |
| 6,575,369 B1 | 6/2003 | Knowles et al. |
| 6,585,159 B1 | 7/2003 | Meier et al. |
| 6,601,768 B2 | 8/2003 | McCall et al. |
| 6,607,128 B1 | 8/2003 | Schwartz et al. |
| 6,616,046 B1 | 9/2003 | Barkan et al. |
| 6,619,547 B2 | 9/2003 | Crowther et al. |
| 6,619,549 B2 | 9/2003 | Zhu et al. |
| 6,628,445 B2 | 9/2003 | Chaleff et al. |
| 6,637,655 B1 | 10/2003 | Hudrick et al. |
| 6,637,658 B2 | 10/2003 | Barber et al. |
| 6,655,595 B1 | 12/2003 | Longacre, Jr. et al. |
| 6,659,350 B2 | 12/2003 | Schwartz et al. |
| 6,669,093 B1 | 12/2003 | Meyerson et al. |
| 6,681,994 B1 | 1/2004 | Koenck |
| 6,685,092 B2 | 2/2004 | Patel et al. |
| 6,685,095 B2 | 2/2004 | Roustaei et al. |
| 6,689,998 B1 | 2/2004 | Bremer |
| 6,695,209 B1 | 2/2004 | La |
| 6,698,656 B2 | 3/2004 | Parker et al. |
| 6,708,883 B2 | 3/2004 | Krichever |
| 6,708,885 B2 | 3/2004 | Reiffel |
| 6,722,569 B2 | 4/2004 | Ehrhart et al. |
| 6,729,546 B2 | 5/2004 | Roustaei |
| 6,736,320 B1 | 5/2004 | Crowther et al. |
| 6,758,402 B1 | 7/2004 | Check et al. |
| 6,758,403 B1 | 7/2004 | Keys et al. |
| 6,762,884 B2 | 7/2004 | Beystrum et al. |
| 6,766,954 B2 | 7/2004 | Barkan et al. |
| 6,778,210 B1 | 8/2004 | Sugahara et al. |
| 6,809,766 B1 | 10/2004 | Krymski et al. |
| 6,814,290 B2 | 11/2004 | Longacre |
| 6,831,690 B1 | 12/2004 | John et al. |
| 6,832,725 B2 | 12/2004 | Gardiner et al. |
| 6,833,822 B2 | 12/2004 | Klocek et al. |
| 6,834,807 B2 | 12/2004 | Ehrhart et al. |
| 6,837,431 B2 | 1/2005 | Carlson et al. |
| 6,863,217 B2 | 3/2005 | Hudrick et al. |
| 6,871,993 B2 | 3/2005 | Hecht |
| 6,889,903 B1 | 5/2005 | Koenck |
| 6,899,272 B2 | 5/2005 | Krichever et al. |
| 6,899,273 B2 | 5/2005 | Hussey et al. |
| 6,912,076 B2 | 6/2005 | Chaleff et al. |
| 6,942,151 B2 | 9/2005 | Ehrhart |
| 6,947,612 B2 | 9/2005 | Helms et al. |
| 6,959,865 B2 | 11/2005 | Walczyk et al. |
| 6,969,003 B2 | 11/2005 | Havens et al. |
| 6,974,084 B2 | 12/2005 | Bobba et al. |
| 6,991,169 B2 | 1/2006 | Bobba et al. |
| 7,021,542 B2 | 4/2006 | Patel et al. |
| 7,036,735 B2 | 5/2006 | Hepworth et al. |
| 7,044,377 B2 | 5/2006 | Patel et al. |
| 7,055,747 B2 | 6/2006 | Havens et al. |
| 7,059,525 B2 | 6/2006 | Longacre, Jr. et al. |
| 7,070,099 B2 | 7/2006 | Patel |
| 7,077,317 B2 | 7/2006 | Longacre, Jr. et al. |
| 7,077,321 B2 | 7/2006 | Longacre, Jr. et al. |
| 7,077,327 B1 | 7/2006 | Knowles et al. |
| 7,080,786 B2 | 7/2006 | Longacre, Jr. et al. |
| 7,083,098 B2 | 8/2006 | Joseph et al. |
| 7,086,596 B2 | 8/2006 | Meier et al. |
| 7,090,135 B2 | 8/2006 | Patel |
| 7,097,102 B2 | 8/2006 | Patel et al. |
| 7,098,946 B1 | 8/2006 | Koseki et al. |
| 7,100,832 B2 | 9/2006 | Good |
| 7,137,555 B2 | 11/2006 | Bremer et al. |
| 7,148,923 B2 | 12/2006 | Harper et al. |
| 7,191,947 B2 | 3/2007 | Kahn et al. |
| 7,195,164 B2 | 3/2007 | Patel |
| 7,198,195 B2 | 4/2007 | Bobba et al. |
| 7,219,843 B2 | 5/2007 | Havens et al. |
| 7,221,394 B2 | 5/2007 | Enomoto |
| 7,222,793 B2 | 5/2007 | Patel |
| 7,232,072 B1 * | 6/2007 | Bunte et al. ............... 235/462.45 |
| 7,261,238 B1 | 8/2007 | Carlson et al. |
| 7,273,298 B2 | 9/2007 | Laschke et al. |
| 7,296,748 B2 | 11/2007 | Good |
| 7,296,751 B2 | 11/2007 | Barber et al. |
| 7,303,126 B2 | 12/2007 | Patel et al. |
| 7,303,131 B2 | 12/2007 | Carlson et al. |
| 7,317,447 B2 | 1/2008 | Tan et al. |
| 7,319,489 B2 | 1/2008 | Miki |
| 7,331,523 B2 | 2/2008 | Meier et al. |
| 7,408,574 B2 | 8/2008 | Miyazaki |
| 7,419,098 B2 | 9/2008 | Hyde et al. |
| 7,420,153 B2 | 9/2008 | Palmer et al. |
| 7,533,819 B2 | 5/2009 | Barkan et al. |
| 7,543,752 B2 | 6/2009 | Kotlarsky |
| 7,568,628 B2 | 8/2009 | Wang et al. |
| 7,611,060 B2 | 11/2009 | Wang et al. |
| 7,675,569 B2 | 3/2010 | Maeda |
| 7,699,227 B2 | 4/2010 | Wang et al. |
| 7,757,955 B2 | 7/2010 | Barkan |
| 7,777,796 B2 | 8/2010 | Inoue et al. |
| 7,798,410 B2 | 9/2010 | Carlson et al. |
| 7,815,120 B2 | 10/2010 | Carlson |
| 7,866,557 B2 | 1/2011 | He et al. |
| 7,909,257 B2 | 3/2011 | Wang et al. |
| 2002/0008968 A1 | 1/2002 | Hennick et al. |
| 2002/0096566 A1 | 7/2002 | Schwartz et al. |
| 2002/0150309 A1 | 10/2002 | Hepworth et al. |
| 2002/0170970 A1 | 11/2002 | Ehrhart |
| 2002/0171745 A1 | 11/2002 | Ehrhart |
| 2002/0179713 A1 | 12/2002 | Pettinelli et al. |
| 2002/0191830 A1 | 12/2002 | Pidhirny |
| 2003/0015662 A1 | 1/2003 | Yang et al. |
| 2003/0062418 A1 | 4/2003 | Barber et al. |
| 2003/0062419 A1 | 4/2003 | Ehrhart et al. |
| 2003/0085282 A1 | 5/2003 | Parker et al. |
| 2003/0197063 A1 | 10/2003 | Longacre, Jr. |
| 2003/0209603 A1 | 11/2003 | Schwartz et al. |
| 2003/0213847 A1 | 11/2003 | McCall et al. |
| 2003/0218069 A1 | 11/2003 | Meier et al. |
| 2004/0000592 A1 | 1/2004 | Schwartz et al. |
| 2004/0004125 A1 | 1/2004 | Havens et al. |
| 2004/0021783 A1 | 2/2004 | Mihara |
| 2004/0094627 A1 | 5/2004 | Parker et al. |
| 2004/0195328 A1 | 10/2004 | Barber et al. |
| 2005/0206762 A1 | 9/2005 | Funakoshi |
| 2005/0253940 A1 | 11/2005 | Chiba et al. |
| 2006/0118632 A1 | 6/2006 | Joseph et al. |
| 2006/0180670 A1 | 8/2006 | Acosta et al. |
| 2006/0202036 A1 | 9/2006 | Wang et al. |
| 2006/0202038 A1 | 9/2006 | Wang et al. |
| 2006/0274171 A1 | 12/2006 | Wang |
| 2007/0095916 A1 | 5/2007 | Joseph et al. |
| 2007/0118689 A1 | 5/2007 | Hyde, II et al. |
| 2007/0187509 A1 | 8/2007 | Kotlarsky et al. |
| 2007/0228174 A1 | 10/2007 | Vinogradov et al. |

| | | | |
|---|---|---|---|
| 2007/0241195 | A1 | 10/2007 | Hussey et al. |
| 2008/0002043 | A1 | 1/2008 | Inoue et al. |
| 2008/0024655 | A1 | 1/2008 | Maeda |
| 2008/0121715 | A1 | 5/2008 | Field |
| 2008/0144964 | A1 | 6/2008 | Soinio et al. |
| 2008/0179402 | A1 | 7/2008 | Barkan et al. |
| 2008/0239108 | A1 | 10/2008 | Kume |
| 2008/0239126 | A1 | 10/2008 | Wakamori |
| 2009/0021612 | A1 | 1/2009 | Hamilton, Jr. et al. |
| 2009/0167911 | A1 | 7/2009 | Takane |
| 2009/0303362 | A1 | 12/2009 | Ebihara |
| 2010/0044440 | A1 | 2/2010 | Wang et al. |
| 2010/0090007 | A1 | 4/2010 | Wang et al. |
| 2010/0232778 | A1 | 9/2010 | Gwak et al. |
| 2010/0252633 | A1 | 10/2010 | Barkan et al. |
| 2010/0302420 | A1 | 12/2010 | Strat et al. |

FOREIGN PATENT DOCUMENTS

| | | |
|---|---|---|
| WO | WO 01/72028 A1 | 9/2001 |
| WO | WO 01/80163 | 10/2001 |

OTHER PUBLICATIONS

Search Report for Int'l Application No. PCT/US07/16298, 2008.
Search Report for European Application No. EP 03 70 5840, 2007.
Search Report for Int'l Application No. PCT/US03/01738, 2003.
Web-based article from Dr. Dobb's Portal entitled "The SPARK Real-Time Kernel" by Anatoly Kotlarsky, www.ddj.com. May 1, 1999, pp. 1-6.
The Customer's Guide to SwiftDecoder™ for Fixed Station Scanners by Omniplanar, Inc., Princeton, New Jersey, Jul. 1, 2008, 136 pages.
Product brochure for the ¼-Inch SOC VGA CMOS Digital Image Sensor by Micron Technology, Inc., 2006, pp. 1-14.
Thesis entitled 'Low-Power Architectures For Single-Chip Digital Image Sensors' by Steve Tanner, Nov. 2000, pp. 1-171.
Product presentation entitled '2D Barcodes and Imaging Scanner Technology' by Bradley S. Carlson for Symbol Technology, Inc. pp. 1-46.
Thesis entitled 'Applications and Implementations of Centroiding Using CMOS Image Sensors' by Joey Shah of the University of Waterloo, 2002, pp. 1-98.
Product brochure for the LMC555 CMOS Timer by National Semiconductor Corporation, Mar. 2002, pp. 1-10.
Code Reader 2.0 (CR2)—promotional pages, Apr. 20-21, 2004 from www.codecorp.com.
Code Corporation's New Imager Offers Revolutionary Performance and Bluetooth Radio, Feb. 19, 2003, by Benjamin M. Miller, Codex Corporation, 11814 South Election Road, Suite 200, Draper UT 84020.
National Semiconductor's brochure entitled "LM9638 Monochrome CMOS Image Sensor SXGA 18 FPS", 2000, www.national.com.
Product Manual for 4600r Retail 2D Imager by HHP, 2006, pp. 1-2.
Product manual for the CBOSII Programmer's Model Rev 1.0, Omniplanar, Inc., Feb. 25, 1994, 52 pages.
Product Brochure for the AV3700 High Speed CCD Bar Code Reader by Accu-Sort Corporation, 2001, pp. 1-2.
Web-based article "Self-checkout systems add 'on-line' efficiency", Jun. 1998, Discount Store News; pp. 1-2.
Product brochure for PSC, Inc. Magellan 1400i "Omni-Directional Imaging Scanner", 2006, p. 1.

* cited by examiner

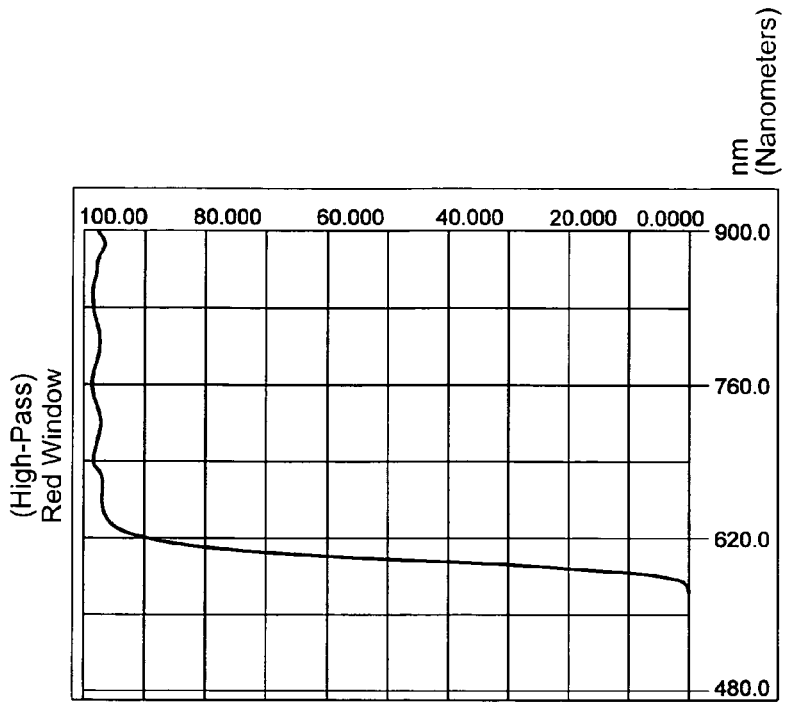
FIG. 5E2
Red Window And Low-Pass Filter Characteristics
• Must Bandpass Return Light Against Ambient
  - Red Window + Low Pass Filter
  - Restricts Range To 620nm – 700nm
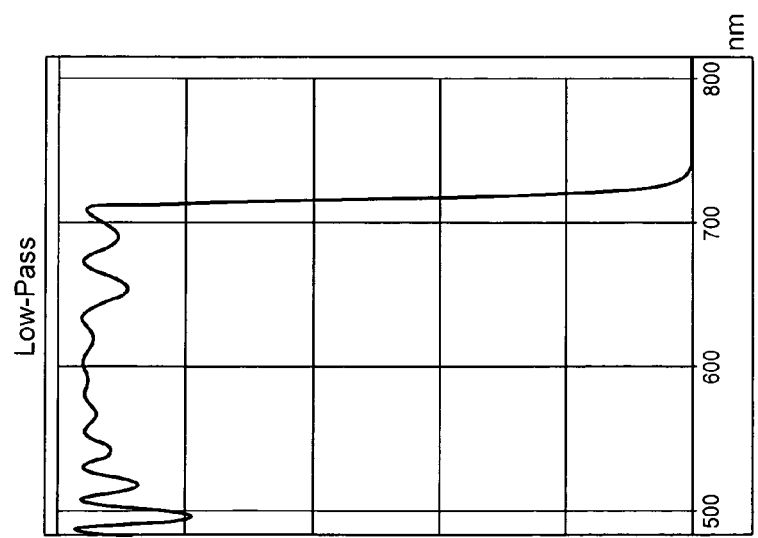
FIG. 5E1

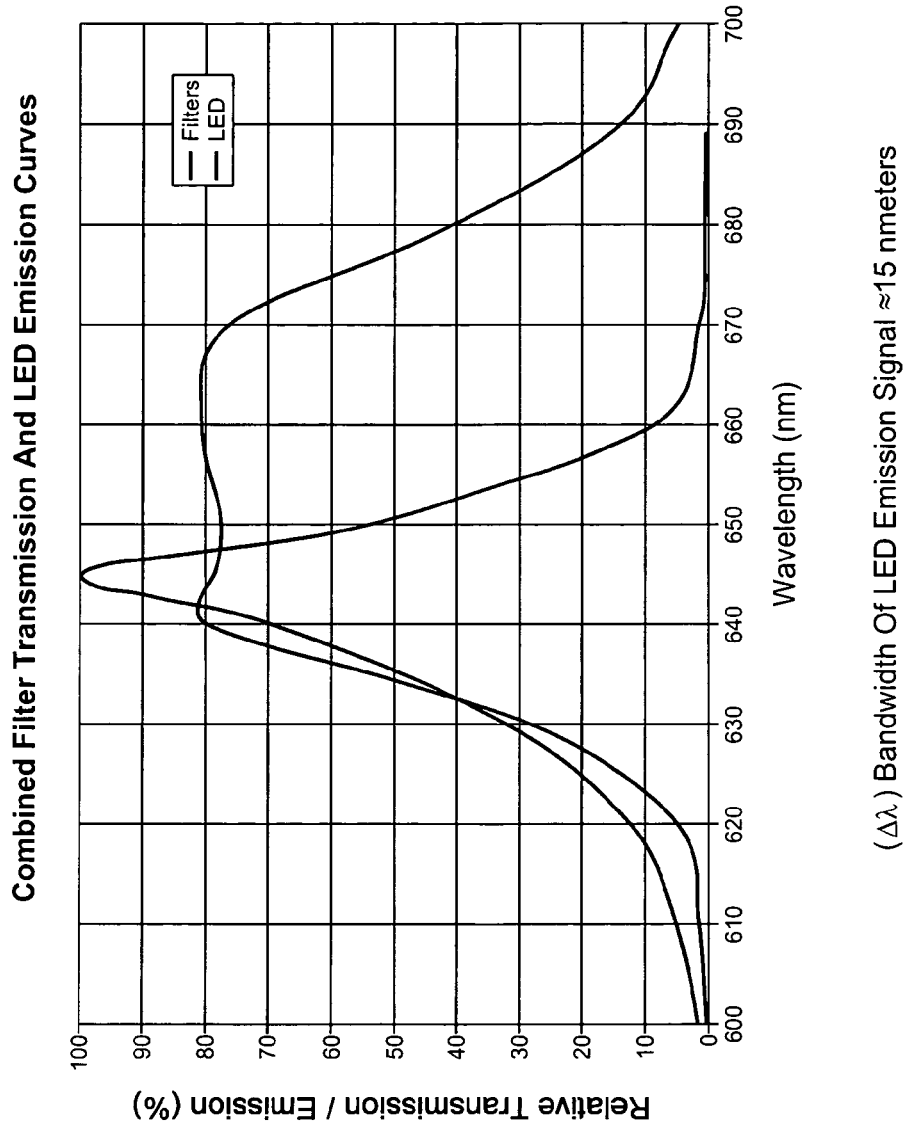
FIG. 5E3

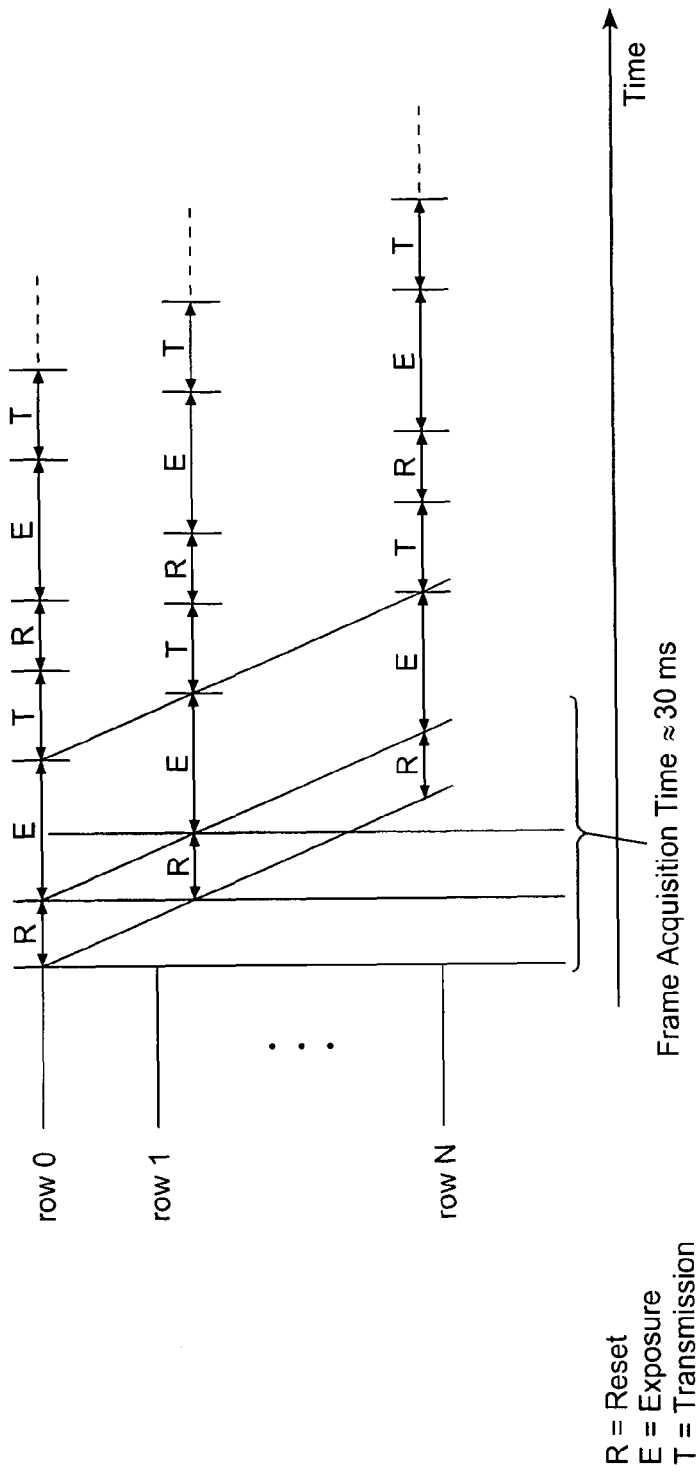

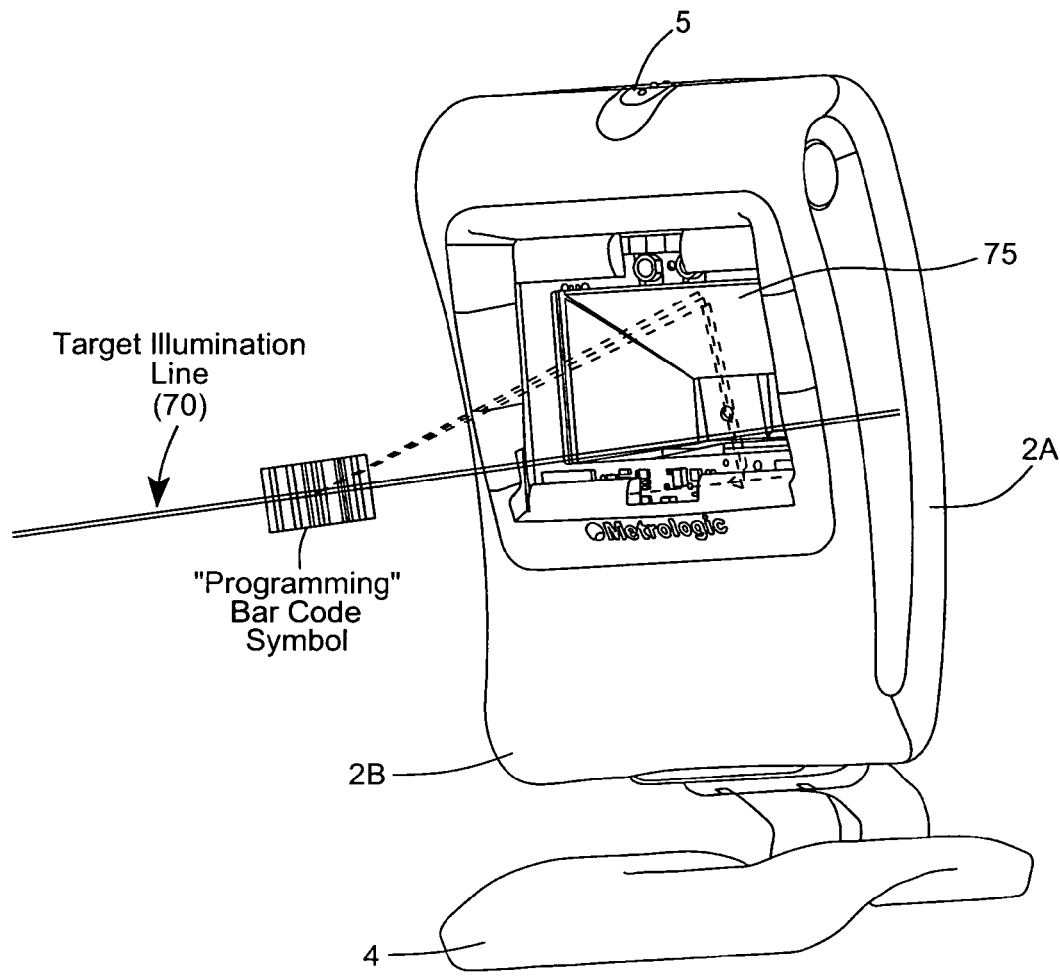
FIG. 14A1

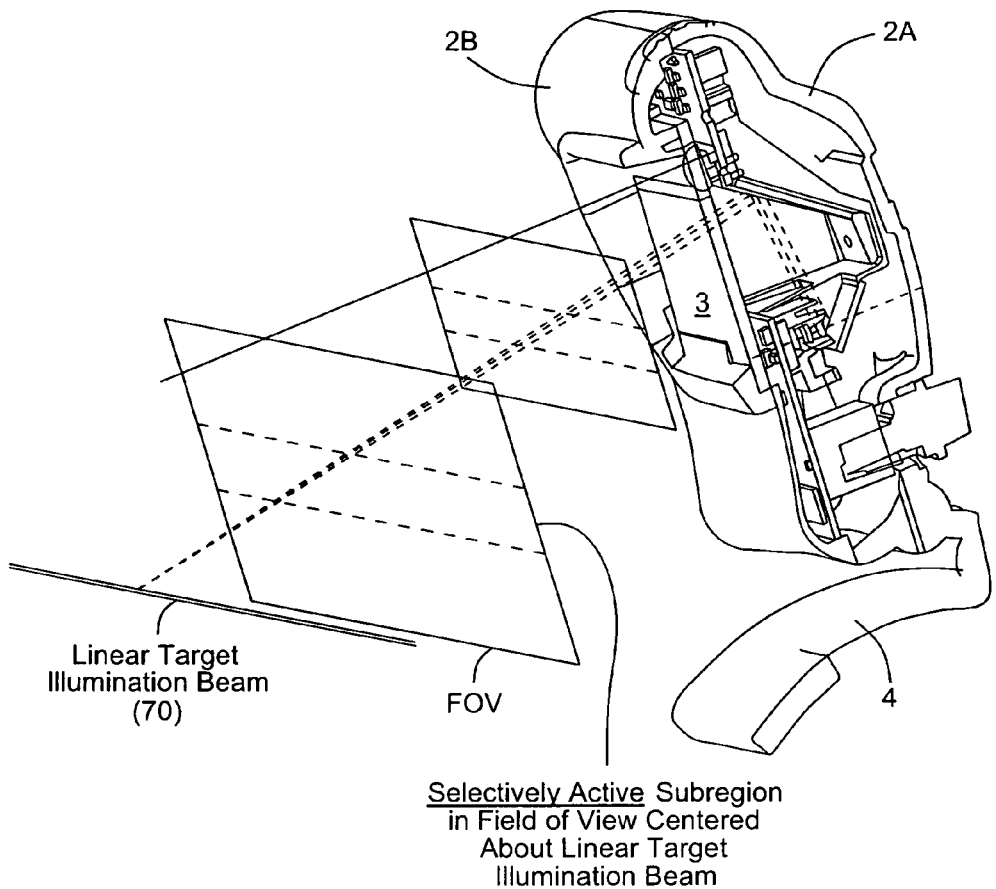
FIG. 14A2

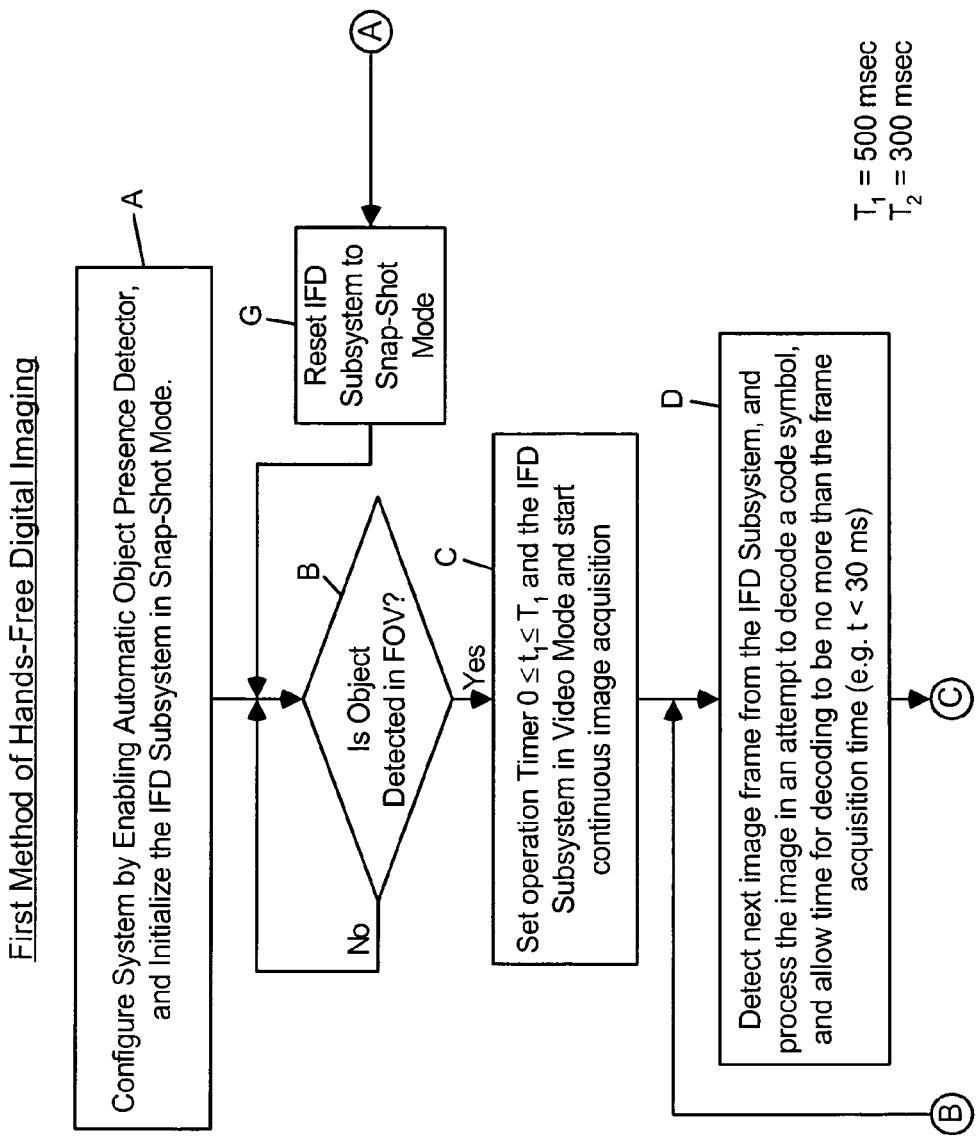
FIG. 15A1

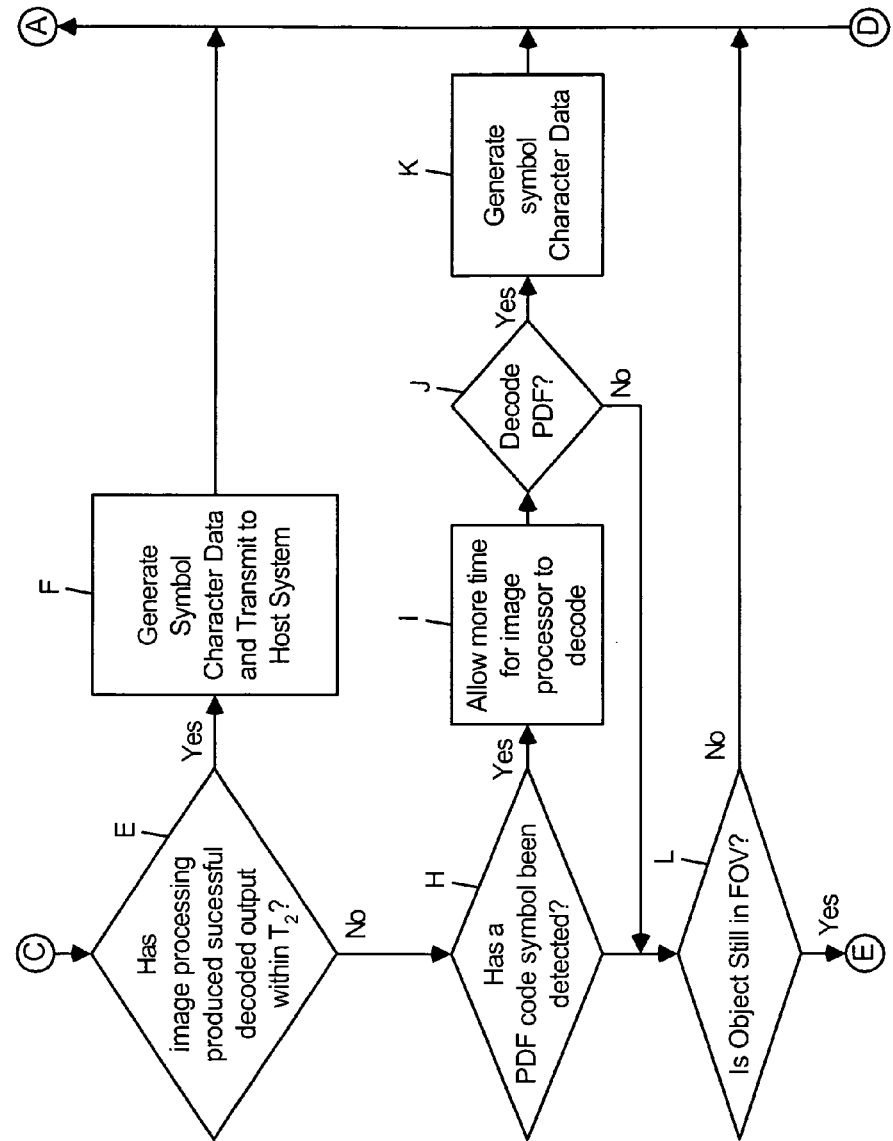
FIG. 15A2

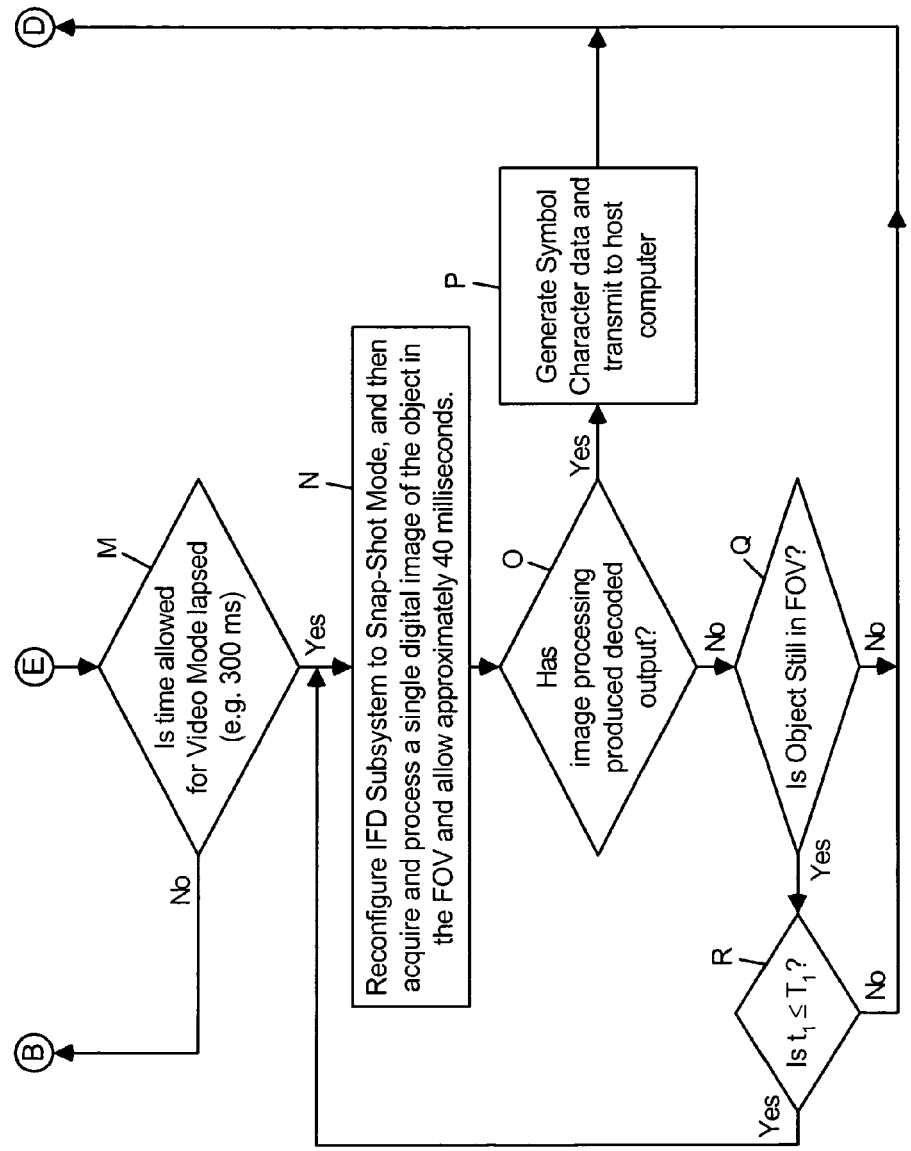
FIG. 15A3

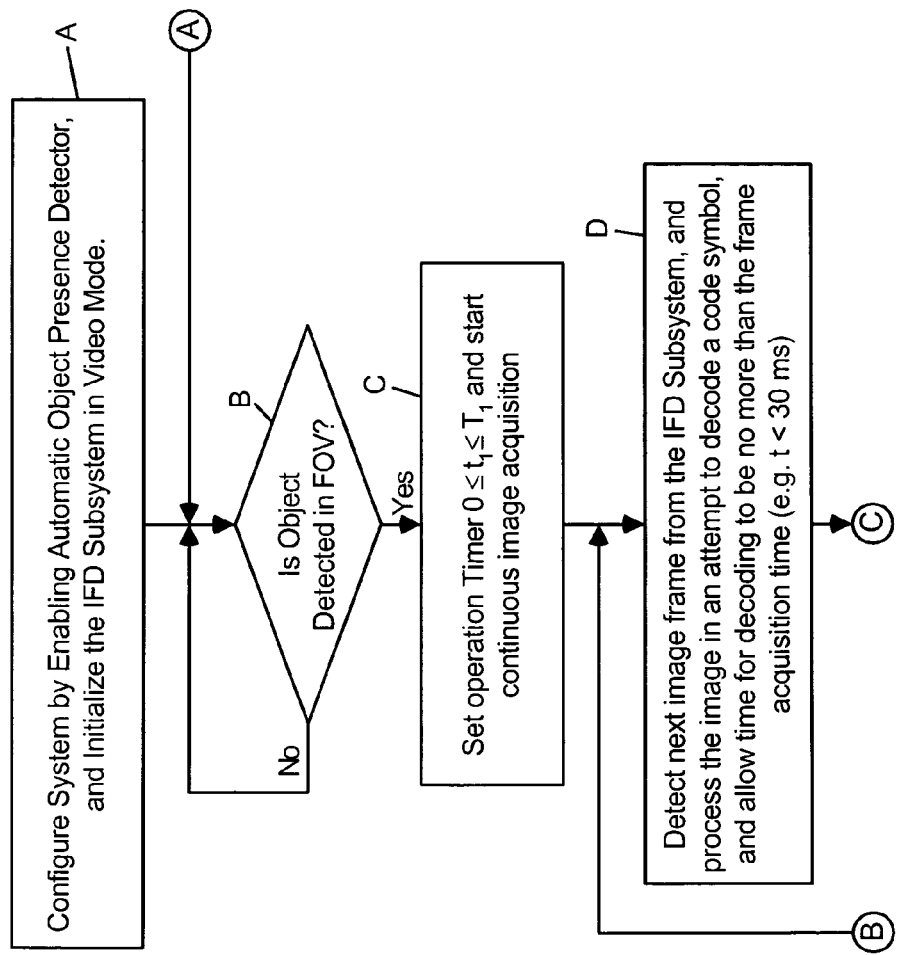
FIG. 17A1

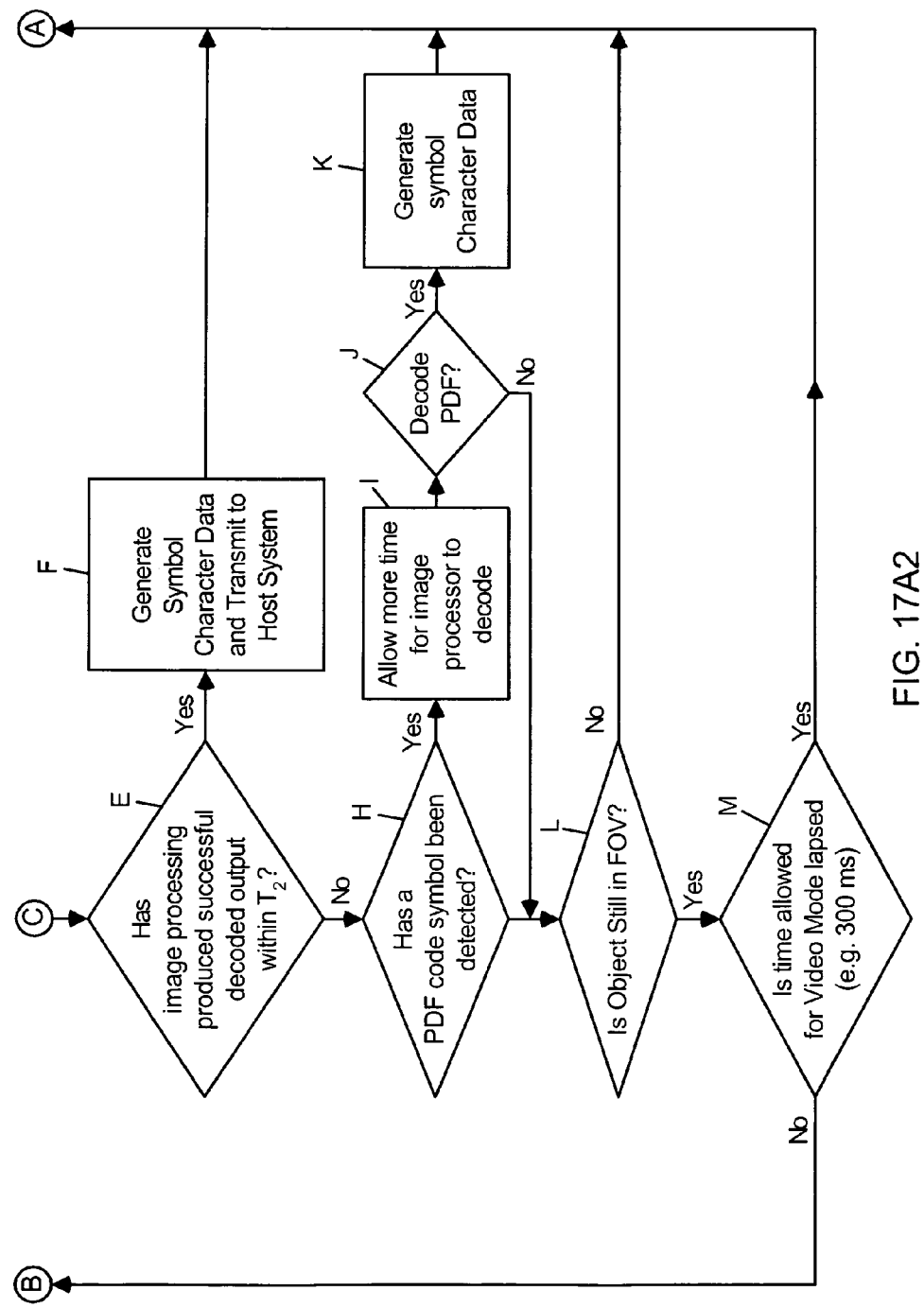
FIG. 17A2

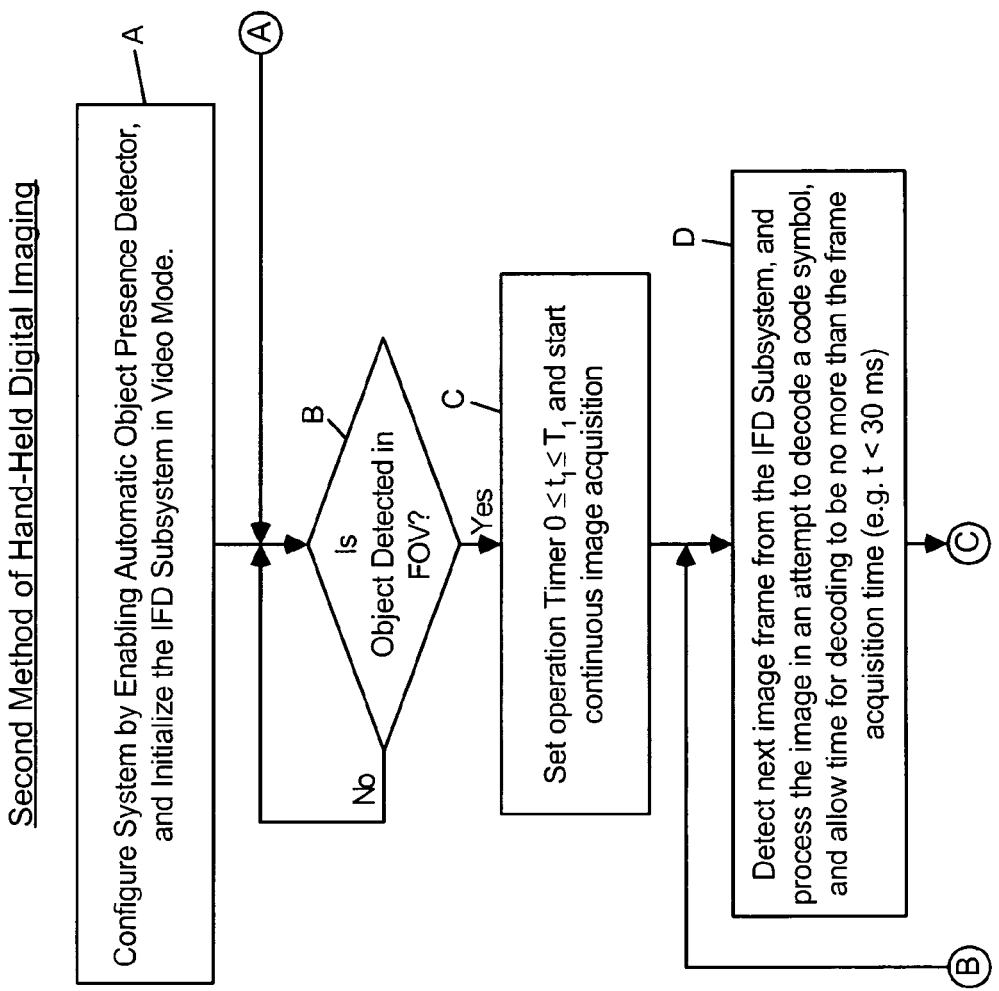
FIG. 19A1

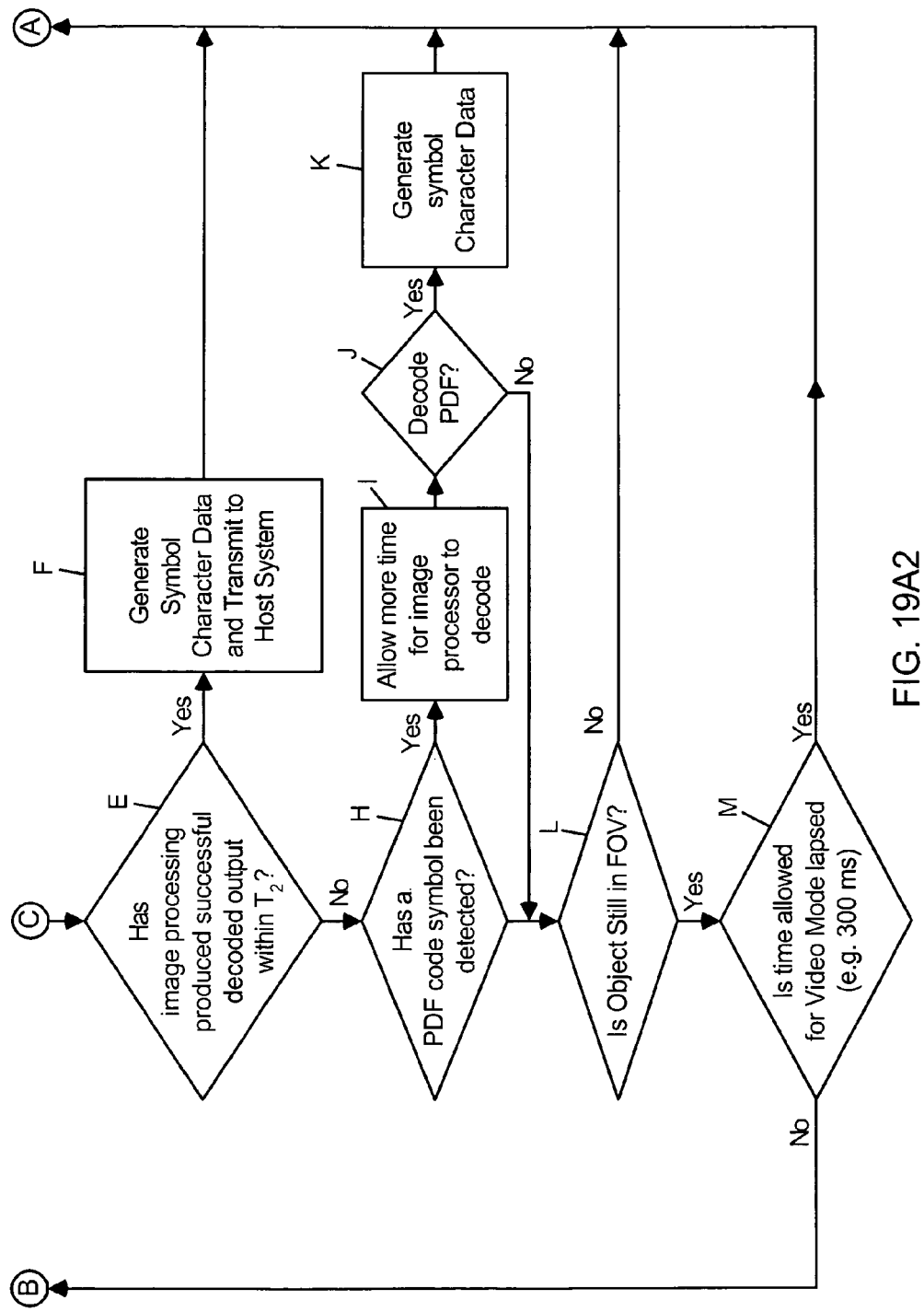
FIG. 19A2

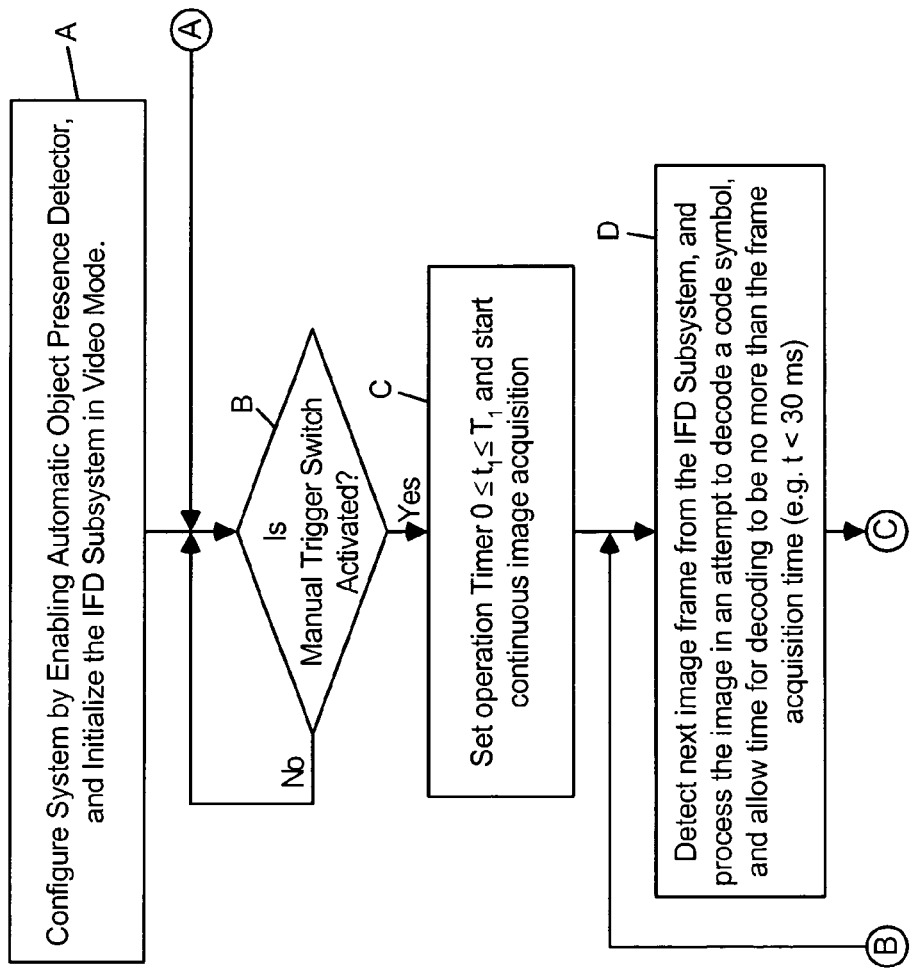
FIG. 21A1

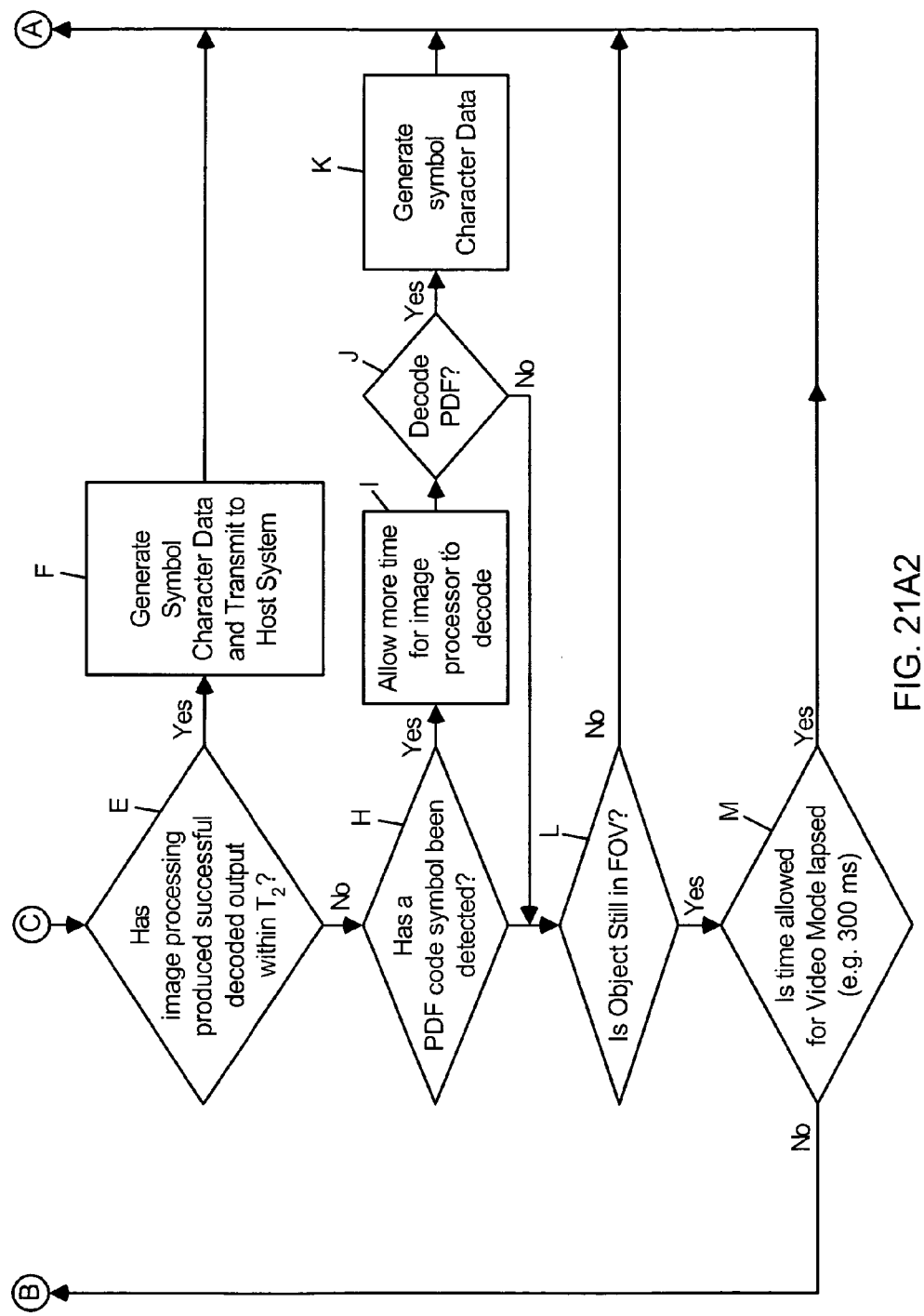
FIG. 21A2

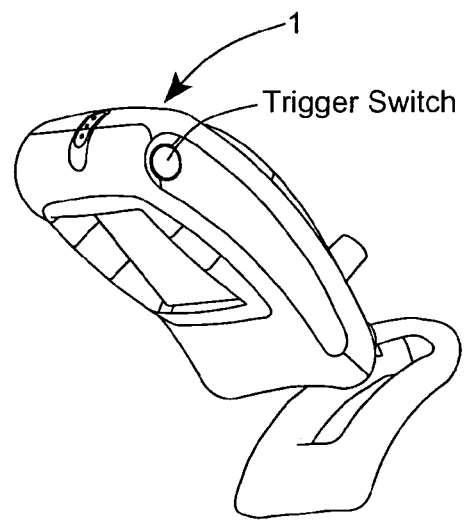
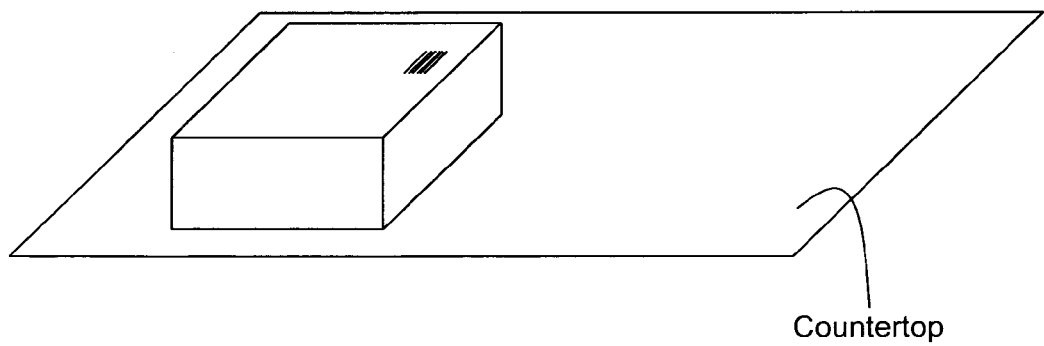
FIG. 21B

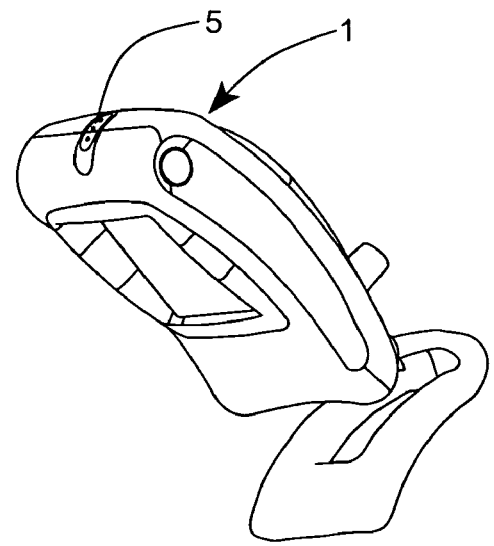
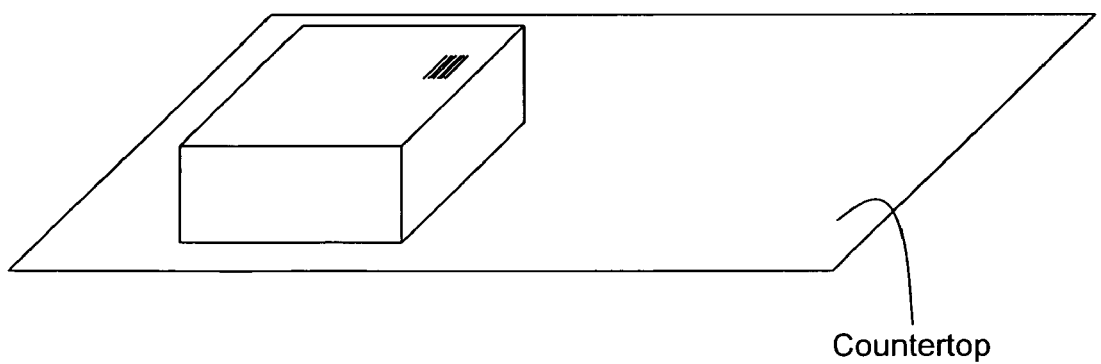
FIG. 22B

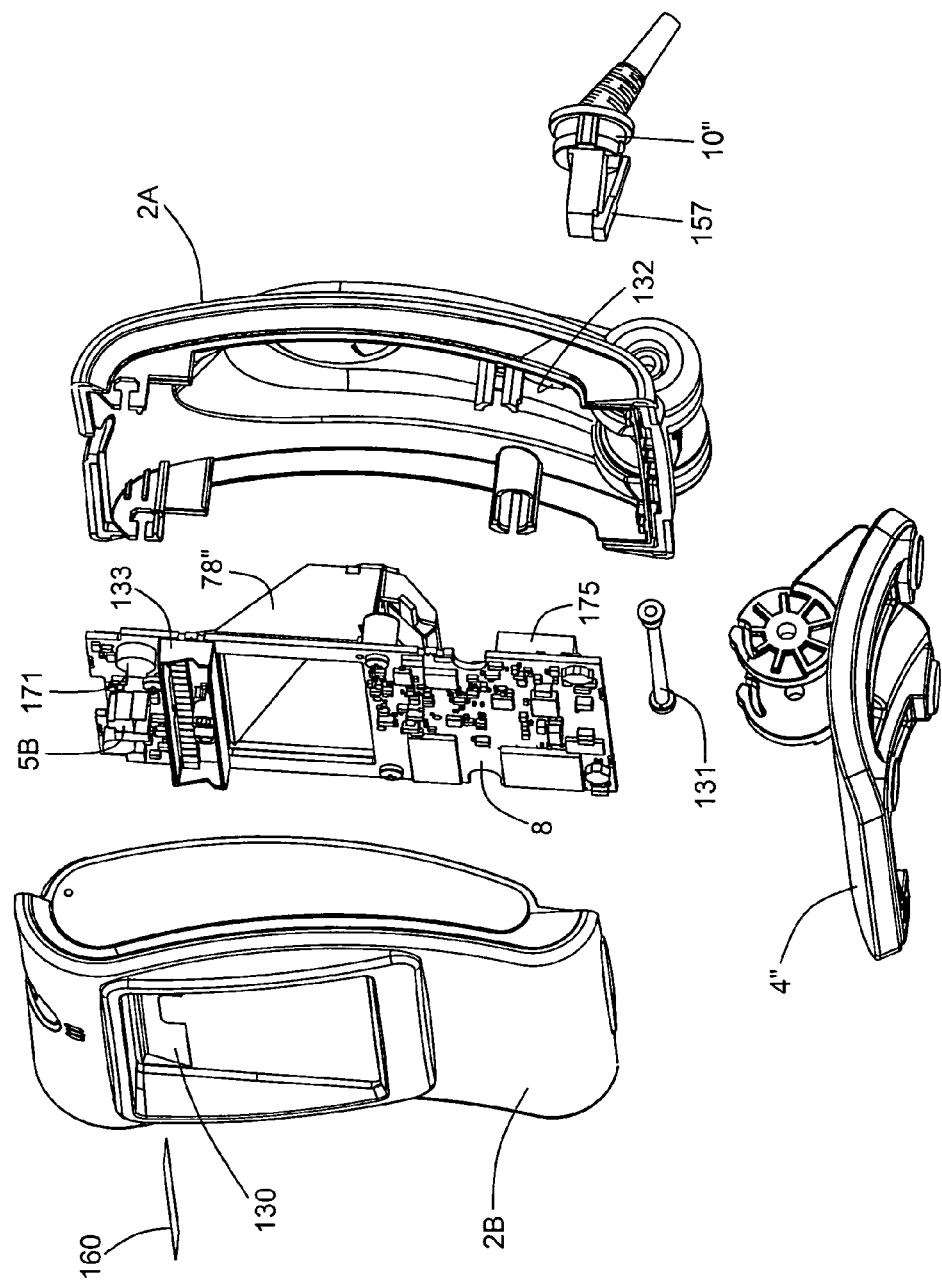

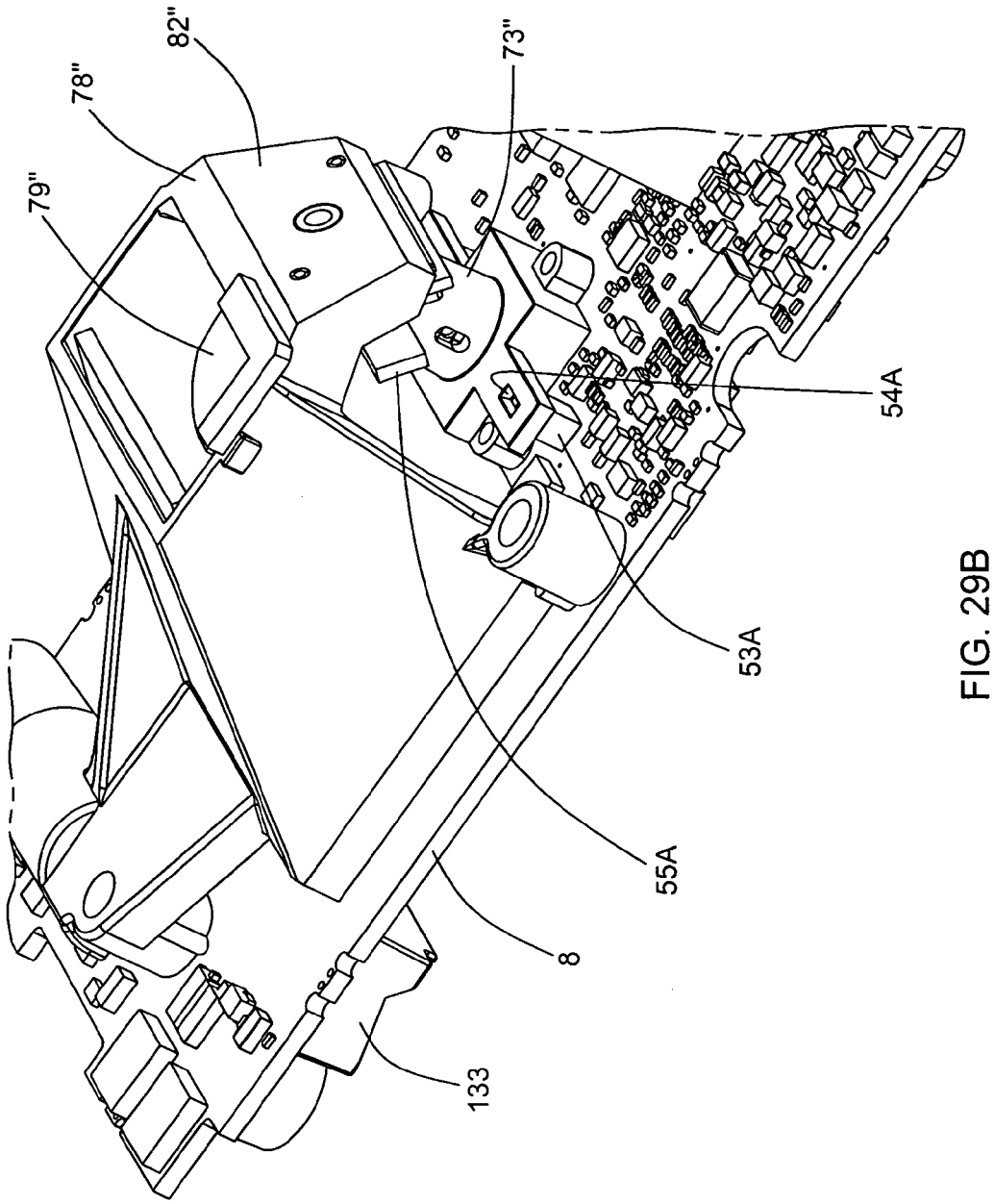

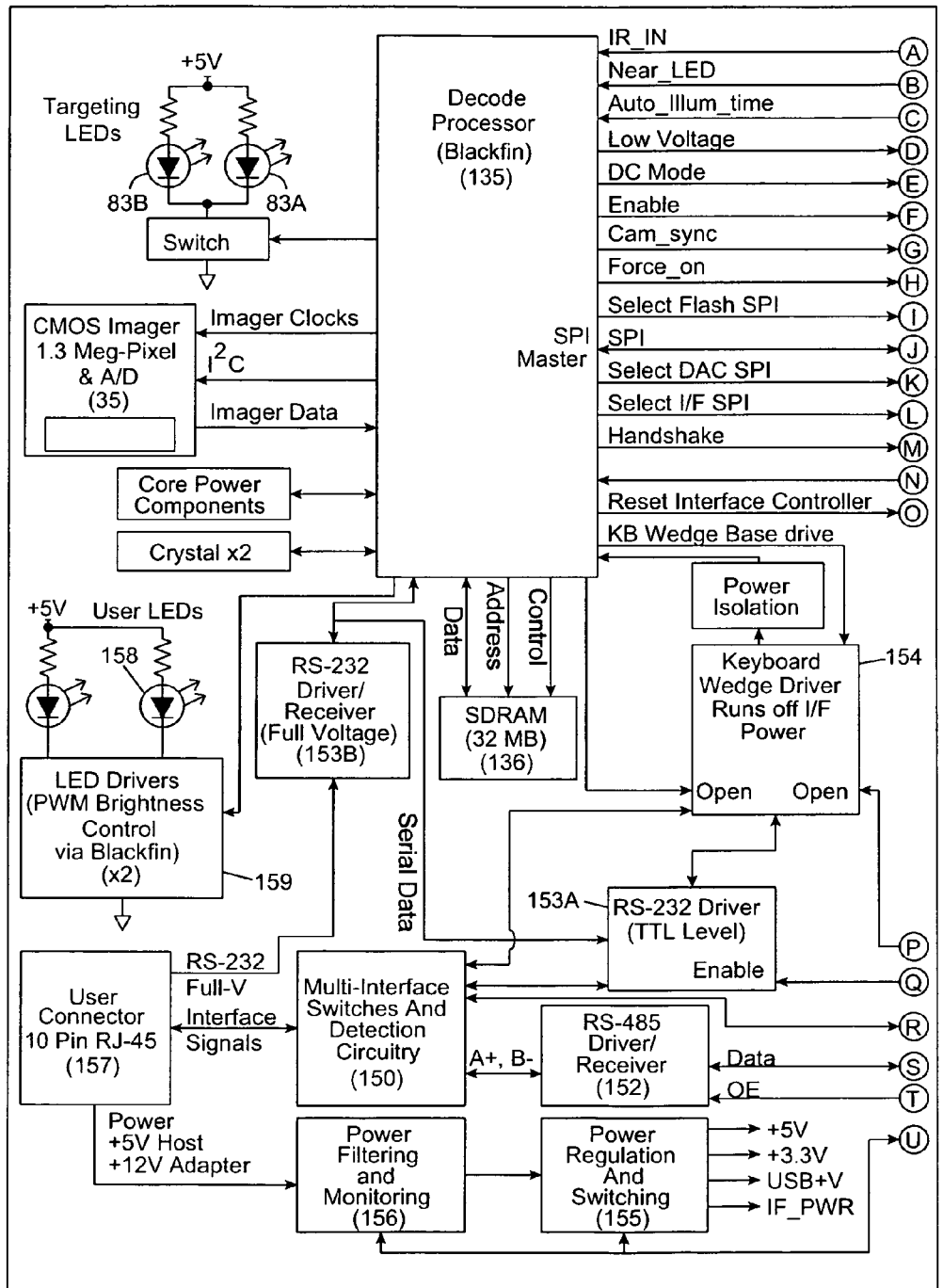
FIG. 32B1

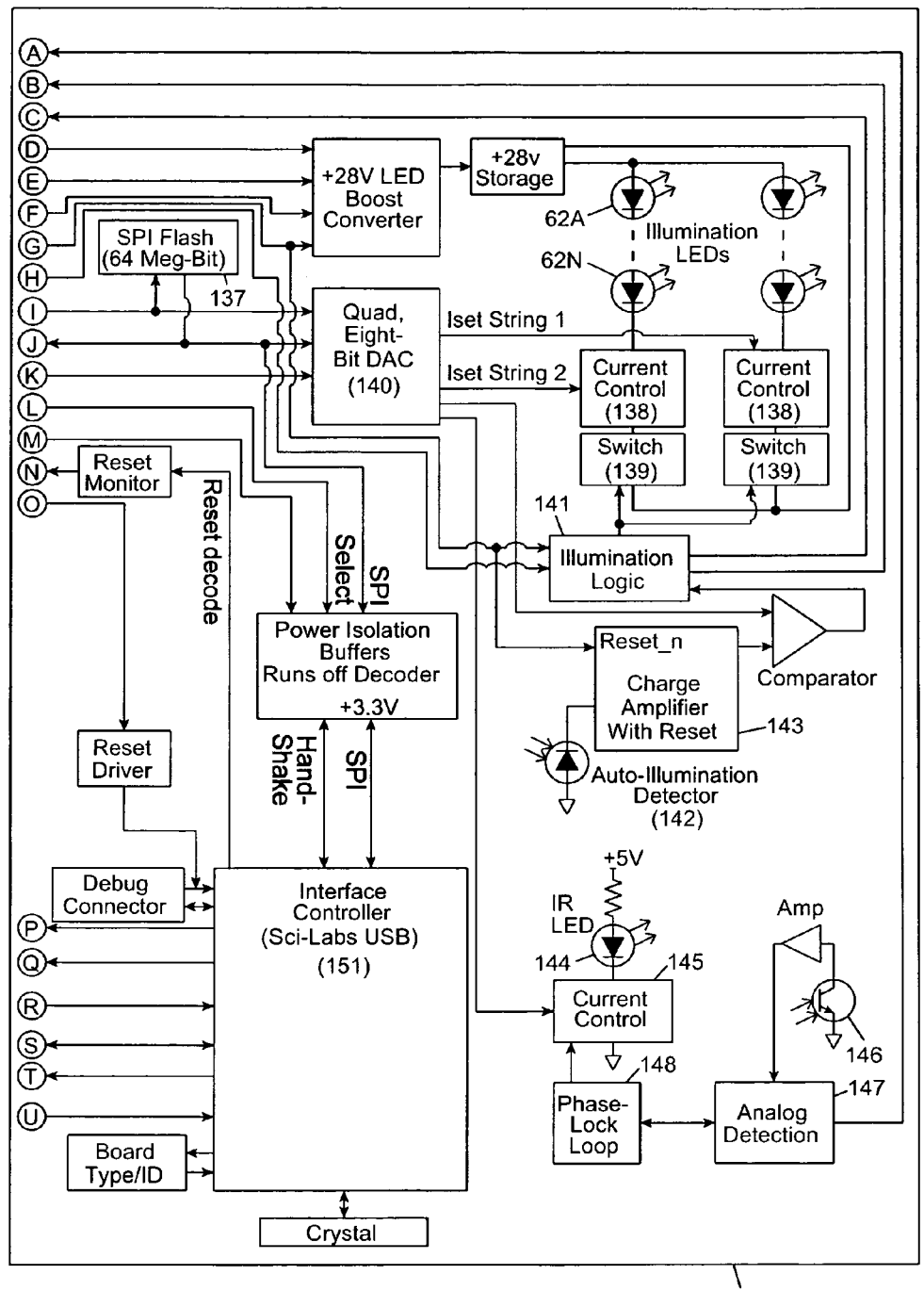
FIG. 32B2

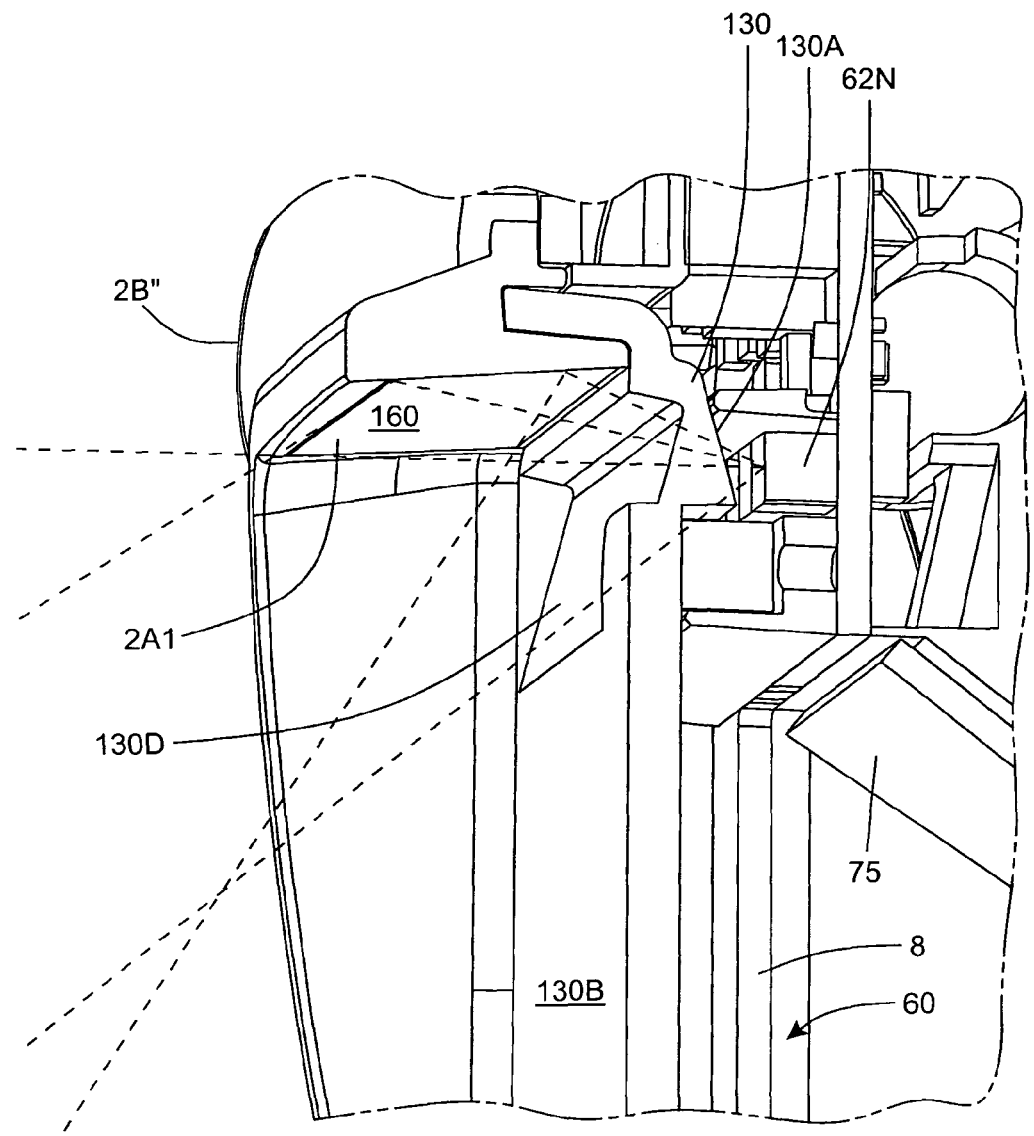
FIG. 33C1

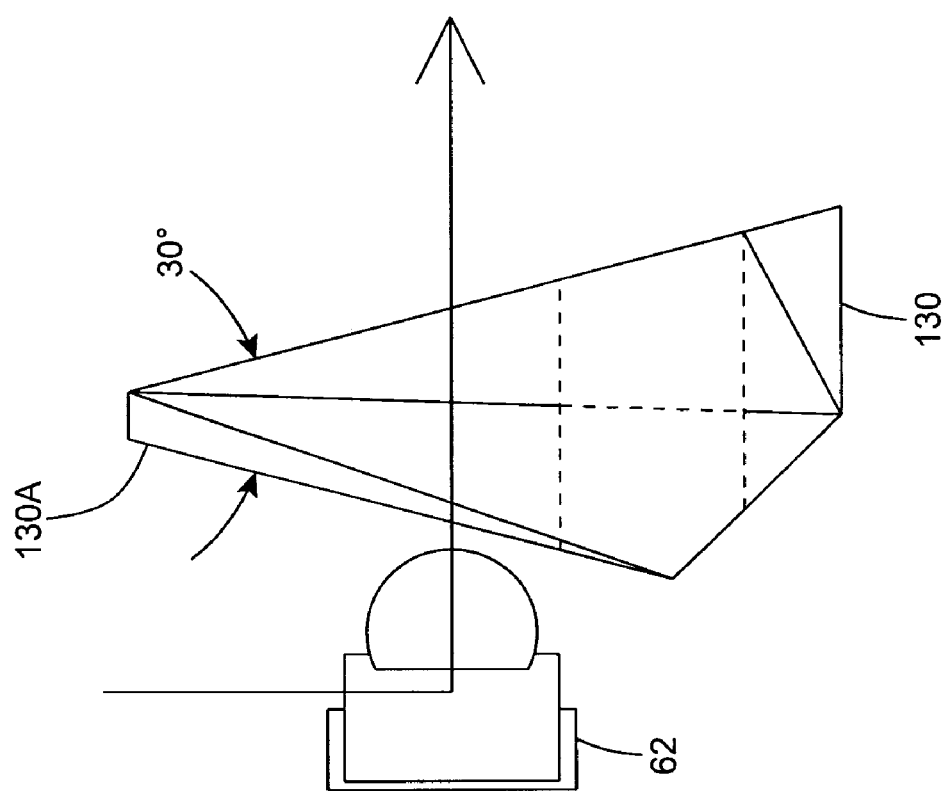
FIG. 33C2

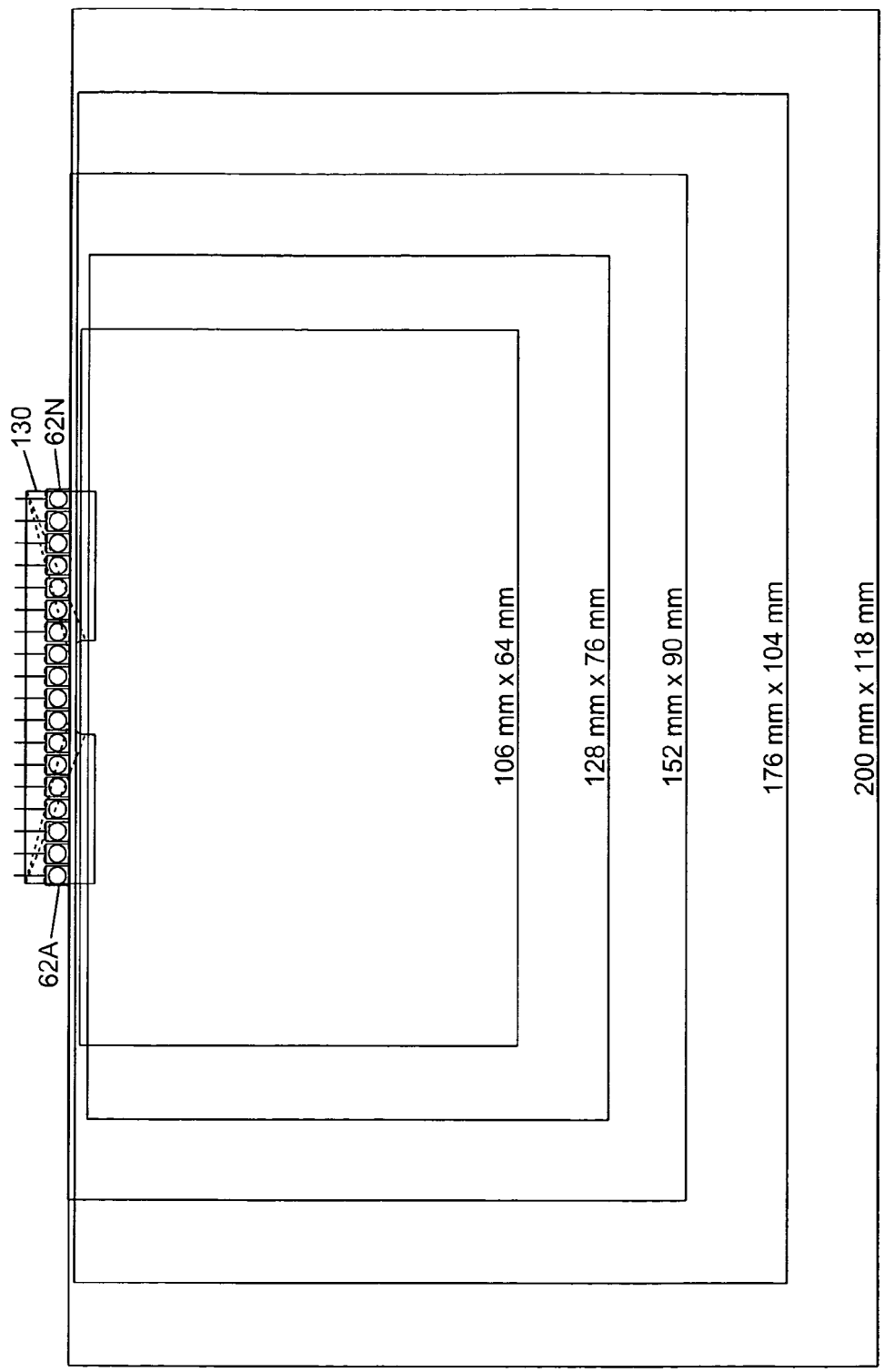

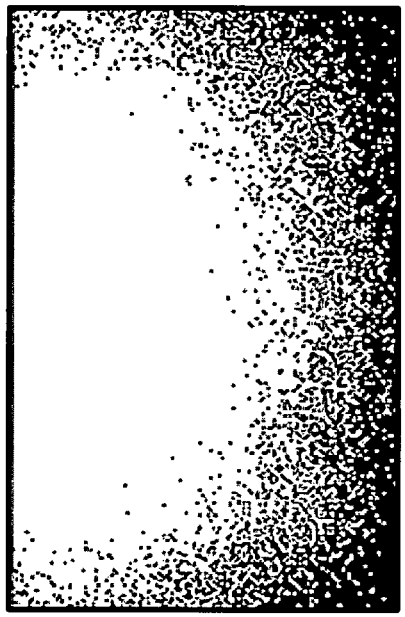
FIG. 33G1
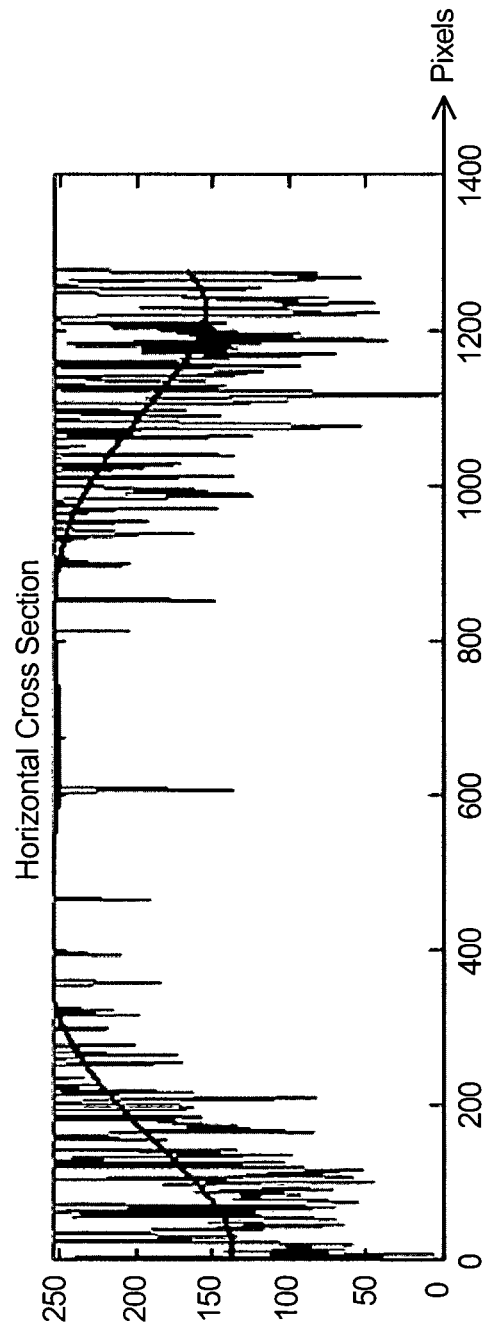
FIG. 33G2

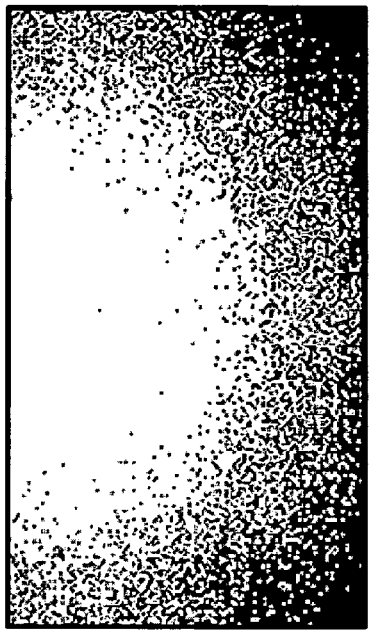
FIG. 33H1
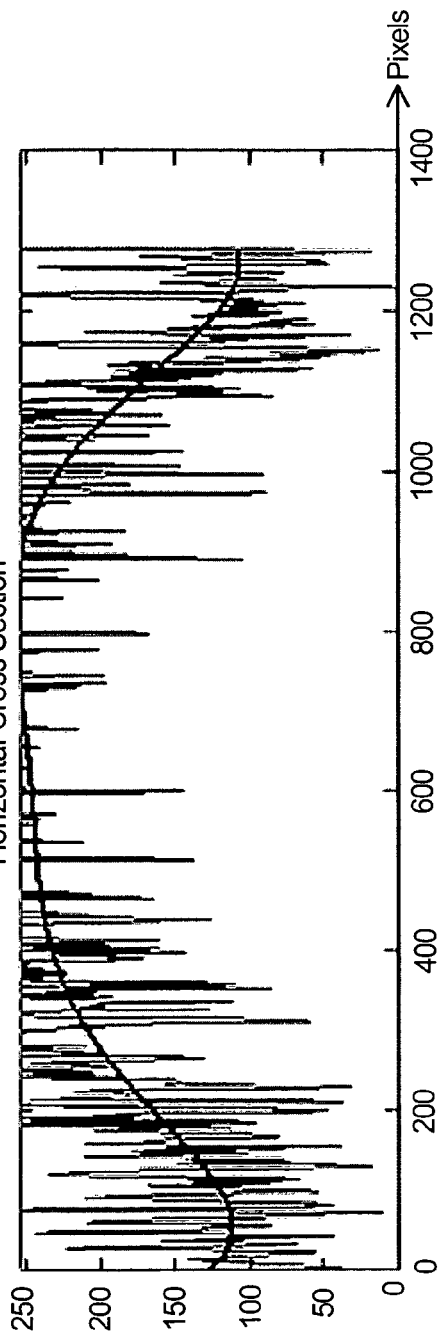
FIG. 33H2

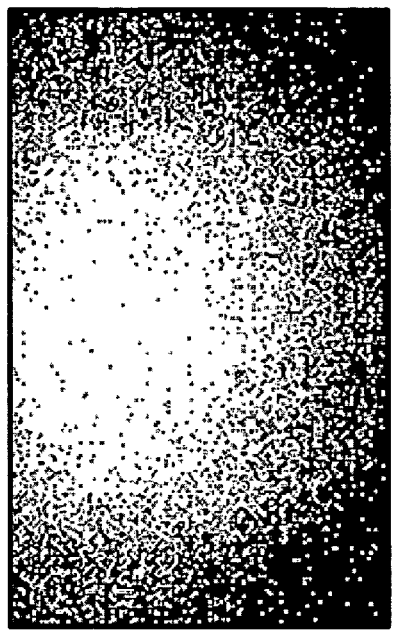
FIG. 33I1
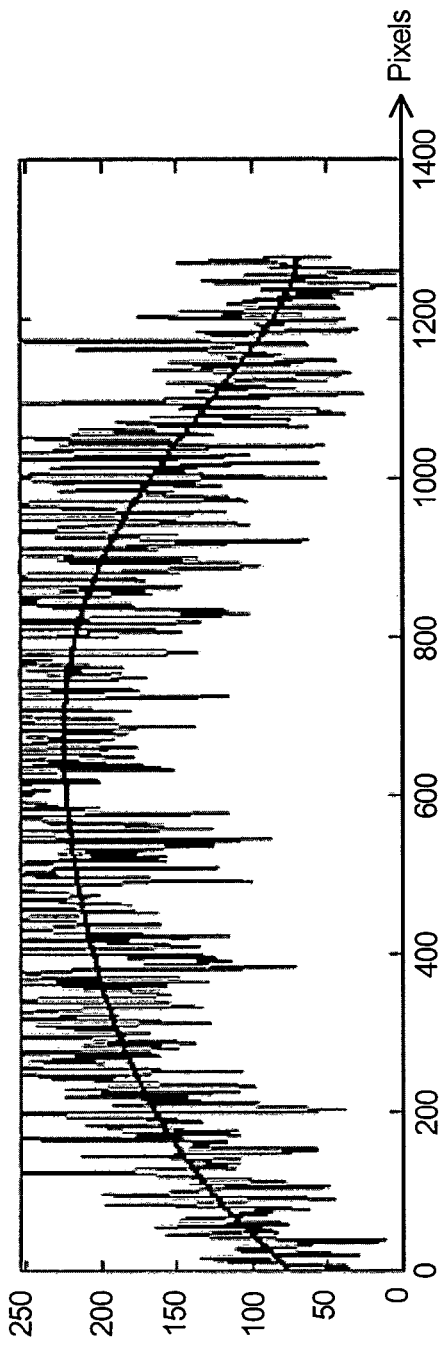
FIG. 33I2

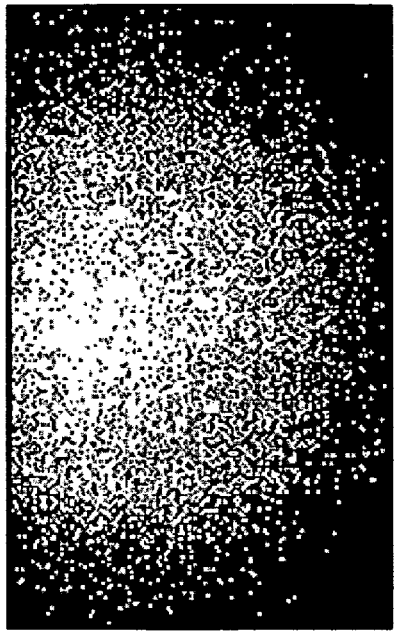
FIG. 33J1
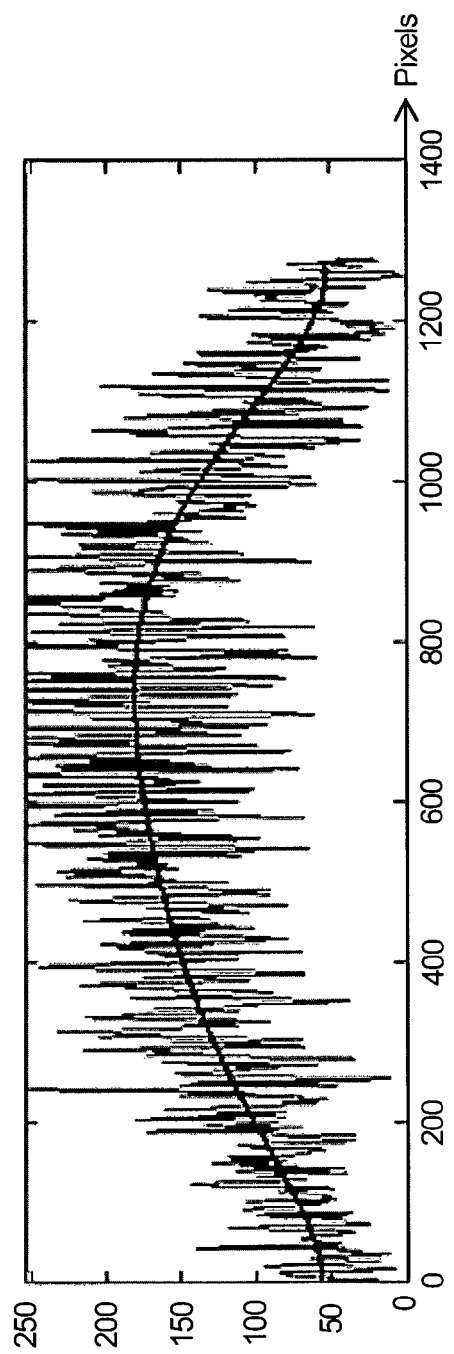
FIG. 33J2

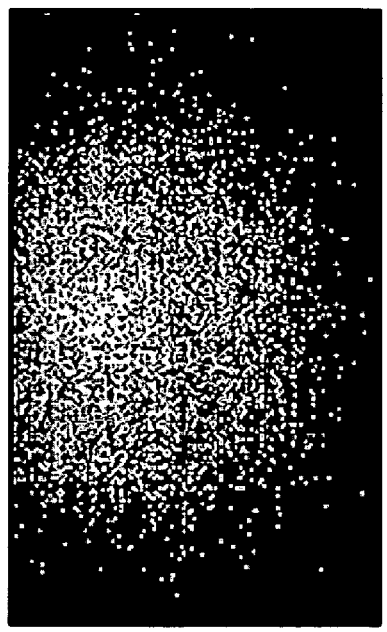
FIG. 33K1
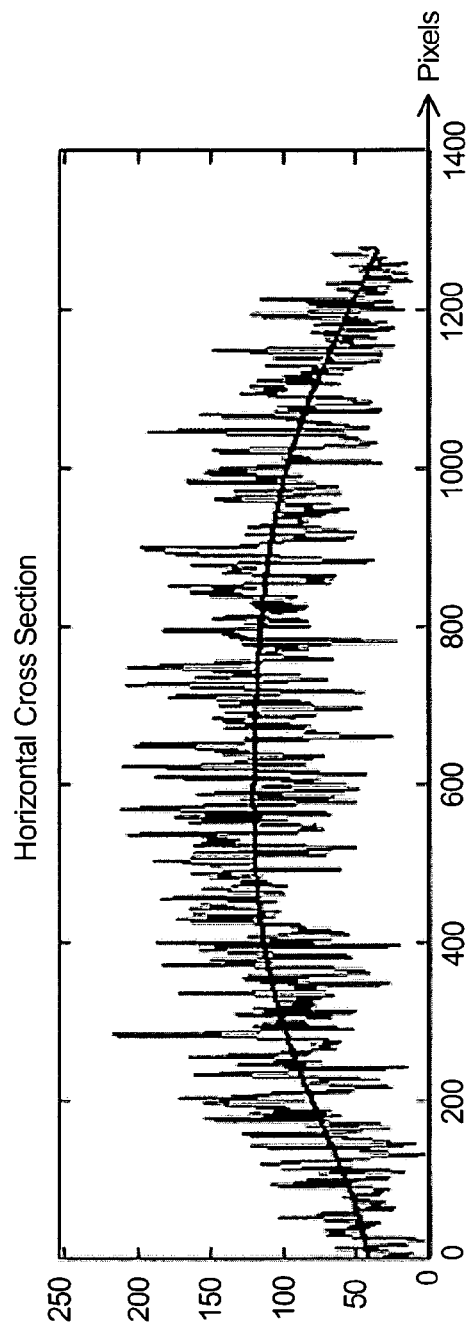
FIG. 33K2

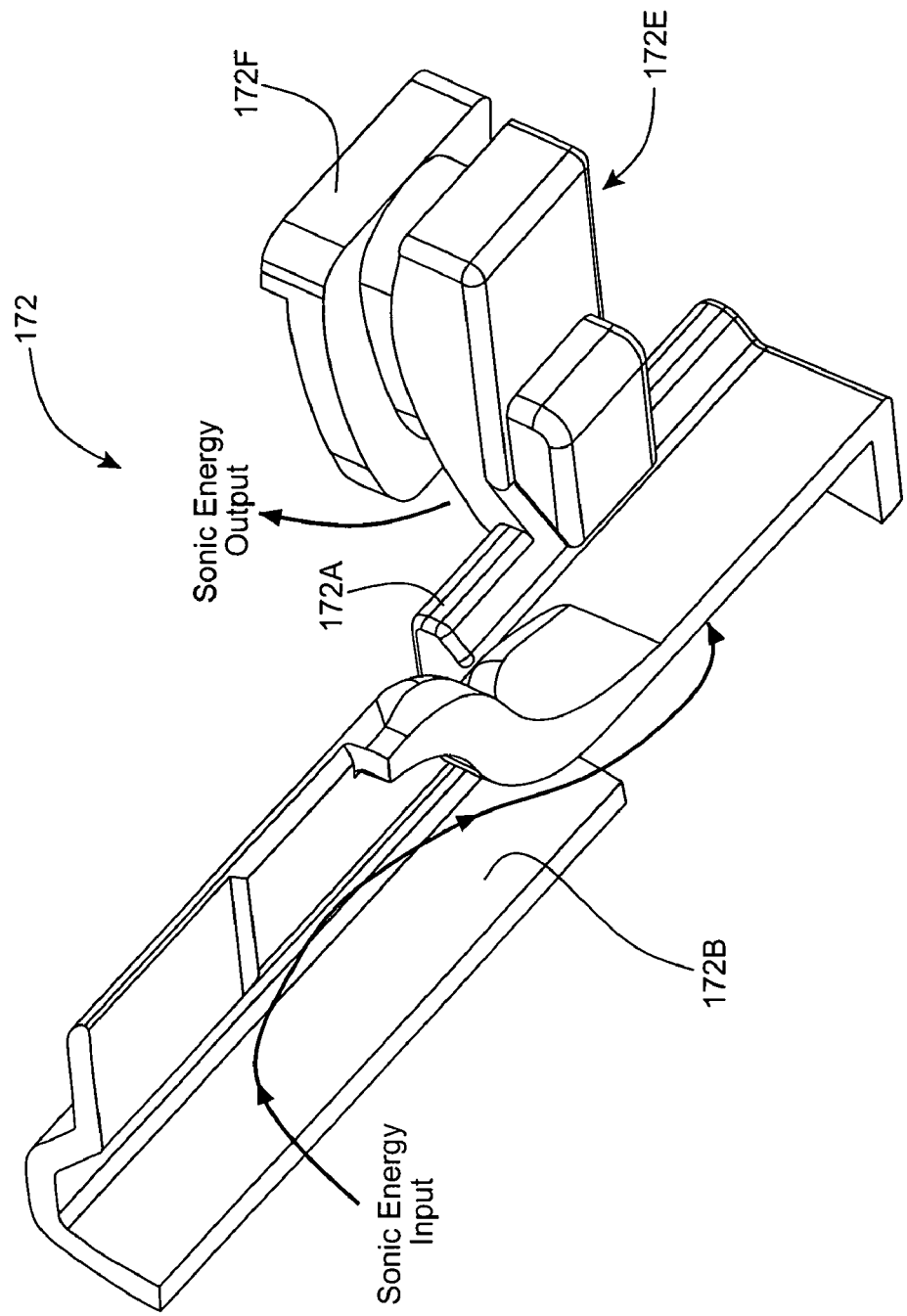

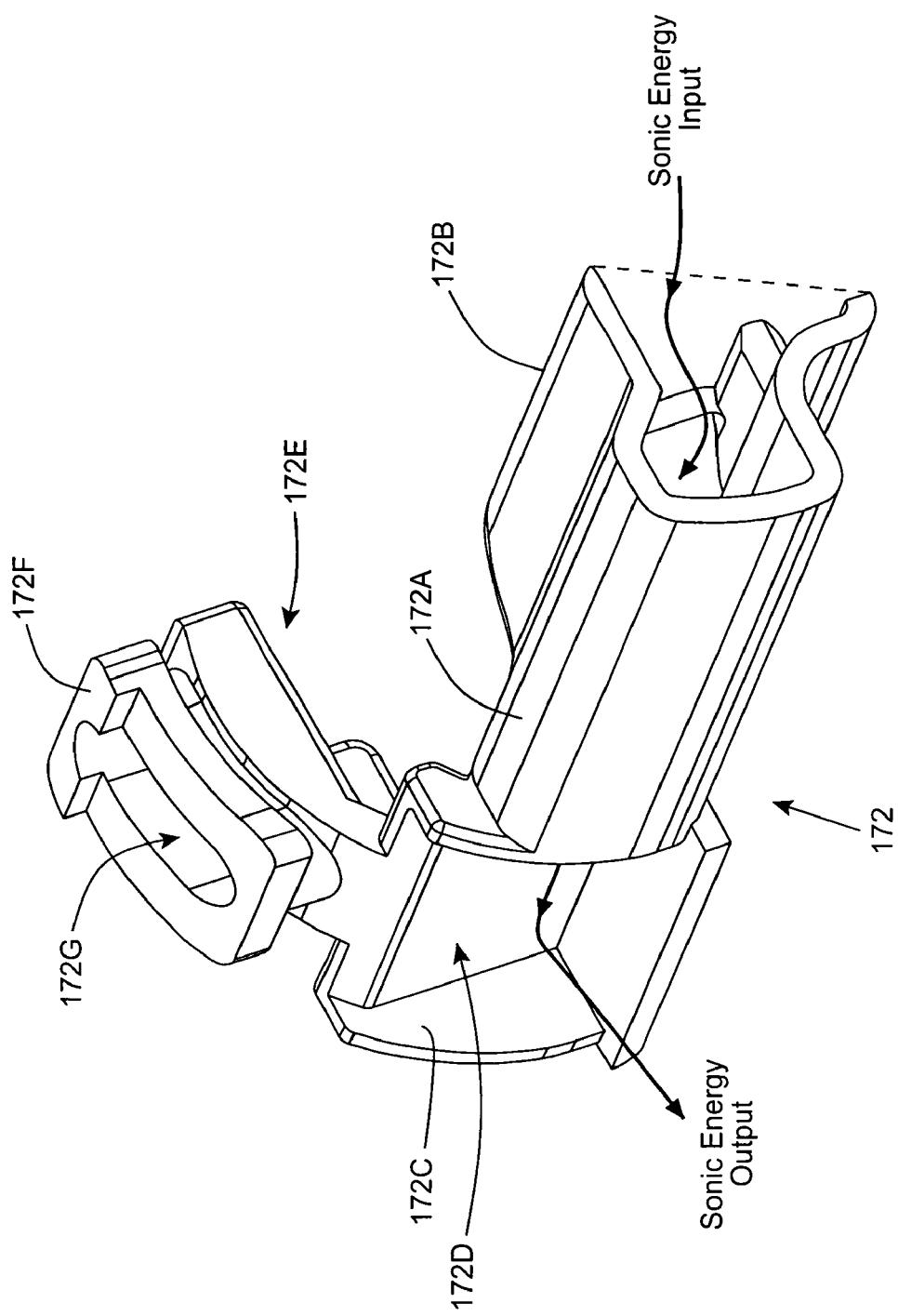

Interface Switching Top Level Block Diagram

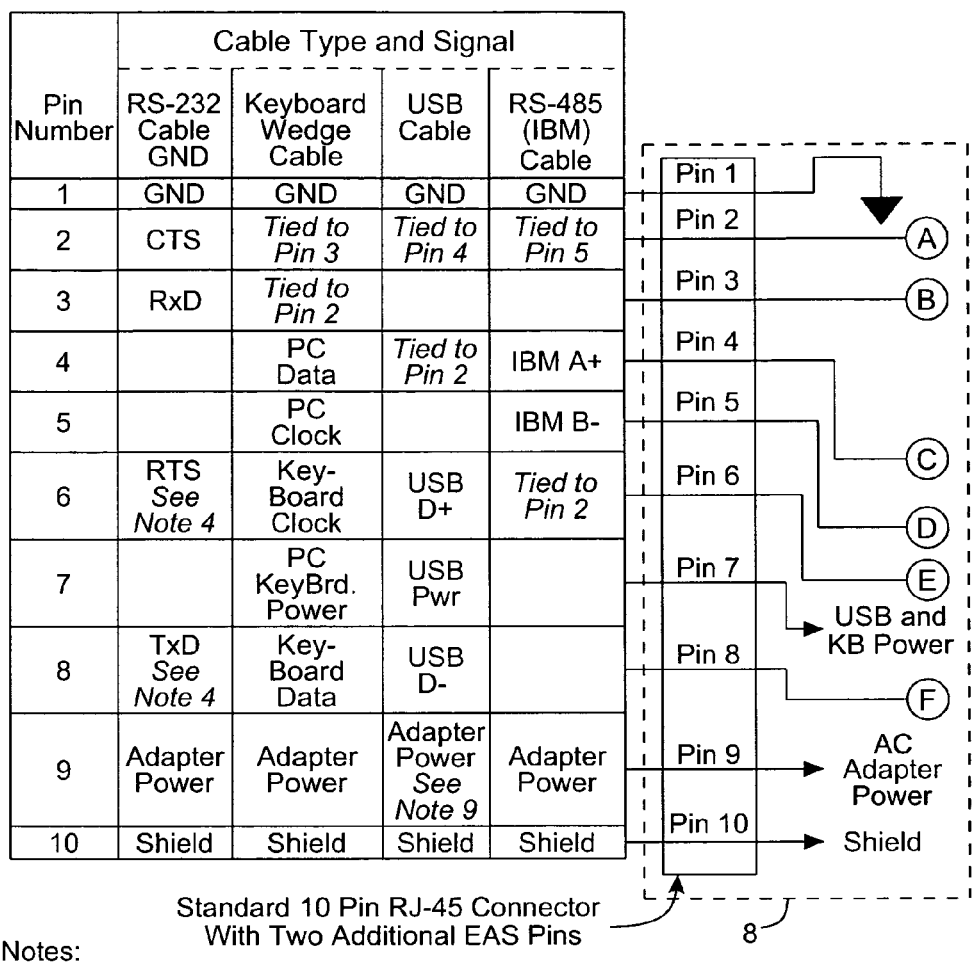

| Pin Number | Cable Type and Signal | | | |
|---|---|---|---|---|
| | RS-232 Cable GND | Keyboard Wedge Cable | USB Cable | RS-485 (IBM) Cable |
| 1 | GND | GND | GND | GND |
| 2 | CTS | Tied to Pin 3 | Tied to Pin 4 | Tied to Pin 5 |
| 3 | RxD | Tied to Pin 2 | | |
| 4 | | PC Data | Tied to Pin 2 | IBM A+ |
| 5 | | PC Clock | | IBM B- |
| 6 | RTS See Note 4 | Key-Board Clock | USB D+ | Tied to Pin 2 |
| 7 | | PC KeyBrd. Power | USB Pwr | |
| 8 | TxD See Note 4 | Key-Board Data | USB D- | |
| 9 | Adapter Power | Adapter Power | Adapter Power See Note 9 | Adapter Power |
| 10 | Shield | Shield | Shield | Shield |

Standard 10 Pin RJ-45 Connector With Two Additional EAS Pins

Notes:
1.) Analog Switches Shown in Power-up State (Keyboard Wedge Mode)
2.) Keyboard Wedge Open Collector Transistors Initially Off. Pull-Ups not tied to +5V.
3.) Keyboard Wedge Circuit Analog Switch (4066) Initially In Open Position.
4.) RTS and TxD Signals are TTL Level Only.
5.) Full RS-232 (-14) Option Is Not Shown In This Diagram.
6.) Keyboard Wedge Open Collector Transistors In Off State For RS-232 Communication.
7.) Flash Update Not Available With Keyboard Interface. USB or RS-232 Cable Can Be Temporarily Used For Flash.
8.) RS-485 Flash Update May Be Possible.
9.) USB Requires Adapter Power for High Power/Imaging Mode Only. KB Wedge power PC Power for pass-through only (Needs adapter to scan).

FIG. 43B1

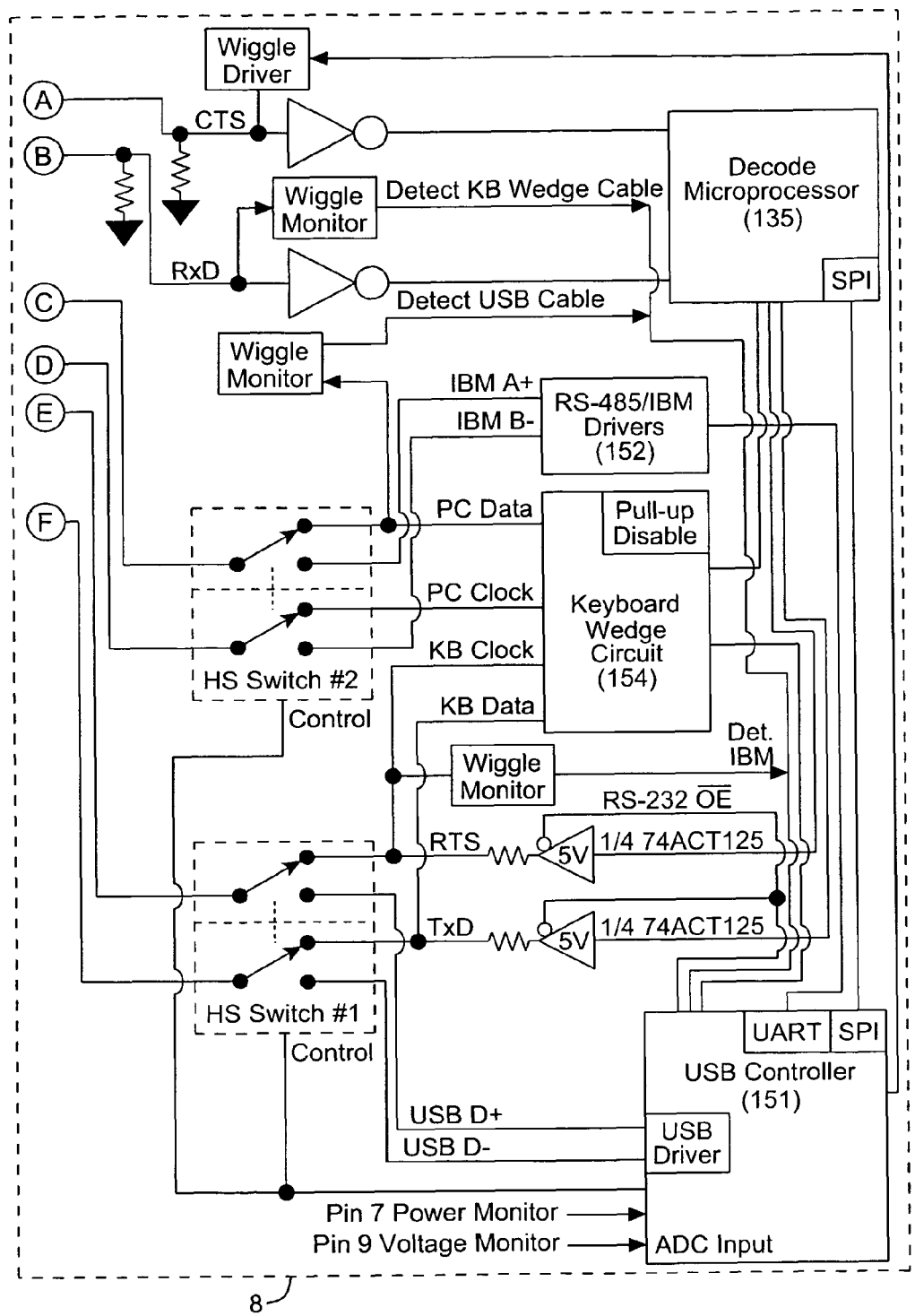
FIG. 43B2

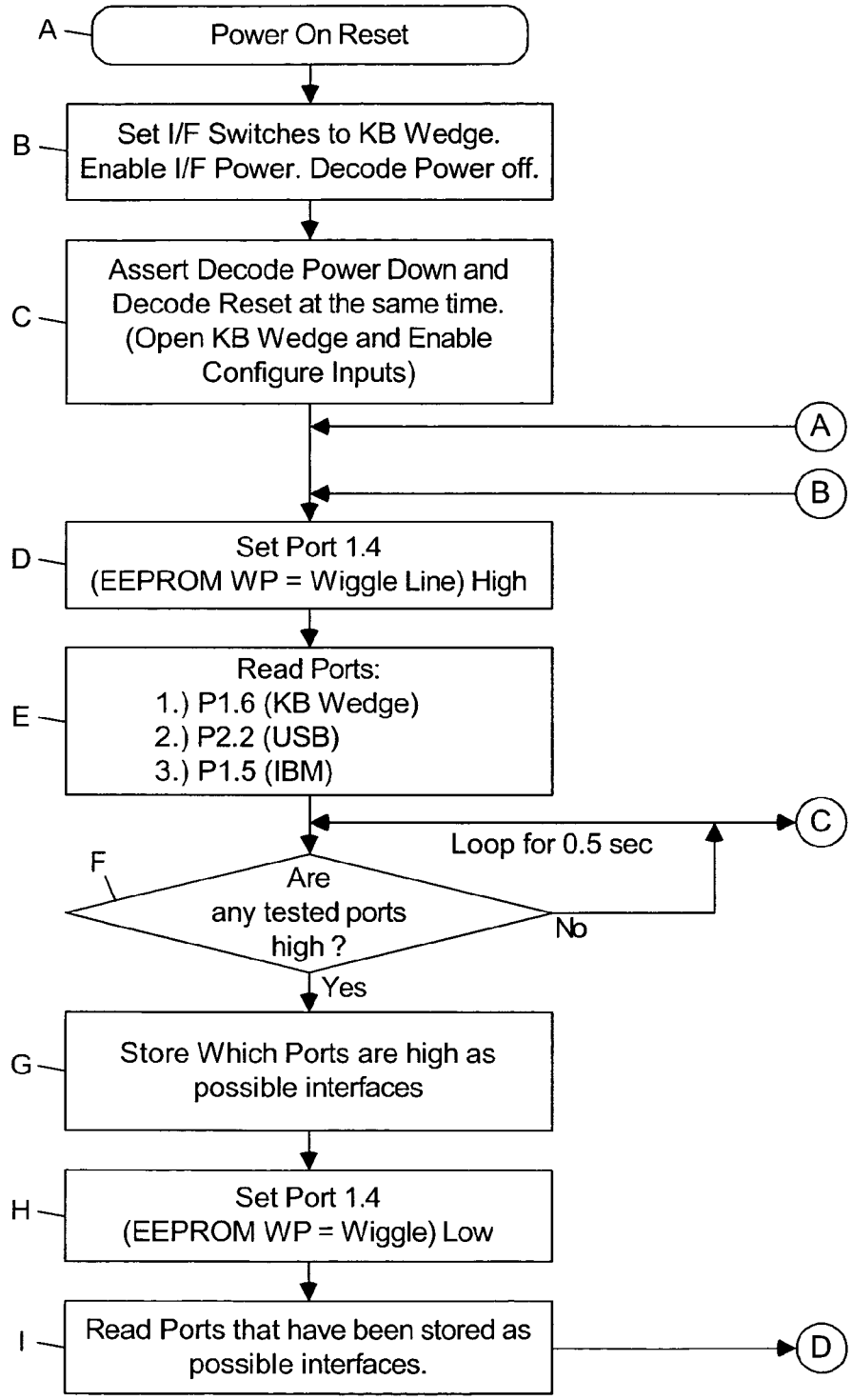
FIG. 43C1

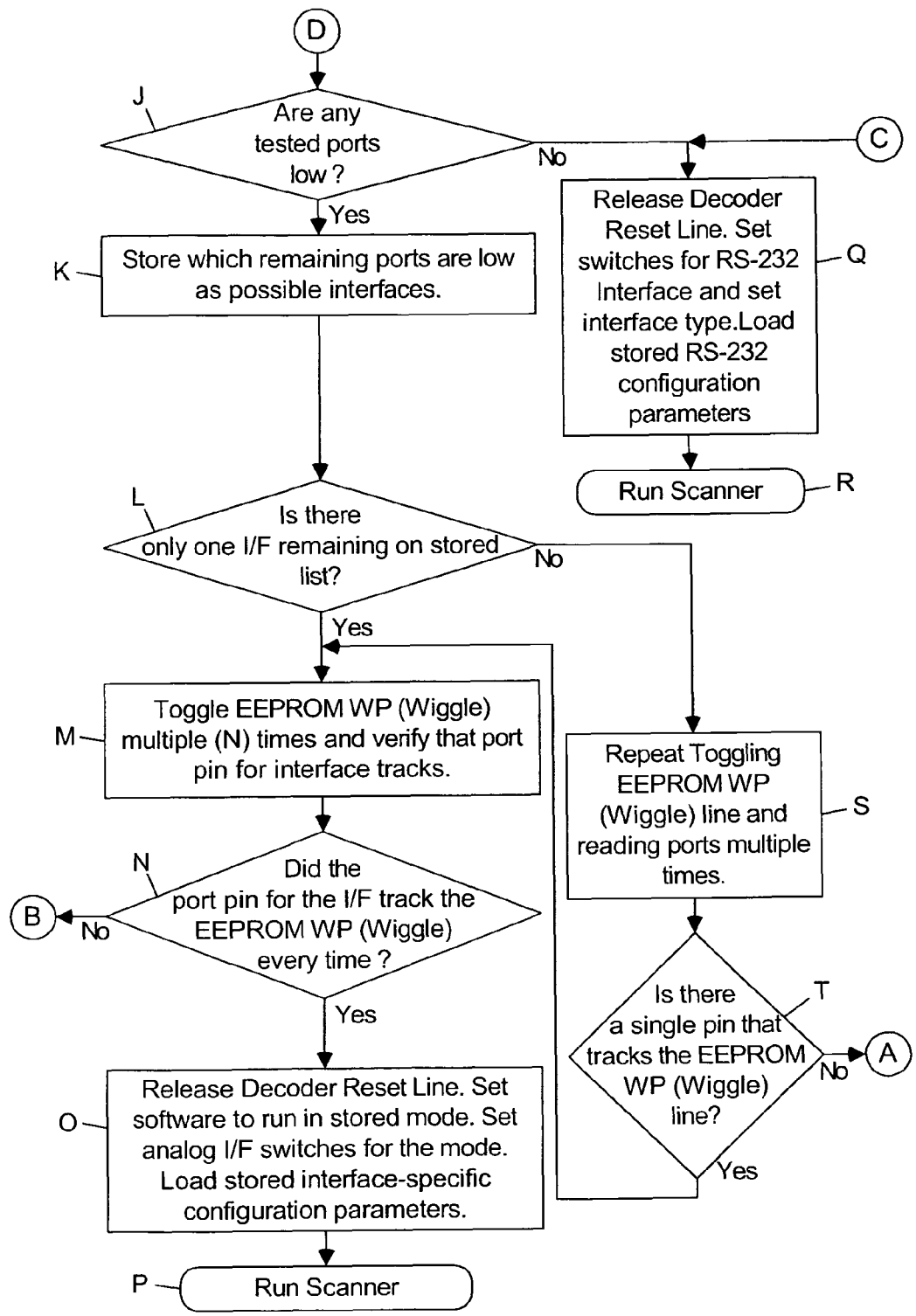
FIG. 43C2

DIGITAL IMAGE CAPTURE AND PROCESSING SYSTEM EMPLOYING AN IMAGE FORMATION AND DETECTION SYSTEM HAVING AN AREA-TYPE IMAGE DETECTION ARRAY SUPPORTING SINGLE SNAP-SHOT AND PERIODIC SNAP-SHOT MODES OF IMAGE ACQUISITION DURING OBJECT ILLUMINATION AND IMAGING OPERATIONS

RELATED CASES

This application a Continuation of U.S. application Ser. No. 12/001,758 filed Dec. 12, 2007 now U.S. Pat. No. 7,841,533; which is a Continuation-in-Part of the following U.S. Applications: Ser. No. 11/640,814 filed Dec. 18, 2006 now U.S. Pat. No. 7,708,205; Ser. No. 11/880,087 filed Jul. 19, 2007; Ser. No. 11/305,895 filed Dec. 16, 2005, now U.S. Pat. No. 7,607,581; Ser. No. 10/989,220 filed Nov. 15, 2004, now U.S. Pat. No. 7,490,774; Ser. No. 10/712,787 filed Nov. 13, 2003, now U.S. Pat. No. 7,128,266; Ser. No. 10/893,800 filed Jul. 16, 2004, now U.S. Pat. No. 7,273,180; Ser. No. 10/893,797 filed Jul. 16, 2004, now U.S. Pat. No. 7,188,770; Ser. No. 10/893,798 filed Jul. 16, 2004, now U.S. Pat. No. 7,185,817; Ser. No. 10/894,476 filed Jul. 16, 2004, now U.S. Pat. No. 7,178,733; Ser. No. 10/894,478 filed Jul. 19, 2004, now U.S. Pat. No. 7,357,325; Ser. No. 10/894,412 filed Jul. 19, 2004, now U.S. Pat. No. 7,213,762; Ser. No. 10/894,477 filed Jul. 19, 2004, now U.S. Pat. No. 7,360,706; Ser. No. 10/895,271 filed Jul. 20, 2004, now U.S. Pat. No. 7,216,810; Ser. No. 10/895,811 filed Jul. 20, 2004, now U.S. Pat. No. 7,225,988; Ser. No. 10/897,390 filed Jul. 22, 2004, now U.S. Pat. No. 7,237,722; Ser. No. 10/897,389 filed Jul. 22, 2004, now U.S. Pat. No. 7,225,989; Ser. No. 10/901,463 filed Jul. 27, 2004, now U.S. Pat. No. 7,086,595; Ser. No. 10/901,426 filed Jul. 27, 2004, now U.S. Pat. No. 7,278,575; Ser. No. 10/901,446 filed Jul. 27, 2004 now U.S. Pat. No. 7,428,998; Ser. No. 10/901,461 filed Jul. 28, 2004, now U.S. Pat. No. 7,320,431; Ser. No. 10/901,429 filed Jul. 28, 2004, now U.S. Pat. No. 7,243,847; Ser. No. 10/901,427 filed Jul. 28, 2004, now U.S. Pat. No. 7,267,282; Ser. No. 10/901,445 filed Jul. 28, 2004, now U.S. Pat. No. 7,240,844; Ser. No. 10/901,428 filed Jul. 28, 2004, now U.S. Pat. No. 7,293,714; Ser. No. 10/902,709 filed Jul. 29, 2004, now U.S. Pat. No. 7,270,272; Ser. No. 10/901,914 filed Jul. 29, 2004, now U.S. Pat. No. 7,325,738; Ser. No. 10/902,710 filed Jul. 29, 2004, now U.S. Pat. No. 7,281,661; Ser. No. 10/909,270 filed Jul. 30, 2004, now U.S. Pat. No. 7,284,705; and Ser. No. 10/909,255 filed Jul. 30, 2004, now U.S. Pat. No. 7,299,986; Ser. No. 10/903,904 filed Jul. 30, 2004, now U.S. Pat. No. 7,255,279. Each said patent application is assigned to and commonly owned by Metrologic Instruments, Inc. of Blackwood, N.J., and is incorporated herein by reference in its entirety.

BACKGROUND OF INVENTION

1. Field of Invention

The present invention relates to area-type digital image capture and processing systems having diverse modes of digital image processing for reading one-dimensional (1D) and two-dimensional (2D) bar code symbols, as well as other forms of graphically-encoded intelligence, employing advances methods of automatic illumination and imaging to meet demanding end-user application requirements.

2. Brief Description of the State of the Art

The state of the automatic-identification industry can be understood in terms of (i) the different classes of bar code symbologies that have been developed and adopted by the industry, and (ii) the kinds of apparatus developed and used to read such bar code symbologies in various user environments.

In general, there are currently three major classes of bar code symbologies, namely: one dimensional (1D) bar code symbologies, such as UPC/EAN, Code 39, etc.; 1D stacked bar code symbologies, Code 49, PDF417, etc.; and two-dimensional (2D) data matrix symbologies.

One-dimensional (1D) optical bar code readers are well known in the art. Examples of such readers include readers of the Metrologic Voyager® Series Laser Scanner manufactured by Metrologic Instruments, Inc. Such readers include processing circuits that are able to read one dimensional (1D) linear bar code symbologies, such as the UPC/EAN code, Code 39, etc., that are widely used in supermarkets. Such 1D linear symbologies are characterized by data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed, including Code 49, as described in U.S. Pat. No. 4,794,239 (Allais), and PDF417, as described in U.S. Pat. No. 5,340,786 (Pavlidis, et al.). Stacked symbols partition the encoded data into multiple rows, each including a respective 1D bar code pattern, all or most of all of which must be scanned and decoded, then linked together to form a complete message. Scanning still requires relatively high resolution in one dimension only, but multiple linear scans are needed to read the whole symbol.

The third class of bar code symbologies, known as 2D matrix symbologies offer orientation-free scanning and greater data densities and capacities than their 1D counterparts. In 2D matrix codes, data is encoded as dark or light data elements within a regular polygonal matrix, accompanied by graphical finder, orientation and reference structures. When scanning 2D matrix codes, the horizontal and vertical relationships of the data elements are recorded with about equal resolution.

In order to avoid having to use different types of optical readers to read these different types of bar code symbols, it is desirable to have an optical reader that is able to read symbols of any of these types, including their various subtypes, interchangeably and automatically. More particularly, it is desirable to have an optical reader that is able to read all three of the above-mentioned types of bar code symbols, without human intervention, i.e., automatically. This is turn, requires that the reader have the ability to automatically discriminate between and decode bar code symbols, based only on information read from the symbol itself. Readers that have this ability are referred to as "auto-discriminating" or having an "auto-discrimination" capability.

If an auto-discriminating reader is able to read only 1D bar code symbols (including their various subtypes), it may be said to have a 1D auto-discrimination capability. Similarly, if it is able to read only 2D bar code symbols, it may be said to have a 2D auto-discrimination capability. If it is able to read both 1D and 2D bar code symbols interchangeably, it may be said to have a 1D/2D auto-discrimination capability. Often, however, a reader is said to have a 1D/2D auto-discrimination capability even if it is unable to discriminate between and decode 1D stacked bar code symbols.

Optical readers that are capable of 1D auto-discrimination are well known in the art. An early example of such a reader is Metrologic's VoyagerCG® Laser Scanner, manufactured by Metrologic Instruments, Inc.

Optical readers, particularly hand held optical readers, that are capable of 1D/2D auto-discrimination and based on the use of an asynchronously moving 1D image sensor, are described in U.S. Pat. Nos. 5,288,985 and 5,354,977, which applications are hereby expressly incorporated herein by reference. Other examples of hand held readers of this type, based on the use of a stationary 2D image sensor, are described in U.S. Pat. Nos. 6,250,551; 5,932,862; 5,932,741; 5,942,741; 5,929,418; 5,914,476; 5,831,254; 5,825,006; 5,784,102, which are also hereby expressly incorporated herein by reference.

Optical readers, whether of the stationary or movable type, usually operate at a fixed scanning rate, which means that the readers are designed to complete some fixed number of scans during a given amount of time. This scanning rate generally has a value that is between 30 and 200 scans/sec for 1D readers. In such readers, the results the successive scans are decoded in the order of their occurrence.

Imaging-based bar code symbol readers have a number advantages over laser scanning based bar code symbol readers, namely: they are more capable of reading stacked 2D symbologies, such as the PDF 417 symbology; more capable of reading matrix 2D symbologies, such as the Data Matrix symbology; more capable of reading bar codes regardless of their orientation; have lower manufacturing costs; and have the potential for use in other applications, which may or may not be related to bar code scanning, such as OCR, security systems, etc Prior art digital image capture and processing systems suffer from a number of additional shortcomings and drawbacks.

Most prior art hand held optical reading devices can be reprogrammed by reading bar codes from a bar code programming menu or with use of a local host processor as taught in U.S. Pat. No. 5,929,418. However, these devices are generally constrained to operate within the modes in which they have been programmed to operate, either in the field or on the bench, before deployment to end-user application environments. Consequently, the statically-configured nature of such prior art imaging-based bar code reading systems has limited their performance.

Prior art digital image capture and processing systems with integrated illumination subsystems also support a relatively short range of the optical depth of field. This limits the capabilities of such systems from reading big or highly dense bar code labels.

Prior art digital image capture and processing systems generally require separate apparatus for producing a visible aiming beam to help the user to aim the camera's field of view at the bar code label on a particular target object.

Prior art digital image capture and processing systems generally require capturing multiple frames of image data of a bar code symbol, and special apparatus for synchronizing the decoding process with the image capture process within such readers, as required in U.S. Pat. Nos. 5,932,862 and 5,942,741 assigned to Welch Allyn, Inc.

Prior art digital image capture and processing systems generally require large arrays of LEDs in order to flood the field of view within which a bar code symbol might reside during image capture operations, oftentimes wasting larges amounts of electrical power which can be significant in portable or mobile imaging-based readers.

Prior art digital image capture and processing systems generally require processing the entire pixel data set of capture images to find and decode bar code symbols represented therein. On the other hand, some prior art imaging systems use the inherent programmable (pixel) windowing feature within conventional CMOS image sensors to capture only partial image frames to reduce pixel data set processing and enjoy improvements in image processing speed and thus imaging system performance.

Many prior art digital image capture and processing systems also require the use of decoding algorithms that seek to find the orientation of bar code elements in a captured image by finding and analyzing the code words of 2-D bar code symbologies represented therein.

Some prior art digital image capture and processing systems generally require the use of a manually-actuated trigger to actuate the image capture and processing cycle thereof.

Prior art digital image capture and processing systems generally require separate sources of illumination for producing visible aiming beams and for producing visible illumination beams used to flood the field of view of the bar code reader.

Prior art digital image capture and processing systems generally utilize during a single image capture and processing cycle, and a single decoding methodology for decoding bar code symbols represented in captured images.

Some prior art digital image capture and processing systems require exposure control circuitry integrated with the image detection array for measuring the light exposure levels on selected portions thereof.

Also, many imaging-based readers also require processing portions of captured images to detect the image intensities thereof and determine the reflected light levels at the image detection component of the system, and thereafter to control the LED-based illumination sources to achieve the desired image exposure levels at the image detector.

Prior art digital image capture and processing systems employing integrated illumination mechanisms control image brightness and contrast by controlling the time that the image sensing device is exposed to the light reflected from the imaged objects. While this method has been proven for the CCD-based bar code scanners, it is not suitable, however, for the CMOS-based image sensing devices, which require a more sophisticated shuttering mechanism, leading to increased complexity, less reliability and, ultimately, more expensive bar code scanning systems.

Prior art digital image capture and processing systems generally require the use of tables and bar code menus to manage which decoding algorithms are to be used within any particular mode of system operation to be programmed by reading bar code symbols from a bar code menu.

Also, due to the complexity of the hardware platforms of such prior art digital image capture and processing systems, end-users are not permitted to modify the features and functionalities of such system to their customized application requirements, other than changing limited functions within the system by reading system-programming type bar code symbols, as disclosed in U.S. Pat. Nos. 6,321,989; 5,965,863; 5,929,418; and 5,932,862, each being incorporated herein by reference.

Also, dedicated image-processing based bar code symbol reading devices usually have very limited resources, such as the amount of volatile and non-volatile memories. Therefore, they usually do not have a rich set of tools normally available to universal computer systems. Further, if a customer or a third-party needs to enhance or alter the behavior of a conventional image-processing based bar code symbol reading system or device, they need to contact the device manufacturer and negotiate the necessary changes in the "standard" software or the ways to integrate their own software into the device, which usually involves the re-design or re-compilation of the software by the original equipment manufacturer (OEM). This software modification process is both costly and time consuming.

Prior Art Field of View (FOV) Aiming, Targeting, Indicating and Marking Techniques The need to target, indicate and/or mark the field of view (FOV) of 1D and 2D image sensors within hand-held imagers has also been long recognized in the industry.

In U.S. Pat. No. 4,877,949, Danielson et a disclosed on Aug. 8, 1986 an digital image capture and processing system having a 2D image sensor with a field of view (FOV) and also a pair of LEDsmounted about a 1D (i.e. linear) image sensor to project a pair of light beams through the FOV focusing optics and produce a pair of spots on a target surface supporting a 1D bar code, thereby indicating the location of the FOV on the target and enable the user to align the bar code therewithin.

In U.S. Pat. No. 5,019,699, Koenck et al disclosed on Aug. 31, 1988 an digital image capture and processing system having a 2D image sensor with a field of view (FOV) and also a set of four LEDs (each with lenses) about the periphery of a 2D (i.e. area) image sensor to project four light beams through the FOV focusing optics and produce four spots on a target surface to mark the corners of the FOV intersecting with the target, to help the user align 1D and 2D bar codes therewithin in an easy manner.

In FIGS. 48-50 of U.S. Pat. Nos. 5,841,121 and 6,681,994, Koenck disclosed on Nov. 21, 1990, an digital image capture and processing system having a 2D image sensor with a field of view (FOV) and also apparatus for marking the perimeter of the FOV, using four light sources and light shaping optics (e.g. cylindrical lens).

In U.S. Pat. No. 5,378,883, Batterman et al disclosed on Jul. 29, 1991, a hand-held digital image capture and processing system having a 2D image sensor with a field of view (FOV) and also a laser light source and fixed lens to produce a spotter beam that helps the operator aim the reader at a candidate bar code symbol. As disclosed, the spotter beam is also used measure the distance to the bar code symbol during automatic focus control operations supported within the bar code symbol reader.

In U.S. Pat. No. 5,659,167, Wang et al disclosed on Apr. 5, 1994, an digital image capture and processing system comprising a 2D image sensor with a field of view (FOV), a user display for displaying a visual representation of a dataform (e.g. bar code symbol), and visual guide marks on the user display for indicating whether or not the dataform being imaged is in focus when its image is within the guide marks, and out of focus when its image is within the guide marks.

In U.S. Pat. No. 6,347,163, Roustaei disclosed on May 19, 1995, a system for reading 2D images comprising a 2D image sensor, an array of LED illumination sources, and an image framing device which uses a VLD for producing a laser beam and a light diffractive optical element for transforming the laser beam into a plurality of beamlets having a beam edge and a beamlet spacing at the 2D image, which is at least as large as the width of the 2D image.

In U.S. Pat. No. 5,783,811, Feng et al disclosed on Feb. 26, 1996, a portable imaging assembly comprising a 2D image sensor with a field of view (FOV) and also a set of LEDs and a lens array which produces a cross-hair type illumination pattern in the FOV for aiming the imaging assembly at a target.

In U.S. Pat. No. 5,793,033, Feng et al disclosed on Mar. 29, 1996, a portable imaging assembly comprising a 2D image sensor with a field of view (FOV), and a viewing assembly having a pivoting member which, when positioned a predetermined distance from the operator's eye, provides a view through its opening which corresponds to the target area (FOV) of the imaging assembly. for displaying a visual representation of a dataform (e.g. bar code symbol).

In U.S. Pat. No. 5,780,834, Havens et al disclosed on May 14, 1996, a portable imaging and illumination optics assembly having a 2D image sensor with a field of view (FOV), an array of LEDs for illumination, and an aiming or spotting light (LED) indicating the location of the FOV.

In U.S. Pat. No. 5,949,057, Feng et al disclosed on Jan. 31, 1997, a portable imaging device comprising a 2D image sensor with a field of view (FOV), and first and second sets of targeting LEDs and first and second targeting optics, which produces first and second illumination targeting patterns, which substantially coincide to form a single illumination targeting pattern when the imaging device is arranged at a "best focus" position.

In U.S. Pat. No. 6,060,722, Havens et al disclosed on Sep. 24, 1997, a portable imaging and illumination optics assembly comprising a 2D image sensor with a field of view (FOV), an array of LEDs for illumination, and an aiming pattern generator including at least a point-like aiming light source and a light diffractive element for producing an aiming pattern that remains approximately coincident with the FOV of the imaging device over the range of the reader-to-target distances over which the reader is used.

In U.S. Pat. No. 6,340,114, filed Jun. 12, 1998, Correa et al disclosed an imaging engine comprising a 2D image sensor with a field of view (FOV) and an aiming pattern generator using one or more laser diodes and one or more light diffractive elements to produce multiple aiming frames having different, partially overlapping, solid angle fields or dimensions corresponding to the different fields of view of the lens assembly employed in the imaging engine. The aiming pattern includes a centrally-located marker or cross-hair pattern. Each aiming frame consists of four corner markers, each comprising a plurality of illuminated spots, for example, two multiple spot lines intersecting at an angle of 90 degrees.

As a result of limitations in the field of view (FOV) marking, targeting and pointing subsystems employed within prior art digital image capture and processing systems, such prior art readers generally fail to enable users to precisely identify which portions of the FOV read high-density 1D bar codes with the ease and simplicity of laser scanning based bar code symbol readers, and also 2D symbologies, such as PDF 417 and Data Matrix.

Also, as a result of limitations in the mechanical, electrical, optical, and software design of prior art digital image capture and processing systems, such prior art readers generally: (i) fail to enable users to read high-density 1D bar codes with the ease and simplicity of laser scanning based bar code symbol readers and also 2D symbologies, such as PDF 417 and Data Matrix, and (iii) have not enabled end-users to modify the features and functionalities of such prior art systems without detailed knowledge about the hard-ware platform, communication interfaces and the user interfaces of such systems.

Also, control operations in prior art image-processing bar code symbol reading systems have not been sufficiently flexible or agile to adapt to the demanding lighting conditions presented in challenging retail and industrial work environments where 1D and 2D bar code symbols need to be reliably read.

Prior art digital imaging and laser scanning systems also suffering from a number of other problems as well.

Some prior art imaging systems have relied on IR-based object detection using the same image sensing array for detecting images of objects, and therefore, require that the decode microprocessor be powered up during the object detection state of operation, and consuming power which would be undesirable in portable digital imaging applications.

Thus, there is a great need in the art for an improved method of and apparatus for reading bar code symbols using image capture and processing techniques which avoid the shortcomings and drawbacks of prior art methods and apparatus.

OBJECTS AND SUMMARY OF THE PRESENT INVENTION

Accordingly, a primary object of the present invention is to provide a novel method of and apparatus for enabling the reading of 1D and 2D bar code symbologies using image capture and processing based systems and devices, which avoid the shortcomings and drawbacks of prior art methods and apparatus.

Another object of the present invention is to provide a novel hand-supportable digital image capture and processing system capable of automatically reading 1D and 2D bar code symbologies using advanced illumination and imaging techniques, providing speeds and reliability associated with conventional laser scanning bar code symbol readers.

Another object of the present invention is to provide a hand-supportable digital image capture and processing system having an integrated LED-based linear targeting illumination subsystem for automatically generating a visible linear targeting illumination beam for aiming on a target object prior to illuminating the same during its area image capture mode of operation.

Another object of the present invention is to provide a hand-supportable digital image capture and processing system having a presentation mode which employs a hybrid video and snap-shot mode of image detector operation.

Another object of the present invention is to provide a hand-supportable digital image capture and processing system employing automatic object presence detection to control the generation of a wide-area illumination beam during bar code symbol imaging operations.

Another object of the present invention is to provide a hand-supportable digital image capture and processing system employing a CMOS-type image detecting array with a band-pass optical filter subsystem integrated within the hand-supportable housing thereof, to allow only narrow-band illumination from the multi-mode illumination subsystem to expose the image detecting array during object illumination and imaging operations.

Another object of the present invention is to provide a hand-supportable digital image capture and processing system employing a multi-mode led-based illumination subsystem.

Another object of the present invention is to provide a hand-supportable digital image capture and processing system having 1D/2D auto-discrimination capabilities.

Another object of the present invention is to provide such an imaging-based bar code symbol reader having target applications at point of sales in convenience stores, gas stations, quick markets, and the like.

Another object of the present invention is to provide a digital image-processing based bar code symbol reading system that is highly flexible and agile to adapt to the demanding lighting conditions presented in challenging retail and industrial work environments where 1D and 2D bar code symbols need to be reliably read.

Another object of the present invention is to provide such an automatic imaging-based bar code symbol reading system, wherein an automatic light exposure measurement and illumination control subsystem is adapted to measure the light exposure on a central portion of the CMOS image detecting array and control the operation of the LED-based illumination subsystem in cooperation with the digital image processing subsystem.

Another object of the present invention is to provide a hand-supportable digital image capture and processing system employing automatic object detection, and a linear targeting illumination beam generated from substantially the same plane as the area image detection array.

Another object of the present invention is to provide a hand-supportable digital image capture and processing system employing hybrid illumination and imaging modes of operation employing a controlled complex of snap-shot and video illumination/imaging techniques.

Another object of the present invention is to provide a hand-supportable digital image capture and processing system employing a single PC board with imaging aperture, and image formation and detection subsystem and linear illumination targeting subsystem supported on the rear side of the board, using common FOV/Beam folding optics; and also, light collection mirror for collecting central rays along the FOV as part of the automatic light measurement and illumination control subsystem.

Another object of the present invention is to provide a hand-supportable digital image capture and processing system, wherein the pair of LEDs, and corresponding aperture stops and cylindrical mirrors are mounted on opposite sides of the image detection array in the image formation and detection subsystem, and employs a common FOV/BEAM folding mirror to project the linear illumination target beam through the central light transmission aperture (formed in the PC board) and out of the imaging window of the system.

Another object of the present invention is to provide a hand-supportable digital image capture and processing system, wherein a single LED array is mounted above its imaging window and beneath a light ray blocking shroud portion of the housing about the imaging window, to reduce illumination rays from striking the eyes of the system operator or nearby consumers during system operation.

Another object of the present invention is to provide a hand-supportable digital image capture and processing system, with improved menu-reading capabilities.

Another object of the present invention is to provide a hand-supportable digital image capture and processing system having an integrated band-pass filter employing wavelength filtering FOV mirror elements.

Another object of the present invention is to provide a hand-supportable digital image capture and processing system having multi-mode image formation and detection systems supporting snap-shot, true-video, and pseudo (high-speed repeated snap-shot) modes of operation.

Another object of the present invention is to provide a hand-supportable digital image capture and processing system having an image formation and detection system supporting high-repetition snap-shot mode of operation, and wherein the time duration of illumination and imaging is substantially equal to the time for image processing—and globally-exposure principles of operation are stroboscopically implemented.

Another object of the present invention is to provide a hand-supportable digital image capture and processing system employing automatic object motion detection using IR sensing techniques (e.g. IR LED/photodiode, IR-based imaging, and IR-based LADAR—pulse doppler).

Another object of the present invention is to provide a hand-supportable digital image capture and processing system employing automatic linear illumination target beam, projected from the rear-side of the PC board, adjacent image sensing array, and reflecting off FOV folding mirror into the FOV.

Another object of the present invention is to provide a hand-supportable digital image capture and processing system having single PC board with light transmission aperture having image detection array mounted thereon, with the optical axis of the image formation optics perpendicular to the said PC board and a double-set of FOV folding mirrors for projecting the FOV out through the light transmission aperture and the image window of the system.

Another object of the present invention is to provide a hand-supportable digital image capture and processing system having single PC board with light transmission aperture, wherein a pair of cylindrical optical elements proved for forming a linear illumination target beam, are disposed parallel to a FOV folding mirror used to project the linear illumination target beam out through the light transmission aperture and the image window of the system.

Another object of the present invention is to provide a hand-supportable digital image capture and processing system having single PC board with light transmission aperture, wherein an array of visible LED are mounted on the rear side of the PC board for producing a linear illumination target beam, and an array of visible LEDs are mounted on the front side of the PC board for producing a field of visible illumination within the FOV of the system.

Another object of the present invention is to provide a hand-supportable digital image capture and processing system having single PC board with a light transmission aperture, wherein a first array of visible LED are mounted on the rear side of the PC board for producing a linear illumination target beam, whereas a second array of visible LEDs are mounted on the front side of the PC board for producing a field of visible illumination within the FOV of the system, wherein said field of visible illumination being substantially coextensive with said linear illumination target beam.

Another object of the present invention is to provide a hand-supportable digital image capture and processing system having single PC board with light transmission aperture, wherein a set of visible LEDs are mounted on opposite sides of an area-type image detection array mounted to the PC board, for producing a linear illumination target beam, that is substantially parallel to the optical axis of the image formation optics of the image detection array, as it is projected through the light transmission aperture and imaging window of the system.

Another object of the present invention is to provide a hand-supportable digital image capture and processing system having single PC board with light transmission aperture, wherein an automatic light measurement and illumination control subsystem is provided employing a light collecting mirror disposed behind said light transmission aperture for collecting light from a central portion of the FOV of the system provided by image formation optics before an area-type image detection array on mounted on the PC board, and focusing the collected light onto photodetector mounted adjacent the image detection array, but independent of its operation; and wherein beyond the light transmission aperture, the optical axis of the light collecting mirror is substantially parallel to the optical axis of the image formation and detection subsystem.

Another object of the present invention is to provide a hand-supportable digital image capture and processing system employing a system control system that controls (i) an image formation and detection subsystem employing an area-type image detection array with image formation optics providing a field of view (FOV) and wherein one of several possible image detection array modes of operation are selectable, and (ii) a multi-mode illumination subsystem employing multiple LED illumination arrays for illuminating selected portions of the FOV.

Another object of the present invention is to provide a hand-supportable digital image capture and processing system employing a system control system that controls an image formation and detection subsystem employing an area-type image detection array with image formation optics providing a field of view (FOV) and in which one of several possible image detection array modes of operation are selectable, and a multi-mode illumination subsystem employing multiple LED illumination arrays for illuminating selected portions of said FOV; and wherein the system supports an illumination and imaging control process employing both snap-shot and video-modes of operation.

Another object of the present invention is to provide a hand-supportable digital image capture and processing system employing linear target illumination beam to align programming-type bar code symbols prior to wide-area illumination and image capture and processing so as to confirm that such bar code symbol was intentionally read as a programming-type bar code symbol.

Another object of the present invention is to provide a hand-supportable digital image capture and processing system employing linear target illumination beam to align programming-type bar code symbols and narrowly-confined active subregion in the FOV centered about the linear target illumination beam so as to confirm that bar code symbols region in this subregion was intentionally read as a programming-type bar code symbols.

Another object of the present invention is to provide a hand/countertop-supportable digital image capture and processing system which carries out a first method of hands-free digital imaging employing automatic hands-free configuration detection, automatic object presence motion/velocity detection in field of view (FOV) of system (i.e. automatic-triggering), automatic illumination and imaging of multiple image frames while operating in a snap-shot mode during a first time interval, and automatic illumination and imaging while operating in a video-mode during a second time interval.

Another object of the present invention is to provide a hand/countertop-supportable digital image capture and processing system which carries out a second method of hands-free digital imaging employing automatic hands-free configuration detection, automatic object presence detection in field of view (FOV) of system (i.e. automatic-triggering), automatic linear target illumination beam generation, and automatic illumination and imaging of multiple image frames while operating in a snap-shot mode within a predetermined time interval.

Another object of the present invention is to provide such a hand/countertop-supportable digital image capture and processing system which can be easily used during for menu-reading applications.

Another object of the present invention is to provide a hand/countertop-supportable digital image capture and processing system which carries out a third method of hands-free digital imaging employing automatic hands-free configuration detection, automatic object presence detection in field of view (FOV) of system (i.e. automatic-triggering), and automatic illumination and imaging while operating in a video mode within a predetermined time interval.

Another object of the present invention is to provide a hand-supportable digital image capture and processing system which carries out a first method of hand-held digital imaging employing automatic hand-held configuration detection, automatic object presence detection in field of view (FOV) of system (i.e. automatic-triggering), automatic linear target illumination beam generation (i.e. automatic object targeting), and automatic illumination and imaging of multiple digital image frames while operating in a snap-shot mode within a predetermined time interval.

Another object of the present invention is to provide a hand-supportable digital image capture and processing system which carries out a second method of hand-held digital imaging employing automatic hand-held configuration detection, automatic object presence detection in field of view (FOV) of system (i.e. automatic-triggering), automatic linear target illumination beam generation (i.e. automatic object targeting), and automatic illumination and imaging of video image frames while operating in a video-shot mode within a predetermined time interval.

Another object of the present invention is to provide a hand-supportable digital image capture and processing system which carries out a first method of hand-held digital imaging employing automatic hand-held configuration detection, manual trigger switching (i.e. manual-triggering), automatic linear target illumination beam generation (i.e. automatic object targeting), and automatic illumination and imaging of multiple image frames while operating in a snap-shot mode within a predetermined time interval.

Another object of the present invention is to provide a hand-supportable digital image capture and processing system which carries out a fourth method of hand-held digital imaging employing automatic hand-held configuration detection, manual trigger switching (i.e. manual-triggering), automatic linear target illumination beam generation (i.e. automatic object targeting), and automatic illumination and imaging of video image frames while operating in a video-shot mode within a predetermined time interval.

Another object of the present invention is to provide a hand-supportable digital image capture and processing system which carries out a fifth method of hand-held digital imaging employing automatic hand-held configuration detection, manual trigger switching (i.e. manual-triggering), automatic linear target illumination beam generation (i.e. automatic object targeting), and illumination and imaging of single image frame while operating in a snap-shot mode.

Another object of the present invention is to provide a hand-supportable digital image capture and processing system employing a pseudo-video illumination mode, enabling ½ the number of frames captured (e.g. 15 frame/second), with a substantially reduced illumination annoyance index (IAI).

Another object of the present invention is to provide a hand-supportable digital image capture and processing system, wherein a single array of LEDs are used to illuminate the field of view of system so as minimize illumination of the field of view (FOV) of human operators and spectators in the ambient environment.

Another object of the present invention is to provide such a hand-supportable digital image capture and processing system which further comprises a linear targeting illumination beam.

Another object of the present invention is to provide a hand/countertop-supportable digital image capture and processing system, employing a method of illuminating and capturing digital images at the point of sale using a digital image capture and processing system operating in a presentation mode of operation.

Another object of the present invention is to provide such a hand/countertop-supportable digital image capture and processing system, wherein a light ray blocking structure is arranged about upper portion of the imaging window.

Another object of the present invention is to provide such a hand-supportable digital image capture and processing system, wherein illumination rays are maintained below an illumination ceiling, above which the field of view of human operator and spectators are typically positioned.

Another object of the present invention is to provide a hand-supportable digital image capture and processing system which stores multiple files for different sets of system configuration parameters which are automatically implemented when one or multiple communication interfaces supported by the system is automatically detected and implemented, without scanning programming type bar code symbols.

Another object of the present invention is to provide a hand-supportable digital image capture and processing system which incorporates image intensification technology within the image formation and detection subsystem and before the image detection array so as to enable the detection of faint (i.e. low intensity) images of objects formed in the FOV using very low illumination levels, as may be required or desired in demanding environments, such as retail POS environments, where high intensity illumination levels are either prohibited or highly undesired from a human safety and/or comfort point of view.

Another object of the present invention is to provide a hand-supportable digital image capture and processing system employing a LED-driven optical-waveguide structure that is used to illuminate a manually-actuated trigger switch integrated within the hand-supportable housing of the system.

Another object of the present invention is to provide a hand-supportable digital image capture and processing system employing an acoustic-waveguide structure coupling sonic energy, produced from its electro-acoustic transducer, to the sound ports formed in the system housing.

Another object of the present invention is to provide a hand-supportable digital image capture and processing system that is provided with an illumination subsystem employing prismatic illumination focusing lens structure integrated within its imaging window, for generating a field of visible illumination that is highly confined below the field of view of the system operator and customers who are present at the POS station at which the digital image capture and processing system is deployed.

Another object of the present invention is to provide a hand-supportable digital image capture and processing system which carries out a method of automatically programming multiple system configuration parameters within system memory of the digital image capture and processing system of present invention, without reading programming-type bar codes.

Another object of the present invention is to provide a hand-supportable digital image capture and processing system which carries out a method of unlocking restricted features embodied within the digital image capture and processing system of present invention of the third illustrative embodiment, by reading feature/functionality-unlocking programming-type bar code symbols.

Another object of the present invention is to provide a hand-supportable digital image capture and processing system of present invention employing a single linear LED illumination array for providing full field illumination within the entire FOV of the system.

Another object of the present invention is to provide a method of reducing glare produced from an LED-based illumination array employed in a digital image capture and processing system.

Another object of the present invention is to provide a hand-supportable digital image capture and processing system employing a prismatic illumination-focusing lens component, integrated within the imaging window of the present invention.

Another object of the present invention is to provide a hand-supportable digital image capture and processing system having a multi-interface I/O subsystem employing a software-controlled automatic communication interface test/detection process that is carried out over a cable connector physically connecting the I/O ports of the digital image capture and processing subsystem and its designated host system.

Another object of the present invention is to provide a hand-supportable digital image capture and processing system supporting a method of programming a set of system configuration parameters (SCPs) within system during the implementation of the communication interface with a host system.

Another object of the present invention is to provide a hand-supportable digital image capture and processing system which once initially programmed, avoids the need read individual programming codes at its end-user deployment environment in order to change additional configuration parameters (e.g. symbologies, prefixes, suffixes, data parsing, etc.) for a particular communication interface supported by the host system environment in which it has been deployed.

Another object of the present invention is to provide such hand-supportable digital image capture and processing system offering significant advantages including, for example, a reduction in the cost of ownership and maintenance, with a significant improvement in convenience and deployment flexibility within an organizational environment employing diverse host computing system environments.

Another object of the present invention is to provide a hand-supportable digital image capture and processing system, which employs or incorporates automatic gyroscopic-based image stabilization technology within the image formation and detection subsystem, so as to enable the formation and detection of crystal clear images in the presence of environments characterized by hand jitter, camera platform vibration, and the like.

Another object of the present invention is to provide such a hand-supportable digital image capture and processing system, wherein the automatic gyroscopic-based image stabilization technology employs FOV imaging optics and FOV folding mirrors which are gyroscopically stabilized, with a real-time image stabilization system employing multiple accelerometers.

These and other objects of the present invention will become more apparently understood hereinafter and in the Claims to Invention appended hereto.

BRIEF DESCRIPTION OF THE DRAWINGS OF PRESENT INVENTION

For a more complete understanding of how to practice the Objects of the Present Invention, the following Detailed Description of the Illustrative Embodiments can be read in conjunction with the accompanying Drawings, briefly described below.

Figure 1A:
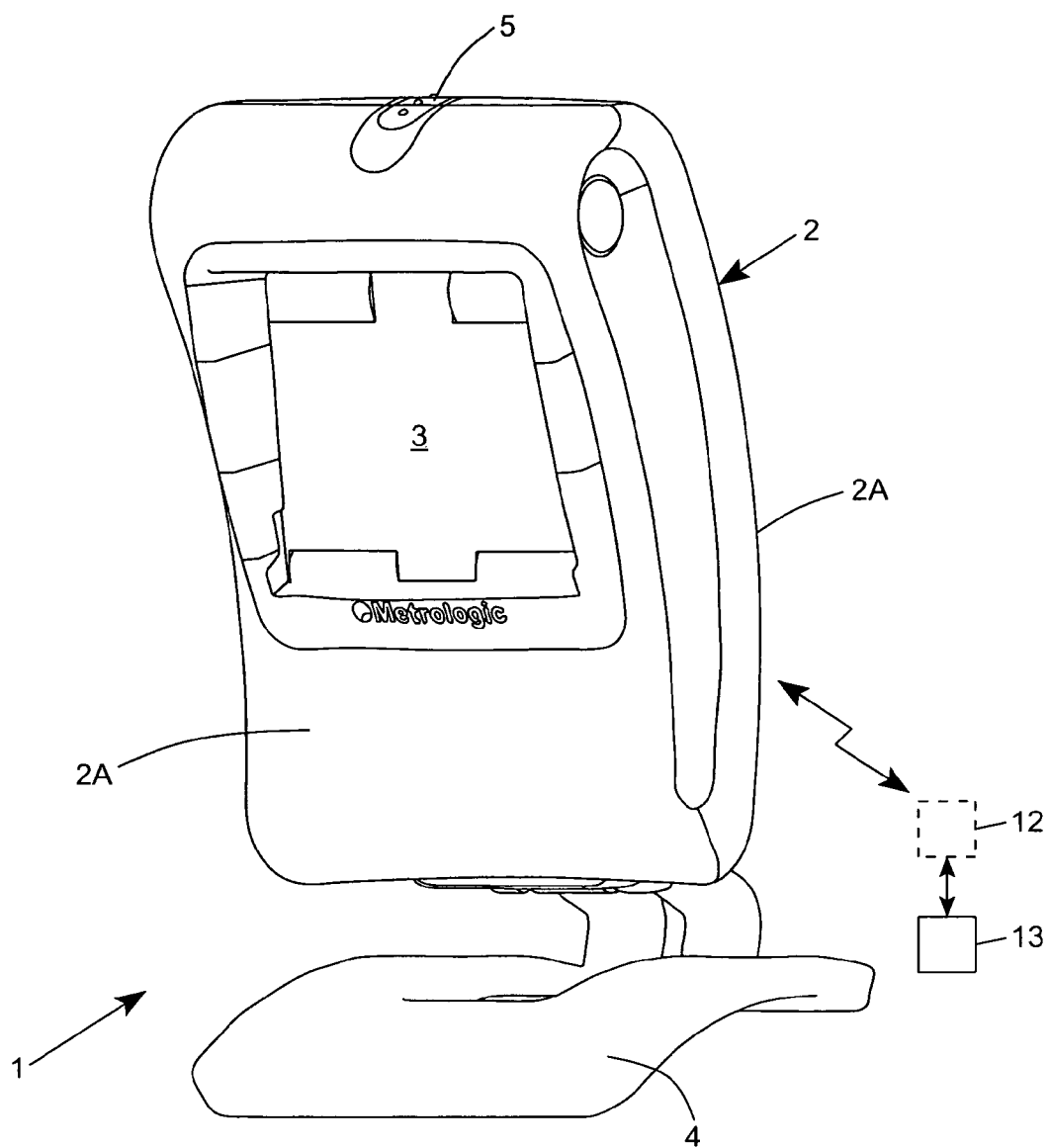
FIG. 1A is a first frontal perspective view of the hand-supportable digital image capture and processing system of the first illustrative embodiment of the present invention.
Figure 1B:
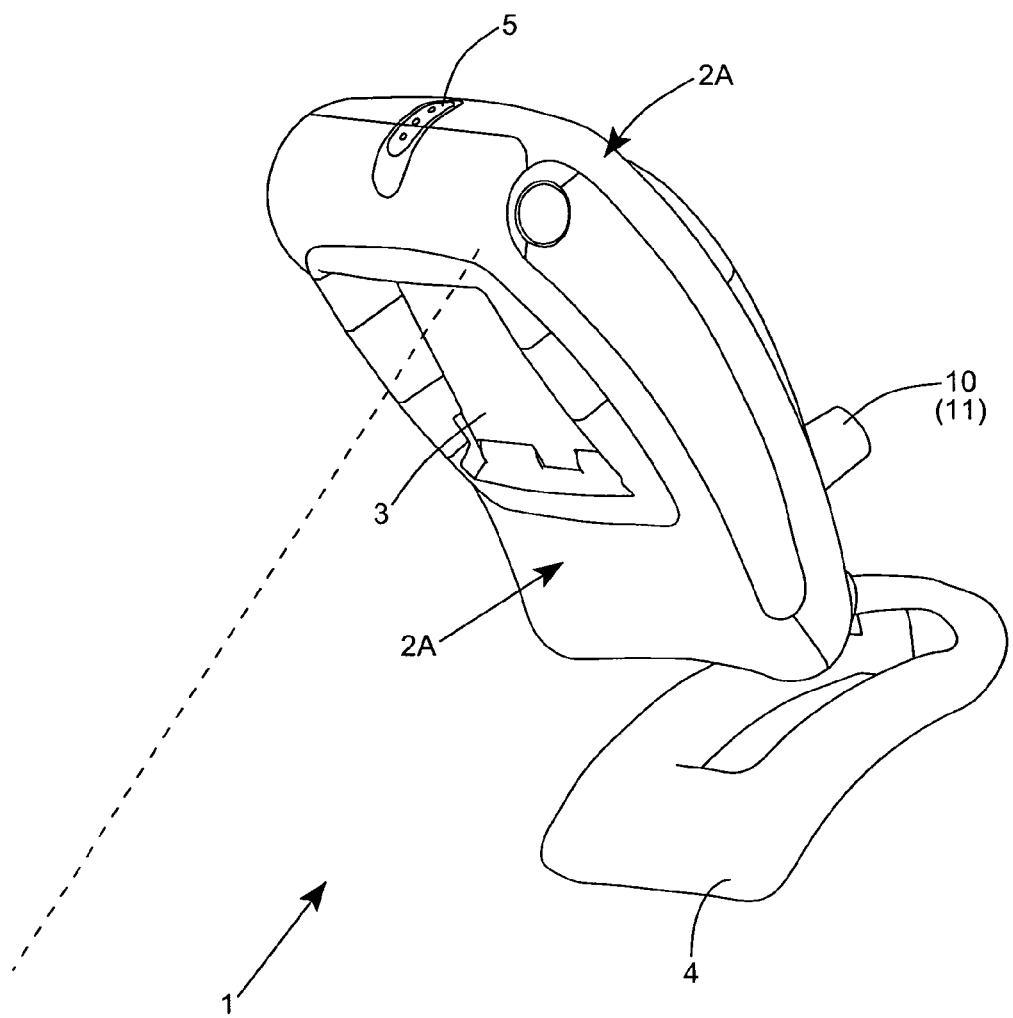
FIG. 1B is a second perspective view of the hand-supportable digital image capture and processing system of the first illustrative embodiment of the present invention.
Figure 1C:
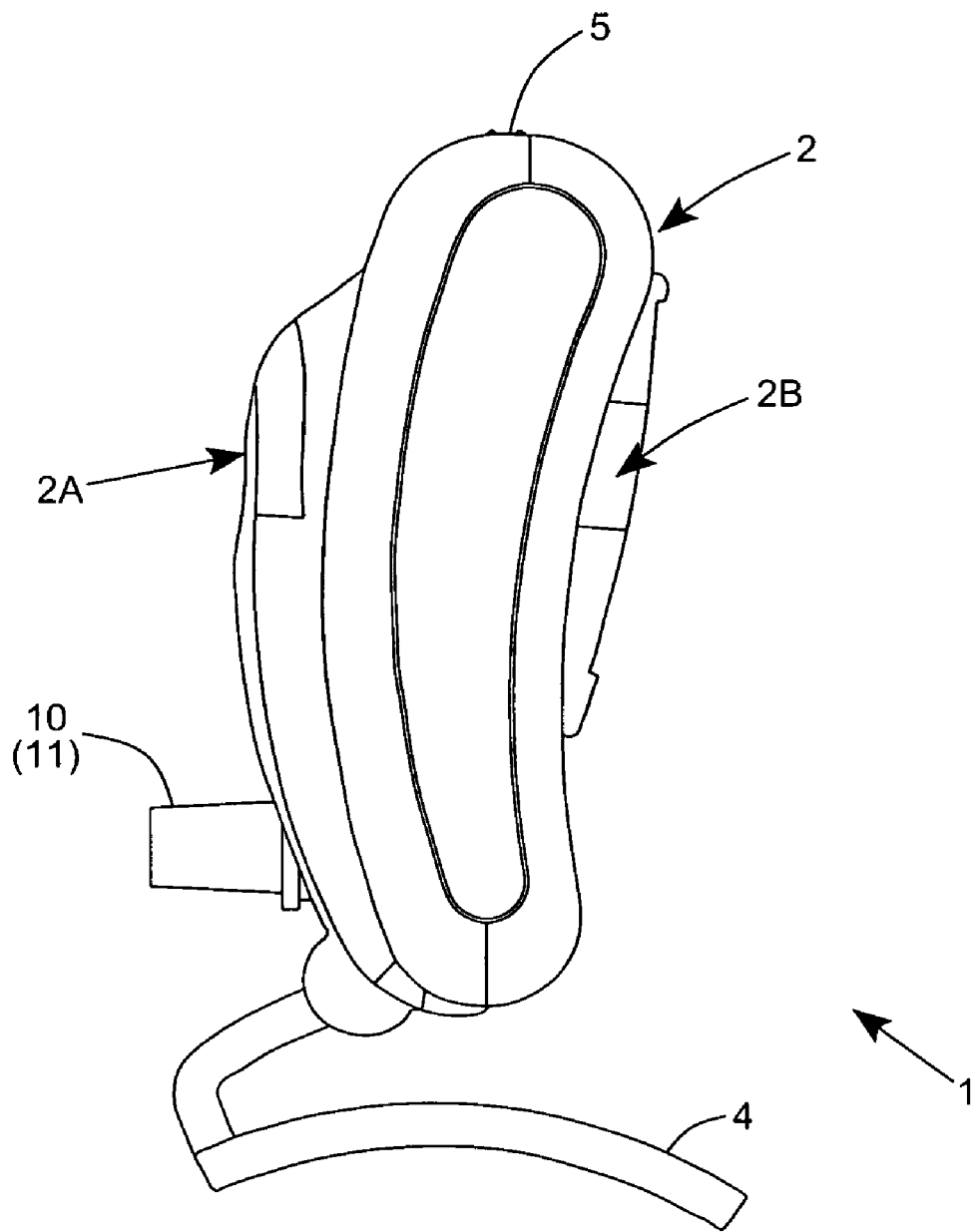
FIG. 1C is an elevated right side view of the hand-supportable digital image capture and processing system of the first illustrative embodiment of the present invention.
Figure 1D:
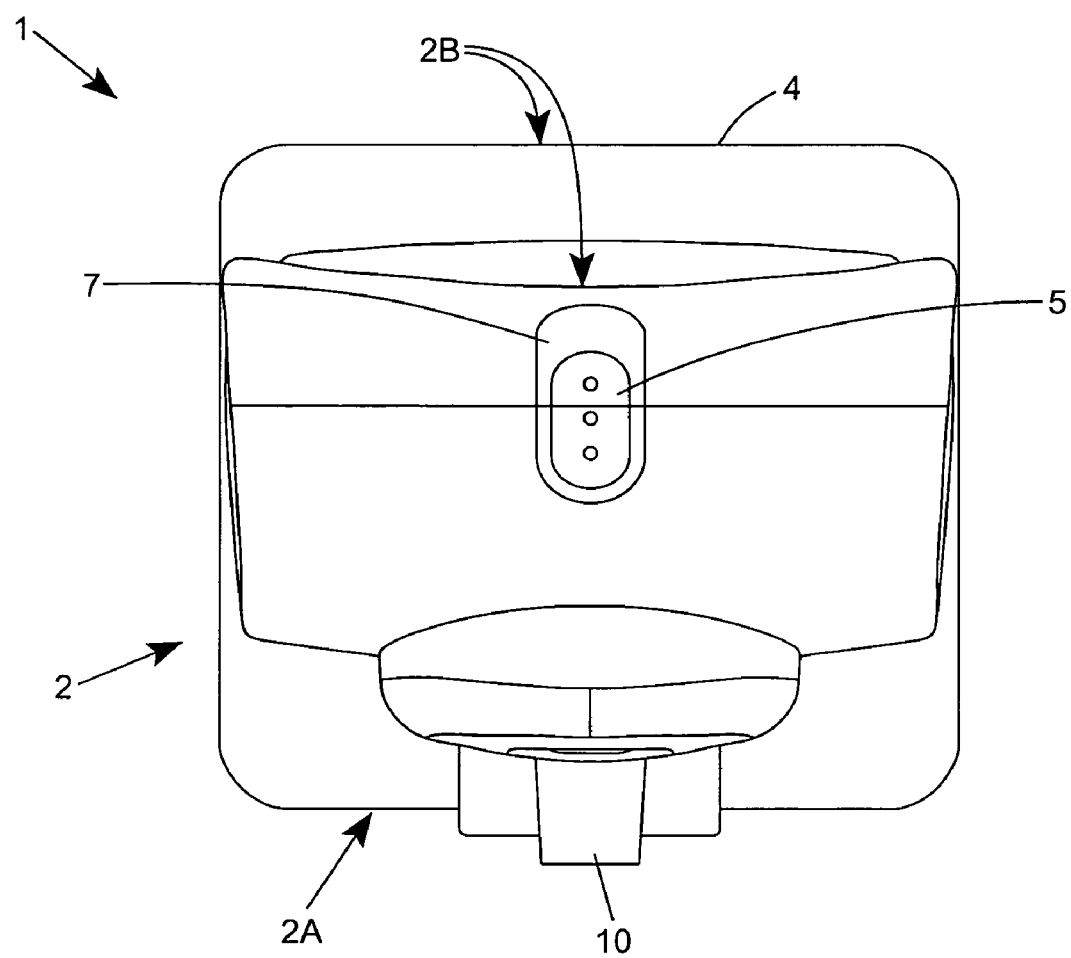
FIG. 1D is an top plan view of the hand-supportable digital image capture and processing system of the first illustrative embodiment of the present invention.
Figure 1E:
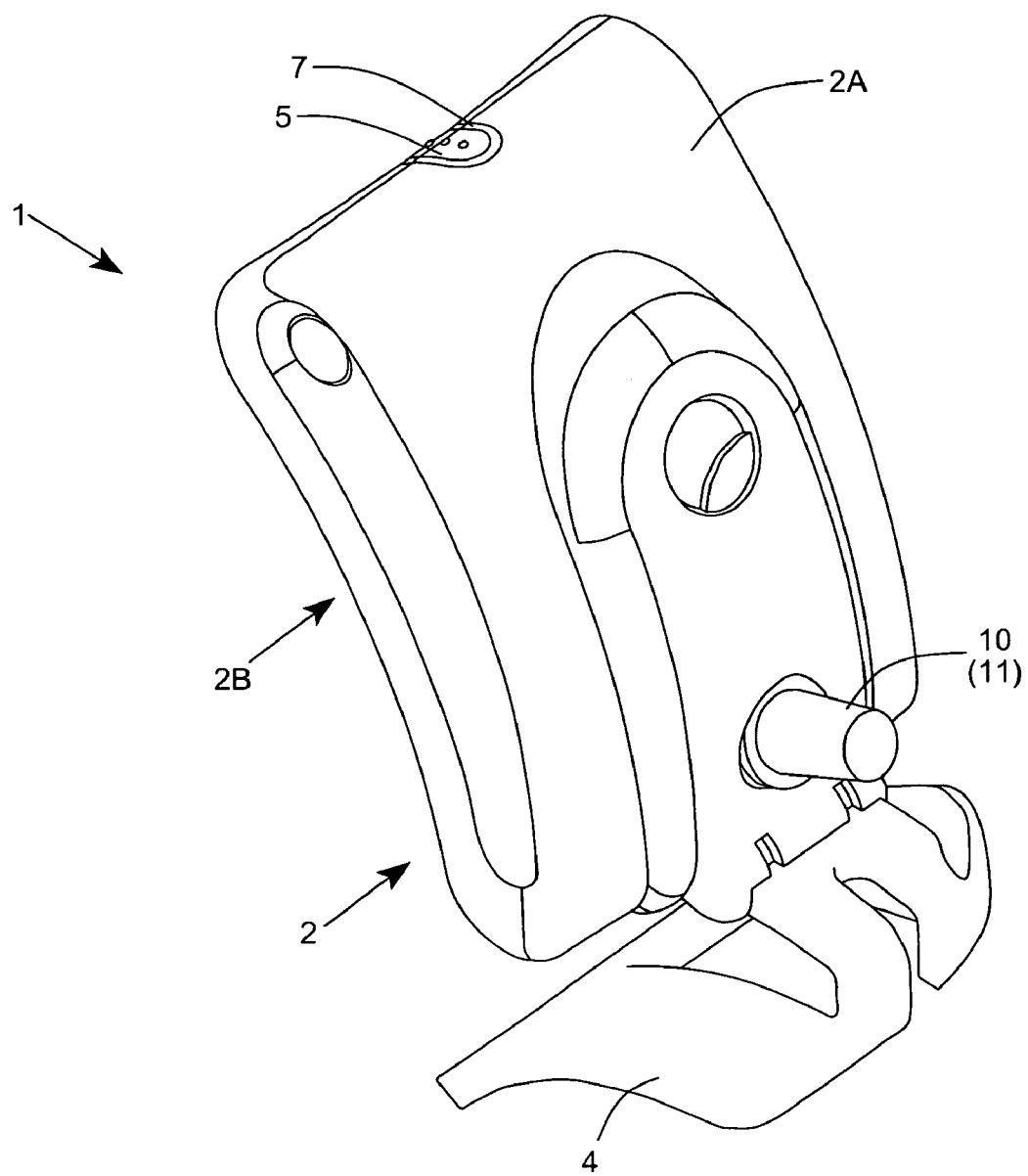
FIG. 1E is a rear perspective view of the hand-supportable digital image capture and processing system of the first illustrative embodiment of the present invention.
Figure 1F:
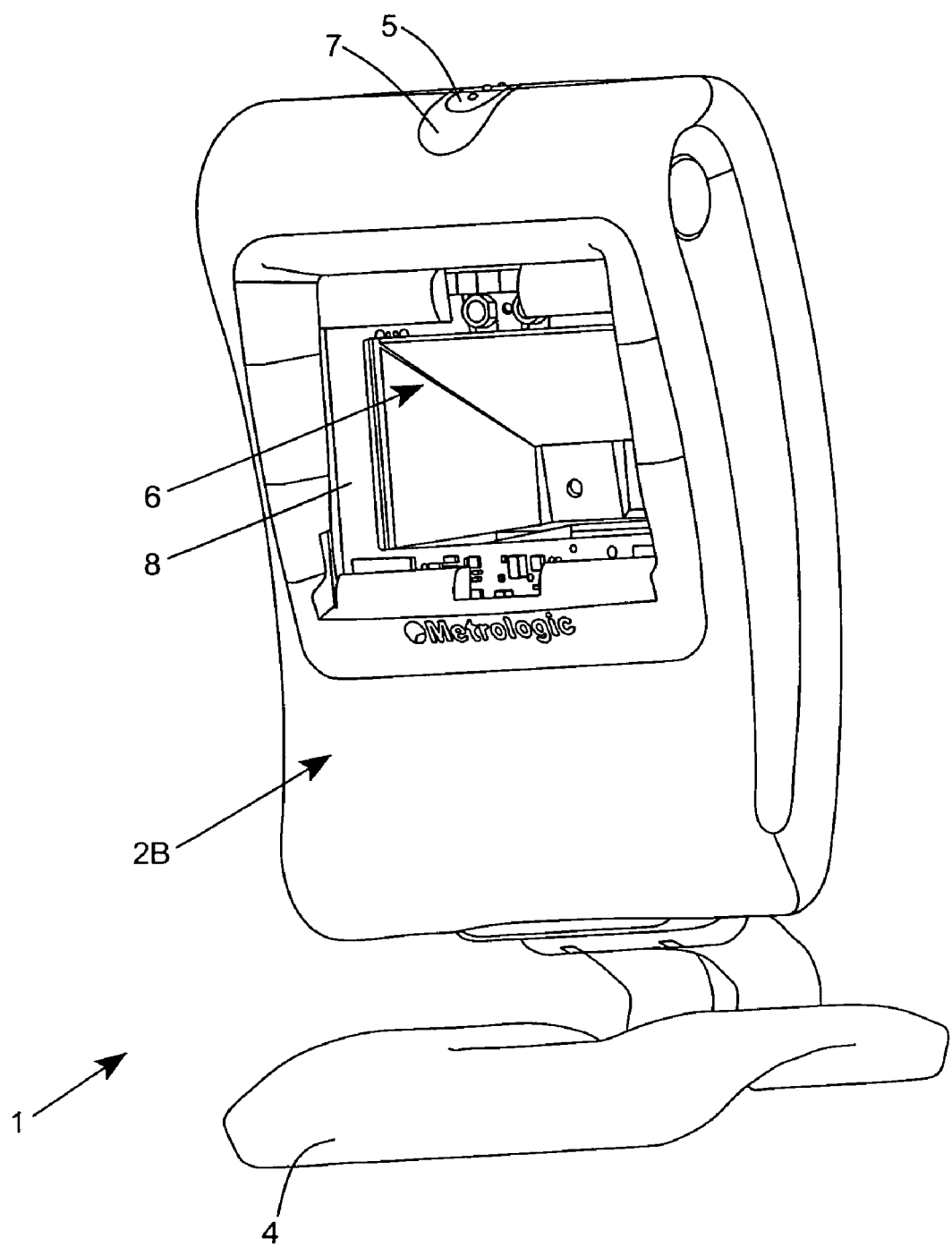
FIG. 1F is a second perspective front view of the hand-supportable digital image capture and processing system of the first illustrative embodiment of the present invention, revealing its first and second illumination arrays and IR-based object detection subsystem.
Figure 2:
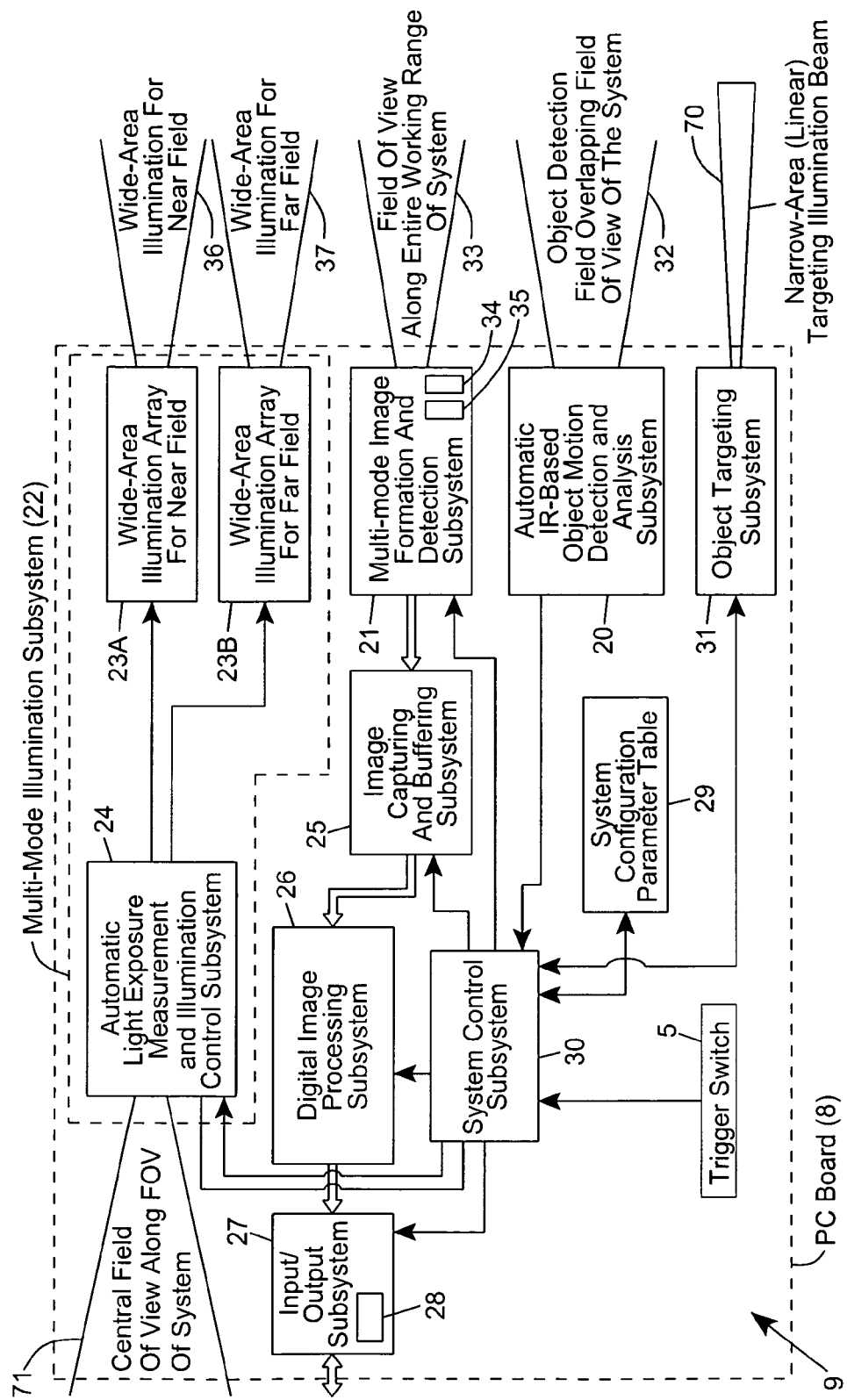
Figure 3:
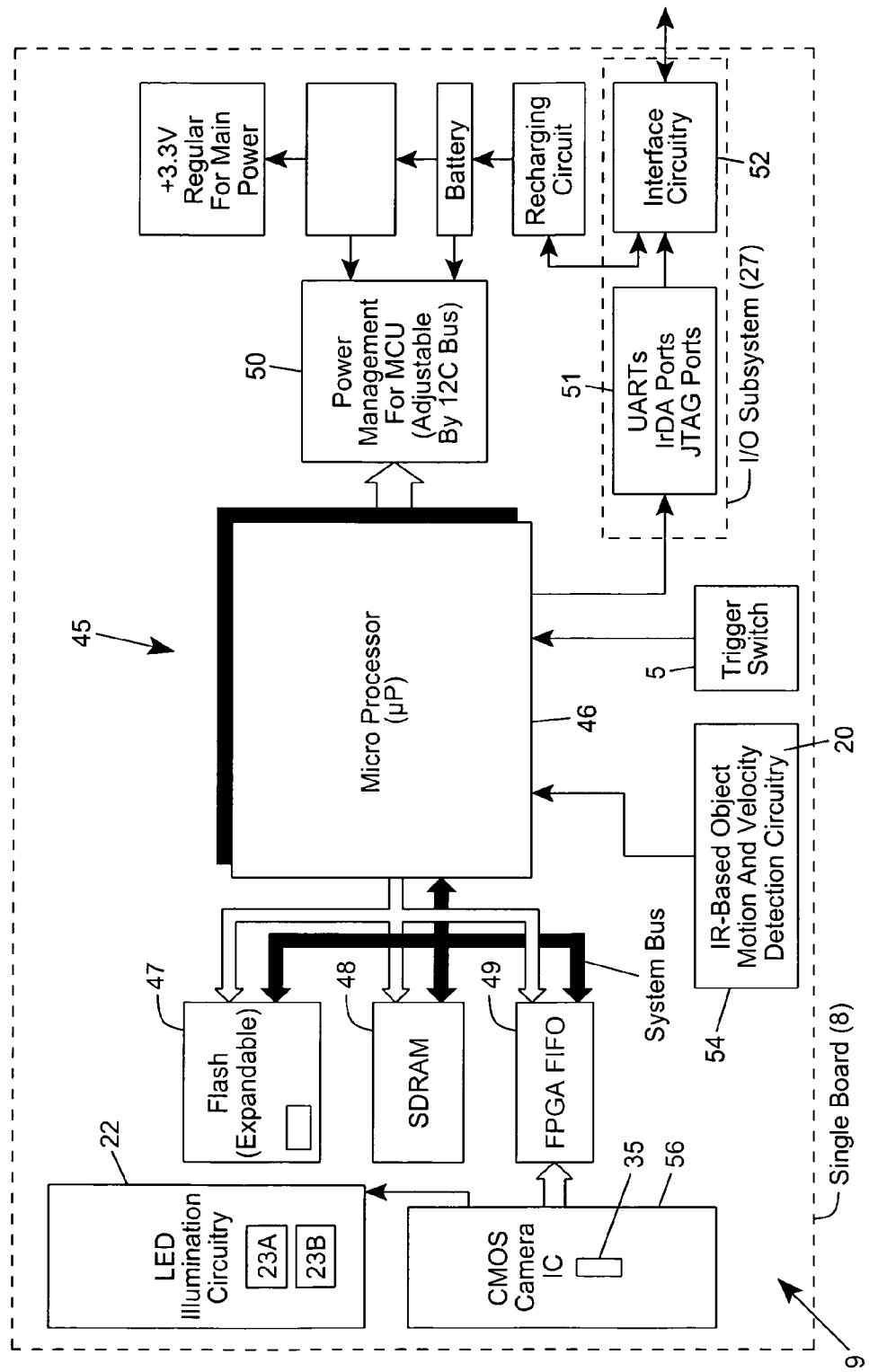
Figure 4A:
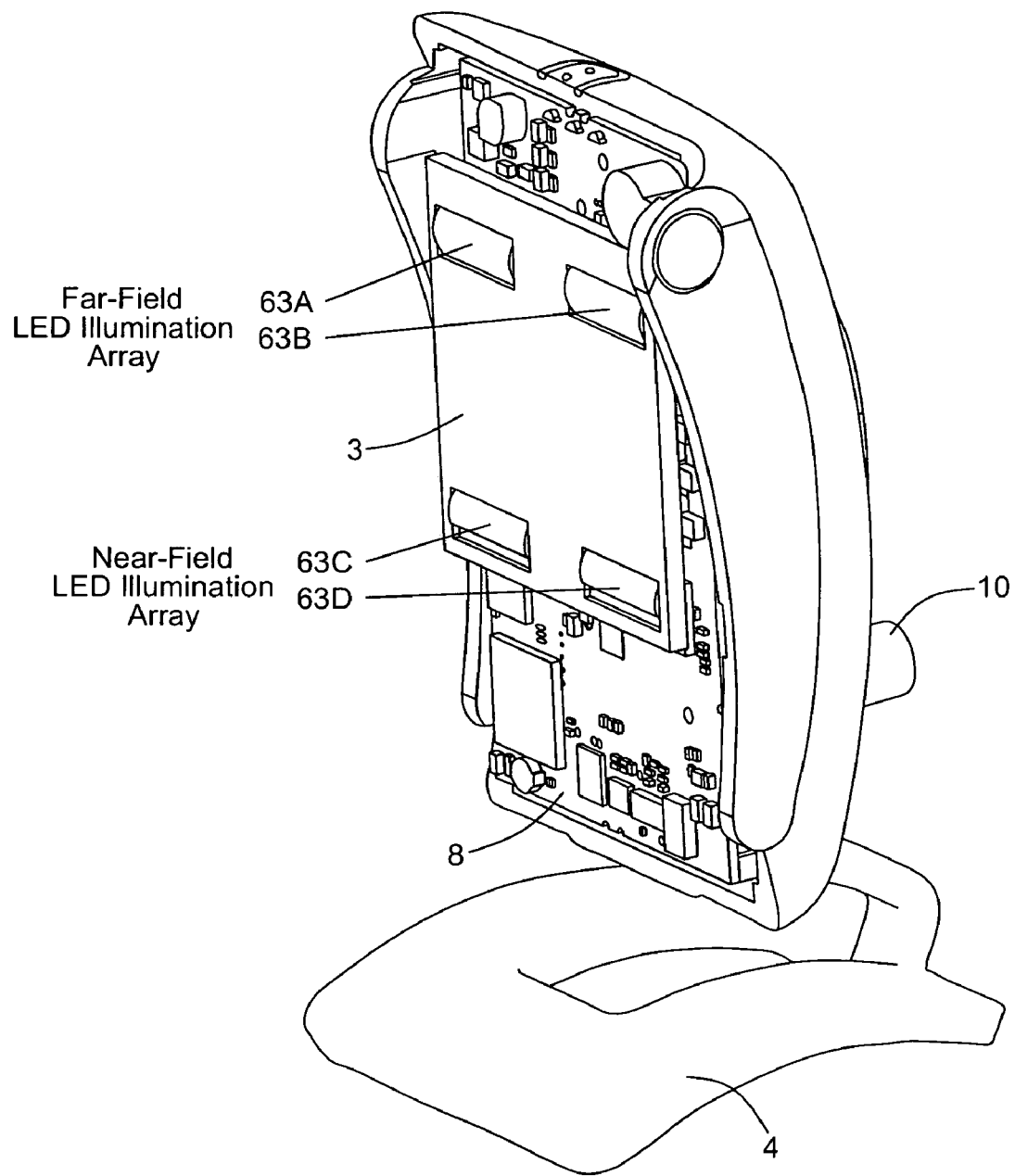
Figure 4B:
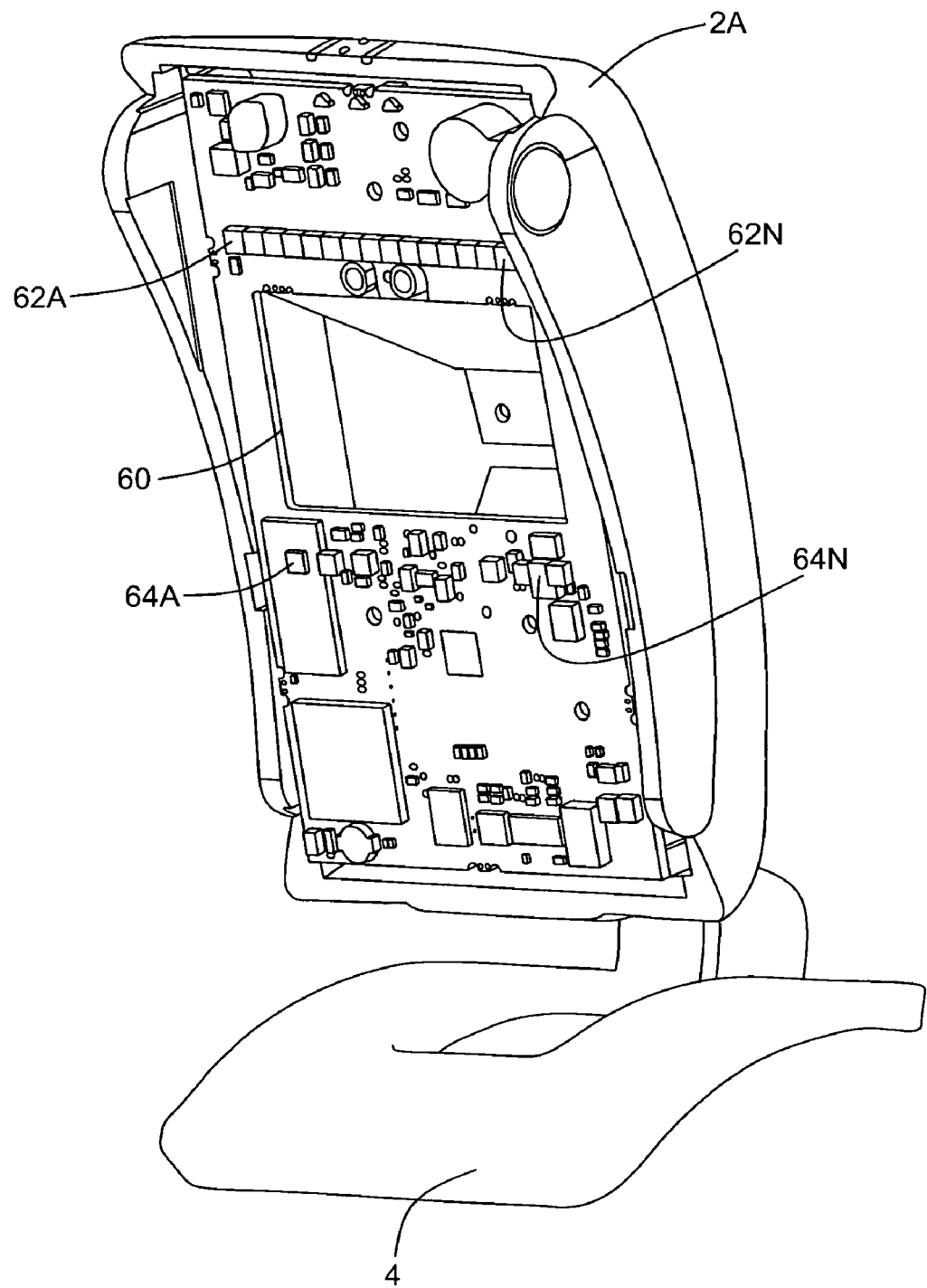
Figure 4C:
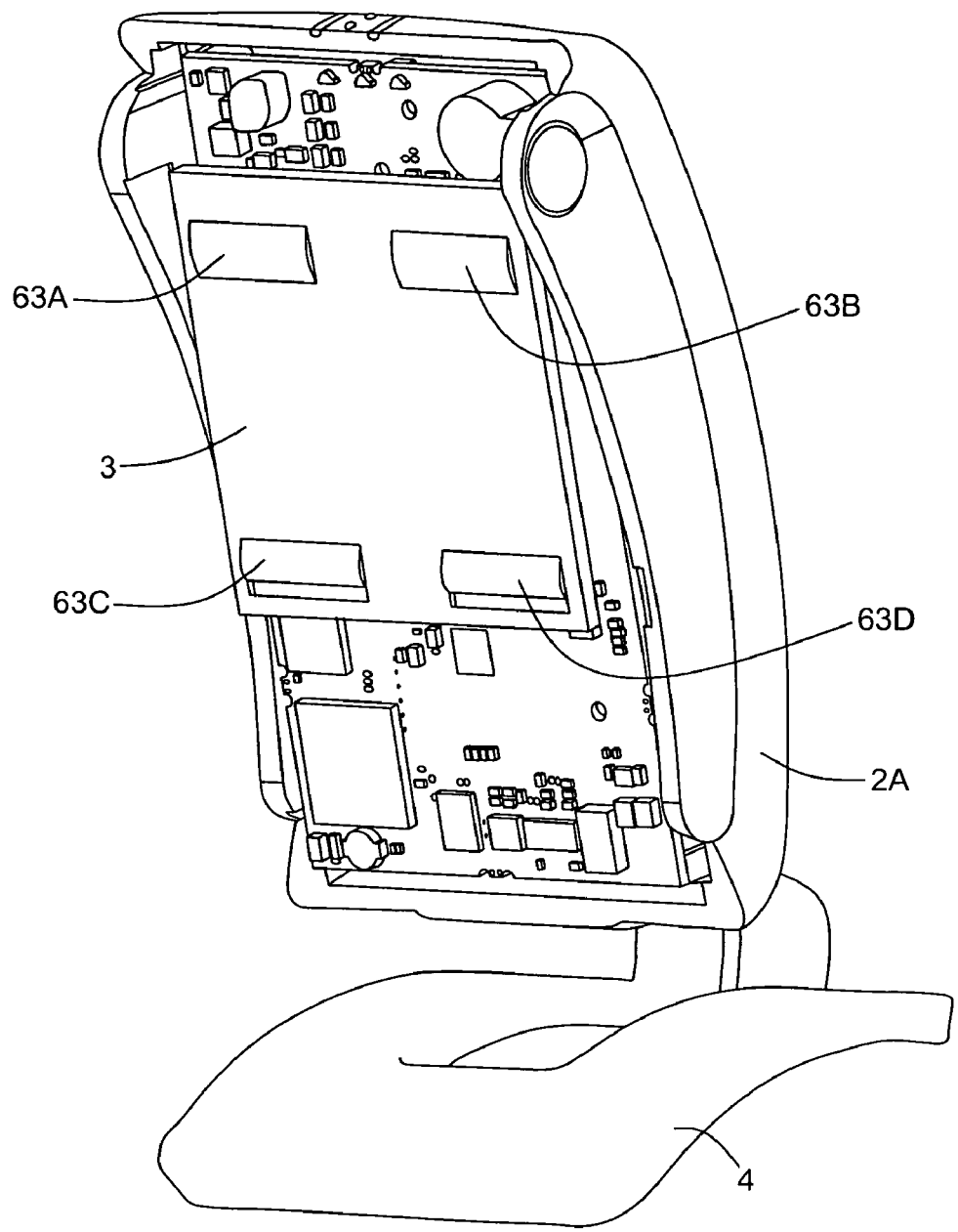
Figure 4D:
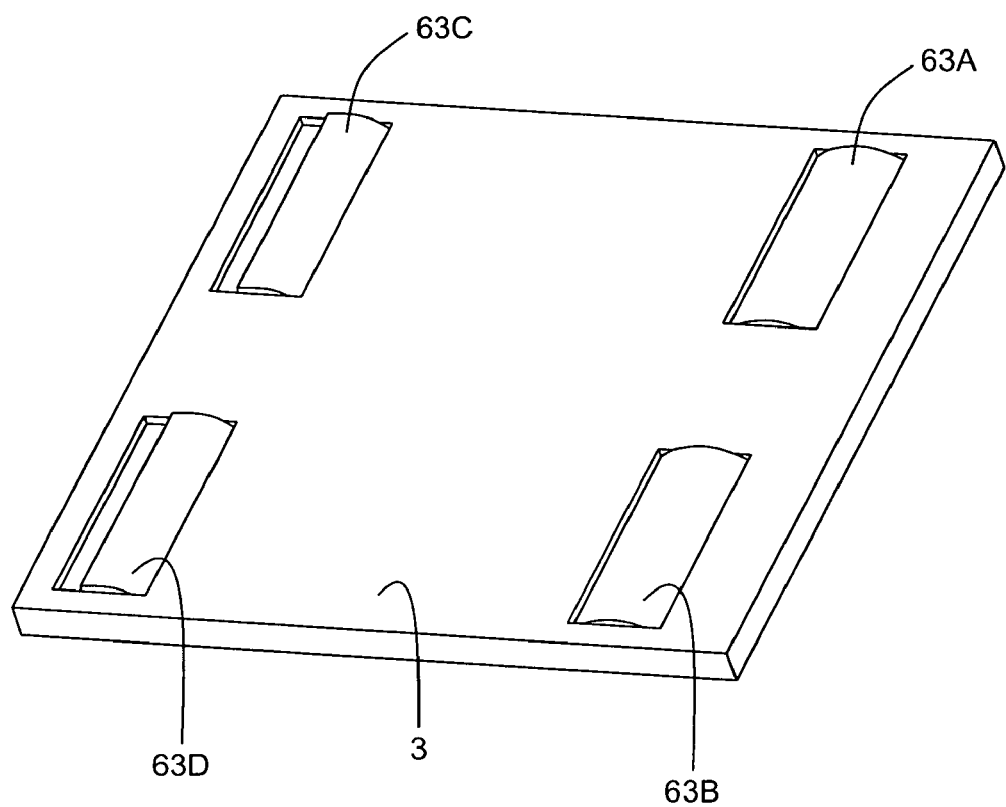
Figure 4E:
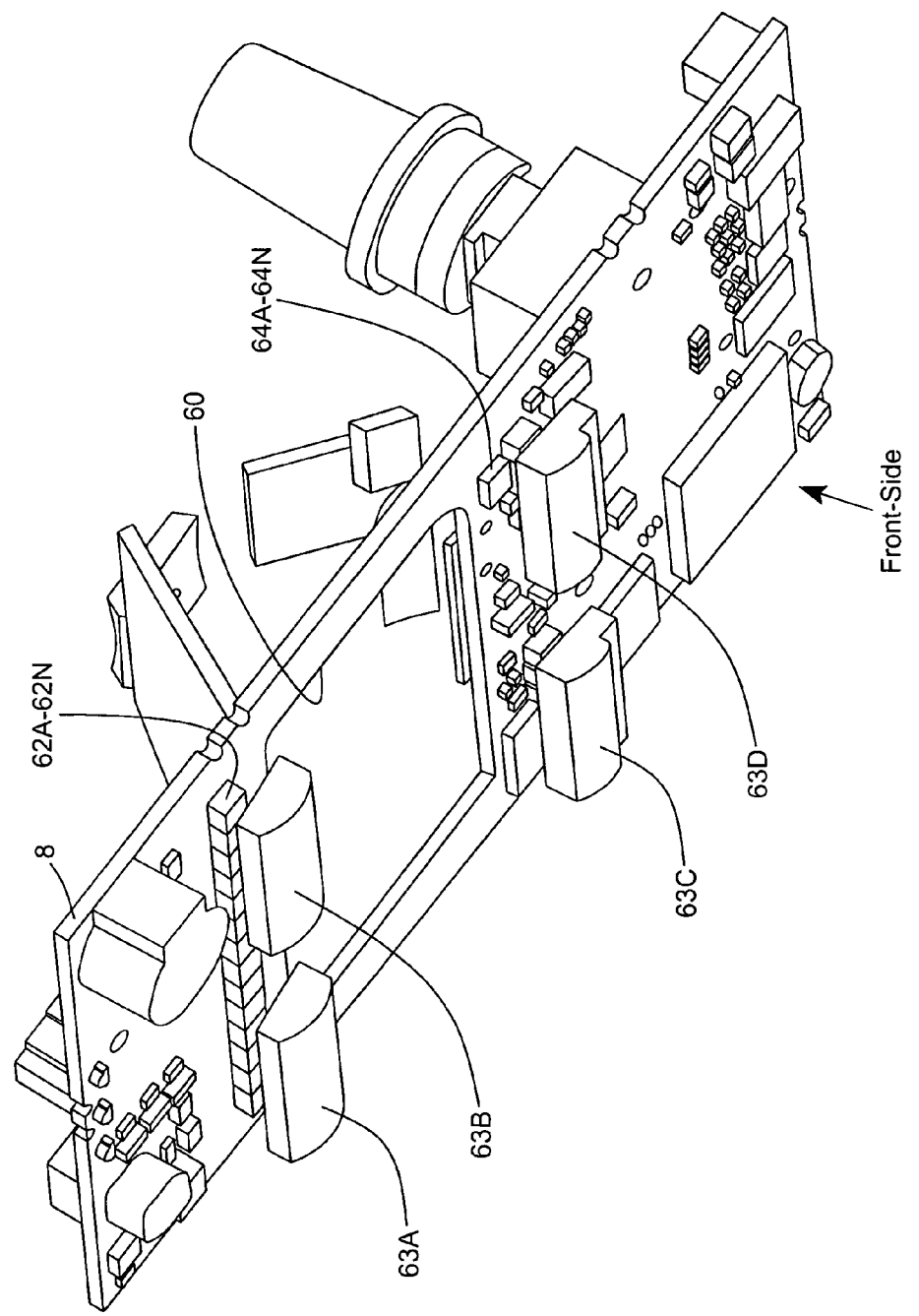
Figure 4F:
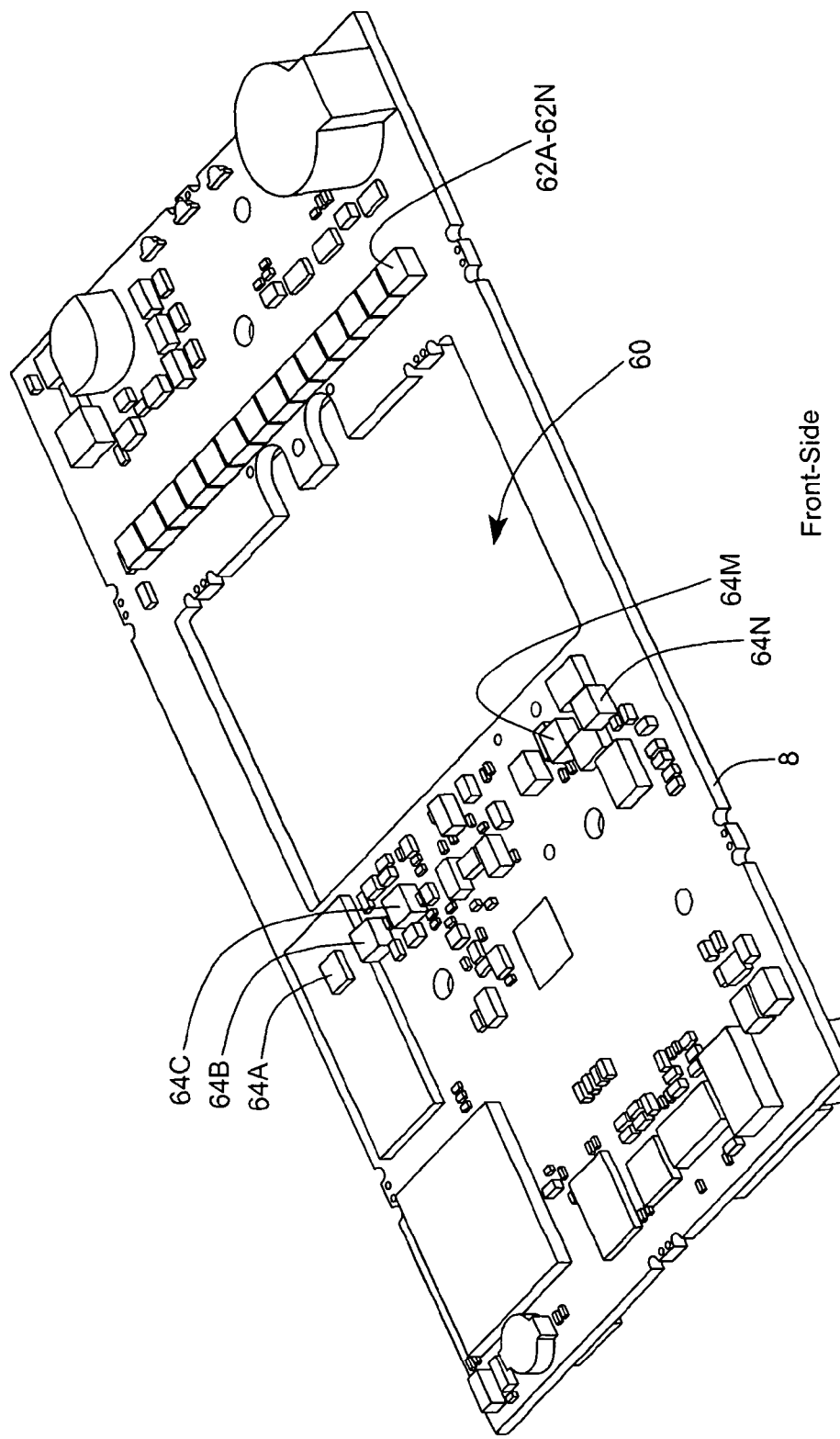
Figure 4G:
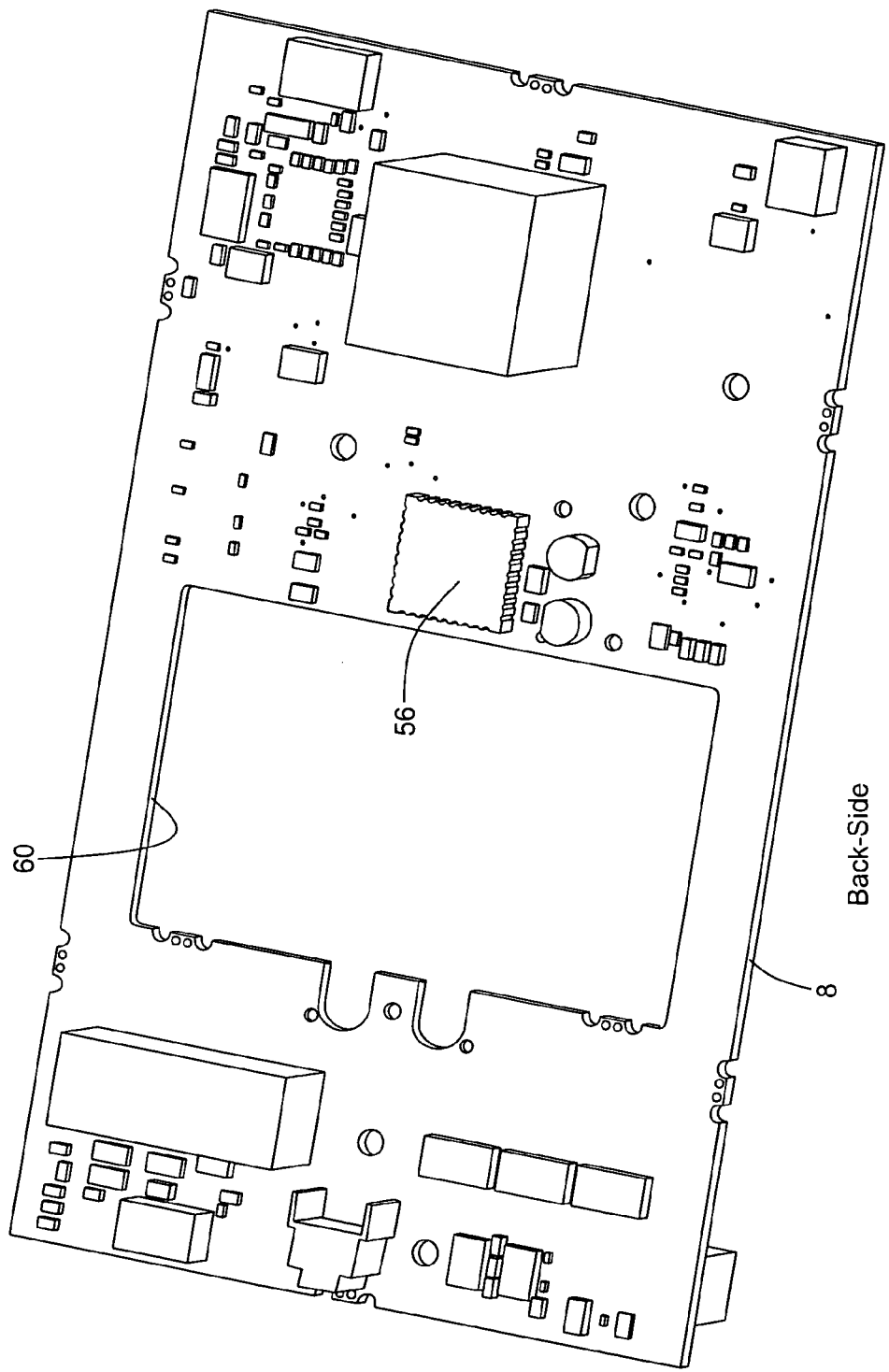
Figure 4H:
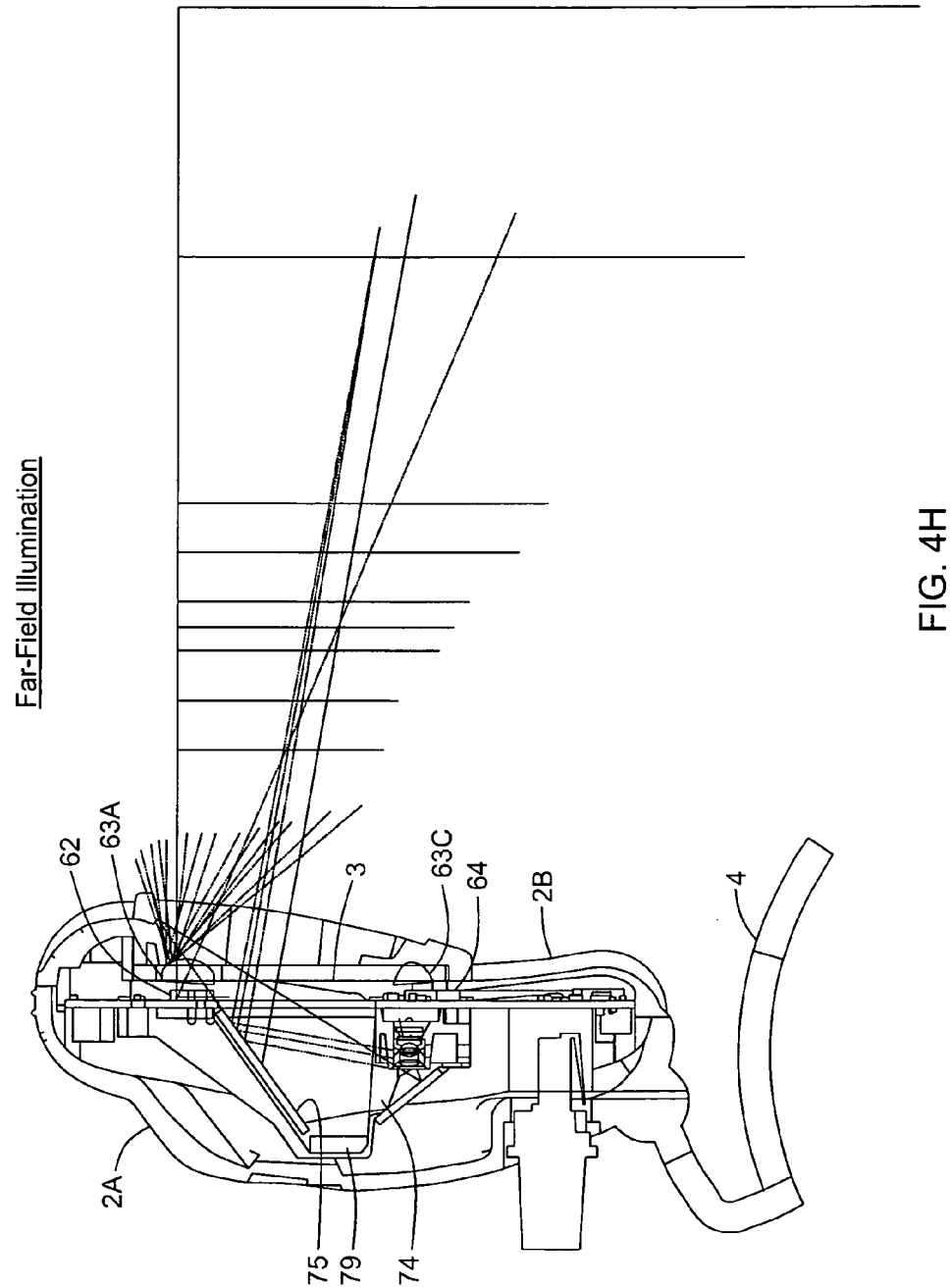
Figure 41:
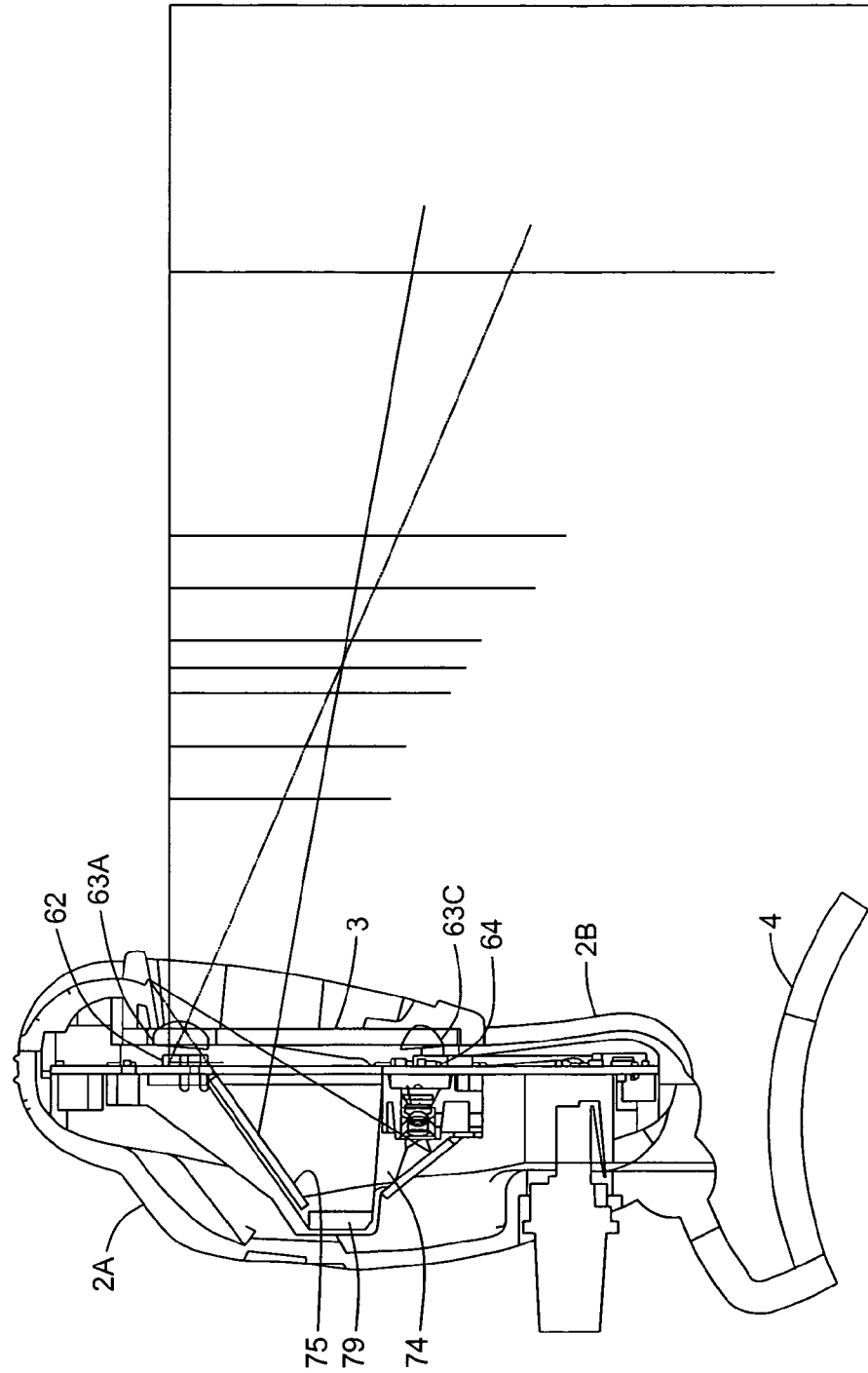
Figure 5A:
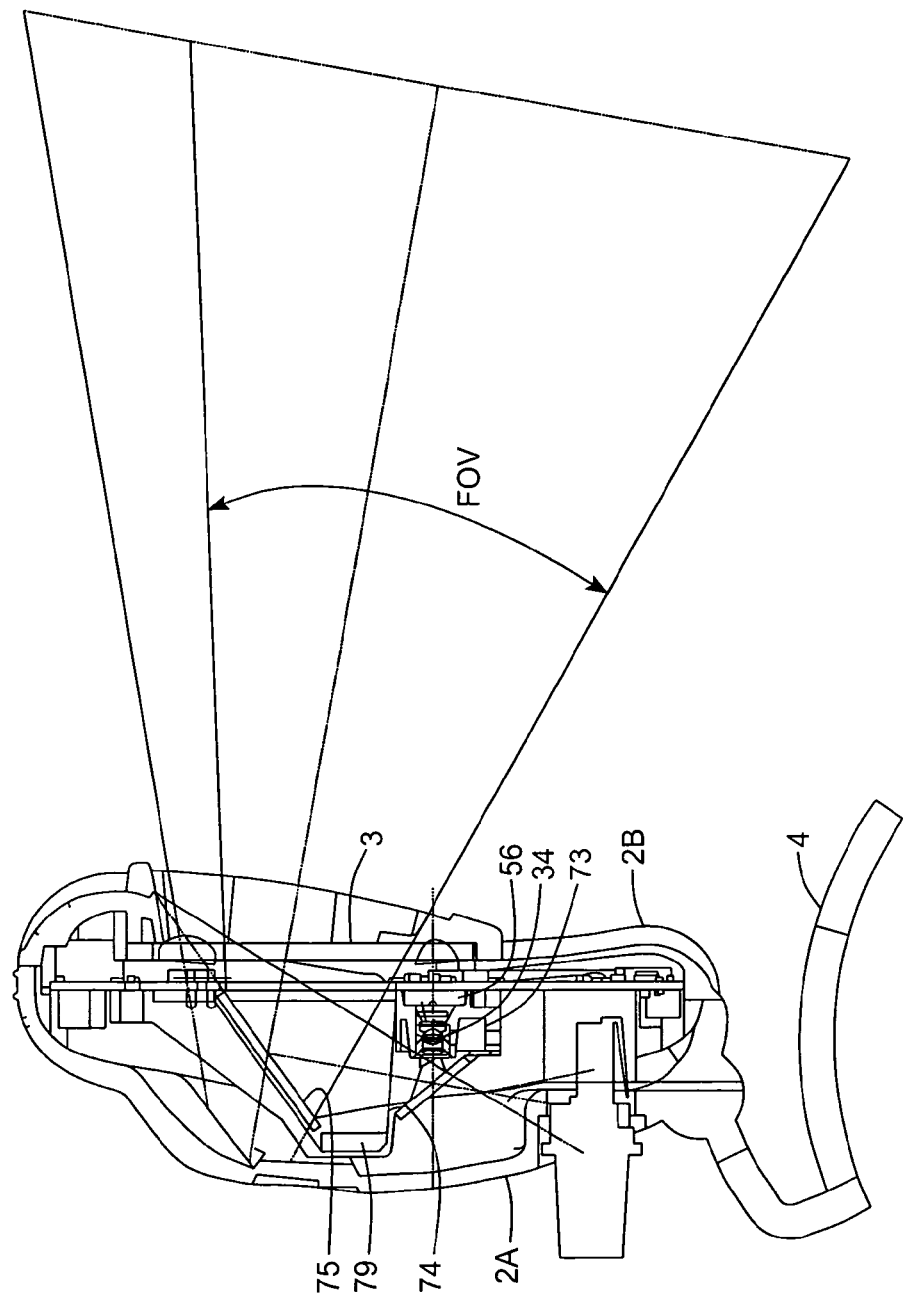
Figure 5B:
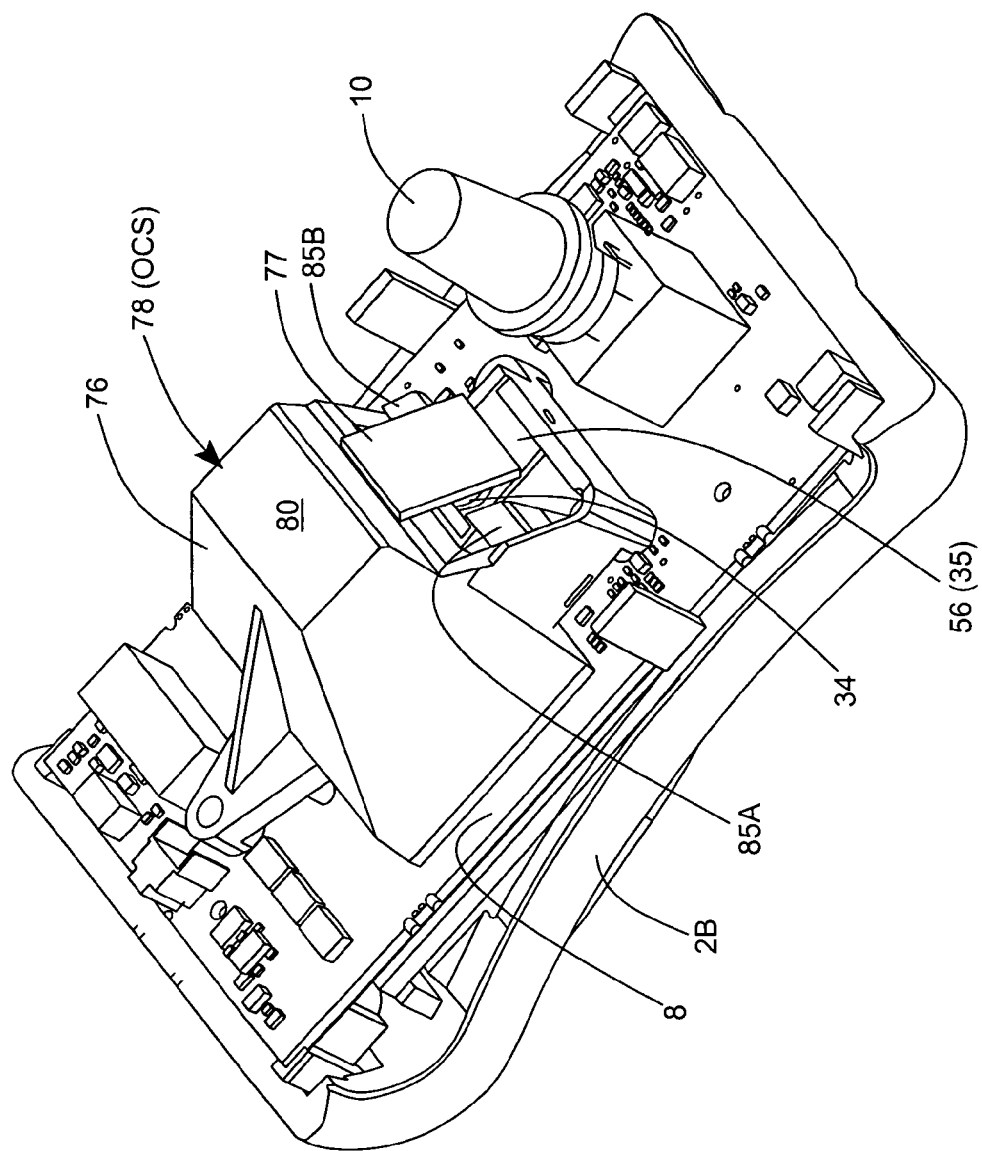
Figure 5C:
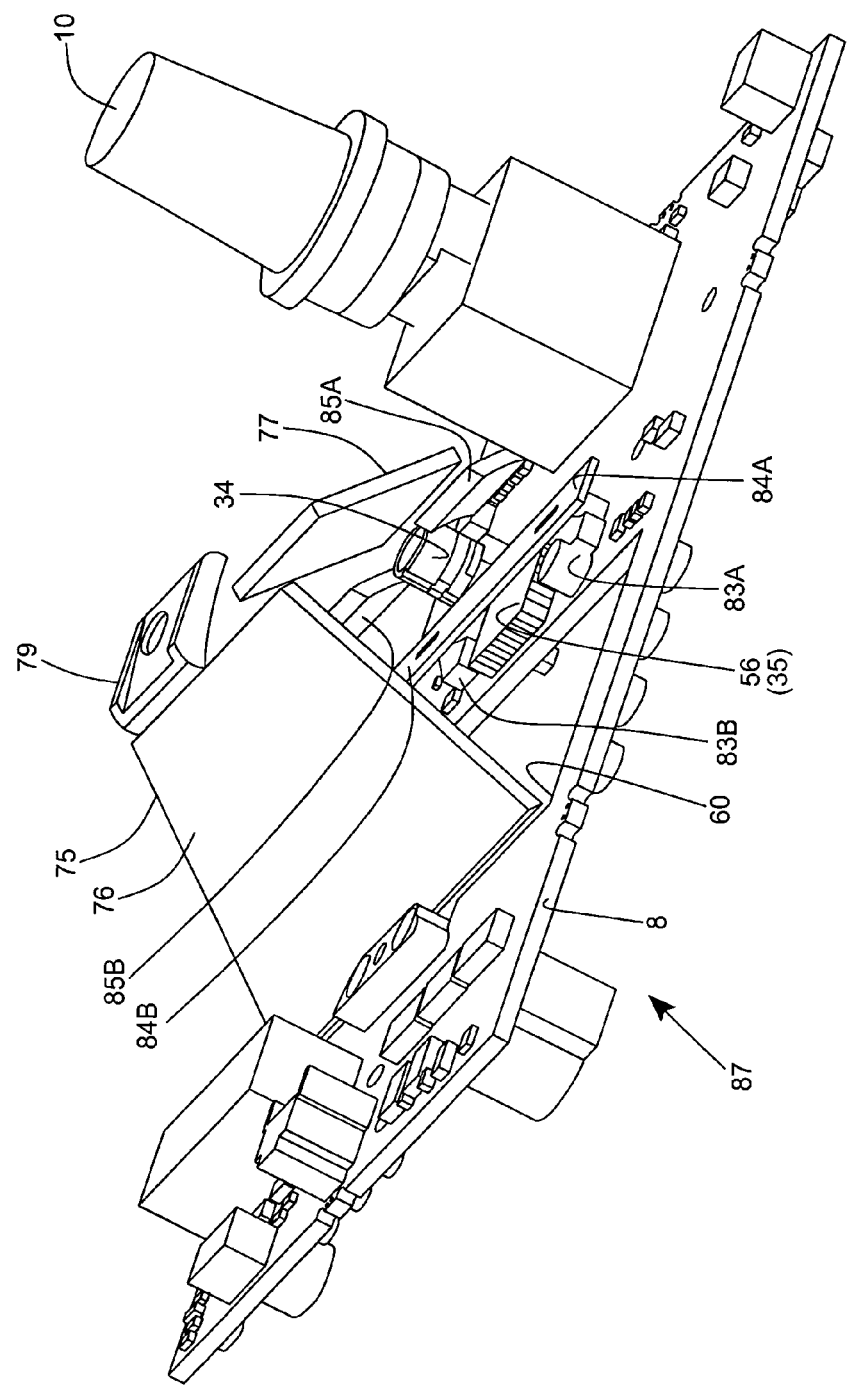
Figure 5D:
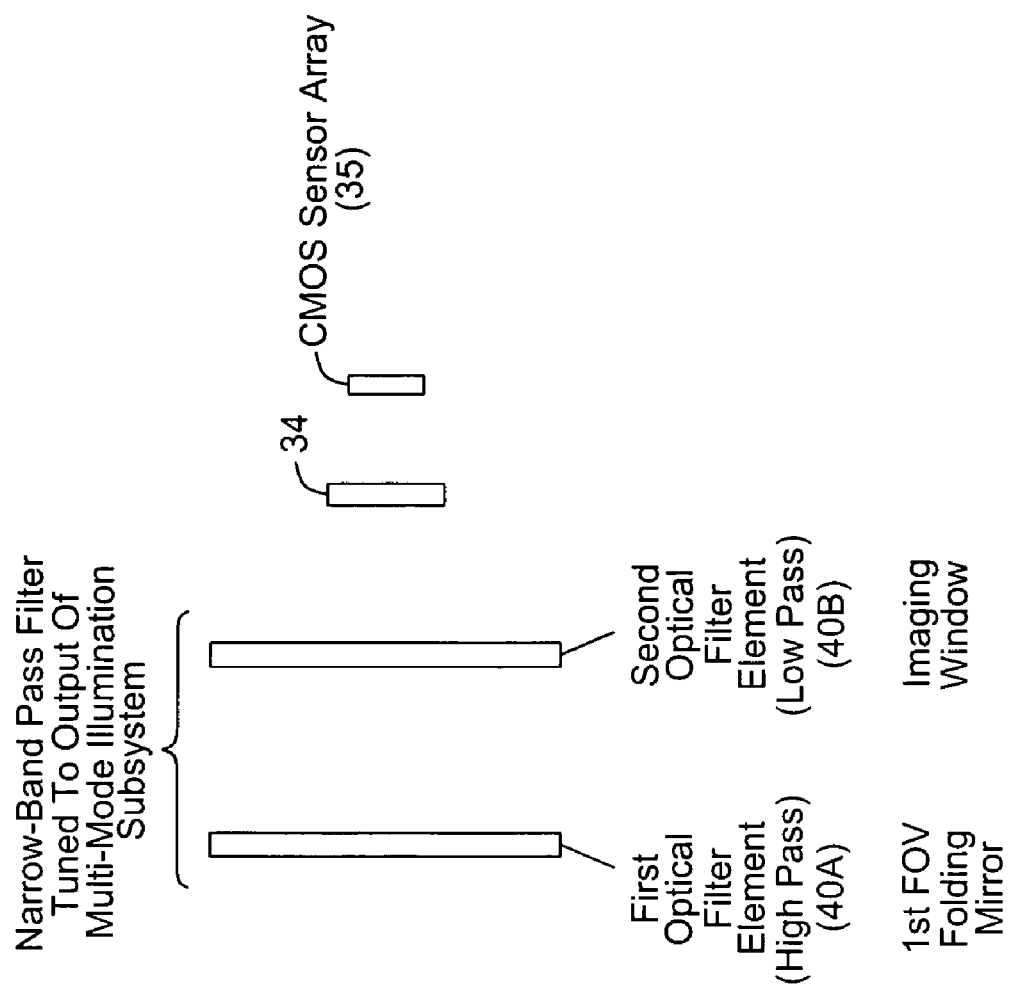
Figure 5F:
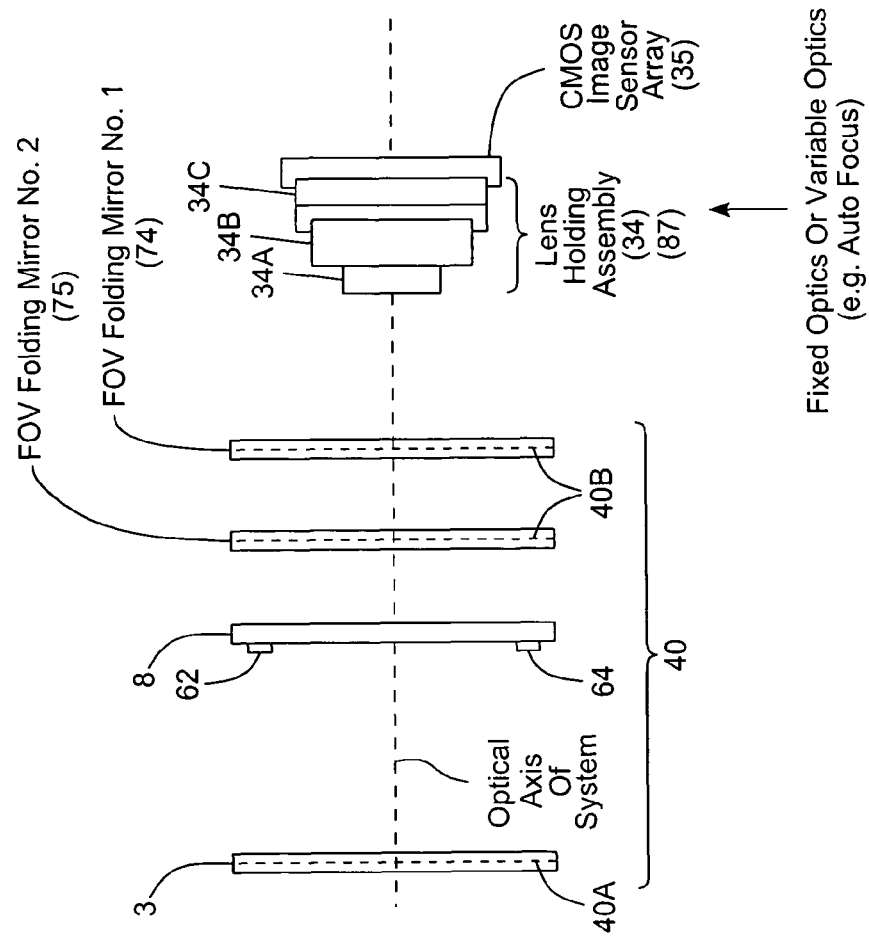
Figure 5G:
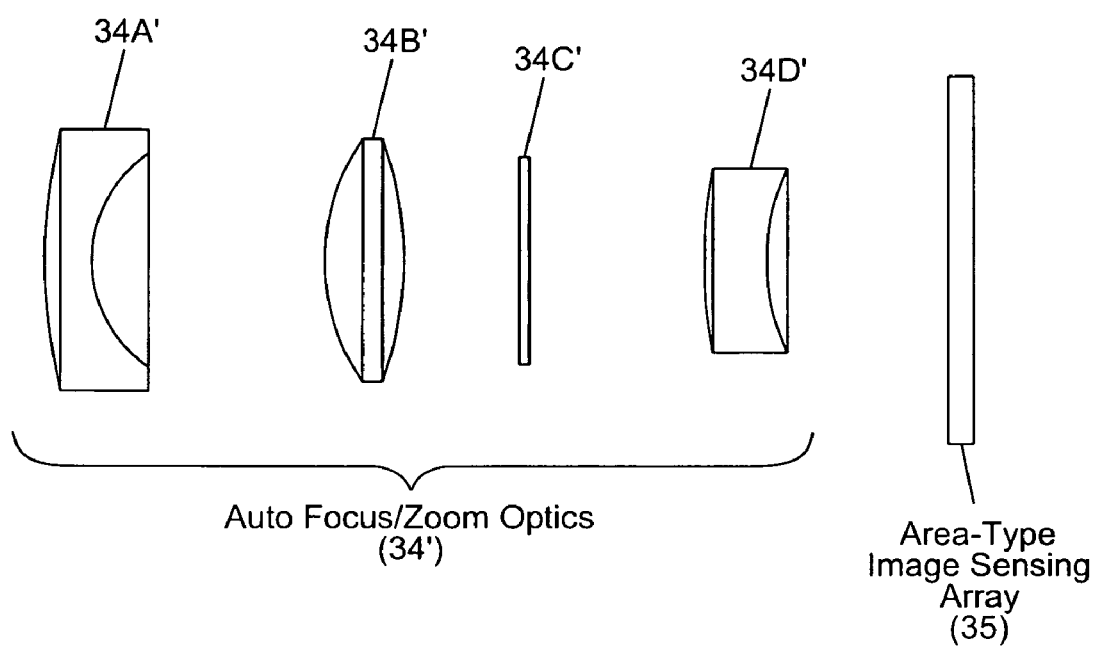
Figure 6A:
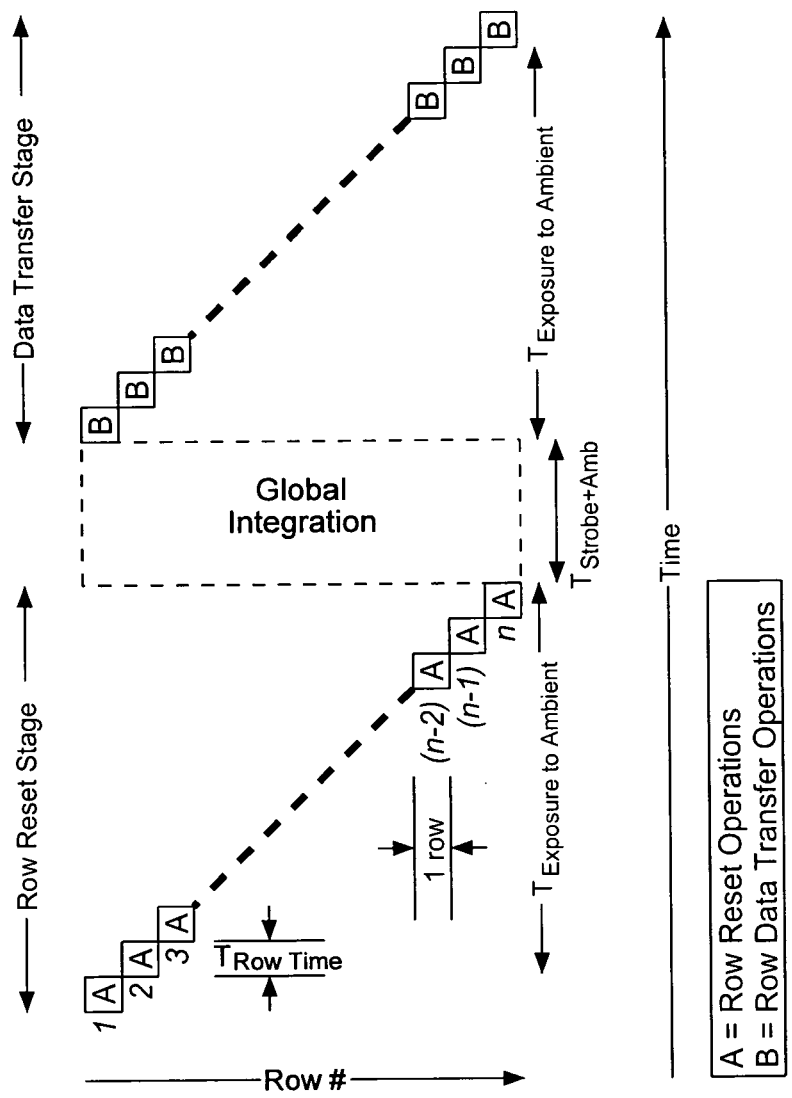
Figure 6B:
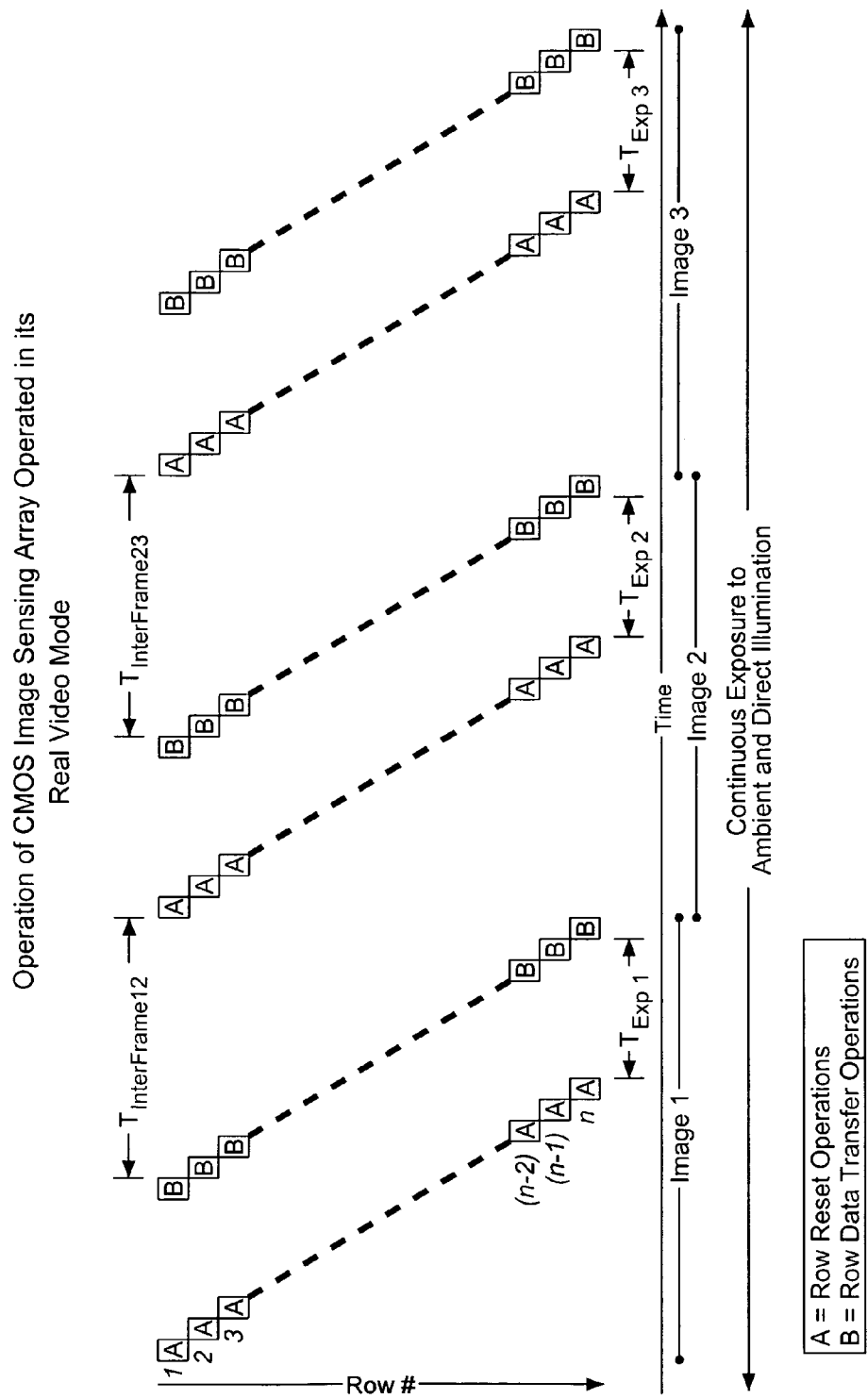
Figure 6C:
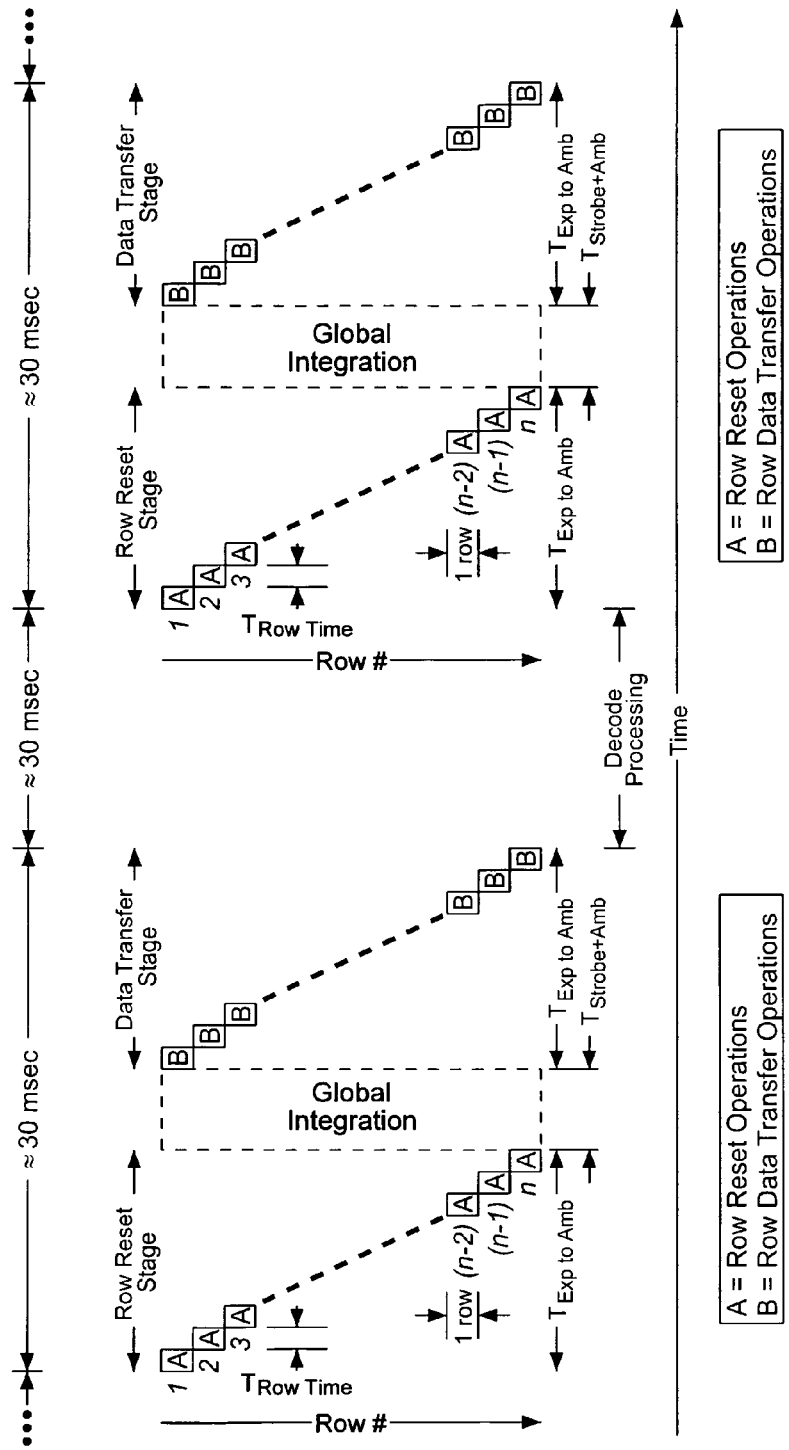
Figure 7A:
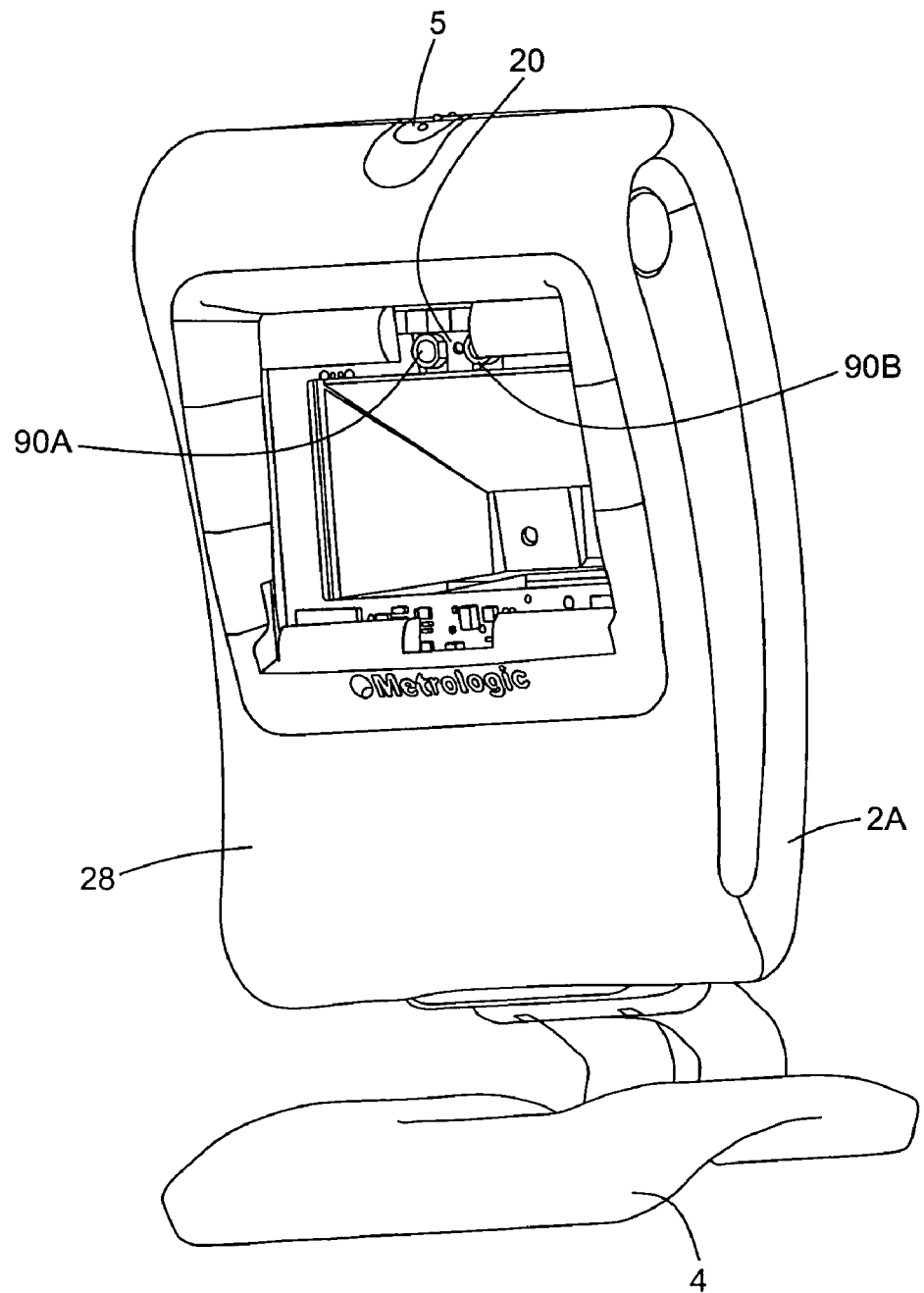
Figure 7B:
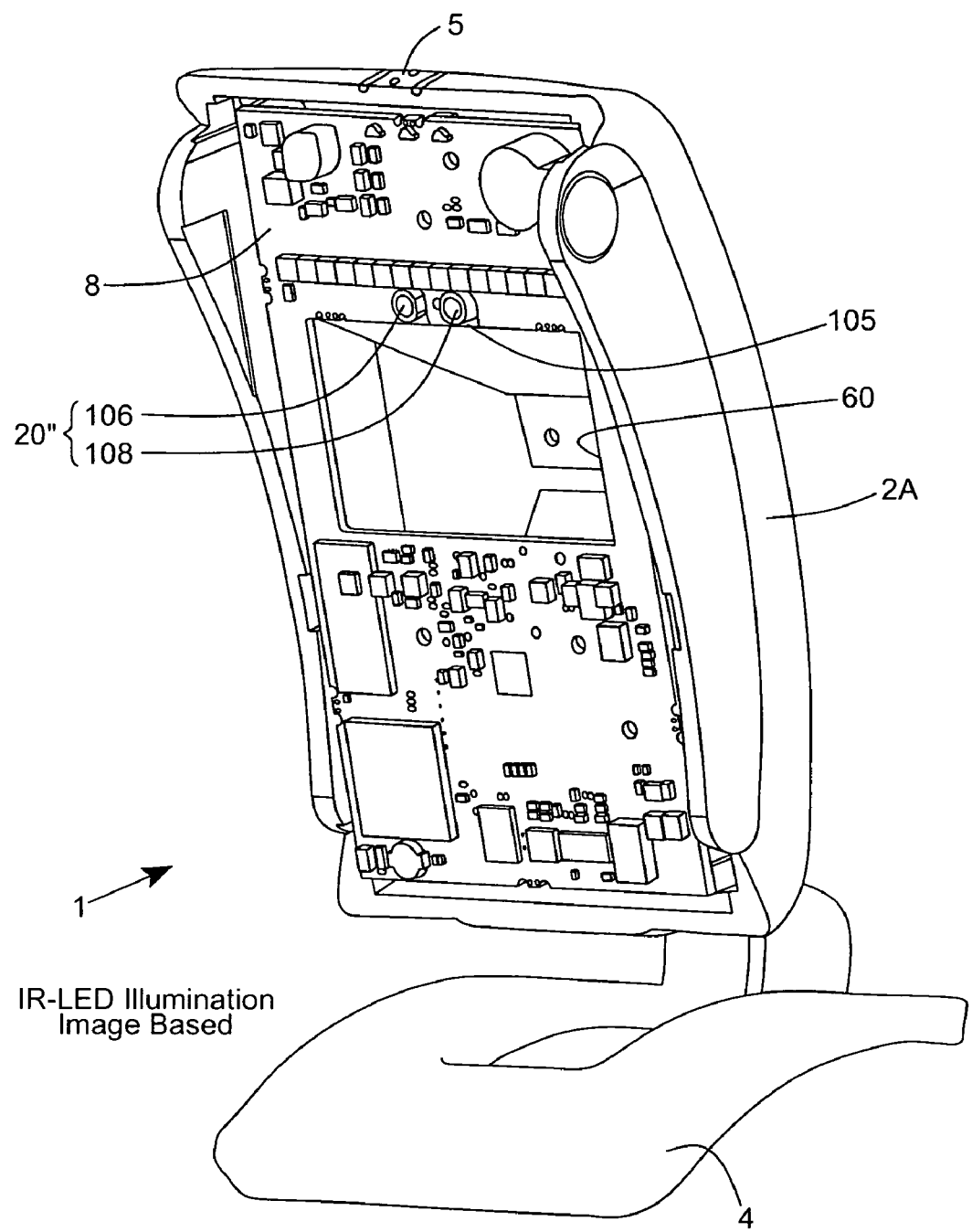
Figure 7C:
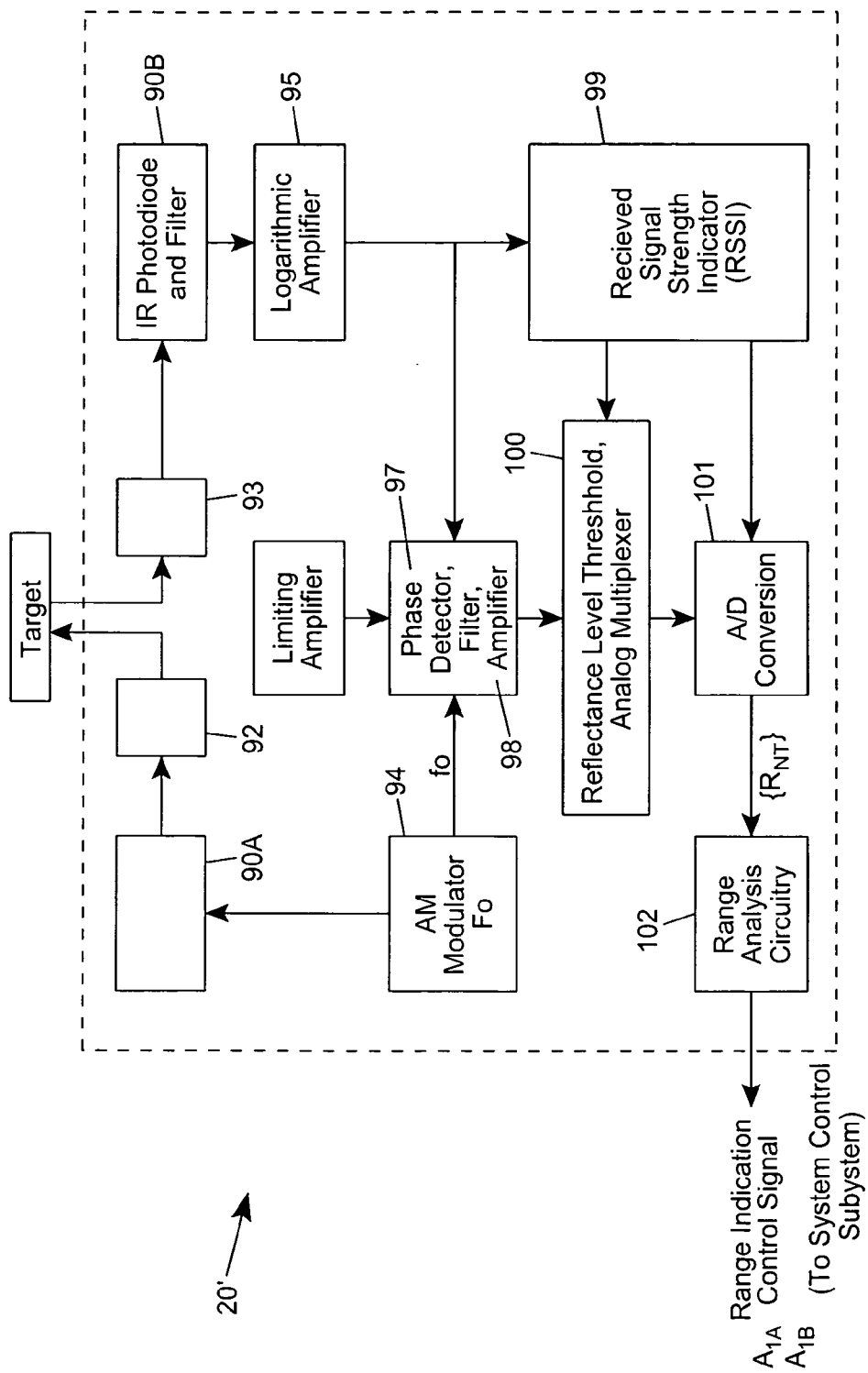
Figure 7D:
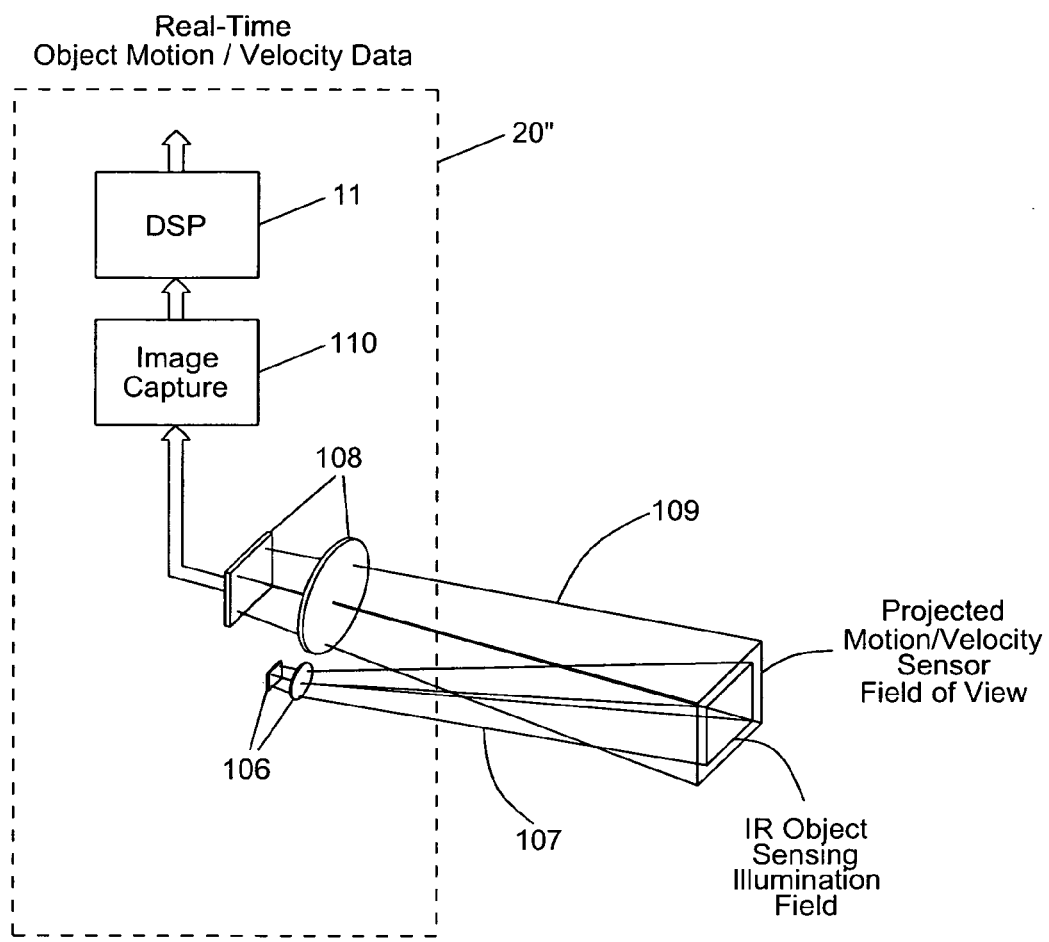
Figure 7E:
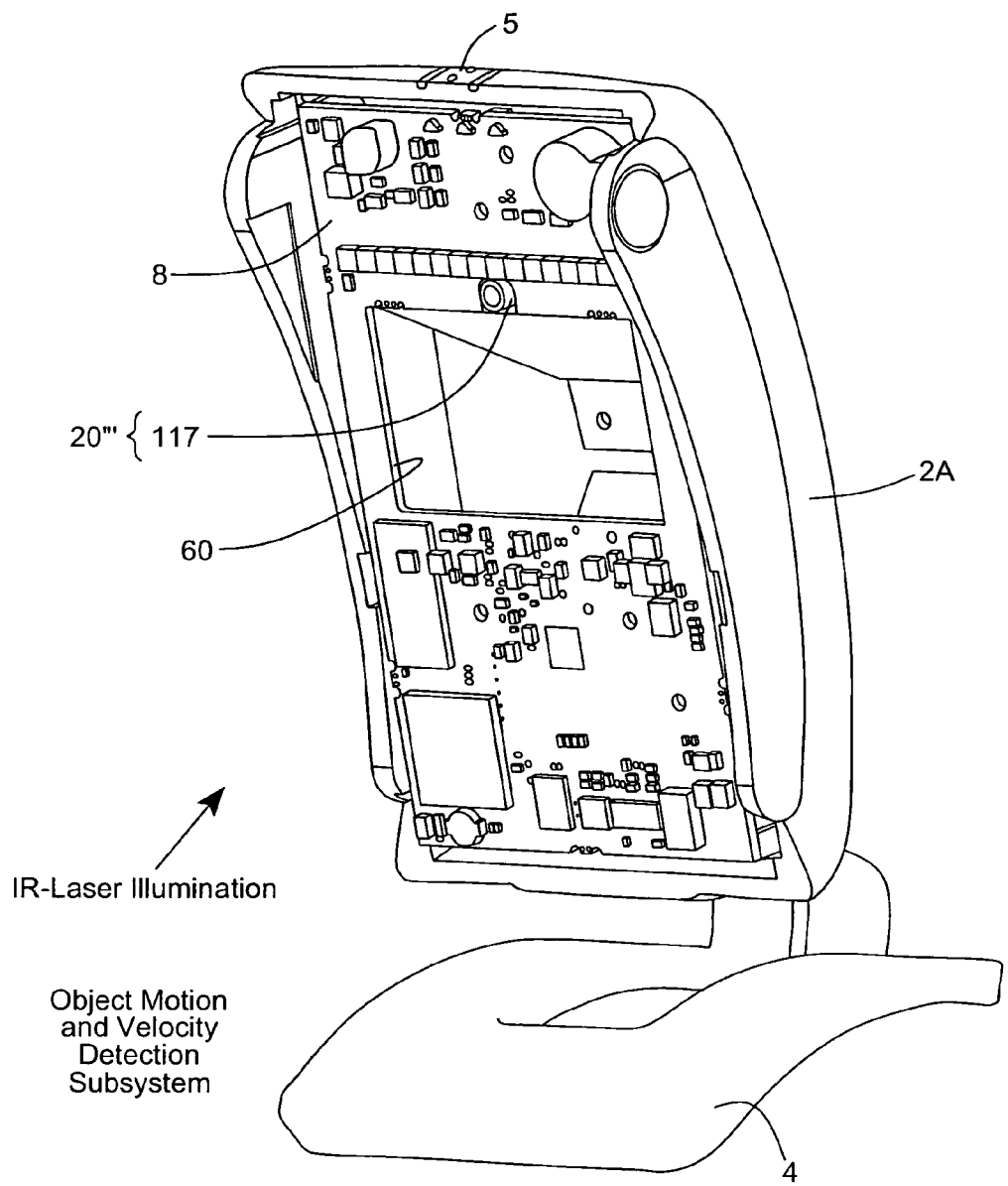
Figure 7F:
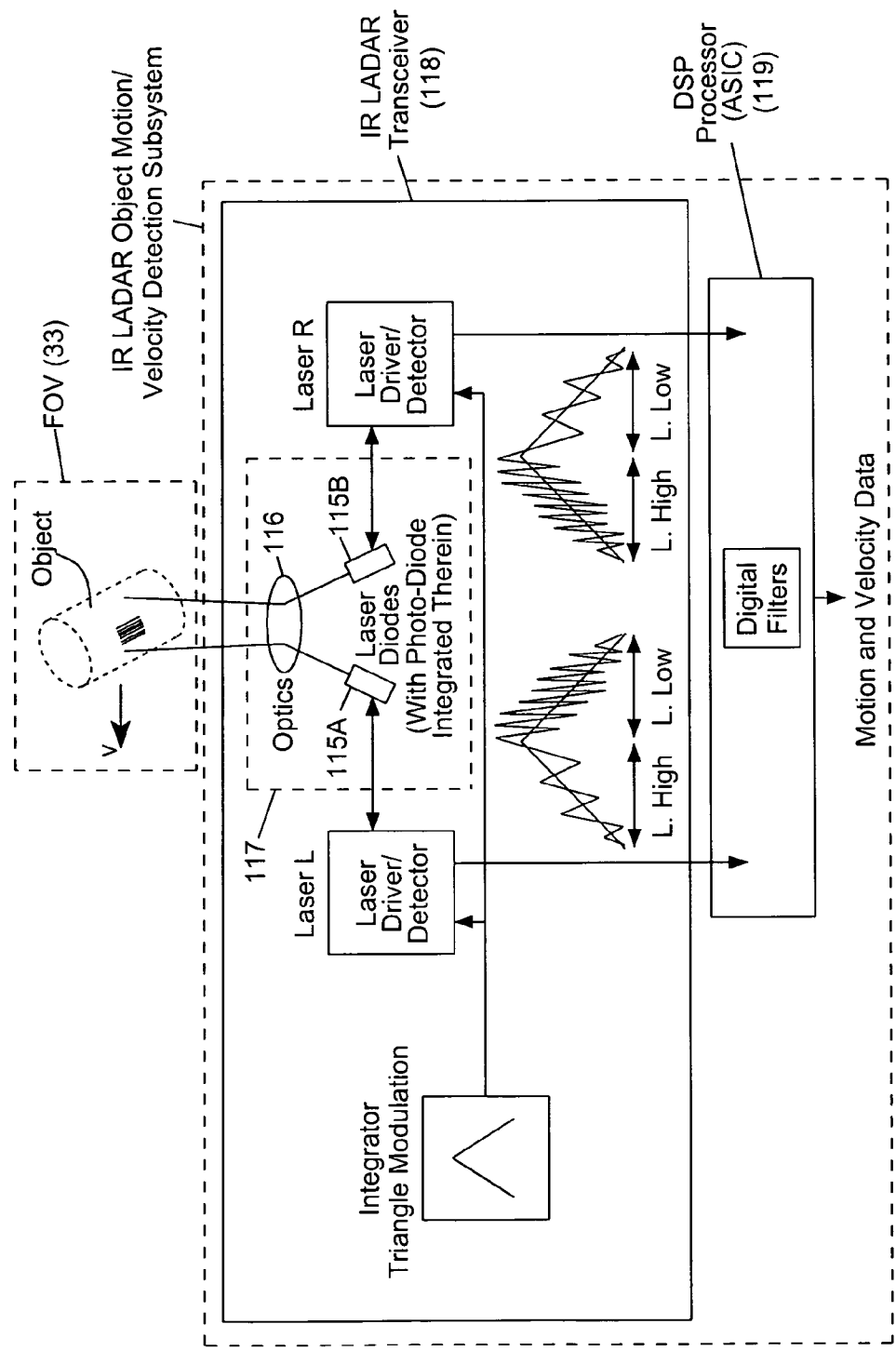
Figure 8A:
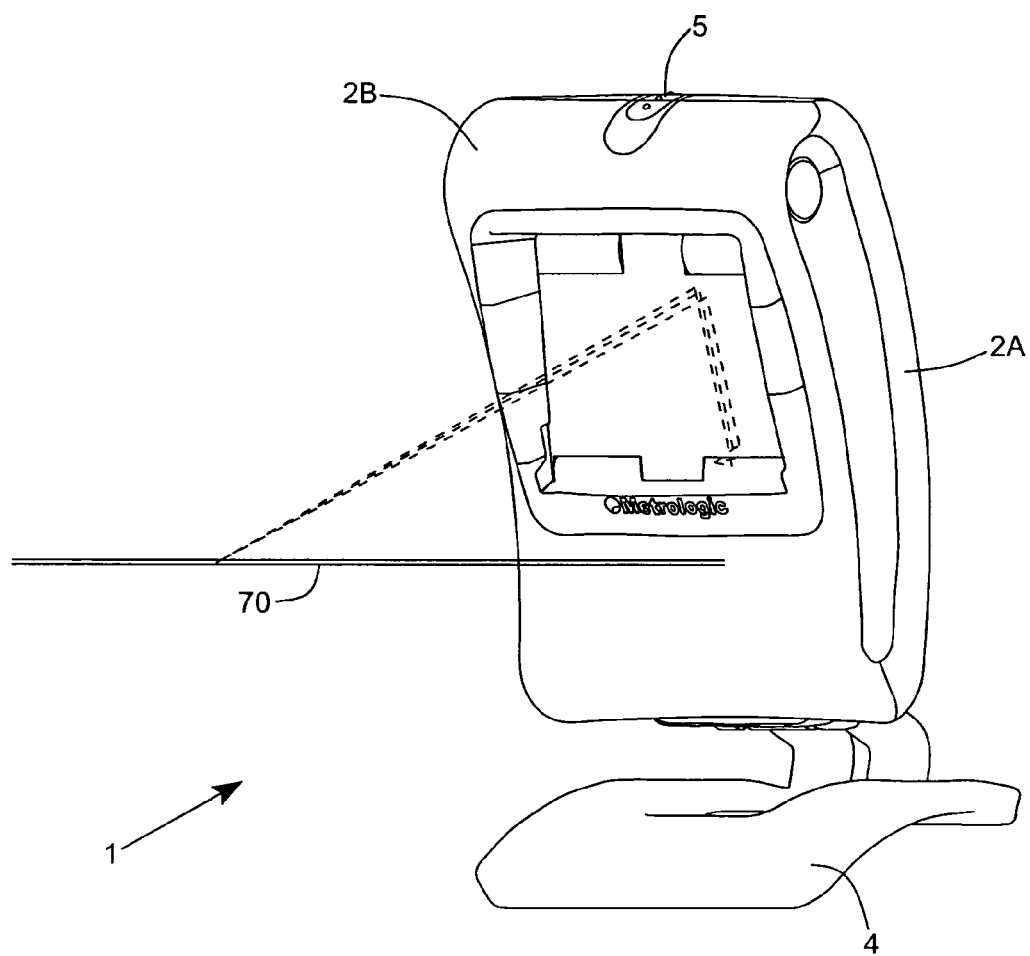
Figure 8B:
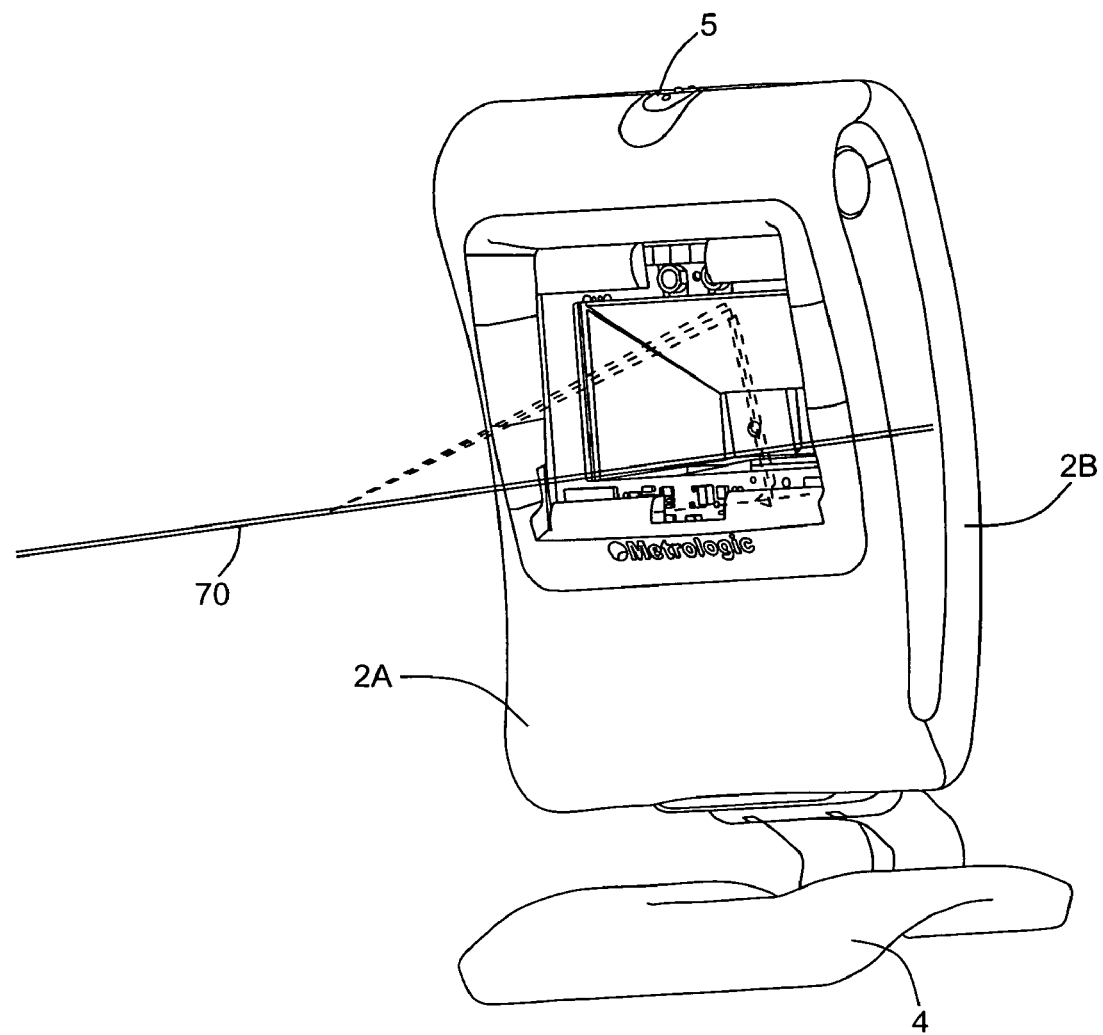
Figure 8C:
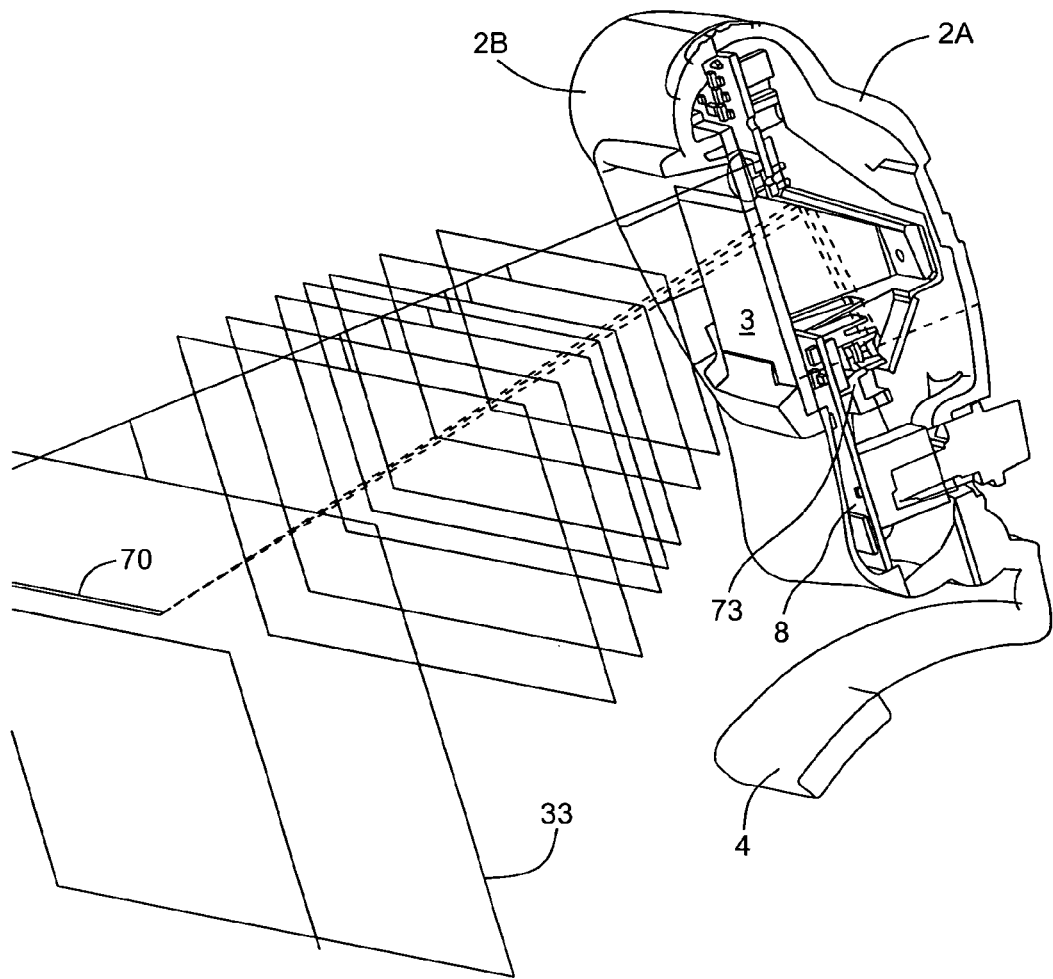
Figure 8D:
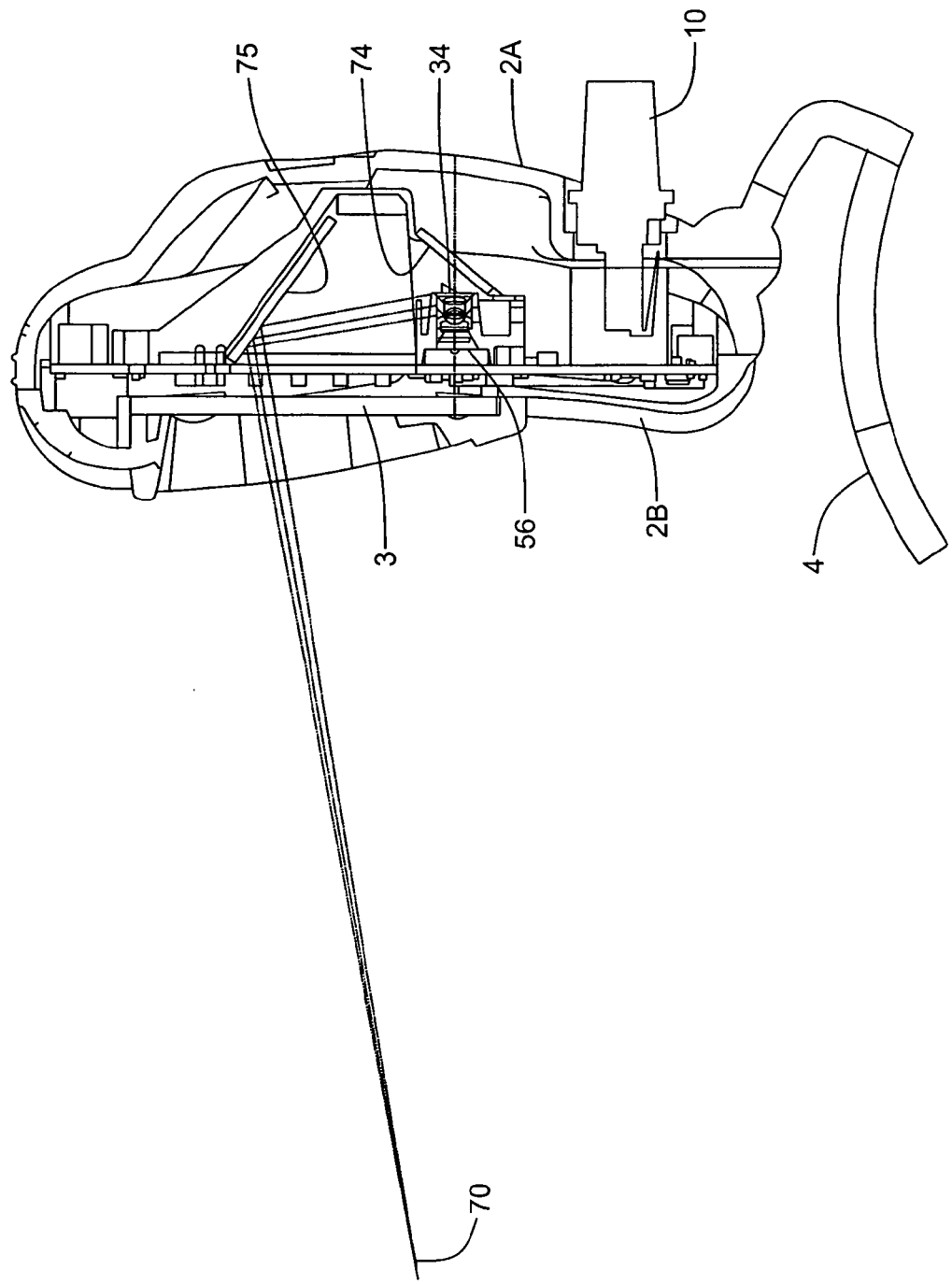
Figure 8E:
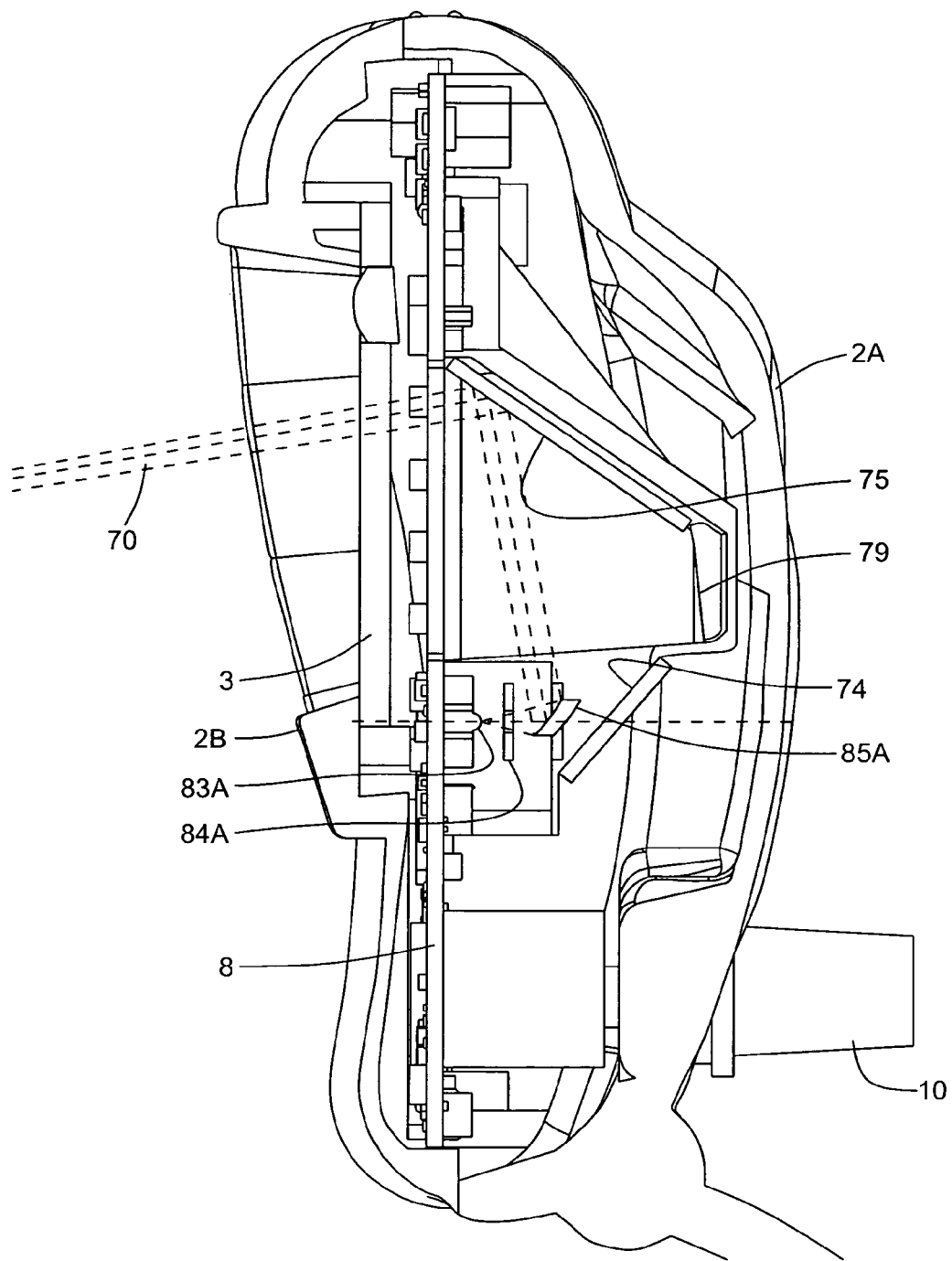
Figure 8F:
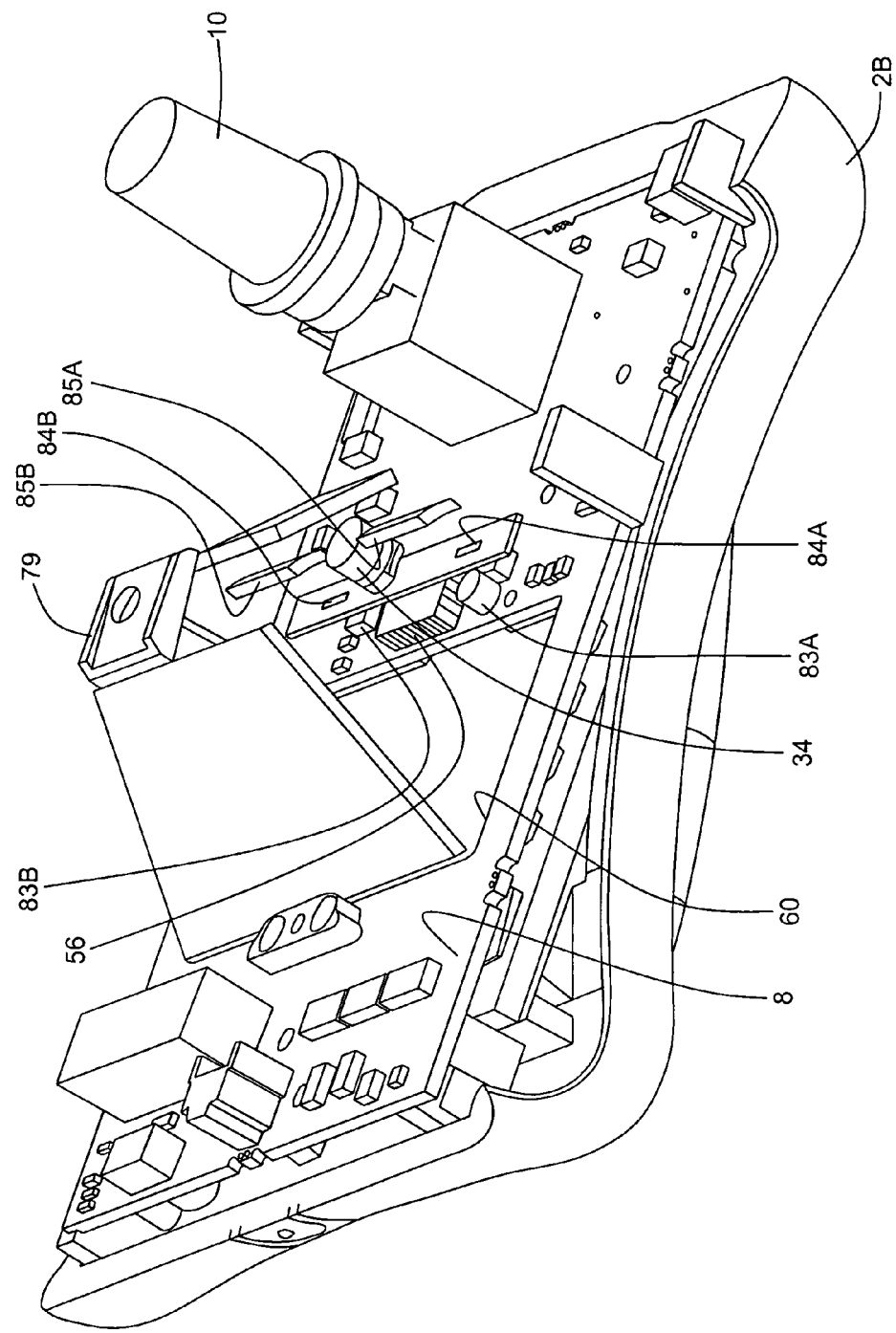
Figure 8G:
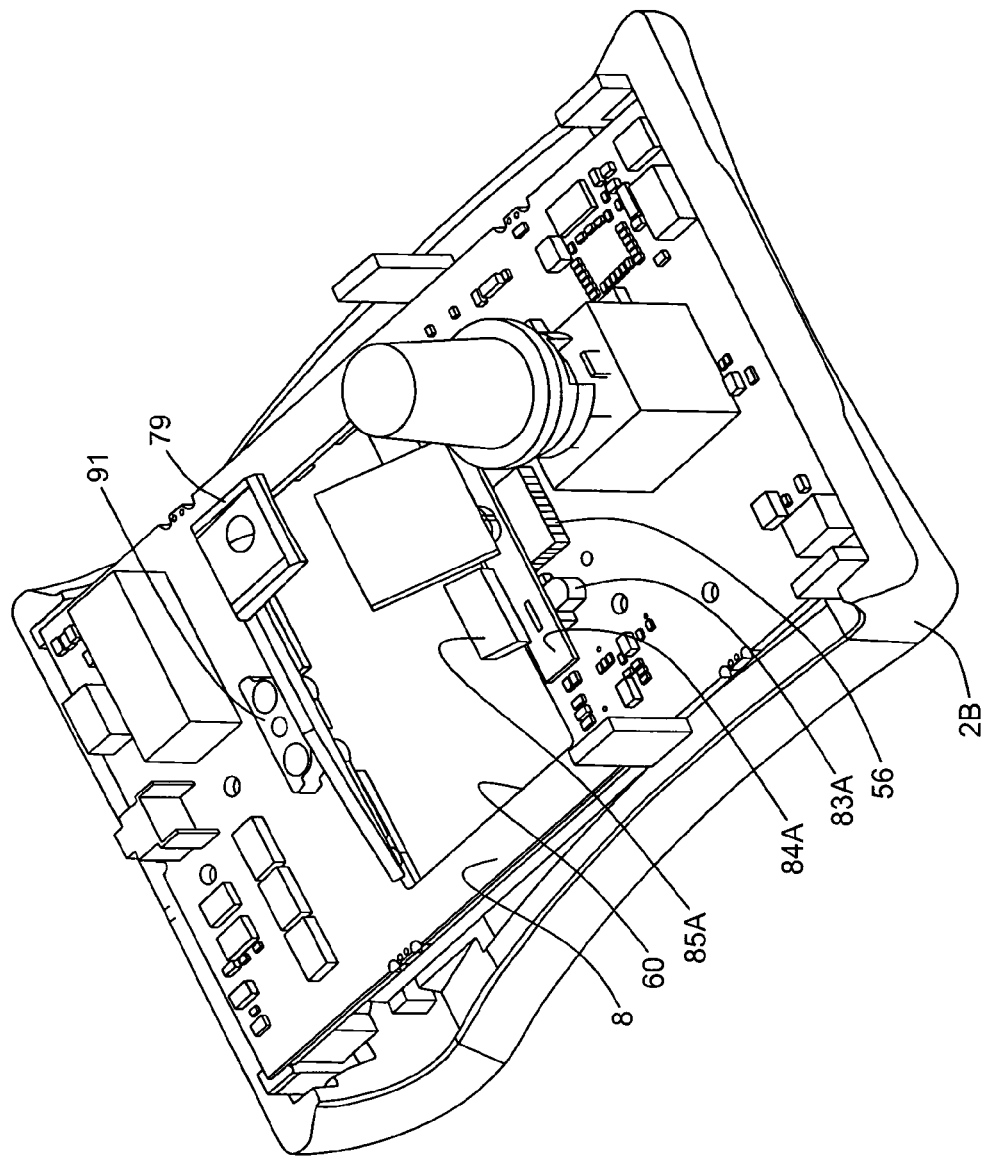
Figure 8H:
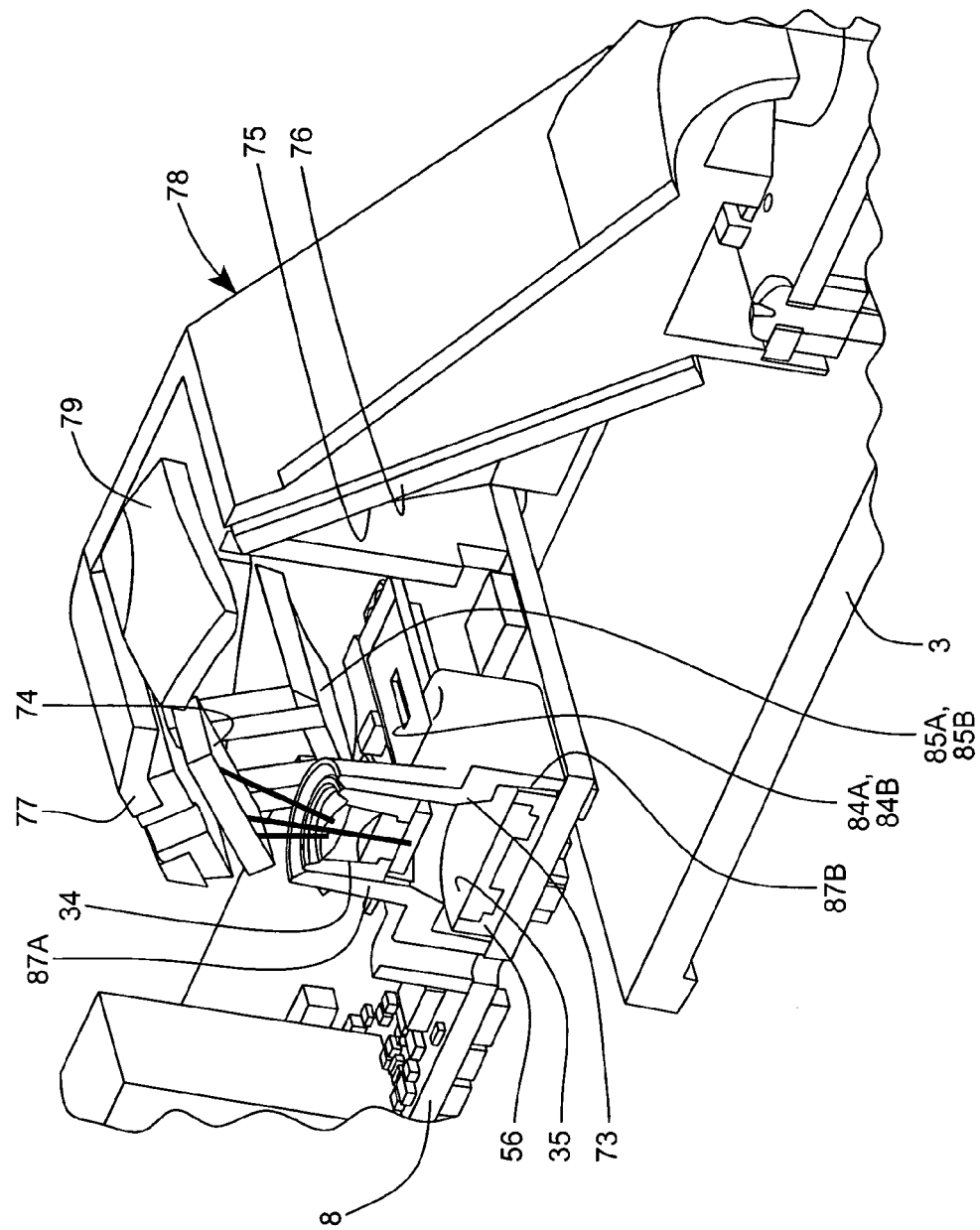
Figure 9A:
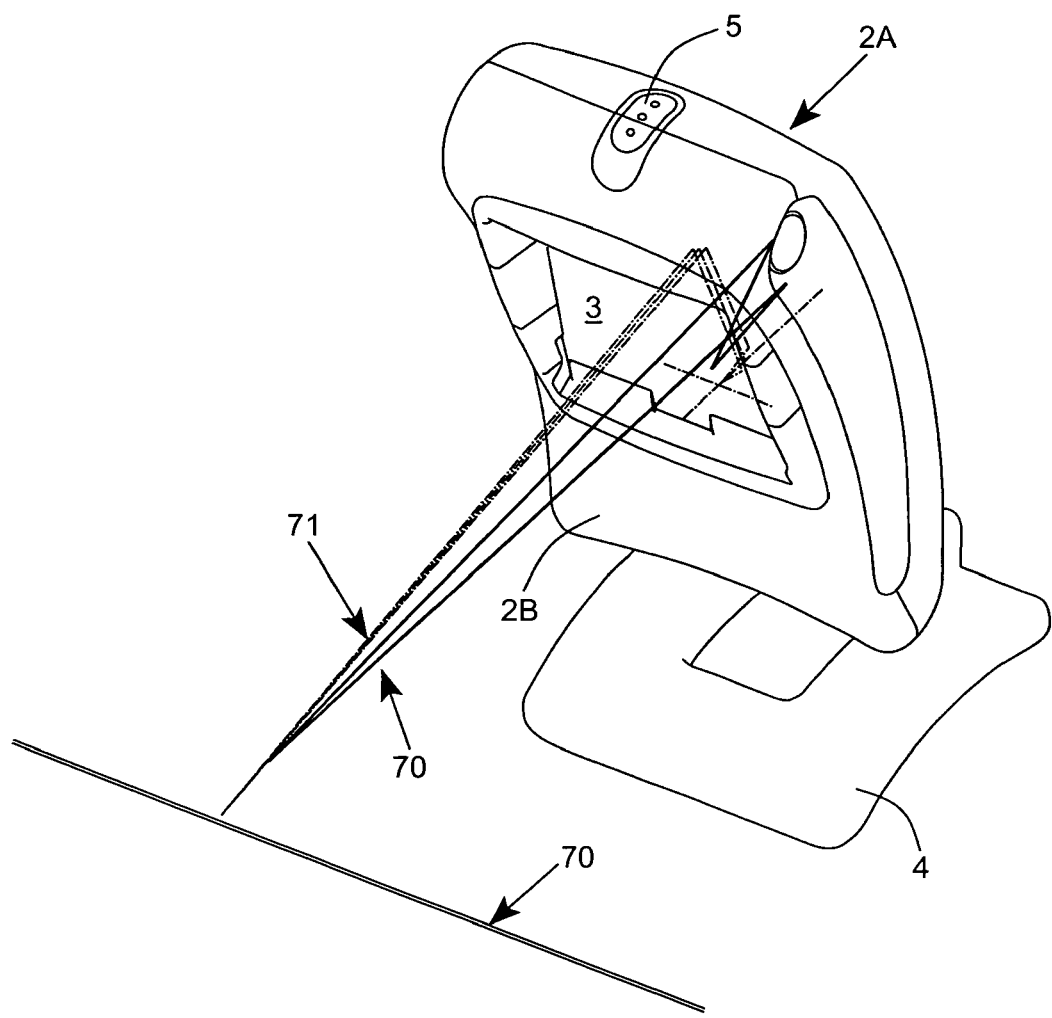
Figure 9B:
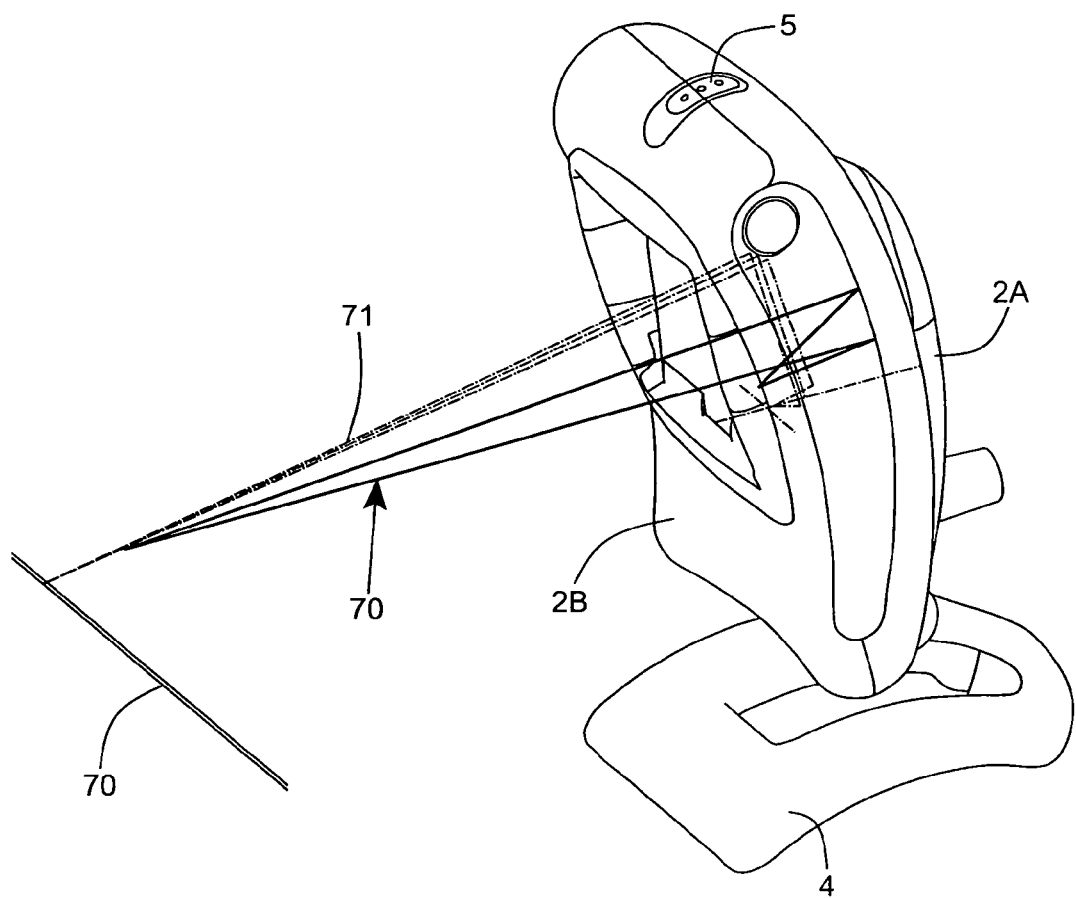
Figure 9C:
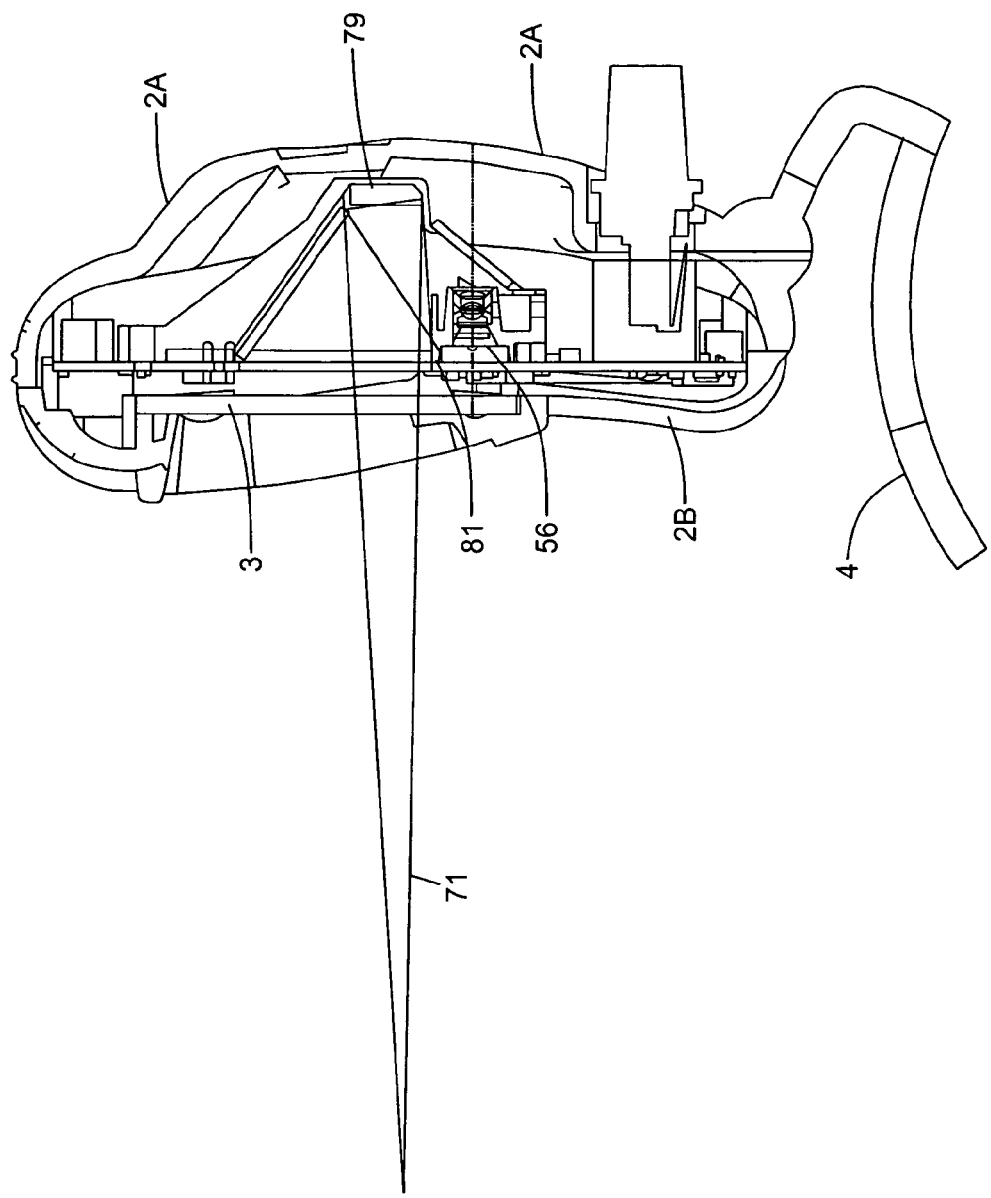
Figure 10:
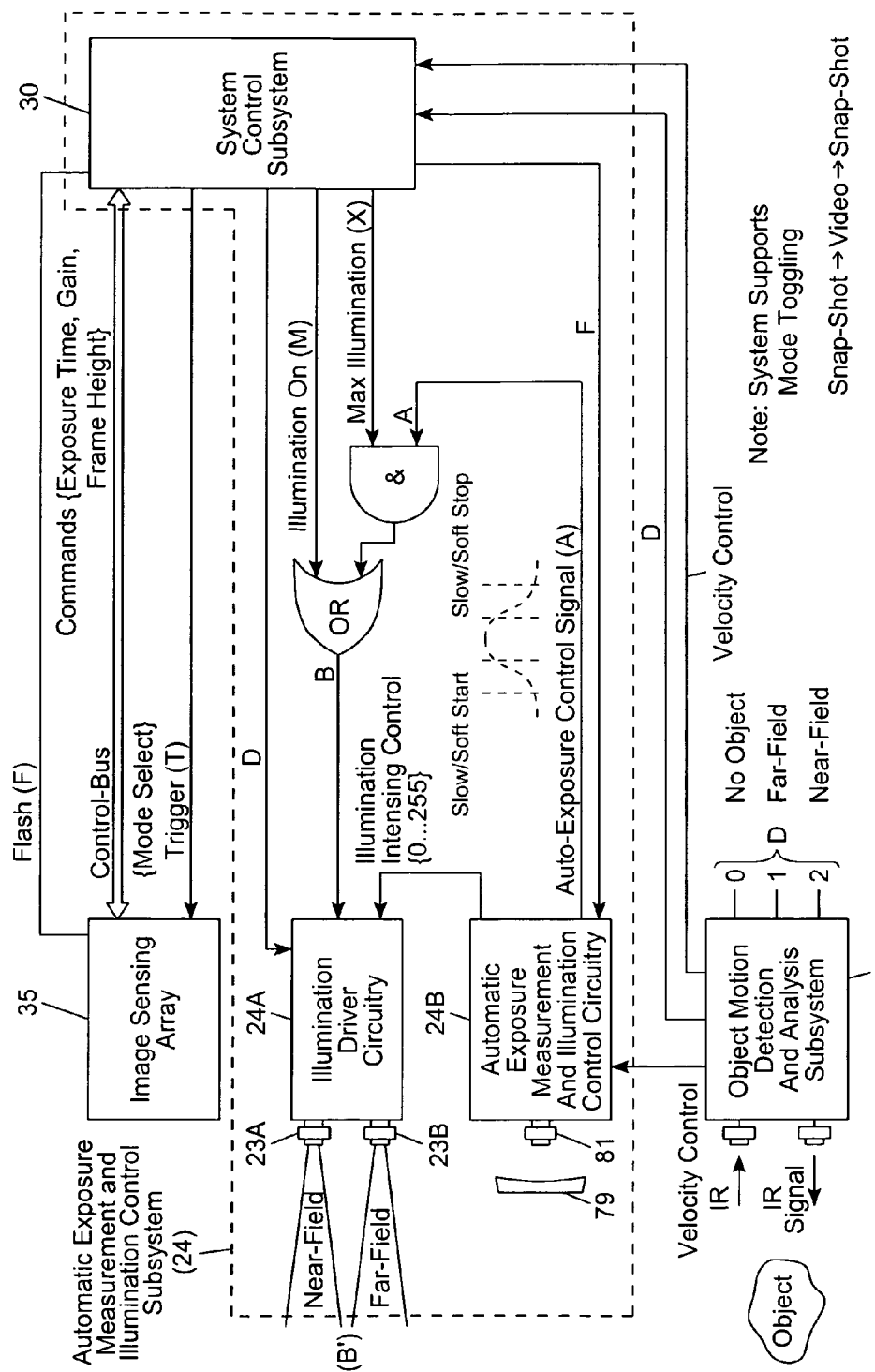
Figure 11A:
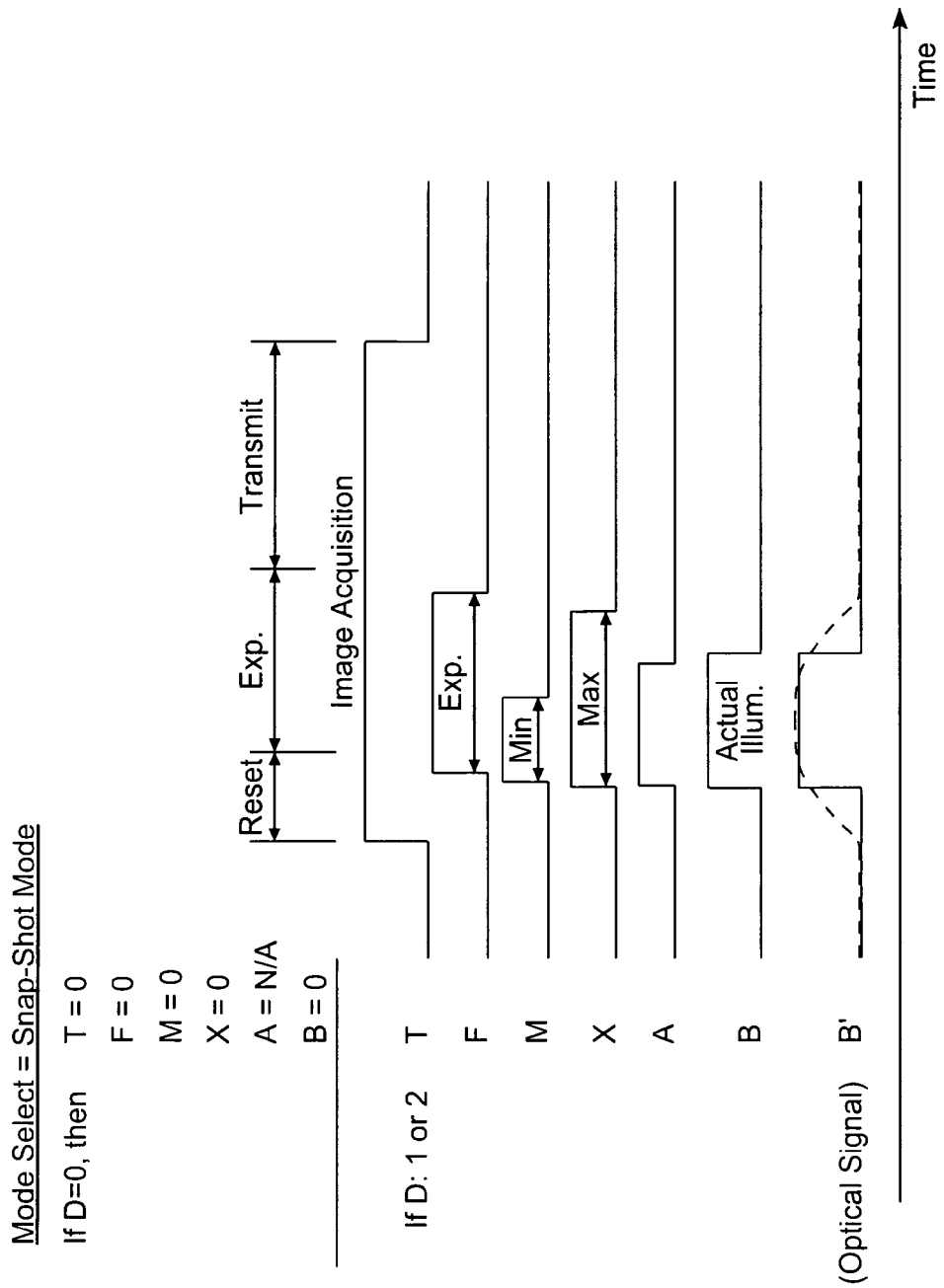
Figure 11B:
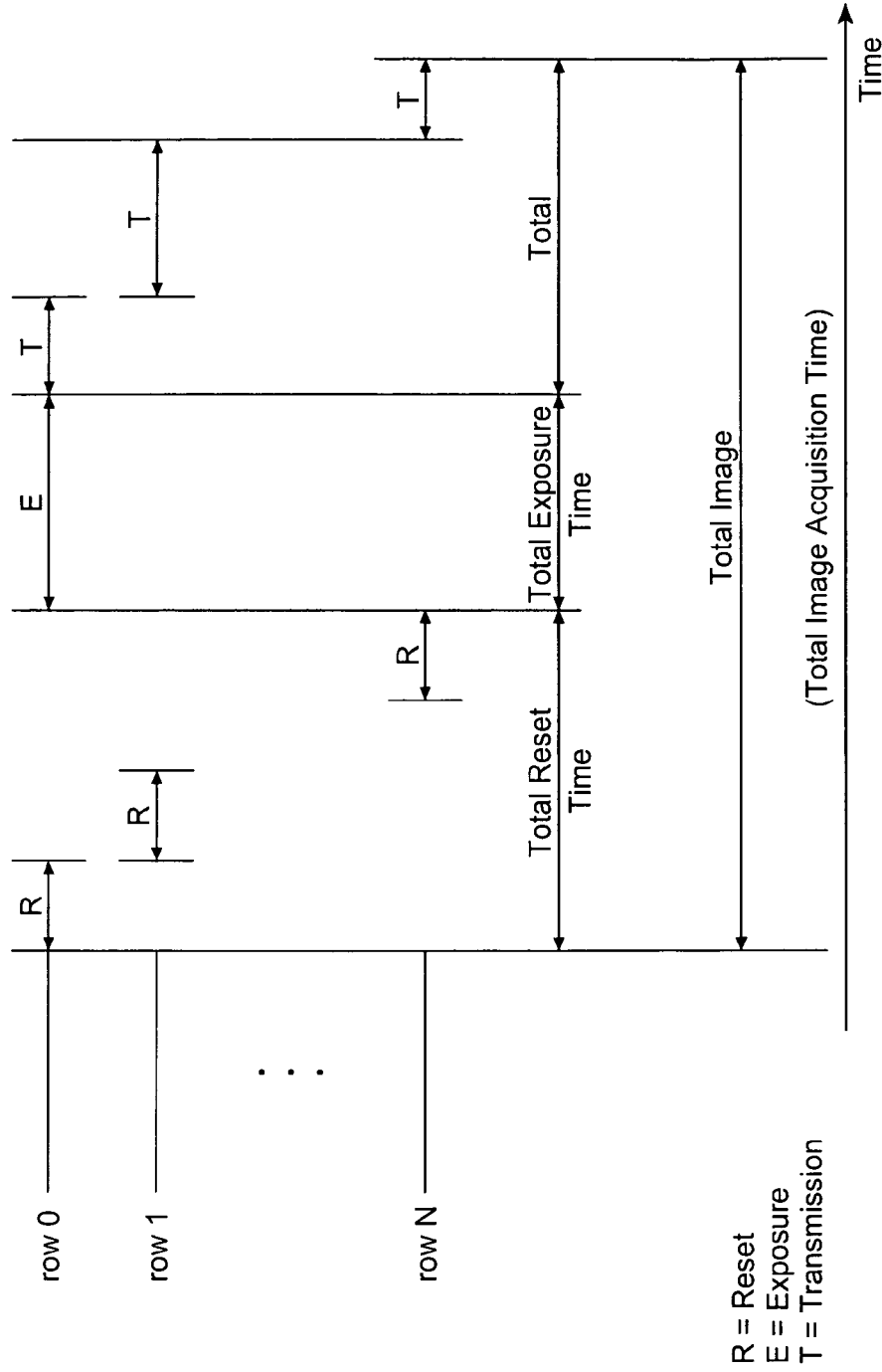
Figure 12A:
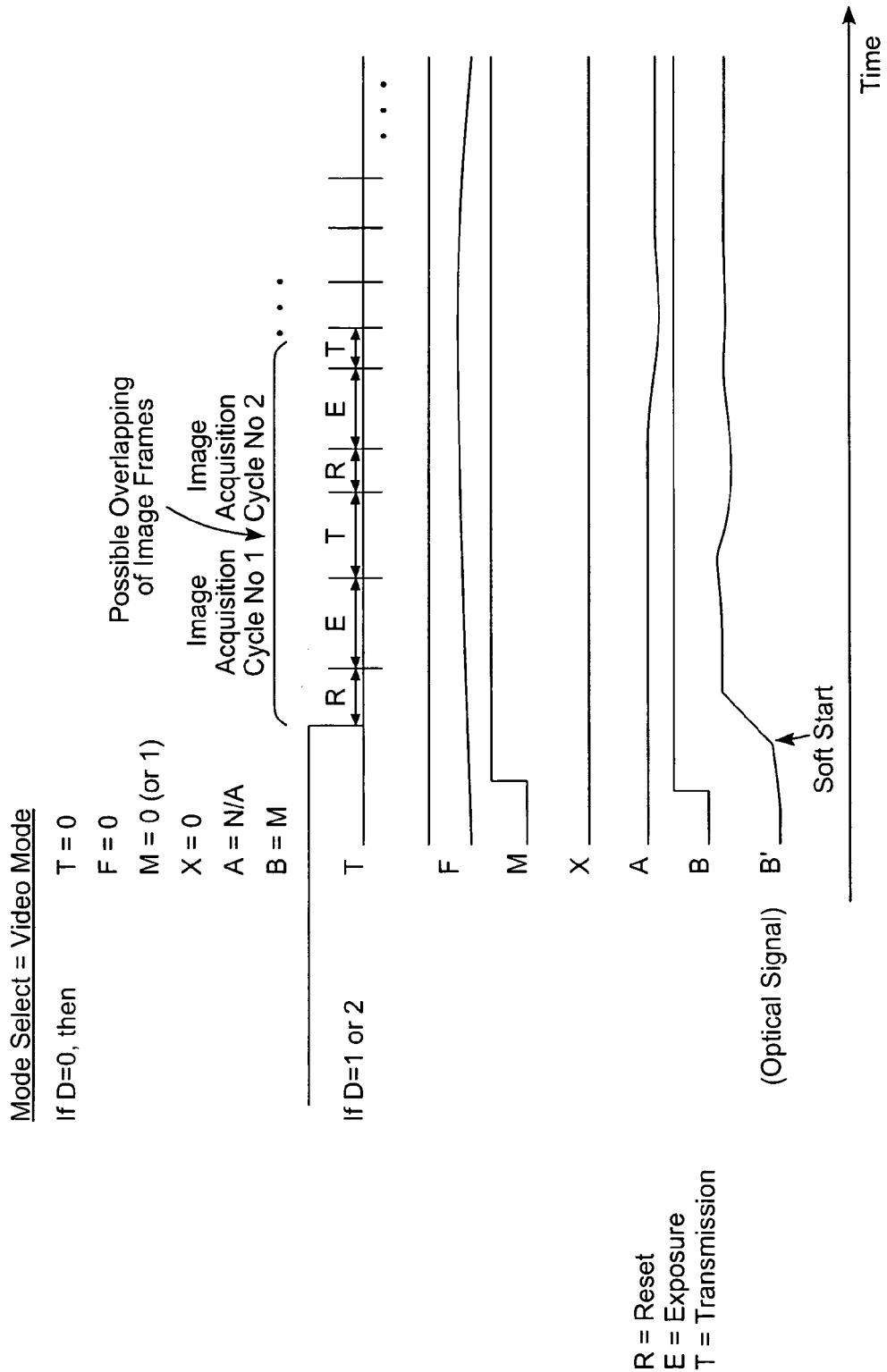
Figure 12C:
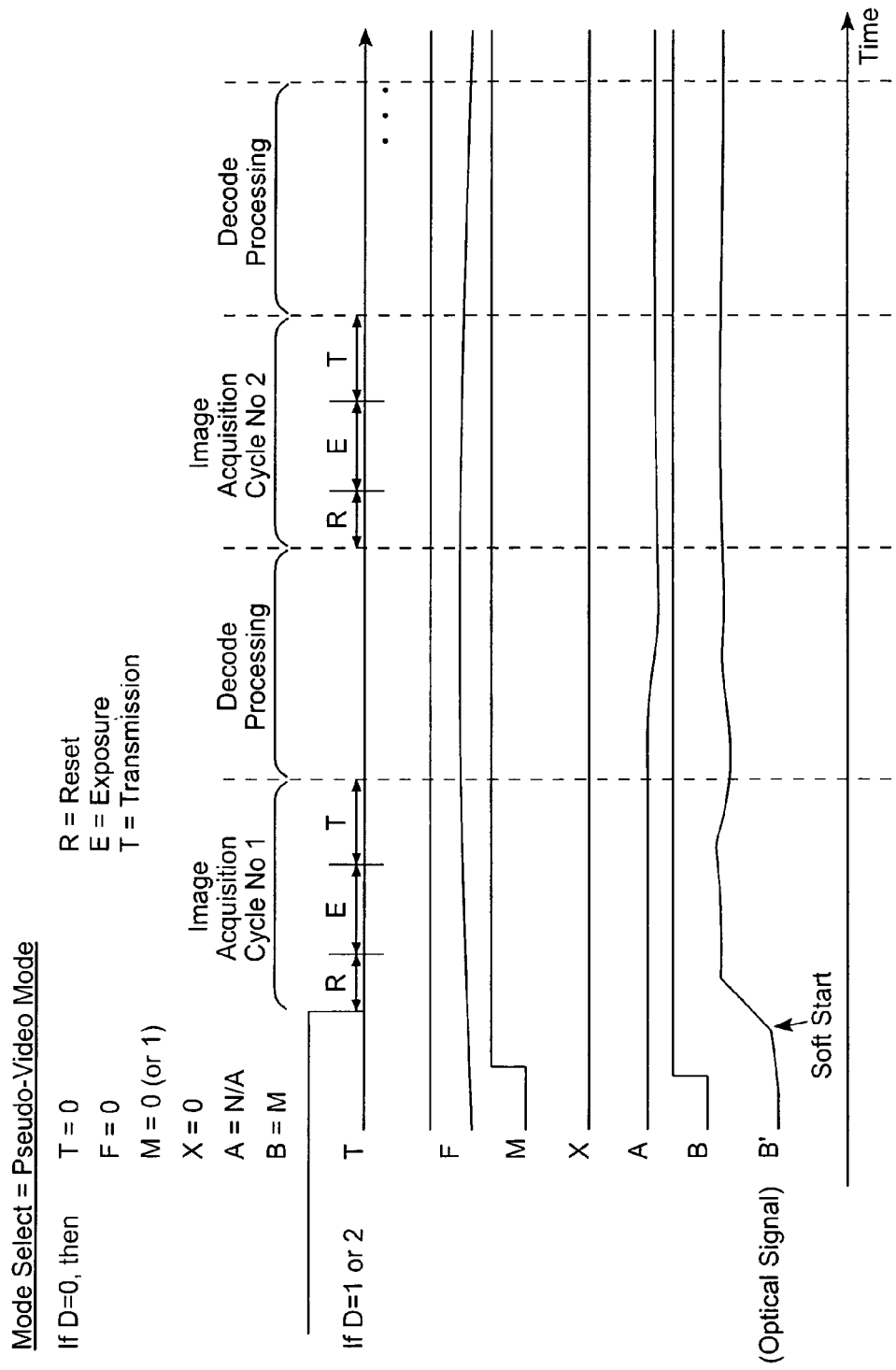
Figure 12D:
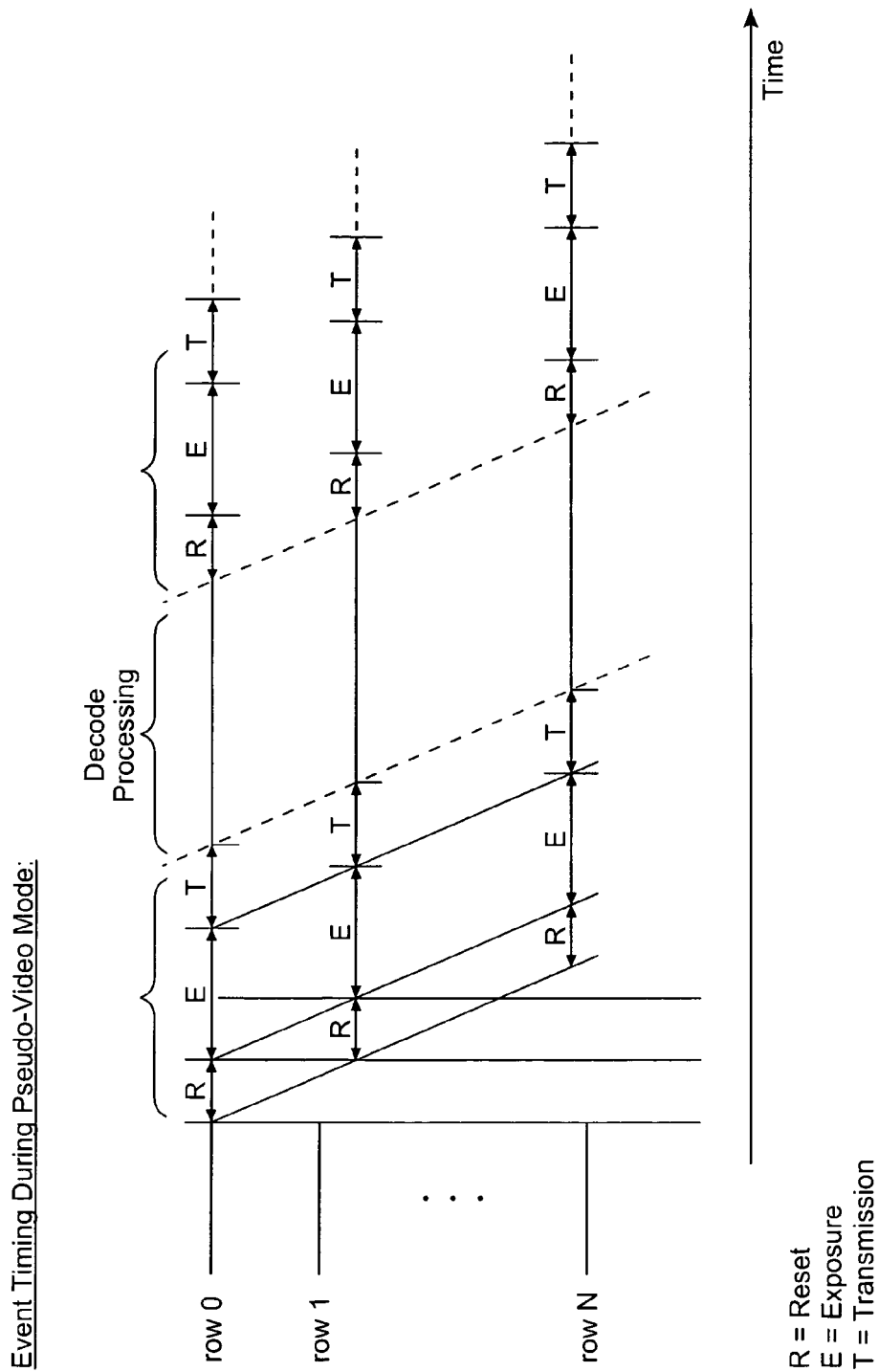
Figure 13:
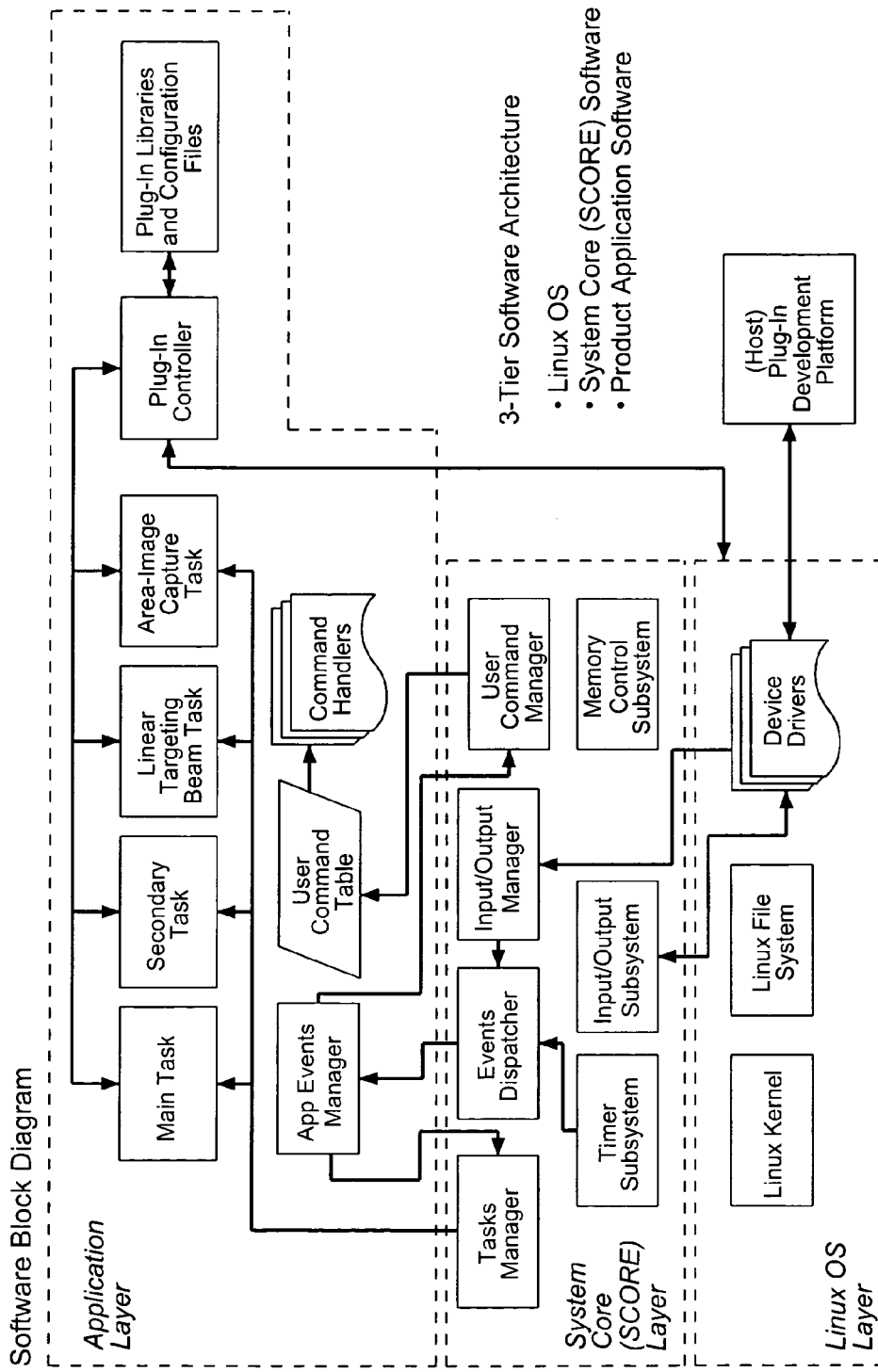
Figure 15B:
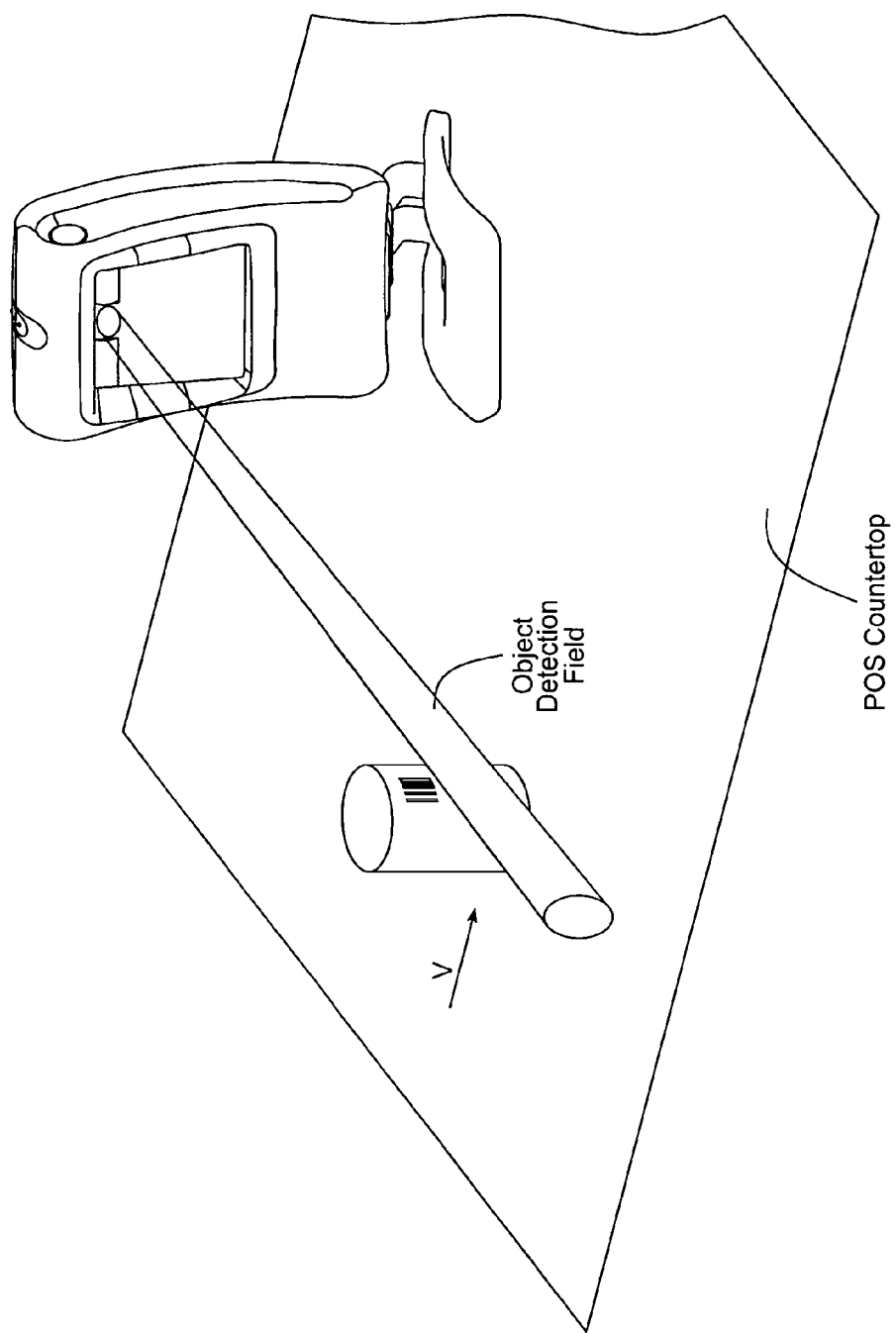
Figure 15C:
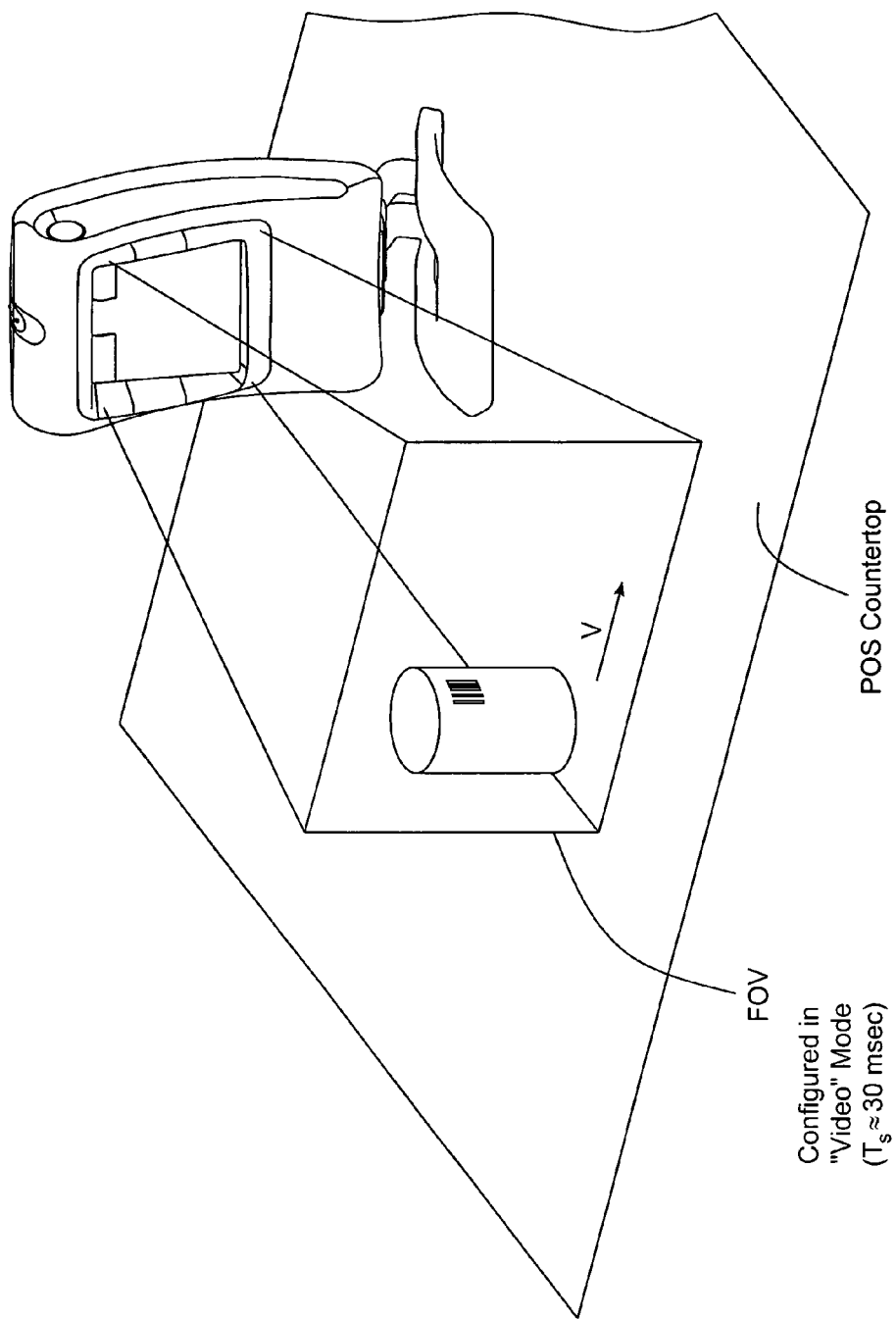
Figure 15D:
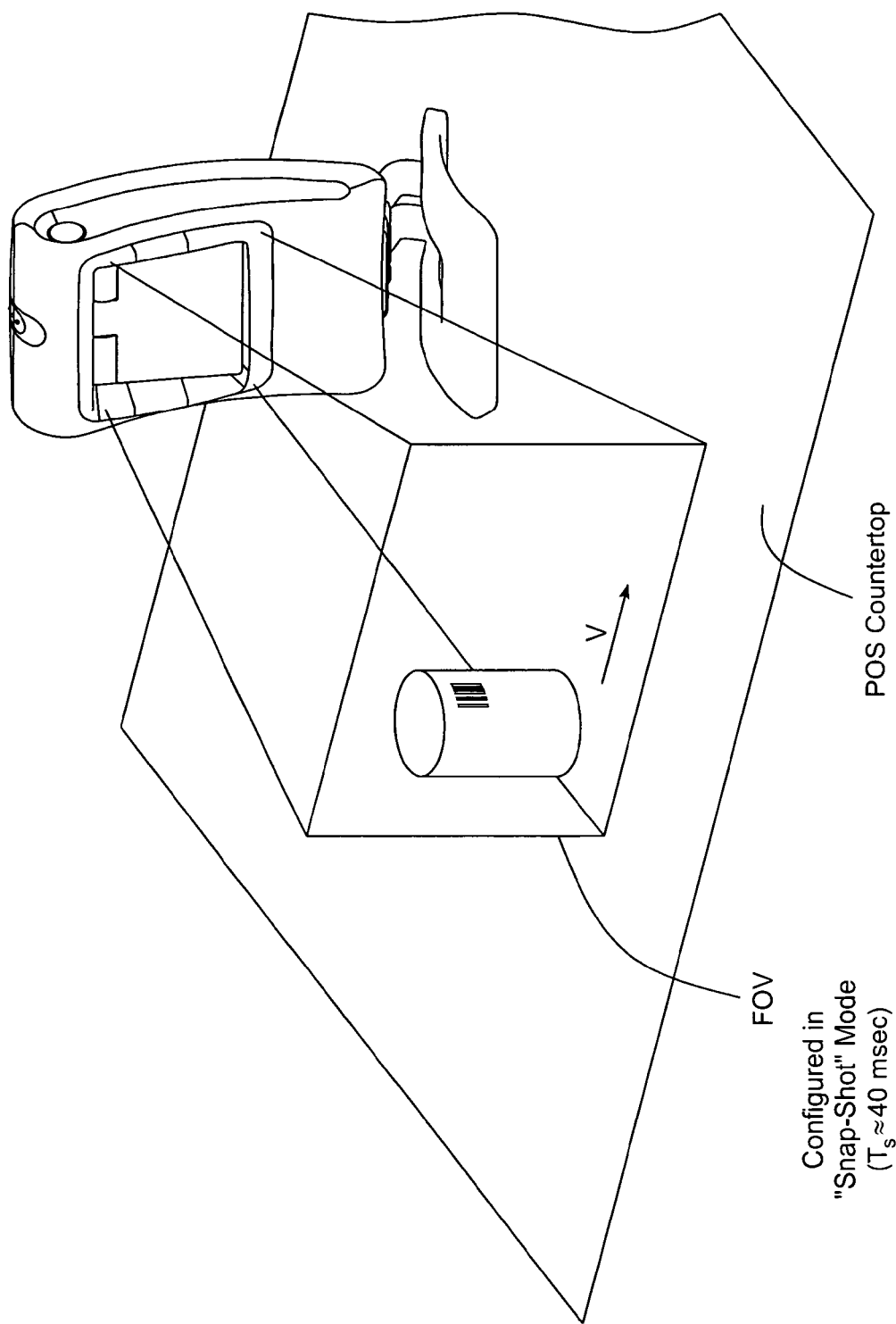
Figure 16A:
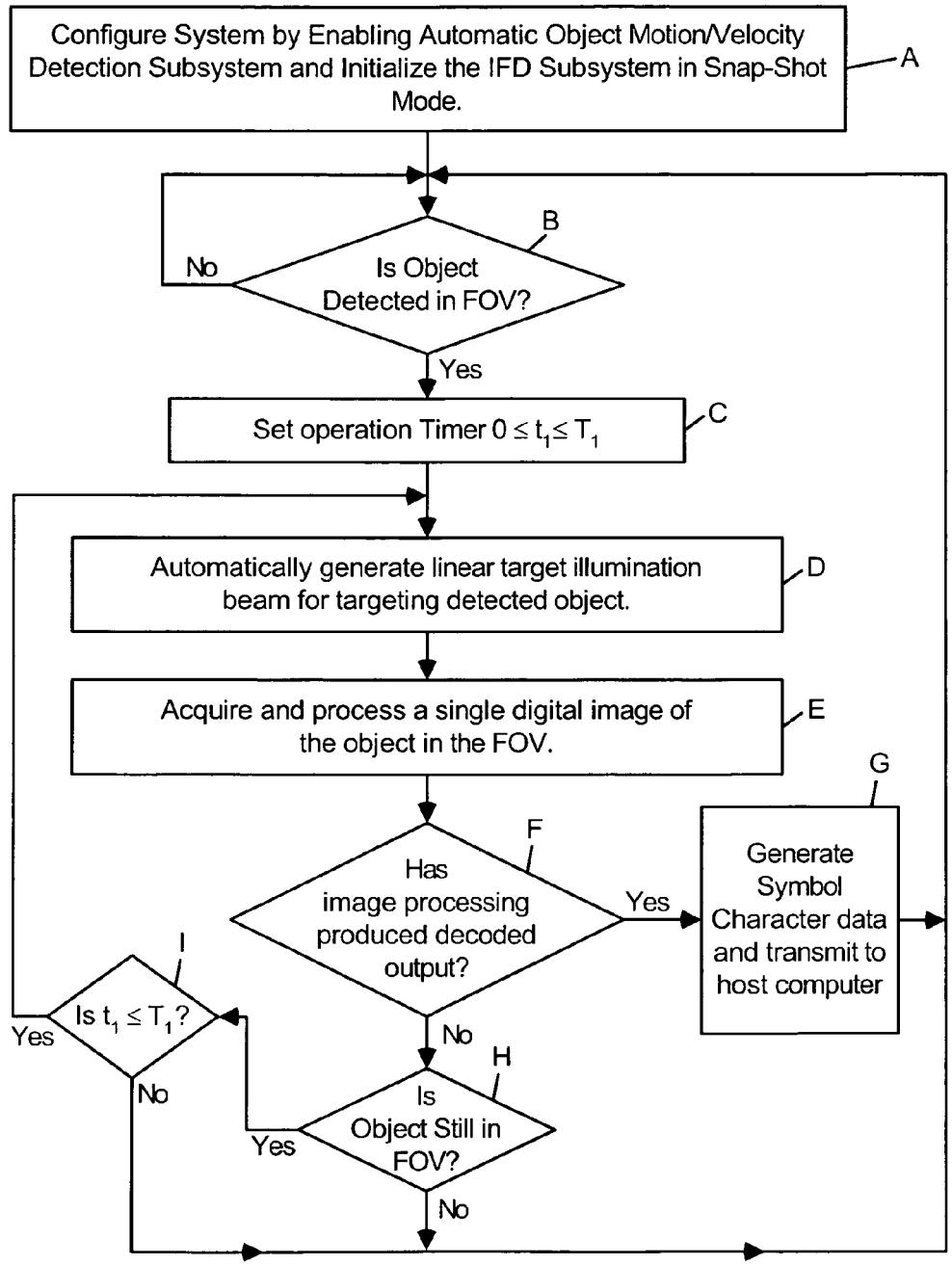
Figure 16B:
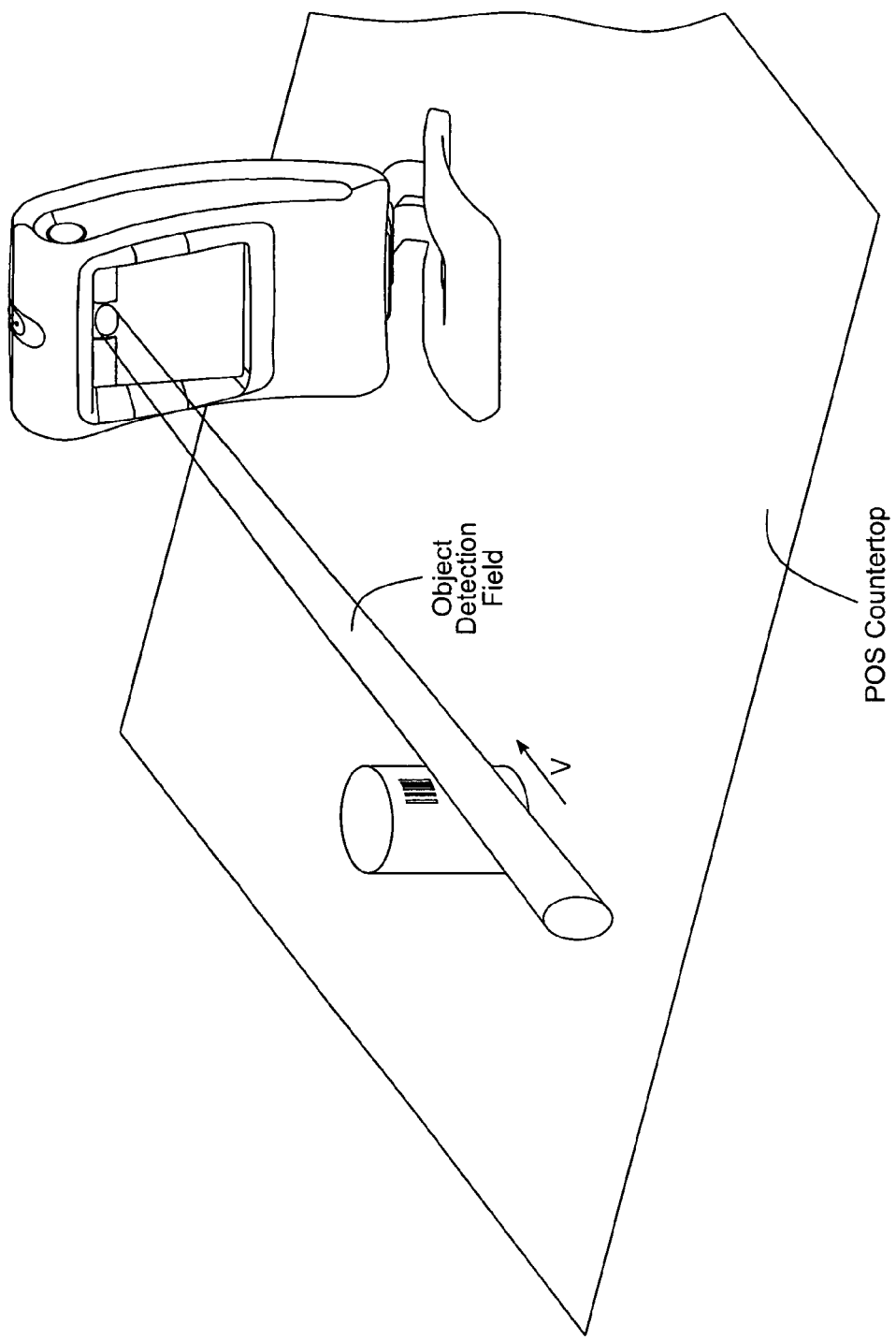
Figure 16C:
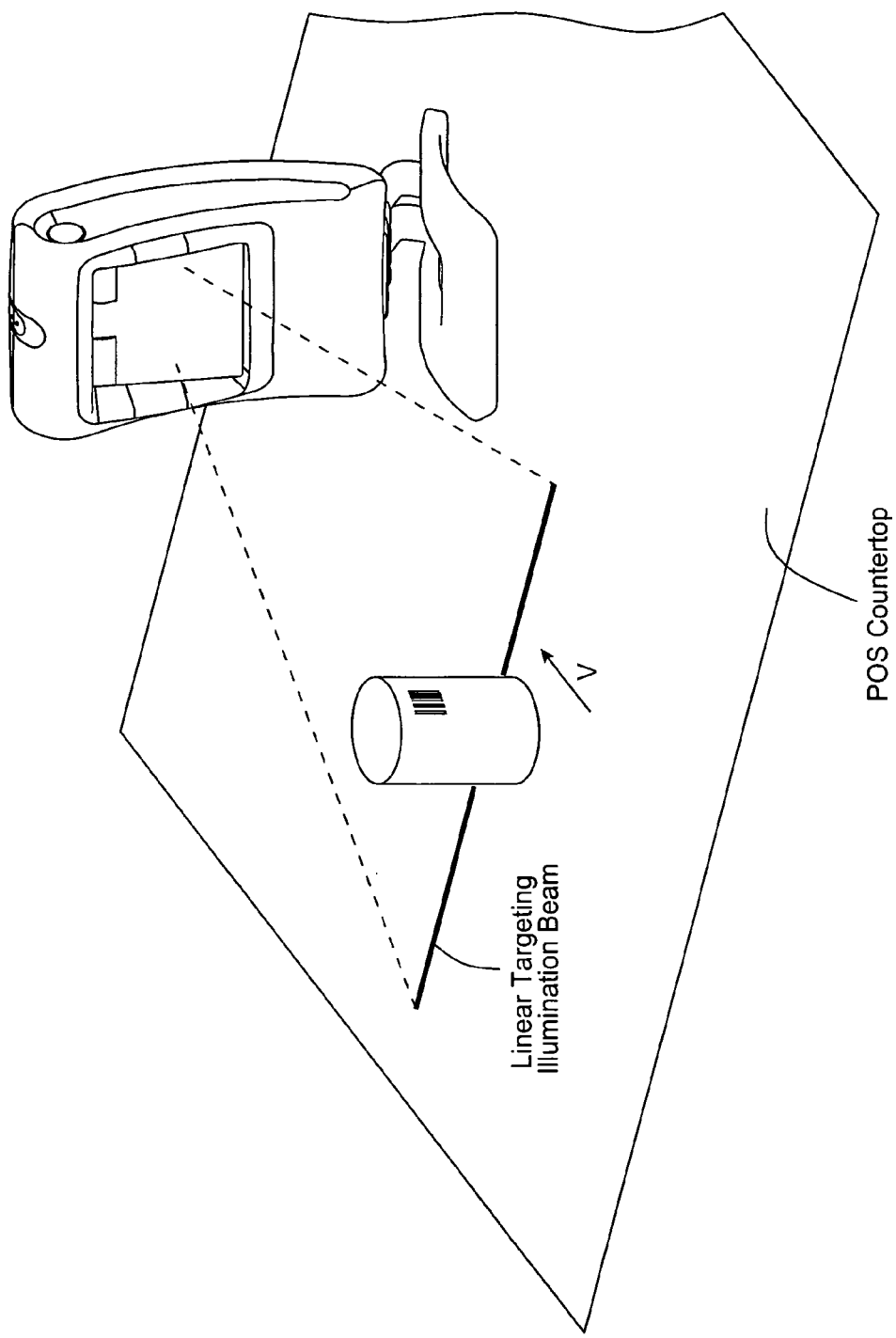
Figure 16D:
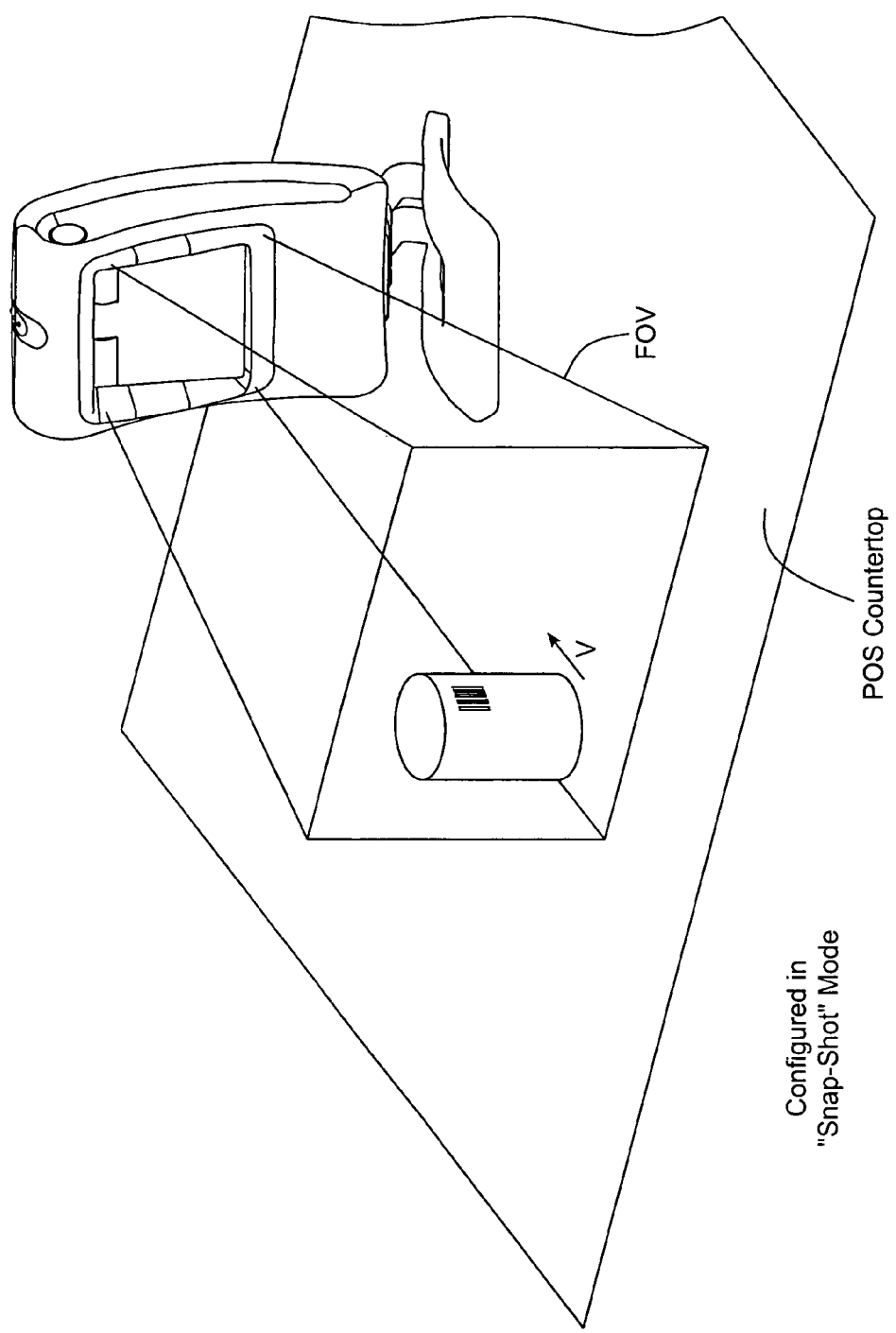
Figure 17B:
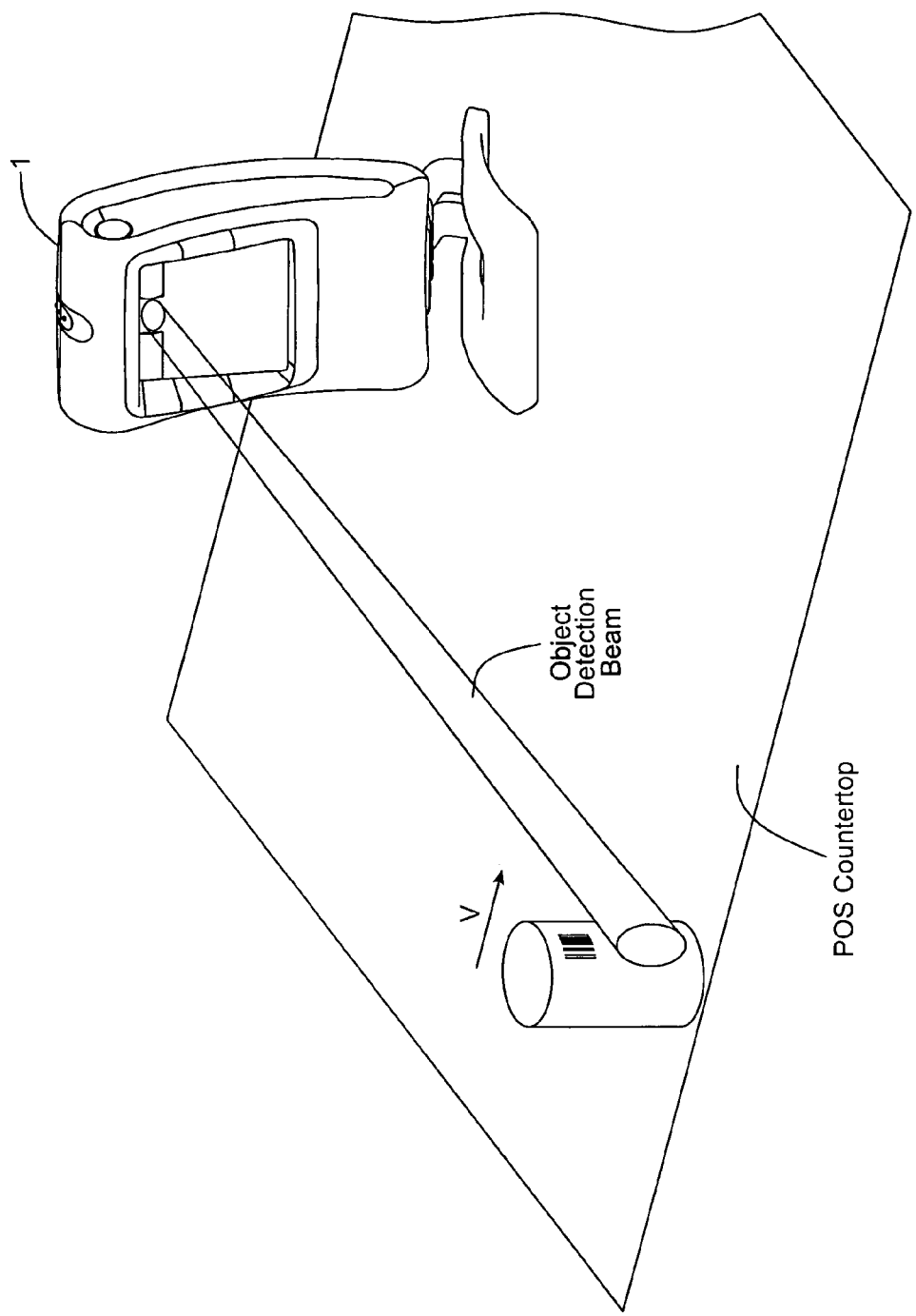
Figure 17C:
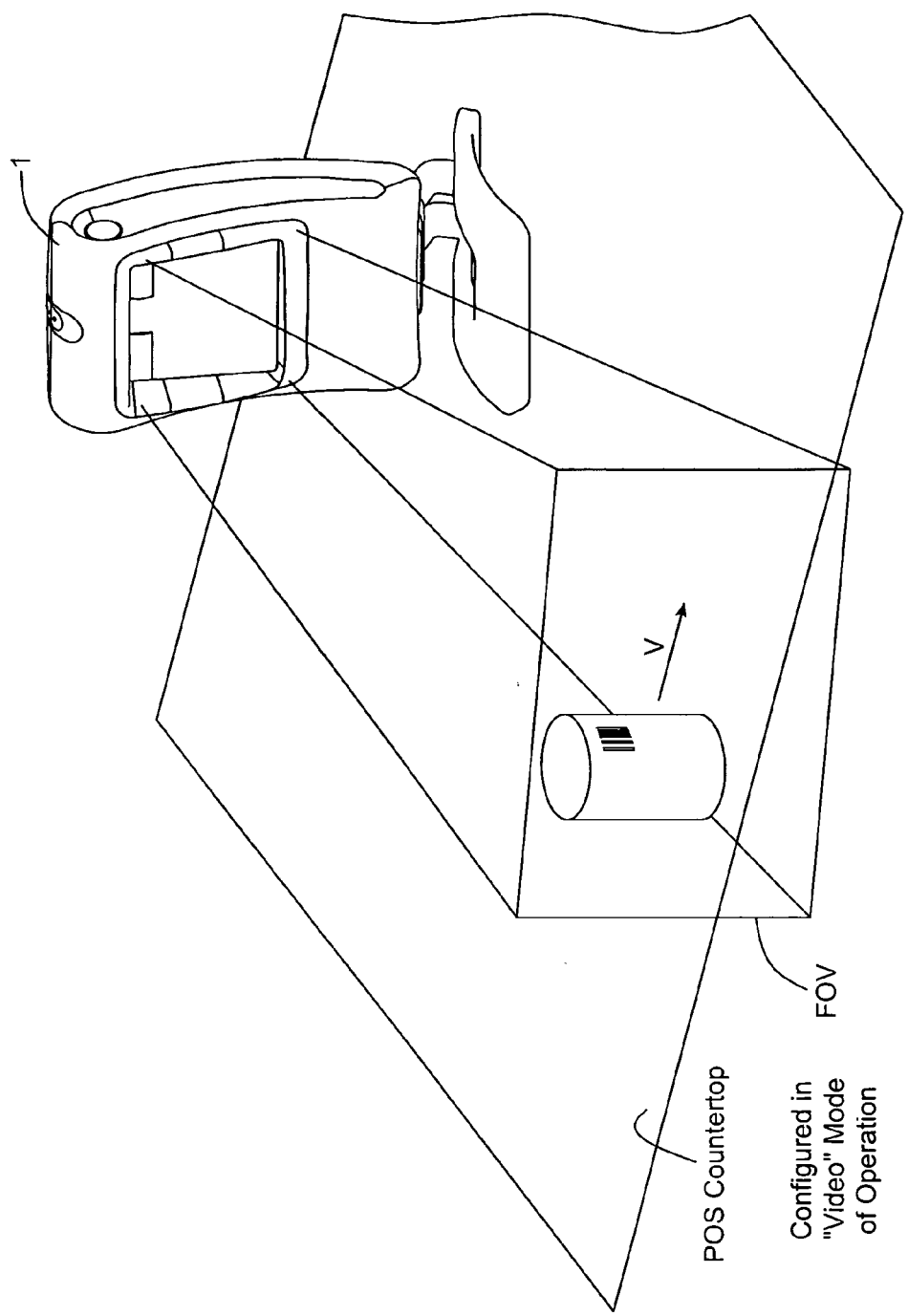
Figure 18A:
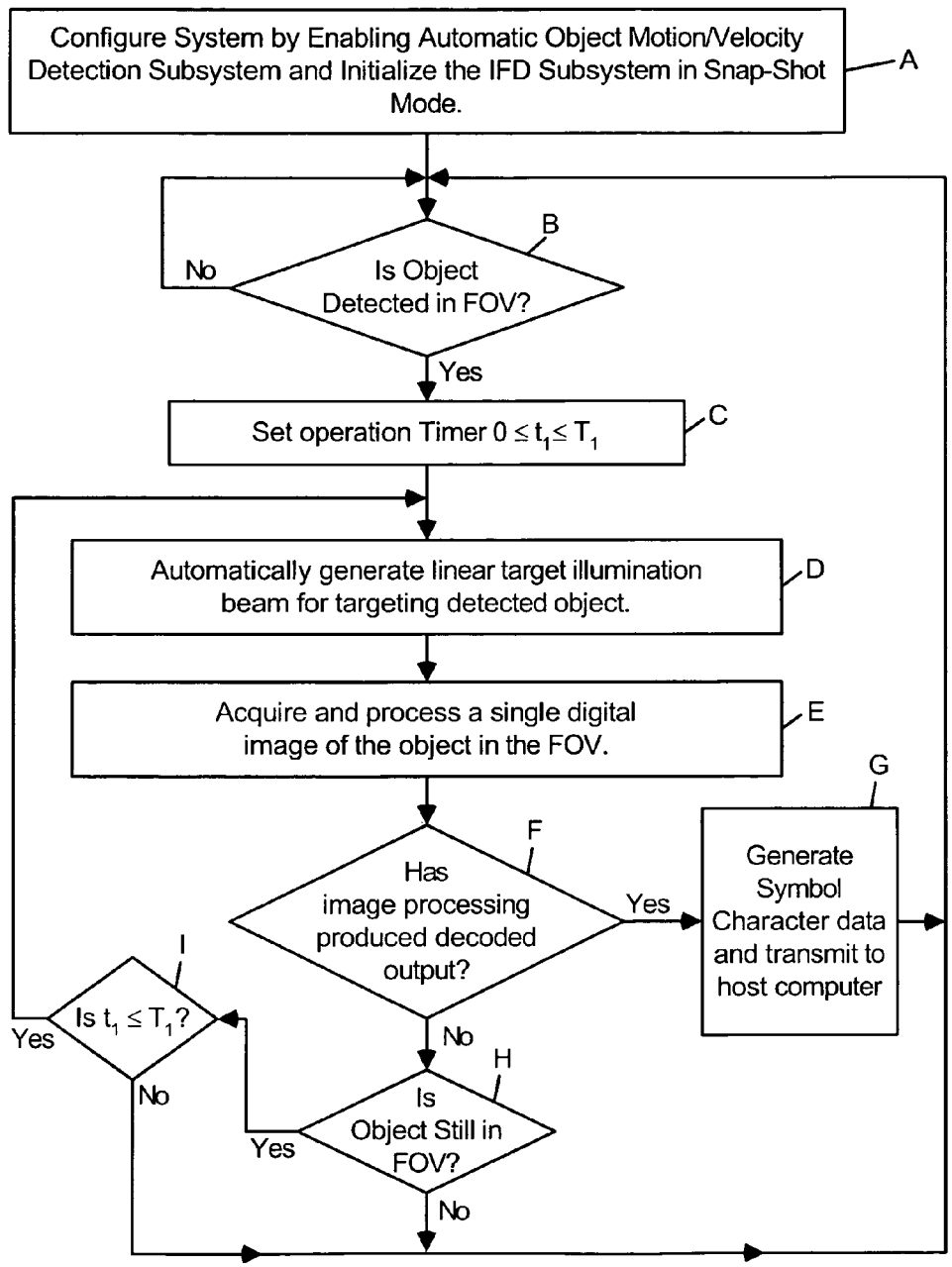
Figure 18B:
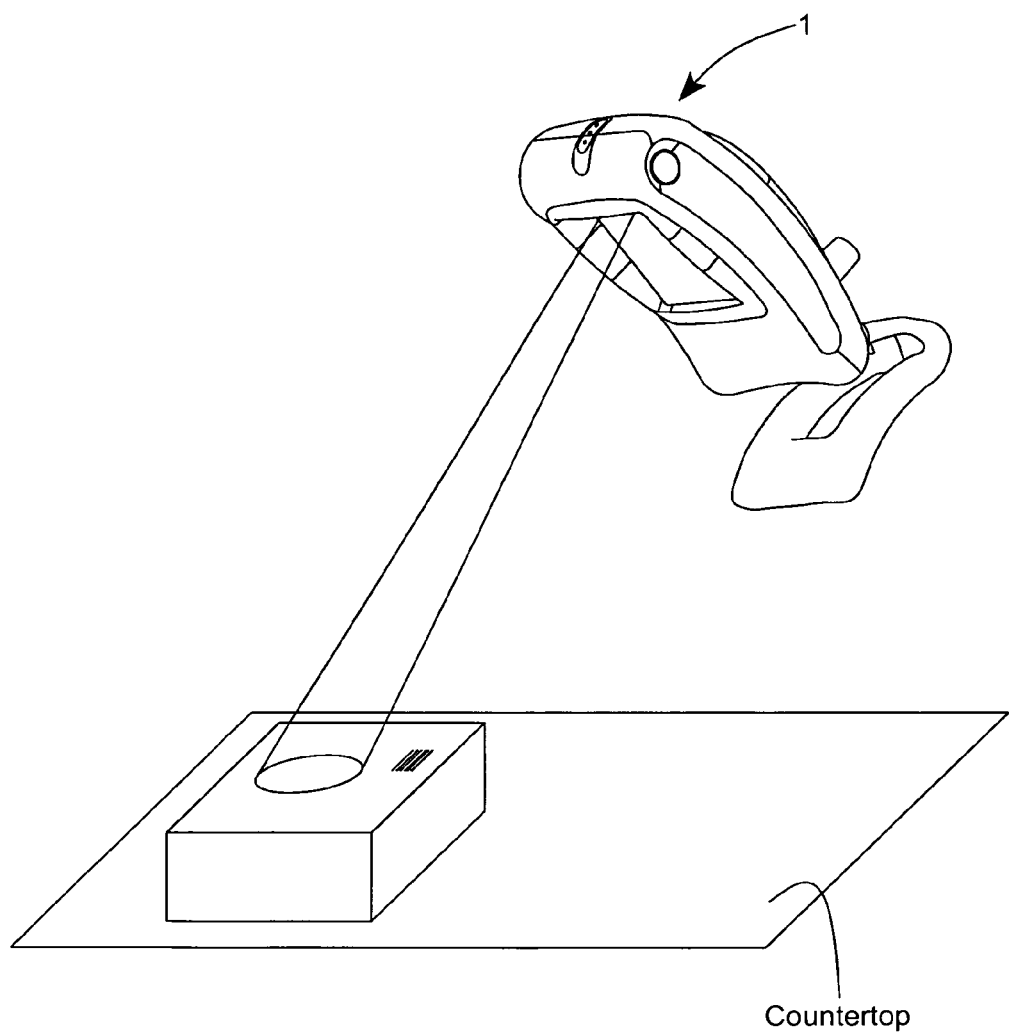
Figure 18C:
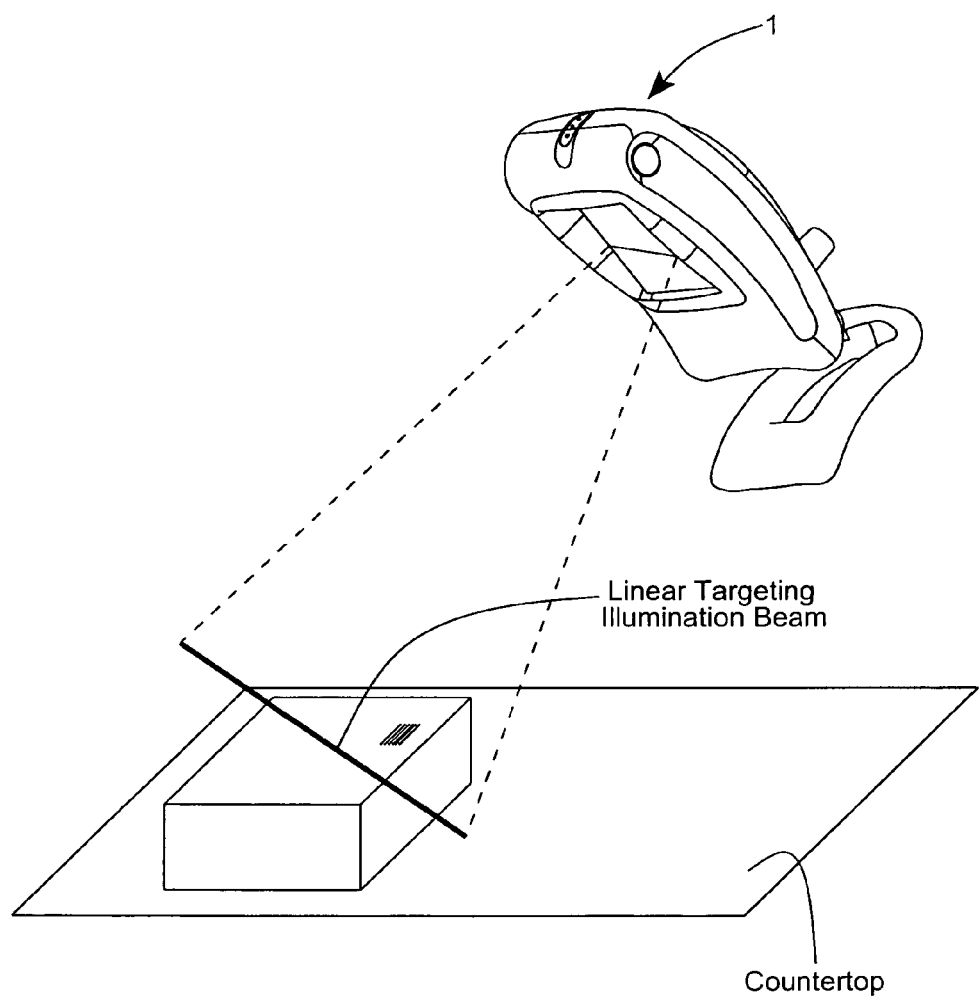
Figure 18D:
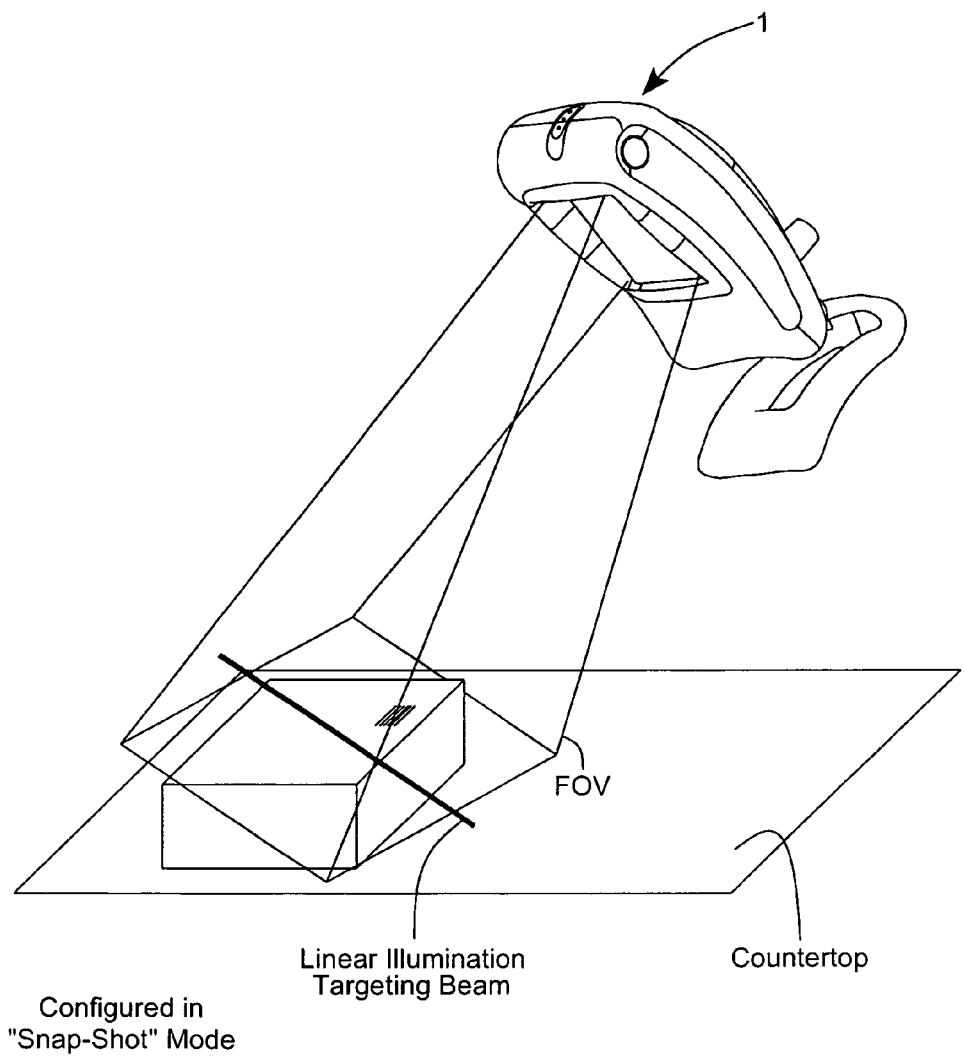
Figure 19B:
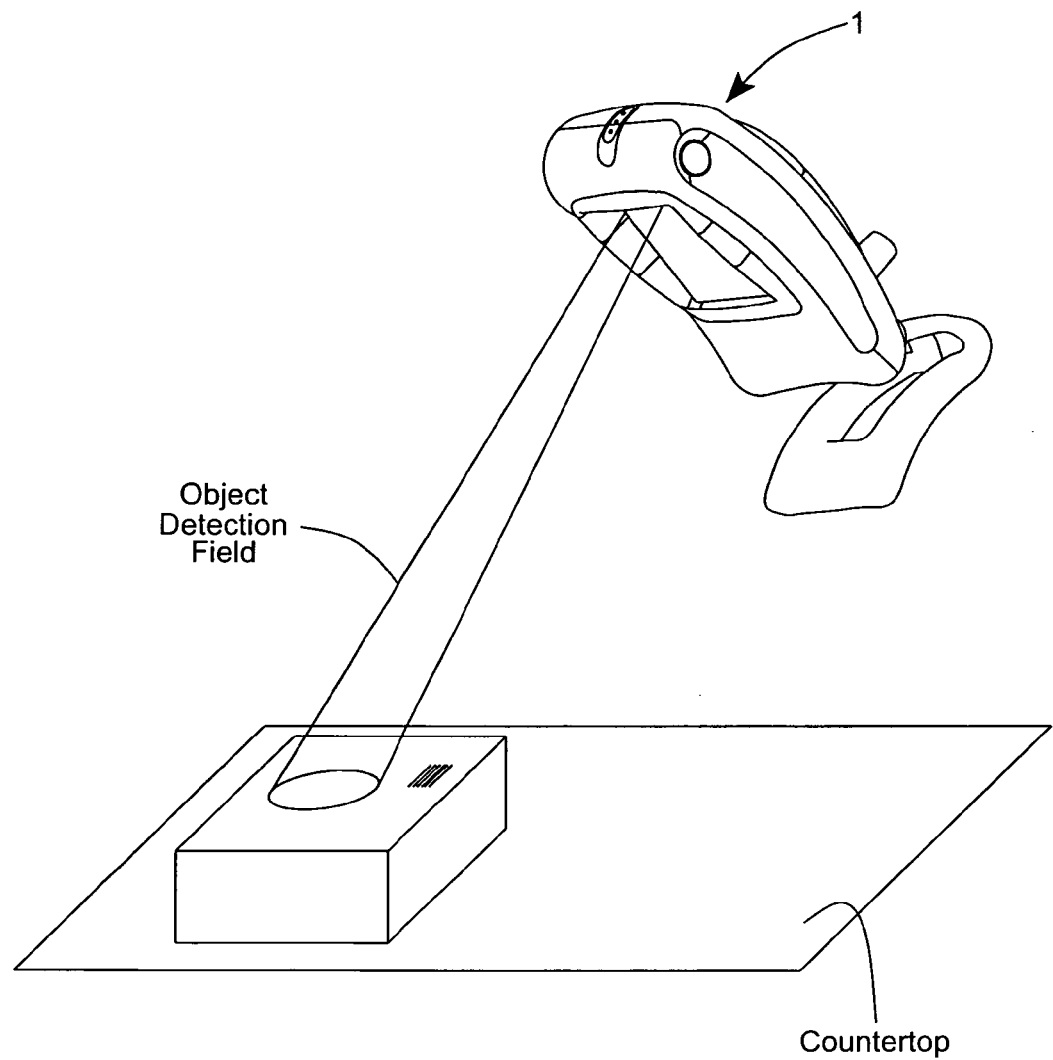
Figure 19C:
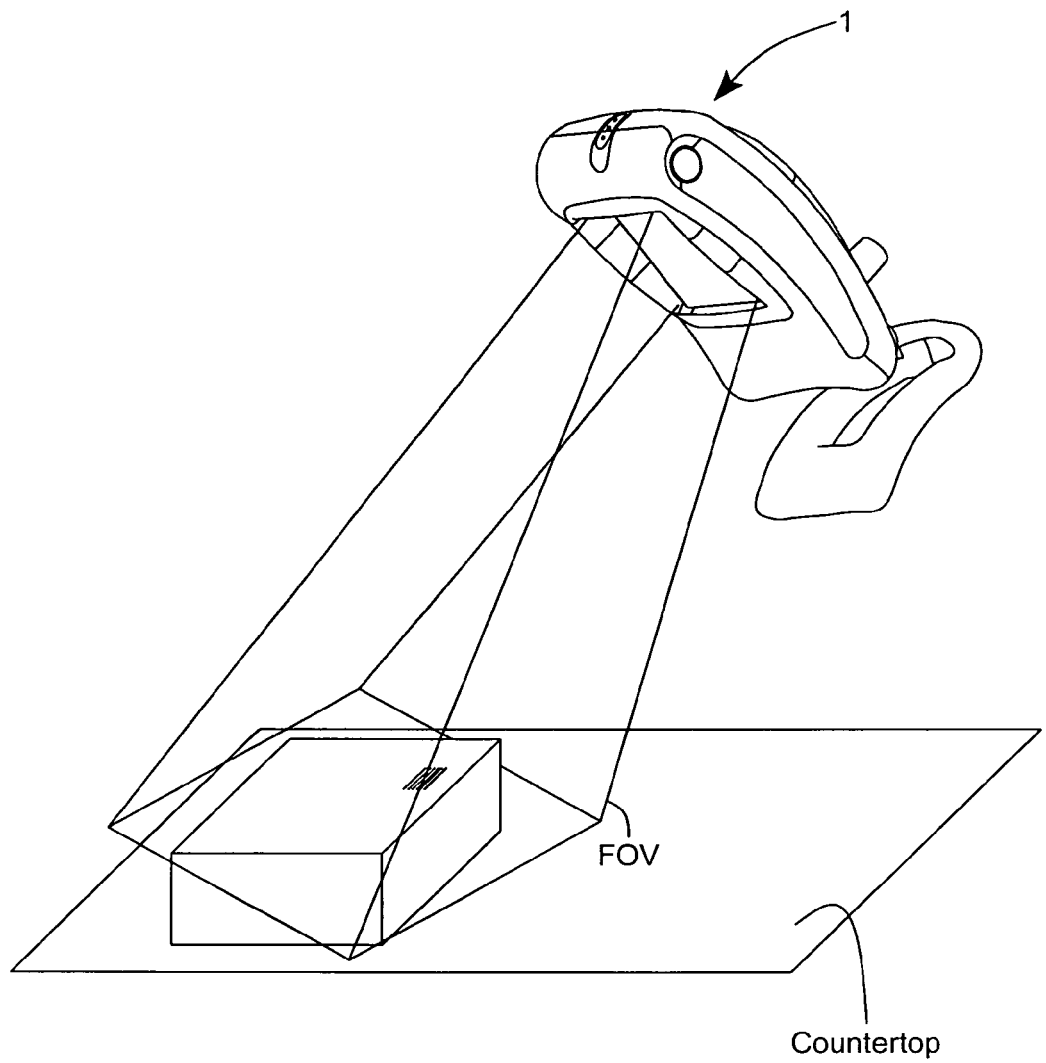
Figure 20A:
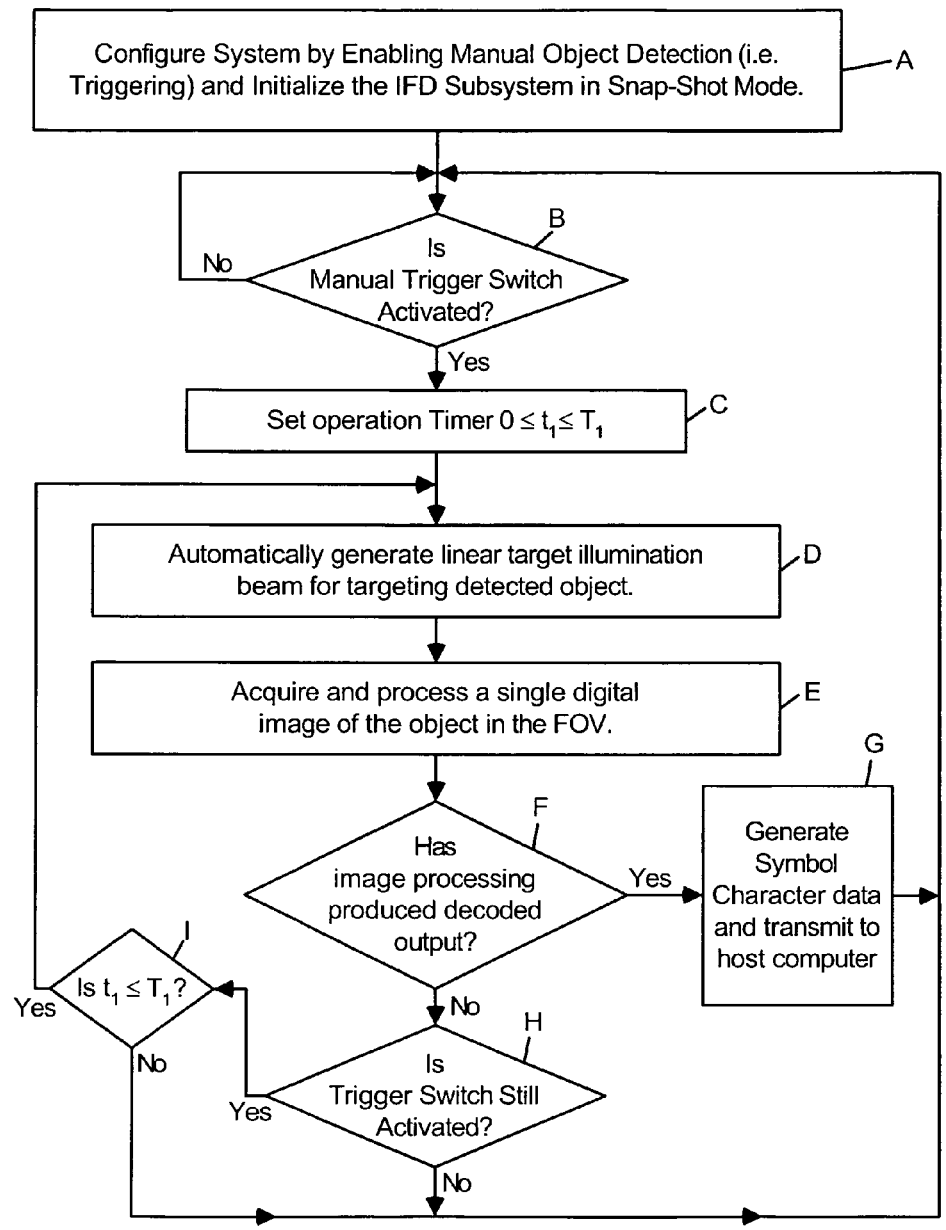
Figure 20B:
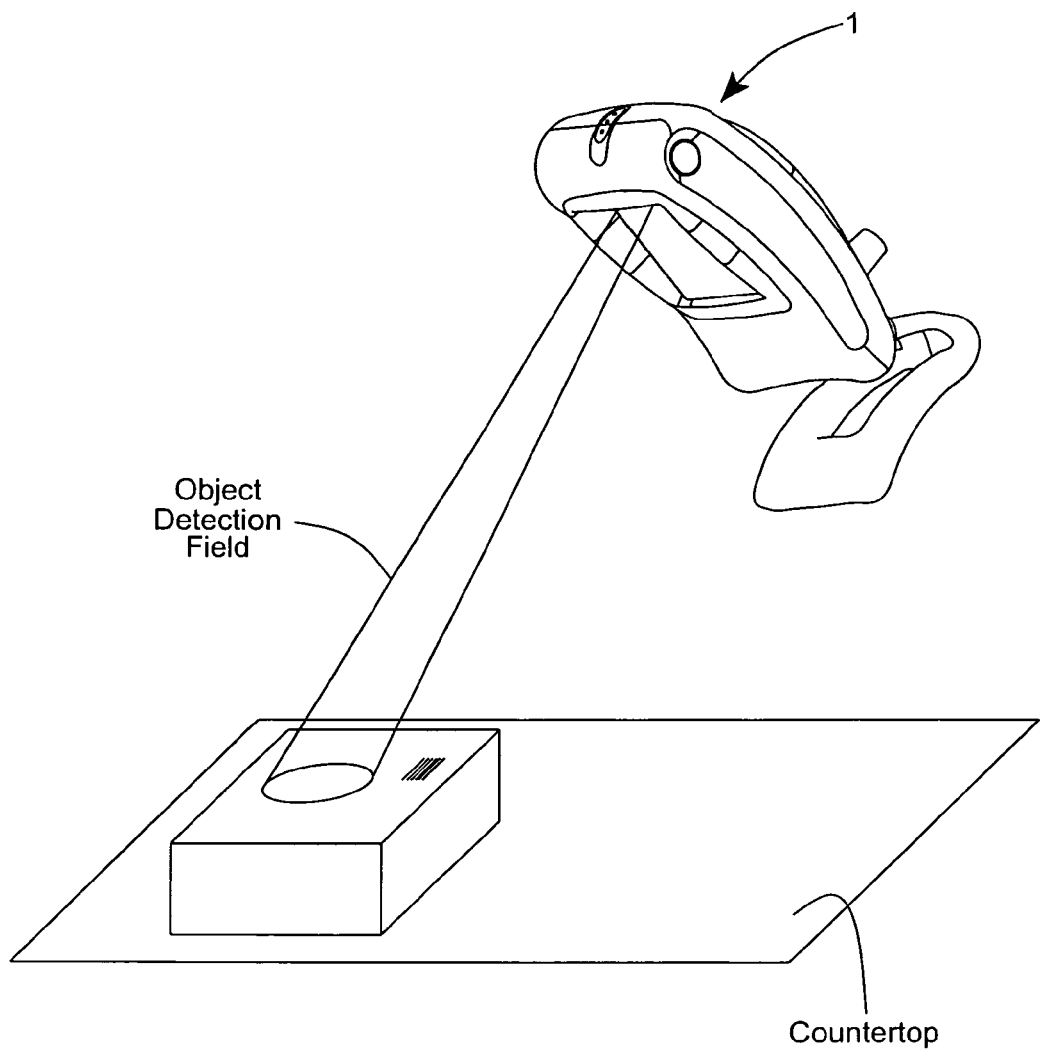
Figure 20C:
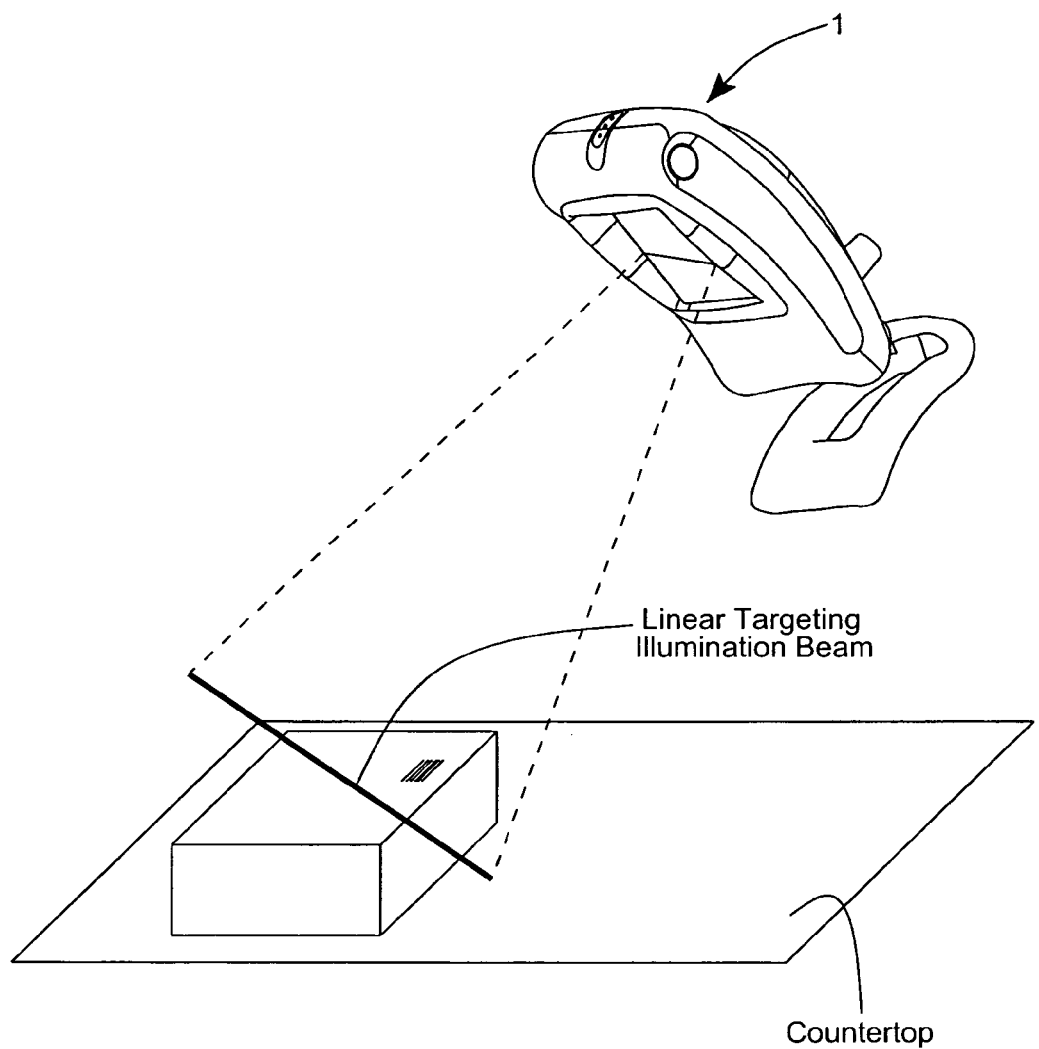
Figure 20D:
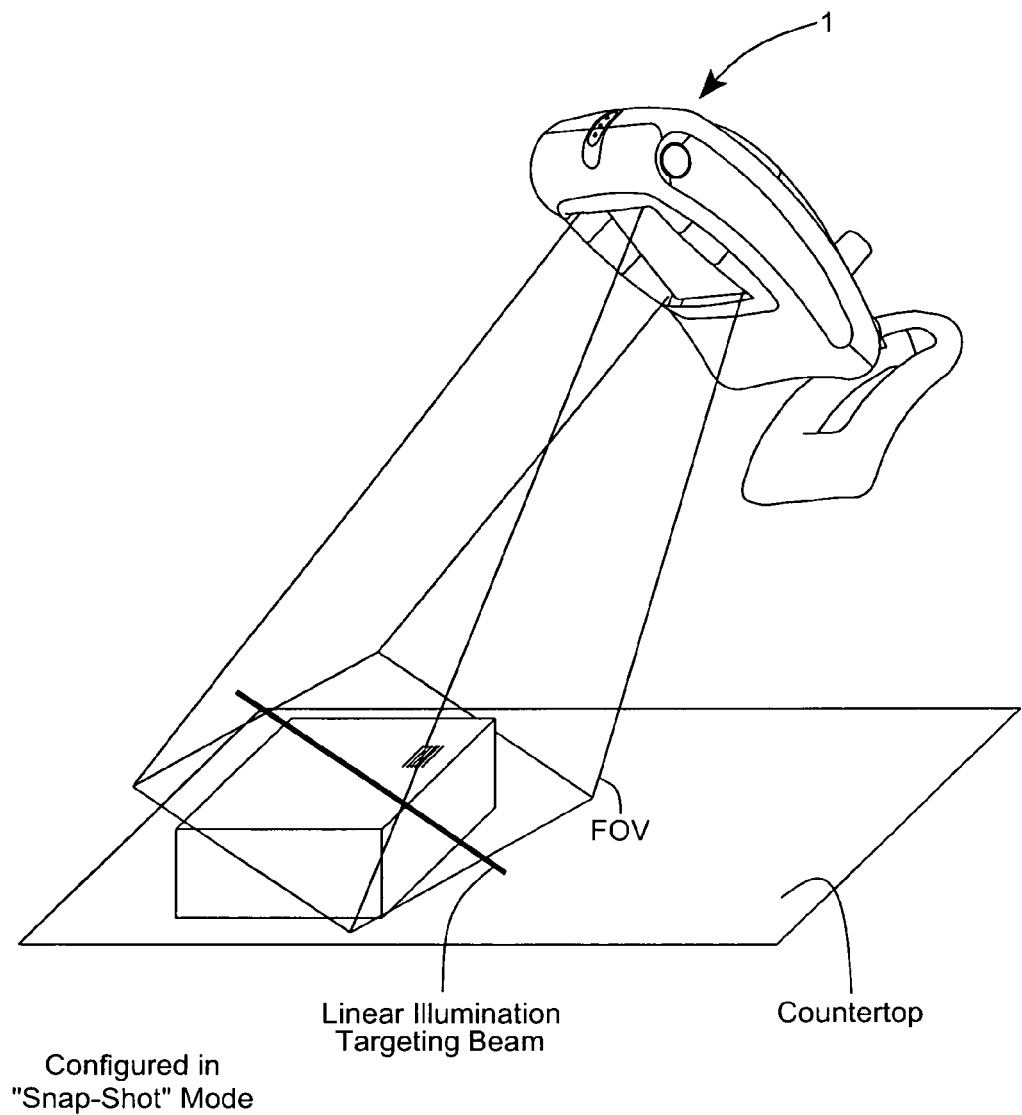
Figure 21C:
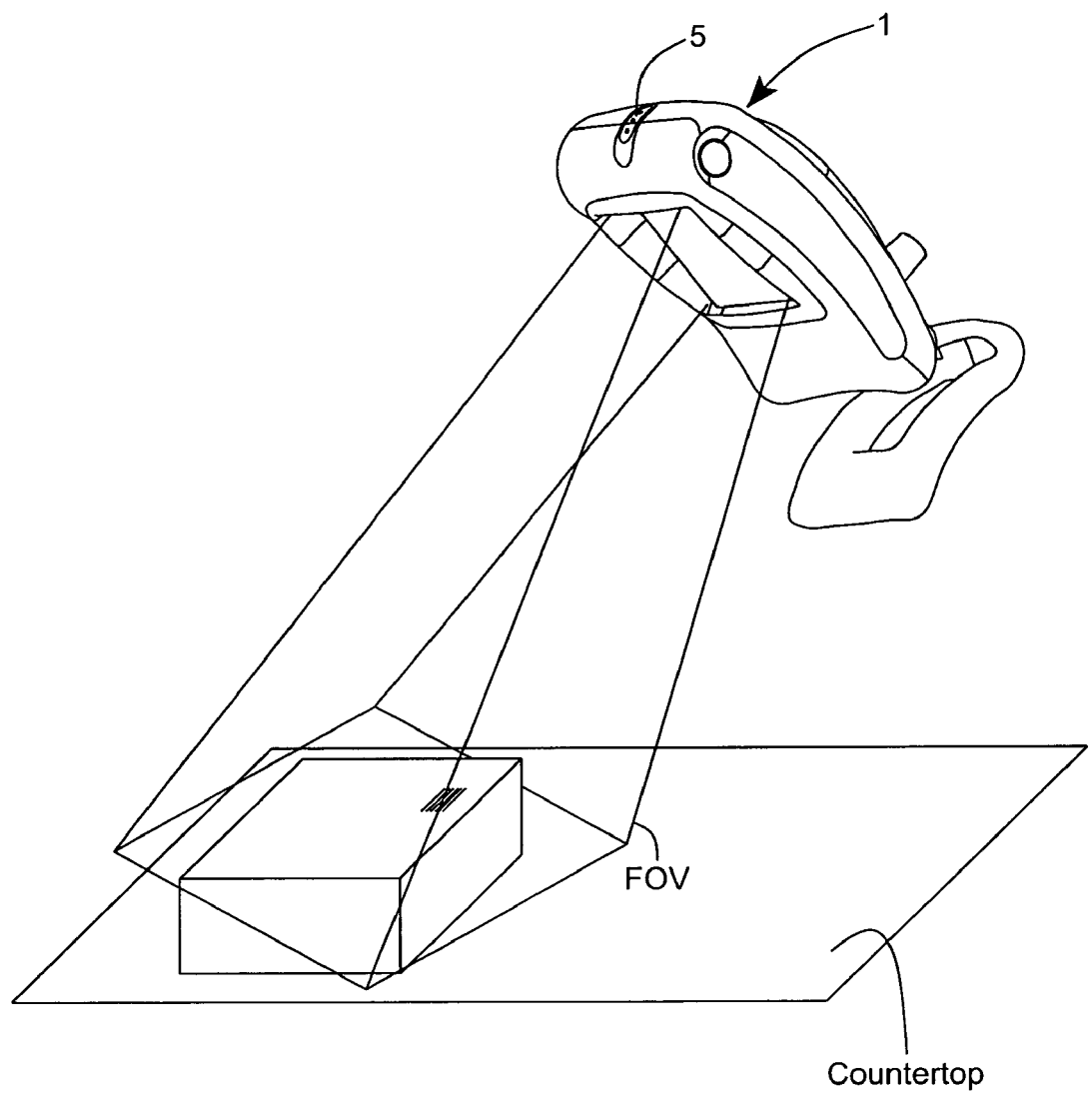
Figure 22A:
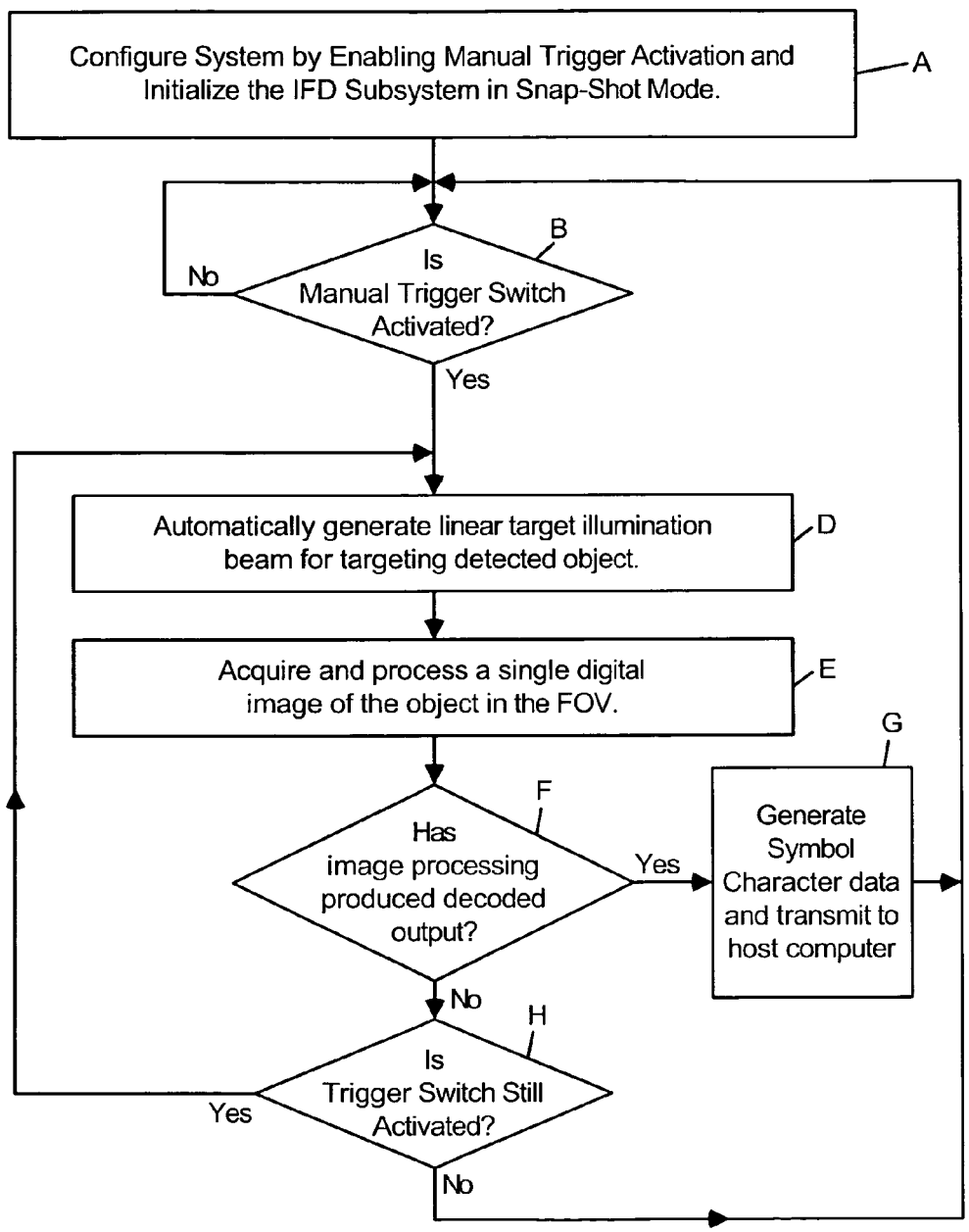
Figure 22C:
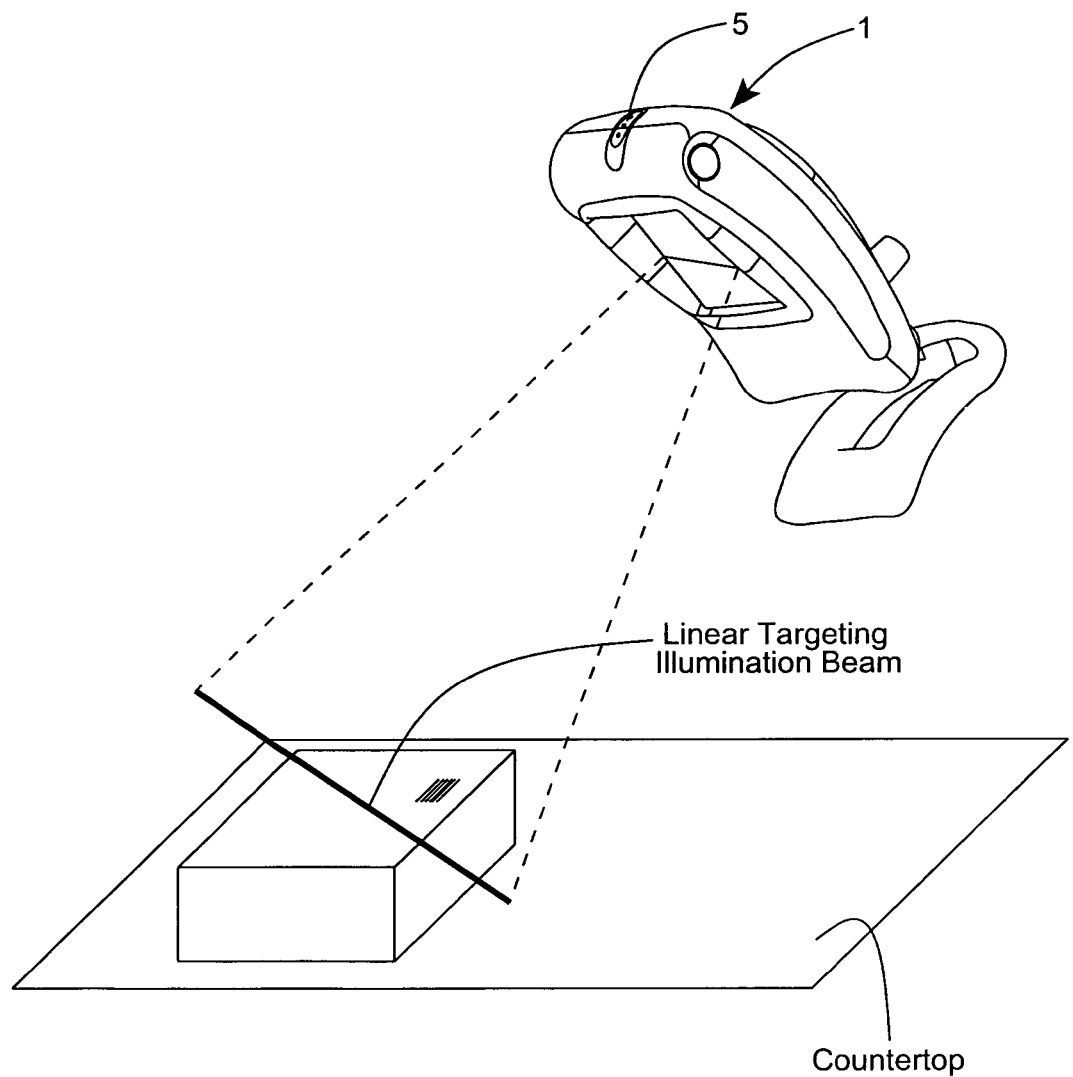
Figure 22D:
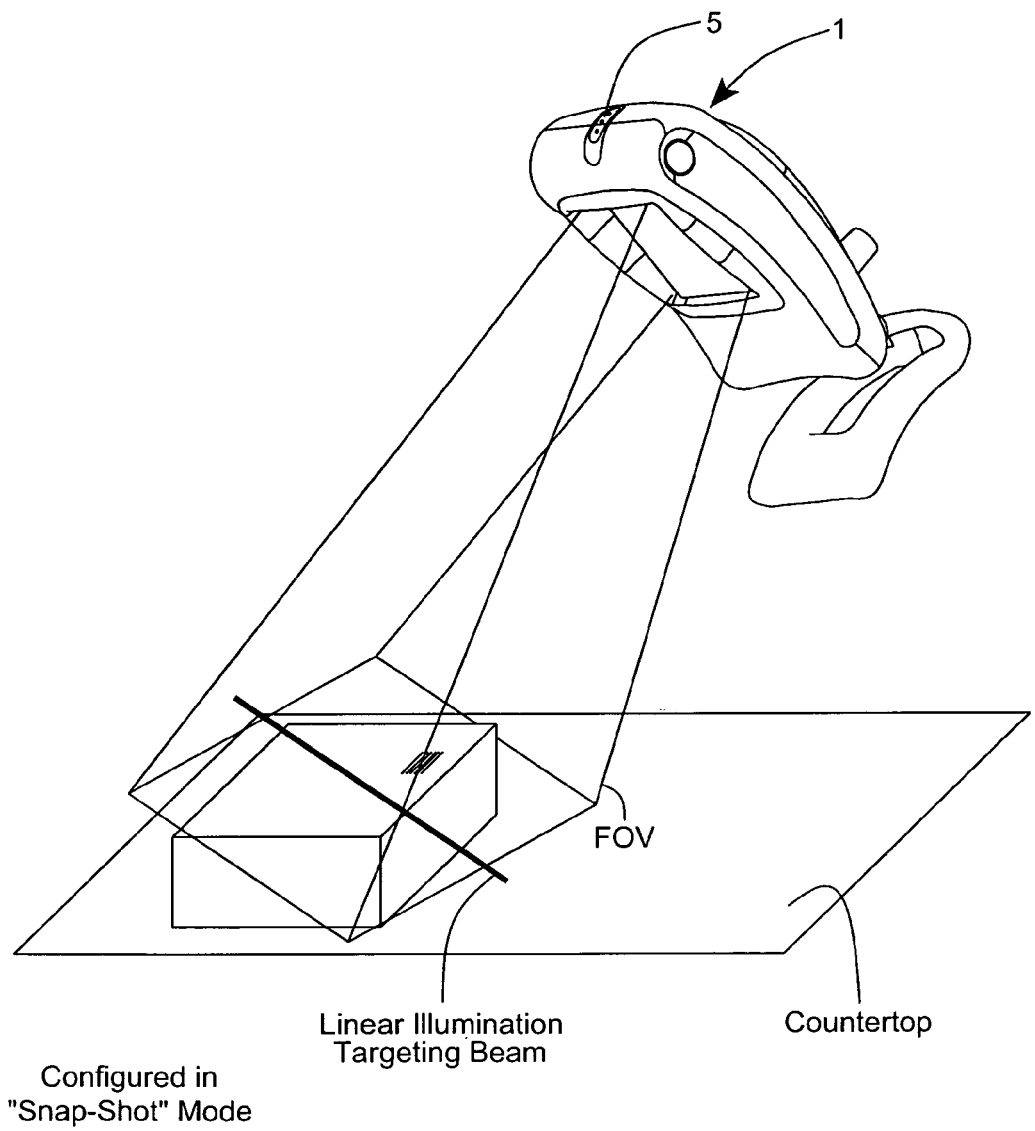
Figure 23A:
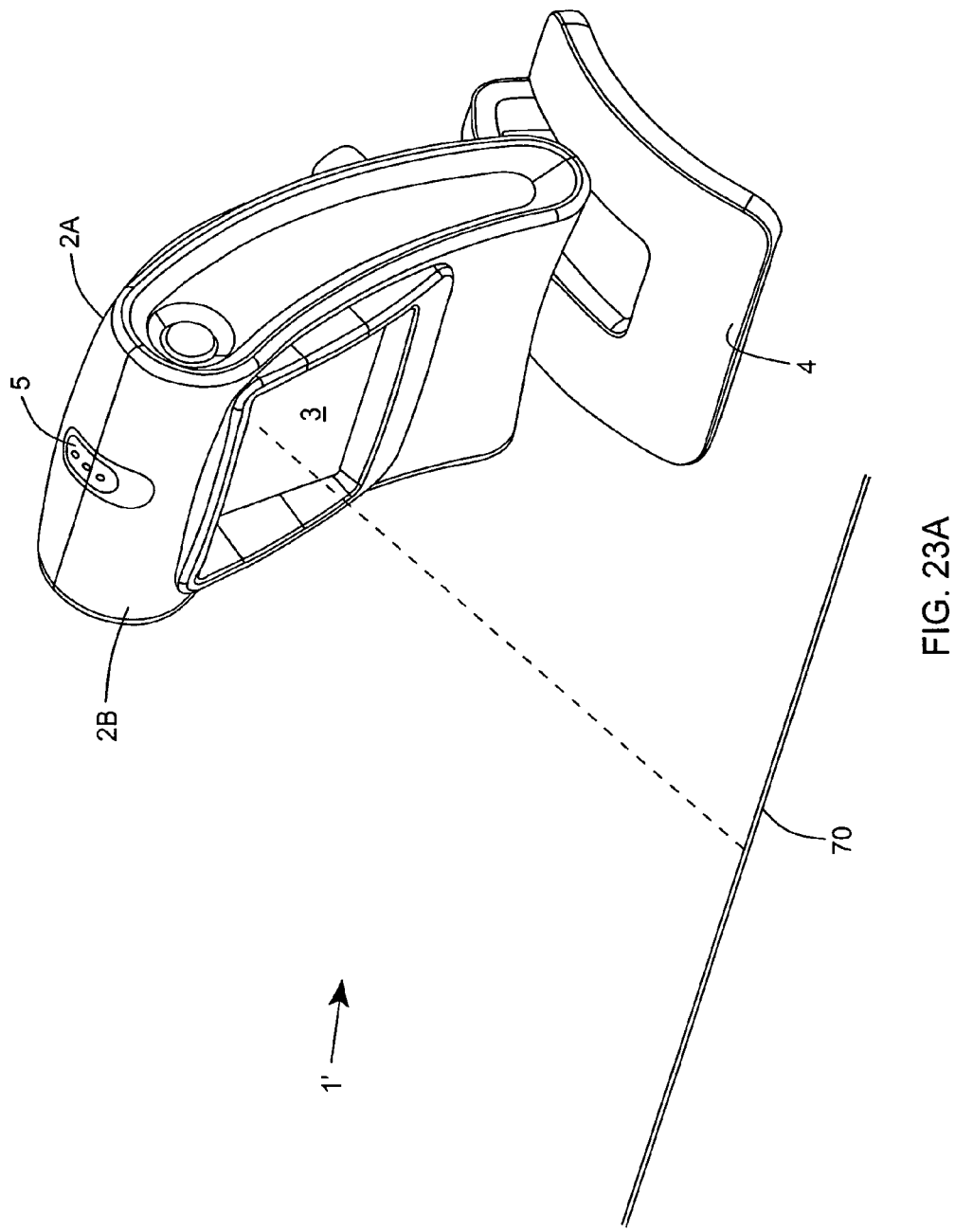
Figure 23B:
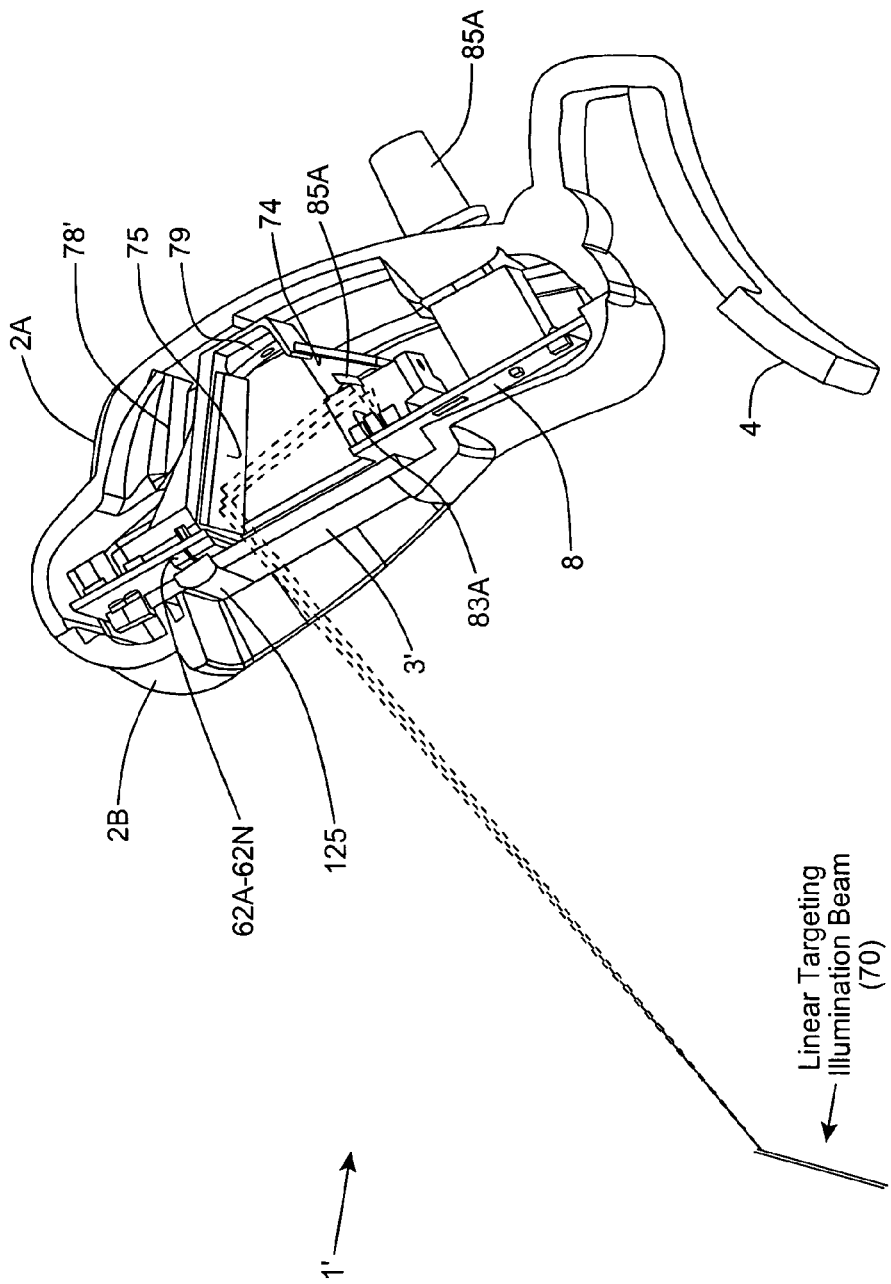
Figure 23C:
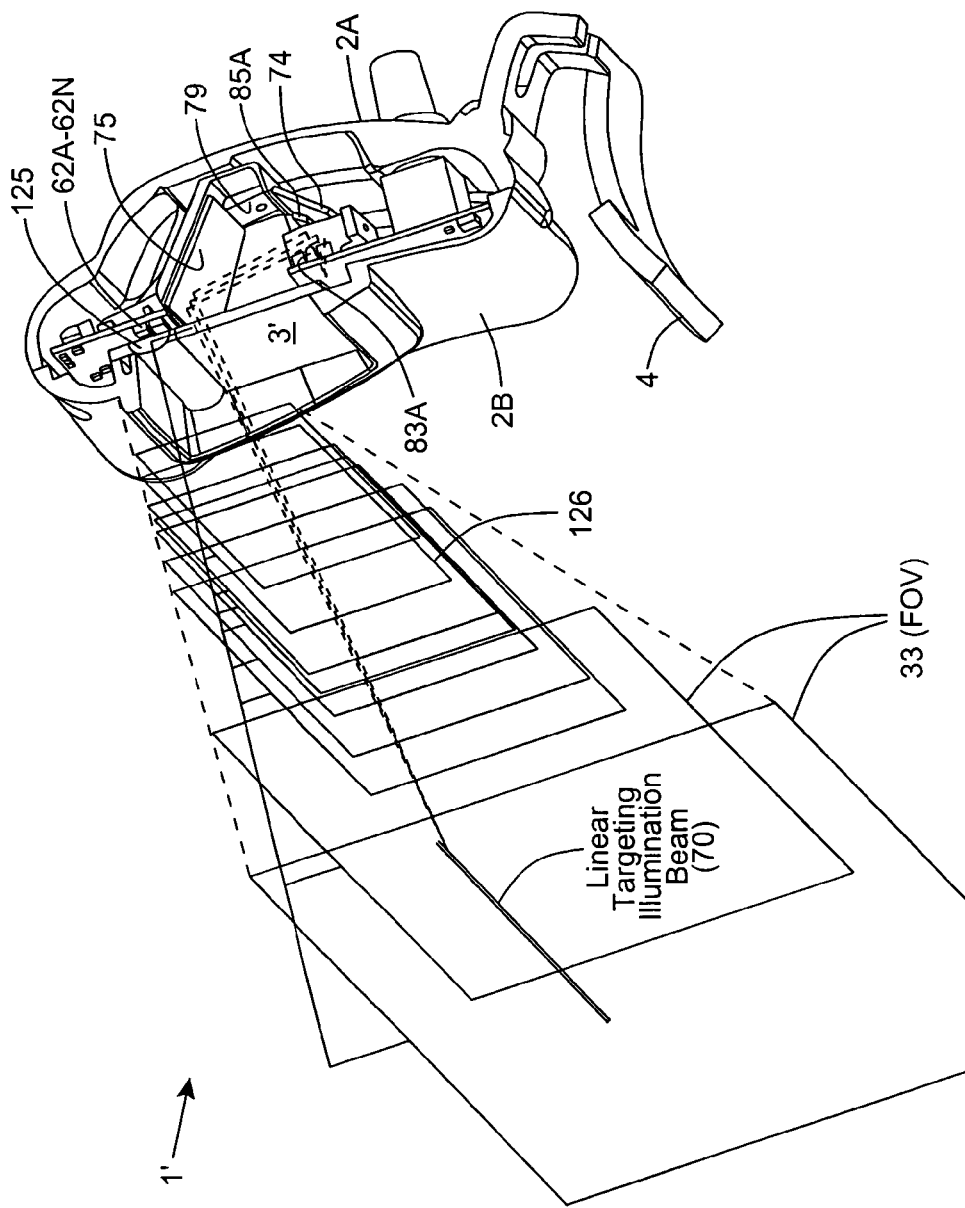
Figure 23D:
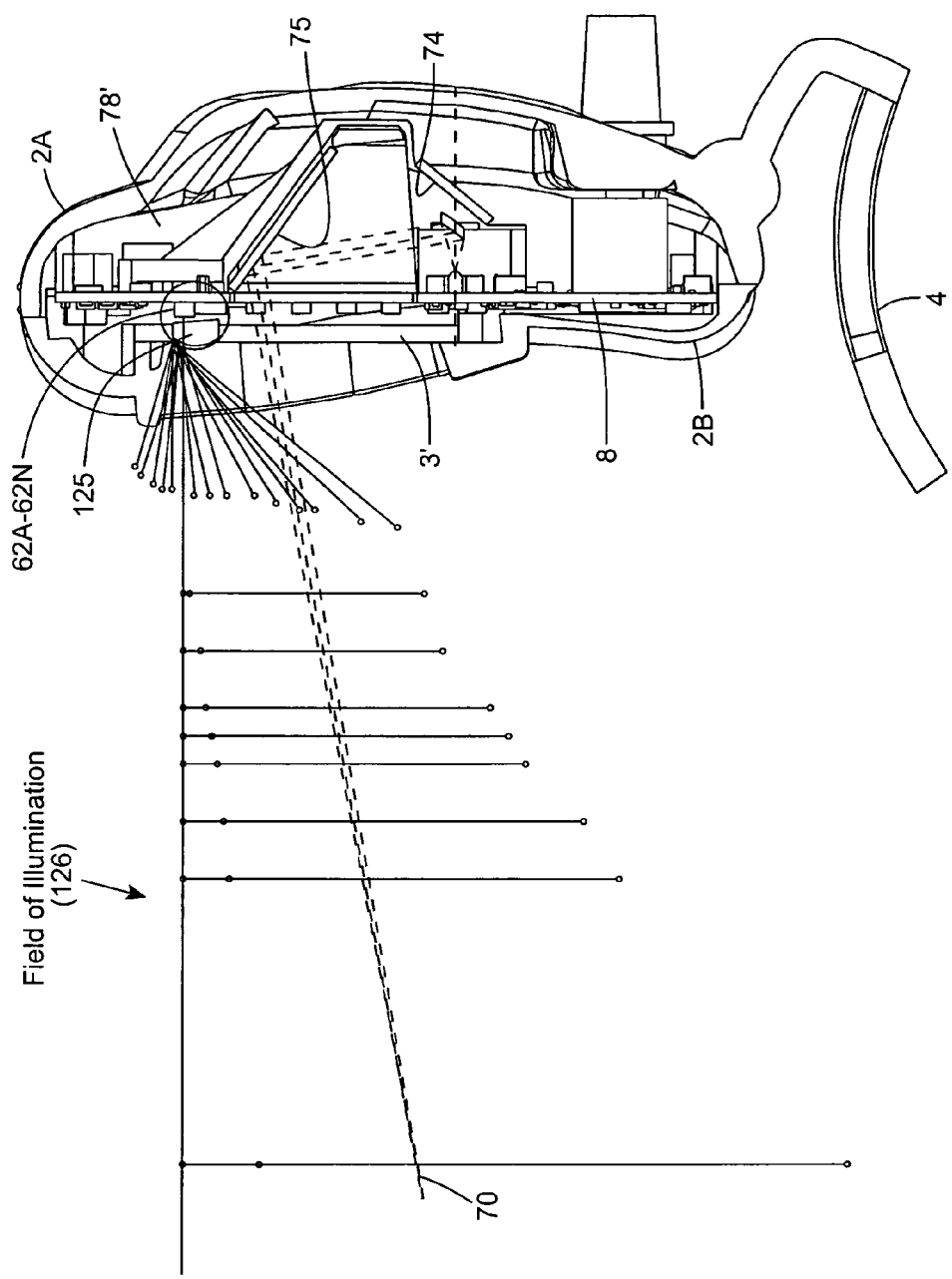
Figure 23E:
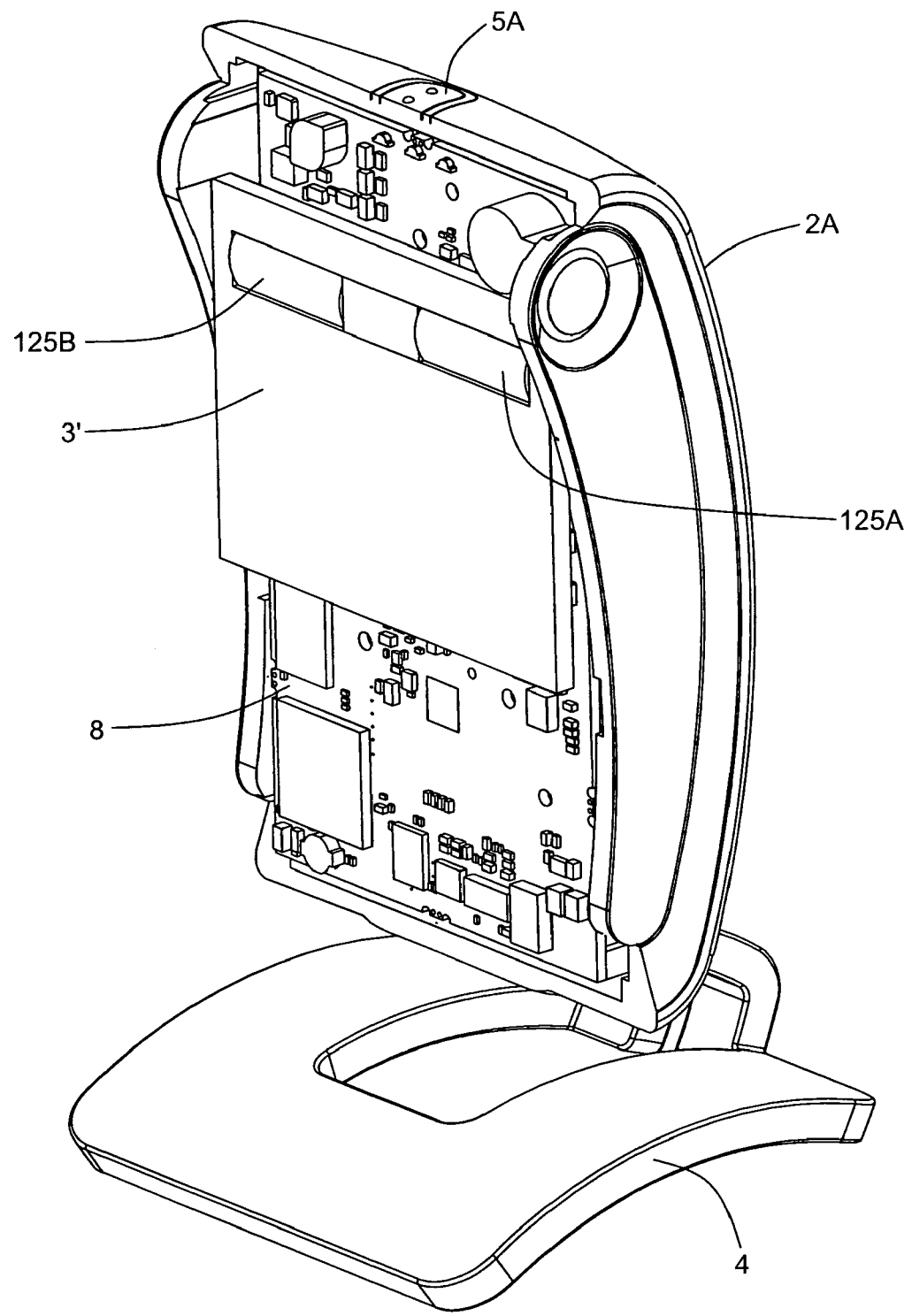
Figure 23F:
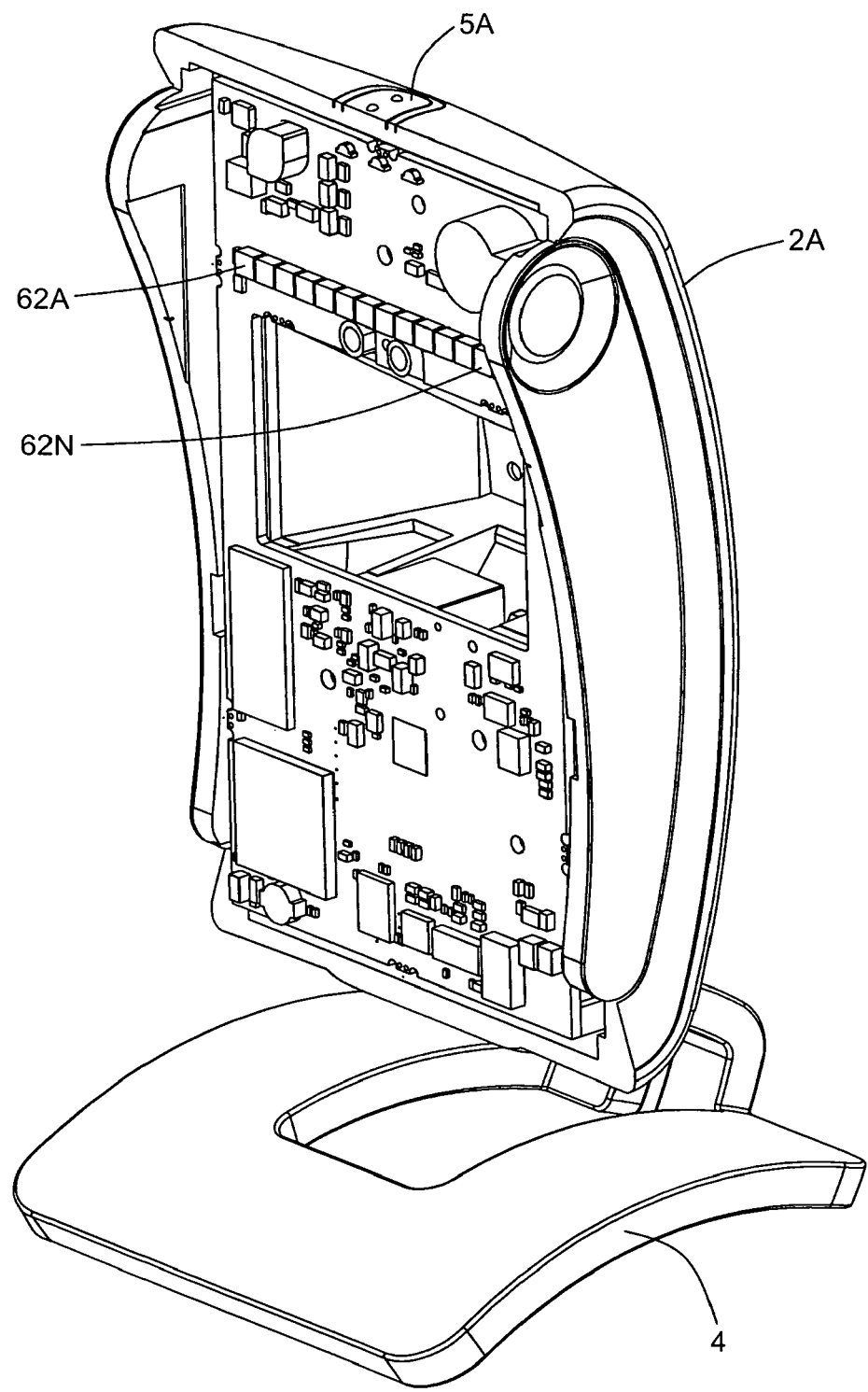
Figure 23G:
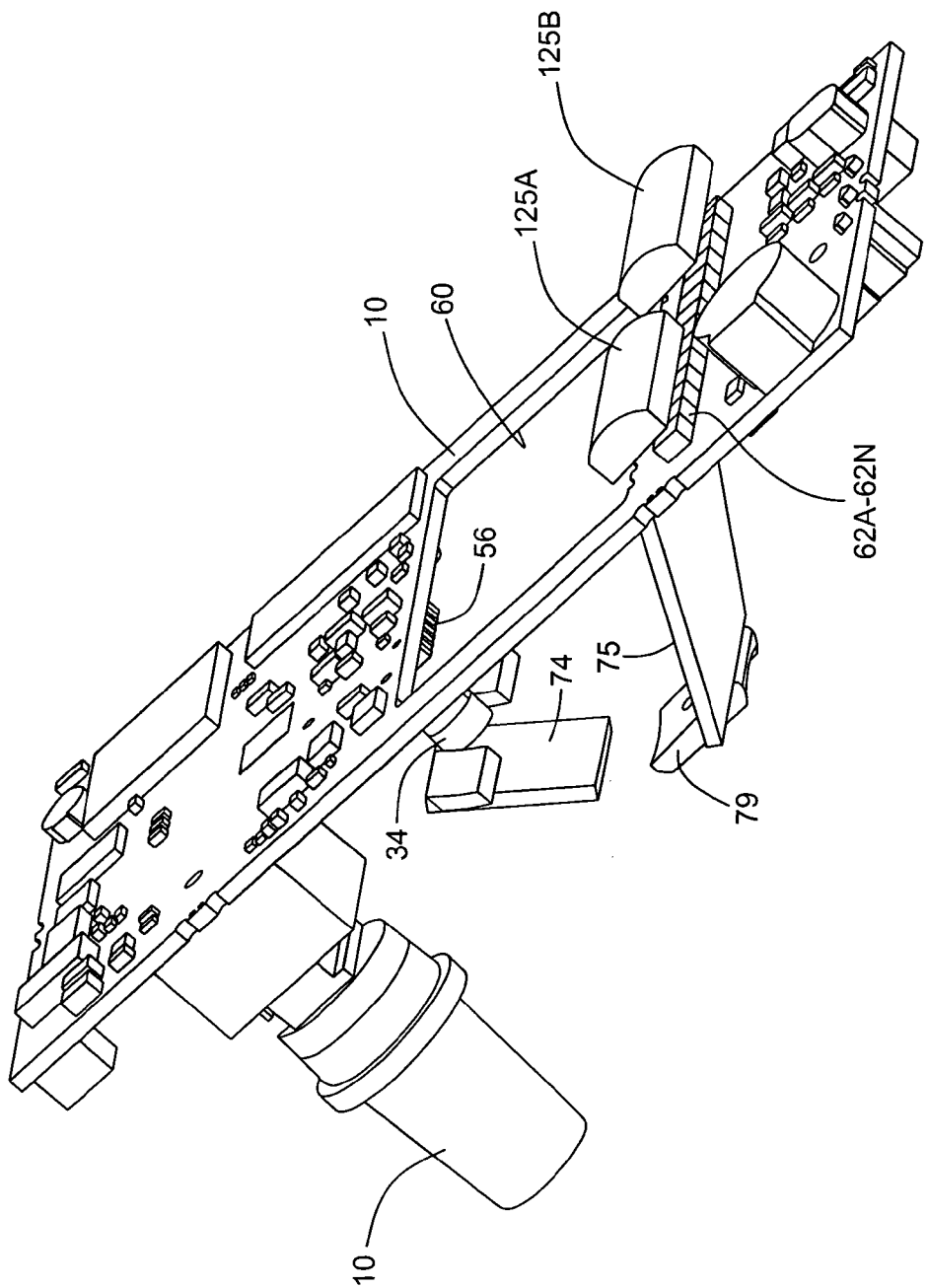
Figure 24:
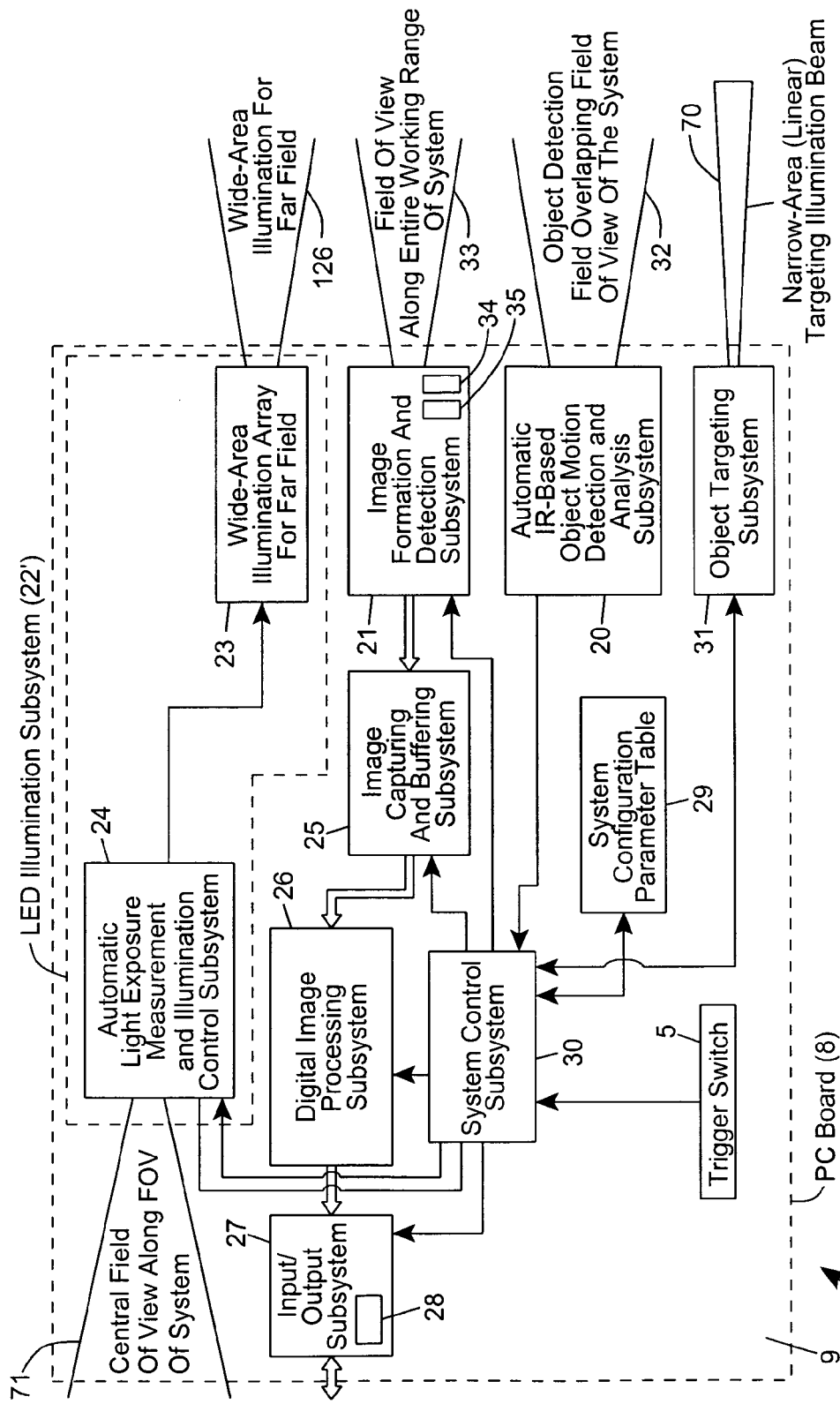
Figure 25:
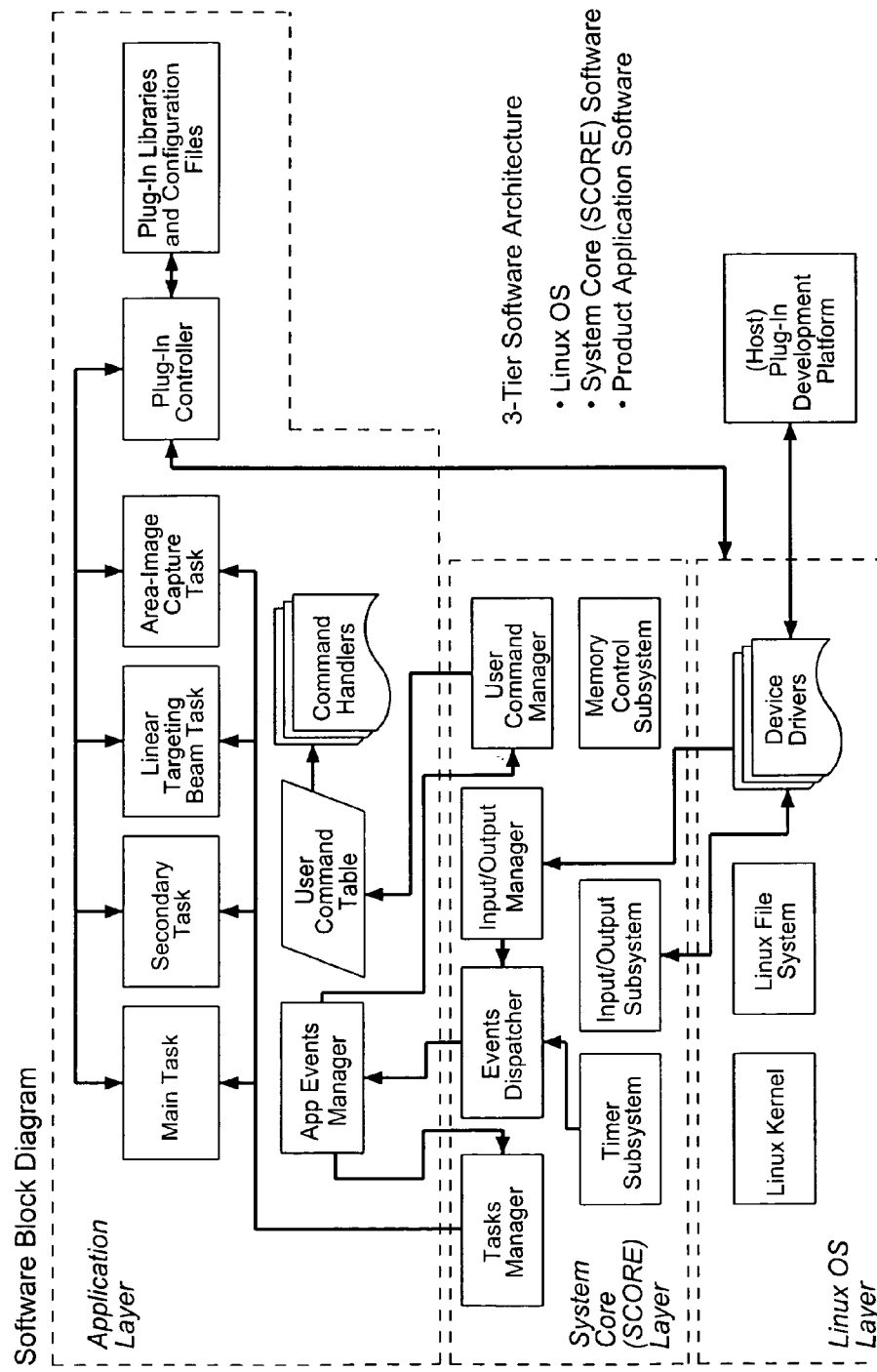
Figure 26A:
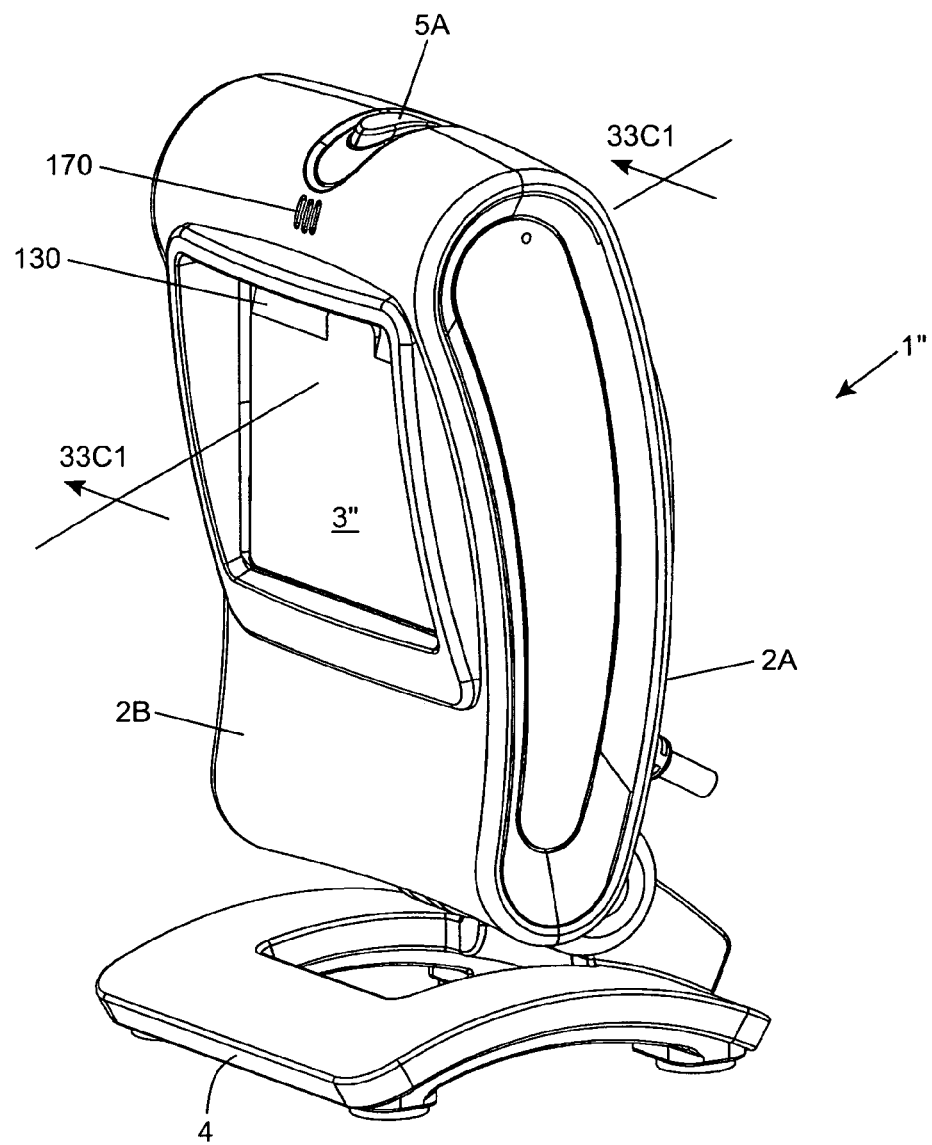
Figure 26B:
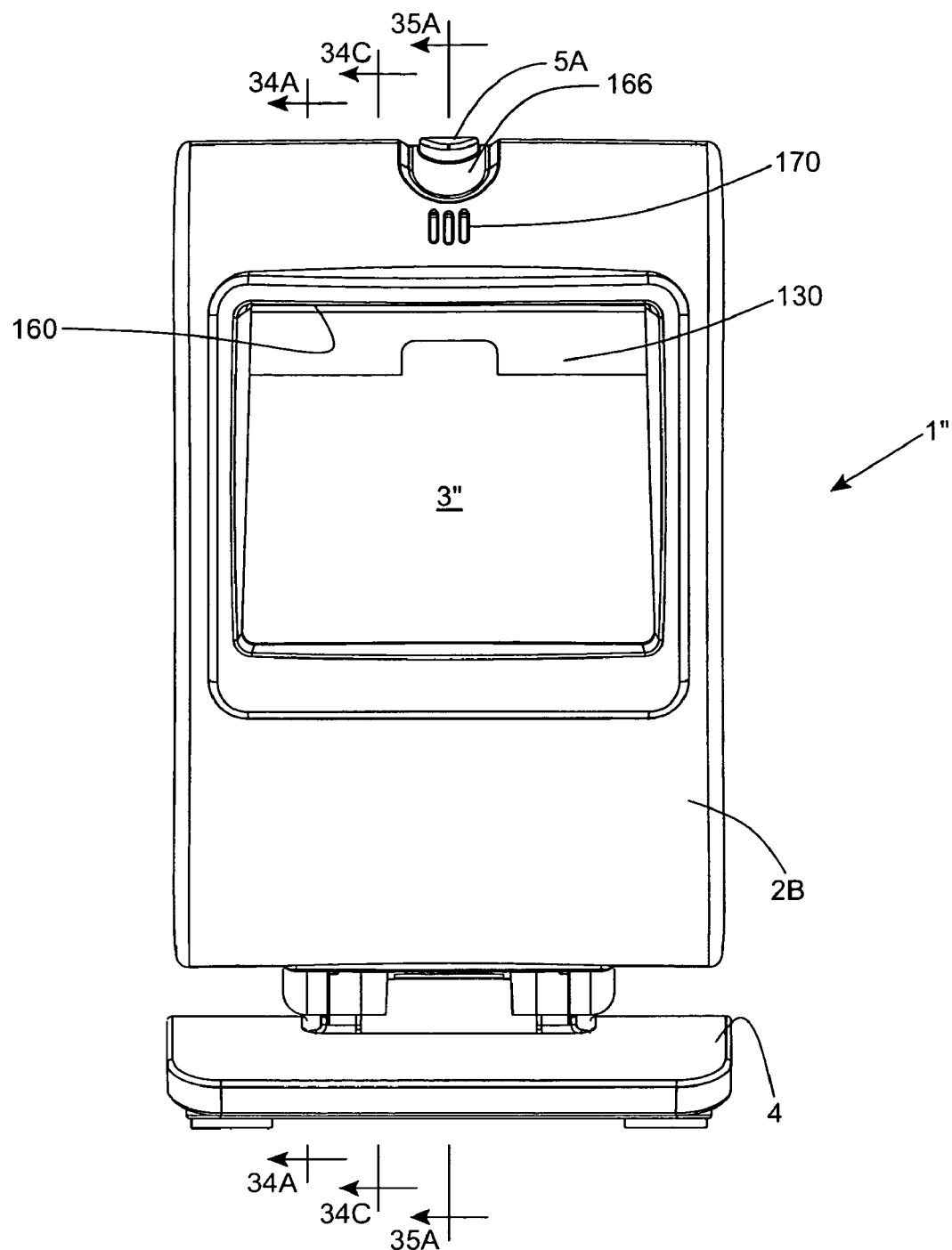
Figure 26C:
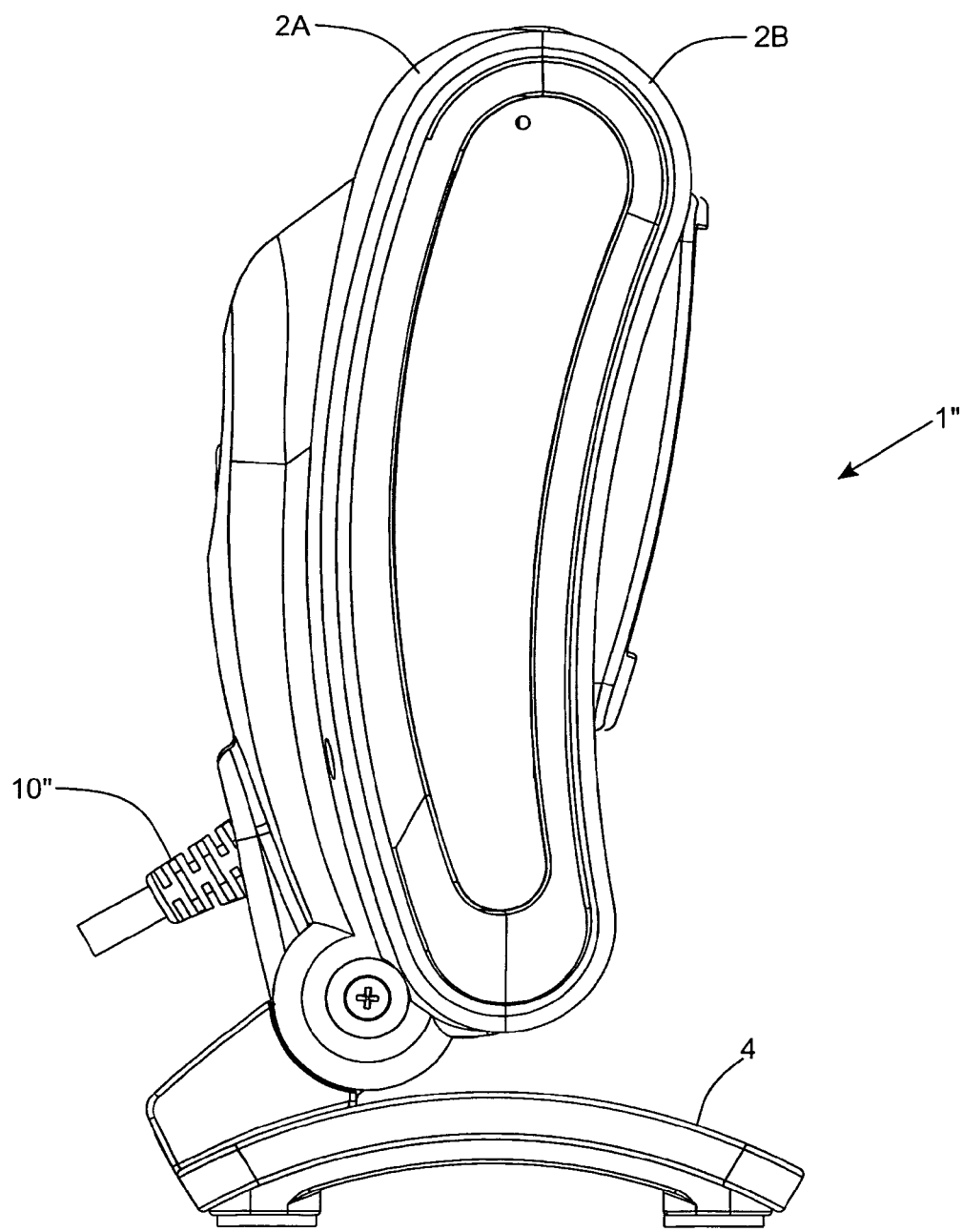
Figure 26D:
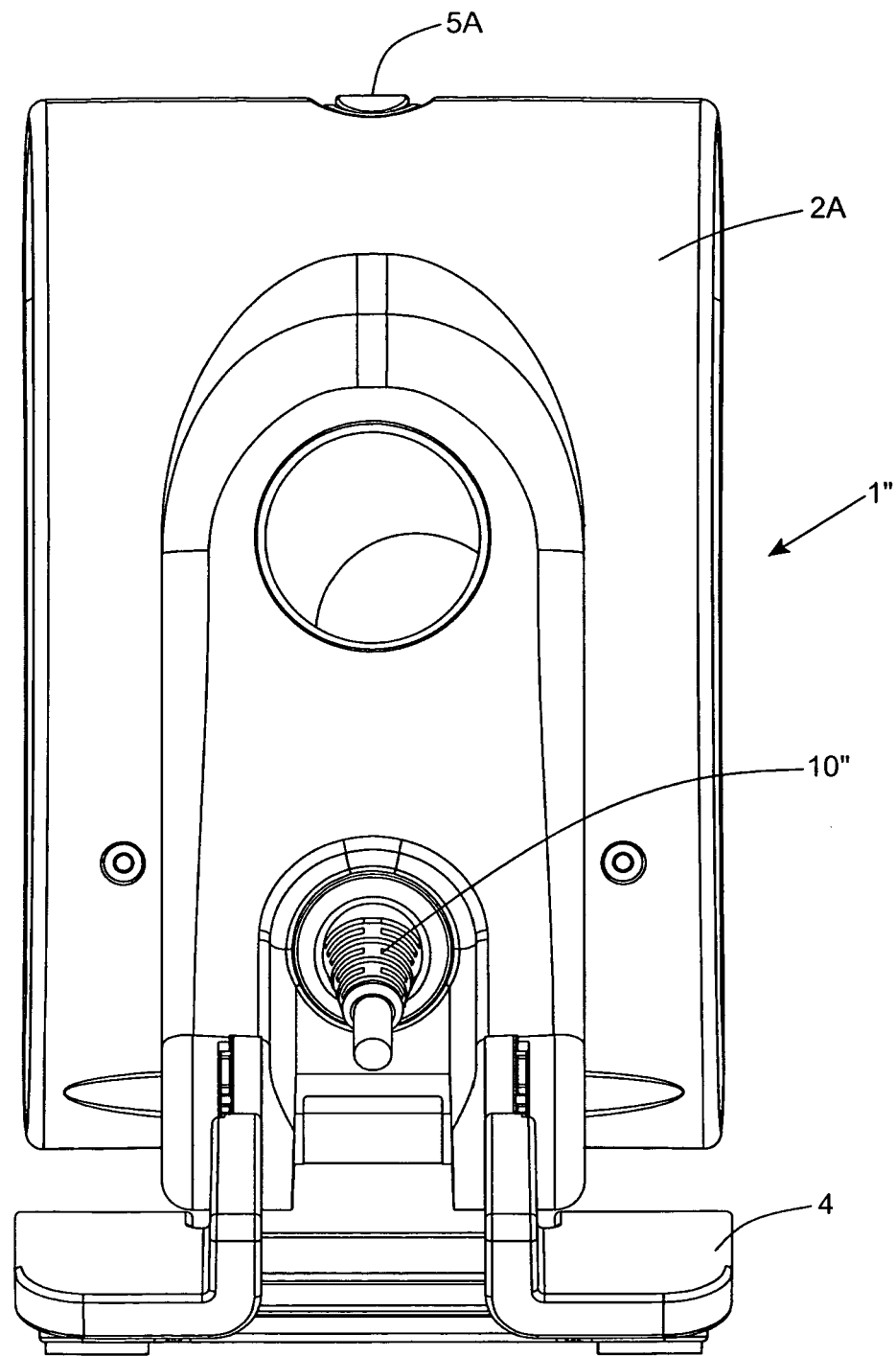
Figure 26E:
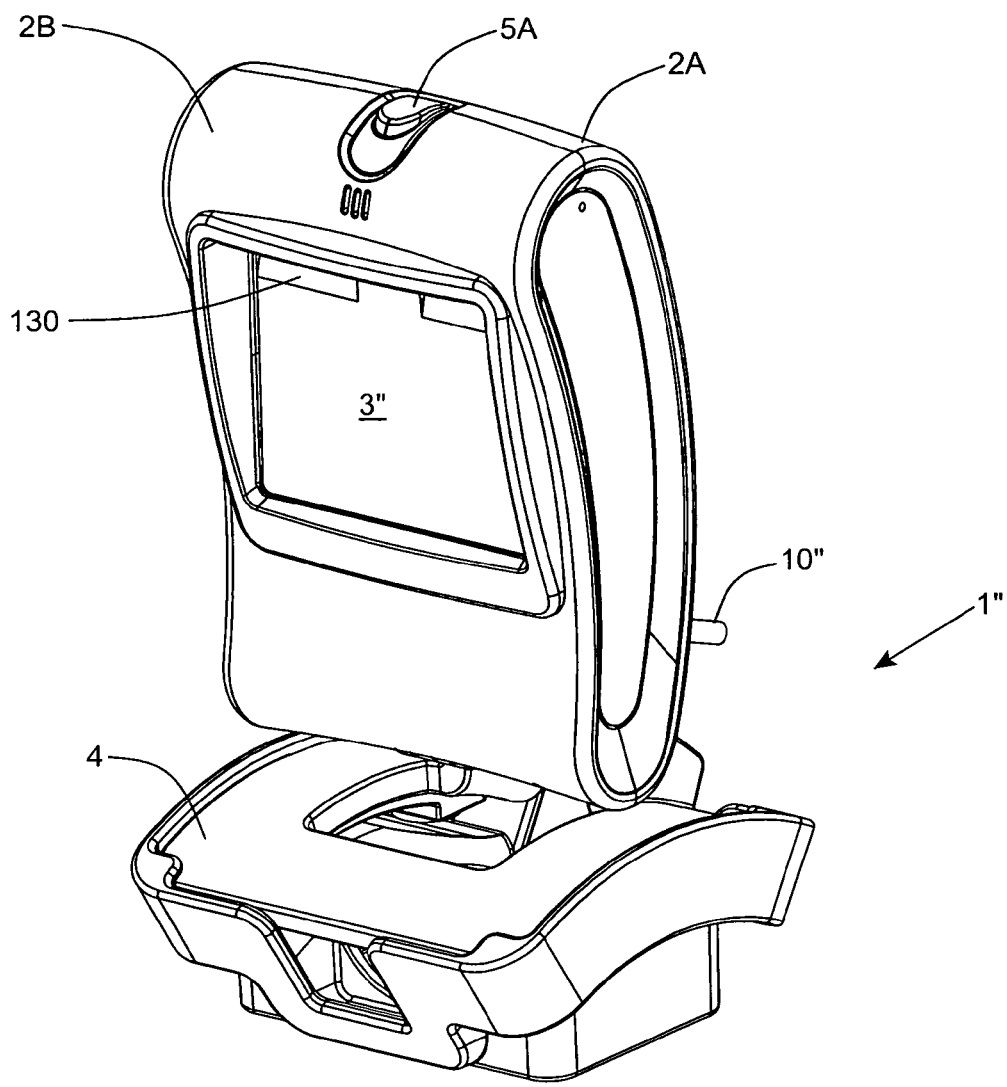
Figure 26F:
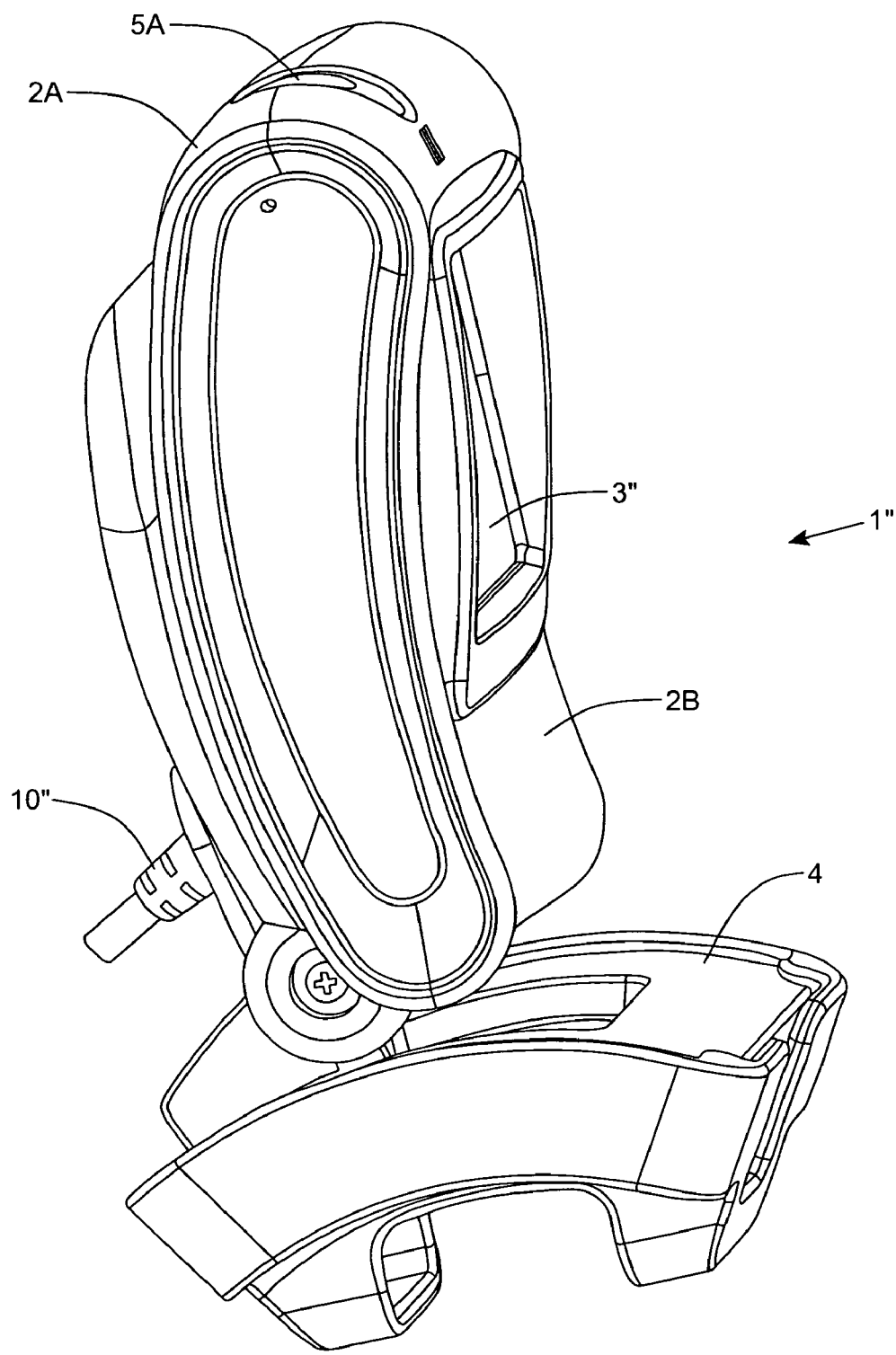
Figure 27A:
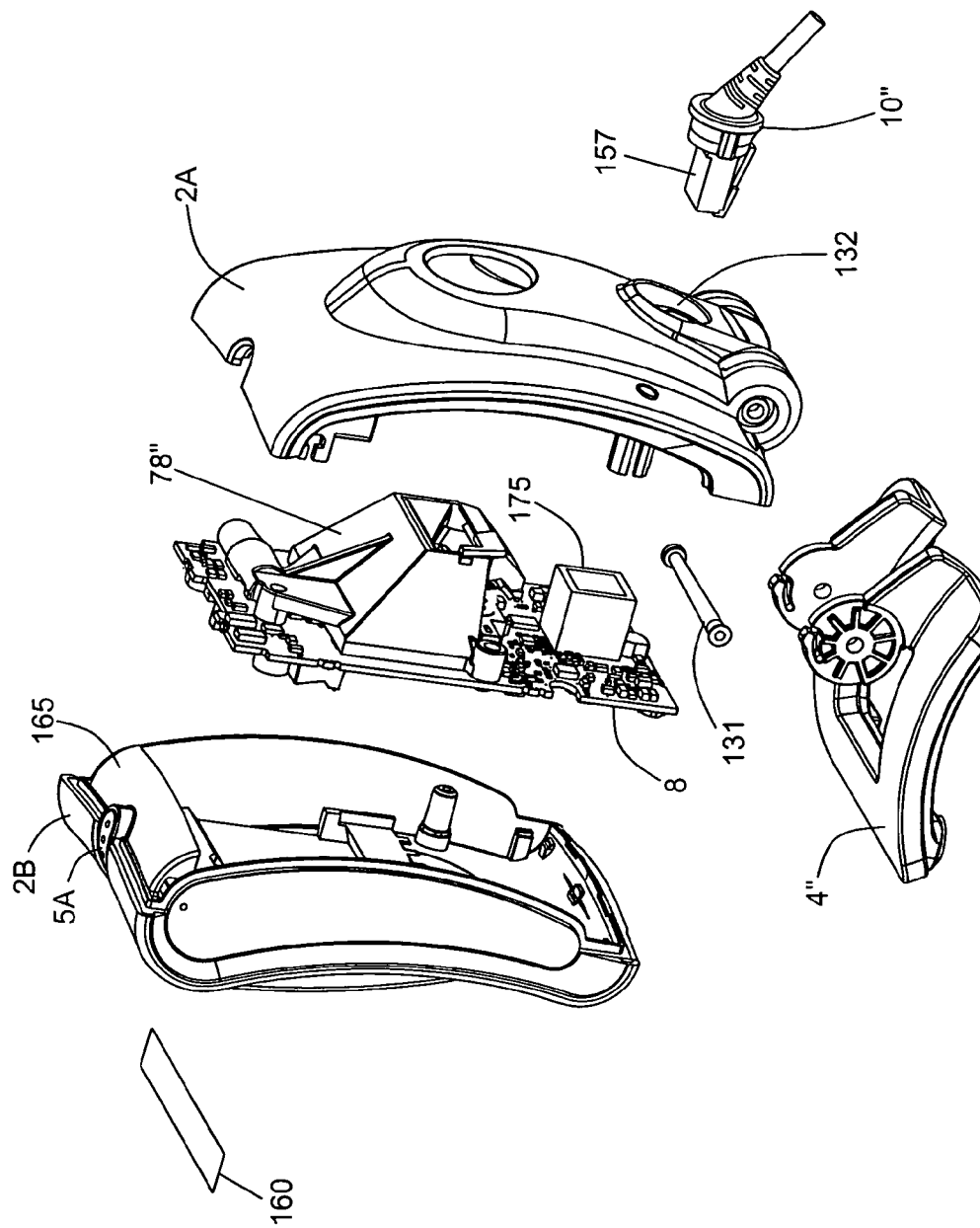
Figure 28A:
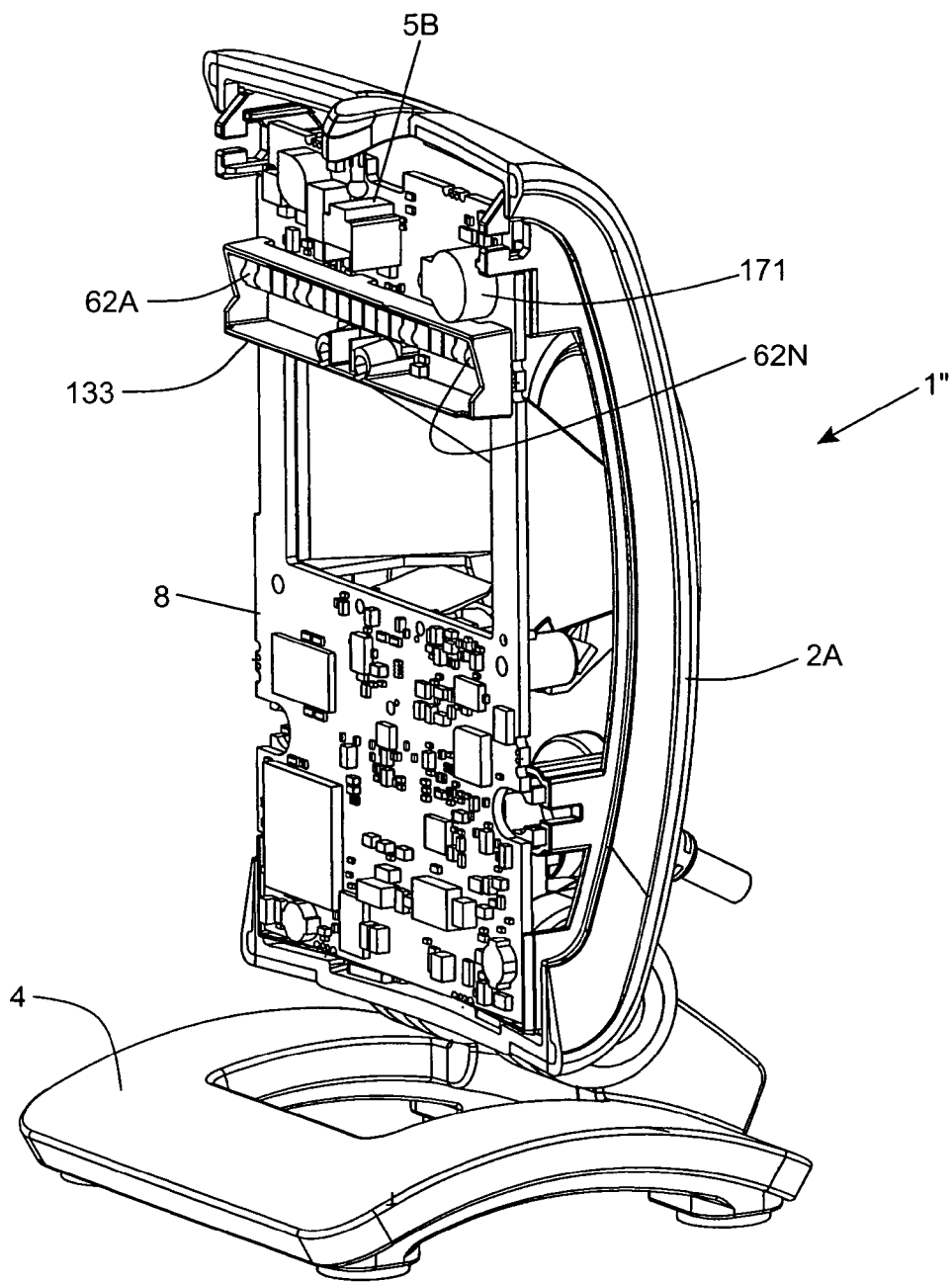
Figure 28B:
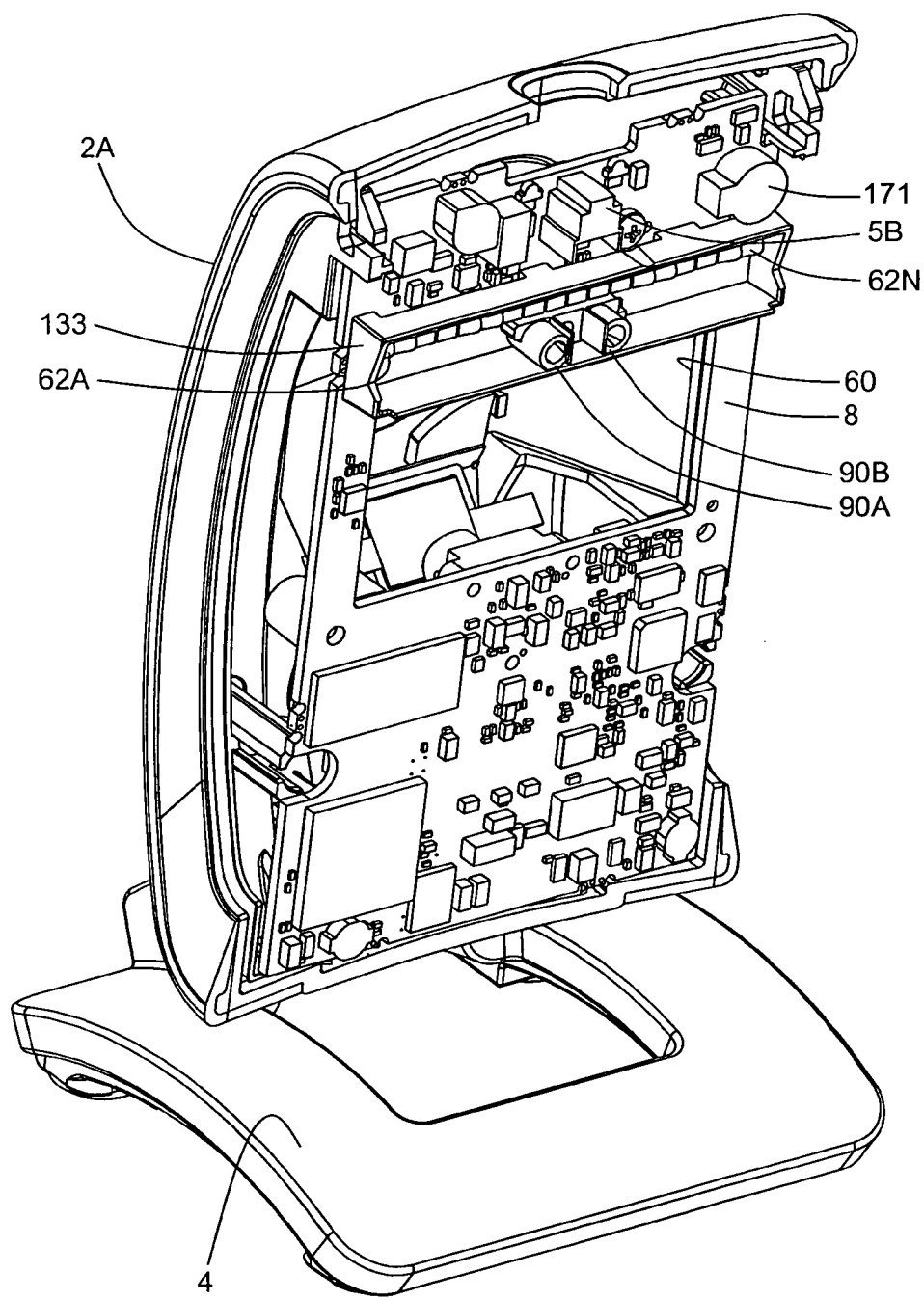
Figure 29A:
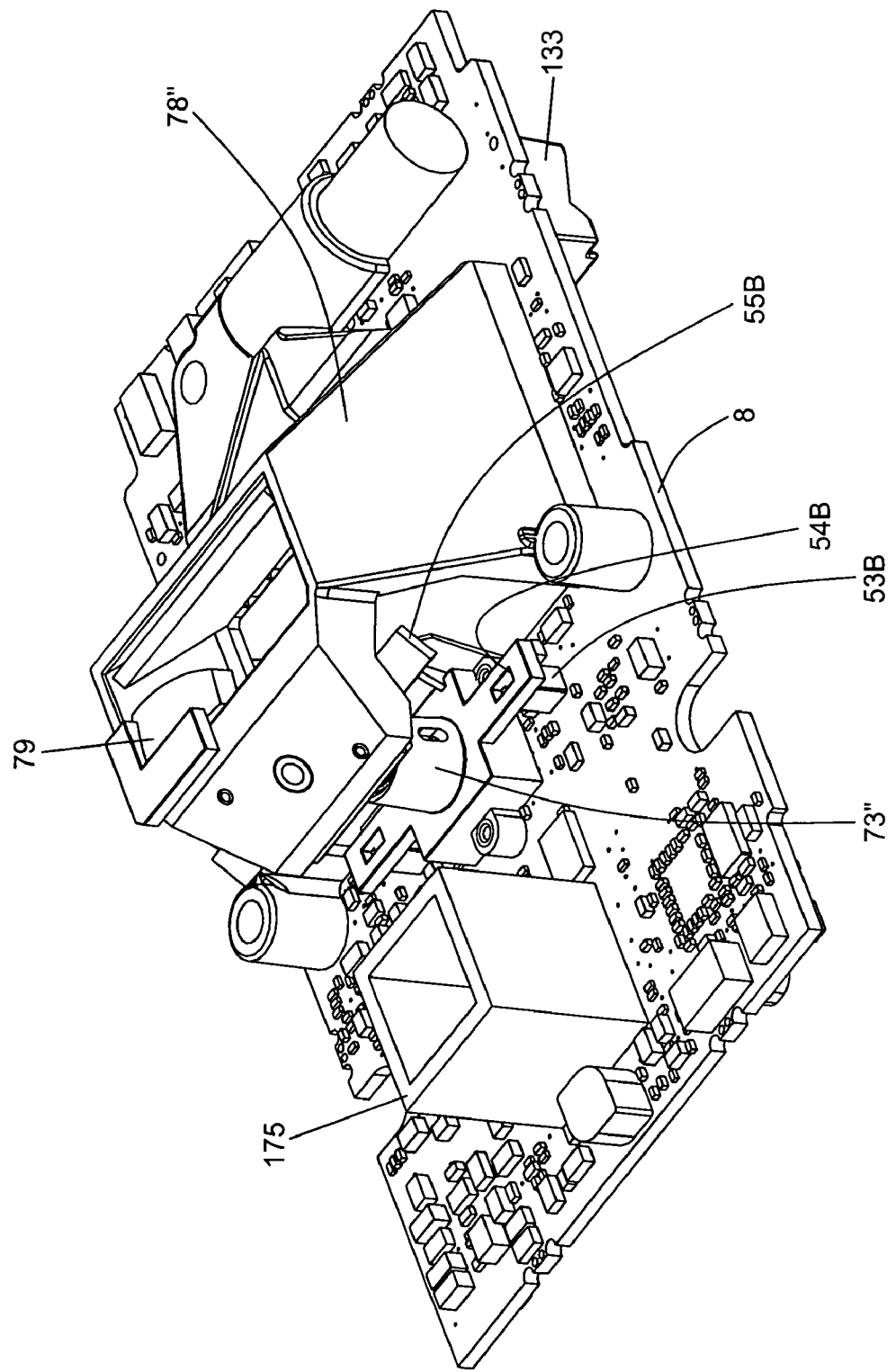
Figure 29C:
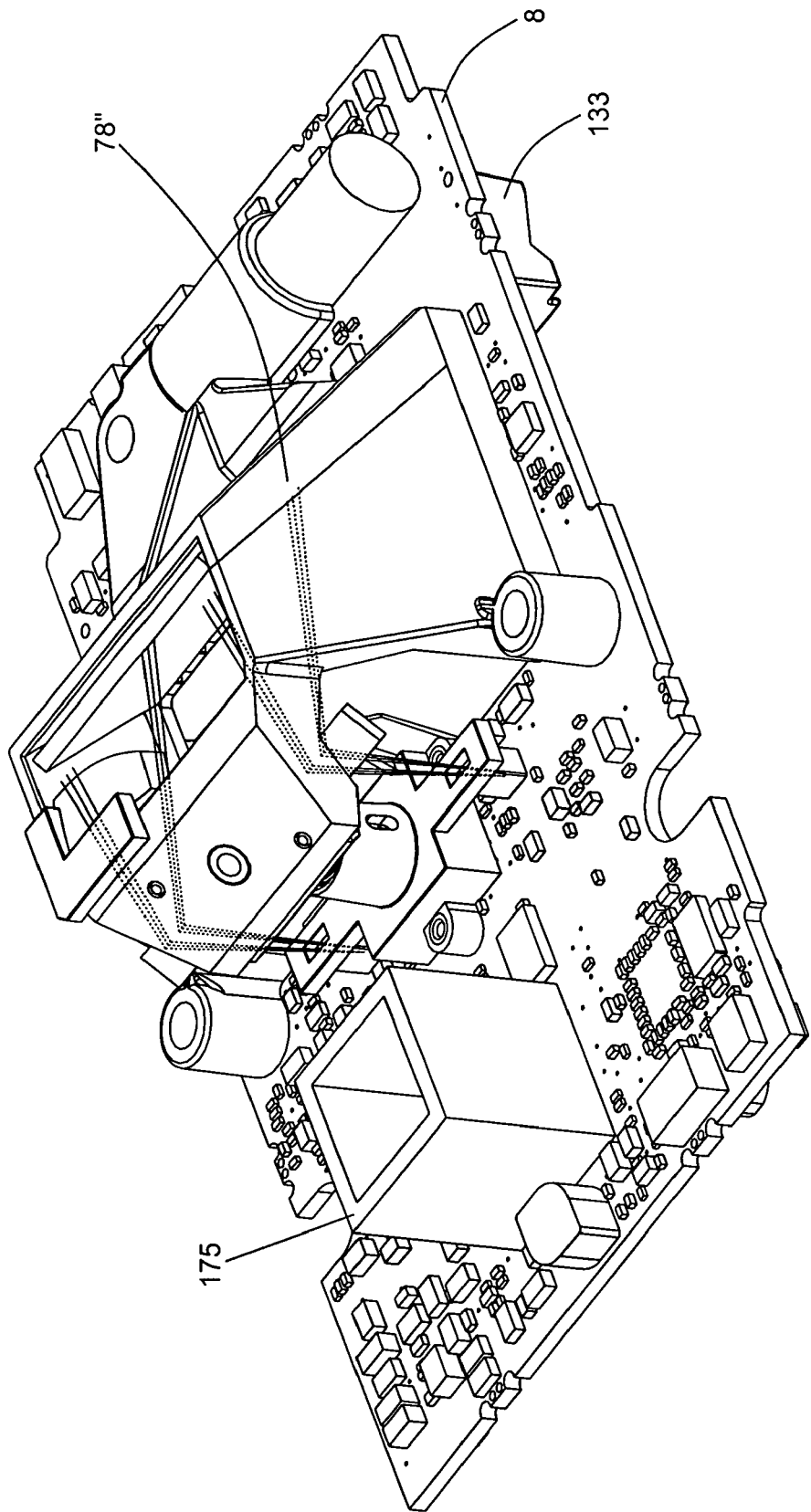
Figure 30:
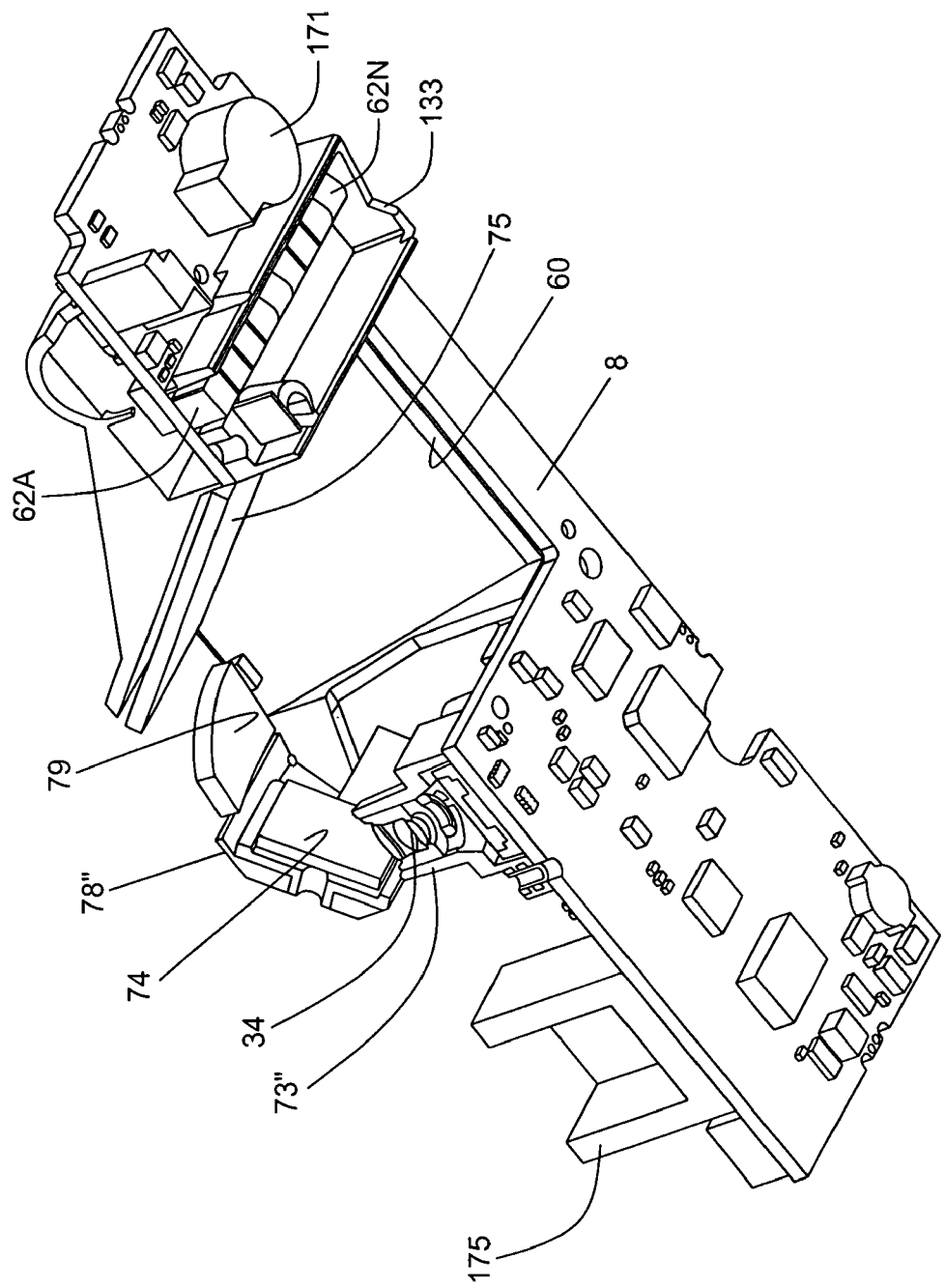
Figure 31A:
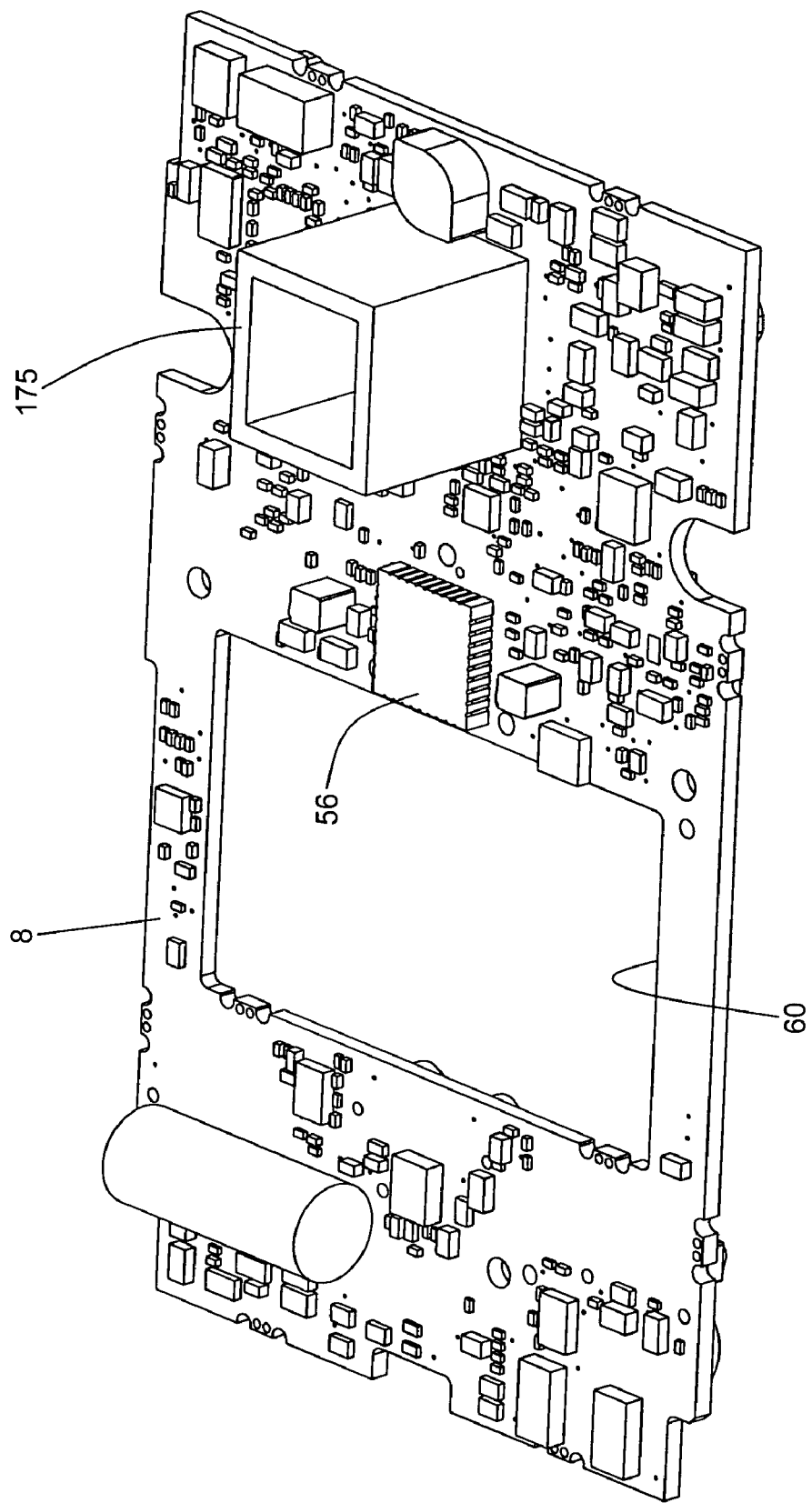
Figure 31B:
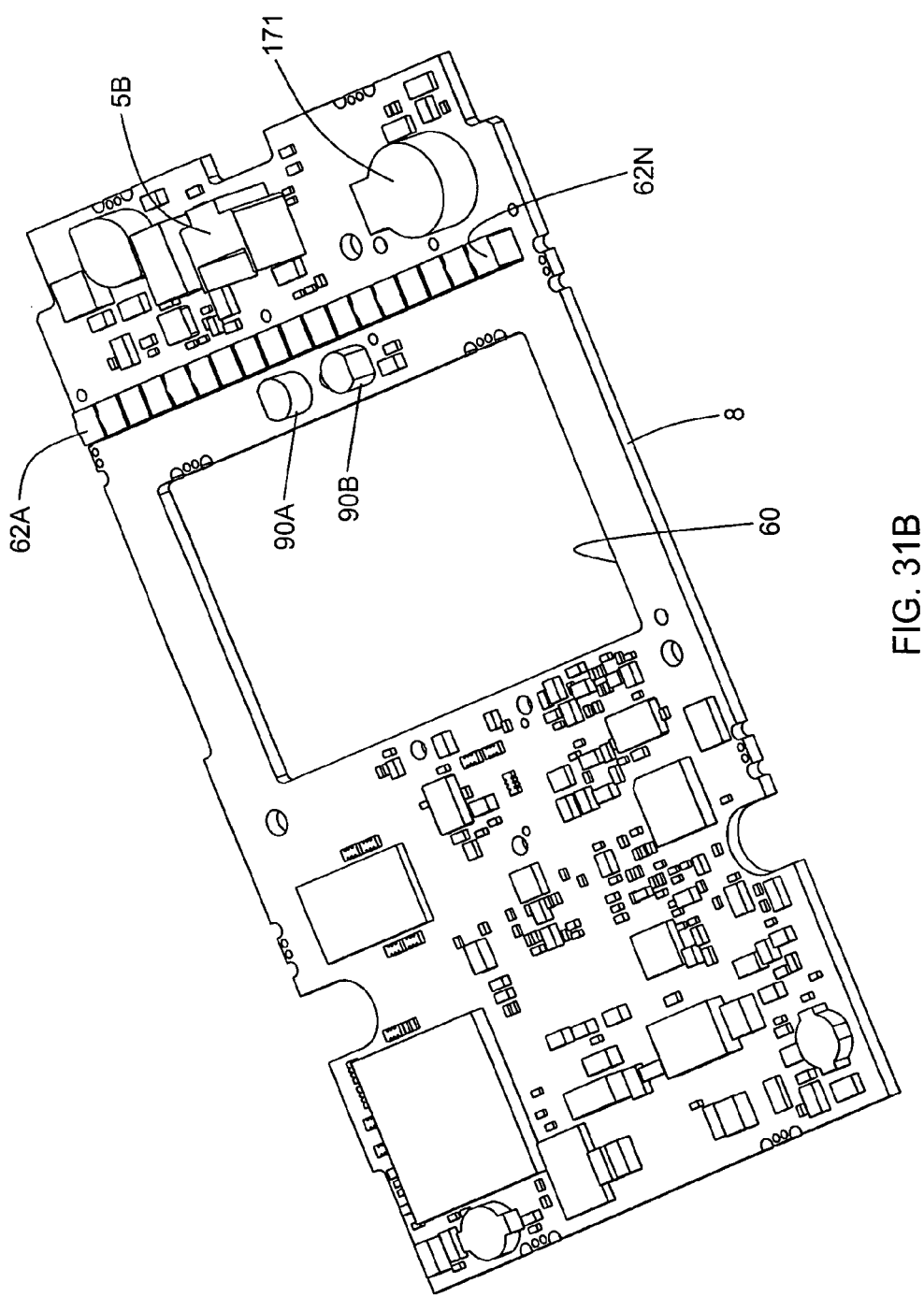
Figure 31C:
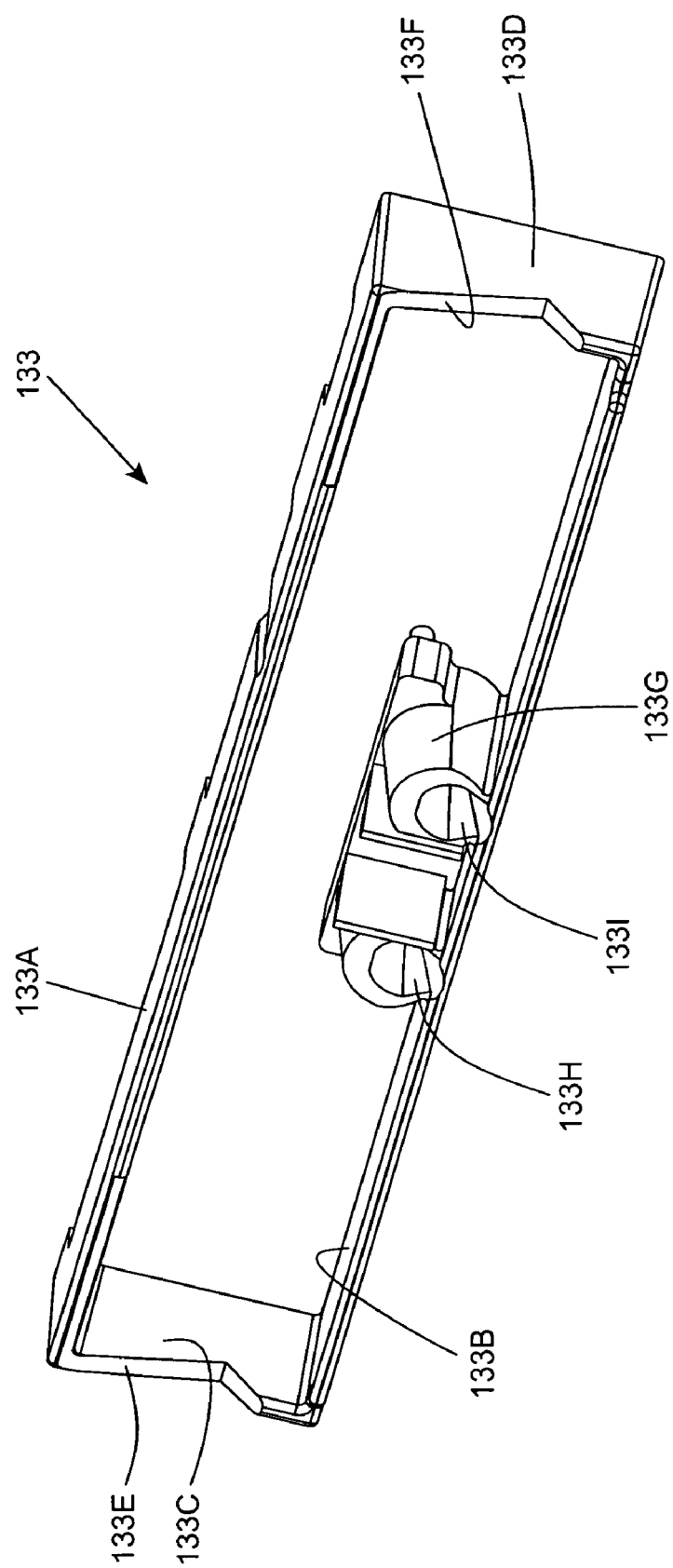
Figure 31D:
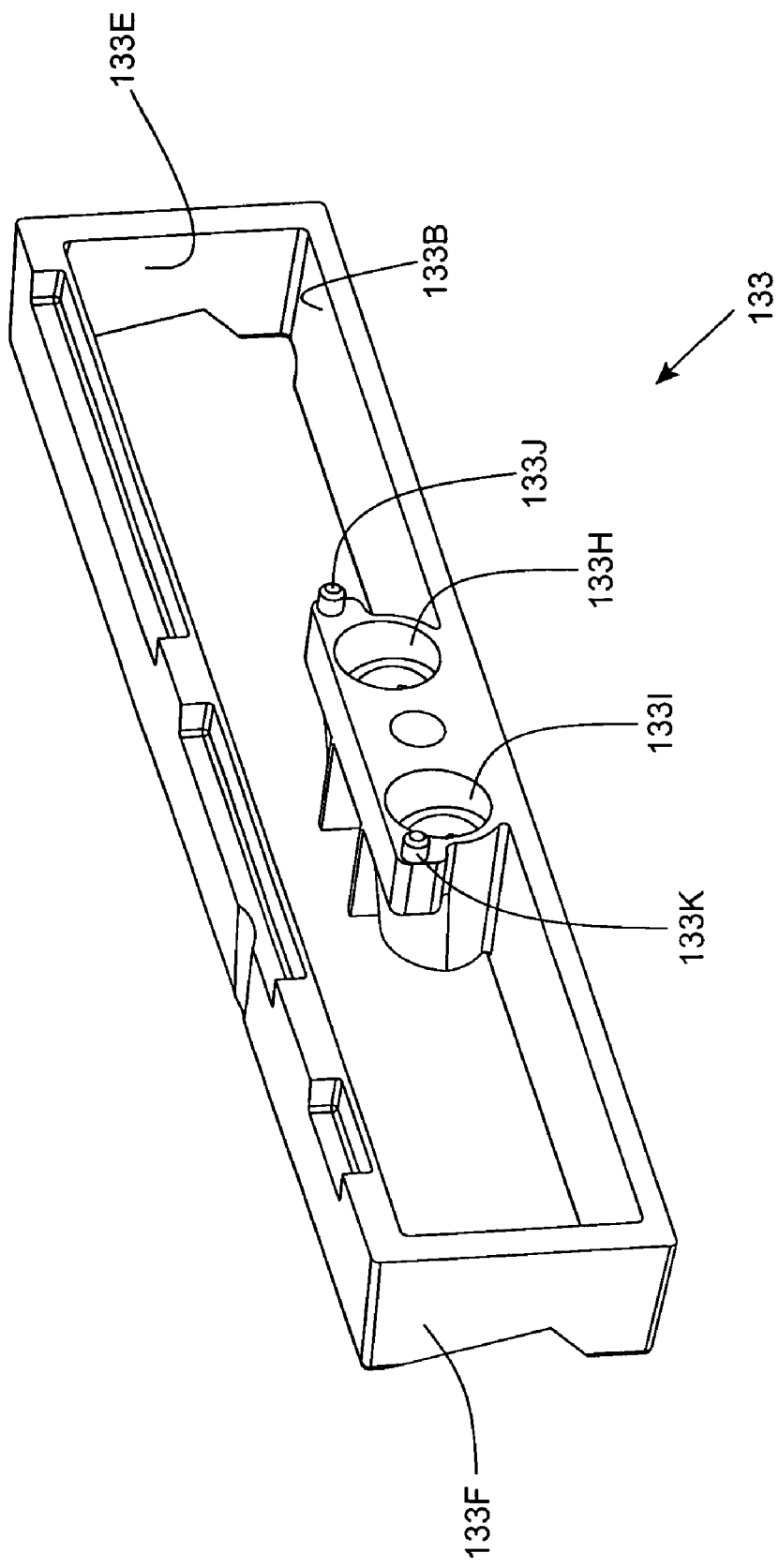
Figure 32A:
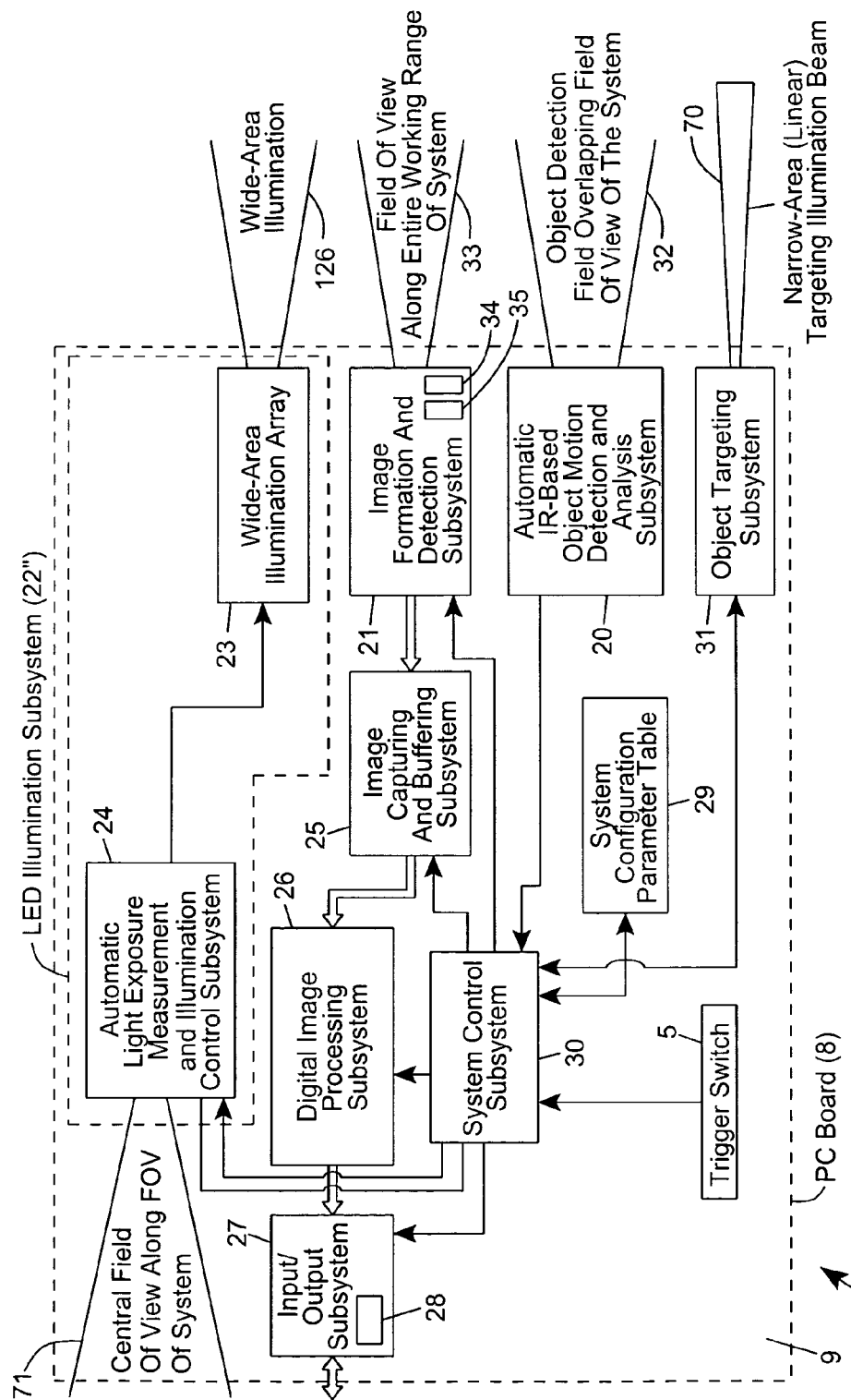
Figure 32C:
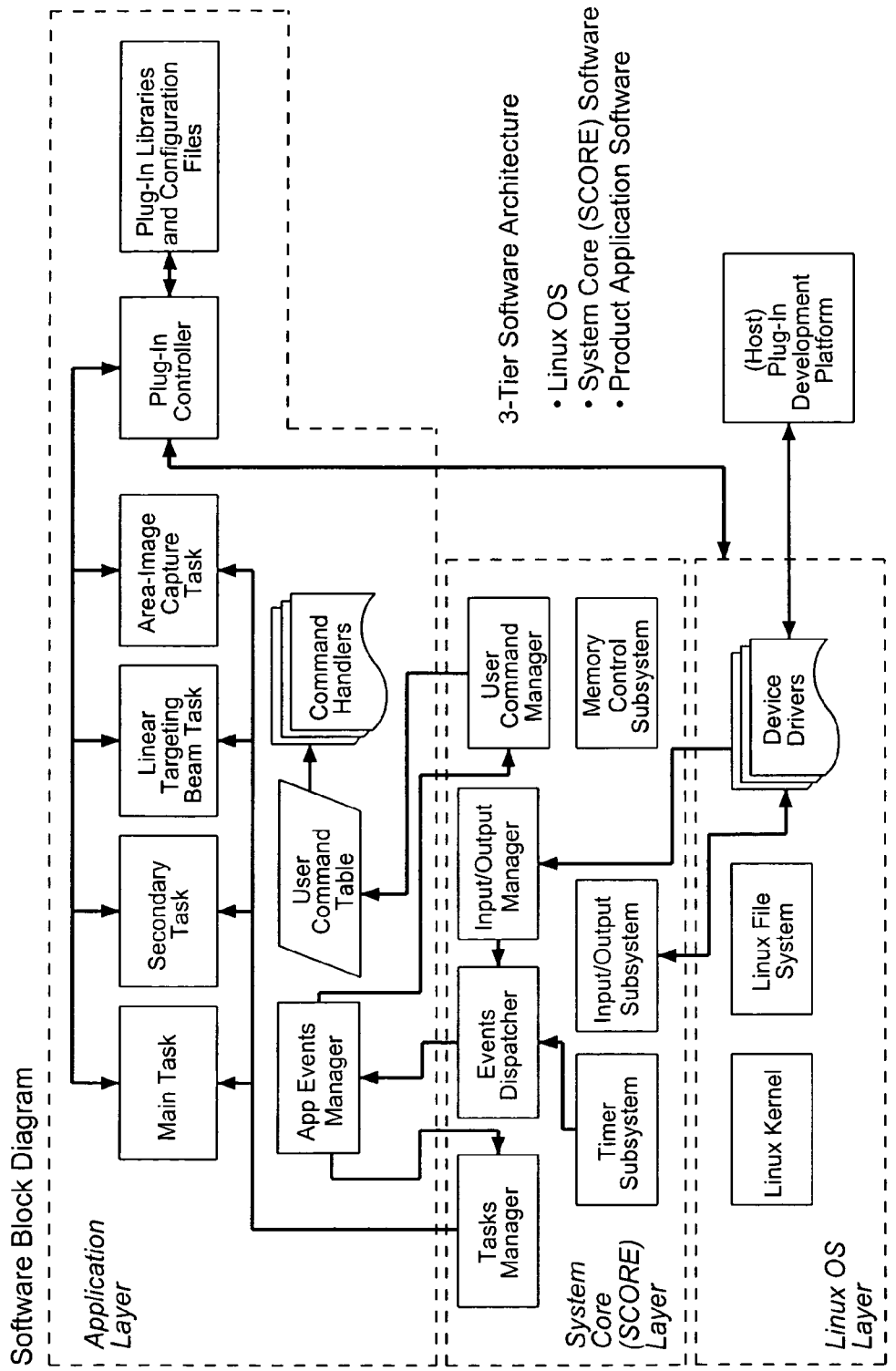
Figure 33A:
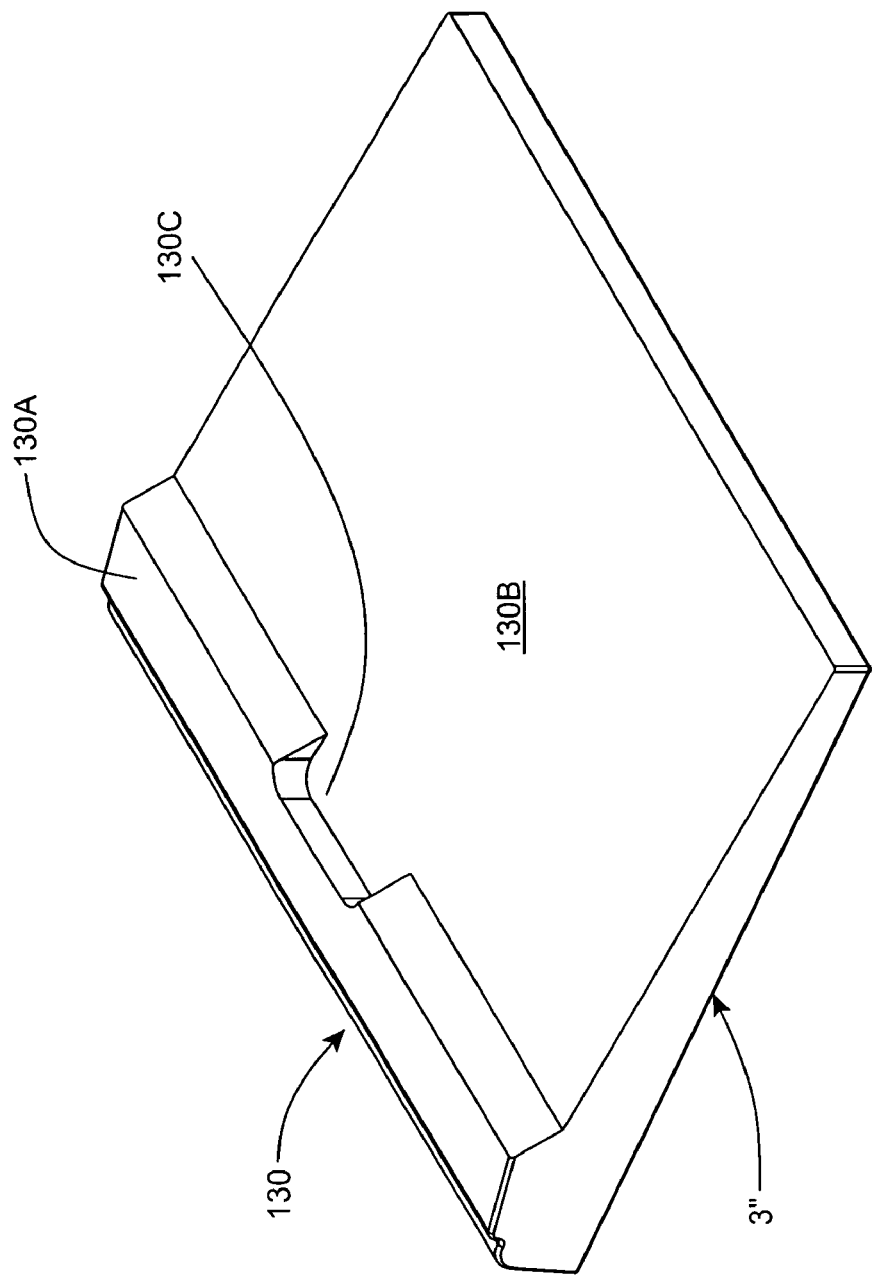
Figure 33B:
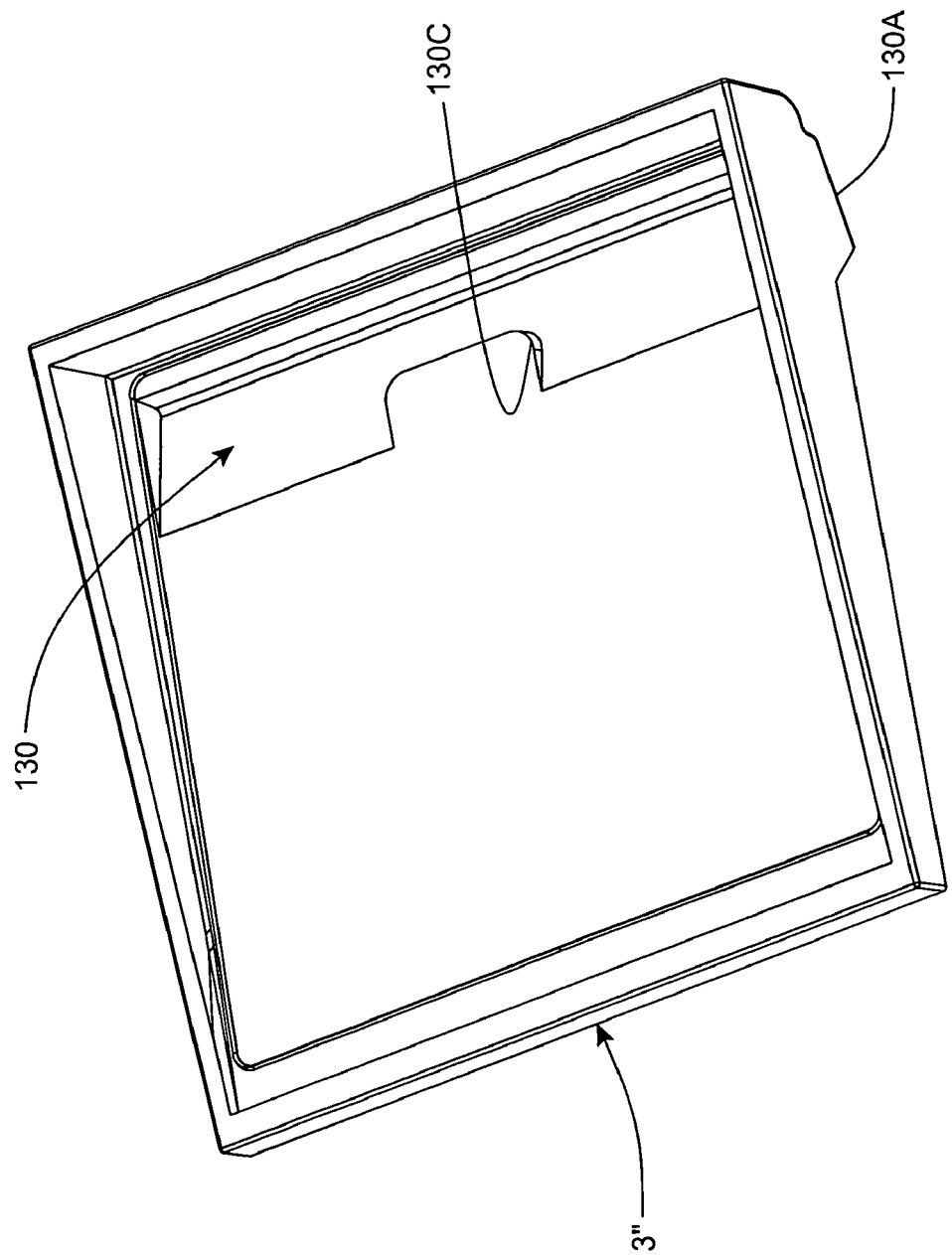
Figure 33D:
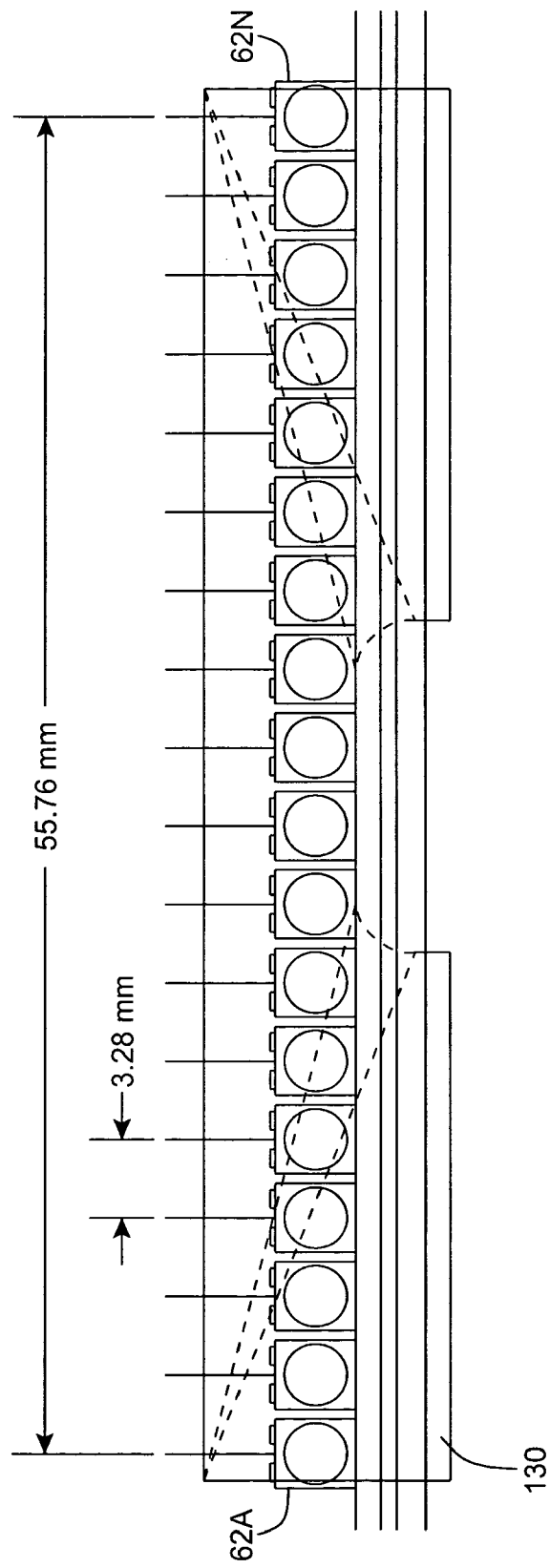
Figure 33E:
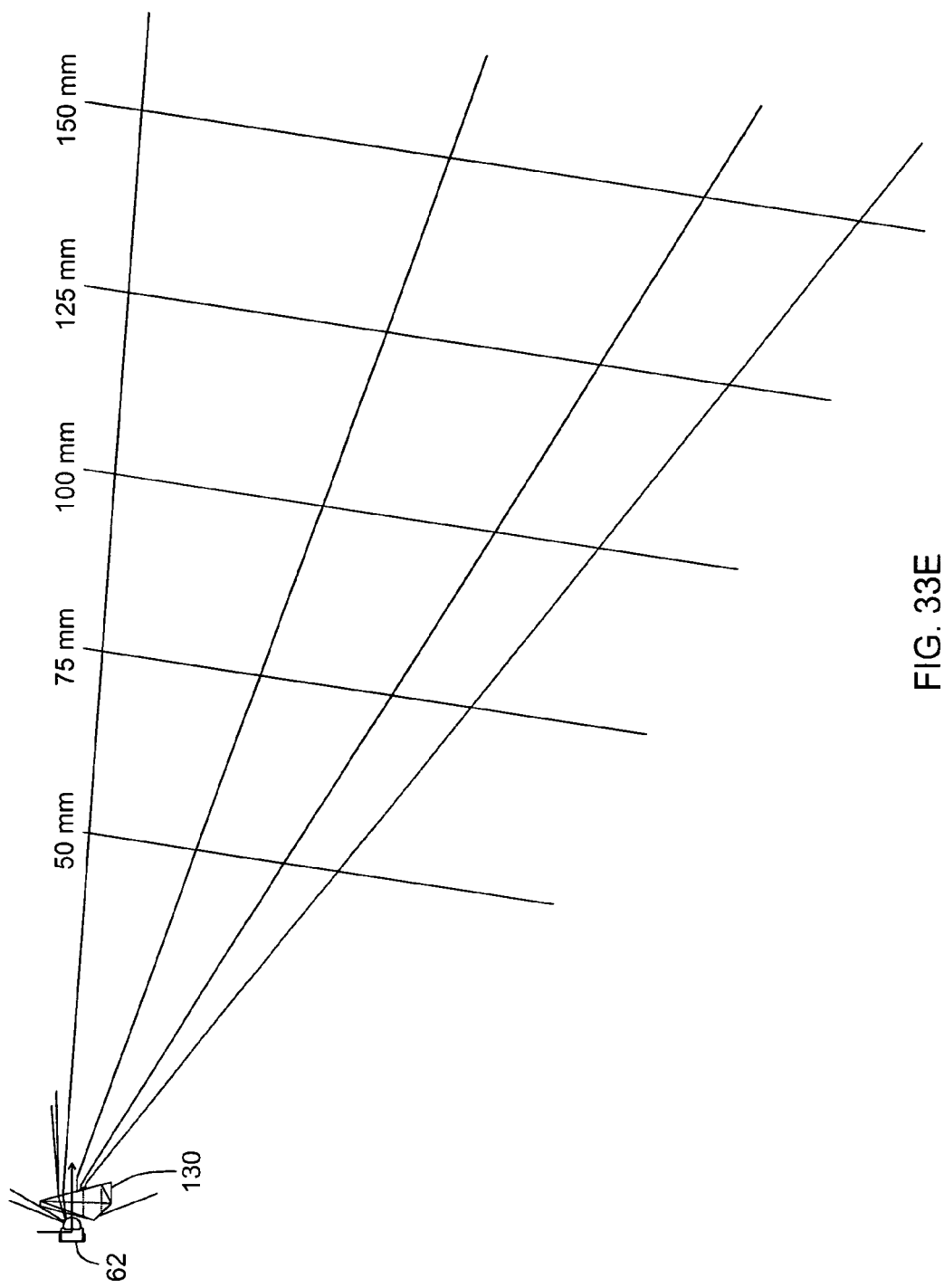
Figure 34A:
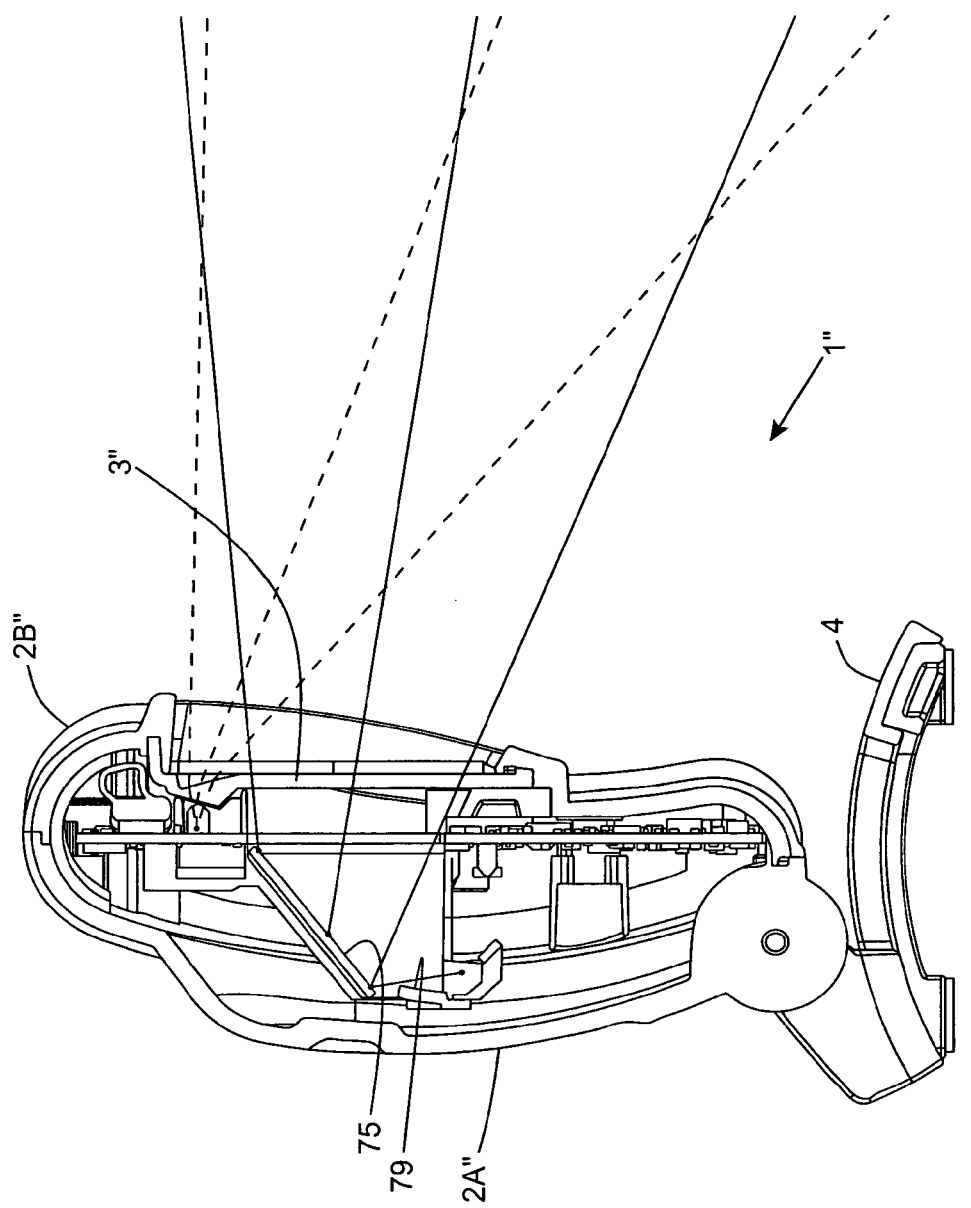
Figure 34B:
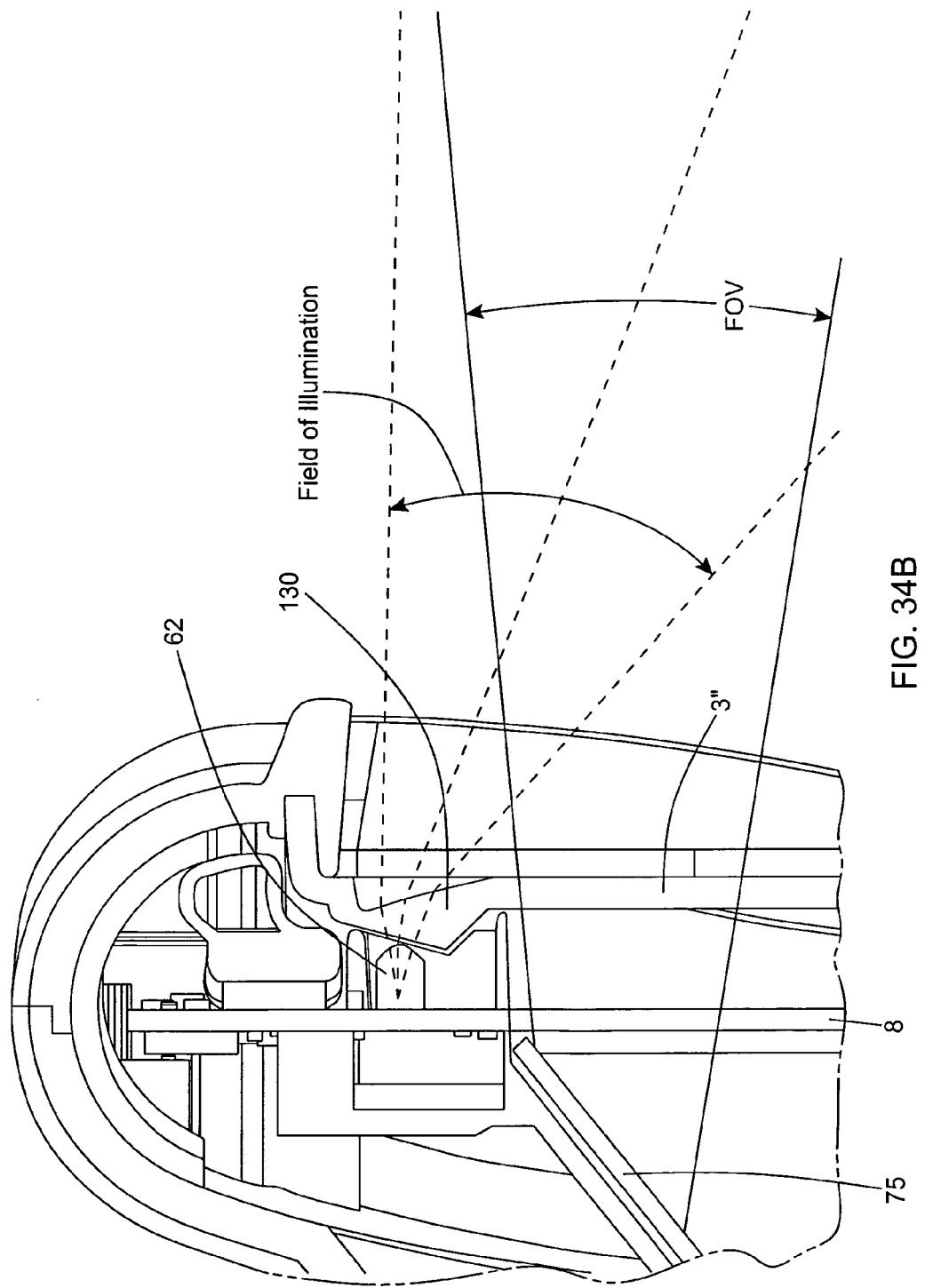
Figure 34C:
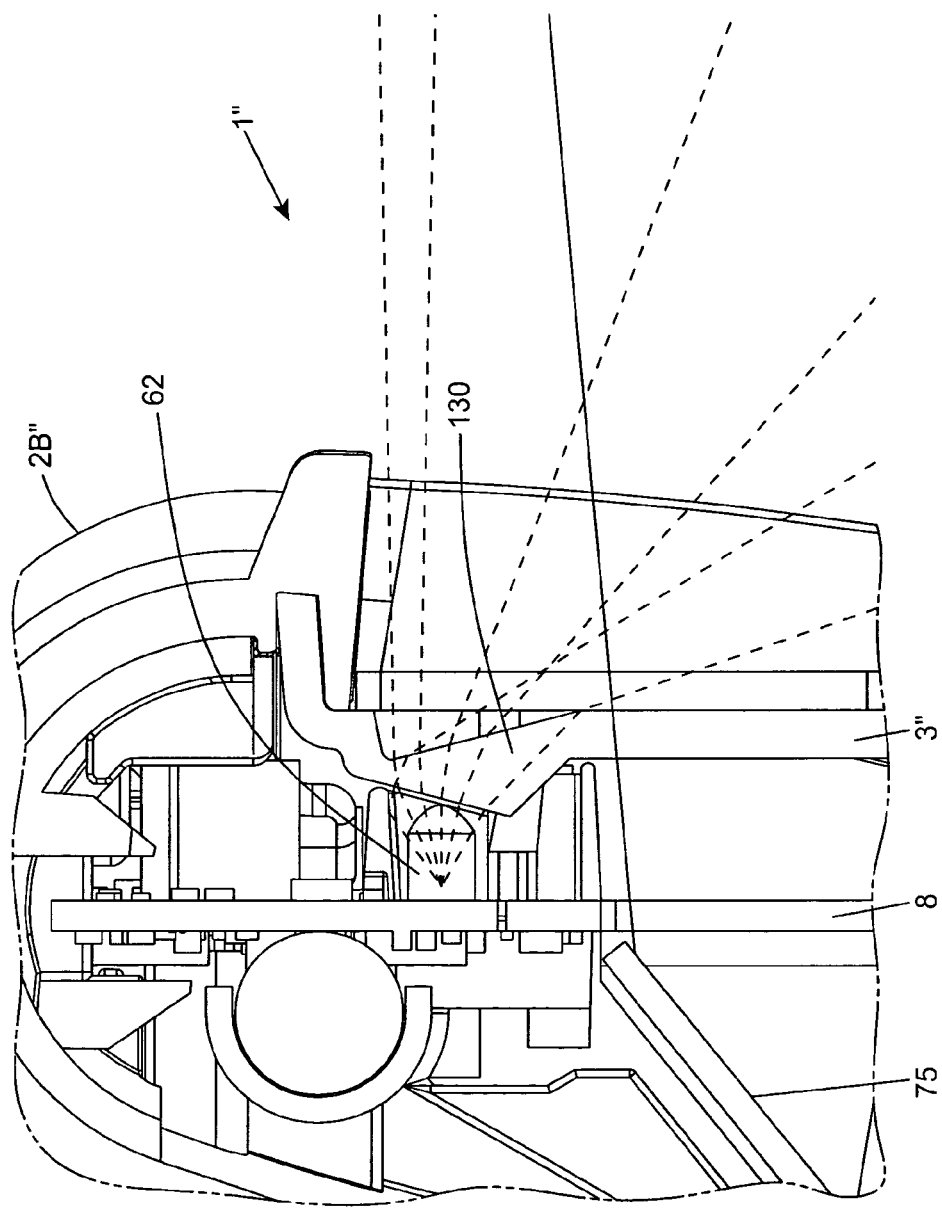
Figure 35A:
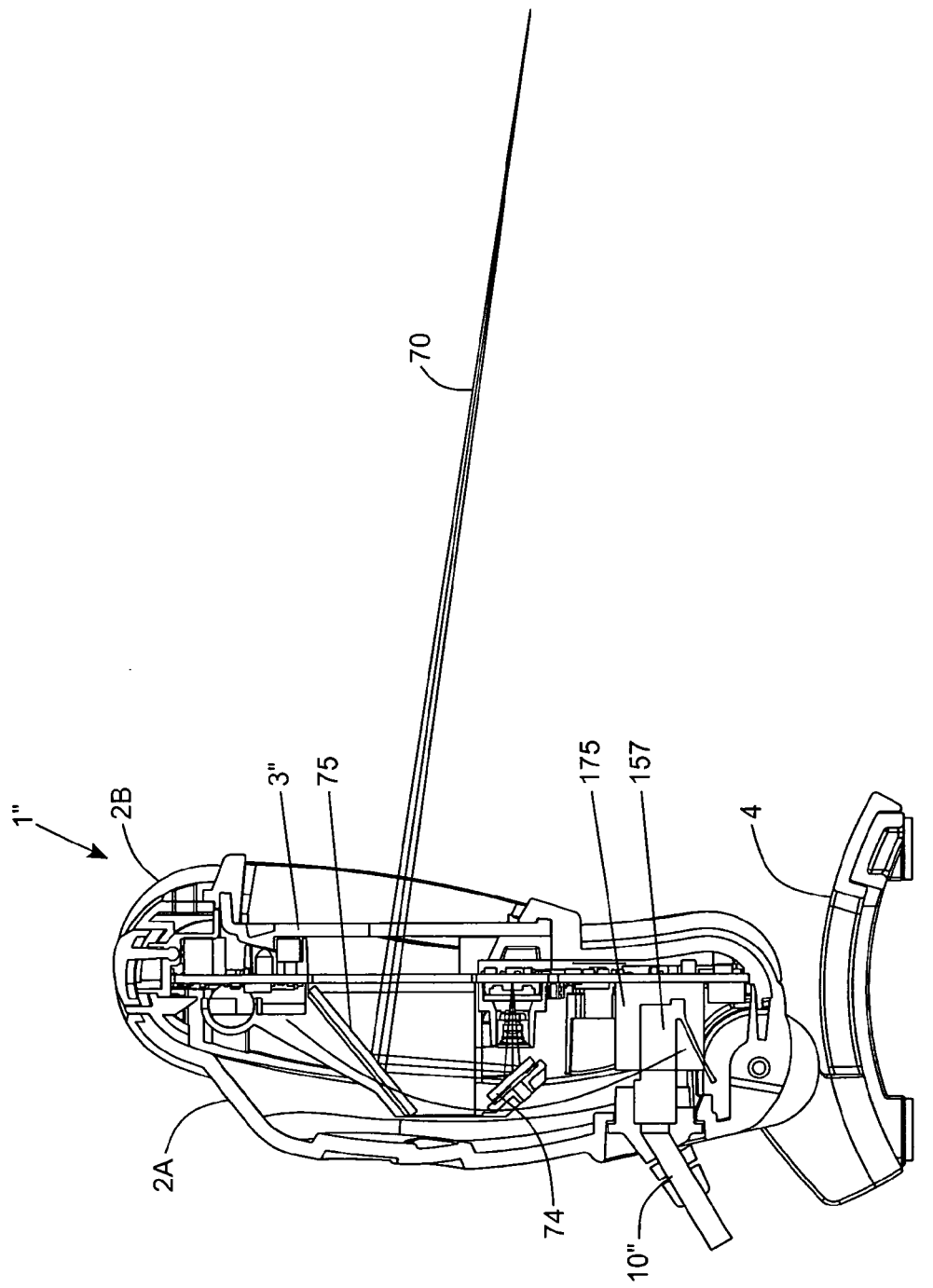
Figure 35B:
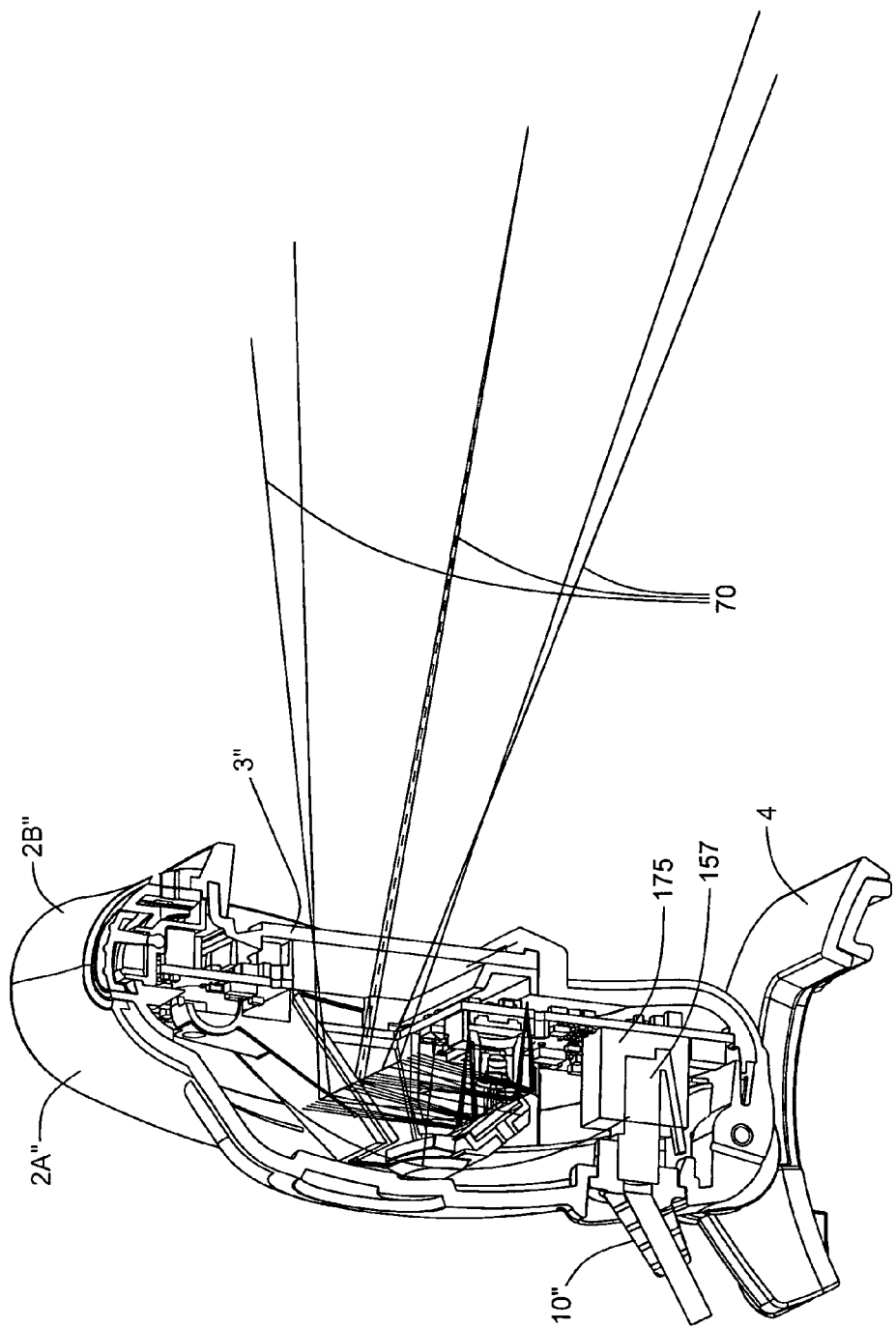
Figure 36A:
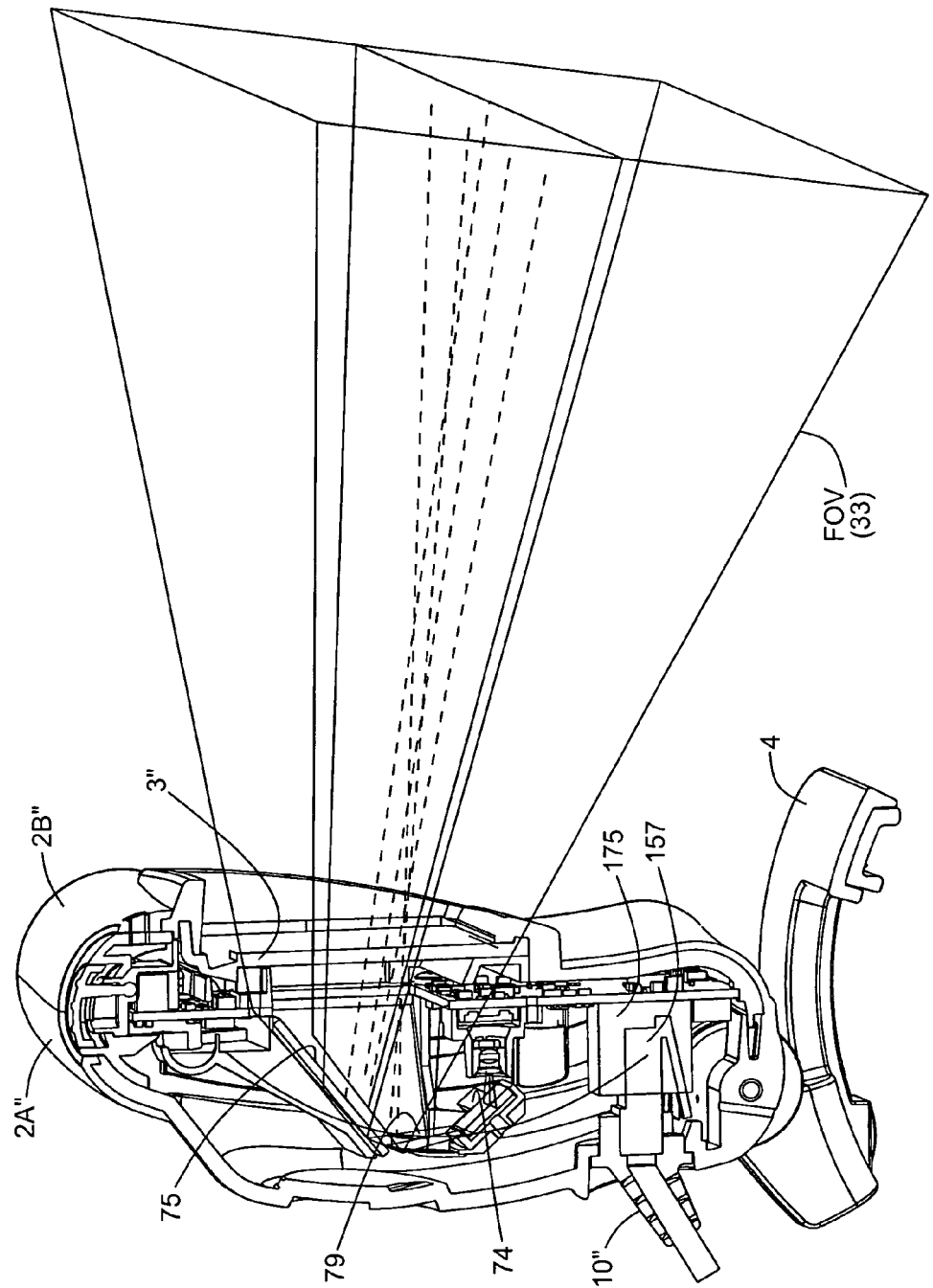
Figure 36B:
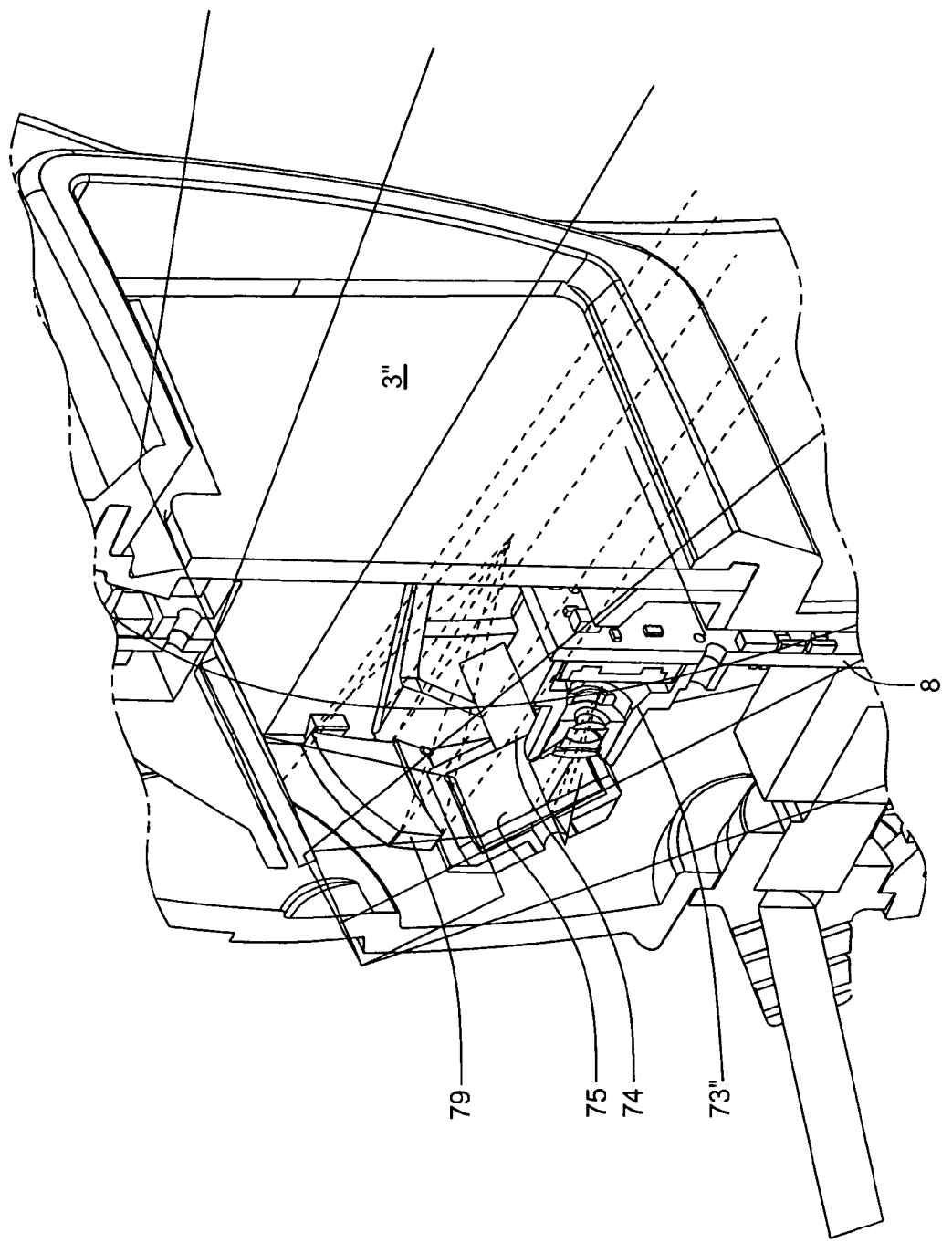
Figure 36C:
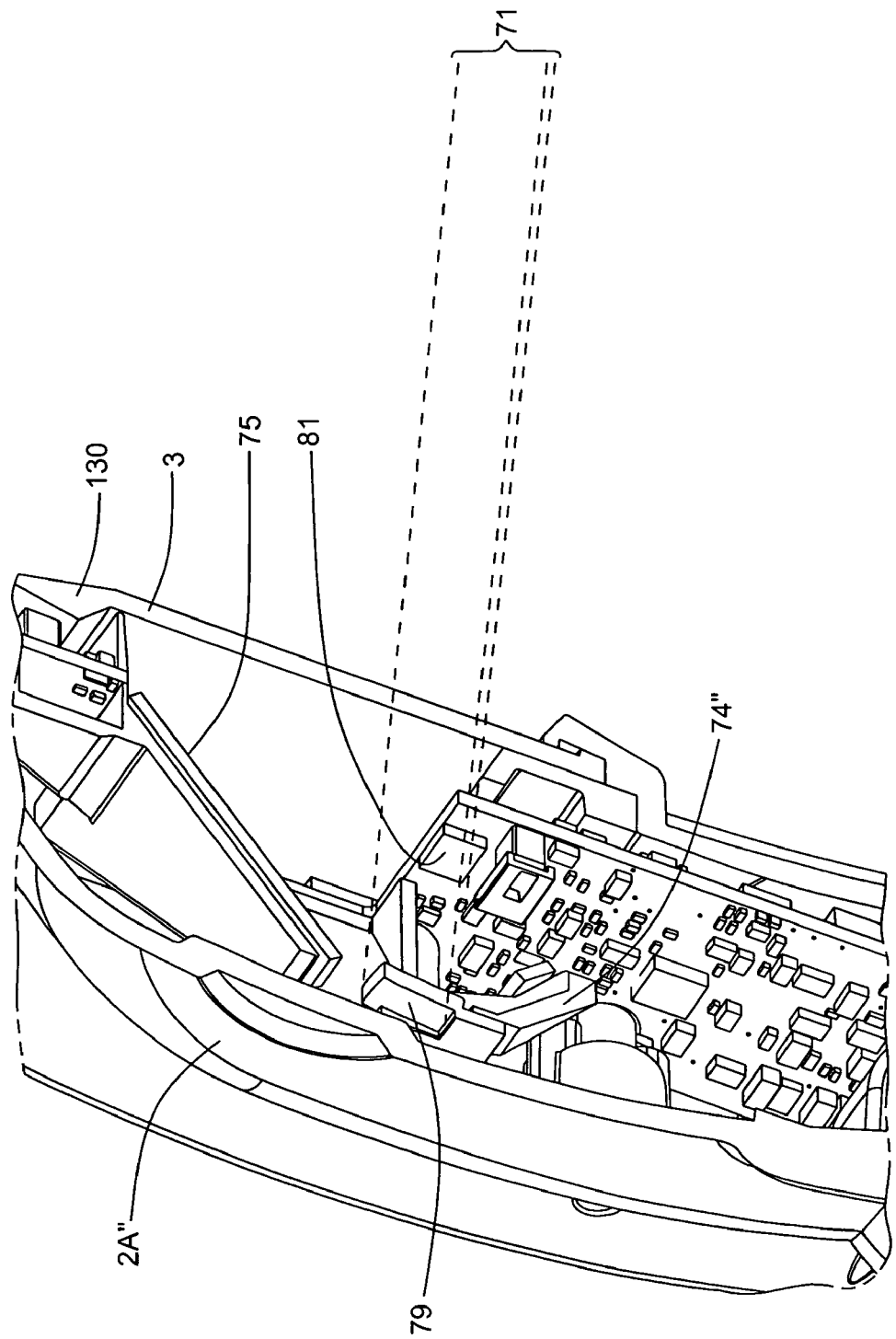
Figure 36D:
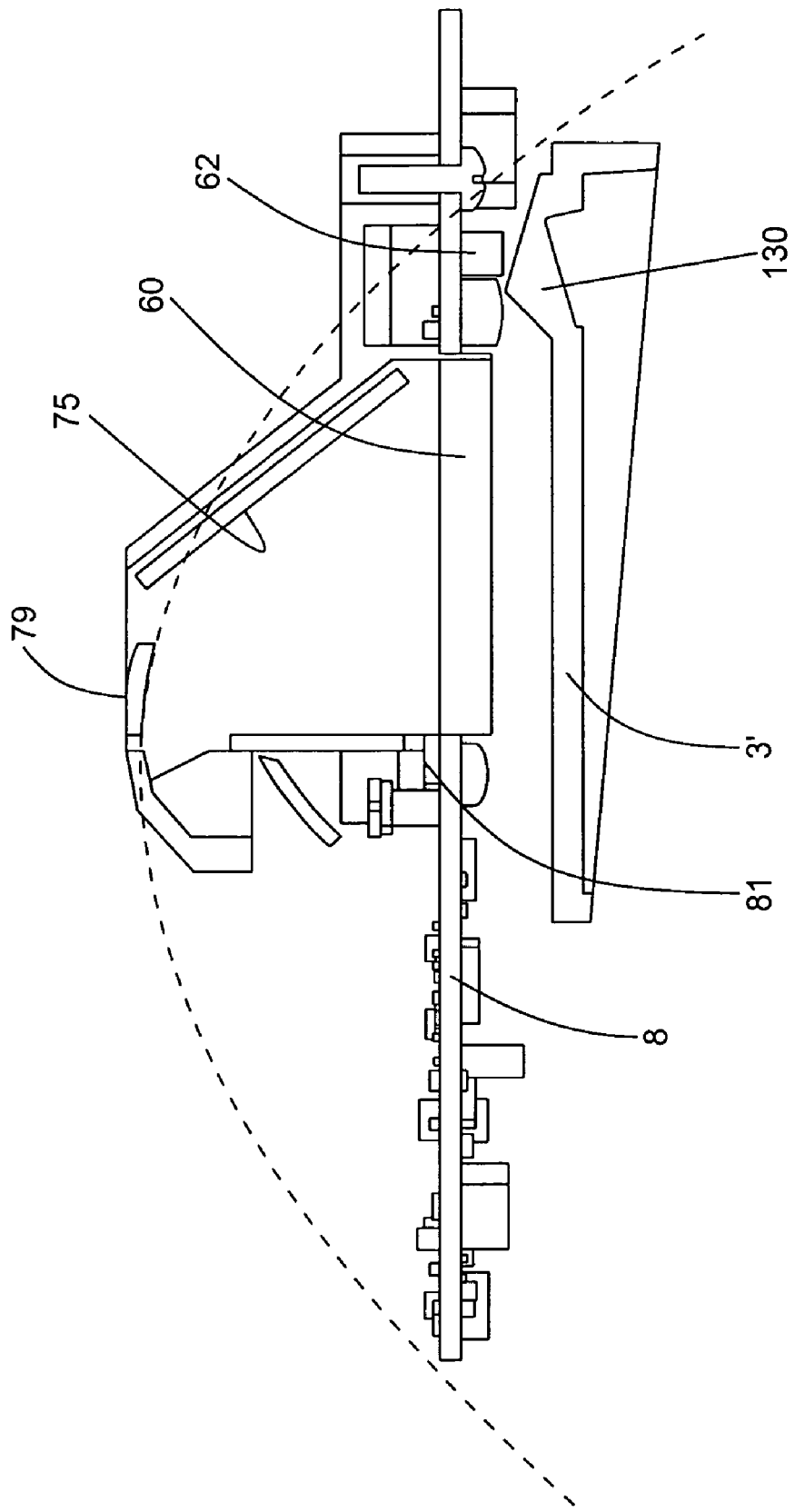
Figure 37:
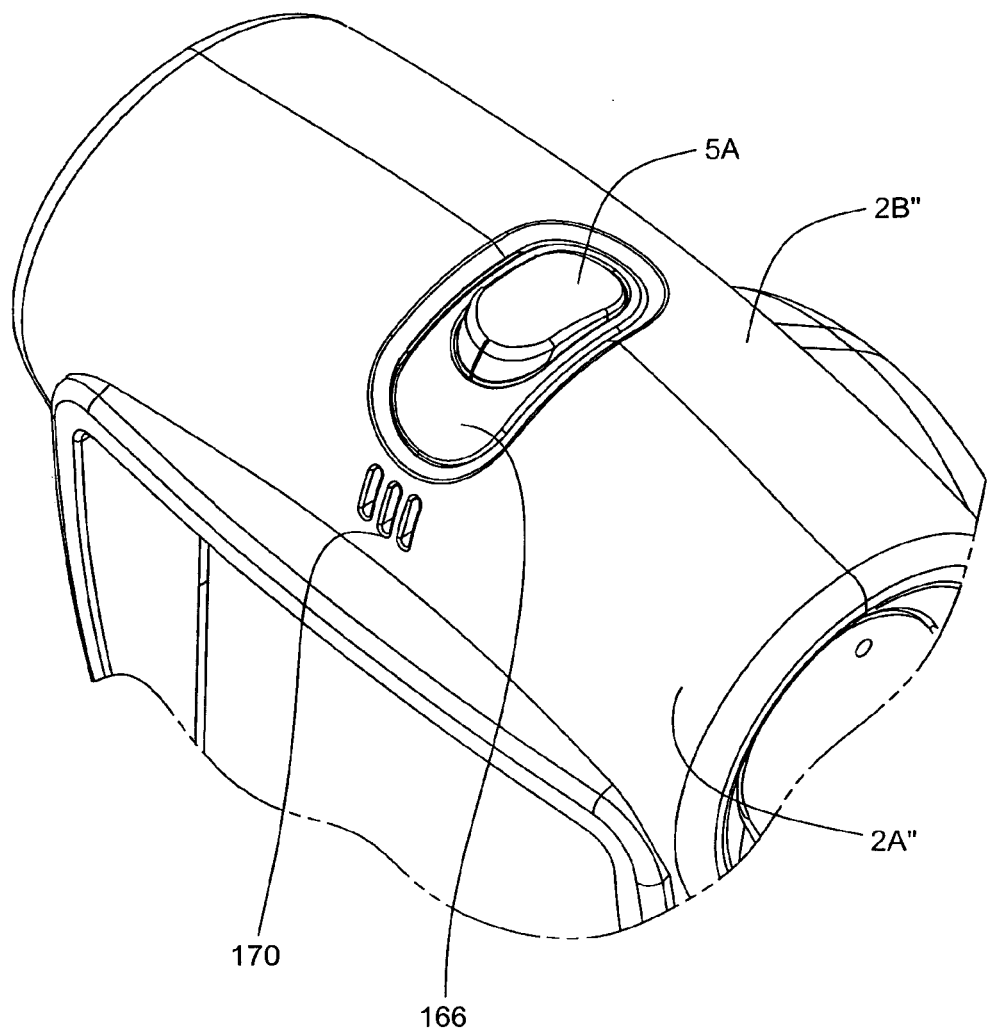
Figure 38A:
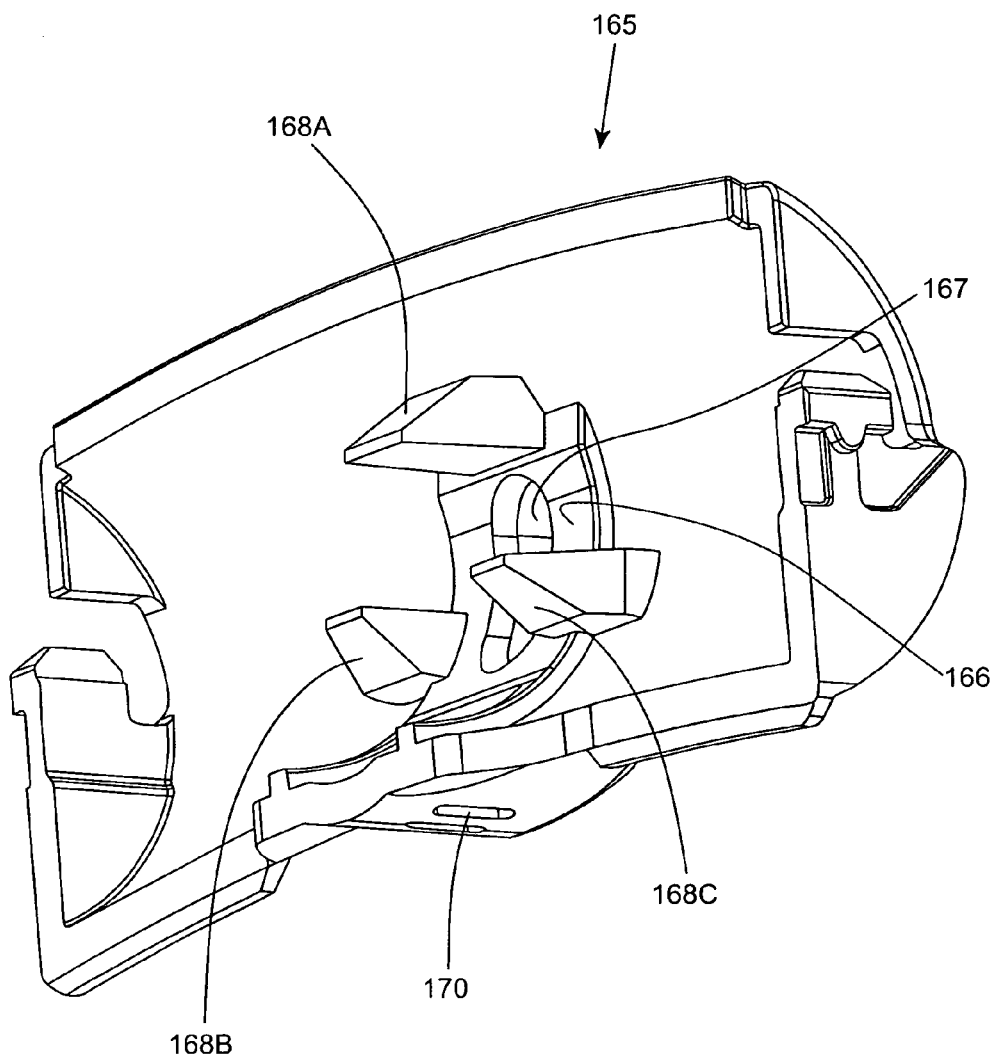
Figure 38B:
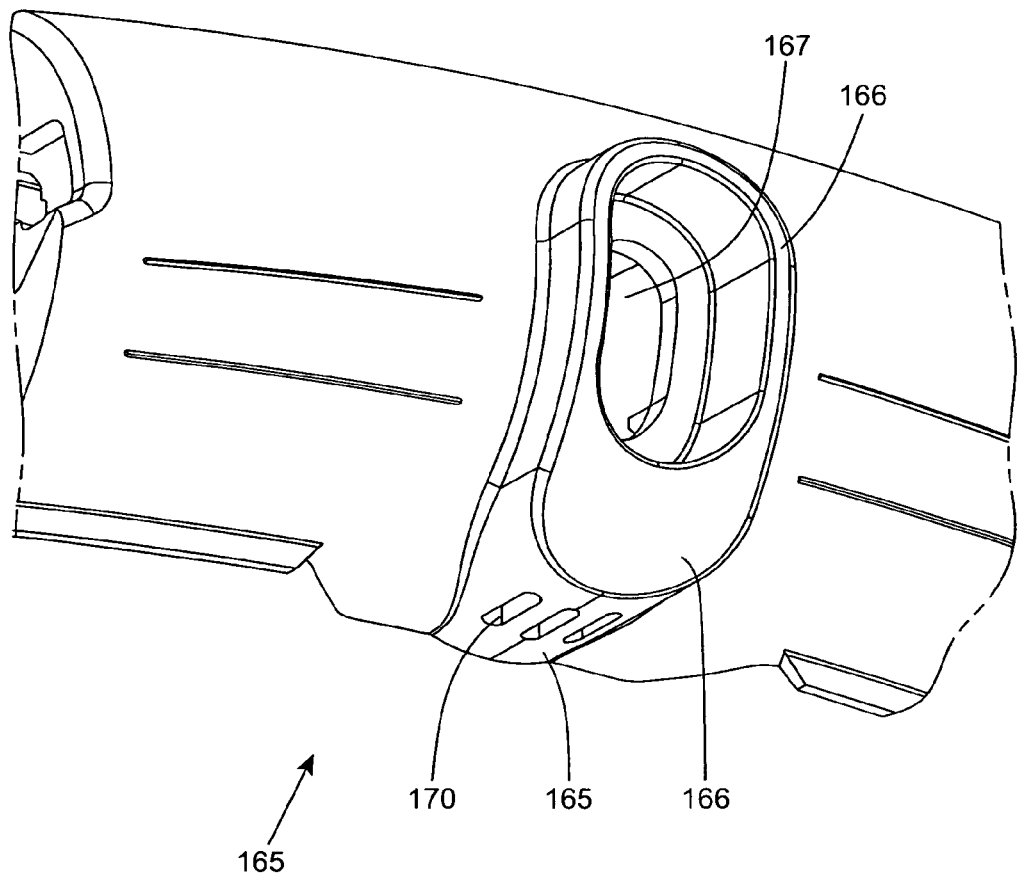
Figure 39A:
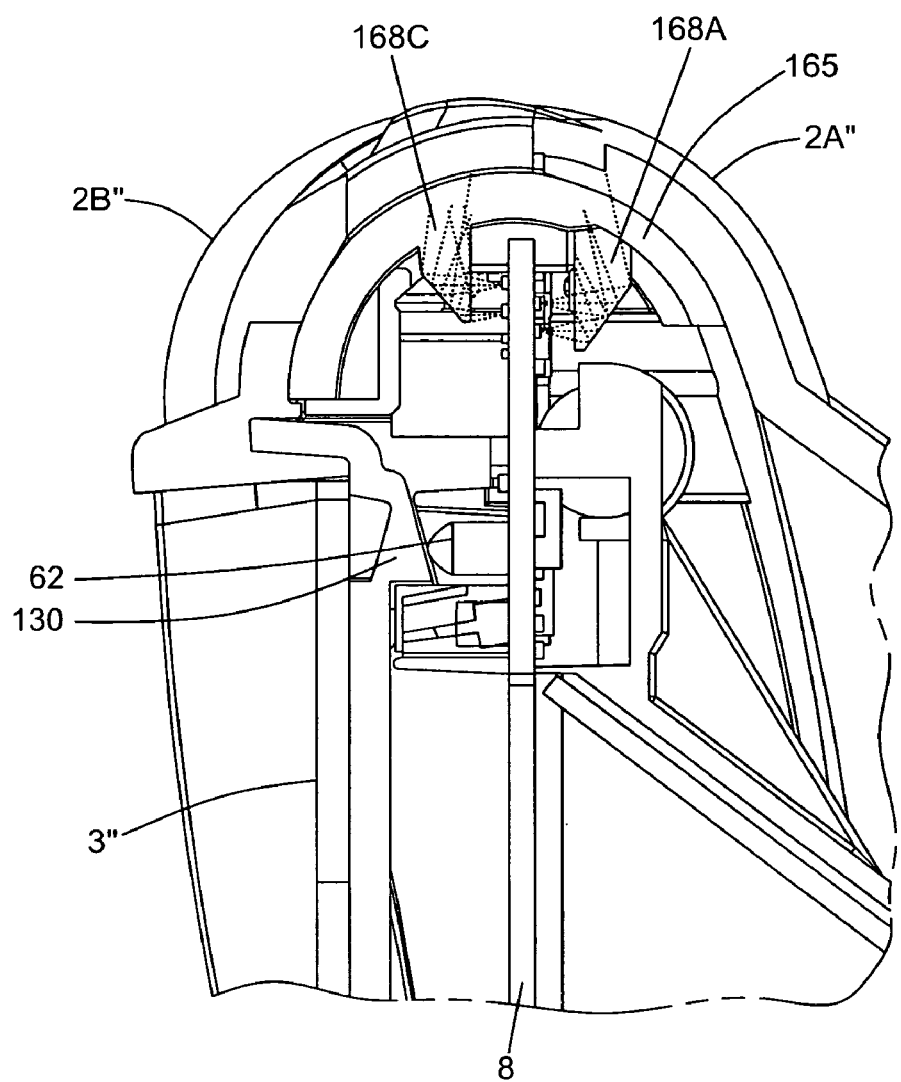
Figure 39B:
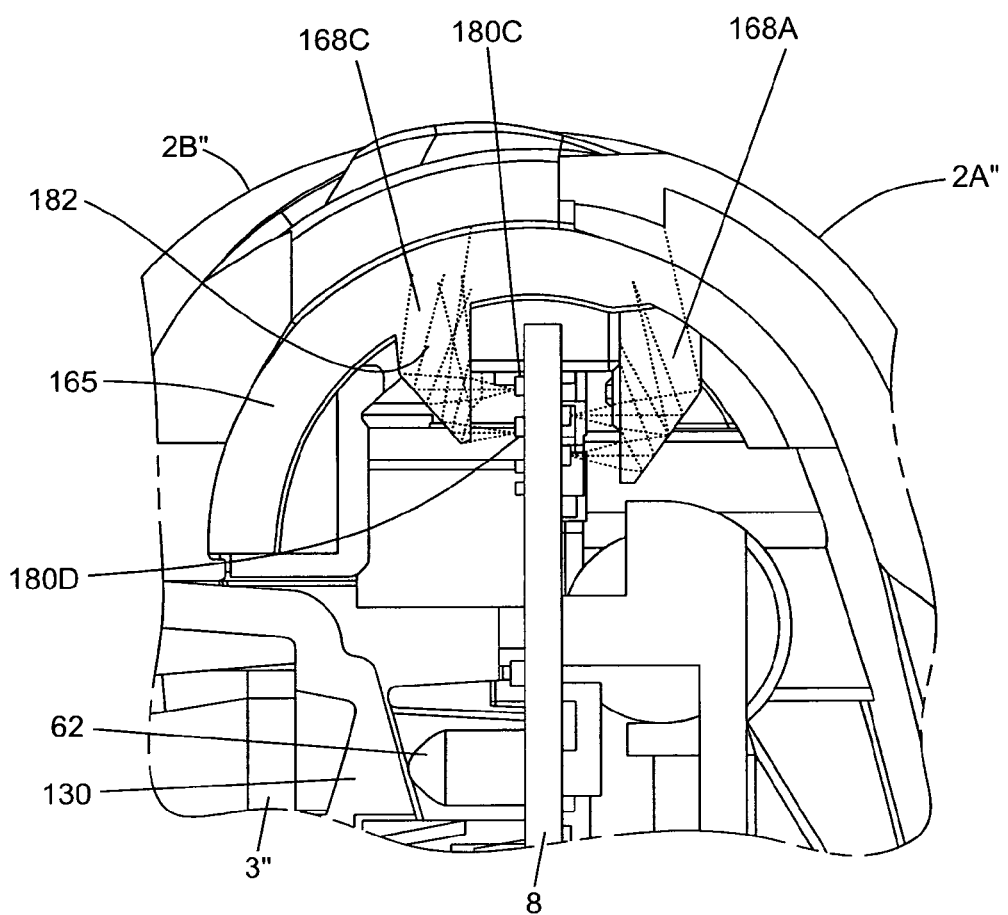
Figure 39C:
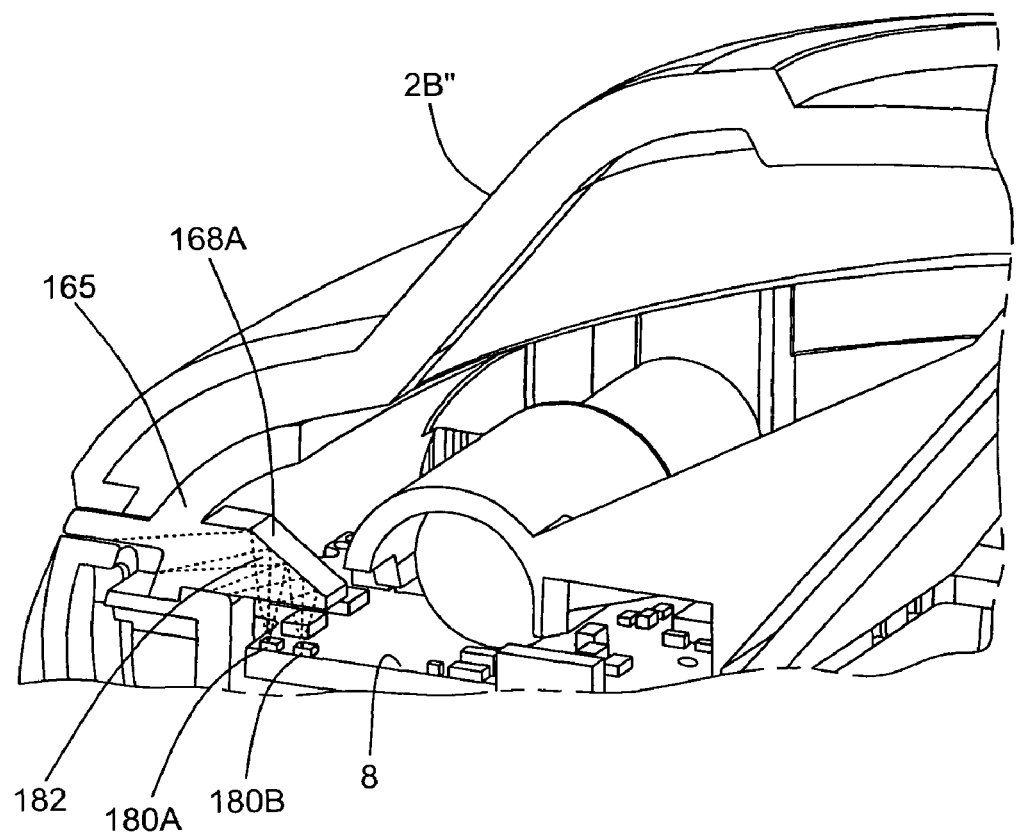
Figure 39D:
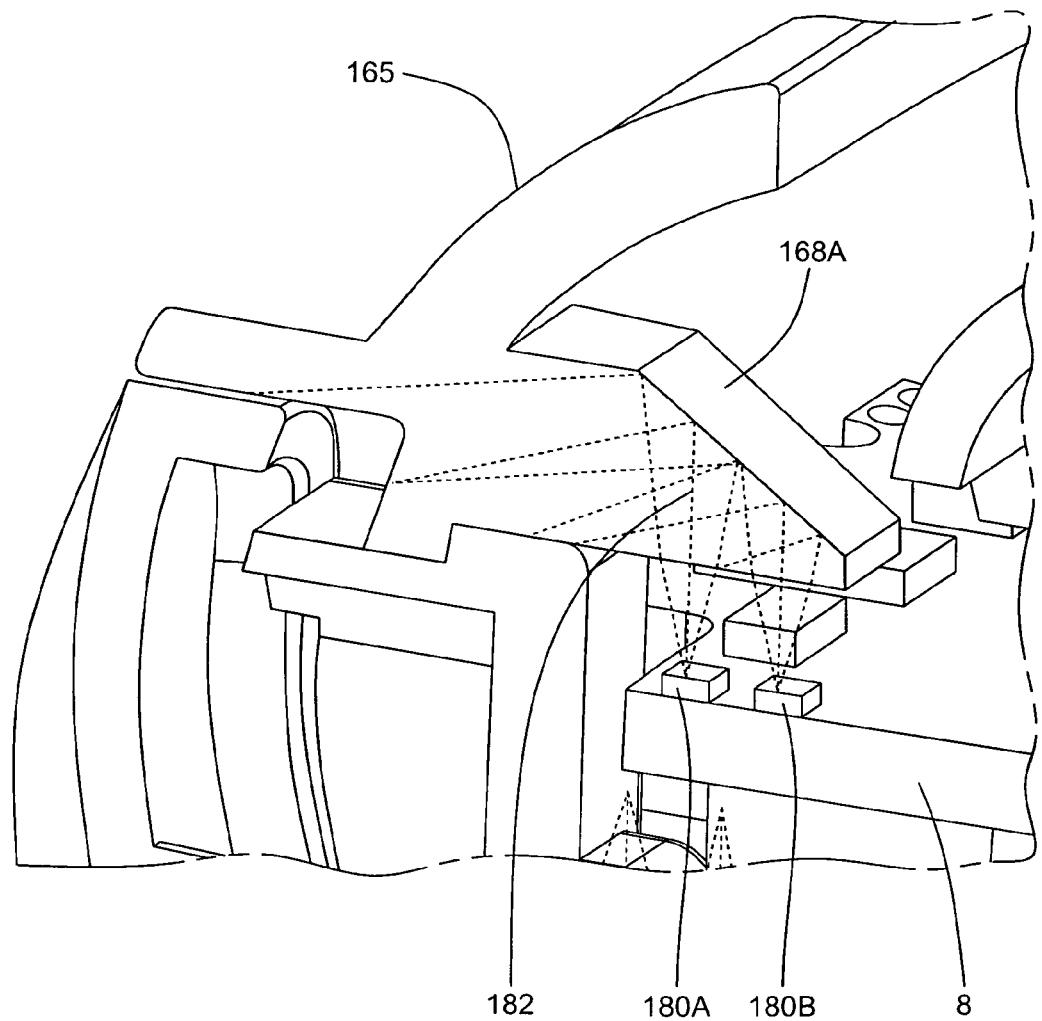
Figure 40:
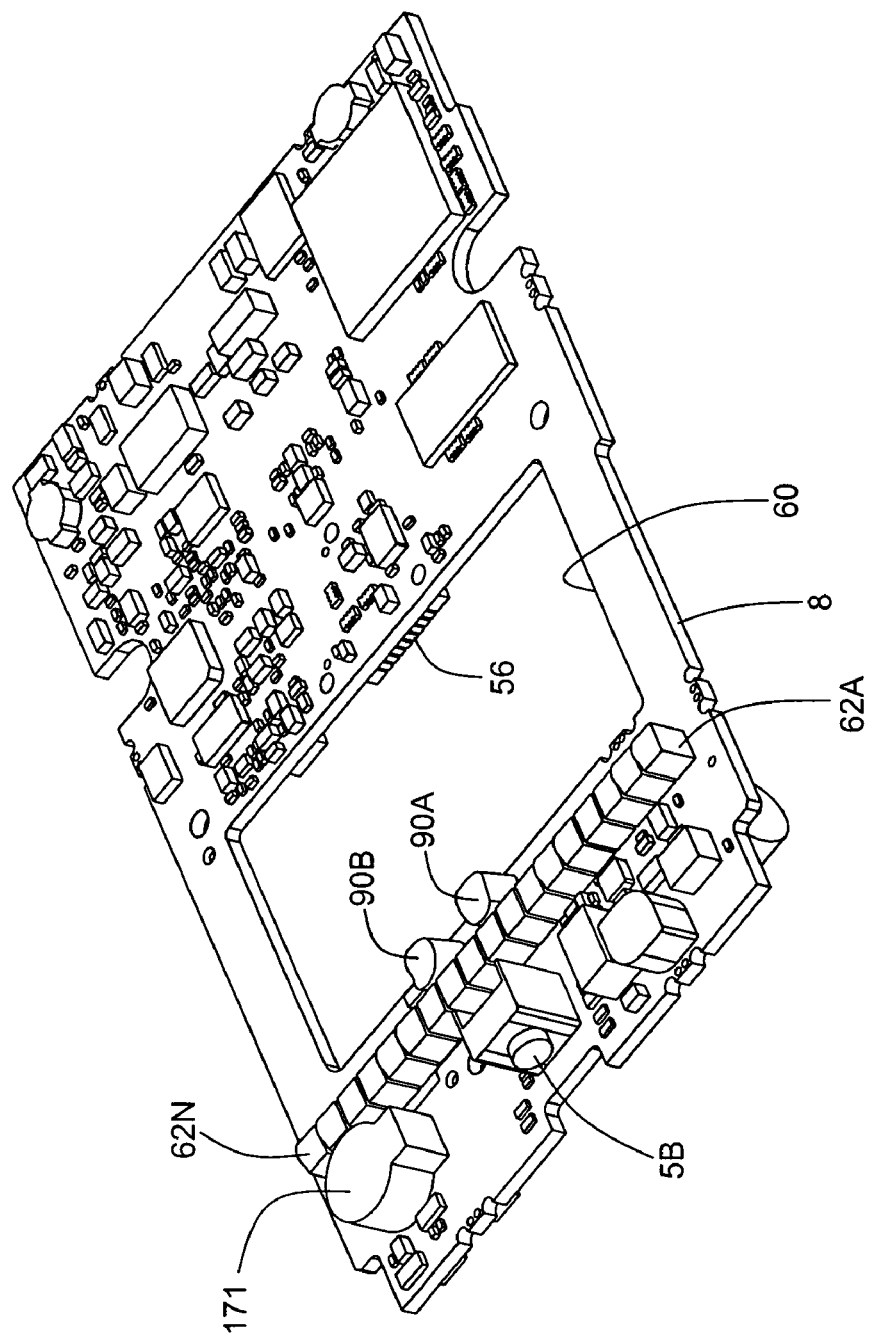
Figure 41A:
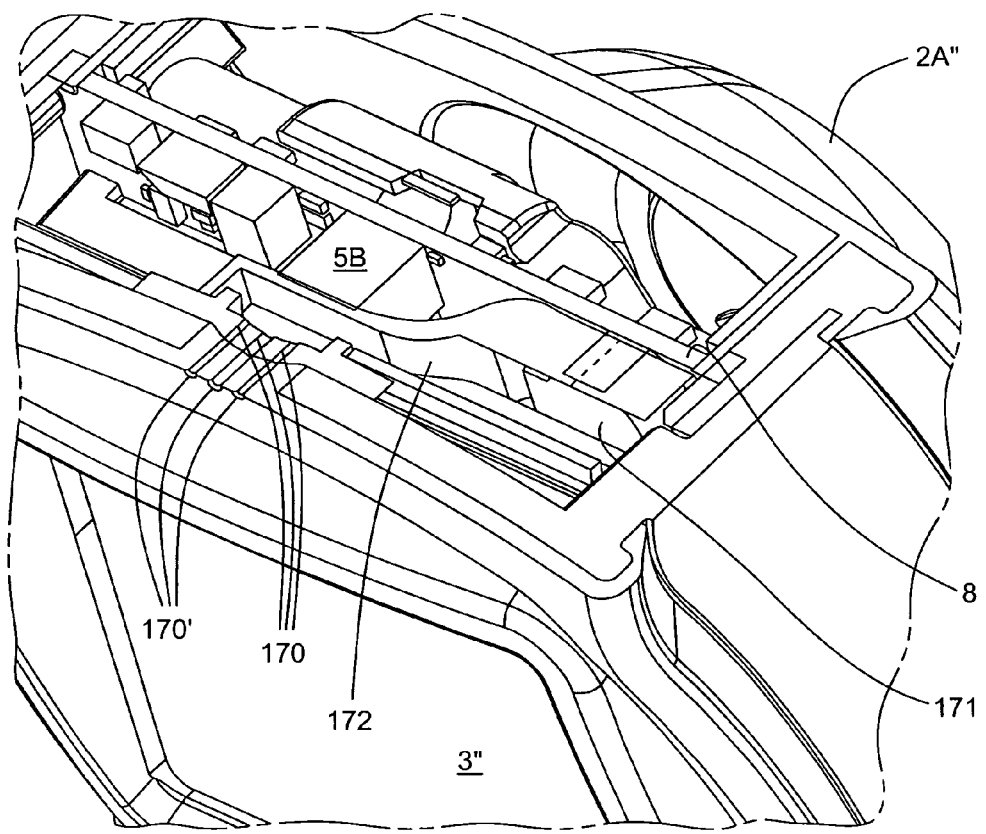
Figure 41B:
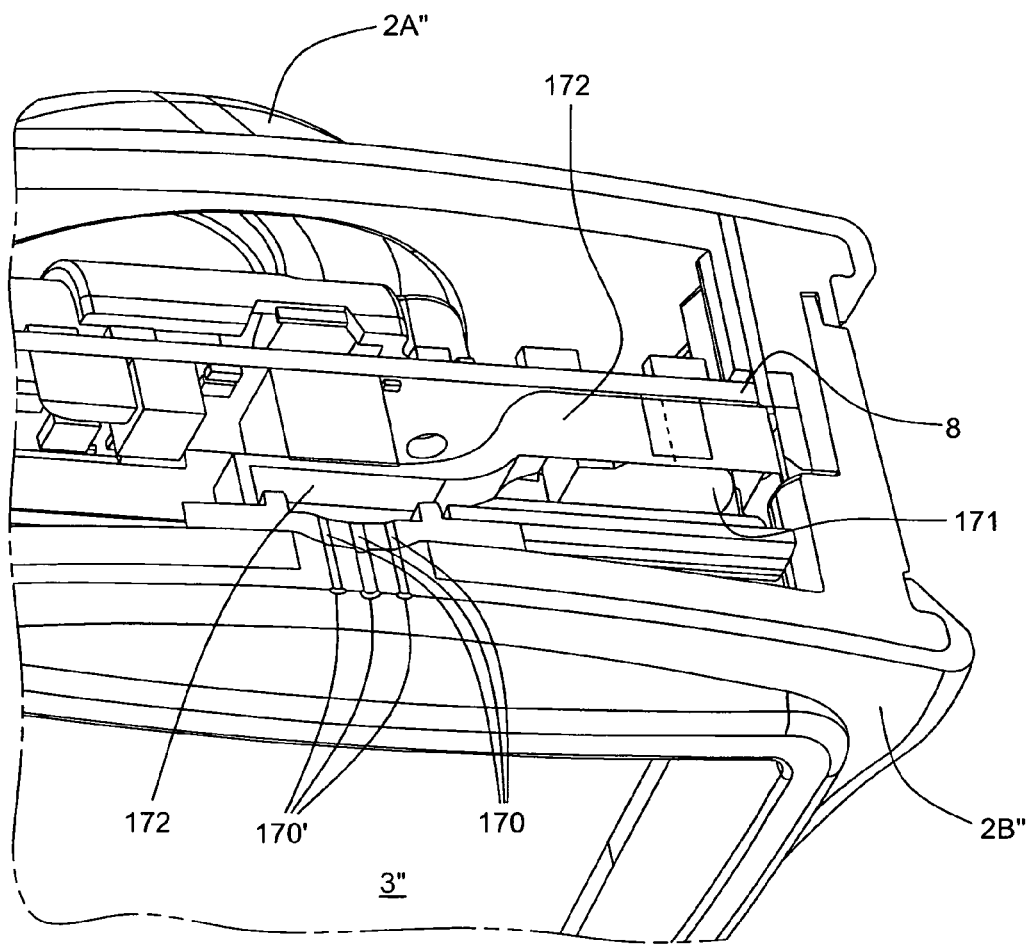
Figure 43A:
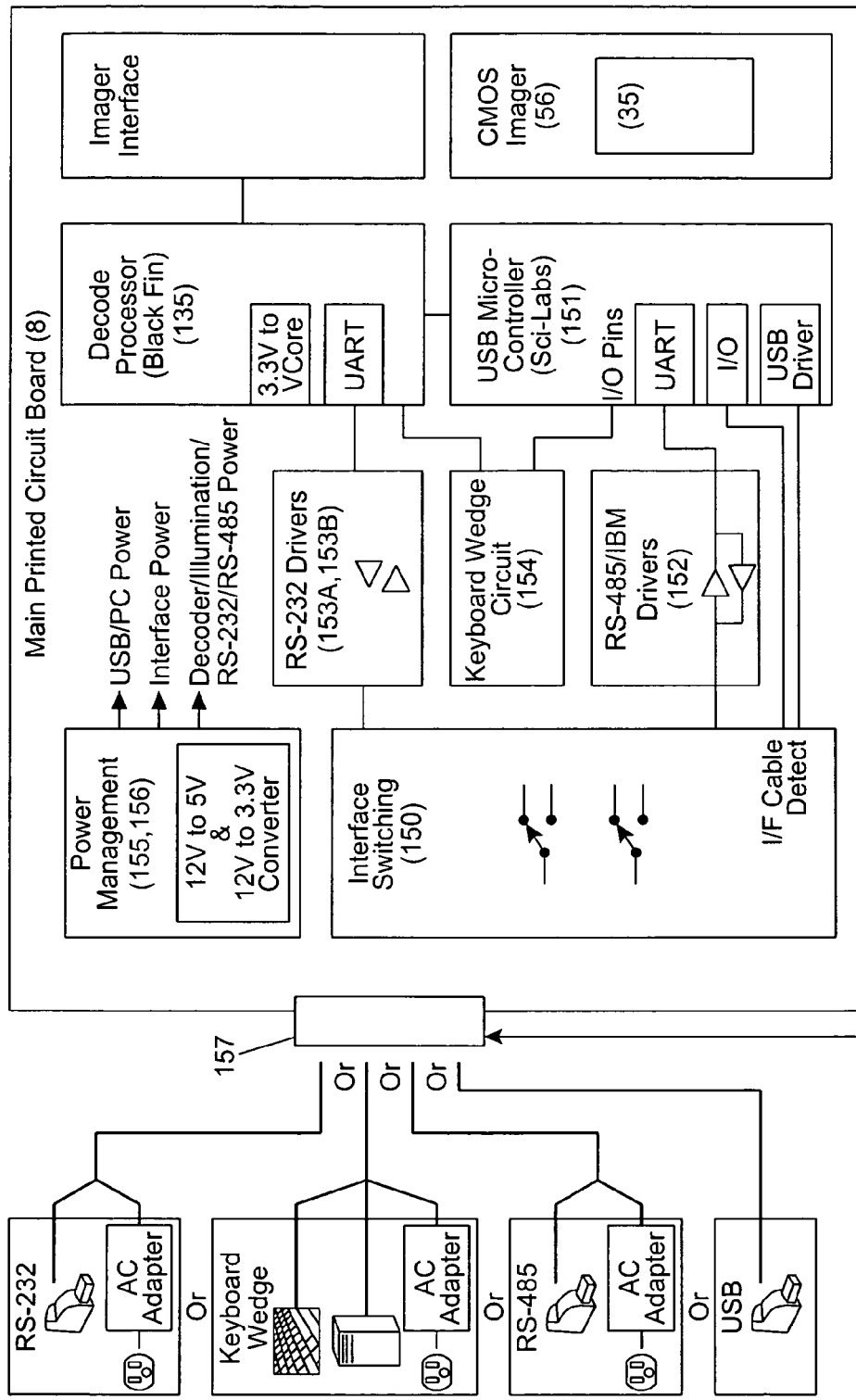
Figure 43D:
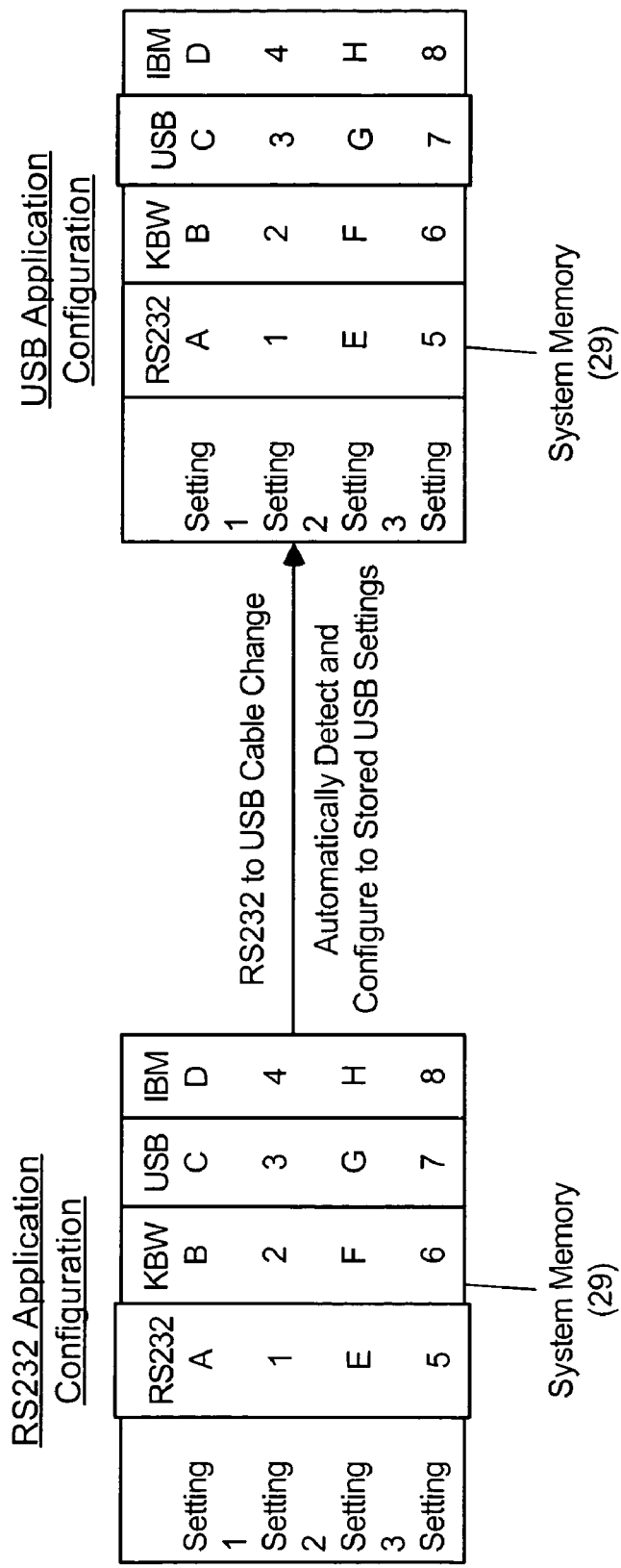
Figure 44:
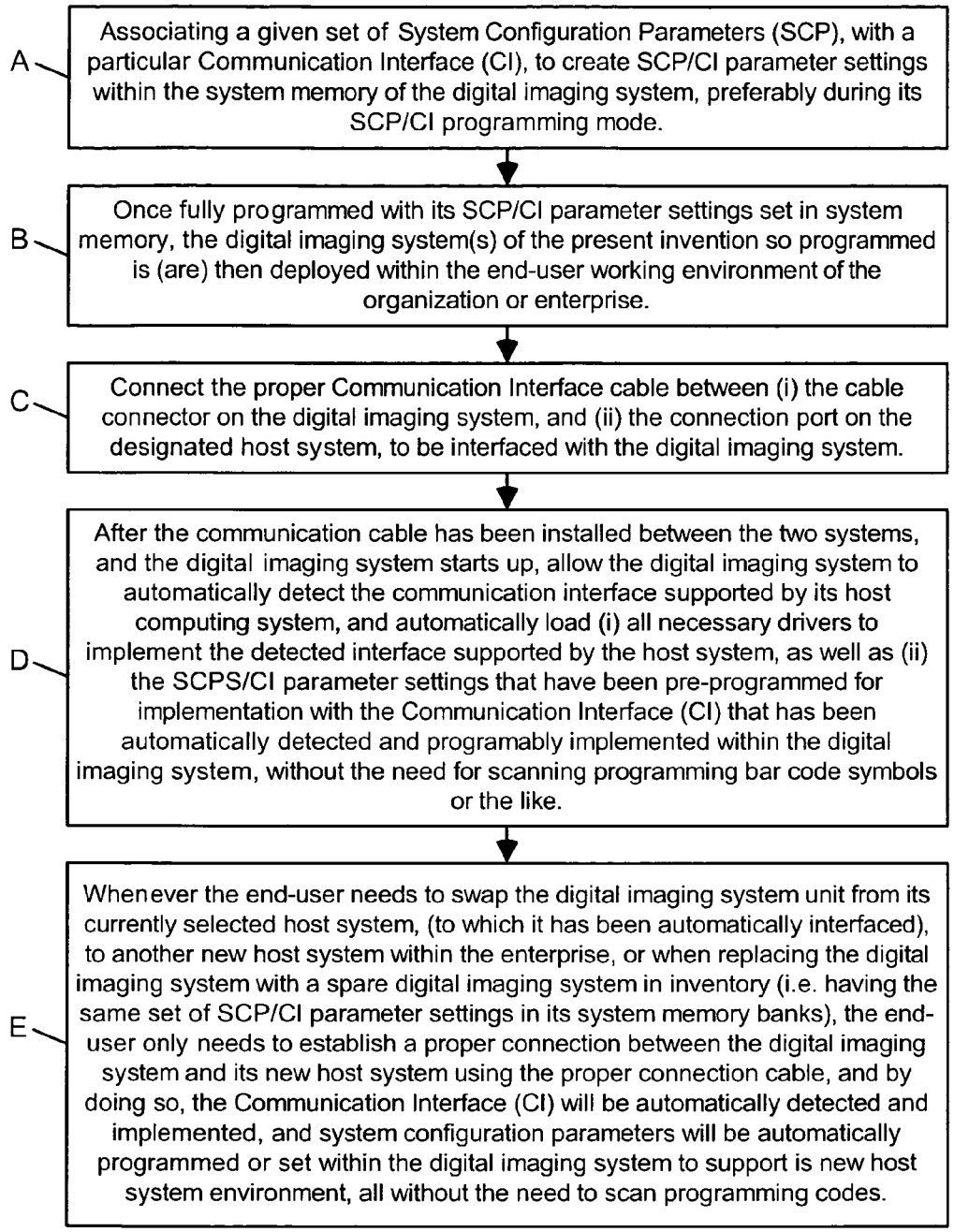
Figure 45:
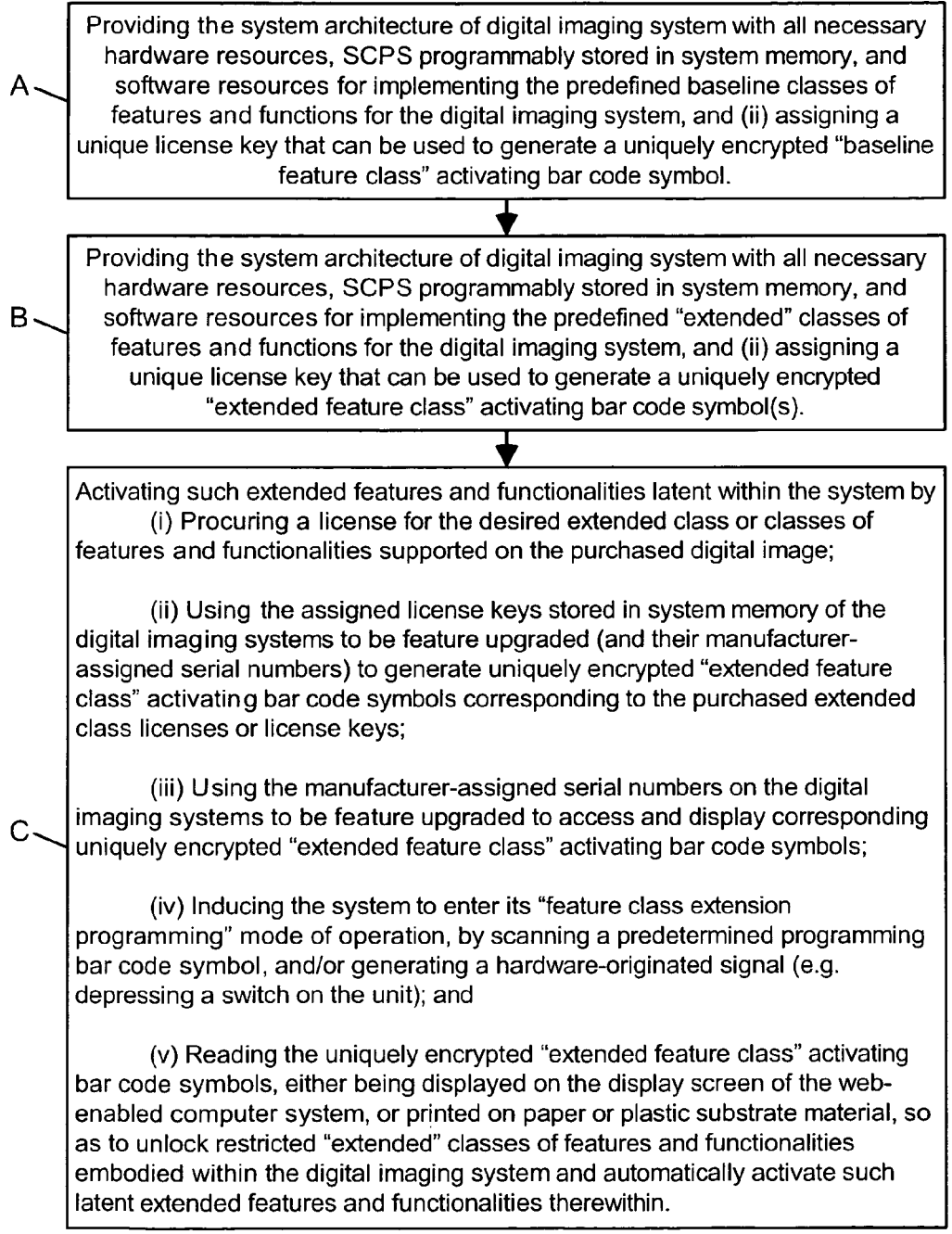
Figure 46A:
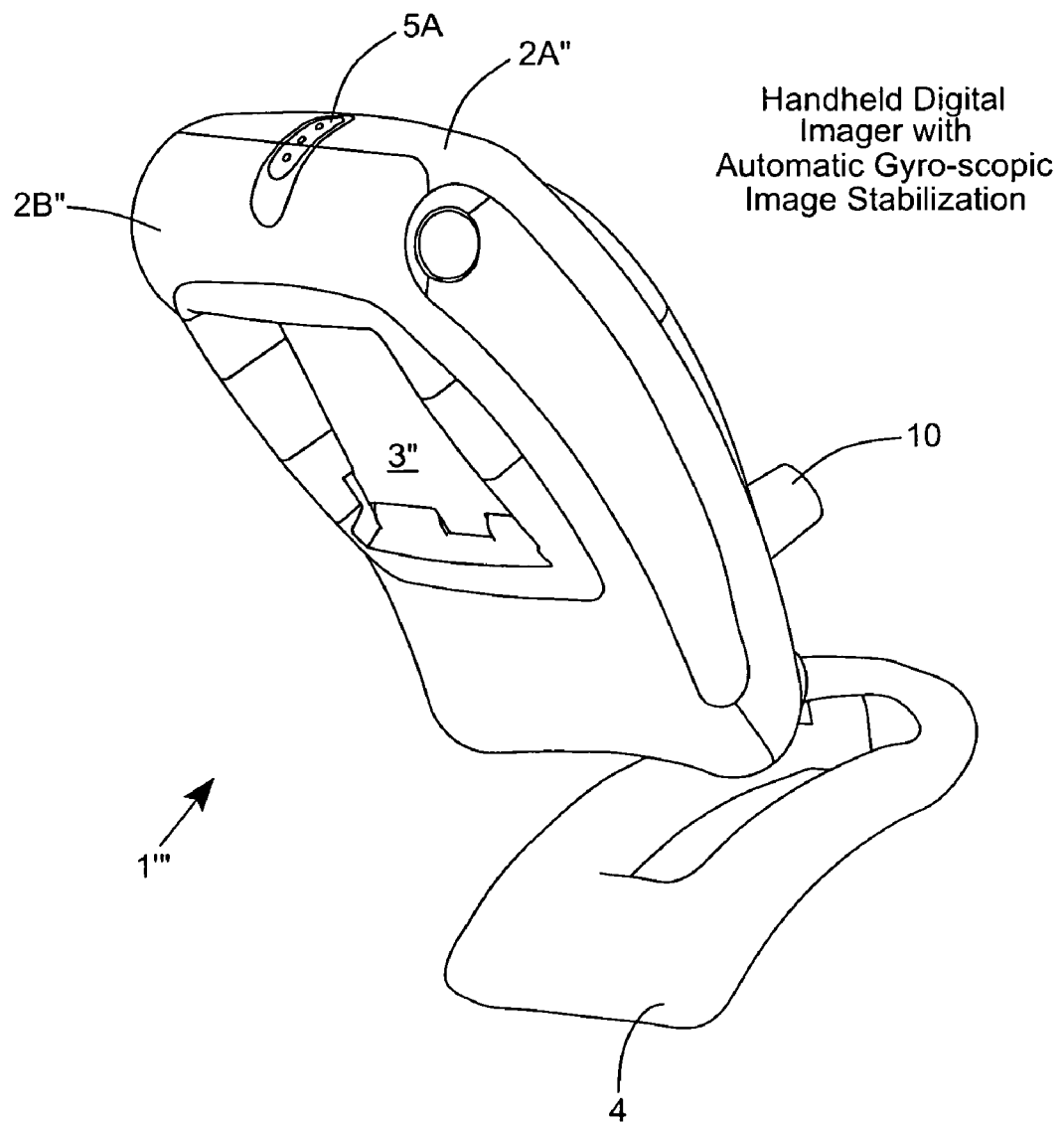
Figure 46B:
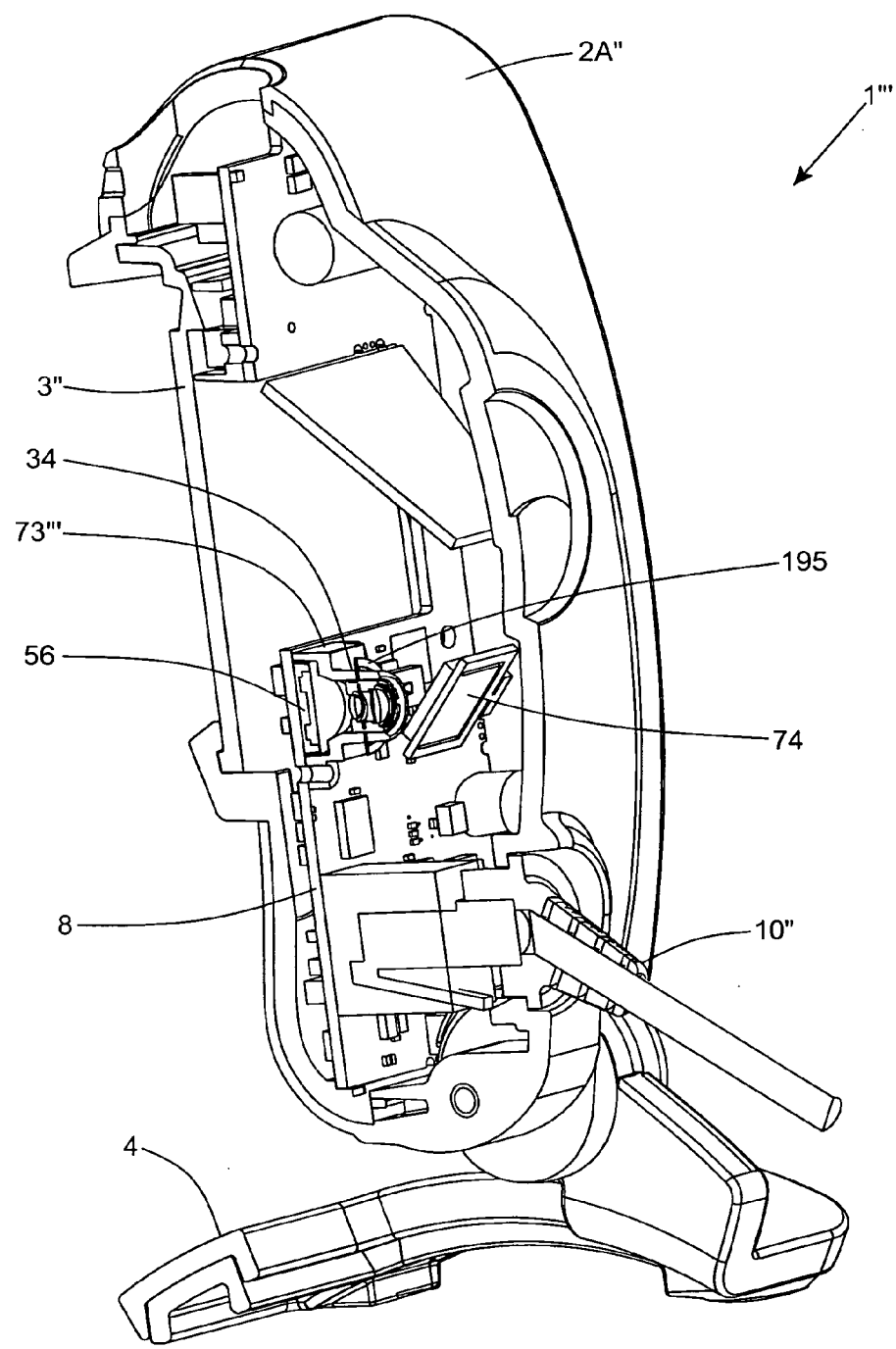

FIG. 2 is a schematic block diagram representative of a system design for the hand-supportable digital image capture and processing system illustrated in FIGS. 1A through 1F, wherein the system design is shown comprising (1) an image formation and detection (i.e. IFD or Camera) subsystem having image formation (camera) optics for producing a field of view (FOV) upon an object to be imaged and a CMOS or like area-type image detection array for detecting imaged light reflected off the object during illumination operations in an image capture mode in which multiple rows of the image detection array, (2) an LED-based multi-mode illumination subsystem employing wide-area LED illumination arrays for producing fields of narrow-band wide-area illumination within both the near-field and far-field portions of the FOV of the image formation and detection subsystem, which is reflected from the illuminated object, transmitted through a narrow-band transmission-type optical filter realized within the hand-supportable housing and detected by the image detection array while all other components (i.e. wavelengths) of ambient light are substantially rejected, (3) an object targeting illumination subsystem (4) an IR-based object motion detection and analysis subsystem for producing an IR-based object detection field within the FOV of the image formation and detection subsystem, (5) an automatic light exposure measurement and illumination control subsystem for controlling the operation of the LED-based multi-mode illumination subsystem, (6) an image capturing and buffering subsystem for capturing and buffering 2-D images detected by the image formation and detection subsystem, (7) a digital image processing subsystem for processing images captured and buffered by the Image Capturing and Buffering Subsystem and reading 1D and 2D bar code symbols represented, and (8) an Input/Output Subsystem for outputting processed image data and the like to an external host system or other information receiving or responding device, in which each said subsystem component is integrated about (9) a System Control Subsystem, as shown;

FIG. 3 is a schematic diagram representative of a system implementation for the hand-supportable digital image capture and processing system illustrated in FIGS. 1A through 2, wherein the system implementation is shown comprising a single board carrying components realizing (i) electronic functions performed by the Multi-Mode LED-Based Illumination Subsystem and the automatic light exposure measurement and illumination control subsystem, (2) a high resolution CMOS image sensor array with randomly accessible region of interest (ROI) window capabilities, realizing electronic functions performed by the multi-mode area-type image formation and detection subsystem, (3) a 64-Bit microprocessor supported by (i) an expandable flash memory and (ii) SDRAM, (4) an FPGA FIFO configured to control the camera timings and drive an image acquisition process, (5) a power management module for the MCU adjustable by the system bus, and (6) a pair of UARTs (one for an IRDA port and one for a JTAG port), (7) an interface circuitry for realizing the functions performed by the I/O subsystem, and (8) an IR-based object motion detection and analysis circuitry for realizing the IR-based object motion detection and analysis subsystem;

FIG. 4A is a perspective view of the hand-supportable digital image capture and processing system of the first illustrative embodiment, wherein the front portion of the hand-supportable housing has been removed revealing both the far-field and near-field lens arrays arranged in registration over the far-field and near-field LED illumination arrays within the system, LED driver circuitry, automatic object motion detection and analysis circuitry, and other circuits;

FIG. 4B is a perspective view of the hand-supportable digital image capture and processing system of the first illustrative embodiment, wherein the front portion of the hand-supportable housing as well as the far-field and near-field lens arrays are removed so as to reveal the underlying single printed circuit (PC) board/optical bench populated with the far-field and near-field LED illumination arrays, LED driver circuitry, automatic object motion detection and analysis circuitry, and other circuits;

FIG. 4C is another perspective view of the hand-supportable digital image capture and processing system of the first illustrative embodiment, wherein the front portion of the hand-supportable housing has been removed revealing both the far-field and near-field lens arrays arranged in registration over the far-field and near-field LED illumination arrays within the system;

FIG. 4D is another perspective view of the far-field and near-field lens arrays employed within the hand-supportable digital image capture and processing system of the first illustrative embodiment shown in FIGS. 1A through 4C;

FIG. 4E is a perspective view of the PC board/optical bench employed within the hand-supportable digital image capture and processing system of the first illustrative embodiment, wherein a light transmission aperture is formed in the PC board, through which the field of view (FOV), and the linear targeting illumination beam passes during system operation, and on the "front-side" of which far-field and near-field LED illumination arrays, area-type image detection arrays, the FOV folding mirrors, the area-type image detecting array, and linear targeting illumination beam optics are mounted, and on the "back-side" of which the IR-based object motion detection and analysis circuitry, the microprocessor and system memory are mounted;

FIG. 4F is a perspective view of the PC board/optical bench employed within the hand-supportable digital image capture and processing system of the first illustrative embodiment, showing the various electro-optical and electronic components mounted on the front-side surface thereof;

FIG. 4G is a perspective view of the back-side of the PC board/optical bench employed within the hand-supportable digital image capture and processing system of the first illustrative embodiment, showing the various electro-optical and electronic components (including the area-type imaging sensing array) mounted on the back-side surface thereof, with the FOV folding mirrors, the area-type image detecting array, and linear targeting illumination beam optics shown removed therefrom;

FIG. 4H is an elevated side cross-sectional view of the hand-supportable digital image capture and processing system of the first illustrative embodiment, showing light rays propagating from the far-field LED illumination array, as well as light rays collected along the FOV of the image formation and detection subsystem;

FIG. 4I is an elevated side cross-sectional view of the hand-supportable digital image capture and processing system of the first illustrative embodiment, showing light rays propagating from the near-field LED illumination array, as well as light rays collected along the FOV of the image formation and detection (IFD) subsystem;

FIG. 5A is an elevated side cross-sectional view of the hand-supportable digital image capture and processing system of the first illustrative embodiment, showing the LED-Based Illumination Subsystem illuminating an object in the FOV with visible narrow-band illumination, and the image formation optics, including the low pass filter before the image detection array, collecting and focusing light rays reflected from the illuminated object, so that an image of the object is formed and detected using only the optical components of light contained within the narrow-band of illumination, while all other components of ambient light are substantially rejected before image detection at the image detection array;

FIG. 5B is a rear perspective view of the hand-supportable digital image capture and processing system of the first illustrative embodiment, shown with the rear portion of the housing removed, and revealing (i) the molded housing portion supporting the FOV folding mirrors of the IFD subsystem, and its narrow-band pass optical filtering structure mounted over the rear portion of the central light transmission aperture formed in the PC board/optical bench, as well as (ii) the illumination sources and optics associated with the linear target illumination subsystem of the present invention mounted about the area-type image detection array of the IFD subsystem;

FIG. 5C is a side perspective view of the PC board/optical bench assembly removed from the hand-supportable digital image capture and processing system of the first illustrative embodiment, and showing the molded housing portion supporting the FOV folding mirrors of the IFD subsystem, mounted over the central light transmission aperture, as well as the illumination sources and optics associated with the linear target illumination subsystem of the present invention, mounted about the area-type image detection array of the IFD subsystem;

FIG. 5D is a schematic representation showing (i) the high-pass (i.e. red-wavelength reflecting) optical filter element embodied within the imaging window of the digital image capture and processing system or embodied within the surface of one of its FOV folding mirrors employed in the IFD subsystem, and (ii) the low-pass optical filter element disposed before its CMOS image detection array or embodied within the surface of another one of the FOV folding mirrors employed in the IFD subsystem, which optically cooperate to form a narrow-band optical filter subsystem for transmitting substantially only the very narrow band of wavelengths (e.g. 620-700 nanometers) of visible illumination produced from the Multi-Mode LED-Based Illumination Subsystem and reflected/scattered off the illuminated object, while rejecting all other optical wavelengths outside this narrow optical band however generated (i.e. ambient light sources);

FIG. 5E1 is a schematic representation of transmission characteristics (energy versus wavelength) associated with the red-wavelength reflecting high-pass imaging window integrated within the hand-supportable housing of the digital image capture and processing system of the present invention, showing that optical wavelengths above 700 nanometers are transmitted and wavelengths below 700 nm are substantially blocked (e.g. absorbed or reflected);

FIG. 5E2 is a schematic representation of transmission characteristics (energy versus wavelength) associated with the low-pass optical filter element disposed after the high-pass optical filter element within the digital image capture and processing system, but before its CMOS image detection array, showing that optical wavelengths below 620 nanometers are transmitted and wavelengths above 620 nm are substantially blocked (e.g. absorbed or reflected);

FIG. 5E3 is a schematic representation of the transmission characteristics of the narrow-based spectral filter subsystem integrated within the hand-supportable image capture and processing system of the present invention, plotted against the spectral characteristics of the LED-emissions produced from the Multi-Mode LED-Based Illumination Subsystem of the illustrative embodiment of the present invention;

FIG. 5F is a schematic representation showing the geometrical layout of the optical components used within the hand-supportable digital image capture and processing system of the first illustrative embodiment, wherein the red-wavelength reflecting high-pass lens element is embodied within the imaging window of the system, while the low-pass filter is disposed before the area-type image detection array so as to image the object at the image detection array using only optical components within the narrow-band of illumination, while rejecting all other components of ambient light;

FIG. 5G is a schematic representation of an alternative auto-focus/zoom optics assembly which can be employed in the image formation and detection subsystem of the hand-supportable digital image capture and processing system of the first illustrative embodiment;

FIG. 6A is a schematic representation of the single frame shutter mode (i.e. snap-shot mode) of the operation supported by the CMOS image detection array employed in the system of the first illustrative embodiment, showing (i) that during the row reset stage (e.g. about 150 milliseconds), only ambient illumination is permitted to expose the image detection array, (ii) that during the global integration operations (e.g. between 500 microseconds and 8.0 milliseconds), both LED-based strobe and ambient illumination are permitted to expose the image detection array, and (iii) that during row data transfer operations (e.g. about 30 milliseconds), only ambient illumination is permitted to illuminate the image detection array;

FIG. 6B is a schematic representation of the real video mode of the operation supported by the CMOS image detection array employed in the system of the first illustrative embodiment, showing (i) that during each image acquisition cycle, including row data transfer operations, multiple rows of the image detection array are simultaneously integrating both LED-based illumination and ambient illumination;

FIG. 6C is a schematic representation of the periodic snap shot ("pseudo-video") mode of the operation supported by the CMOS image detection array employed in the system of the first illustrative embodiment, showing the periodic generation of snap-shot type image acquisition cycles (e.g. each having a duration of approximately 30 milliseconds), followed by a decode-processing cycle having a time-duration approximately equal to the duration of the snap-shot type image acquisition cycle (e.g. approximately 30 milliseconds) so that at least fifteen (15) image frames can be acquired per second;

FIG. 7A is a perspective view of the hand-supportable digital image capture and processing system of the first illustrative embodiment, employing infra-red (IR) transmitting and receiving diodes to implement an IR-based object motion detection and analysis subsystem therein;

FIG. 7B is a schematic representation of the IR-based object motion detection and analysis subsystem of FIG. 7A, shown comprising an IR laser diode, an IR photo-detector, phase detector, AM modulator and other components for generating range indication information from reflected AM IR laser signals transmitted from the IR laser diode and received by the IR photo-detector during system operation;

FIG. 7C is a perspective view of the hand-supportable digital image capture and processing system of the first illustrative embodiment, wherein the front portion of the system housing including the imaging window are removed so as to reveal the underlying single printed circuit (PC) board/optical bench supporting the infra-red (IR) LED and image sensor associated with the IR-imaging based object motion and velocity detection subsystem further illustrated in FIG. 7D;

FIG. 7D is a schematic representation of the IR-imaging based object motion and velocity detection subsystem of FIG. 7C, shown comprising an IR LED, optics for illuminating at least a portion of the field of view with IR illumination, an image detection array for capturing an IR-based image, and a digital signal processor (DSP) for processing captured digital images and computing the motion and velocity of objects in the field of view of the system;

FIG. 7E is a perspective view of the hand-supportable digital image capture and processing system of the first illustrative embodiment, wherein the front portion of the system housing including the imaging window are removed so as to reveal the underlying single printed circuit (PC) board/optical bench supporting a high-speed IR LADAR Pulse-Doppler based object motion and velocity detection subsystem, wherein a pair of pulse-modulated IR laser diodes are focused through optics and projected into the 3D imaging volume of the system for sensing the presence, motion and velocity of objects passing therethrough in real-time using IR Pulse-Doppler LIDAR techniques;

FIG. 7F is a block schematic representation of the high-speed imaging-based object motion/velocity detection subsystem of FIG. 7E, shown comprising an IR LADAR transceiver and an embedded digital signal processing (DSP) chip to support high-speed digital signal processing operations required for real-time object presence, motion and velocity detection;

FIG. 8A is a perspective view of the hand-supportable digital image capture and processing system of the first illustrative embodiment, wherein its object targeting illumination subsystem automatically generates and projects a visible linear-targeting beam across the central extent of the FOV of the system in response to the automatic detection of an object during hand-held imaging modes of system operation;

FIG. 8B is an elevated front view of the hand-supportable digital image capture and processing system of the first illustrative embodiment, as shown in FIG. 8B, wherein its object targeting illumination subsystem automatically generates and projects a visible linear-targeting beam across the central extent of the FOV of the system in response to the automatic detection of an object during hand-held imaging modes of system operation;

FIG. 8C is a perspective cross-sectional view of the hand-supportable digital image capture and processing system of the first illustrative embodiment, as shown in FIGS. 8A and 8B, wherein its object targeting illumination subsystem automatically generates and projects a linear visible targeting beam across the central extent of the FOV of the system in response to the automatic detection of an object during hand-held imaging modes of system operation;

FIG. 8D is an elevated side cross-sectional view of the hand-supportable digital image capture and processing system of the first illustrative embodiment, as shown in FIGS. 8A through 8C, wherein its object targeting illumination subsystem automatically generates and projects a linear visible targeting beam, from a pair of visible LEDs and rectangular aperture stops mounted adjacent the image detection array of the system, a pair of cylindrical-type beam shaping and folding mirrors mounted above the LEDs, and a planar beam folding mirror mounted behind the imaging window of the system;

FIG. 8E is an elevated side cross-sectional, enlarged view of the hand-supportable digital image capture and processing system of the first illustrative embodiment, as shown in FIGS. 8A through 8D, wherein its object targeting illumination subsystem automatically generates and projects a linear visible targeting beam, from a pair of visible LEDs and rectangular aperture stops mounted adjacent the image detection array of the system, a pair of cylindrical-type beam shaping and folding mirrors mounted above the LEDs, and a planar beam folding mirror mounted behind the imaging window of the system;

FIGS. 8F and 8G are perspective views of the hand-supportable digital image capture and processing system of the first illustrative embodiment, as shown in FIGS. 8A through 8D, wherein its rear housing portion is removed so as to reveal, in greater detail, the subcomponents of the object targeting illumination subsystem of the present invention, which automatically generates and projects a linear visible targeting illumination beam, from a pair of visible LEDs, a pair of rectangular aperture stops mounted adjacent the image detection array, a pair of cylindrical-type beam shaping and folding mirrors mounted above the LEDs, and a planar beam folding mirror mounted behind the imaging window of the system;

FIG. 8H is perspective, cross-sectional view of the hand-supportable digital image capture and processing system of the first illustrative embodiment, as shown in FIGS. 8A through 8D, wherein its rear housing portion is removed so as to reveal, in greater detail, half of the subcomponents of the object targeting illumination subsystem of the present invention, which automatically generates and projects half of the linear visible targeting illumination beam, from a visible LED, rectangular aperture stop, a cylindrical-type beam shaping and folding mirror mounted above the visible LED, and a planar beam folding mirror mounted behind the imaging window of the system;

FIG. 9A is a top perspective view of the hand-supportable digital image capture and processing system of the first illustrative embodiment, as illustrated in FIGS. 8A through 8H, and showing the optical path of central light rays propagating towards the parabolic light reflecting/collecting mirror and avalanche-type photodiode associated with the automatic light exposure measurement and illumination control subsystem, and compactly arranged within the hand-supportable digital image capture and processing system of the illustrative embodiment, wherein incident illumination is collected from a selected portion of the center of the FOV of the system using the spherical light collecting mirror, and then focused upon a photodiode for detection of the intensity of reflected illumination and subsequent processing by the automatic light exposure measurement and illumination control subsystem, so as to control the illumination produced by the LED-based multi-mode illumination subsystem employed in the digital image capture and processing system of the present invention;

FIG. 9B is a side perspective view of the hand-supportable digital image capture and processing system of the first illustrative embodiment, as illustrated in FIGS. 8A through 9A, showing the optical path of central light rays propagating towards the spherical/parabolic light reflecting/collecting mirror and photodiode associated with the automatic light exposure measurement and illumination control subsystem, and compactly arranged within the hand-supportable digital image capture and processing system of the illustrative embodiment, wherein incident illumination is collected from a selected portion of the center of the FOV of the system using the spherical light collecting mirror, and then focused upon a photodiode for detection of the intensity of reflected illumination and subsequent processing by the automatic light exposure measurement and illumination control subsystem, so as to then control the illumination produced by the LED-based multi-mode illumination subsystem employed in the digital image capture and processing system of the present invention;

FIG. 9C is a first elevated side cross-sectional view of the hand-supportable digital image capture and processing system of the first illustrative embodiment, as illustrated in FIGS. 8A through 9B, showing the optical path of central light rays propagating towards of the spherical/parabolic light reflecting/collecting mirror and photodiode associated with the automatic light exposure measurement and illumination control subsystem, and compactly arranged within the hand-supportable digital image capture and processing system of the illustrative embodiment, wherein incident illumination is collected from a selected portion of the center of the FOV of the system using the spherical light collecting mirror, and then focused upon a photodiode for detection of the intensity of reflected illumination and subsequent processing by the automatic light exposure measurement and illumination control subsystem, so as to then control the illumination produced by the LED-based multi-mode illumination subsystem employed in the digital image capture and processing system of the present invention;

FIG. 10 is a block-type schematic diagram for the hand-supportable digital image capture and processing system of the first illustrative embodiment, illustrating the control processes carried out when particular illumination and imaging modes of operation are enabled by the system during its modes of system operation;

FIG. 11A is a signal timing diagram describing the timing of signals generated within the control architecture of the system of the first illustrative embodiment, when the snap-shot mode of operation is selected;

FIG. 11B is an event timing diagram describing the timing of events within the area-type digital image detection array during its snap-shot mode of operation in the system of the first illustrative embodiment;

FIG. 12A is a signal timing diagram describing the timing of signals generated within the control architecture of the system of the first illustrative embodiment, when the Video Mode of operation is selected;

FIG. 12B is an event timing diagram describing the timing of events within the area-type digital image detection array during its video mode of operation in the system of the first illustrative embodiment;

FIG. 12C is a signal timing diagram describing the timing of signals generated within the control architecture of the system of the first illustrative embodiment, when the Pseudo-Video Mode of operation is selected;

FIG. 12D is an event timing diagram describing the timing of events within the area-type digital image detection array during its pseudo-video mode of operation in the system of the first illustrative embodiment;

FIG. 13 is a schematic representation showing the software modules associated with the three-tier software architecture of the hand-supportable digital image capture and processing system of the present invention, namely: the Main Task module, the Secondary Task module, the Linear Targeting Illumination Beam Task module, the Area-Image Capture Task module, the Application Events Manager module, the User Commands Table module, the Command Handler module, Plug-In Controller, and Plug-In Libraries and Configuration Files, all residing within the Application layer of the software architecture; the Tasks Manager module, the Events Dispatcher module, the Input/Output Manager module, the User Commands Manager module, the Timer Subsystem module, the Input/Output Subsystem module and the Memory Control Subsystem module residing with the System Core (SCORE) layer of the software architecture; and the Linux Kernal module in operable communication with the Plug-In Controller, the Linux File System module, and Device Drivers modules residing within the Linux Operating System (OS) layer of the software architecture, and in operable communication with an external (host) Plug-In Development Platform via standard or proprietary communication interfaces;

FIG. 14A1 is a perspective view of the hand-supportable digital image capture and processing system of the first illustrative embodiment, shown operated according to a method of hand-held digital imaging for the purpose of reading bar code symbols from a bar code symbol menu, involving the generation of a visible linear target illumination beam from the system, targeting a programming code symbol therewith, and then illuminating the bar code symbol with wide-field illumination during digital imaging operations over a narrowly-confined active region in the FOV centered about the linear targeting beam;

FIG. 14A2 is a perspective cross-sectional view of the hand-supportable digital image capture and processing system of the first illustrative embodiment in FIG. 14A1, shown operated according to the method of hand-held digital imaging used to read bar code symbols from a bar code symbol menu, involving the steps of (i) generating a visible linear target illumination beam from the system, (ii) targeting a programming-type code symbol therewithin, and then (iii) illuminating the bar code symbol within a wide-area field of illumination during digital imaging operations over a narrowly-confined active region in the FOV centered about the linear targeting beam;

FIGS. 15A1 through 15A3, taken together, show a flow chart describing the control process carried out within the countertop-supportable digital image capture and processing system of the first illustrative embodiment during its first hands-free (i.e. presentation/pass-through) method of digital imaging in accordance with the principles of the present invention, involving the use of its automatic object motion detection and analysis subsystem and both of its snap-shot and video (imaging) modes of subsystem operation;

FIG. 15B is a graphical illustration describing the countertop-supportable digital image capture and processing system of the present invention configured according to the control process of FIGS. 15A1 through 15A3, and showing its IR-based object detection field automatically sensing the presence of objects within the field of view (FOV) of the system, above a countertop surface;

FIG. 15C is a graphical illustration describing the countertop-supportable digital image capture and processing system of the present invention configured according to the control process of FIG. 15A, and showing its image formation and detection subsystem operating in its video mode of operation for a first predetermined time period;

FIG. 15D is a graphical illustration describing the countertop-supportable digital image capture and processing system of the present invention configured according to the control process of FIG. 15A, and showing its image formation and detection subsystem operating in its snap-shot mode of operation for a first predetermined time period;

FIG. 16A is a flow chart describing the control process carried out within the countertop-supportable digital image capture and processing system of the first illustrative embodiment during its second hands-free method of digital imaging in accordance with the principles of the present invention, involving the use of its automatic object motion detection and analysis subsystem and snap-shot imaging mode of subsystem operation;

FIG. 16B is a graphical illustration describing the countertop-supportable digital image capture and processing system of the present invention configured according to the control process of FIG. 16A, and showing its IR-based object detection field automatically sensing the presence of objects within the field of view (FOV) of the system, above a countertop surface;

FIG. 16C is a graphical illustration describing the countertop-supportable digital image capture and processing system of the present invention configured according to the control process of FIG. 16A, showing the projection of its linear object targeting illumination beam upon automatic detection of an object within its FOV;

FIG. 16D is a graphical illustration describing the countertop-supportable digital image capture and processing system of the present invention configured according to the control process of FIG. 16A, and showing its image formation and detection subsystem operating in its snap-shot mode of operation for a first predetermined time period, to repeatedly attempt to read a bar code symbol within one or more digital images captured during system operation;

FIGS. 17A1 and 17A2, taken together, shows a flow chart describing the control process carried out within the countertop-supportable digital image capture and processing system of the first illustrative embodiment during its third hands-free method of digital imaging in accordance with the principles of the present invention, involving the use of its automatic object motion detection and analysis subsystem and video imaging mode of subsystem operation;

FIG. 17B is a graphical illustration describing the countertop-supportable digital image capture and processing system of the present invention configured according to the control process of FIG. 17A, and showing its IR-based object detection field automatically sensing the presence of objects within the field of view (FOV) of the system, above a countertop surface;

FIG. 17C is a graphical illustration describing the countertop-supportable digital image capture and processing system of the present invention configured according to the control process of FIG. 17A, and showing its image formation and detection subsystem operating in its video mode of operation for a first predetermined time period to repeatedly attempt to read a bar code symbol within one or more digital images captured during system operation;

FIG. 18A is a flow chart describing the control process carried out within the hand-supportable digital image capture and processing system of the first illustrative embodiment during its first hand-held method of digital imaging in accordance with the principles of the present invention, involving the use of its automatic object motion detection and analysis subsystem and snap-shot imaging mode of subsystem operation;

FIG. 18B is a graphical illustration describing the hand-supportable digital image capture and processing system of the present invention configured according to the control process of FIG. 18A, and showing its IR-based object detection field automatically sensing the presence of objects within the field of view (FOV) of the system, above a countertop surface;

FIG. 18C is a graphical illustration describing the hand-supportable digital image capture and processing system of the present invention configured according to the control process of FIG. 18A, showing the projection of its linear targeting illumination beam upon automatic detection of an object within its FOV;

FIG. 18D is a graphical illustration describing the hand-supportable digital image capture and processing system of the present invention configured according to the control process of FIG. 18A, and showing its image formation and detection subsystem operating in its snap-shot mode of operation for a first predetermined time period to repeatedly attempt to read a bar code symbol within one or more digital images captured during system operation;

FIGS. 19A1 through 19A2, taken together, show a flow chart describing the control process carried out within the hand-supportable digital image capture and processing system of the first illustrative embodiment during its second hand-held method of digital imaging in accordance with the principles of the present invention, involving the use of its automatic object motion detection and analysis subsystem and video imaging mode of subsystem operation;

FIG. 19B is a graphical illustration describing the hand-supportable digital image capture and processing system of the present invention configured according to the control process of FIG. 19A, and showing its IR-based object detection field automatically sensing the presence of objects within the field of view (FOV) of the system, above a countertop surface;

FIG. 19C is a graphical illustration describing the hand-supportable digital image capture and processing system of the present invention configured according to the control process of FIG. 19A, and showing its image formation and detection subsystem operating in its video mode of operation for a first predetermined time period to repeatedly attempt to read a bar code symbol within one or more digital images captured during system operation;

FIG. 20A is a flow chart describing the control process carried out within the hand-supportable digital image capture and processing system of the first illustrative embodiment during its third hand-held method of digital imaging in accordance with the principles of the present invention, involving the use of its manually-actuatable trigger switch and snap-shot imaging mode of subsystem operation;

FIG. 20B is a graphical illustration describing the hand-supportable digital image capture and processing system of the present invention configured according to the control process of FIG. 20A, and showing its trigger switch being manually actuated (by an human operator) when an object is present within the field of view (FOV) of the system, above a countertop surface;

FIG. 20C is a graphical illustration describing the hand-supportable digital image capture and processing system of the present invention configured according to the control process of FIG. 20A, showing the projection of its linear targeting illumination beam upon automatic detection of an object within its FOV;

FIG. 20D is a graphical illustration describing the hand-supportable digital image capture and processing system of the present invention configured according to the control process of FIG. 20A, and showing its image formation and detection subsystem operating in its snap-shot Mode of operation for a first predetermined time period to repeatedly attempt to read a bar code symbol within one or more digital images captured during system operation;

FIG. 21A1 through 21A2, taken together, show a flow chart describing the control process carried out within the hand-supportable digital image capture and processing system of the first illustrative embodiment during its fourth hand-held method of digital imaging in accordance with the principles of the present invention, involving the use of its manually-actuatable trigger switch and video imaging mode of subsystem operation;

FIG. 21B is a graphical illustration describing the hand-supportable digital image capture and processing system of the present invention configured according to the control process of FIG. 21A, and showing its trigger switch being actuated (by the human operator) when an object is present within the field of view (FOV) of the system, above a countertop surface;

FIG. 21C is a graphical illustration describing the hand-supportable digital image capture and processing system of the present invention configured according to the control process of FIG. 21A, and showing its image formation and detection subsystem operating in its video mode of operation for a first predetermined time period to repeatedly attempt to read a bar code symbol within one or more digital images captured during system operation;

FIG. 22A is a flow chart describing the control process carried out within the hand-supportable digital image capture and processing system of the first illustrative embodiment during its fifth hand-held method of digital imaging in accordance with the principles of the present invention, involving the use of its manually-actuatable trigger switch and snap-shot imaging mode of subsystem operation;

FIG. 22B is a graphical illustration describing the hand-supportable digital image capture and processing system of the present invention configured according to the control process of FIG. 22A, and showing its trigger switch being manually actuated (by an human operator) when an object is present within the field of view (FOV) of the system, above a countertop surface;

FIG. 22C is a graphical illustration describing the hand-supportable digital image capture and processing system of the present invention configured according to the control process of FIG. 22A, showing the projection of its linear targeting illumination beam upon automatic detection of an object within its FOV;

FIG. 22D is a graphical illustration describing the hand-supportable digital image capture and processing system of the present invention configured according to the control process of FIG. 22A, and showing its image formation and detection subsystem operating in its snap-shot mode of operation to capture a single image frame and attempt to read a bar code symbol therein during system operation;

FIG. 23A is a perspective view of a second illustrative embodiment of the hand-supportable digital image capture and processing system of the present invention, wherein its automatic objection motion detection subsystem projects an IR-based illumination beam within the FOV of the system during object detection mode of objection, and its LED-based illumination subsystem employs a single array of LEDS, disposed near the upper edge portion of the imaging window, to project single wide-area field of narrow-band illumination which extends throughout the entire FOV of the system, and in a manner which minimizes the annoyance of the operator as well as others in the vicinity thereof during system operation;

FIG. 23B is a perspective cross-sectional view of the hand-supportable digital image capture and processing system of the second illustrative embodiment of the present invention, illustrated in FIG. 23B, showing the projection of its linear target illumination beam during upon automatic detection of an object within the FOV of the system;

FIG. 23C is a perspective cross-sectional view of the hand-supportable digital image capture and processing system of the second illustrative embodiment of the present invention, illustrated in FIG. 23B, showing the projection of linear target illumination beam, with respect to the FOV of the system;

FIG. 23D is a cross-sectional view of the hand-supportable digital image capture and processing system of the second illustrative embodiment of the present invention, illustrated in FIG. 23B, showing the projection of its single wide-area field of narrow-band illumination within the FOV of the system;

FIG. 23E is a perspective view of the hand-supportable digital image capture and processing system of the second illustrative embodiment of the present invention, shown with its front housing portion removed to reveal its imaging window and its single array of illumination LEDs covered by a pair of cylindrical lens elements;

FIG. 23F is a perspective view of the hand-supportable digital image capture and processing system of the second illustrative embodiment of the present invention, shown with its front housing portion and imaging window removed to reveal its single array of illumination LEDs mounted on the single PC board;

FIG. 23G is a perspective view of the PC board, and FOV folding mirrors supported thereon, employed in the hand-supportable digital image capture and processing system of the second illustrative embodiment of the present invention, shown in FIGS. 23A through 23F;

FIG. 24 is a schematic block diagram representative of a system design for the hand-supportable digital image capture and processing system illustrated in FIGS. 23A through 23G, wherein the system design is shown comprising (1) an image formation and detection (i.e. camera) subsystem having image formation (camera) optics for producing a field of view (FOV) upon an object to be imaged and a CMOS or like area-type image detection array for detecting imaged light reflected off the object during illumination operations in an image capture mode in which at least a plurality of rows of pixels on the image detection array are enabled, (2) an LED-based illumination subsystem employing wide-area LED illumination arrays for producing a field of narrow-band wide-area illumination within the FOV of the image formation and detection subsystem, which is reflected from the illuminated object and transmitted through a narrow-band transmission-type optical filter realized within the hand-supportable housing (e.g. using a red-wavelength high-pass reflecting window filter element disposed at the light transmission aperture thereof and a low-pass filter before the image sensor) is detected by the image sensor while all other components of ambient light are substantially rejected, (3) an linear targeting illumination subsystem for generating and projecting a linear (narrow-area) targeting illumination beam into the central portion of the FOV of the system, (4) an IR-based object motion and velocity detection subsystem for producing an IR-based object detection field within the FOV of the image formation and detection subsystem, (5) an automatic light exposure measurement and illumination control subsystem for controlling the operation of the LED-based illumination subsystem, (6) an image capturing and buffering subsystem for capturing and buffering 2-D images detected by the image formation and detection subsystem, (7) a digital image processing subsystem for processing images captured and buffered by the image capturing and buffering subsystem and reading 1D and 2D bar code symbols represented, and (8) an input/output subsystem, supporting a universal data communication interface subsystem, for outputting processed image data and the like to an external host system or other information receiving or responding device, in which each subsystem component is integrated about (9) a system control subsystem, as shown;

FIG. 25 is a schematic representation showing the software modules associated with the three-tier software architecture of the digital image capture and processing system of the second illustrative embodiment, namely: the Main Task module, the Secondary Task module, the Linear Targeting Illumination Beam Task module, the Area-Image Capture Task module, the Application Events Manager module, the User Commands Table module, the Command Handler module, Plug-In Controller, and Plug-In Libraries and Configuration Files, all residing within the Application layer of the software architecture; the Tasks Manager module, the Events Dispatcher module, the Input/Output Manager module, the User Commands Manager module, the Timer Subsystem module, the Input/Output Subsystem module and the Memory Control Subsystem module residing with the System Core (SCORE) layer of the software architecture; and the Linux Kernal module in operable communication with the Plug-In Controller, the Linux File System module, and Device Drivers modules residing within the Linux Operating System (OS) layer of the software architecture, and in operable communication with an external (host) Plug-In Development Platform via standard or proprietary communication interfaces;

FIG. 26A is a perspective view of a third illustrative embodiment of the hand-supportable digital image capture and processing system of the present invention, wherein its automatic objection motion detection and analysis subsystem projects an IR-based illumination beam within the FOV of the system during object detection mode of objection, and, like the second illustrative embodiment shown in FIGS. 23A through 24, its LED-based illumination subsystem also employs a single array of light emitting diodes (LEDs) disposed near the upper edge portion of the imaging window, but with a prismatic lens structure integrated within the imaging window of the system so that illumination from the LEDs is focused and projected into a single wide-area field of narrow-band illumination which extends through the substantially entire FOV of the system, so as to illuminate objects located anywhere within the working distance of the system, while minimizing annoyance to the operator, as well as others in the vicinity thereof during system operation;

FIG. 26B is an elevated front view of the hand-supportable digital image capture and processing system of the third illustrative embodiment of the present invention, illustrated in FIG. 26A;

FIG. 26C is an elevated side view of the hand-supportable digital image capture and processing system of the third illustrative embodiment of the present invention, illustrated in FIG. 26A;

FIG. 26D is an elevated rear view of the hand-supportable digital image capture and processing system of the third illustrative embodiment of the present invention, illustrated in FIG. 26A;

FIG. 26E is an elevated perspective view of the hand-supportable digital image capture and processing system of the third illustrative embodiment of the present invention, illustrated in FIG. 26A, showing an optional base extender unit affixed to the base portion of the system;

FIG. 26F is an elevated side view of the hand-supportable digital image capture and processing system of the third illustrative embodiment of the present invention, illustrated in FIG. 26E;

FIG. 27A is a first perspective exploded view of the hand-supportable digital image capture and processing system of the third illustrative embodiment of the present invention, illustrated in FIGS. 26A through 26E, and showing its PC board assembly arranged between the front and rear portions of the system housing, with the hinged base being pivotally connected to the rear portion of the system housing by way of an axle structure;

FIG. 27B is a second perspective/exploded view of the hand-supportable digital image capture and processing system of the third illustrative embodiment of the present invention, illustrated in FIGS. 26A through 26E;

FIG. 28A is a first perspective view of the hand-supportable digital image capture and processing system of the third illustrative embodiment of the present invention, illustrated in FIGS. 26A through 27B, shown with its front housing portion removed from its rear housing portion, to reveal its PC board assembly;

FIG. 28B is a first perspective view of the hand-supportable digital image capture and processing system of the third illustrative embodiment of the present invention, illustrated in FIGS. 26A through 27B, shown with its front housing portion removed from its rear housing portion, to reveal its PC board assembly;

FIG. 29A is a first perspective view of the PC board assembly of the present invention, removed from between its front and rear housing portions, and showing its optical component support assembly mounted on the rear side of the PC board, on which the area-type image detection array is mounted between a pair of LED subarrays employed in the linear illumination targeting subsystem;

FIG. 29B is a second partially-cutaway perspective view of the PC board assembly of the present invention, removed from between its front and rear housing portions, and showing its optical component support assembly mounted on the rear side of the PC board, and supporting the pair of FOV folding mirrors employed in the image formation and detection subsystem, the parabolic light collection mirror segment employed in the automatic exposure measurement and illumination control subsystem, and the beam folding mirrors employed in the linear targeting illumination subsystem of the present invention;

FIG. 29C is a third perspective view of the PC board assembly of the present invention, shown in FIGS. 29A and 29B, and illustrating (i) the generation and projection the linear targeting beam produced from linear targeting illumination subsystem, and (ii) collection of light rays from a central portion of the FOV of the system, using the parabolic light collection mirror segment employed in the automatic exposure measurement and illumination control subsystem;

FIG. 30 is a fourth perspective, cross-sectional view of the PC board assembly of the present invention, shown in FIGS. 29A, 29B and 29C, and showing (i) the multiple optical elements used to construct the image formation optics assembly of the image formation and detection subsystem of the present invention, as well as (ii) the multiple LEDs used to construct the illumination array of the illumination subsystem of the present invention, and the light shroud structure surrounding the LED array, to minimize stray illumination from entering the FOV of the system during operation;

FIG. 31A is a perspective view of the rear-surface of the PC board assembly of the present invention, showing its rectangular-shaped light transmission aperture formed in the central portion of the PB board, and the population of electronic components mounted on the rear surface thereof;

FIG. 31B is a perspective, partially cut-away view of the front surface of the PC board assembly of FIG. 31A, showing in greater detail the array of LEDs associated with the illumination subsystem, with its LED light shroud structure removed from about the array of LEDs, and the IR transmitter and receiving diodes associated with the automatic object detection subsystem of the system;

FIG. 31C is a front perspective view of the LED light shrouding structure shown removed from the PC board assembly of FIG. 31A;

FIG. 31D is a rear perspective view of the LED light shrouding structure shown removed from the PC board assembly of FIG. 31A;

FIG. 32A is a schematic block diagram representative of a system design for the hand-supportable digital image capture and processing system illustrated in FIGS. 26A through 31C, wherein the system design is shown comprising (1) an image formation and detection (i.e. camera) subsystem having image formation (camera) optics for producing a field of view (FOV) upon an object to be imaged and a CMOS or like area-type image detection array for detecting imaged light reflected off the object during illumination operations in an image capture mode in which at least a plurality of rows of pixels on the image detection array are enabled, (2) an LED-based illumination subsystem employing a single linear array of LEDs for producing a field of narrow-band wide-area illumination of substantially uniform intensity over the working distance of the FOV of the image formation and detection subsystem, which is reflected from the illuminated object and transmitted through a narrow-band transmission-type optical filter realized within the hand-supportable housing (e.g. using a red-wavelength high-pass reflecting window filter element disposed at the light transmission aperture thereof and a low-pass filter before the image sensor) is detected by the image sensor while all other components of ambient light are substantially rejected, (3) an linear targeting illumination subsystem for generating and projecting a linear (narrow-area) targeting illumination beam into the central portion of the FOV of the system, (4) an IR-based object motion detection and analysis subsystem for producing an IR-based object detection field within the FOV of the image formation and detection subsystem, (5) an automatic light exposure measurement and illumination control subsystem for controlling the operation of the LED-based illumination subsystem, (6) an image capturing and buffering subsystem for capturing and buffering 2-D images detected by the image formation and detection subsystem, (7) a digital image processing subsystem for processing images captured and buffered by the image capturing and buffering subsystem and reading 1D and/or 2D bar code symbols represented therein, and (8) an input/output subsystem, supporting a multi-interface I/O subsystem, for outputting processed image data and the like to an external host system or other information receiving or responding device, in which each subsystem component is integrated about (9) a system control subsystem, as shown;

FIGS. 32B1 and 32B2 set forth a schematic block diagram representation of an exemplary implementation of the electronic and photonic aspects of the digital image capture and processing system of the third illustrative embodiment of the present invention, whose components are supported on the PC board assembly of the present invention;

FIG. 32C is a schematic representation showing the software modules associated with the three-tier software architecture of the digital image capture and processing system of the third illustrative embodiment, namely: the Main Task module, the Secondary Task module, the Linear Targeting Illumination Beam Task module, the Area-Image Capture Task module, the Application Events Manager module, the User Commands Table module, the Command Handler module, Plug-In Controller, and Plug-In Libraries and Configuration Files, all residing within the Application layer of the software architecture; the Tasks Manager module, the Events Dispatcher module, the Input/Output Manager module, the User Commands Manager module, the Timer Subsystem module, the Input/Output Subsystem module and the Memory Control Subsystem module residing with the System Core (SCORE) layer of the software architecture; and the Linux Kernal module in operable communication with the Plug-In Controller, the Linux File System module, and Device Drivers modules residing within the Linux Operating System (OS) layer of the software architecture, and in operable communication with an external (host) Plug-In Development Platform via standard or proprietary communication interfaces;

FIG. 33A is a first perspective view of the rear side of the imaging window of the present invention installed within the area-type digital image capture and processing system of the third illustrative embodiment, showing the rear surface of the integrated prismatic illumination lens which is used to focus illumination produced from a single linear array of LEDs into a field (i.e. beam) of LED-based illumination beam that uniformly illuminates the entire FOV of the image formation and detection subsystem of the system, in accordance with the principles of the present invention;

FIG. 33B is a second perspective view of the front side of the imaging window of the present invention installed within the area-type digital image capture and processing system of the third illustrative embodiment, showing the front surface of the integrated prismatic illumination lens which is used to focus illumination produced from a single linear array of LEDs into a field or beam of LED-based illumination beam that uniformly illuminates the entire FOV of the image formation and detection subsystem of the system, in accordance with the principles of the present invention;

FIG. 33C1 is a cross-sectional partially cut-away view of the digital image capture and processing system of the third illustrative embodiment, taken along lines 33C1-33C1 in FIG. 26A, showing several LEDs transmitting illumination through an illustrative embodiment of the prismatic illumination lens component of the imaging window according to the present invention, in a controlled manner so that the focused field of illumination substantially covers the entire FOV of the system but is not objectionably projected into the eyes of consumers and/or operators who might happen to be present at the point of sale (POS);

FIG. 33C2 is a cross-sectional view of the prismatic lens component integrated within the upper edge portion of the imaging window of the present invention, employed in the digital image capture and processing system of the third illustrative embodiment, and showing the propagation of light rays from an LED in the linear LED array, and through the prismatic lens component, into the FOV of the system;

FIG. 33D is an elevated cross-sectional schematic view of the prismatic lens component depicted in FIG. 33C2, and linear array of LEDs employed in the table digital image capture and processing system of the third illustrative embodiment, graphically depicting the cross sectional dimensions of the field of illumination that is produced within the FOV, with five different regions being marked at five marked distances from the imaging window (i.e. 50 mm, 75 mm, 100 mm, 125 mm, and 150 mm);

FIG. 33E is schematic representation of an elevated side view of the illumination subsystem employed in the system of the third illustrative embodiment, graphically depicting five different regions of the field of illumination produced from marked at five marked distances from the imaging window (i.e. 50 mm, 75 mm, 100 mm, 125 mm, and 150 mm);

FIG. 33F is schematic representation of an elevated front view of the illumination subsystem employed in the system of the third illustrative embodiment, graphically depicting the cross-sectional dimensions of the illumination field (i.e. 106 mm×64 mm, 128 mm×76 mm, 152 mm×98 mm, 176 mm×104 mm, and 200 mm×118 mm) produced at the five marked distances from the imaging window (i.e. 50 mm, 75 mm, 100 mm, 125 mm, and 150 mm, respectively);

FIG. 33G1 is a gray scale image of 1280 pixels by 768 pixels showing the spatial intensity profile of the field of illumination produced from the illumination system of the system at 50 mm from the imaging window, over an exposure duration of 0.5 milliseconds, wherein each pixel has an intensity value ranging from 0 to 255, and due to the illumination design scheme of the illustrative embodiment, the center portion of the intensity profile has a larger intensity value than the edge portion;

FIG. 33G2 is a graphical representation of the horizontal cross section of the spatial intensity profile of FIG. 33G1, taken at the center of the FOV, and showing a drop off in spatial intensity when moving from the center of the FOV to its edge, and wherein "noise-like" structures are gray scale values for the 1280 pixels in the grey scale image, whereas the solid smooth line is the curve fitted result of the fluctuation in grey scale image pixel values, showing the average intensity value drop off from the center of the image, to its edge;

FIG. 33H1 is a gray scale image of 1280 pixels by 768 pixels showing the spatial intensity profile of the field of illumination produced from the illumination system of the system at 75 mm from the imaging window, over an exposure duration of 0.5 milliseconds, wherein each pixel has an intensity value ranging from 0 to 255, and due to the illumination design scheme of the illustrative embodiment, the center portion of the intensity profile has a larger intensity value than the edge portion;

FIG. 33H2 is a graphical representation of the horizontal cross section of the spatial intensity profile of FIG. 33H1, taken at the center of the FOV, and showing a drop off in spatial intensity when moving from the center of the FOV to its edge, and wherein "noise-like" structures are gray scale values for the 1280 pixels in the grey scale image, whereas the solid smooth line is the curve fitted result of the fluctuation in grey scale image pixel values, showing the average intensity value drop off from the center of the image, to its edge;

FIG. 33I1 is a gray scale image of 1280 pixels by 768 pixels showing the spatial intensity profile of the field of illumination produced from the illumination system of the system at 100 mm from the imaging window, over an exposure duration of 0.5 milliseconds, wherein each pixel has an intensity value ranging from 0 to 255, and due to the illumination design scheme of the illustrative embodiment, the center portion of the intensity profile has a larger intensity value than the edge portion;

FIG. 33I2 is a graphical representation of the horizontal cross section of the spatial intensity profile of FIG. 33I1, taken at the center of the FOV, and showing a drop off in spatial intensity when moving from the center of the FOV to its edge, and wherein "noise-like" structures are gray scale values for the 1280 pixels in the grey scale image, whereas the solid smooth line is the curve fitted result of the fluctuation in grey scale image pixel values, showing the average intensity value drop off from the center of the image, to its edge;

FIG. 33J1 is a gray scale image of 1280 pixels by 768 pixels showing the spatial intensity profile of the field of illumination produced from the illumination system of the system at 125 mm from the imaging window, over an exposure duration of 0.5 milliseconds, wherein each pixel has an intensity value ranging from 0 to 255, and due to the illumination design scheme of the illustrative embodiment, the center portion of the intensity profile has a larger intensity value than the edge portion;

FIG. 33J2 is a graphical representation of the horizontal cross section of the spatial intensity profile of FIG. 33J1, taken at the center of the FOV, and showing a drop off in spatial intensity when moving from the center of the FOV to its edge, and wherein "noise-like" structures are gray scale values for the 1280 pixels in the grey scale image, whereas the solid smooth line is the curve fitted result of the fluctuation in grey scale image pixel values, showing the average intensity value drop off from the center of the image, to its edge;

FIG. 33K1 is a gray scale image of 1280 pixels by 768 pixels showing the spatial intensity profile of the field of illumination produced from the illumination system of the system at 50 mm from the imaging window, over an exposure duration of 0.5 milliseconds, wherein each pixel has an intensity value ranging from 0 to 255, and due to the illumination design scheme of the illustrative embodiment, the center portion of the intensity profile has a larger intensity value than the edge portion;

FIG. 33K2 is a graphical representation of the horizontal cross section of the spatial intensity profile of FIG. 33K1, taken at the center of the FOV, and showing a drop off in spatial intensity when moving from the center of the FOV to its edge, and wherein "noise-like" structures are gray scale values for the 1280 pixels in the grey scale image, whereas the solid smooth line is the curve fitted result of the fluctuation in grey scale image pixel values, showing the average intensity value drop off from the center of the image, to its edge;

FIG. 34A is a cross-sectional view of the digital image capture and processing system of the third illustrative embodiment of the present invention, taken along line 34A-34A in FIG. 26B, showing the projection of light rays from a first single LED in the linear LED illumination array, through the prismatic lens component of the imaging window, and out into the field of view (FOV) of the system, with the projected light rays being maintained substantially beneath the plane of the light-occluding wall surface surrounding the upper edge of the imaging window of the present invention, and disposed proximity to the proximate lens array, thereby significantly reducing the number of light rays entering the eyes of humans who might be present during operation of the system;

FIG. 34B is an enlarged cross-sectional view of the digital image capture and processing system of the third illustrative embodiment of the present invention, taken along line 34A-34A in FIG. 26B, showing the projection of light rays from the first single LED in the linear LED illumination array, through the prismatic lens component of the imaging window, and out into the field of flew (FOV) of the system, with the projected light rays being maintained substantially beneath the plane of the light-occluding wall surface surrounding the upper edge of the imaging window of the present invention, thereby significantly reducing the number of light rays entering the eyes of humans who might be present during operation of the system;

FIG. 34C is a cross-sectional view of the digital image capture and processing system of the third illustrative embodiment of the present invention, taken along line 34C-34C in FIG. 26B, showing the projection of light rays from a second single LED in the linear LED illumination array, through the prismatic lens component of the imaging window, and out into the field of view (FOV) of the system, with the projected light rays being maintained substantially beneath the plane of the light-occluding wall surface surrounding the upper edge of the imaging window of the present invention, thereby significantly reducing the number of light rays entering the eyes of humans who might be present during operation of the system;

FIG. 35A is a cross-sectional side view of the digital image capture and processing system of the third illustrative embodiment of the present invention, taken along line 35A-35A in FIG. 26B, and showing the generation and projection of the linear visible targeting illumination beam from the system, in automatic response to the detection of an object within the field of view (FOV) of the system;

FIG. 35B is a cross-sectional cut-away perspective view of the digital image capture and processing system of the third illustrative embodiment of the present invention, taken along line 35A-35A in FIG. 26B, and showing the generation and projection of the linear visible illumination targeting beam produced from the system in automatic response to the detection of an object within the field of view (FOV) of the system;

FIG. 36A is a perspective cross-sectional view of the digital image capture and processing system of the third illustrative embodiment of the present invention, illustrated in FIG. 26A, showing the folding of the FOV of the image formation and detection subsystem, its reflection off the first and second FOV folding mirrors mounted on the optics support structure on the PC board assembly, and the ultimate projection of the folded FOV out through the imaging window of the system and towards an object to be imaged, while the parabolic light collection mirror collects light rays from a central portion of the FOV during object illumination and imaging operations, and focuses these light rays onto a photodetector of the automatic exposure measurement and illumination control subsystem;

FIG. 36B is second perspective partially-cut away view of the digital image capture and processing system of the third illustrative embodiment of the present invention, illustrated in FIG. 26A, showing the parabolic light collection mirror collecting light rays from the central portion of the FOV, and focusing these collected light rays onto the photodector of the automatic exposure measurement and illumination control subsystem, mounted on the rear surface of the PC board assembly;

FIG. 36C is a third perspective partially-cut away view of the digital image capture and processing system of the third illustrative embodiment of the present invention, illustrated in FIG. 26A, showing the parabolic light collection mirror collecting light rays from the central portion of the FOV, and focusing these collected light rays onto the photodector on the rear surface of the PC board assembly, during object illumination and imaging operations;

FIG. 36D is an elevated side cross-sectional view of the digital image capture and processing system of the second illustrative embodiment, showing the parabolic surface characteristics of its parabolic light reflecting/collecting mirror and the location of the photodiode associated with the automatic light exposure measurement and illumination control subsystem, at the focal point of the parabolic light reflecting/collecting mirror;

FIG. 37 is a perspective partially-cut away view of the digital image capture and processing system of the third illustrative embodiment of the present invention, illustrated in FIG. 26A, showing a centrally-disposed optically-translucent region surrounding an aperture through which the manually-actuated trigger switch is installed, and being illuminated by an LED-driven optical-waveguide assembly that is mounted about the upper edge of the PC board assembly and beneath the upper edge regions of the front and rear portions of the system housing, when assembled together with the PC board assembly disposed therebetween;

FIG. 38A is a perspective view of the rear side of the LED-driven optical-waveguide assembly illustrated in FIG. 37, shown removed and in isolation from the upper edge of the PC board assembly of the present invention, and having upper and lower light coupling elements arranged in optical communication with the central illumination region of the optical wave-guide assembly, and the sound-wave ports disposed in the side edge portion of the an LED-driven optical-waveguide assembly;

FIG. 38B is a perspective view of the top side of the LED-driven optical-waveguide assembly illustrated in FIGS. 37 and 38A, shown removed and in isolation from the upper edge of the PC board assembly of the present invention, and having upper and lower light coupling elements arranged in optical communication with the central illumination region of the optical wave-guide assembly, and the sound-wave ports disposed in the side edge portion of the an LED-driven optical-waveguide assembly;

FIG. 39A is a cross-sectional, partially-cutaway view the digital image capture and processing system of the third illustrative embodiment of the present invention, illustrated in FIG. 26A, showing the upper and lower light coupling elements arranged in optical communication with LEDs mounted on the PC board assembly, and conducting the flow of optical illumination from the LEDs, through the optical waveguide, and to the centrally-disposed optically-translucent region surrounding the manually-actuated trigger switch, during system operation;

FIG. 39B is an enlarged cross-sectional, partially cut-away view of the digital image capture and processing system illustrated in FIG. 26A, showing the upper and lower light coupling elements arranged in optical communication with LEDs mounted on the PC board assembly, and conducting the flow of optical illumination from the LEDs, through the optical waveguide, and to the centrally-disposed optically-translucent region surrounding the manually-actuated trigger switch, during system operation;

FIG. 39C is a perspective, partially cut-away view of the digital image capture and processing system illustrated in FIG. 26A, showing lower light coupling element arranged in optical communication with its LED mounted on the PC board assembly, and conducting the flow of optical illumination from the LED, through the optical waveguide, and to the centrally-disposed optically-translucent region surrounding the manually-actuated trigger switch, during system operation;

FIG. 39D is an cross-sectional, partially cut-away view of the digital image capture and processing system illustrated in FIG. 26A, showing the upper and lower light coupling elements arranged in optical communication with LEDs mounted on the PB board assembly, and conducting the flow of optical illumination from the LEDs, through the optical waveguide, and to the centrally-disposed optically-translucent region surrounding the manually-actuated trigger switch, during system operation;

FIG. 40 is a perspective, partially-cutaway view of the PC board assembly employed in the digital image capture and processing system illustrated in FIG. 26A, shown removed from its system housing and mounted on the upper front edge of the PC board, an electro-acoustic transducer for generating system event sounds (e.g. "Good Read" beeps), a linear LED array for generating a wide-area illumination field within the FOV, and a pair of IR transmitting and receiving diodes for detecting objects within the FOV;

FIG. 41A is a perspective, partially-cutaway view of the view of the digital image capture and processing system illustrated in FIG. 26A, showing the acoustic-waveguide structure of the present invention, coupling sonic energy, produced from its electro-acoustic transducer, to the sound ports formed in the LED-driven optical-waveguide assembly of the present invention;

FIG. 41B is a second perspective, partially-cutaway view of the view of the digital image capture and processing system illustrated in FIG. 26A, showing, from a different perspective, the acoustic-waveguide structure of the present invention, coupling sonic energy, produced from its electro-acoustic transducer, to the sound ports formed in the LED-driven optical-waveguide assembly of the present invention;

FIG. 42A is a first perspective, cross-sectional view of the acoustic-waveguide structure of the present invention employed in the digital image capture and processing system of the third illustrative embodiment, shown in FIGS. 41A and 41B;

FIG. 42B is a second perspective view of the acoustic-waveguide structure of the present invention employed in the digital image capture and processing system of the third illustrative embodiment, shown in FIG. 41A;

FIG. 43A is a schematic diagram for the multi-interface I/O subsystem of the present invention employed in the third illustrative embodiment of the digital image capture and processing system of the present invention, shown comprising: a standard (e.g. RJ-45 10 pin) connector (with EAS support) for connecting, via a flexible communication cable, to a host system or device supporting at least one of the following communication interfaces (i) RS-232 with an AC power adapter, (ii) a keyboard wedge (KBW) with an AC power adapter, (iii) RS-485 (IBM) with an AC power adapter, and (iv) USB with an AC adapter required for powering imaging modes (i.e driving illumination LEDs);

FIGS. 43B1 and 43B2 set forth a schematic diagram for the interface switching module employed in the multi-interface I/O subsystem of FIG. 43A;

FIGS. 43C1 and 43C2 set forth a flow chart describing the automatic interface detection process carried out within the multi-interface I/O subsystem of FIG. 43A, employed in the third illustrative embodiment of the digital image capture and processing system of the present invention;

FIG. 43D is a schematic representation showing (i) the system configuration parameter (SCPs) settings maintained in system memory of the digital image capture and processing system of the present invention, for the different multiple communication interfaces (CIs), e.g. RS-232, KBW, USB and IBM, supported by the multiple-interface I/O subsystem thereof, and (ii) how these multiple system configuration parameters (SCPs) for a given communication interface (CI) are automatically programmed without reading programming-type codes when a communication interface cable is installed between the multiple-interface I/O subsystem of the digital image capture and processing system and the host system to which the digital image capture and processing system is being interfaced;

FIG. 44 shows a flow chart describing the primary steps involved in carrying out a method of automatically programming multiple system configuration parameters (SCPs) within the system memory of the digital image capture and processing system of present invention, without reading programming-type codes;

FIG. 45 shows a flow chart describing the primary steps involved in carrying out a method of unlocking restricted features embodied within the digital image capture and processing system of present invention of the third illustrative embodiment, by reading feature-unlocking programming bar code symbols;

FIG. 46A is a front perspective view of the fourth illustrative embodiment of the hand-supportable digital image capture and processing system of the present invention, incorporating automatic gyroscopic image stabilization capabilities integrated within the image formation and detection subsystem, so as to enable the formation and detection of crystal clear images in the presence of environments characterized by hand jitter, camera platform vibration, and the like;

FIG. 46B is a rear perspective cross-sectional view of the fourth illustrative embodiment of the hand-supportable digital image capture and processing system of the present invention, showing its gyroscopic image stabilization apparatus integrated about the optical components of the image formation and detection subsystem.

Figure 46C:
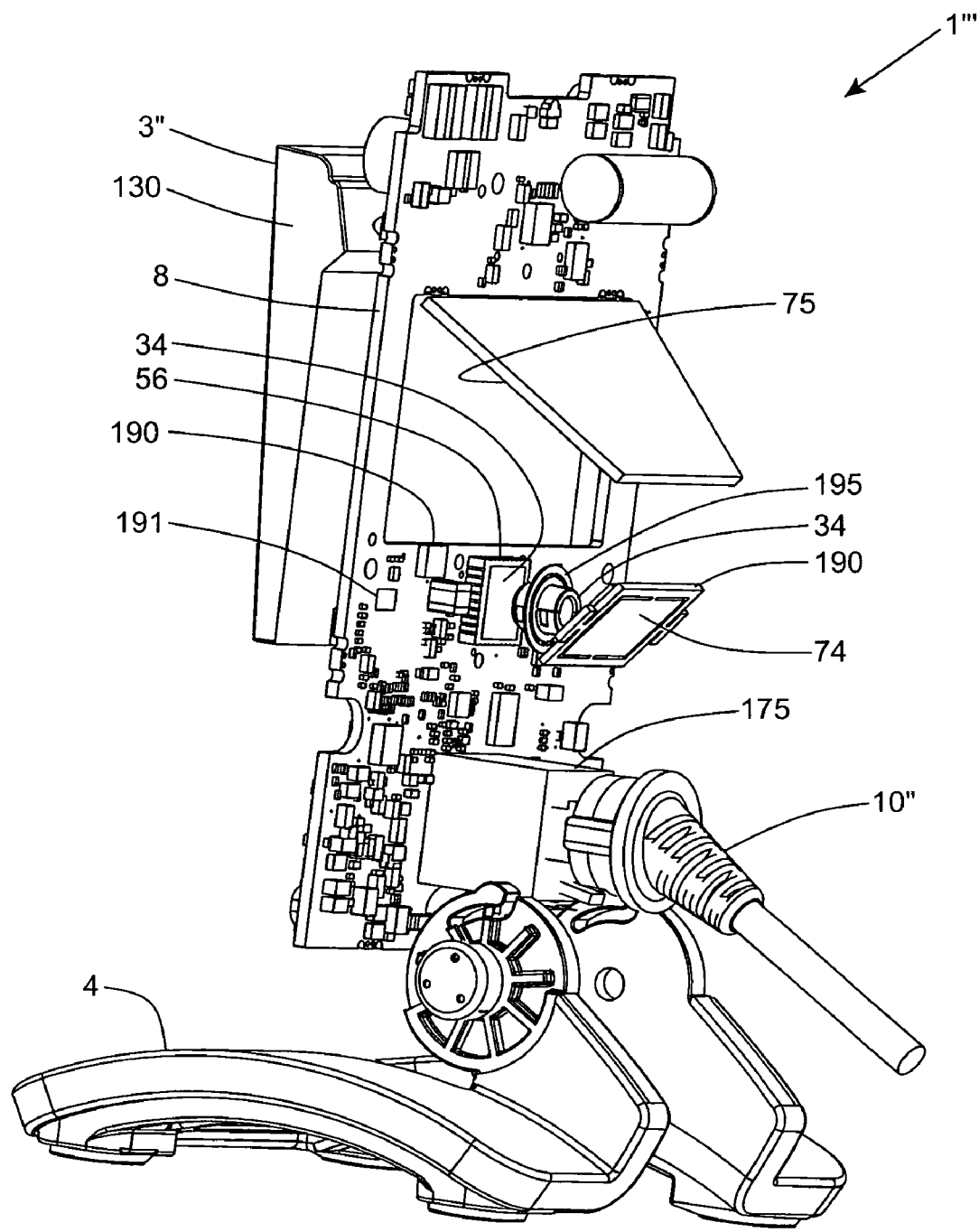
Figure 46D:
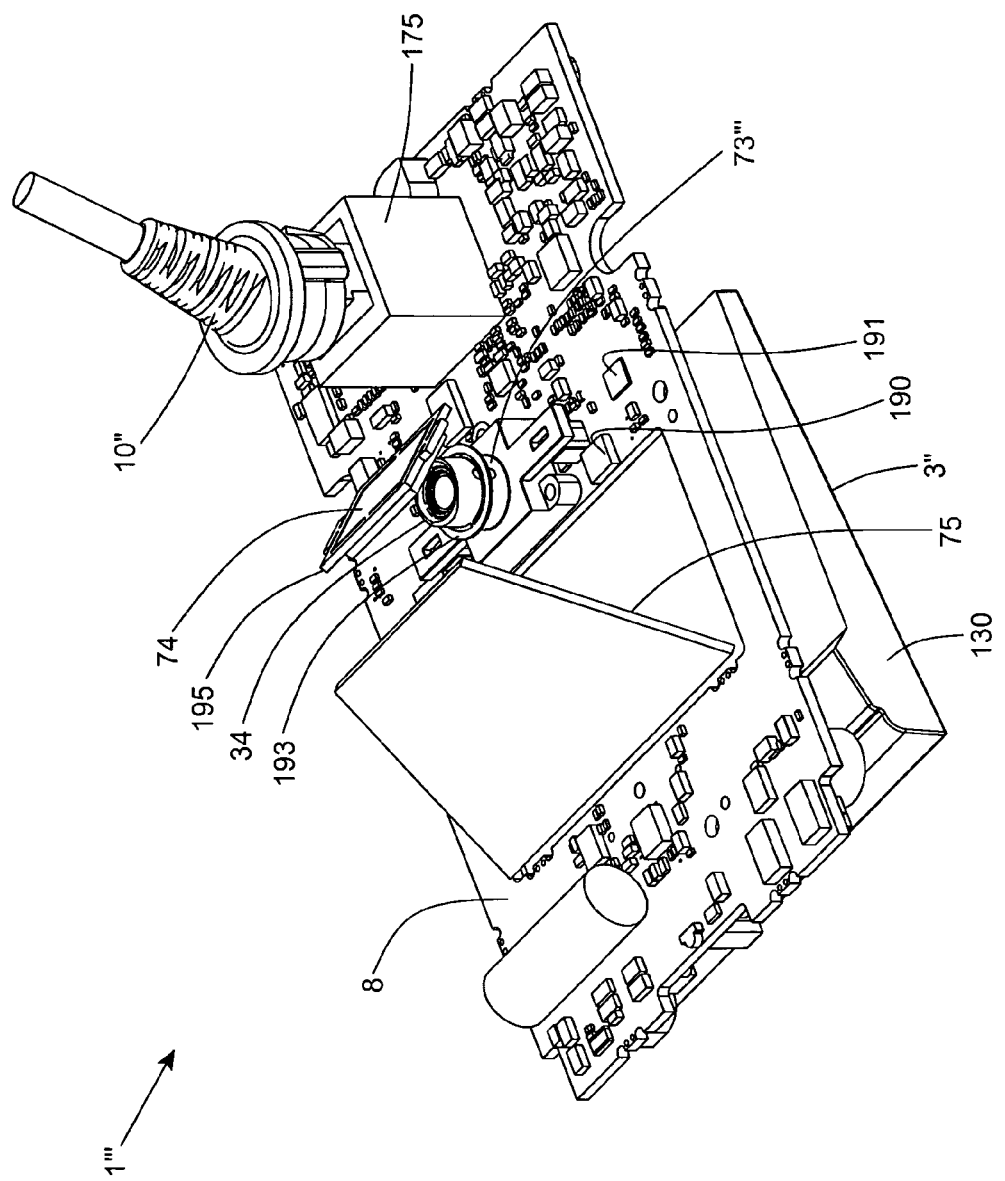
Figure 46E:
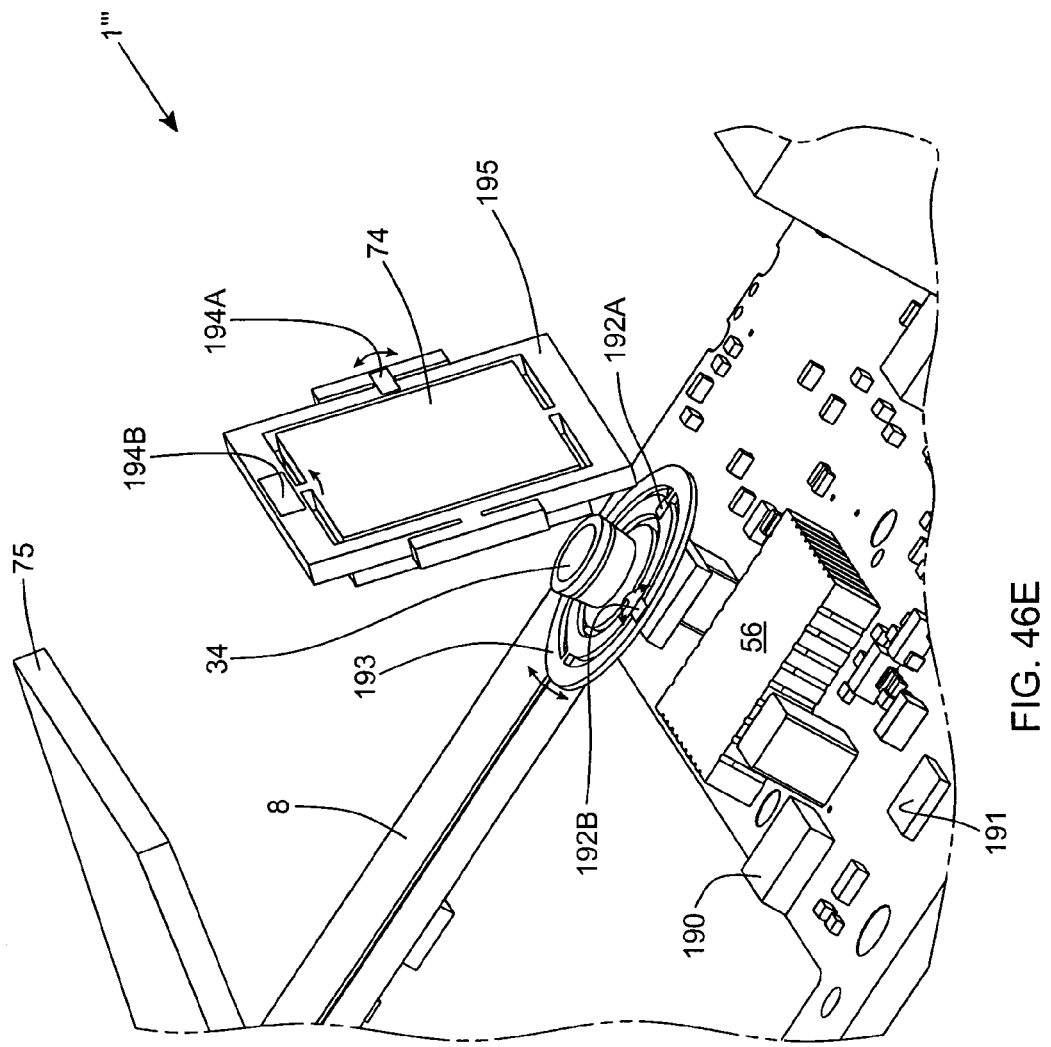
Figure 47:
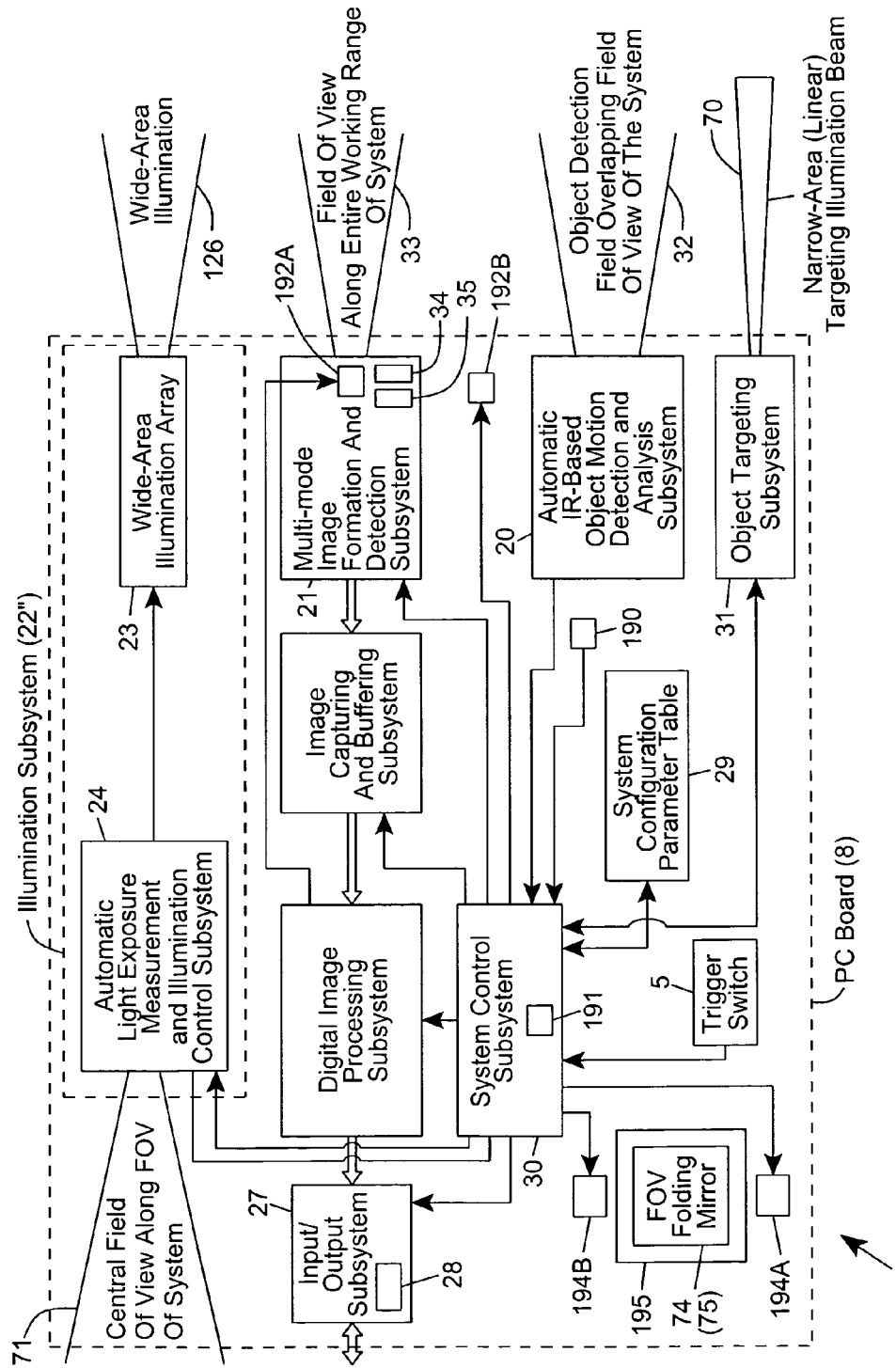
Figure 48A:
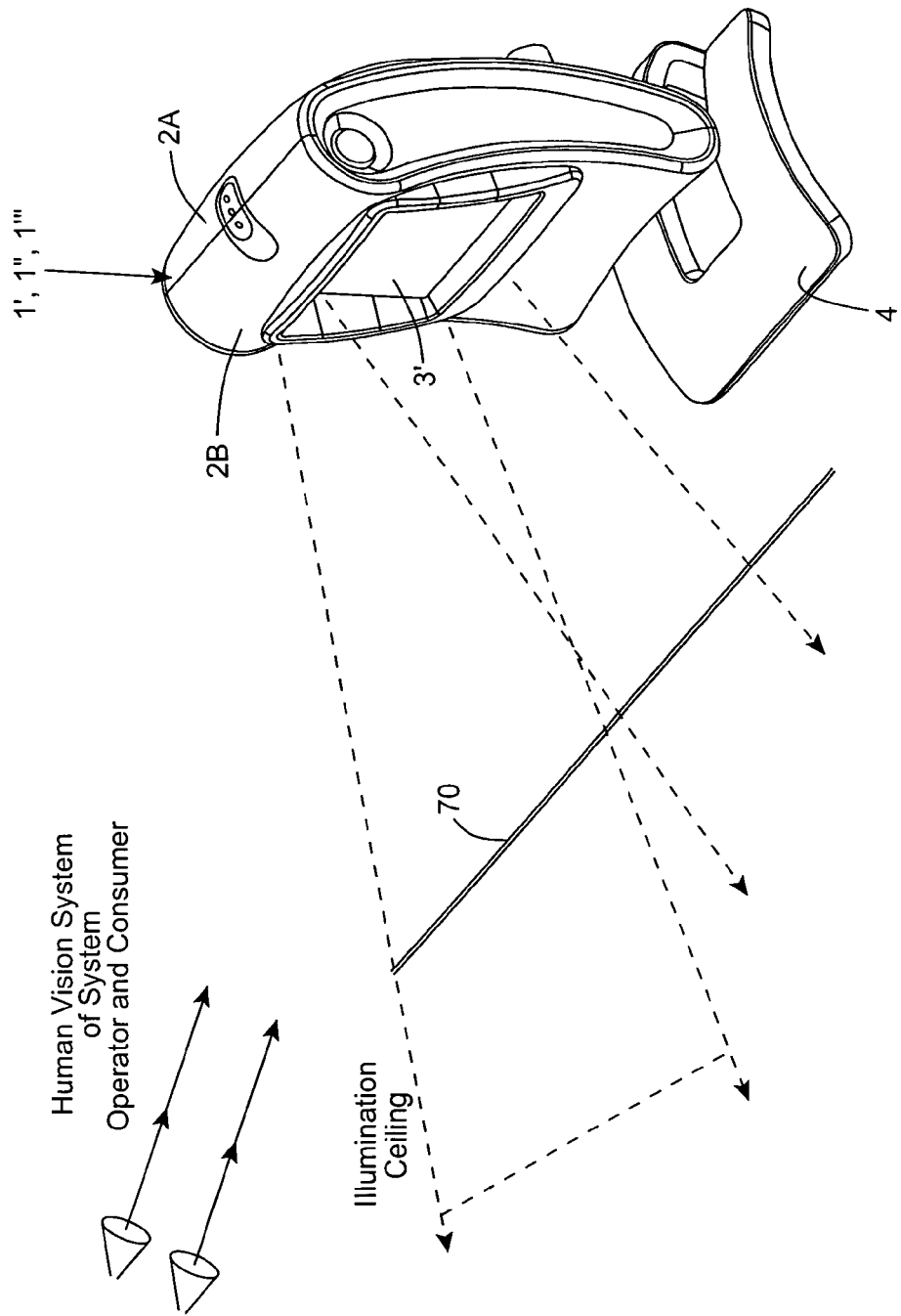
Figure 48B:
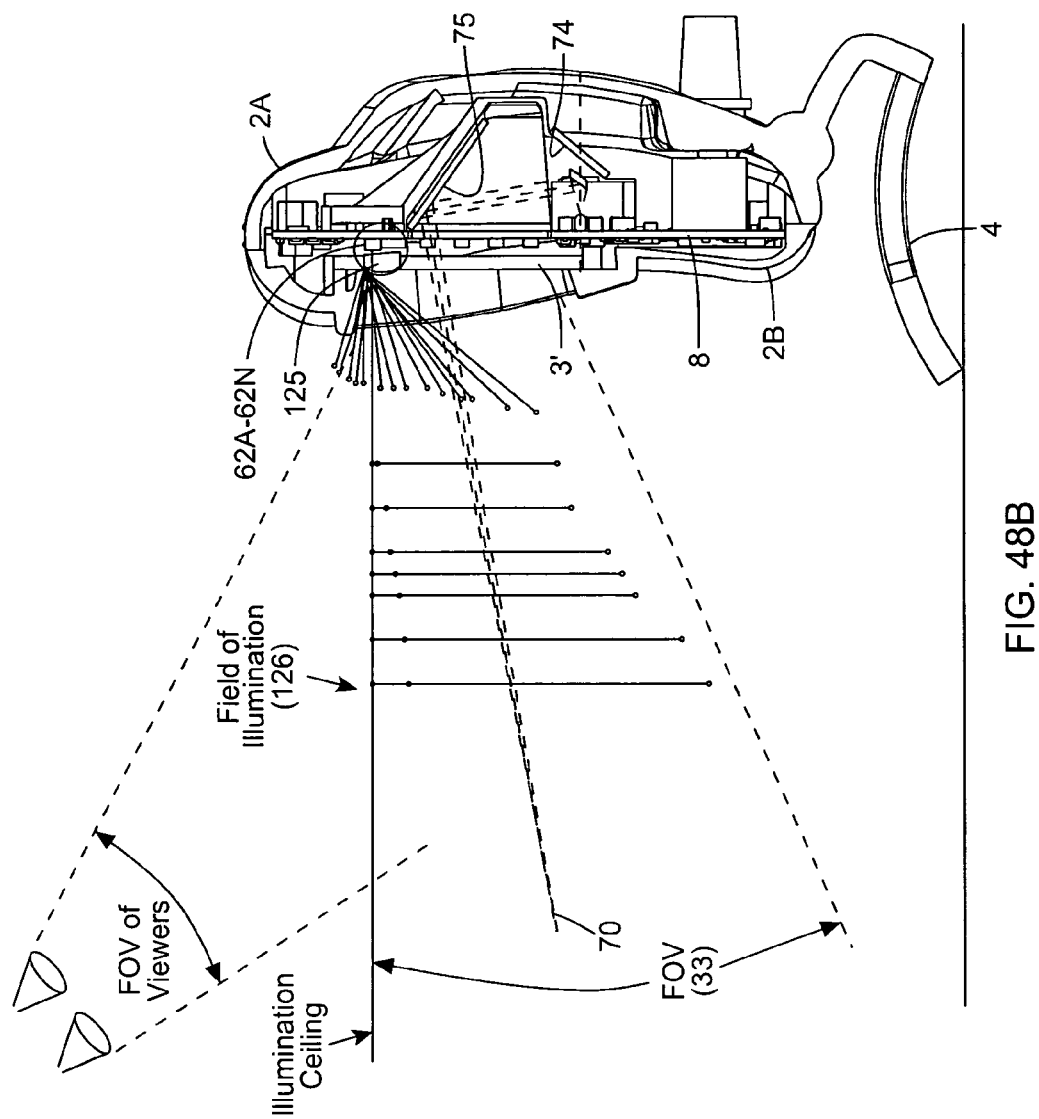

FIG. 46C is a rear perspective view of the fourth illustrative embodiment of the hand-supportable digital image capture and processing system of the present invention, shown with its front and rear housing portions removed so as to reveal the PC board assembly and the gyroscopic image stabilization apparatus integrated about the optical components of the image formation and detection subsystem;

FIG. 46D is a top front perspective view of the PC board assembly and the gyroscopic image stabilization apparatus integrated about the optical components of the image formation and detection subsystem employed in the fourth illustrative embodiment of the hand-supportable digital image capture and processing system of the present invention shown in FIG. 46A;

FIG. 46E is a top side perspective view of the PC board assembly showing in greater detail, the gyroscopic image stabilization apparatus including (i) a dual-axis gyroscopic sensor (or accelerometer) mounted on the PC board, (ii) a first set of miniature motors for adjusting the horizontal and/or vertical position of a first floating element supporting the FOV lens, and (iii) a second set of miniature motors for adjusting the horizontal and/or vertical position of a second floating element supporting a FOV folding mirror;

FIG. 47 is a schematic block diagram representative of the fourth illustrative embodiment of the hand-supportable digital image capture and processing system shown in FIGS. 46A through 46E;

FIG. 48A is a perspective view of the digital image capture and processing system of either the second or third illustrative embodiments, shown supported on a POS countertop surface and illuminating an object present within the FOV of the system so that illumination rays from its LED illumination array are contained below a spatially-defined "illumination ceiling", above which extends the field of view of the human vision system of the operator or consumers at the POS station, thereby preventing or reducing annoyance of such illumination rays during system operation; and FIG. 48B is an elevated side view of the hand-supportable digital image capture and processing system of FIG. 48A, showing an object within the FOV of the system being automatically illuminated so that illumination rays from its single linear LED illumination array are contained below a spatially-defined illumination ceiling, above which the field of view of the human vision system of the operator or consumers extends at the POS station, thereby preventing or reducing annoyance of such illumination rays during system operation.

DETAILED DESCRIPTION OF THE ILLUSTRATIVE EMBODIMENTS OF THE PRESENT INVENTION

Referring to the figures in the accompanying Drawings, the various illustrative embodiments of the hand-supportable and countertop-supportable digital image capture and processing systems of the present invention will be described in great detail, wherein like elements will be indicated using like reference numerals.

Hand-Supportable/Countertop-Supportable Digital Image Capture and Processing System of the First Illustrative Embodiment of the Present Invention Referring to FIGS. 1A through 1F, the hand-supportable/countertop-supportable digital image capture and processing system of the first illustrative embodiment of the present invention 1 is shown in detail comprising a hand-supportable and countertop-supportable housing 2 having a rear housing portion 2a and a front housing portion 2B that is provided with a light transmission (i.e. imaging) window 3. As best shown, digital image capture and processing system further comprises: a foot-like structure 4 mounted to the rear housing portion 2A which provides a means to support the system in a presentation and/or pass-through mode of system operation; a trigger switch structure 5 provided on the top surface of the housing, for generating a triggering event (signal) within the system; a window aperture 6 formed in the front housing portion 2B; an LED-based indicator 7 mounted on the top of the housing; a single PC board 8 supported between the front and rear housing portions 2B and 2A for supporting (i) electronic components (e.g. microprocessor, RAM, etc), electro-optical components (e.g. LEDs, IR diodes and photosensors) and optical components (e.g. cylindrical lens arrays over the array of light emitting diodes LEDs) on the front surface of the PC board, and also (ii) electro-optical components (e.g. area-type image detection array, and photo-detector) and electronic circuitry (e.g. drivers etc) collectively indicated by reference numeral 9, mounted on the front and rear surfaces of the PC board 8; and a cable connector 10 mounted on the rear housing portion 2A, or alternative an RF antenna structure 11 mounted on the rear housing portion for supporting wireless 2-way RF-based data packet communications with a base station 12, or other IP-based network connectivity device (e.g. wireless switch) which is connected to a host system or device 13.

In alternative embodiments of the present invention, the form factor of the hand-supportable/countertop-supportable housing of the illustrative embodiments might be different. In yet other alternative embodiments, the housing need not be hand-supportable or countertop-supportable, as disclosed herein, but rather might be designed for stationary or permanent installation above a desktop or countertop surface, at a point-of-sale (POS) station, or a commercial or industrial environment requiring digital imaging for one or more particular applications.

Schematic Block Functional Diagram as System Design Model for the Digital Image Capture and Processing System of the Present Invention As shown in the system design model of FIG. 2, the digital imaging-based bar code symbol reading system 1 of the illustrative embodiment comprises: an IR-based object motion and analysis subsystem 20 which includes the ability to detect object presence, range, and velocity of objects within the FOV of the system; an area-type digital image formation and detection (i.e. camera) subsystem 21 having wide-area mode of image capture over its field of view (FOV); an object targeting subsystem 31 for generating a linear or narrow-area object targeting illumination beam 70 within the FOV of the system; a multi-mode LED-based illumination subsystem 22 having a near-field LED array 23A for producing a field of wide-area narrow-band illumination over a near field region of the FOV of the system, and a far-field LED array 23B for producing a field of wide-area narrow-band illumination over a far field region of the FOV of the system; an automatic light exposure measurement and illumination control subsystem 24; an image capturing and buffering subsystem 25; a digital image processing subsystem 26 supporting various modes of digital image-processing based bar code symbol reading, OCR, text recognition, hand-writing recognition, and human intelligence extraction and acquisition; an Input/Output Subsystem 27 with automatic multi-interface detection and implementation capabilities 28; manually-actuatable trigger switch 5 for sending user-originated control activation signals to the device; a system configuration parameter table 29 supported in system memory; and a system control subsystem 30 integrated with each of the above-described subsystems, as shown.

In general, the primary function of the object motion detection and analysis subsystem 20 is to automatically produce an object detection field 32 within the FOV 33 of the image formation and detection subsystem 21, detect the presence of an object within predetermined regions of the object detection field 32, as well as motion and velocity information about the object therewithin, and generate control signals which are supplied to the system control subsystem 30 for indicating when and where an object is detected within the object detection field of the system.

In the first illustrative embodiment, the image formation and detection (i.e. camera) subsystem 21 includes image formation (camera) optics 34 for providing a field of view (FOV) 33 upon an object to be imaged and a CMOS area-type image detection array 35 for detecting imaged light reflected off the object during illumination and image acquisition/capture operations.

In the first illustrative embodiment, the primary function of the multi-mode LED-based illumination subsystem 22 is to produce a near-field wide-area illumination field 36 from the near field LED array 23A when an object is automatically detected within the near-field portion of the FOV, and a far-field wide-area illumination field 37 from the far-field LED array 23B when an object is detected within the far-field portion of the FOV. Notably, each such field of illumination has a narrow optical-bandwidth and is spatially confined within the FOV of the image formation and detection subsystem 21 during near and far field modes of illumination and imaging, respectively. This arrangement is designed to ensure that only narrow-band illumination transmitted from the illumination subsystem 22, and reflected from the illuminated object, is ultimately transmitted through a narrow-band transmission-type optical filter subsystem 40 within the system and reaches the CMOS area-type image detection array 35 for detection and processing, whereas all other components of ambient light collected by the light collection optics are substantially rejected at the image detection array 35, thereby providing improved SNR thereat, thus improving the performance of the system. In the illustrative embodiment, the narrow-band transmission-type optical filter subsystem 40 is realized by (1) high-pass (i.e. red-wavelength reflecting) filter element 40A embodied within at the imaging window 3, and (2) low-pass filter element 40B mounted either before the CMOS area-type image detection array 35 or anywhere after beyond the high-pass filter element 40A, including being realized as a dichroic mirror film supported on at least one of the FOV folding mirrors 74 and 75. FIG. 5E3 sets forth the resulting composite transmission characteristics of the narrow-band transmission spectral filter subsystem 40, plotted against the spectral characteristics of the emission from the LED illumination arrays employed in the LED-based illumination subsystem 22.

The primary function of the automatic light exposure measurement and illumination control subsystem 24 is two fold: (1) to measure, in real-time, the power density [joules/cm] of photonic energy (i.e. light) collected by the optics of the system at about its image detection array 35, and generate auto-exposure control signals indicating the amount of exposure required for good image formation and detection; and (2) in combination with illumination array selection control signal provided by the system control subsystem 30, automatically drive and control the output power of selected LED arrays 23A and 23B in the illumination subsystem 22, so that objects within the FOV of the system are optimally exposed to LED-based illumination and optimal images are formed and detected at the image detection array 35.

The primary function of the image capturing and buffering subsystem 25 is to (1) detect the entire 2-D image focused onto the 2D image detection array 35 by the image formation optics 34 of the system, (2) generate a frame of digital pixel data for either a selected region of interest of the captured image frame, or for the entire detected image, and then (3) buffer each frame of image data as it is captured. Notably, in the illustrative embodiment, a single 2D image frame (31) is captured during each image capture and processing cycle, or during a particular stage of a processing cycle, so as to eliminate the problems associated with image frame overwriting, and synchronization of image capture and decoding processes, as addressed in U.S. Pat. Nos. 5,932,862 and 5,942,741 assigned to Welch Allyn, and incorporated herein by reference.

The primary function of the digital image processing subsystem 26 is to process digital images that have been captured and buffered by the image capturing and buffering subsystem 25, during both far-field and near-field modes of illumination and operation. Such image processing operation includes image-based bar code decoding methods described in detail hereinafter and in U.S. Pat. No. 7,128,266, incorporated herein by reference.

The primary function of the input/output subsystem 27 is to support universal, standard and/or proprietary data communication interfaces with external host systems and devices, and output processed image data and the like to such external host systems or devices by way of such interfaces. Examples of such interfaces, and technology for implementing the same, are given in U.S. Pat. Nos. 6,619,549 and 6,619,549, incorporated herein by reference in its entirety.

The primary function of the System Control Subsystem is to provide some predetermined degree of control, coordination and/or management signaling services to each subsystem component integrated within the system, as shown. While this subsystem can be implemented by a programmed microprocessor, in the preferred embodiments of the present invention, this subsystem is implemented by the three-tier software architecture supported on microcomputing platform shown in FIGS. 3 and 13, and described in U.S. Pat. No. 7,128,266, and elsewhere hereinafter.

The primary function of the manually-activatable trigger switch 5 integrated with the hand-supportable/countertop-supportable housing is to enable the user to generate a control activation signal (i.e. trigger event signal) upon manually depressing the same (i.e. causing a trigger event), and to provide this control activation signal to the system control subsystem for use in carrying out its complex system and subsystem control operations, described in detail herein.

The primary function of the system configuration parameter table 29 in system memory is to store (in non-volatile/persistent memory) a set of system configuration and control parameters (i.e. SCPs) for each of the available features and functionalities, and programmable modes of system operation supported in any particular embodiment of the present invention, and which can be automatically read and used by the system control subsystem 30 as required during its complex operations. Notably, such SCPs can be dynamically managed as taught in great detail in copending U.S. patent application Ser. No. 11/640,814 filed Dec. 18, 2006, incorporated herein by reference.

The detailed structure and function of each subsystem will now be described in detail above.

Specification of the System Implementation Model for the Digital Image Capture and Processing System of the Present Invention FIG. 3 shows a schematic diagram of a system implementation for the hand-supportable Digital Image Capture and Processing System illustrated in FIGS. 1A through 1F. As shown in this system implementation, the single PC board 8, supports a number of components including: a high resolution (e.g. 1280×1024 7-bit 6 micron pixel size) CMOS image detection array 35 with randomly accessible region of interest (ROI) window capabilities, and realizing electronic functions performed by the image formation and detection subsystem; a computing platform 45 including (i) a 64-Bit microprocessor 46, (ii) an expandable Flash ROM memory 47, (iii) SDRAM 48, (iv) an FPGA FIFO 49 configured to control the camera timings and drive an image acquisition process, (v) a power management module 50 for the memory control unit (MCU), and (vi) a pair of UARTs 51 (one for an IRDA port and one for a JTAG port); interface circuitry 52 for realizing the functions performed by the I/O subsystem; and an IR-based object motion detection and analysis circuitry 53 for realizing subsystem 20. The I/O interface circuitry 52 provides the hardware data communication interfaces for the system to communicate with systems, including host systems, located external to the image capture and processing system of the present invention. The interfaces implemented in system of the present invention will typically include RS232, keyboard wedge (KBW), RS-485 (IBM), and/or USB, or some combination of the above, as well as others required or demanded by the particular applications at hand. An exemplary universal interface system, which can be supported within the system of the present invention, is taught in Applicant's prior U.S. Pat. No. 6,619,549, incorporated herein by reference in its entirety.

As shown in FIG. 3, CMOS area-type image detection array 35 employed in the digital image capture and processing system hereof is mounted on a semiconductor-based digital camera sensor IC 55, which is operably connected to microprocessor 46 through the FPGA-implemented FIFO 49 and a system bus. As shown, SDRAM 48 is also operably connected to the microprocessor 46 by way of the system bus, thereby enabling the mapping of pixel data captured by the CMOS image detection array 35 into the SDRAM 48 under the control of the direct memory access (DMA) module within the microprocessor 46.

During image acquisition operations, the image pixels are sequentially read out of the image detection array 35. Although one may choose to read column-wise or row-wise for some CMOS image sensors, without loss of generality, the row-by-row read out of the data is preferred. The pixel image data set is arranged in the SDRAM 48 sequentially, starting at address 0XAOEC0000. To randomly access any pixel in the SDRAM is a straightforward matter: the pixel at row y ¼ column x located is at address (0XAOEC0000+y x 1280+x). As each image frame always has a frame start signal out of the image detection array 35, that signal can be used to start the DMA process at address 0XAOEC0000, and the address is continuously incremented for the rest of the frame. But the reading of each image frame is started at address 0XAOEC0000 to avoid any misalignment of data. Notably, however, if the microprocessor 46 has programmed the CMOS image detection array 35 to have a ROI window, then the starting address will be modified to (0XAOEC0000+1280×$R_1$), where $R_1$ is the row number of the top left corner of the ROI. Further details regarding memory access are described in Applicant's prior U.S. Pat. No. 7,128,266, incorporated herein by reference.

Specification of the Multi-Mode LED-Based Illumination Subsystem Employed in the Hand-Supportable Digital Image Capture and Processing System of the Present Invention In the illustrative embodiment shown in FIGS. 4A, 4B, 4C, 4D, 4E, 4F, 4H and 4I, the multi-mode illumination subsystem 22 includes two spatially-separated, independently-controlled linear LED-based illumination arrays 23A and 23B. As shown, these linear LED illumination arrays are mounted in the upper and lower positions on the single PC board 8, about the light transmission aperture 60 centrally formed in the PC board, as shown. Each linear LED-based illumination array 23A and 23B is designed to illuminate a different portion of the FOV of the system during different modes of operation. The first LED-based illumination array 23A is designed to illuminate the near-field portion of the field of view of the system during the near-field illumination mode of the multi-mode illumination subsystem 22. In contrast, the second LED-based illumination array 23B is designed to illuminate the far-field portion of the field of view of the system far-field illumination mode of the multi-mode illumination subsystem 22.

As shown in FIGS. 4A, 4B, 4C, 4E and 4F, the near-field illumination array 23A comprises a linear array of LED light sources 62A through 62N mounted on the top portion of the light transmission aperture 60 as shown. Many of these LEDs are positioned beneath a pair refractive-type illumination focusing lens elements 63A and 63B integrated within the imaging window panel 3. Also, some of these LEDs can be provided with spherical (i.e. plano-convex) lenses and some with flat-tops so as to produce a resulting field of illumination in the near field region which has a substantially uniform spatial intensity thereover. During the near-field (wide-area) image capture mode of the image formation and detection subsystem 21, the near-field wide-area illumination array 23A produces a near-field wide-area illumination field 36 of narrow optical-bandwidth within the near-field portion of the FOV of the system, so as to illuminate object(s) residing therein during object illumination and imaging operations.

As shown in FIGS. 4A, 4B, 4C, 4E and 4F, the far-field illumination array 23B comprises a linear array of LED light sources 62A through 62N mounted on the bottom portion of the light transmission aperture 60 as shown. Many of these LEDs are positioned beneath a pair refractive-type illumination focusing lens elements 63C and 63D integrated within the imaging window panel 3. Also, some of these LEDs can be provided with spherical (i.e. plano-convex) lenses and some with flat-tops so as to produce a resulting field of illumination in the far field region which has a substantially uniform spatial intensity thereover. During the far-field (wide-area) image capture mode of the image formation and detection subsystem 21, the far-field wide-area illumination array 23A produces a far-field wide-area illumination field 36 of narrow optical-bandwidth within the near-field portion of the FOV of the system, so as to illuminate object(s) residing therein during object illumination and imaging operations.

As shown in FIG. 4D, illumination focusing lenses 63A and 63B integrated in the upper portion of the imaging window panel 3, illumination focusing lenses 63C and 63D integrated in the bottom portion of the imaging window panel 3, are preferably realized within a molded optical plastic imaging window structure having integrated lenses, simplifying lens/LED alignment, and cost of manufacture.

During system operation, the far-field illumination mode of the multi-mode illumination subsystem 22 is automatically activated in response to detecting that an object resides within the far-field portion of the FOV by the IR object motion detection and analysis subsystem. In response thereto, the multi-mode illumination subsystem 22 drives the far-field illumination array 23B to illuminate the far-field portion of the FOV, as shown in FIG. 4H. Similarly, the near-field illumination mode of the multi-mode illumination subsystem 22 is automatically activated in response to detecting that an object resides within the near-field portion of the FOV by the IR object motion detection and analysis subsystem. In response thereto, the multi-mode illumination subsystem 22 drives the near-field illumination array 23A to illuminate the near-field portion of the FOV, as shown in FIG. 4I.

In general, the multi-mode illumination subsystem 22 is designed to cover the entire optical field of view (FOV) of the digital image capture and processing system with sufficient illumination to generate high-contrast images of bar codes located at both short and long distances from the imaging window.

As shown in FIGS. 4H and 4I, the multi-mode illumination subsystem 22 transmits visible narrow-band illumination through imaging window 3 and into the FOV of the image formation optics of the image formation and detection subsystem 21. Light rays reflected and scattered from the illuminated object (typically bearing a code symbol structure) are transmitted through the high-pass and low-pass optical filters 40A, 40B of the narrow-band optical filtering system 40, and ultimately focused onto the CMOS image detection array 35 to form of a focused detected 2D image thereupon, while all other components of ambient light are substantially rejected before reaching image detection at the image detection array.

Notably, in the illustrative embodiment, the red-wavelength reflecting high-pass optical filter element 40A is embodied within the imaging window panel 3, whereas the low-pass optical filter element 40B is disposed before the image detection array 35 either disposed among the focusing lens elements of the image formation optics 34, or realized as a dichroic surface on one of the FOV folding mirrors 74 and 75. This forms the integrated narrow-band optical filter subsystem 40 which ensures that the object within the FOV is imaged at the image detection array 35 using only spectral components within the narrow-band of illumination produced from the illumination subsystem 22, while all other components of ambient light outside this narrow range (e.g. 15 nm) are substantially rejected.

Specification of the Digital Image Formation and Detection (i.e. IFD or Camera) Subsystem During its Wide-Area Mode of Digital Image Formation and Detection, Supported by Near and Far Fields of Narrow-Band Wide-Area Illumination As shown in FIGS. 5A through 5G2 and 6A through 6C, the digital image formation and detection subsystem 21 of the illustrative embodiment has a wide-area 2D image capture mode of operation where either substantially all or a selected region of pixels in its CMOS image detection array 35 are enabled. However, the image formation and detection subsystem 21 can also be easily programmed to support other modes of image capture, namely: (i) a narrow-area image capture mode in which only a few central rows of pixels about the center of the image detection array are enabled, as disclosed in U.S. Pat. No. 7,128,266 and U.S. application Ser. No. 10/989,220, and incorporated herein by reference, and (ii) a wide-area image capture mode in which a predetermined region of interest (ROI) on the CMOS image sensing array is visibly marked as being a region in which its pixel data will be cropped and processed for reading information graphically encoded within the ROI region of captured images, as disclosed in U.S. application Ser. No. 10/989,220 supra.

As shown in FIG. 5A, the CMOS image detection array 35 is equipped with image formation optics 34 which provides the image detection array 35 with a field of view (FOV) 33 on objects to be illuminated and imaged. As shown in FIGS. 5A and 8C, the CMOS image detection array 35 is mounted on the PC board and surrounded by a "light-box" housing that is mounted over the CMOS image detection array chip (i.e. 2D CMOS image sensor chip on the PC board) 56. As shown, the a "light-box" housing supports FOV forming optics 34 which are aligned along the optical axis passing through the 2D image detection array, orthogonal to the image detection plane thereof, and residing within the surface of the 2D CMOS image sensor chip. Preferably, the light-box housing 73 is fabricated from plastic or other suitable material, and its hollow interior volume is optically absorbing (e.g. with light absorbing coatings) to minimize light reflections therewithin during image formation and detection. As best shown in FIGS. 5A, 5B and 8H, the light box housing 73 can be formed as part of a larger optical component support (OCS) structure 78, designed for supporting the first FOV folding mirror 74 which works in conjunction with the second FOV mirror 75. The first FOV mirror 74 is supported, on a first support surface 76 in the OCS assembly, whereas the second FOV mirror 75 is supported on an opposing support surface 77 in the OCS structure 78.

FIG. 5A clearly illustrates the geometrical relationship among the primary optical and electro-optical components maintained within the OCS structure 78, including the parabolic light collecting mirror 79 supported on surface 80 adjacent FOV folding mirrors 74 and 75, for purposes of collecting light rays from a central portion of the FOV and directing the focused light energy onto an avalanche-type photodiode 81 (as part of the automatic exposure measurement and illumination control subsystem) mounted on the PC board, adjacent CMOS image sensor chip 56, as clearly illustrated in FIG. 9C.

In the illustrative embodiment, the image formation optics 34 supported by the system provides a field of view (FOV) of about _ mm at the nominal focal distance to the target, and approximately 70 mm from the edge of the imaging window. The minimal size of the field of view (FOV) is _ mm at the nominal focal distance to the target of approximately 10 mm.

In FIGS. 5B and 5C, the hand-supportable digital image capture and processing system of the first illustrative embodiment is shown with the rear portion of the housing removed. Such views clearly reveal (i) the molded OCS housing structure 78 supporting the FOV folding mirrors 74 and 75 of the IFD subsystem, and narrow-band pass optical filtering structure 40A and 40B mounted over the rear portion of the central light transmission aperture formed in the PC board/optical bench 8, as well as (ii) the illumination sources 83A and 83B, linear aperture stop optics 84A and 84B, and cylindrical beam folding mirrors 85A and 85B associated with the linear target illumination subsystem 31 which are mounted about the area-type image detection array 35 of the image formation and detection subsystem 21.

Specification of the Narrow-Band Optical Filter Subsystem Integrated within the Housing of the Digital Image Capture and Processing System of the Present Invention As shown in FIGS. 5D through 5E3, the housing of the digital image capture and processing system of the present invention has integrated within its housing, narrow-band optical filter subsystem 40 for transmitting substantially only the very narrow band of wavelengths (e.g. 620-700 nanometers) of visible illumination produced from the narrow-band multi-mode illumination subsystem 22, and rejecting all other optical wavelengths outside this narrow optical band however generated (i.e. ambient light sources). As shown, narrow-hand optical filter subsystem 40 comprises: (i) high-pass (i.e. red-wavelength reflecting) optical filter element 40A embodied within the plastic imaging window; and (ii) low-pass optical filter element 40B disposed before the CMOS image detection array 35. as described above. Alternatively, the high-pass (i.e. red-wavelength reflecting) optical filter element 40A can be embodied as a dichroic film applied to the surface of one of its FOV folding mirrors 74 or 75 employed in the image formation and detection subsystem. Preferably, the red-color window filter 40A will have substantially planar surface characteristics over its central planar region 3A to avoid focusing or defocusing of light transmitted therethrough during imaging operations. During system operation, these optical filter elements 40A and 40B optically cooperate to form a narrow-band optical filter subsystem 40 transmitting substantially only the very narrow band of wavelengths (e.g. 620-700 nanometers) of visible illumination produced from the LED-based illumination subsystem 22 and reflected/scattered off the illuminated object, while rejecting all other optical wavelengths outside this narrow optical band however generated (i.e. ambient light sources).

Alternatively, the band-pass optical filter subsystem 40 may also be realized as an integrated multi-layer filter structure disposed anywhere before its CMOS image detection array 35, or even within the imaging window 3 itself.

As shown in FIG. 5E1, the light transmission characteristics (energy versus wavelength) associated with the low-pass optical filter element 40B indicate that optical wavelengths below 620 nanometers are transmitted therethrough, whereas optical wavelengths above 620 nm are substantially blocked (e.g. absorbed or reflected).

As illustrated in FIG. 5E2, optical wavelengths greater than 620 nanometers are transmitted through the high-pass optical filter element 40B, while optical wavelengths less than 620 nm are substantially blocked (e.g. absorbed or reflected).

FIG. 5E3 shows the transmission characteristics of the narrow-based spectral filter subsystem 40, plotted against the spectral characteristics of the LED-emissions produced from the LED-arrays in the Multi-Mode LED-Based Illumination Subsystem of the illustrative embodiment of the present invention. Notably, the pass-bandwidth of the optical filtering subsystem 40 is slightly greater than the bandwidth of the laser illumination beam generated by the multi-mode illumination subsystem.

During system operation, spectral band-pass filter subsystem 40 greatly reduces the influence of the ambient light, which falls upon the CMOS image detection array 35 during the image capturing operations.

By virtue of the optical filter of the present invention, an optical shutter mechanism is eliminated in the system. In practice, the optical filter can reject more than 85% of incident ambient light, and in typical environments, the intensity of LED illumination is significantly more than the ambient light on the CMOS image detection array 35. Thus, while an optical shutter is required in nearly most conventional CMOS imaging systems, the digital image capture and processing system of the present invention effectively manages the time that the CMOS image detection array 35 is exposed to narrow-band illumination by controlling the time duration that LED-based illumination arrays 23A and 23B generate and project illumination into the FOV in which the object is detected. This method of illumination control is achieved using control signals generated by (i) the CMOS image detection array 35 and (ii) the automatic light exposure measurement and illumination control subsystem 24 in response to real-time measurements of light exposure within the central portion of the FOV, while the delivery of narrow-band illumination is controllably delivered to the object in the FOV by operation of the band-pass optical filter subsystem 40 described above. The result is a simple system design, without moving parts, and having a reduced manufacturing cost.

FIG. 5F specifies the geometrical layout of the optical components used within the digital IPD subsystem 21. As shown, the red-wavelength reflecting high-pass lens element 40A is positioned at the imaging window 3 before the image formation lens elements 34, while the low-pass filter element 40B is embodied within the surface of the first or second FOV folding mirrors 74 and 75 or anywhere before the image detection array 35. In the illustrative embodiment, image formation optics 34 comprises three lenses 34A, 34B and 34C, each made as small as possible, having spherical surfaces, and made from common glass. Collectively, these lenses are held together within a lens holding assembly 87, and form an image formation subsystem arranged along the optical axis of the CMOS image detection array 35. As shown in FIGS. 5A, 5C and 8H the lens holding assembly 87 is formed as part of the light box structure 73, and comprises: a barrel structure 87A for holding lens elements 34A, 34B and 34C; and a base structure 87B for holding the CMOS image detection array 35 mounted on the PC board/optical bench structure 8.

In FIG. 5F, the lens holding assembly 87 and imaging detecting array 35 are mounted along an optical path defined along the central axis of the system. In the illustrative embodiment, the image detection array 35 has, for example, a 1280× 1024 pixel resolution (½" format), 6 micron pixel size, with randomly accessible region of interest (ROI) window capabilities. An example of an exemplary area image sensor is the 1.23 Megapixel Digital Video CMOS Image Sensor VC5602 having an image size of 1280×780 pixels, from STMicroelectronics. It is understood, however, that many others kinds of imaging sensing devices (e.g. CMOs or CCD) can be used to practice the principles of the present invention disclosed herein.

Details regarding a preferred method of designing the image formation (i.e. camera) optics within the image-based bar code reader of the present invention using the modulation transfer function (MTF) are described in Applicants' U.S. Pat. No. 2,270,272, incorporated herein by reference.

Specification of the Automatic Zoom/Focus Mechanism Integrated within the Image Formation and Detection Subsystem of the Digital Image Capture and Processing System of the Present Invention As shown in FIG. 5G an alternative auto-focus/zoom optics assembly 34' can be employed in the image formation and detection subsystem of the digital image capture and processing system of the present invention. In this alternative illustrative embodiment, only one optical element needs to be moved in order to adjust both the focus and zoom characteristics of the system. As shown, the optics assembly 34' comprises four optical components disposed before the image sensing array 35, namely: 34A', 34B', 34C' and 34D". In such illustrative embodiments, the IR-based object detection subsystem can be replaced by an IR ladar-based object motion detection and analysis subsystem 20' to support real-time measurement of an object's range within the FOV of the system during system operation. Real-time object range data is provided to the system control subsystem for use in generating automatic focus and zoom control signals that are supplied to the auto-focus/zoom optics assembly employed in the image formation and detection subsystem 21. Based on the measured range of the detected object in the FOV, a control algorithm running within the system control subsystem 30 will automatically compute the focus and zoom parameters required to generate control signals for driving the optics to their correct configuration/position to achieve the computed focus and zoom parameters.

Specification of Modes of Operation of the Area-Type Image Sensing Array Employed in the Digital Image Formation and Detection Subsystem of the Present Invention In the digital image capture and processing system 1 of the present invention, the CMOS area-type image detection array 35 supports several different modes of suboperation, namely: a Single Frame Shutter Mode (i.e. Snap-Shot Mode) of the operation illustrated in FIG. 6A; a Real Video Mode of the operation illustrated in FIG. 6B; and a Periodic Snap Shot ("Pseudo-Video") Mode of the operation illustrated in FIG. 6C. Each of these modes of CMOS image detector suboperation will be described in greater detail below.

The Single Frame Shutter Mode (i.e. Snap-Shot Mode) of the Operation

Referring to FIG. 6A, the Single Frame Shutter Mode (i.e. Snap-Shot Mode) of the operation is schematically illustrated. As shown, during the row reset stage (e.g. about 150 milliseconds), only ambient illumination is permitted to expose the image detection array. During the global integration operations (e.g. between 500 microseconds and 8.0 milliseconds), both LED-based strobe and ambient illumination are permitted to expose the image detection array. During row data transfer operations (e.g. about 30 milliseconds), only ambient Illumination is permitted to illuminate the image detection array. The particular timings selected for this mode will depend on the specifics of the image sensor employed, and the size of the digital image to be formed and detected. In the illustrative embodiments, an ST image sensor VC5602 is used, and the size of the image is 1280×780. When using the ST image sensor, it is noted that "global reset" is supported so that the all rows in FIG. 6A will be reset simultaneously, rather than as sequentially shown in FIG. 6A. Based on these requirements, the timings are selected as follows: reset stage ~150 microseconds; global integration (exposure) time can be set to as low as 500 microseconds, as a default setting, but can be set to a value lower than 500 microseconds, or as high as 8 milliseconds; the data transfer stage is set to about 30 milliseconds.

The Real Video Mode of the Operation

Referring to FIG. 6B, the Real Video Mode of the operation is schematically illustrated. As shown, during each image acquisition cycle, including row data transfer operations, multiple rows of the image detection array are simultaneously integrating both LED-based illumination and ambient illumination. The particular timings selected for this mode will depend on the specifics of the image sensor employed, and the size of the digital image to be formed and detected. In the illustrative embodiments, an ST image sensor VC5602 is used, and the size of the image is 1280×780. Based on these requirements, the timings are selected as follows: Texp1=Texp2=Texp3 which is the exposure time which, in the illustrative embodiment, is 500 microseconds by default, but could be set to a higher or lower value. In this mode, Image 1 time=Image 2 time=Image 3 time=frame time which, in the illustrative embodiment, is set to approximately 30 milliseconds. Also, Tinterframe12=Tinterframe23=frame time=approximately 30 milliseconds.

The Periodic Snap Shot ("Pseudo-Video") Mode of the Operation

Referring to FIG. 6C, the Periodic Snap Shot ("Pseudo-Video") Mode is schematically illustrated. The particular timings selected for this mode will depend on the specifics of the image sensor employed, and the size of the digital image to be formed and detected. In the illustrative embodiments, an ST image sensor VC5602 is used, and the size of the image is 1280×780. Based on these requirements, the timings are selected as follows: the duration of each periodically generated Snap-Shot type image acquisition cycle is approximately 30 milliseconds, followed by a decode-processing cycle having a time-duration approximately equal to the duration of the Snap-Shot type image acquisition cycle (e.g. approximately 30 milliseconds) so that at least fifteen (15) image frames can be acquired per second. Also, when using the ST image sensor, it is noted that "global reset" is supported so that the all rows in FIG. 6C will be reset simultaneously, rather than as sequentially shown in FIG. 6C.

Specification of the Automatic Object Motion Detection and Analysis Subsystem of the Present Invention: Various Ways to Realize Said Subsystem in Practice As shown in FIGS. 7A through 7G, there are several different ways of implementing the automatic object motion detection and analysis subsystem, employed in the hand-supportable digital image capture and processing system of the first illustrative embodiment of the present invention.

In general, automatic object motion detection and analysis subsystem 20 operates as follows. In system modes of operation requiring automatic object presence and/or range detection, automatic object motion detection and analysis subsystem 20 will be activated at system start-up and operational at all times of system operation, typically continuously providing the system control subsystem 30 with information about the state of objects within the object detection field 32 of the imaging-based system of the first illustrative embodiment. During such operation, the system control subsystem responds to such state information and generates control activation signals during particular stages of the system control process, such as, for example, control activation signals which are provided to system control subsystem 30 for (i) activating either the near-field and/or far-field LED illumination arrays, and (ii) controlling how strongly these LED illumination arrays 23A, 23B should be driven to ensure quality image exposure at the CMOS image detection array 35.

It is appropriate at this juncture to describe these different kinds of object motion detection and analysis subsystem hereinbelow.

Automatic Object Motion and Analysis Detection Subsystem Realized Using a Pair of Infra-Red (IR) Transmitting and Receiving Laser Diodes FIGS. 7A and 7B show a digital image capture and processing system employing an automatic object motion and analysis detection subsystem realized as an IR-based automatic object detection and ranging subsystem using a pair of infra-red (IR) transmitting and receiving diodes 90A and 90B, as disclosed in U.S. Pat. No. 6,705,526, as well as in copending U.S. application Ser. No. 11/489,259 filed Jul. 19, 2006, incorporated herein by reference. As shown in FIG. 7A, the underlying single printed circuit (PC) board 8 supports infra-red (IR) transmitting and receiving laser diodes 90A and 90B associated with the IR-based object motion detection and ranging subsystem illustrated in greater detail in FIG. 7B below.

As shown in FIG. 7B, the IR-based object motion and ranging subsystem 20' of FIGS. 7A and 7B comprises: an IR laser diode 90A' supported in a support module 91 mounted on the PC board 8, for producing a low power IR laser beam; IR beam shaping optics 92, supported in the module 91 for shaping the IR laser beam (e.g. into a thin fan-like like geometry) and directing the same into the central portion of the object detection field 32 defined by the field of view (FOV) of IR light collection/focusing optics 93 also supported in the module 91; an amplitude modulation (AM) circuit 94 supported on the PC board 8, for modulating the amplitude of the IR laser beam produced from the IR laser diode at a frequency $f_c$, (e.g. 75 Mhz) with up to 7.5 milli Watts of optical power; optical detector (e.g. an avalanche-type IR photo-detector) 90B, mounted at the focal point of the IR light collection/focusing optics 93, for receiving the IR optical signal reflected off an object within the object detection field, and converting the received optical signal into an electrical signal; an amplifier and filter circuit 95, mounted on the PC board 8, for isolating the $f_0$ signal component and amplifying it; a limiting amplifier 96 for maintaining a stable signal level; a phase detector 97 for mixing the reference signal component $f_0$ from the AM circuit 94 and the received signal component $f_0$ reflected from the object and producing a resulting signal which is equal to a DC voltage proportional to the Cosine of the phase difference between the reference and the reflected $f_0$ signals; an amplifier circuit 98 for amplifying the phase difference signal; a received signal strength indicator (RSSI) 99 for producing a voltage proportional to a LOG of the signal reflected from the target object which can be used to provide additional information; a reflectance level threshold analog multiplexer 100 for rejecting information from the weak signals; and a 12 bit A/D converter 101 for converting the DC voltage signal from the RSSI circuit 99 into sequence of time-based range data elements $\{R_{n,i}\}$, taken along nT discrete instances in time. Each range data element $R_{n,i}$ provides a measure of the distance (i.e. range) of the object referenced from (i) the IR laser diode 90A to (ii) a point on the surface of the object within the object detection field 32. The range analysis circuitry 102 analyzes these range data elements and detects where the object resides along the spatial extend of the FOV (e.g. in the long range region, or short range region of the FOV). Various kinds of analog and digital circuitry can be designed to implement the IR-based automatic object motion detection and analysis subsystem 20' Alternatively, this subsystem can be realized using various kinds of range detection techniques as taught in U.S. Pat. No. 6,637,659, incorporated herein by reference in its entirely.

Automatic Object Motion and Analysis Detection Subsystem Realized Using an IR-Based Image Sensing and Processing Device FIGS. 7C and 7D show a digital image capture and processing system employing an automatic object motion and analysis detection subsystem 20" realized using an IR-based image sensing and processing device to analyze object motion and compute velocity. As shown in FIGS. 7C, the front portion of the system housing, including imaging window 3, has been removed so as to reveal the underlying single printed circuit (PC) board/optical bench 8 that supports the infra-red (IR) LED and image sensing module 105 associated with the IR-imaging based object motion and velocity detection subsystem 20" further illustrated in FIG. 7E.

As shown in FIG. 7D, the IR-imaging based object motion and velocity detection subsystem 20" comprises: an IR LED and optics 106 for illuminating at least a portion of the FOV with a field of IR illumination 107; an image detection array and optics 108 for projecting a motion/velocity detection FOV 109 into the FOV 33, and capturing IR-based 2D images of an object moving through the FOV 33; an image capture and buffering subsystem 110; and a digital signal processor (DSP) 111 for processing captured digital images and computing the motion and velocity of objects in the field of view of the system. This object motion and velocity data is then provided to the system control system 30 for use in carrying of system control management operations within the digital image capture and processing system.

Automatic Object Motion Detection and Analysis Subsystem Realized Using an IR-Based LADAR Pulse-Doppler Based Object Motion and Velocity Detection Device FIGS. 7E and 7F show a hand-supportable digital image capture and processing system employing an automatic high-speed IR LADAR Pulse-Doppler based object motion and velocity detection subsystem. As shown in FIGS. 7E, the front portion of the system housing, including imaging window 3, has been removed so as to reveal the underlying single printed circuit (PC) board/optical bench 8 supporting a high-speed IR LADAR Pulse-Doppler based object motion and velocity detection subsystem 20'''. As shown therein, a pair of pulse-modulated IR laser diodes 115A and 115B (with IR photo-diodes integrated therein) are focused through optics 116 supported in support module 117, and projected into the 3D imaging volume of the system for sensing the presence, motion and velocity of objects passing therethrough in real-time using IR Pulse-Doppler LIDAR techniques as disclosed, in great detail in Applicants' copending application Ser. Nos. 11/489,259 filed Jul. 19, 2006 and 11/880,087 filed Jul. 19, 2007, both incorporated herein by reference, in its entirety.

As shown in FIG. 7F, the high-speed imaging-based object motion/velocity detection subsystem of FIG. 7F, shown comprising an IR LADAR transceiver 118 and an embedded digital signal processing (DSP) chip 119 (including digital filters) to support high-speed digital signal processing operations required for real-time object presence, motion and velocity detection, and corresponding signal generation operations.

While several techniques have been detailed above for automatically detecting the motion and velocity of objects within the FOV of the digital image capture and processing system of the present invention, it understood that other methods may be employed, as disclosed, for example, in great detail in Applicants' copending application Ser. Nos. 11/489, 259 filed Jul. 19, 2006 and 11/880,087 filed Jul. 19, 2007, both being incorporated herein by reference, in their entirety.

Specification of the Automatic Linear Targeting Illumination Subsystem of the Present Invention Referring to FIGS. 8A through 8H, the automatic linear object targeting illumination subsystem of the present invention 31 will now be described in detail.

As shown in FIGS. 8A and 8B, the object targeting illumination subsystem 31 employed in the digital image capture and processing system of the illustrative embodiment automatically generates and projects a visible linear-targeting illumination beam 70 across the central extent of the FOV of the system in response to either (i) the automatic detection of an object during hand-held imaging modes of system operation, or (ii) manual detection of an object by an operator when s/he manually actuates the manual actuatable trigger switch 5.

FIGS. 8C through 8H show the automatic linear object targeting illumination subsystem in greater structural and functional detail. As shown therein, the OCS support assembly 78 of the preferred embodiment serves as a component in the linear targeting illumination beam generation subsystem. As shown, the OCS support assembly 78 supports (i) a pair of cylindrical beam folding mirrors 85A and 85B arranged on opposite sides of the FOV optics subassembly 34, as well as (ii) a pair of elongated aperture stops 84A and 84B, also supported by the OCS support assembly, and arranged above a pair of visible high-brightness LEDs 83A and 83B mounted on the PC board, on opposite sides of the FOV optics subassembly 34. The purpose of aperture stops 84A and 84B is to produce a pair of spaced apart light beams which are planarized during transmission through the aperture stops. In turn, the planarized light beams are then focused by the cylindrical beam folding mirrors 84A and 84B, to project a pair of visible linear targeting illumination beams 70A, 70B off the planar beam folding mirror 75 mounted behind the imaging window of the system. As shown, these planar light beams are ultimately projected simultaneously into the FOV of the system and spatially converge to produce a single substantially planar (narrow area) visible illumination beam 70 for object targeting purposes, during object detection operations. FIGS. 8F and 8G show the components of the object targeting illumination subsystem from different perspective views.

Specification of the Automatic Light Exposure Measurement and Illumination Control Subsystem of the Present Invention Referring to FIGS. 9A through 9D and 10, the automatic light exposure measurement and illumination control subsystem of the present invention will now be described in greater detail.

As shown in FIG. 9C, the parabolic light-collecting mirror segment 79 collects narrow-band LED-based light reflected from a central portion of the FOV of the system, and focuses this collected light energy onto the avalance-type photo-diode 81 that is mounted at the focal point of the light collection mirror 79. The photo-diode 81 converts the detected light signal into an electrical signal having an amplitude which directly corresponds to the intensity of the collected light signal. Electronic circuitry then processes the electrical signals produced by the photo-diode 81 indicative of the intensity of detected light exposure levels within the focal plane of the CMOS image detection array, and control signals are automatically generated so as to control the illumination produced by LED arrays 23A and 23D employed in the multi-mode illumination subsystem 22.

During object illumination and imaging operations, narrow-band light from the LED arrays 23A and/or 23B is reflected from the target object (at which the digital imager is aimed) and is accumulated by the CMOS image detection array 35. The object illumination process must be carried out for an optimal duration so that each acquired digital image frame has good contrast and is not saturated. Such conditions are required for consistent and reliable bar code decoding operation and performance.

In order to automatically control the brightness and contrast of acquired images, the automatic light exposure measurement and illumination control subsystem 24 carries out the following operations: (i) it automatically measures the amount of light reflected from the target object (i.e measured light exposure at the image plane of the CMOS imaging sensing array); (ii) it automatically calculates the maximum time that the CMOS image detection array 35 should be kept exposed to the actively-driven LED-based illumination array 23A (23B) associated with the multi-mode illumination subsystem 22; (iii) it automatically controls the time duration that the illumination subsystem 22 illuminates the target object with narrow-band illumination generated from the activated LED illumination array; and then (iv) it automatically deactivates the illumination array when the calculated time to do so expires (i.e. lapses).

By virtue of its operation, the automatic light exposure measurement and illumination control subsystem 24 eliminates the need for a complex shuttering mechanism for CMOS-based image detection array 35. This novel mechanism ensures that the digital image capture and processing system of the present invention generates non-saturated images with enough brightness and contrast to guarantee fast and reliable image-based bar code decoding in demanding end-user applications.

Specification of the System Control Subsystem of the Present Invention

Referring to FIGS. 10 through 12D, the system control subsystem of the present invention will now be described in detail.

As shown in FIG. 10, the system control subsystem 30 of the first illustrative embodiment interfaces with all other subsystems, namely: the image formation and detection subsystem 21 and its CMOS image sensing array 35; the illumination subsystem and its near and far field LED illumination arrays 23A, 23B; the automatic exposure measurement and illumination control subsystem 24 and its illumination diver circuitry 24A and its automatic exposure measurement and illumination control circuitry 24B; the object motion detection and analysis subsystem 20; the object targeting illumination subsystem 31; the image capture and buffering subsystem 25; the digital image processing subsystem 26; and the I/O subsystem 27.

Also, as illustrated, system control subsystem 30 controls the image detection array 35, the illumination subsystem 22, and the automatic light exposure measurement and illumination control subsystem 24 in each of the submodes of operation of the imaging detection array, namely: (i) the snap-shot mode (i.e. single frame shutter mode) of operation; (ii) the real-video mode of operation; and (iii) the pseudo-video mode of operation. Each of these modes of image detection array operation will be described in greater detail below.

Single Frame Shutter Mode (i.e. Snap-Shot Mode) of the Sub-Operation Supported by CMOS Image Detection Array When the single frame shutter mode (i.e. snap-shot mode) of the sub-operation is selected, as shown in FIG. 11A, the system control subsystem generates a series of control signals which control the automatic exposure measurement and illumination control subsystem, the illumination subsystem, and the image detection/sensing array as follows: (i) during the row reset stage (e.g. about 150 milliseconds), only ambient illumination is permitted to expose the image detection array; (ii) during the global integration operations (e.g. between 500 microseconds and 8.0 milliseconds), both LED-based strobe and ambient illumination are permitted to expose the image detection array; and (iii) during row data transfer operations (e.g. about 30 milliseconds), only ambient illumination is permitted to illuminate the image detection array. As shown in FIG. 11A, different control signals are generated in response to different object detection events. Also, FIG. 11B describes the timing of such events during the snap-shot mode of suboperation.

Notably, during this single frame shutter mode (i.e. snap-shot mode) of the sub-operation, a novel exposure control method is used to ensure that all rows of pixels in the CMOS image detection array have a common integration time, thereby capturing high quality images even when the object is in a state of high speed motion, relative to the image sensing array. This novel exposure control technique shall be referred to as "the global exposure control method" of the present invention, which is described in great detail in the flow chart of FIG. 6A. Also, the global exposure control method has been described in greater detail in U.S. Pat. No. 7,128,266 which is incorporated herein by reference.

Real-Video Mode of the Sub-Operation Supported by CMOS Image Detection Array

When the real-video mode of sub-operation is selected, as shown in FIG. 12A, the system control subsystem generates a series of control signals which controls the automatic exposure measurement and illumination control subsystem, the illumination subsystem, and the image sensing array. As illustrated, during each image acquisition cycle, including row data transfer operations, multiple rows of the image detection array simultaneously integrate both LED-based illumination and ambient illumination. As shown in FIG. 12A, different control signals are generated in response to different object detection events. Also, FIG. 12B describes the timing of such events during the Real-Video Mode of suboperation.

Periodic Snap Shot ("Pseudo-Video") Mode of the Operation Supported by the CMOS Image Detection Array When the periodic snap shot ("pseudo-video") mode of sub-operation is selected, as shown in FIG. 12C, the system control subsystem generates a series of control signals which controls the automatic exposure measurement and illumination control subsystem, the illumination subsystem, and the image sensing array. As shown in FIG. 12C, different control signals are generated in response to different object detection events. When an object is detected in the FOV, then the system control subsystem enables the periodic generation of snap-shot type image acquisition cycles (e.g. each having a duration of approximately 30 milliseconds), followed by a decode-processing cycle having a time-duration approximately equal to the duration of the snap-shot type image acquisition cycle (e.g. approximately 30 milliseconds) so that at least fifteen (15) image frames can be acquired per second. FIG. 12D describes the timing of such events during the real-video mode of suboperation.

Specification of the Three-Tier Software Architecture of the Digital Image Capture and Processing System of the First Illustrative Embodiment of the Present Invention As shown in FIG. 13, digital image capture and processing system of the present invention is provided with a three-tier software architecture comprising multiple software modules, including: (1) the Main Task module, the Secondary Task, the Area-Image Capture Task module, the Linear Targeting Beam Task module, the Application Events Manager module, the User Commands Table module, the Command Handler module, the Plug-In Controller (Manager) and Plug-In Libraries and Configuration Files, each residing within the Application layer of the software architecture; (2) the Tasks Manager module, the Events Dispatcher module, the Input/Output Manager module, the User Commands Manager module, the Timer Subsystem module, the Input/Output Subsystem module and the Memory Control Subsystem module, each residing within the System Core (SCORE) layer of the software architecture; and (3) the Linux Kernal module, the Linux File System module, and Device Drivers modules, each residing within the Linux Operating System (OS) layer of the software architecture.

While the operating system layer of the digital image capture and processing system is based upon the Linux operating system, it is understood that other operating systems can be used (e.g. Microsoft Windows, Apple Mac OSX, Unix, etc), and that the design preferably provides for independence between the main Application Software Layer and the Operating System Layer, and therefore, enables of the Application Software Layer to be potentially transported to other platforms. Moreover, the system design principles of the present invention provides an extensibility of the system to other future products with extensive usage of the common software components, decreasing development time and ensuring robustness.

In the illustrative embodiment, the above features are achieved through the implementation of an event-driven multi-tasking, potentially multi-user, Application layer running on top of the System Core software layer, called SCORE. The SCORE layer is statically linked with the product Application software, and therefore, runs in the Application Level or layer of the system. The SCORE layer provides a set of services to the Application in such a way that the Application would not need to know the details of the underlying operating system, although all operating system APIs are, of course, available to the application as well. The SCORE software layer provides a real-time, event-driven, OS-independent framework for the product Application to operate. The event-driven architecture is achieved by creating a means for detecting events (usually, but not necessarily, when the hardware interrupts occur) and posting the events to the Application for processing in real-time manner. The event detection and posting is provided by the SCORE software layer. The SCORE layer also provides the product Application with a means for starting and canceling the software tasks, which can be running concurrently, hence, the multi-tasking nature of the software system of the present invention.

Specification of Software Modules within the Score Layer of the System Software Architecture Employed in the Digital Image Capture and Processing System of the Present Invention The SCORE layer provides a number of services to the Application layer.

The Tasks Manager provides a means for executing and canceling specific application tasks (threads) at any time during the product Application run.

The Events Dispatcher provides a means for signaling and delivering all kinds of internal and external synchronous and asynchronous events When events occur, synchronously or asynchronously to the Application, the Events Dispatcher dispatches them to the Application Events Manager, which acts on the events accordingly as required by the Application based on its current state. For example, based on the particular event and current state of the application, the Application Events Manager can decide to start a new task, or stop currently running task, or do something else, or do nothing and completely ignore the event.

The Input/Output Manager provides a means for monitoring activities of input/output devices and signaling appropriate events to the Application when such activities are detected.

The Input/Output Manager software module runs in the background and monitors activities of external devices and user connections, and signals appropriate events to the Application Layer, which such activities are detected. The Input/Output Manager is a high-priority thread that runs in parallel with the Application and reacts to the input/output signals coming asynchronously from the hardware devices, such as serial port, user trigger switch 2C, bar code reader, network connections, etc. Based on these signals and optional input/output requests (or lack thereof) from the Application, it generates appropriate system events, which are delivered through the Events Dispatcher to the Application Events Manager as quickly as possible as described above.

The User Commands Manager provides a means for managing user commands, and utilizes the User Commands Table provided by the Application, and executes appropriate User Command Handler based on the data entered by the user.

The Input/Output Subsystem software module provides a means for creating and deleting input/output connections and communicating with external systems and devices The Timer Subsystem provides a means of creating, deleting, and utilizing all kinds of logical timers.

The Memory Control Subsystem provides an interface for managing the multi-level dynamic memory with the device, fully compatible with standard dynamic memory management functions, as well as a means for buffering collected data. The Memory Control Subsystem provides a means for thread-level management of dynamic memory. The interfaces of the Memory Control Subsystem are fully compatible with standard C memory management functions. The system software architecture is designed to provide connectivity of the device to potentially multiple users, which may have different levels of authority to operate with the device.

The User Commands Manager, which provides a standard way of entering user commands, and executing application modules responsible for handling the same. Each user command described in the User Commands Table is a task that can be launched by the User Commands Manager per user input, but only if the particular user's authority matches the command's level of security.

The Events Dispatcher software module provides a means of signaling and delivering events to the Application Events Manager, including the starting of a new task, stopping a currently running task, or doing something or nothing and simply ignoring the event.

Specification of Software Modules within the Application Layer of the System Software Architecture Employed in the Digital Image Capture and Processing System of the Present Invention The image processing software employed within the system hereof performs its bar code reading function by locating and recognizing the bar codes within the frame of a captured digital image comprising pixel data. The modular design of the image processing software provides a rich set of image processing functions, which can be utilized in future applications, related or not related to bar code symbol reading, such as: optical character recognition (OCR) and verification (OCV); reading and verifying directly marked symbols on various surfaces; facial recognition and other biometrics identification; etc.

The Area Image Capture Task, in an infinite loop, performs the following task. It illuminates the entire field-of-view (FOV) and acquires a wide-area (e.g. 2D) digital image of any objects in the FOV. It then attempts to read bar code symbols represented in the captured frame of image data using the image processing software facilities supported by the digital image processing subsystem 26 to be described in greater detail hereinafter. If a bar code symbol is successfully read, then subsystem 26 saves the decoded data in the special decode data buffer. Otherwise, it clears the decode data buffer. Then, it continues the loop. The Area Image Capture Task routine never exits on its own. It can be canceled by other modules in the system when reacting to other events. For example, when a user pulls the trigger switch 5, the event TRIGGER_ON is posted to the Application. The Application software responsible for processing this event, checks if the Area Image Capture Task is running, and if so, it cancels it and then starts the Main Task. The Area Image Capture Task can also be canceled upon OBJECT_DETECT_OFF event, posted when the user moves the digital imager away from the object, or when the user moves the object away from the digital imager. The Area Image Capture Task routine is enabled (with Main Task) when "semi-automatic-triggered" system modes of programmed operation are to be implemented on the digital image capture and processing platform of the present invention.

The Linear Targeting Illumination Task is a simple routine which is enabled (with Main Task) when manually or automatically triggered system modes of programmed are to be implemented on the illumination and imaging platform of the present invention.

Various bar code symbologies are supported by the digital image capture and processing system of the present invention. Supported bar code symbologies include: Code 128; Code 39; 12 of 5; Code93; Codabar; UPC/EAN; Telepen; UK-Plessey; Trioptic; Matrix 2 of 5; Ariline 2 of 5; Straight 2 of 5; MSI-Plessey; Code11; and PDF417.

Specification of Method of Reading a Programming-Type Bar Code Symbol Using the Hand-Supportable Digital Image Capture and Processing System of the Present Invention Referring to FIGS. 14A1 and 14A2, a novel method of reading a "programmable bar code symbol" using the digital image capture and processing system of the present invention will now be described.

As shown in FIG. 14A1, when configured in the programming-type bar code reading mode of the present invention, the image capture and processing system of the present invention automatically generates a visible linear target illumination beam upon detection of the target menu, enabling the user/operator to target a programming-type code symbol with the visible targeting illumination beam. As shown in FIG. 14A2, with the programming bar code symbol aligned with the targeting illumination beam, the operator then manually actuates the trigger switch 5 and in response thereto, the system automatically generates a field of illumination within the FOV which illuminates the targeted programming-type bar code symbol, while (i) only an imaged subregion of the FOV, centered about the linear targeting illumination beam, is made decode-processing activated during illumination and imaging operations, and (ii) the linear targeting illumination beam is deactivated (i.e. turned off). This technique enables only a narrow-area image, centered about the reference location of the linear illumination targeting beam, to be captured and decode processed, for the purpose of decoding the targeted programming-type bar code symbol, which is typically a 1D symbology. By virtue of the present invention here, it is possible to avoid the inadvertent reading of multiple programming-type bar code symbols (i) printed on a bar code menu page or sheet, or (ii) displayed on a LCD display screen, as the case may be.

Specification of the Various Modes of Operation in the Digital Image Capture and Processing System Of the Present Invention The digital image capture and processing system of the illustrative embodiment supports many different methods and modes of digital image capture and processing. Referring to FIGS. 15A1 through 22D, a number of these methods will now be described in detail below.

First Illustrative Method of Hands-Free Digital Imaging Using the Digital Image Capture and Processing System of the Present Invention Referring to FIGS. 15A1 through 15D, a first illustrative method of hands-free (i.e. presentation/pass-through) digital imaging will be described using the digital image capture and processing system of the first illustrative embodiment, wherein its image formation and detection subsystem is operated in either (i) snap-shot and real video modes of sub-operation of the CMOS image sensing array 35, illustrated in FIGS. 6A and 6B, respectively, or (ii) snap-shot and pseudo video modes of sub-operation of the CMOS image sensing array, illustrated in FIGS. 6A and 6C, respectively.

The flow chart shown in FIGS. 15A1 through 15A3 describes the primary steps involved in carrying out the first illustrative method of hands-free (i.e. presentation/pass-through) digital imaging according to the present invention.

As shown at Block A in FIG. 15A1, the system is configured by enabling the automatic object presence detector, and the IFD subsystem (i.e. CMOS image sensing array) initialized in the snap-shot mode of suboperation. At this stage, this system is ready to be used as shown in FIG. 15B, where the IR-based object detection field is projected into the field of view (FOV) of the system and ready to automatically detect objects within the FOV, and sends control activation signals to the system control subsystem upon the occurrence of such object detection events.

Then at Block B, the system control subsystem determines whether or not the object is detected in the FOV. If the object is not present in the FOV, the system continues to this check this condition about Block B. If the object is detected at Block B, then the system control subsystem proceeds to Block C and sets the operation of the Timer (0<t1<T1), configures the IFD subsystem in a video mode (e.g. real or pseudo video mode) as shown FIG. 15C and starts continuous image acquisition. In the illustrative embodiment, T1=5000 ms, but this value can and will vary from embodiment to embodiment of the present invention. The system control subsystem detects the next image frame from the IFD subsystem, and processes the digital image in an attempt to decode a code symbol, and allow time for decoding to be no more than the frame acquisition time (e.g. t<30 milliseconds). At Block E in FIG. 15A2, the system control subsystem determines whether or not the image processing has produced a successful decoded output within T2 (e.g. T2=300 ms). If image processing has produced a successful output with T2, then at Block F, the system control subsystem generates symbol character data and transmits the data to the host system, and then proceeds to Block G, where the IFD subsystem is reset to its snap-shot mode of sub-operation.

If at Block E, the system control subsystem determines that image processing has not produced a successful decoded output within T2, then the system proceeds to Block H and determines whether or not a PDF code symbol has been detected. If a PDF code symbol has been detected, then at Block I more time is allowed for the image processor to code the PDF code symbol.

Then at Block J, the system control subsystem determines whether or not a PDF code symbol is in fact decoded, and if so, then at Block K, the system generates symbol character data for the decoded PDF symbol. If a PDF code symbol has not been decoded with the extra time allowed, then the system proceeds to Block L and determines whether or not the object is still in the FOV of the system. If the object has move out of the FOV, then the system returns to Block G, where the IFD subsystem is reset to its snap-shot mode (e.g. for approximately 40 milliseconds).

If, at Block L in FIG. 15A2, the system control subsystem determines that the object is still present within the FOV, then the system control subsystem proceeds to Block M and determines whether or not the time allowed for the video mode (e.g. 300 milliseconds) has lapsed. If the time allowed for video mode operation has net elapsed, then the system proceeds to Block D, where the next frame of digital image data is detected, and next frame of image data processed in an attempt to decode a code symbol within the allowed time for decoding (e.g. less than 30 ms).

If at Block M the system control subsystem determines that the time for Video Mode operation has lapsed, then the system control subsystem proceeds to Block N and reconfigures the IFD subsystem to the snap-shot mode (shown in FIG. 15D), and then the system acquires and processes a single digital image of the object in the FOV, allowing up to approximately 500 ms for acquisition and decode processing.

At Block O in FIG. 15A3, the system control subsystem determines whether or not image processing has produced decoded output, and if so, then at Block P, symbol character data (representative of the read code symbol) is generated and transmitted to the host computer.

If at Block O in FIG. 15A3 the system control subsystem determines that image processing has not produced successful decoded output, then at Block Q the system control subsystem determines whether or not the object is still present within the FOV. If it is determined at Block Q that the object is no longer present in the FOV, then the system control subsystem returns to Block G, where the IFD subsystem is reset to its snap-shot mode. However, if at Block Q the system control subsystem determines that the object is still present in the FOV, then at Block R the system control subsystem determines whether the Timer set at Block D has run out of time (t1<T1). If the Timer has run out of time (t1>T1), then the system control subsystem proceeds to Block G, where the IFD subsystem is reset to its snap-shot mode and returns to Block B to determine whether an object is present within the FOV. However, if the system control subsystem determines at a Block R that the Timer has not yet run out of time (t1<T1), then the system control subsystem proceeds to Block N, and reconfigures the IFD Subsystem to its snap-shot mode, and then acquires and processes a single digital image of the object in the FOV, allowing up to approximately 500 milliseconds to do so.

Notably, during the video mode of sub-operation, then ifd subsystem can be running either the real or pseudo video modes illustrated in FIGS. 6B and 6C, respectively, depending on the application and user requirements.

Second Illustrative Method of Hands-Free Digital Imaging Using the Digital Image Capture and Processing System of the Present Invention Referring to FIGS. 16A through 16D, a second illustrative method of hands-free (i.e. presentation/pass-through) digital imaging will be described using the digital image capture and processing system of the first illustrative embodiment, wherein its image formation and detection subsystem is operated in its snap-shot mode of operation for a first predetermined time period (e.g. approximately 5000 milliseconds), to repeatedly attempt to read a bar code symbol within one or more digital images captured during system operation.

The flow chart shown in FIG. 16A describes the primary steps involved in carrying out the second illustrative method of hands-free (i.e. presentation/pass-through) digital imaging according to the present invention.

As shown at Block A in FIG. 16A, the system is configured by enabling the automatic object presence detection subsystem, and initializing (i.e. configuring) the IFD subsystem (i.e. CMOS image sensing array) in the snap-shot mode of suboperation. At this stage, this system is ready to be used as shown in FIG. 16B, where the IR-based object detection field is automatically projected into the field of view (FOV) of the system and ready to automatically detect objects within the FOV, and send control activation signals to the system control subsystem upon the occurrence of such object detection events.

Then at Block B in FIG. 16A, the system control subsystem determines whether or not the object is detected in the FOV. If the object is not present in the FOV, then the system continues to this check this condition about Block B. If the object is detected at Block B, then the system control subsystem proceeds to Block C and sets the operation of the Timer (0<t1<T1). For illustration purposes, consider $T_1$=5000 milliseconds. Then at Block D in FIG. 16A, the system's linear illumination object targeting illumination subsystem automatically generates and projects its linear illumination object targeting beam into the FOV in which detected object is present, and the user/operator manually aligns the linear illumination targeting beam with the code symbol on the object, as shown in FIG. 16C. As indicated at Block E, and shown in FIG. 16D, the illumination subsystem then illuminates the targeted object (while the linear targeting illumination beam 70 is momentarily ceased, i.e. switched off, during object illumination and image capture operations within the FOV) while the IFD subsystem acquires a single digital image of the detected object in the FOV, and the image processing subsystem processes the acquired digital image in an attempt to produce a successful decoded output within about T2=500 milliseconds. At Block F, the system control subsystem determines whether or not image processing has produced a successful decoded output (e.g. read bar code symbol) within T2 (e.g. T2=500 ms). If image processing has produced a successful output within T2, then at Block F, the system control subsystem generates symbol character data and transmits the data to the host system, and then proceeds to Block B, where the object present detection subsystem resumes its automatic object detection operations.

If at Block F, the system control subsystem determines that image processing has not produced a successful decoded output within T2, then the system proceeds to Block H and determines whether or not an object is still present within the FOV. If the object has move out of the FOV, then the system returns to Block B, where automatic object detection operations resume. If, however, at Block H in FIG. 16A, the system control subsystem determines that the object is still present within the FOV, then the system control subsystem proceeds to Block I and determines whether or not the earlier set timer T1 has lapsed. If timer T1 has not elapsed, then the system returns to Block D, where the next frame of digital image data is detected and processed in an attempt to decode a code symbol within the allowed time T2 for decoding. If at Block I, the system control subsystem determines that timer T1 has lapsed, then the system control subsystem proceeds to Block B, where automatic object detection resumes.

Third Illustrative Method of Hands-Free Digital Imaging Using the Digital Image Capture and Processing System of the Present Invention Referring to FIGS. 17A1 through 17C, a third illustrative method of hands-free (i.e. presentation/pass-through) digital imaging will be described using the digital image capture and processing system of the first illustrative embodiment, wherein its image formation and detection subsystem is operated in its video mode of operation for a first predetermined time period (e.g. approximately 5000 milliseconds), to repeatedly attempt to read a bar code symbol within one or more digital images captured during system operation.

The flow chart shown in FIG. 17A1 describes the primary steps involved in carrying out the second illustrative method of hands-free (i.e. presentation/pass-through) digital imaging according to the present invention.

As shown at Block A in FIG. 17A1, the system is configured by enabling the automatic object presence detection subsystem, and initializing (i.e. configuring) the IFD subsystem (i.e. CMOS image sensing array) in the (real or pseudo) video mode of suboperation (illustrated in FIGS. 6B and 6C, respectively). At this stage, this system is ready to be used as shown in FIG. 17B, where the IR-based object detection field is automatically projected into the field of view (FOV) of the system and ready to automatically detect objects within the FOV, and send control activation signals to the system control subsystem upon the occurrence of such object detection events.

Then at Block B in FIG. 17A1, the system control subsystem determines whether or not the object is detected in the FOV. If the object is not present in the FOV, then the system continues to this check this condition about Block B. If the object is detected at Block B, then the system control subsystem proceeds to Block C and sets the operation of the Timer (0<t1<T1) and starts continuous image acquisition (i.e. object illumination and imaging operations), as shown in FIG. 17C. For illustrative purposes, consider $T_1$=5000 milliseconds.

Then, as indicated at Block D in FIG. 17A1, the IFD subsystem detects the next image frame of the detected object in the FOV, and the image processing subsystem processes the digital image frame in an attempt to produce a successful decoded output (e.g. decode a bar code symbol), and allow time for decoding to be no more than the image frame acquisition (e.g. t<30 ms) within about T2<30 milliseconds.

At Block E in FIG. 17A2, the system control subsystem determines whether or not image processing has produced a successful decoded output (e.g. read bar code symbol) within T2 (e.g. T2=30 ms). If image processing has produced a successful output within T2, then at Block F, the system control subsystem generates symbol character data and transmits the data to the host system, and then proceeds to Block B, where the object present detection subsystem resumes its automatic object detection operations.

If at Block F, the system control subsystem determines that image processing has not produced a successful decoded output within T2, then the system proceeds to Block H and determines whether or not an object is still present within the FOV. If the object has moved out of the FOV, then the system returns to Block B, where automatic object detection operations resume.

If, however, at Block H in FIG. 17A2, the system control subsystem determines that the object is still present within the FOV, then the system control subsystem proceeds to Block I and determines whether or not the earlier set timer T1 has lapsed. If timer T1 has not elapsed, then the system returns to Block D, where the next frame of digital image data is detected and processed in an attempt to decode a code symbol within the allowed time T2 for decoding. If at Block I, the system control subsystem determines that timer T1 has lapsed, then the system control subsystem proceeds to Block B, where automatic object detection resumes.

First Illustrative Method of Hand-Held Digital Imaging Using the Digital Image Capture and Processing System of the Present Invention Referring to FIGS. 18A through 18D, a first illustrative method of hand-held digital imaging will be described using the digital image capture and processing system of the first illustrative embodiment, wherein its image formation and detection subsystem is operated in its snap-shot mode of operation for a first predetermined time period (e.g. approximately 5000 milliseconds), to repeatedly attempt to read a bar code symbol within one or more digital images captured and processed during system operation.

The flow chart shown in FIG. 18A describes the primary steps involved in carrying out the first illustrative method of hand-held digital imaging according to the present invention.

As shown at Block A in FIG. 18A, the system is configured by enabling the automatic object presence detection subsystem, and initializing (i.e. configuring) the IFD subsystem (i.e. CMOS image sensing array) in the snap-shot mode of suboperation. At this stage, this system is ready to be used as shown in FIG. 18B. Here, the user holds the hand-held digital imager in his or her hand, near a product bearing a code symbol (or other graphical indicia) to be read, while the IR-based object detection field is automatically projected into the field of view (FOV) of the system for the purpose of automatically detecting objects within the FOV, and sending control activation signals to the system control subsystem upon the occurrence of such object detection events.

Then at Block B in FIG. 18A, the system control subsystem determines whether or not the object is automatically detected in the FOV. If the object is not detected in the FOV, then the system control subsystem continues to this check this condition about Block B. If the object is detected at Block B, then the system control subsystem proceeds to Block C and sets the operation of the Timer (0<t1<T1). Then at Block D in FIG. 18A, the system's linear illumination object targeting illumination subsystem automatically generates and projects its linear illumination object targeting beam into the FOV in which detected object is present, and the user/operator manually aligns the linear illumination targeting beam 70 with the code symbol on the object, as shown in FIG. 18C. As indicated at Block E, and shown in FIG. 16D, the illumination subsystem then illuminates the targeted object (while the linear targeting illumination beam 70 is momentarily ceased, i.e. switched off, during object illumination and image capture operations within the FOV) while the IFD subsystem acquires a single digital image of the detected object in the FOV, and the image processing subsystem processes the acquired digital image in an attempt to produce a successful decoded output within about T2=500 milliseconds. At Block F, the system control subsystem determines whether or not image processing has produced a successful decoded output (e.g. read bar code symbol) within T2 (e.g. T2=500 ms). If image processing has produced a successful output within T2, then at Block F, the system control subsystem generates symbol character data and transmits the data to the host system, and then proceeds to Block B, where the object present detection subsystem resumes its automatic object detection operations.

If at Block F in FIG. 18A, the system control subsystem determines that image processing has not produced a successful decoded output within T2, then the system proceeds to Block H and determines whether or not an object is still present within the FOV. If the object has move out of the FOV, then the system returns to Block B, where automatic object detection operations resume. If, however, at Block H in FIG. 18A, the system control subsystem determines that the object is still present within the FOV, then the system control subsystem proceeds to Block I and determines whether or not the earlier set timer T1 has lapsed. If timer T1 has not elapsed, then the system returns to Block D, where the next frame of digital image data is detected and processed in an attempt to decode a code symbol within the allowed time T2 for decoding. If at Block I, the system control subsystem determines that timer T1 has lapsed, then the system control subsystem proceeds to Block B, where automatic object detection resumes.

Second Illustrative Method of Hand-Held Digital Imaging Using the Digital Image Capture and Processing System of the Present Invention Referring to FIGS. 19A1 through 19C, a second illustrative method of hand-held digital imaging will be described using the digital image capture and processing system of the first illustrative embodiment, wherein its image formation and detection subsystem is operated in its video mode of operation for a first predetermined time period (e.g. approximately 5000 milliseconds), to repeatedly attempt to read a bar code symbol within one or more digital images captured during system operation.

The flow chart shown in FIG. 19A1 describes the primary steps involved in carrying out the second illustrative method of hand-held digital imaging according to the present invention.

As shown at Block A in FIG. 19A1, the system is configured by enabling the automatic object presence detection subsystem, and initializing (i.e. configuring) the IFD subsystem (i.e. CMOS image sensing array) in the (real or pseudo) video mode of suboperation (illustrated in FIGS. 6B and 6C, respectively). At this stage, this system is ready to be used as shown in FIG. 19B. Here, the user holds the hand-held digital imager in his or her hand, near a product bearing a code symbol (or other graphical indicia) to be read, while the IR-based object detection field is automatically projected into the field of view (FOV) of the system and ready to automatically detect objects within the FOV, and send control activation signals to the system control subsystem upon the occurrence of such object detection events.

Then at Block B in FIG. 19A1, the system control subsystem determines whether or not the object is detected in the FOV. If the object is not detected in the FOV, then the system control subsystem continues to this check this condition about Block B. If the object is detected at Block B, then the system control subsystem proceeds to Block C and sets the operation of the Timer (0<t1<T1) and starts continuous image acquisition (i.e. object illumination and imaging operations), as shown in FIG. 19C. For illustrative purposes, consider $T_1$=5000 milliseconds.

Then, as indicated at Block D in FIG. 19A1, the IFD subsystem detects the next image frame of the detected object in the FOV, and the image processing subsystem processes the digital image frame in an attempt to produce a successful decoded output (e.g. decode a' bar code symbol), and allow time for decoding to be no more than the image frame acquisition (e.g. t<30 ms) within about T2<30 milliseconds.

At Block E in FIG. 19A2, the system control subsystem determines whether or not image processing has produced a successful decoded output (e.g. read bar code symbol) within T2 (e.g. T2=30 ms). If image processing has produced a successful output within T2, then at Block F, the system control subsystem generates symbol character data and transmits the data to the host system, and then proceeds to Block B, where the object presence detection subsystem resumes its automatic object detection operations.

If at Block E, the system control subsystem determines that image processing has not produced a successful decoded output within T2, then the system proceeds to Block H and determines whether or not a PDF code symbol has been detected within the FOV. If so, then at Block I the system control subsystem allows more time for the image processor to decode the detected PDF code symbol. Then if the system control subsystem determines, at Block J, that a PDF code symbol has been decoded at Block J, then at Block K, the image processor generates symbol character data for the decoded PDF symbol. If, at Block J, a PDF code symbol has not been decoded with the extra time allowed, then the system control subsystem proceeds to Block L and determines whether or not the object is still in the FOV of the system. If the object has moved out of the FOV, then the system returns to Block B, where the object detection subsystem resumes its automatic object detection operations.

If, at Block L in FIG. 19A2, the system control subsystem determines that the object is still present within the FOV, then the system control subsystem proceeds to Block M, where it determines whether or not the allowed time for the video mode (e.g. T1=5000 milliseconds) has elapsed the time for video mode operation has lapsed. If timer T1 has elapsed, then the system control subsystem returns to Block B, where the object detection subsystems resumes its automatic object detection operations. If timer T1 has not elapsed at Block M, then the system control subsystem returns to Block D, where the IFD subsystem detects the next image frame, and the image processor attempts to decode process a code symbol graphically represented in the captured image frame, allowing not more than frame acquisition time (e.g. less than 30 milliseconds) to decode process the image.

Third Illustrative Method of Hand-Held Digital Imaging Using the Digital Image Capture and Processing System of the Present Invention Referring to FIGS. 20A through 20D, a third illustrative method of hand-held digital imaging will be described using the digital image capture and processing system of the first illustrative embodiment and involving the use of its manually-actuatable trigger switch 5 and snap-shot imaging mode of subsystem operation wherein its image formation and detection subsystem is operated in its snap-shot Mode of operation for a first predetermined time period (e.g. approximately 5000 milliseconds), to repeatedly attempt to read a bar code symbol within one or more digital images captured and processed during system operation.

The flow chart shown in FIG. 20A describes the primary steps involved in carrying out the third illustrative method of hand-held digital imaging according to the present invention.

As shown at Block A in FIG. 20A, the system is configured by enabling the automatic object presence detection subsystem, and initializing (i.e. configuring) the IFD subsystem (i.e. CMOS image sensing array) in the snap-shot mode of suboperation. At this stage, this system is ready to be used as shown in FIG. 20B. Here, the user holds the hand-held digital imager in his or her hand, near a product on a countertop surface and bearing a code symbol (or other graphical indicia) to be read.

Then at Block B in FIG. 20A, the system control subsystem determines whether or not the trigger switch is manually actuated by the operator to indicate that the object is present within the field of view (FOV) of the system, above a countertop surface. If the manual trigger switch 5 is not activated/actuated, then the system control subsystem continues to this check for this condition about Block B. If the manual trigger switch is actuated at Block B, then the system control subsystem proceeds to Block C and sets the operation of the Timer (0<t1<T1). For illustrative purposes, consider $T_1$=5000 milliseconds. Then at Block D in FIG. 20A, the system's linear illumination object targeting illumination subsystem automatically generates and projects its linear illumination object targeting beam into the FOV in which detected object is present, and the user/operator manually aligns the linear illumination targeting beam with the code symbol on the object, as shown in FIG. 20C. As indicated at Block E, and shown in FIG. 20D, the illumination subsystem then illuminates the targeted object (while the linear targeting illumination beam 70 is momentarily ceased, i.e. switched off, during object illumination and image capture operations within the FOV) while the IFD subsystem acquires a single digital image of the detected object in the FOV, and the image processing subsystem processes the acquired digital image in an attempt to produce a successful decoded output within about T2=500 milliseconds. At Block F, the system control subsystem determines whether or not image processing has produced a successful decoded output (e.g. read bar code symbol) within T2 (e.g. T2=500 ms). If image processing has produced a successful output within T2, then at Block F, the system control subsystem generates symbol character data and transmits the data to the host system, and then proceeds to Block B, where the system control subsystem resumes waiting for detection of the manual trigger switch actuation (i.e. trigger event).

If at Block F in FIG. 20A, the system control subsystem determines that image processing has not produced a successful decoded output within T2, then the system proceeds to Block H and determines whether or not the trigger switch 5 is still being manually actuated. If the manual trigger switch is no longer actuated (i.e. it has been released), then the system returns to Block B, where detection of manual trigger switch actuation resumes. If, however, at Block H in FIG. 20A, the system control subsystem determines that the manual trigger switch is still being actuated, then the system control subsystem proceeds to Block I and determines whether or not the earlier set timer T1 has lapsed. If timer T1 has not elapsed, then the system returns to Block D, where the next frame of digital image data is detected and processed in an attempt to decode a code symbol within the allowed time T2 for decoding. If at Block I, the system control subsystem determines that timer T1 has lapsed, then the system control subsystem proceeds to Block B, where detection of manual trigger switch actuation resumes.

Fourth Illustrative Method of Hand-Held Digital Imaging Using the Digital Image Capture and Processing System of the Present Invention Referring to FIGS. 21A1 through 21C, a fourth illustrative method of hand-held digital imaging will be described using the hand-supportable digital image capture and processing system of the first illustrative embodiment, wherein its image formation and detection subsystem is operated in its video mode of operation for a first predetermined time period (e.g. approximately 5000 milliseconds), to repeatedly attempt to read a bar code symbol within one or more digital images captured during system operation.

The flow chart shown in FIG. 21A1 describes the primary steps involved in carrying out the second illustrative method of hand-held digital imaging according to the present invention, involving the use of its manually-actuatable trigger switch 5 and video imaging mode of subsystem operation.

As shown at Block A in FIG. 21A1, the system is configured by enabling the automatic object presence detection subsystem, and initializing (i.e. configuring) the IFD subsystem (i.e. CMOS image sensing array) in the (real or pseudo) video mode of suboperation (illustrated in FIGS. 6B and 6C, respectively). At this stage, this system is ready to be used as shown in FIG. 21B. Here, the user holds the hand-held digital imager in his or her hand, near a product bearing a code symbol (or other graphical indicia) to be read, and preparing to manually actuate the trigger switch integrated with the hand-held housing of the digital imager.

Then at Block B in FIG. 21A1, the system control subsystem determines whether or not the trigger switch 5 is manually actuated. If the object is not manually actuated at Block B, then the system control subsystem continues to this check this condition about Block B. If the trigger switch is manually actuated at Block B, then the system control subsystem proceeds to Block C and sets the operation of the Timer (0<t1<T1) and starts continuous image acquisition (i.e. object illumination and imaging operations), as shown in FIG. 19C. For illustrative purposes, consider T1=5000 milliseconds.

Then, as indicated at Block D in FIG. 21A1, the IFD subsystem detects the next image frame of the object in the FOV, and the image processing subsystem processes the digital image frame in an attempt to produce a successful decoded output (e.g. decode a bar code symbol), and allow time for decoding to be no more than the image frame acquisition (e.g. t<30 ms) within about T2<30 milliseconds.

At Block E in FIG. 21A2, the system control subsystem determines whether or not image processing has produced a successful decoded output (e.g. read bar code symbol) within T2 (e.g. T2=30 ms). If image processing has produced a successful output within T2, then at Block F, the system control subsystem generates symbol character data and transmits the data to the host system, and then proceeds to Block B, where the system control subsystem resumes its trigger switch actuation detection operations.

If at Block E, the system control subsystem determines that image processing has not produced a successful decoded output within T2, then the system proceeds to Block H and determines whether or not a PDF code symbol has been detected within the FOV. If so, then at Block I the system control subsystem allows more time for the image processor to decode the detected PDF code symbol. Then if the system control subsystem determines, at Block J, that a PDF code symbol has been decoded at Block J, then at Block K, the image processor generates symbol character data for the decoded PDF symbol. If, at Block J, a PDF code symbol has not been decoded with the extra time allowed, then the system control subsystem proceeds to Block L and determines whether or not the object is still within the FOV. If the object is no longer in the FOV, then the system returns to Block B, where the system control subsystems resumes trigger switch actuation detection operations.

If, at Block L in FIG. 21A2, the system control subsystem determines that the object is still present within the FOV, then the system control subsystem proceeds to Block M, where it determines whether or not the allowed time for the video mode (e.g. T1=5000 milliseconds) has elapsed the time for video mode operation has lapsed. If timer T1 has elapsed, then the system control subsystem returns to Block B, where the system control subsystem resumes its detection of trigger switch actuation. If timer T1 has not elapsed at Block M, then the system control subsystem returns to Block D, where the IFD subsystem detects the next image frame, and the image processor attempts to decode process a code symbol graphically represented in the captured image frame, allowing not more than frame acquisition time (e.g. less than 30 milliseconds) to decode process the image.

Fifth Illustrative Method of Hand-Held Digital Imaging Using the Digital Image Capture and Processing System of the Present Invention Referring to FIGS. 22A through 22D, a fifth illustrative method of hand-held digital imaging will be described using the digital image capture and processing system of the first illustrative embodiment and involving the use of its manually-actuatable trigger switch 5 and snap-shot imaging mode of subsystem operation. wherein its image formation and detection subsystem is operated in its snap-shot mode of operation for a first predetermined time period (e.g. approximately 5000 milliseconds), to repeatedly attempt to read a bar code symbol within one or more digital images captured and processed during system operation.

The flow chart shown in FIG. 22A describes the primary steps involved in carrying out the third illustrative method of hand-held digital imaging according to the present invention.

As shown at Block A in FIG. 22A, the system is configured by enabling the automatic object presence detection subsystem, and initializing (i.e. configuring) the IFD subsystem (i.e. CMOS image sensing array) in the snap-shot mode of suboperation. At this stage, this system is ready to be used as shown in FIG. 22B. Here, the user holds the hand-held digital imager in his or her hand, near a product on a countertop surface and bearing a code symbol, preparing to manually actuate the manual trigger switch. If the system control subsystem determines that the manual trigger switch is not activated/actuated, then the system control subsystem continues to this check for this condition about Block B.

When the manual trigger switch 5 is actuated at Block B, then the system control subsystem proceeds to Block C and sets the operation of the Timer (0<t1<T1). For illustrative purposes, consider T1=5000 milliseconds. Then at Block D in FIG. 22A, the system's linear illumination object targeting illumination subsystem automatically generates and projects its linear illumination object targeting beam into the FOV in which detected object is present, and the user/operator manually aligns the linear illumination targeting beam with the code symbol on the object, as shown in FIG. 22C. As indicated at Block E, and shown in FIG. 22D, the illumination subsystem then illuminates the targeted object (while the linear targeting illumination is momentarily ceased during object illumination operations within the FOV) while the IFD subsystem acquires a single digital image of the detected object in the FOV, and the image processing subsystem processes the acquired digital image in an attempt to produce a successful decoded output within about T2=500 milliseconds. At Block F, the system control subsystem determines whether or not image processing has produced a successful decoded output (e.g. read bar code symbol) within T2 (e.g. T2=500 milliseconds). If image processing has produced a successful output within T2, then at Block F, the system control subsystem generates symbol character data and transmits the data to the host system, and then proceeds to Block B, where the system control subsystem resumes waiting for detection of the manual trigger switch actuation (i.e. trigger event).

If at Block F in FIG. 22A, the system control subsystem determines that image processing has not produced a successful decoded output within T2, then the system proceeds to Block H and determines whether or not the trigger switch is still being manually actuated (i.e. activated). If the manual trigger switch is no longer actuated (i.e. it has been released), then the system returns to Block B, where detection of manual trigger switch actuation resumes. If, however, at Block H in FIG. 22A, the system control subsystem determines that the manual trigger switch is still being actuated, then the system control subsystem returns to Block D, where the linear target illumination beam is automatically generated within the FOV of the system, and then at Block E, the illumination subsystem illuminates the targeted object (while the linear targeting illumination is momentarily ceased during object illumination operations within the FOV) while the IFD subsystem acquires a single digital image of the detected object in the FOV, and the image processing subsystem processes the acquired digital image in an attempt to produce a successful decoded output within about T2=500 milliseconds. During this system mode of operation, so long as the trigger switch is manually actuated, the system will capture and process single digital images using the Snap-Shot Mode image sensing array sub-operation.

Specification of the Second Illustrative Embodiment of the Digital Image Capture and Processing System of Present Invention Employing Single Linear LED Illumination Array to Illuminate the Field of View (FOV) of the System Referring to FIGS. 23A through 25B, the second illustrative embodiment of the digital image capture and processing system will be described. In contrast with the first illustrative embodiment described hereinabove, the second illustrative embodiment of the digital image capture and processing system 1″ hereof employs an LED-based illumination subsystem having a single array of LEDs 62A through 65N and a single illumination-focusing lens element 125 embodied in the imaging window panel 3′. The function of this LED-based illumination subsystem is to generated and project a single field of wide-area narrow-band illumination within the FOV of the system, in a way which minimizes the annoyance of the operator as well as others in the vicinity thereof during system operation. In all other respects, the second illustrative embodiment of the system is similar to the first illustrative embodiment. Below, the second illustrative embodiment of the system will be described in greater detail.

In FIG. 23A, the digital image capture and processing system of the second illustrative embodiment 1′ is shown generating and projecting its linear targeting illumination beam 70 into the FOV 33 of the system upon automatic detection of an object within the FOV of the system, using its automatic IR-based object motion detection and analysis subsystem 20. FIG. 23B also shows the system when operated in this linear targeting mode of operation, during which a pair of substantially planarized illumination beams are generated about the FOV optics 34 on the PC board of the system, reflected off the FOV folding mirror 75, and ultimately projected out into the central portion of the FOV as a single linear targeting illumination beam 70 having high visibility characteristics to human beings.

FIG. 23C shows the spatial relationship between (i) the projected linear target illumination beam, and (ii) the FOV of the system of the second illustrative embodiment. FIG. 23D shows the spatial relationship between (i) the projected linear target illumination beam, and (ii) the single wide-area field of narrow-band illumination projected across the FOV of the system during object illumination and imaging operations.

As shown in FIGS. 23E through 23G, the illumination-focusing lens elements 125A and 125B lens elements, integrated within the upper edge of the imaging window panel 3′, are shown are disposed in front of the single array of illumination LEDs 62A through 62N, for focusing illumination generated by the LEDs and shaping the field of illumination to meet illumination field requirements and characteristics for particular end-user applications.

As shown in FIG. 24, is a schematic block diagram representative of a system design for the digital image capture and processing system 1′ illustrated in FIGS. 23A through 23G, wherein the system design is shown comprising: (1) an image formation and detection (i.e. camera) subsystem 21 having image formation (camera) optics 34 for producing a field of view (FOV) upon an object to be imaged and a CMOS or like area-type image detection array 35 for detecting imaged light reflected off the object during illumination operations in an image capture mode in which at least a plurality of rows of pixels on the image detection array are enabled; (2) an LED-based illumination subsystem 22′ employing a single LED illumination array for producing a field of narrow-band wide-area illumination 126 within the entire FOV 33 of the image formation and detection subsystem 21, which is reflected from the illuminated object and transmitted through a narrow-band transmission-type optical filter 40 realized within the hand-supportable and detected by the image detection array 35, while all other components of ambient light are substantially, rejected; (3) an object targeting illumination subsystem 31 as described hereinabove; (4) an IR-based object motion detection and analysis subsystem 20 for producing an IR-based object detection field 32 within the FOV of the image formation and detection subsystem 21; (5) an automatic light exposure measurement and illumination control subsystem 24 for controlling the operation of the LED-based multi-mode illumination subsystem 22; (6) an image capturing and buffering subsystem 25 for capturing and buffering 2-D images detected by the image formation and detection subsystem 21: (7) a digital image processing subsystem 26 for processing 2D digital images captured and buffered by the image capturing and buffering subsystem 25 and reading 1D and/or 2D bar code symbols represented therein; and (8) an input/output subsystem 27 for outputting processed image data and the like to an external host system or other information receiving or responding device; and a system control subsystem 30 integrated with the subsystems above, for controlling and/or coordinating these subsystems during system operation.

Specification of the Three-Tier Software Architecture of the Digital Image Capture and Processing System of the Second Illustrative Embodiment of the Present Invention As shown in FIG. 25, digital image capture and processing system of the present invention 1″ is provided with a three-tier software architecture comprising multiple software modules, including: (1) the Main Task module, the Secondary Task, the Area-Image Capture Task module, the Linear Targeting Beam Task module, the Application Events Manager module, the User Commands Table module, the Command Handler module, the Plug-In Controller (Manager) and Plug-In Libraries and Configuration Files, each residing within the Application layer of the software architecture; (2) the Tasks Manager module, the Events Dispatcher module, the Input/Output Manager module, the User Commands Manager module, the Timer Subsystem module, the Input/Output Subsystem module and the Memory Control Subsystem module, each residing within the System Core (SCORE) layer of the software architecture; and (3) the Linux Kernal module, the Linux File System module, and Device Drivers modules, each residing within the Linux Operating System (OS) layer of the software architecture.

While the operating system layer of the digital image capture and processing system is based upon the Linux operating system, it is understood that other operating systems can be used (e.g. Microsoft Windows, Apple Mac OSX, Unix, etc), and that the design preferably provides for independence between the main Application Software Layer and the Operating System Layer, and therefore, enables of the Application Software Layer to be potentially transported to other platforms. Moreover, the system design principles of the present invention provides an extensibility of the system to other future products with extensive usage of the common software components, decreasing development time and ensuring robustness.

In the illustrative embodiment, the above features are achieved through the implementation of an event-driven multi-tasking, potentially multi-user, Application layer running on top of the System Core software layer, called SCORE. The SCORE layer is statically linked with the product Application software, and therefore, runs in the Application Level or layer of the system. The SCORE layer provides a set of services to the Application in such a way that the Application would not need to know the details of the underlying operating system, although all operating system APIs are, of course, available to the application as well. The SCORE software layer provides a real-time, event-driven, OS-independent framework for the product Application to operate. The event-driven architecture is achieved by creating a means for detecting events (usually, but not necessarily, when the hardware interrupts occur) and posting the events to the Application for processing in real-time manner. The event detection and posting is provided by the SCORE software layer. The SCORE layer also provides the product Application with a means for starting and canceling the software tasks, which can be running concurrently, hence, the multi-tasking nature of the software system of the present invention.

Specification of the Third Illustrative Embodiment of the Digital Image Capture and Processing System Of the Present Invention, Employing Single Linear LED Illumination Array for Full Field Illumination Referring now to FIGS. 26A through 43C, a third illustrative embodiment of the digital image capture and processing system of the present invention 1" will be described in detail.

In some important respects, the third illustrative embodiment of the digital image capture and processing system 1" is similar to the second illustrative system embodiment 1', namely: both systems employ a single linear array of LEDs to illuminate its field of view (FOV) over the working range of the system, in a way to illuminate objects located within the working distance of the system during imaging operations, while minimizing annoyance to the operator, as well as others in the vicinity thereof during object illumination and imaging operations.

However, the third illustrative embodiment has many significant advancements over the second illustrative embodiment, relating particularly to its: (i) prismatic illumination-focusing lens structure 130 illustrated in FIGS. 31B through 35B; (ii) lightpipe-technology 150 illustrated in FIGS. 37 through 39D; (iii) sound-pipe technology 160 illustrated in FIGS. 40 through 42C; and (iv) multi-interface capabilities capabilities illustrated in FIGS. 43A through 43D.

As shown in FIGS. 26A through 26F, and 27A and 27B, the digital image capture and processing system of the third illustrative embodiment 1" comprises: an imaging housing 2 having (i) a front housing portion 2B" with a window aperture 6 and an imaging window panel 3" installed therein, and (ii) a rear housing portion 2A"; a single PC board based optical bench 8 (having optical subassemblies mounted thereon) supported between the front and rear housing portions which when brought together, form an assembled unit; and a base portion 4 connected to the assembled unit by way of an pivot axle structure 130 that passes through the bottom portion of the imager housing and the base portion so that the imager housing and base portion are able to rotate relative to each other.

As show in FIG. 27B, the light transmission aperture 60 formed in the PC board 8 is spatially aligned within the imaging window 3" formed in the front housing portion. Also, its linear array of LEDs 23 are aligned with the illumination-focusing prismatic lens structure 130 embodied or integrated within upper edge of the imaging window 3". The function of illumination-focusing prismatic lens structure 130 is to focus illumination from the single linear array of LEDs 62A through 62N, and uniformly illuminate objects located anywhere within the working distance of the FOV of the system, while minimizing annoyance to the operator, as well as others in the vicinity thereof during system operation. As shown, the host/imager interface cable 10" passes through a port 132 formed in the rear of the rear housing portion, and interfaces with connectors mounted on the PC board.

As shown in FIGS. 28A, 28B, 30, 31C and 31D, an optically-opaque light ray containing structure 133 is mounted to the front surface of the PC board, about the linear array of LEDs 62A through 62N. The function of the optically-opaque light ray containing structure 133 is to prevent transmission of light rays from the LEDs to any surface other than the rear input surface of the prismatic illumination-focusing lens panel 3", which uniformly illuminates the entire FOV of the system over its working range.

As shown in FIGS. 31C and 31D, the optically-opaque light ray containing structure 133 comprises: upper and lower side panels 133A and 133B, joined together by left and right side panels 133C and 133D to form a rectangular-shaped box-like structure, without a top or bottom panel. The function of this rectangular-shaped box-like structure is to surround the linear array of LEDs when the structure 133 is mounted to the PC board about the LED array. As shown, upper and lower side panels 133A and 133B have slanted cut-aways 133E and 133F formed in their top edge surface for receiving the rear surface 130A of the prismatic illumination-focusing lens panel 3".

When the front and rear housing panels 2B" and 2A" are joined together, with the PC board 8 disposed therebetween, the prismatic illumination-focusing lens panel 3" will sit within the slanted cut-aways 133E and 133F formed in the top surface of the side panels, and illumination rays produced from the linear array of LEDs will be either directed through the rear surface of the prismatic illumination-focusing lens panel 3" or absorbed by the black colored interior surface of the optically-opaque light ray containing structure 133. In alternative embodiments, the interior surface of the optically-opaque light ray containing structure may be coated with a light reflecting coating so as to increase the amount of light energy transmitted through the prismatic illumination-focusing lens panel, and thus increasing the light transmission efficiency of the LED-based illumination subsystem employed in the digital image capture and processing system of the present invention.

As shown in FIGS. 31C and 31D, the optically-opaque light ray containing structure 133 also includes a support structure 133G with bores 133H and 133I, for supporting IR LED 90A and IR photodiode 90B in the central lower portion of the structure, below the linear array of LEDs 62A through 62N. As shown, the support structure 133G includes a pair of pins 133J and 133K which are used for aligning and mounting the optically-opaque light ray containing structure 133 onto the front surface of the PC board 8, adjacent the upper portion of the light transmission aperture 60, and over which the imaging window panel 3" is installed within the window aperture 6 of the front housing portion 2B".

As shown in FIGS. 29A, 29B, 29C, and 30, the optical component support structure/assembly 78"employed in the third illustrative embodiment performs substantially the same functions as the optical component support structure/assemblies 78' and 78 employed in the other illustrative embodiments. Specifically, the optical component support (OCS) assembly 78" comprises a first inclined panel 77" for supporting the FOV folding mirror 74 above the FOV forming optics, and a second inclined panel 76" for supporting the second FOV folding mirror 75 above the light transmission aperture 60. With this arrangement, the FOV employed in the image formation and detection subsystem, and originating from optics supported on the rear side of the PC board, is folded twice, in space, and then projected through the light transmission aperture and out of the imaging window of the system. The OCS assembly 78" also comprises a third support panel 80" for supporting the parabolic light collection mirror segment 79 employed in the automatic exposure measurement and illumination control subsystem 24, so that a narrow light collecting FOV 71 is projected out into a central portion of the wide-area FOV 33 of the image formation and detection subsystem 21 and focuses collected light onto photo-detector 81, which is operated independently from the area-type image sensing array 35. The OCS assembly 78" also comprises a fourth support structure 82" for supporting the pair of beam folding mirrors 85A" and 85B" above the pair of aperture slots 84A" and 84B", which in turn are disposed above visible LEDs 83A" and 83B" arranged on opposite sites of the FOV optics so as to generate a linear visible targeting beam 70 that is projected off the second FOV folding 75 and out the imaging window 3", as shown.

The System Architecture of the Third Illustrative Embodiment of the Digital Image Capture and Processing System In FIG. 32A, the system architecture of the third illustrative embodiment of the digital image capture and processing system 1" is shown comprising: (1) an image formation and detection (i.e. camera) subsystem 21 having image formation (camera) optics 34 for producing a field of view (FOV) 33 upon an object to be imaged and a CMOS or like area-type image detection array 35 for detecting imaged light of a narrow-band reflected off the object and passing through an narrow passband optical filter 40 (rejecting ambient noise) before detection by the image detection array during illumination operations in an image capture mode in which at least a plurality of rows of pixels on the image detection array are enabled; (2) an LED-based illumination subsystem 22" employing a single linear array of LEDs 23 (62A through 62N) for producing a field of narrow-band wide-area illumination 126 of substantially uniform intensity over the working distance of the FOV 33 of the image formation and detection subsystem 21; (3) an linear targeting illumination subsystem 31 for generating and projecting a linear (narrow-area) targeting illumination beam 70 into the central portion of the FOV of the system, for visually targeting objects prior to imaging; (4) an IR-based object motion detection and analysis subsystem 20 for producing an IR-based object detection field 32 within the FOV 33 for automatically detecting objects therewithin; (5) an automatic light exposure measurement and illumination control subsystem 24 for controlling the operation (e.g. duration and intensity) of the linear array of LEDs 23 employed in the LED-based illumination subsystem 22"; (6) an image capturing and buffering subsystem 25 for capturing and buffering 2-D images detected by the image formation and detection subsystem 21; (7) a digital image processing subsystem 26 for processing digital images captured and buffered by the image capturing and buffering subsystem 25, and reading 1D and 2D bar code symbols graphically represented therein; and (8) a multi-interface I/O subsystem 27, with automatic interface detection and implementation capabilities 28, for outputting processed image data and the like to an external host system or other information receiving or responding device, supporting any one of a multiple number of interfacesxssss; and (9) a system control subsystem 30 integrated with each subsystem component and controlling and/or coordinating the operation thereof as required by the application at hand.

Implementing the System Architecture of the Third Illustrative Embodiment of the Digital Image Capture and Processing System The subsystems employed within the digital image capture and processing system of the third illustrative embodiment are implemented with components mounted on the PC board assembly shown in FIG. 32B, and other hardware components illustrated in FIGS. 26A through 31D. In particular, a pair of visible LEDs and switches are used to implement the visible targeting illumination beam subsystem. A 1.3 megapixel CMOS image sensing array 35 and A/D circuitry are used to implement the area-type image formation and detection subsystem. A Blackfin® decode processor 135, SDRAM (e.g. 32 MB) 136, and SPI Flash (e.g. 64 MB) 137 are used to implement the digital image processing subsystem 26. An array of LEDs 62A through 62N driven by current control circuitry 138, along with switches' 139, an 8-bit digital-to-analog converter (DAC) 140 and illumination logic 141, are used to implement the LED-based illumination subsystem 22". An illumination photo-detector 142 and charge amplifier 143 are used in the implementation of the automatic light exposure and illumination control subsystem 24. An IR LED 144 and current control circuitry 145, and an IR photo-diode 146, amplifier, analog detection circuit 147 and a PLL circuit 148 are used to implement the automatic object motion detection and analysis subsystem 20. Multi-interface switches and detection circuitry 150, an USB interface controller (e.g. from Sc-Labs) 151, a RS-485 Driver/Receiver 152, RS-232 driver/receiver circuitry 153A, 153B, and KBW driver 154 are used to implement the multi-interface I/O subsystem 27. Power regulation and switching circuitry 155, and power filtering and monitoring circuitry 156, are used to implement the power supply and distribution subsystem. As shown, a user/host connector (i.e. 10 pin RJ-45) 157 is connected to various circuits, as shown. Also, LEDs 158 and LED drivers 159 are provided for the light-pipe driven indication mechanism of the present invention, integrated about the trigger switch button 5A.

Specification of the Three-Tier Software Architecture of the Digital Image Capture and Processing System of the Third Illustrative Embodiment of the Present Invention As shown in FIG. 32C, digital image capture and processing system of the present invention 1" is provided with a three-tier software architecture comprising multiple software modules, including: (1) the Main Task module, the Secondary Task, the Area-Image Capture Task module, the Linear Targeting Beam Task module, the Application Events Manager module, the User Commands Table module, the Command Handler module, the Plug-In Controller (Manager) and Plug-In Libraries and Configuration Files, each residing within the Application layer of the software architecture; (2) the Tasks Manager module, the Events Dispatcher module, the Input/Output Manager module, the User Commands Manager module, the Timer Subsystem module, the Input/Output Subsystem module and the Memory Control Subsystem module, each residing within the System Core (SCORE) layer of the software architecture; and (3) the Linux Kernal module, the Linux File System module, and Device Drivers modules, each residing within the Linux Operating System (OS) layer of the software architecture.

While the operating system layer of the digital image capture and processing system is based upon the Linux operating system, it is understood that other operating systems can be used (e.g. Microsoft Windows, Apple Mac OSX, Unix, etc), and that the design preferably provides for independence between the main Application Software Layer and the Operating System Layer, and therefore, enables of the Application Software Layer to be potentially transported to other platforms. Moreover, the system design principles of the present invention provides an extensibility of the system to other future products with extensive usage of the common software components, decreasing development time and ensuring robustness.

In the illustrative embodiment, the above features are achieved through the implementation of an event-driven multi-tasking, potentially multi-user, Application layer running on top of the System Core software layer, called SCORE. The SCORE layer is statically linked with the product Application software, and therefore, runs in the Application Level or layer of the system. The SCORE layer provides a set of services to the Application in such a way that the Application would not need to know the details of the underlying operating system, although all operating system APIs are, of course, available to the application as well. The SCORE software layer provides a real-time, event-driven, OS-independent framework for the product Application to operate. The event-driven architecture is achieved by creating a means for detecting events (usually, but not necessarily, when the hardware interrupts occur) and posting the events to the Application for processing in real-time manner. The event detection and posting is provided by the SCORE software layer. The SCORE layer also provides the product Application with a means for starting and canceling the software tasks, which can be running concurrently, hence, the multi-tasking nature of the software system of the present invention.

Specification of the Illumination Subsystem of the Present Invention Employing Prismatic Illumination Focusing Lens Structure Integrated within the Imaging Window Referring to FIGS. 33A through 33K2, the prismatic illumination-focusing lens structure 130 of the illustrative embodiment will now be described in greater detail.

FIGS. 33A and 33B show the rear and front sides of the imaging window of the present invention 3", respectively, which is installed within the third illustrative embodiment of the present invention. As shown in FIG. 33A, the prismatic illumination-focusing lens structure 130 is integrated into a upper portion of the rear surface of the imaging window panel 3", and projects out beyond the rear planar surface 130B of the imaging window. As shown in FIG. 33A, the prismatic illumination-focusing lens structure 130 has a cut out portion 130C for allowing the IR transmitting and receiving diodes 90A and 90B and their support module 133G to fit within the cut out portion 130G and transmit and receive IR light through the imaging window 3". As shown in FIG. 33B, the front surface of the prismatic illumination-focusing lens structure 130 is recessed below the planar surface of the imaging window panel 3".

FIG. 33C1 shows several LEDs 62N, 62M (from the linear LED array) transmitting illumination through the rear surface 130A of the prismatic illumination lens component 130 of the imaging window, in a controlled manner, so that a focused field of illumination emerging from the front recessed surface 130D and illuminates the FOV of the system in a substantially uniform manner, without objectionally projecting light rays into the eyes of consumers and/or operators who happen to be present at the point of sale (POS). Most light rays which emerge from the recessed surface section 130D project into the FOV, while a small percentage of the transmitted light rays strike the top wall surface 3A1 formed in the rectangular opening formed about the imaging window, and reflect/scatter off the mirrored surface 160 and into the FOV according to the optical design of the present invention. Light rays that illuminate objects within the FOV of the system scatter off the surface of illuminated objects within the FOV of the system, and are transmitted back through the imaging window panel 3" and collected by FOV optics 34 and focused onto the area-type image sensing array 35 in the image formation and detection subsystem 21. The light transmission characteristics of the planar panel portion of the imaging window panel 3" can be selected so that the cooperate with another optical filtering element 40 located near or proximate the image detection array 35 to form an optical band-pass filter system 40 that passes only a narrow band of optical wavelengths (e.g. a narrow band optical spectrum) centered about the characteristic wavelength of the illumination beam, thereby rejecting ambient noise to a significant degree and improving image contrast and quality.

By virtue of the imaging window design of the present invention, particularly its integrated prismatic illumination lens, it is now possible to uniformly illuminate the FOV of a 2D digital imaging system using a single linear array of LEDs that generates and project a field of visible illumination into the FOV of the system, without projecting light rays into the eyes of cashiers, sales clerks, customers and other humans present at the POS station where the digital imaging system of the illustrative embodiment can be installed.

Description of Operation of the Prismatic Illumination-Focusing Lens Component, Integrated within the Imaging Window of the Present Invention Referring to FIGS. 33C2 through 33K2, operation of the prismatic illumination-focusing lens component, integrated within the imaging window of the present invention, will now be described in greater detail below.

FIG. 33C2 illustrates the propagation of a central light ray which is generated from an LED in the linear LED array 23, and passes through the central portion of the prismatic illumination-focusing lens component of the imaging window panel, and ultimately into the FOV of the system. FIG. 33D shows how a plurality of LEDs employed in the linear LED array 23 are located proximately behind the prismatic illumination-focusing lens component 130, in accordance with the principles of the present invention. FIG. 33E graphically depicts the cross sectional dimensions of the field of illumination that is produced from the prismatic illumination-focusing lens component and transmitted within the FOV, indicating five different regions marked at five marked distances from the imaging window (i.e. 50 mm, 75 mm, 100 mm, 125 mm, and 150 mm). FIG. 33F graphically depicts the cross-sectional dimensions of the illumination field at the five different regions (i.e. 106 mm×64 mm, 128 mm×76 mm, 152 mm×98 mm, 176 mm×104 mm, and 200 mm×118 mm) located at five marked distances from the imaging window (i.e. 50 mm, 75 mm, 100 mm, 125 mm, and 150 mm, respectively).

FIGS. 33G1 through 33K2 describe the spatial intensity profile characteristics achieved over the working range of the digital imaging system (e. from 50 mm to 150 mm from the imaging window) using the optical design employed in a particular illustrative embodiment of the present invention. In this illustrative embodiment shown in FIGS. 33G1 through 33K2, there is an average spatial intensity value drop off, measured from the center of the image, to its edge, and at each of the five different illumination regions. Notably, this optical design works very well in POS-based digital imaging applications; however, in other illustrative embodiments of the system, different spatial intensity profile characteristics may be desired or required to satisfy the needs of a different classes of digital imaging applications.

Specification of the Optical Function of the Prismatic Illumination-Focusing Lens Structure within the Illumination Subsystem of the Digital Image Capture and Processing System of the Third Illustrative Embodiment Referring to FIGS. 34A through 34C, the optical function of the prismatic illumination-focusing lens structure 130 is described in connection with the illumination subsystem 22" employed in the digital image capture and processing system of the third illustrative embodiment 1".

FIGS. 34A and 34B show the projection of light rays from a first single LED in the linear LED illumination array, through the prismatic lens component of the imaging window, and out into the field of flew (FOV) of the system, with the projected light rays being maintained substantially beneath the plane of the light-occluding wall surface surrounding the upper edge of the imaging window of the present invention, thereby significantly reducing the number of light rays entering the eyes of humans who might be present during operation of the system. FIG. 34C shows the projection of light rays from a second single LED in the linear LED illumination array, through the prismatic lens component of the imaging window, and out into the field of flew (FOV) of the system, in accordance with the principles of illumination according to the present invention.

Specification of the Linear Visible Illumination Targeting Subsystem Employed in the Hand-Supportable Digital Image Capture and Processing System of the Third Illustrative Embodiment of the Present Invention FIG. 35A shows the generation and projection of the linear visible illumination targeting beam 70 from the linear targeting illumination subsystem 31, in automatic response to the detection of an object within the field of view (FOV) of the system (e.g. by either a manual trigger operation or automatic object detection using the automatic object detection subsystem, depending on the configured mode of system operation).

As shown in FIG. 35B, the linear visible targeting illumination beam 70 is produced from the pair of spaced apart visible LEDs 83A and 83B which are employed in the linear visible targeting illumination subsystem. These are arranged on opposite sides of the FOV forming optics 34, beneath the pair of linear aperture stops 84A and 84B, respectively. The pair of linear beams which emerge from the linear aperture stops 84A and 84B are then directed to the pair of parabolic beam shaping and focusing mirrors 85A and 85B, respectively, above the stops, to focus the beams into a pair of linear or planarized beams which are reflected off the first FOV folding mirror 75 and then projected into the central portion of the FOV where they converge into a single planarized (linearized) visible illumination targeting beam 70 that is used to target objects which are to be illuminated and imaged by the system.

Specification of the Image Formation and Detection Subsystem Employed in the Hand-Supportable Digital Image Capture and Processing System of the Third Illustrative Embodiment of the Present Invention FIGS. 36A, 36B and 36C show the folding of the FOV 33 of the image formation and detection subsystem, its reflection off the first and second FOV folding mirrors 83A and 83B mounted on the optics support structure on the PC board assembly, and the ultimate projection of the folded FOV out through the imaging window of the system and towards an object to be imaged, while the parabolic light collection mirror 79 collects light rays from a central portion of the FOV during object illumination and imaging operations and focuses these light rays onto a photodetector 79 of the automatic exposure measurement and illumination control subsystem 24.

FIGS. 36B and 36C show, in greater detail, how the parabolic light collection mirror 79 collects light rays from the central portion of the FOV, and focuses these collected light rays onto the photodector 81, mounted on the rear surface of the PC board assembly 8.

Specification of the LED-Driven Optical-Waveguide Structure Used to Illuminate the Manually-Actuated Trigger Switch Integrated in the Housing of the Digital Image Capture and Processing System of the Third Illustrative Embodiment of the Present Invention Referring to FIGS. 37 through 39D, it is appropriate at this juncture to describe the LED-driven optical-waveguide structure 165 that is used to illuminate the manually-actuated trigger switch button 5A employed in the digital image capture and processing system of the third illustrative embodiment.

FIG. 37 shows a centrally-disposed optically-translucent region 166 that surrounds an aperture 167 through which the manually-actuated trigger switch button 5A is installed at the top portion of the hand-supportable housing of the system of the third illustrative embodiment. In FIG. 38A, the rear side of the LED-driven optical-waveguide structure 165 is shown; while removed and in isolation from the upper edge of the PC board assembly 8. As shown in FIGS. 38A and 38B, the LED-driven optical-waveguide structure 165 has upper and lower light coupling elements 168A, 168C and 168C arranged about and in optical communication with the optically-translucent central illumination region 166 of the optical wave-guide structure 165. Also shown in FIGS. 38A and 38B, the LED-driven optical-waveguide structure 165 has sound-wave ports 170 formed in the side edge portion of the LED-driven optical-waveguide structure, for transmitting sound waves produced from the electro-acoustic transducer 171 on the PC board, and conducted through the acoustic-waveguide structure 172 shown in FIGS. 41A through 42C, to the sound-wave ports 170 in the side edge portion of the LED-driven optical-waveguide structure 165.

As shown in FIGS. 39A through 39D, the optical-waveguide structure 165 is mounted about the upper edge of the PC board assembly 8 and beneath the upper edge regions of the front and rear portions of the system housing, when assembled together with the PC board assembly disposed therebetween. During system operation, a set of LEDs 180A and 180B, and 180A through 180F, mounted on front and rear surfaces of the PC board, respectively, are driven to a state of illumination by LED driver circuits 159 also mounted on the PC board 8. This arrangement results in optical illumination produced from the LEDs, and light rays 182 associated therewith conducted through the optical waveguide projections 168A, 168B and 168C and into the centrally-disposed optically-translucent region 166 surrounding the manually-actuated trigger switch button 5A which, in the illustrative embodiment, causes the optically-translucent region 166 to glow, preferably a blueish color. In other embodiments, other color illuminations may be produced from the centrally-disposed optically-translucent region 166, as the application may require. In the illustrative embodiment, the top portion of the front and rear housing portions 2B" and 2A" are opaque, and thus visible illumination will only exit the optically-translucent region 166 encircling the manually-actuated trigger switch button 5A. The function of the visible illumination produced from the optically-translucent region 166 serves to visually indicate where the trigger switch button 5A is located on the housing, as well as produce an aesthetic impression that is pleasing to the end user and customers alike at the retail point of sale (POS) station.

Specification of the Acoustic-Waveguide Structure Used to Couple Sonic Energy, Produced from an Electro-Transducer, to the Sound Output Ports Formed in the Housing of the Digital Image Capture and Processing System of the Third Illustrative Embodiment of the Present Invention Referring to FIGS. 40 through 42B, it is appropriate at this juncture to describe the acoustic-waveguide structure 172 that is used to conduct acoustic energy signals generated from the electro-acoustic transducer 171 (e.g. when a bar code is read) to the sound-wave ports 170 in the side edge portion of the LED-driven optical-waveguide structure 165.

FIG. 40 shows the PC board assembly 8 supporting on its front end: (i) the electro-acoustic transducer 171 for generating system event sounds (e.g. Good Read beeps); (ii) the linear LED array 23 (62A-62N) for generating a wide-area illumination field within the FOV; and (iii) the pair of IR transmitting and receiving diodes 90A and 90B for detecting objects within the FOV using IR signal transmission and reception techniques.

In cutaway views of FIGS. 41A and 41B, the acoustic-waveguide structure 172 of the present invention is shown installed between the PC board 8 and the front housing portion 2B", so that sonic energy produced from the electro-acoustic transducer 171 is efficiently conduced through the acoustic-waveguide structure 172, and transmitted through the sound ports 170 formed in the optical-waveguide structure 165 described above, with minimal energy attenuation or loss.

The acoustic-waveguide structure 172 of the present invention is shown in greater detail in FIGS. 42A through 42B. As shown in FIG. 42C, the acoustic-waveguide structure 172, preferably made of a resilient rubber material, comprises: an inner sound conduit 172 that extends along the central portion of the structure and has first and second end portions; an first interface portion 172B for interfacing with the electro-acoustic transducer 171 and coupled to the first end portion of the sound conduit; and a second interface portion 172C with a recess 172D for interfacing with the sound-ware ports 170 formed in the LED-driven optical-waveguide structure 165 and coupled to the second end portion of the sound conduit, so that sonic energy generated by the electro-acoustic transducer 171 propagates down the sound conduit 172A and exits out the second interface portion 172C. The recess 172D is snap fitted into the channel formed in the lower portion of the optical-waveguide structure 176 shown in FIG. 38A.

By way of the acoustic-waveguide structure, sound signals generated from the electro-acoustic transducer 171 are efficiently conducted through the waveguide channel and exit out through sound ports 170 formed in the optical-waveguide structure 165, and corresponding sound ports 170' formed in the front housing portion 2B, as shown in FIGS. 41A and 41B.

As shown in FIG. 42B, acoustic-waveguide structure 172 also includes a rubber elastomeric structure 172E which extends from the second interface portion 172C and provides a compressible rubber gasket 172F which receives the opaque trigger switch button 5A in recess 172G. During system operation, the compressible rubber gasket 172F permits the trigger switch button 5A to engage and activate the electronic switch 5B when the rigger switch button 5A is manually depressed by the system operator, causing the rubber gasket 172F to momentarily compress when the depression forced is applied to the trigger switch button 5A, and uncompress when the depression force is released.

Specification of the Multi-Interface I/O Subsystem Employed in the Digital Image Capture and Processing System of Present Invention of the Third Illustrative Embodiment Referring now to FIGS. 43A through 43D, the multi-interface I/O subsystem 27 of the third illustrative embodiment will be described.

As shown in FIG. 43A, the multi-interface I/O subsystem 27 supports multiple user interfaces (e.g. RS-232, keyboard wedge, RS-485 and USB) using, for example, standard cables with standard male-type RJ-45 connectors (providing EAS support). In the illustrative embodiment, the multi-interface I/O subsystem 27 employs software-based automatic interface detection (i.e. as taught in U.S. Pat. No. 6,619,549 incorporated herein by reference) which eliminates the need to reading programming-type bar codes by the user during communication interface set-up operations.

As shown in FIG. 43A, the multi-interface I/O subsystem 27 comprises: a RS-45 female connector 157 mounted on the rear surface of bottom portion of the PC board 8 and receives the standard male-type RJ-45 (e.g. RJ-45 10 pin) connector associated with a flexible communication interface cable 10" (with EAS support), for connecting to a host device 13 supporting at least one of the following communication interfaces (i) RS-232 with an AC power adapter, (ii) a keyboard wedge interface with an AC power adapter, (iii) a RS-485 interface with an AC power adapter or (iv) a USB interface with an AC adapter required for an imaging mode (driving illumination devices); a RS-232 driver module 153A, 153B, interfaced with an UART integrated within the (decode) microprocessor 135 supported on the PC board 8, for supporting the RS-232 interface; a keyboard wedge circuit 154 interfaced with an UART integrated within the (decode) microprocessor 135 as well as the I/O pins of a USB microcontroller (e.g. from Sci-Labs Inc.) 135 connected to the decode microprocessor, for supporting the keyboard/wedge interface; a RS-485/IBM driver module 152, interfaced with an UART integrated within USB microcontroller 135, for supporting the RS-232 interface; an interface switching module 150 connected to the signal pins of the standard 10 pin connector 157, and the inputs of the RS-232 driver module 153A, 153B, the keyboard wedge circuit 154, and the RS-485/IBM drivers 152; USB driver module 151 integrated within the USB microcontroller 135, via the I/F cable detect pin on the interface switching circuit 150; and a power management module 155, 156, including an 12V-5V and 12V-3.3V conversion modules, and connected to the power pins of the interface connector 157, and the USB/PC power lines, the interface power lines, and the decoder/illumination RS-232/RS485 power lines aboard the PC board assembly 8.

In FIG. 43B, the multi-interface I/O subsystem of FIG. 43A is shown implemented using discrete circuit components. Specifically, the interface switching circuits 150 are implemented using a pair of high speed (HS) switches, (HS Switch #1 and #2), square-wave test (wiggle) signal drivers, square-wave test (wiggle) signal monitors, and RS-232 drivers, configured as shown, for detecting signal levels on the connector cable 10" that is connected between the interface connector 157 on the PC board and the connector on the host system. As indicated in FIG. 43B, each interface cable that is used, except the RS-232 interface cable, would include a jumper wire that would jump from Pin 2 (CTS) to a pin not used for the communication interface. Specifically, the keyboard wedge jumper would extend from Pin 2 to Pin 3. The USB jumper would extend from Pin 2 to Pin 4. The RS-485/IBM jumper would jump from Pin 2 to Pin 6. The RS-232 cable has no jumper as it uses all non-power signal pins.

As shown in FIG. 43B, the interface switching circuit 150 on the PC board 8 includes a circuit that will pull up the signal on the CTS wiggle) line (on Pin 2). As the decode processor is I/O limited, the wiggle line is shared with the EEPROM WP; the RS-485 detect line is shared with the UC_SPI_REQUEST; and the keyboard wedge pull up disconnect the AND of the PWR_SWITCH_N and the Decoder Reset (which are not needed at the same time).

The USB microcontroller (from Sci-Labs) supports software which carries out a square-wave signal (i.e. Wiggle) test, using the driver circuits and the interface (I/F) switching circuit 150 described above. This software-controlled automatic interface test/detection process can be summarized as follows. First, the CTS (Clear To Send) (i.e. Pin 2) is set to High and the RS-232 pull down resistor is allowed to go Low. The line which follows the CTS during the wiggle test signal is then checked; if no lines follow the CTS, then the RS-232 interface is determined or indicated. The line that follows CTS pin is tested multiple times. After passing the test, the interface is detected for operation.

The software-based automatic interface test/detection process employed by the multi-interface I/O subsystem 27 will now be described in greater detail with reference to the flow chart of FIG. 43C.

As shown at Block A in FIG. 43C, when the "power on" button is depressed, and the system proceeds to Block B.

As indicated at Block B in FIG. 43C, the USB microcontroller sets the interface (I/F) switches (within the interface switching module) to the keyboard wedge (KW) interface setting, enables the interface (I/F) power, and powers off the decode functionalities supported by the (Blackfin) decode microprocessor so that the USB microcontroller essentially has control over the entire system until automatic interface detection process is completed by the USB microcontroller. In this state, control is passed onto and held by the USB microcontroller so that the USB microcontroller is prepared to automatically: (i) determine which communication interface (CI) is supported by the host system to which the digital imaging system is physically connected by the connector cable; (ii) implement the detected interface within the digital imaging system by loading the appropriate software drivers, setting configuration parameters, etc.; and (iii) thereafter, return control back to the (Blackfin) decode microprocessor 135 which implements the multi-tier software-based computing platform underlying the digital image capture and processing system of the present invention.

As indicated at Block C in FIG. 43C, the USB microcontroller asserts the Decode Power Down and Decode Reset Commands at the same time, while opening the keyboard wedge (KBW) and enable the configure inputs.

As indicated at Block D in FIG. 43C, the USB microcontroller sets port 1.4 so that EEPROM WP=Wiggle Line/Pin is High.

As indicated at Block E in FIG. 43C, the USB microcontroller reads and tests ports: (1) P1.6 (KB Wedge); (2) P2.2 (USB); and (3) P1.5 (IBM).

As indicated at Block F in FIG. 43C, the USB microcontroller determines whether or not any of the tested port are HIGH. If not, the USB microcontroller dwells in a loop until at least one of the tested ports attains a HIGH test signal level. If the USB microcontroller determines one of the ports goes HIGH, then at Block G it stores those HIGH level ports as possible detected interfaces.

As indicated at Block H in FIG. 43C, the USB microcontroller sets Port 1.4 low (i.e. EEPROM WP=Low.

As indicated at Block I in FIG. 43C, the USB microcontroller reads and tests ports that have been stored as possible communication interfaces.

As indicated at Block J in FIG. 43C, the USB microcontroller determines which of the tested ports have LOW levels.

In no tested port levels have gone LOW at Block J, then at Block Q the USB microcontroller releases the Decoder Reset Line, sets interface switches for the RS-232 interface and interface type, and then loads stored RS-232 configuration parameters into memory, so as to implement the RS-232 communication interface with the host system. At Block R, the scanner/imager is ready to run or operate.

If at Block J, any of the tested ports have gone LOW, then at Block K the USB microcontroller stores as possible interfaces, the remaining ports which have gone LOW.

As indicated at Block L in FIG. 43C, the USB microcontroller determines whether there is only one interface (I/F) candidate on the stored possible interface list; and if not, then at Block S, the USB microcontroller repeats toggling/driving the EEPROM WP (wiggle) test line and reading the interface ports multiple times to determine which ports are likely detected interface types. Then at Block T, the USB microcontroller determines whether or not there is a single port pin that tracks the EEPROM WP (wiggle) test line. If no port pins track the wiggle test line, then the USB microcontroller returns to Block D as shown in FIG. 43C. If at least port pin tracks the wiggle test line, then the USB microcontroller proceeds to Block M.

If at Block L there is only one interface (I/F) candidate on the list of stored possible communication interfaces, the USB microcontroller toggles the EEPROM WP (wiggle) test line multiple (N) times to verify that the port pin for the sole interface candidate tracks the wiggle test signal.

If at Block N, the port pin for the sole interface candidate does not track the wiggle test signal, then the USB microcontroller returns to Block D, as shown in FIG. 43C. If at Block N, the port pin for the sole interface candidate does track the wiggle test signal, then at Block O the USB microcontroller releases the Decoder Reset Line, sets analog interface switches for the interface on the detected interface list, and then loads interface configuration parameters into memory, so as to implement the detected communication interface with the host system. At Block P, the digital imager is ready to run or operate.

The multi-interface I/O subsystem design described above has a number of other features which makes it very useful in POS application, namely: it does not require electronic circuitry to be embodied in the connector cables; it supports the option for 12 Volt to 5 Volt power conversion, and 12 Volt to 3.3 Volt power conversion; and its Keyboard Wedge (KW) interface allows for signals to pass therethrough without use of a power adapter.

In the illustrative embodiment, the power requirements for the multi-interface I/O subsystem are as follows: satisfy specification requirements for the USB Mode; consume less than 500 uA during its Sleep Mode; consume less than 100 mA before re-numeration; disable the decode section before USB I/F detection; consume less than 500 mA during operation; verify there is adapter power before switching to the higher power, Imaging Mode; keep the KeyBoard Wedge pass through mode operational without ale adapter; and maintain the keyboard power fuse limit at about 250 mA for PC.

Specification of Method of Programming a Set of System Configuration Parameters (SCPs) within the Digital Image Capture and Processing System of the Present Invention, During Implementation of the Communication Interface Detected with a Host System Oftentimes, end-user customers (e.g. retailers) employing multiple digital imaging systems of the present invention will support different-types of host systems within their operating environment. This implies that digital imaging systems of the present invention must be interfaced to at least one host system within such diverse operating environments. Also, typically, these different types of host systems will require different communication methods (e.g. RS232, USB, KBW, etc.). Also, depending on the interface connection, oftentimes the system configuration parameters (SCPs) for these different host system environments (e.g. supporting particular types of decode symbologies, prefixes, suffixes, data parsing, etc.) will be different within each digital imaging system. In general, the term SCP and SCPs as used herein, and in the claims, are intended to cover a broad range of parameters that control features and functions supported within any digital imaging system according to the present invention, and such features and functions include the parameters disclosed herein as well as those that are clearly defined and detailed in Applicants' copending U.S. application Ser. No. 11/640,814 filed Dec. 18, 2006, which is incorporated herein by reference in its entirety.

In order to eliminate the need to scan or read individual programming codes to change system configuration parameters required to interface within an assigned host system, it is an objective of the present invention to provide each digital imaging system of the present invention with the capacity to programmably store, its system memory (e.g. EPROM), a different set of system configuration parameters (SCPs) for each supported communication interface (e.g. RS232, USB, Keyboard Wedge (KBW), and IBM 46xx RS485), as illustrated in FIG. 43D. Thus, a first set of system configuration parameters (e.g. supporting particular types of symbologies, prefixes, suffixes, data parsing, etc.) would be programmed in a first section of memory associated with a first communication interface (e.g. RS-232) A second set of system configuration parameters would be programmed in a second section of memory associated with a second communication interface (e.g. Keyboard Wedge KBW). Similarly, a third set of system configuration parameters would be programmed in a third section of memory associated with a third communication interface (e.g. USB). A fourth set of system configuration parameters would be programmed in a fourth section of memory associated with a fourth communication interface (e.g. IBM 46xx RS485), and so on.

In the flow chart of FIG. 44, there is described a method of automatically programming multiple system configuration parameters within the system memory of the digital image capture and processing system of present invention, without reading programming-type bar codes.

As indicated at Block A in FIG. 44, the first step of the method involves associating (i) a given set of system configuration parameters (SCP) with (ii) a particular communication interface (CI), to create SCP/CI parameter settings in the system memory of the digital imaging system, which preferably will be done during its SCP/CI programming mode. Typically, this step will be carried out by a technician or an automated process supported with robust information about: (i) the different types of communication interfaces (CI) that are supported by the different host systems within the end-users organization or enterprise; as well as (ii) the different kinds of system configuration parameters (SCPs) that should be programmed within a particular communication interface (CI). Such SCP/CI programming can be carried out in a variety of different ways.

One SCP/CI programming method would be to electronically load a SCP/CI data file into the system memory of each digital imaging system to be deployed within an organization's enterprise typically having diverse types of host systems, to which the digital imaging systems must establish a communication interface. This programming method might take place at the factory where the digital imaging systems are manufactured, or by a technician working at the user's enterprise before the digital imaging systems are deployed for their end use applications.

Another SCP/CI programming method might be to first cause the digital imaging system to enter a SCP/CI programming mode, whereupon a technician reads programming-type bar codes from a programming manual, following a predetermined code reading sequence, e.g. before the digital imaging system is ultimately programmed and deployable for end use.

When programming SCP/CI parameter settings in the system memory of the digital imaging system using a PC-based software application running on a host or client system, the PC-based software application can be designed to provide system configuration specialists with the option of selecting the communication interface (CI) for the set of system configuration parameters that are to be associated therewithin in system memory. Also, upon changing system configuration parameters associated with a particular communication interface (i.e. changing SCP/CI parameter settings within system memory), such users can also be provided with the option of selecting whether updated changes to a full set of system configuration parameters (SCPs) should be applied to (i) a single communication interface (e.g. RS-232 or USB), or (ii) all available communication interfaces (CIs) supported by the digital imaging system, and thereafter programmed into the memory banks of the system memory of the digital imaging system. Notably, selection of option (ii) above would serve as a global programming change within the digital imaging systems.

As indicated at Block B in FIG. 44, once the system memory of the digital imaging system has been fully programmed with its SCP/CI parameter settings, using any suitable method of programming, the digital imaging system(s) so programmed is (are) deployed within the end-user working environment of the organization or enterprise. Typically, numerous digital imaging system units will be programmed and deployed in a batch manner within the organization.

As indicated at Block C in FIG. 44, the proper communication interface (CI) cable is connected between (i) the cable connector on the digital imaging system, and (ii) the connection port on the designated host system, to be interfaced with the digital imaging system.

At indicated at Block D in FIG. 44, after the communication cable has been installed between the two systems, and the digital imaging system starts up, it will automatically detect the communication interface supported by its host computing system, using the multi-interface detection technique as described hereinabove, and automatically load (i) all necessary drivers to implement the detected interface supported by the host system, as well as (ii) the SCP/CI parameter settings that have been pre-programmed for implementation with the communication interface (CI) that has been automatically detected and programmably implemented within the digital imaging system, without the need for scanning programming bar code symbols or the like.

As indicated at Block E in FIG. 44, whenever the end-user needs to either (i) swap the digital imaging system unit from its currently selected host system, (to which it has been automatically interfaced) to another or new host system environment within the enterprise, or (ii) replace the digital imaging system with a spare digital imaging system maintained in inventory (i.e. having the same set of SCP/CI parameter settings in its system memory banks as like units), the end-user only needs to establish a proper connection between the digital imaging system and its new host system using the proper connection cable, and the communication interface (CI) will be automatically detected and implemented, and system configuration parameters will be automatically programmed and set within the digital imaging system so as to support a new host system environment, all without the need to scan programming codes.

By virtue of the present invention, a digital image capture and processing system once initially programmed, avoids the need read individual programming-type codes at its end-user deployment environment in order to change additional configuration parameters (e.g. symbologies, prefix, suffix, data parsing, etc.) for a particular communication interface supported by the host system environment in which it has been deployed. This feature of the present invention offers significant advantages including, for example. a reduction in cost of ownership and maintenance, with a significant improvement in convenience and deployment flexibility within an organizational environment employing diverse host computing systems.

Specification of Method of Unlocking Restricted Features Embodied within the Digital Image Capture and Processing System of Present Invention of the Third Illustrative Embodiment, by Reading Feature-Unlocking Programming Bar Code Symbols Often times, end-users of digital imaging systems do not want to pay extra for digital image capture and processing capabilities that far exceed any code capture and decode processing challenge that might be foreseeably encountered within a given end-user deployment environment. Also, manufacturers and value-added retailers (VARs) of digital imaging systems do not want to procure the necessary license fees, or incur the necessary software and/or hardware development costs associated with the provision of particular kinds of digital image capture and processing capabilities unless the end-user sees value in purchasing such digital imaging systems based on a real-world need. Examples of such kinds of digital image capture and processing capabilities, which customers may not require in many end-user applications might include, for example: (i) the capacity for decoding particular types of symbologies (i.e, PDF417, Datamstrix, QR code, etc.); (ii) the capacity for performing optical character recognition (OCR) on particular types of fonts; (iii) the capacity for performing digital image transfer to external systems and devices; (iv) the capacity for reading documents bearing machine readable code as well as handwriting (e.g. signatures); etc.

In order to more efficiently deliver value to end-user customers, it is an object of the present invention to provide manufacturers with a way of and means for providing their customers with digital imaging products having features and functions that truly serve their needs at the time of purchase procurement, and at less cost to the customer. This objective is achieved by providing a digital imaging system as shown in FIGS. 26A through 44, wherein the manufacturer and/or VAR can predetermined classes of features and functions that shall be programmed into the digital imaging system as a baseline model, and after purchase and sale to the customer, additional "extended" classes of features and functionalities can be purchased and activated by reading "feature class activating" bar code symbols during a feature class extension programming mode of operation supported by the digital imaging system.

Examples of predetermined classes of features and functions in the "baseline" model of the digital imaging system of FIGS. 26A though 44, would include: the capacity to capture digital image and read all known linear 1D bar code symbologies, and also a limited number of 2D bar code symbols (but excluding PDF417, Datamstrix, QR code symbologies), so to provide a baseline class of features and functions for the digital imaging system.

Also, an example of a first "extended" class of features and functions might include, for example: (i) the capacity for decoding particular types of symbologies (i.e PDF417, Datamstrix, and QR code); and (ii) the capacity for performing optical character recognition (OCR) on particular types of fonts. A second extended class of features and functions might include, for example: (iii) the capacity for performing digital image transfer to external systems and devices. Also, a third extended class of features and functions might include, for example: (iv) the capacity for reading documents bearing machine readable code as well as handwriting (e.g. signatures). Typically, each of these extended classes of feature and functionalities are locked and inaccessible to end-users unless authorized to do so after purchasing a license to access the extended class of features and functionalities.

Therefore, in accordance with the principle of the present invention, a unique "license key" is assigned to each extended class of features and functionalities, and it is stored in system memory along with the SCPs that implement the extended class of features and functionalities. This license key is required to unlock or activate the extended class of features and functionalities. This license key must be properly loaded into the system memory in order for the SCPs associated with the corresponding extended class of features and functionalities to operate properly, after the license has been procured by the customer or end-user, as the case may be.

As will be explained below, the license key can be loaded into the digital imaging system by way of reading a uniquely encrypted "extended feature class" activating bar code symbol which is based on the license key itself, as well as the serial # of the digital imaging system/unit. In the case of desiring to activate a number of digital imaging systems by reading the same uniquely encrypted "extended feature class" activating bar code symbol, the single uniquely encrypted "extended feature class" activating bar code symbol can be generated using the license key and the range of serial numbers associated with a number of digital imaging systems/units which are to be functionally upgraded in accordance with the principles of the present invention.

The method of unlocking restricted "extended" classes of features and functionalities embodied within the digital image capture and processing system of present invention is illustrated in the flow chart of FIG. 45.

As indicated at Block A thereof, the first step involves (i) providing the system architecture of digital imaging system with all necessary hardware resources, SCPs programmably stored in system memory, and software resources for implementing the predefined baseline classes of features and functions for the digital imaging system, and (ii) assigning a unique license key that can be used to generate a uniquely encrypted "baseline feature class" activating bar code symbol which, when read by the digital imaging system while its is operating in "feature class extension programming" mode of operation, automatically unlocks the baseline class of features, and programs the digital imaging system to operate in its baseline feature and functionality configuration.

As indicated at Block B, the second step involves (ii) providing the system architecture of digital imaging system with all necessary hardware resources, SCPs programmably stored in system memory, and software resources for implementing the predefined "extended" classes of features and functions for the digital imaging system, and (ii) assigning a unique license key that can be used to generate a uniquely encrypted "extended feature class" activating bar code symbol which, when read by the digital imaging system while its is operating in "feature class extension programming" mode of operation, automatically unlocks the corresponding extended class of features, and programs the digital imaging system to operate with the corresponding extended class of features and functionalities, in addition to its baseline class of features and functionalities.

Notably, Steps A and B above can be performed either at the time of manufacturer of the digital imaging system, or during a service-upgrade at the factory or authorized service center.

As indicated at Block C, the third step involves (iii) activating such extended features and functionalities latent within the system by doing the following: (a) contacting the manufacturer, or its agent or service representative and procuring a license(s) for the desired extended class or classes of features and functionalities supported on the purchased digital image; (b) using the assigned license keys stored in system memory of the digital imaging systems to be feature upgraded (and their manufacturer-assigned serial numbers) to generate uniquely encrypted "extended feature class" activating bar code symbols corresponding to the purchased extended class licenses or license keys; (c) using the manufacturer-assigned serial numbers on the digital imaging systems to be feature upgraded to access and display corresponding uniquely encrypted "extended feature class" activating bar code symbols (either on the display screen of computer running a Web-browser programmed connected to a Web-based site supporting the procurement of extended class licenses for the digital imaging system of the customer, or by way of printing such programming bar code symbols by some way and/or means); (iv) inducing the system to enter its "feature class extension programming" mode of operation, by scanning a predetermined programming bar code symbol, and/or generating a hardware-originated signal (e.g. depressing a switch on the unit); and (v) reading the uniquely encrypted "extended feature class" activating bar code symbols, either being displayed on the display screen of the Web-enabled computer system, or printed on paper or plastic substrate material, so as to automatically unlock restricted "extended" classes of features and functionalities embodied within the digital imaging system and to activate such latent extended features and functionalities therewithin.

By virtue of the present invention, it is now possible to economically purchase digital imaging systems as disclosed in FIGS. 26A through 44, supporting "baseline" classes of features and functions, and at later date purchase and activate "extended" classes of features and functions supported by hardware and software resources that have been previously embodied within the digital imaging system at the time of initial purchase procurement, or subsequent service upgrade. As such, the present invention provides a new and valuable way of protecting ones investment in digital imaging solutions by allowing customers to purchase an system feature and functionality upgrades, beyond basic baseline features and functionalities, if and when they shall require more functionality for particular end-user deployment applications.

Specification of the Fourth Illustrative Embodiment of the Digital Image Capture and Processing System of the Present Invention, Employing an Electro-Mechanical Optical Image Stabilization Subsystem that is Integrated with the Image Formation and Detection Subsystem Referring now to FIGS. 46A through 47, there is shown a digital image capture and processing system of present invention 1''' which employs an integrated electro-mechanical optical image stabilization subsystem to enable the formation and detection of crystal clear images in the presence of environments characterized by hand jitter, camera platform vibration, and the like. In this illustrative embodiment, the FOV imaging optics 34 and/or the FOV folding mirrors 74, 75 are gyroscopically stabilized, using a real-time image stabilization subsystem employing multiple accelerometers and high-speed motion correction mechanisms.

The system shown in FIGS. 46A through 47 is similar in all respects to the system shown in FIGS. 26A through 45, except for the following medications described below.

As shown in the system diagram of FIG. 47, a miniature gyroscopic sensor or accelerometer 190 is supported in the system housing near the FOV lens 34. The miniature gyroscopic sensor or accelerometer 190 can be realized using the integrated dual-axis gyro chip IDG-300 by Invensense, Inc. The function of the miniature gyroscopic sensor or accelerometer is to automatically detect any horizontal and/or vertical movement of the FOV lens 34 (and/or FOV folding mirrors 75 and 75), and generate electrical signals representative of the detected horizontal and/or vertical movement. These electrical signals are is sent to a high-speed microcontroller 191 (which can be realized as part of the system control subsystem) that is programmed to automatically correct for such detected movements by generating electrical signals that a drive (i) a first set of miniature motors 192A and 192B which adjust the horizontal and/or vertical position of a first floating element 193 supporting the FOV lens 34, and (ii) a second set of miniature motors 194A and 194B which adjust the horizontal and/or vertical position of a second floating element 195 supporting the FOV folding mirror 74 (and/or mirror 75), as shown. Alternatively, the miniature motors can be driven so as to adjust the horizontal and/or vertical movement of the image detection array 35, instead of the FOV lens 34, or FOV folding mirrors 74 and 75, so as to compensate for any inertial movement of the digital image capture and processing system during object illumination and imaging operations.

Also, image intensification panel can also be incorporated into the image formation and detection subsystem immediately before the image detection array 35 to enable the detection of faint (i.e. low intensity) images of objects in the FOV when using low intensity illumination levels required in demanding environments where high intensity illumination levels are prohibited or undesired from the human safety or comfort point of view.

Specification of Method of Reducing Stray Light Rays Produced from LED-Based Illumination Array Employed in the Digital Image Capture and Processing System of the Present Invention Referring to FIGS. 48A and 48B, a method of reducing "stray light" rays produced from an LED-based illumination array 23 during digital imaging operations will now be described in connection with the digital image capture and processing system of the present invention (1', 1" or 1''') shown and described herein above.

In FIGS. 48A and 48B, a countertop-supportable digital image capture and processing system 1', 1" or 1" is shown illuminating an object according to the principles of the present invention. As shown, using any of the hands-free digital imaging methods illustrated in FIGS. 15A1 through 17C, the FOV of the system is illuminated with light from the LED illumination array 23 so that substantially all of the illumination rays from the LED illumination array are maintained below a spatially-defined "illumination ceiling" above which the field of view (FOV) of the human vision system of the operator or consumers extends at the POS station. By maintaining substantially all illumination rays below this illumination ceiling, glare and visual annoyance from stray light rays (originating from the digital imager) is substantially prevented or reduced at the POS station, to the benefit of operators and consumers alike.

Some Modifications which Readily Come to Mind

In alternative embodiments of the present invention, the linear illumination array 23 employed within the illumination subsystem 22" may be realized using solid-state light sources other than LEDs, such as, for example, visible laser diode (VLDs) taught in great detail in WIPO Publication No. WO 02/43195 A2, published on May 30, 2002, and copending U.S. application Ser. No. 11/880,087 filed Jul. 19, 2007, assigned to Metrologic Instruments, Inc., and incorporated herein by reference in its entirety. However, when using VLD-based illumination techniques in the digital image capture and processing system of the present invention, great care must be taken to eliminate or otherwise substantially reduce speckle-noise generated at the image detection array 35 when using coherent illumination source during object illumination and imaging operations. WIPO Publication No. WO 02/43195 A2, and U.S. patent application Ser. No. 11/880,087 filed Jul. 19, 2007, supra, disclose diverse methods of and apparatus for eliminating or substantially reducing speckle-noise during image formation and detection when using VLD-based illumination arrays.

Also, the linear illumination array can be realized using a combination of both visible and invisible illumination sources as taught in great detail in Applicants' copending U.S. application Ser. No. 11/880,087 filed Jul. 19, 2007, incorporated herein by reference in its entirety. The use of such spectral mixing techniques will enable the capture of images of bar code labels having high contract, while using minimal levels of visible illumination.

While CMOS image detection array technology was described as being used in the preferred embodiments of the present invention, it is understood that in alternative embodiments, CCD-type image detection array technology, as well as other kinds of image detection technology, can be used.

The digital image capture and processing system design described in great detail hereinabove can be readily adapted for use as an industrial or commercial fixed-position bar code reader/imager, having the interfaces commonly used in the industrial world, such as Ethernet TCP/IP for instance. By providing such digital imaging systems with an Ethernet TCP/IP port, a number of useful features will be enabled, such as, for example: multi-user access to such bar code reading systems over the Internet; management control over multiple systems on a LAN or WAN from a single user application; web-servicing of such digital imaging systems; upgrading of software, including extended classes of features and benefits, as disclosed hereinabove; and the like.

While the illustrative embodiments of the present invention have been described in connection with various types of bar code symbol reading applications involving 1-D and 2-D bar code structures, it is understood that the present invention can be use to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

Also, digital image capture and processing systems of the present invention can also be used to capture and process various kinds of graphical images including photos and marks printed on driver licenses, permits, credit cards, debit cards, or the like, in diverse user applications.

It is understood that the digital image capture and processing technology employed in bar code symbol reading systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A digital image capture and processing system comprising:

a housing having an imaging window;

an area-type image formation and detection subsystem, disposed in said housing, and having image formation optics for projecting a field of view (FOV) through said imaging window and an area-type image detection array having (i) a single snap-shot mode of the operation supporting a single snap-shot image acquisition cycle during object illumination and imaging operations, and (ii) a periodic snap-shot mode of the operation supporting periodic generation of snap-shot type image acquisition cycles during object illumination and imaging operations;

an automatic object detection subsystem, disposed in said housing, for automatically detecting the presence of an object within said FOV, and generating an object detection event signal in response to the detection of said object in said FOV;

an illumination subsystem, disposed in said housing, including an illumination array for producing a field of illumination within said FOV, and illuminating said object detected in said FOV, so that said illumination reflects off said object and is transmitted back through said imaging window and onto said area-type image detection array to form a 2D digital image of said object on said area-type image detection array while operating in either said single snap-shot mode of the operation or said periodic snap-shot mode of the operation;

an image capturing and buffering subsystem, disposed in said housing, for capturing and buffering 2D digital images detected by said image formation and detection subsystem;

a digital image processing subsystem, disposed in said housing, for processing 2D digital images captured and buffered by said image capturing and buffering subsystem and reading one or more ID and/or 2D code symbols graphically represented in said 2D digital images, and generating symbol character data representative of said read 1D and/or 2D code symbols; and a system control subsystem, disposed in said housing and responsive to said object detection event signal generated within said digital image capture and processing system, for controlling and/or coordinating one or more of said subsystems during object detection, illumination and imaging operations.

2. The digital image capture and processing system of claim 1, which further comprises an input/output subsystem, disposed in said housing, for outputting processed image data, including symbol character data, to an external host system or other information receiving or responding device.

3. The digital image capture and processing system of claim 1, wherein, in response to said object detection event signal, said system control subsystem automatically configures said area-type image formation and detection subsystem so that said area-type image detection array is operating in said single snap-shot mode of the operation during object illumination and imaging operations.

4. The digital image capture and processing system of claim 1, wherein, in response to said object detection event signal, said system control subsystem automatically configures said area-type image formation and detection subsystem so that said area-type image detection array is operating in said periodic snap-shot mode of the operation during object illumination and imaging operations.

5. The digital image capture and processing system of claim 1, which further comprises an object targeting illumination subsystem, disposed in said housing, for generating and projecting a targeting illumination beam within a portion of said FOV, in response to the generation of said object detection event signal.

6. The digital image capture and processing system of claim 1, wherein said illumination array comprises an LED illumination array having a plurality of LEDs.

7. The digital image capture and processing system of claim 1, wherein said housing is capable of being supported within the hand of an operator.

8. The digital image capture and processing system of claim 1, wherein said housing is capable of being supported on a countertop surface.

9. The digital image capture and processing system of claim 1, wherein said 1D and/or 2D code symbols are selected from the group of 1D and/or 2D bar code symbols, PDF symbols and data matrix symbols.

10. A digital image capture and processing system comprising:

a housing having an imaging window;

an area-type image formation and detection subsystem, disposed in said housing, and having image formation optics for projecting a field of view (FOV) through said imaging window and an area-type image detection array having (i) a single snap-shot mode of the operation supporting a single snap-shot image acquisition cycle during object illumination and imaging operations, and (ii) a periodic snap-shot mode of the operation supporting periodic generation of snap-shot type image acquisition cycles during object illumination and imaging operations;

an illumination subsystem, disposed in said housing, including an illumination array for producing a field of illumination within said FOV, and illuminating said object in said FOV, so that said illumination reflects off said object and is transmitted back through said imaging window and onto said area-type image detection array so as to form a 2D digital image of said object on said area-type image detection array while operating in either said single snap-shot mode of the operation, or form multiple 2D digital images of said object and said area-type image detection array while operating in said periodic snap-shot mode of the operation;

an object targeting illumination subsystem, disposed in said housing, for generating and projecting a targeting illumination beam within a portion of said FOV, in response to the generation of a trigger event signal within said digital image capture and processing system;

an image capturing and buffering subsystem, disposed in said housing, for capturing and buffering 2D digital images detected by said image formation and detection subsystem;

a digital image processing subsystem, disposed in said housing, for processing one or more 2D digital images captured and buffered by said image capturing and buffering subsystem and reading one or more 1D and/or 2D code symbols graphically represented in said one or more digital images, and generating symbol character data representative of said read 1D and/or 2D code symbols; and a system control subsystem, disposed in said housing and responsive to said trigger event signal generated within said digital image capture and processing system, for controlling and/or coordinating one or more of said subsystems during object detection, illumination and imaging operations;

wherein said targeting illumination beam is momentarily switched off while said illumination array is producing said field of illumination within said FOV and said area-type image detection array is detecting said one or more 2D digital images of said detected object within said FOV, during object illumination and imaging operations.

11. The digital image capture and processing system of claim 10, wherein said trigger event signal is generated by an object detection subsystem disposed in said housing, for automatically detecting the presence of an object within said FOV.

12. The digital image capture and processing system of claim 10, wherein said trigger event signal is generated by a manually actuatable trigger switch integrated with said housing, for generating said triggering event upon an operator manually actuating said manually actuatable trigger switch, indicative of the presence of an object within said FOV.

13. The digital image capture and processing system of claim 10, wherein said illumination array comprises an LED illumination array having a plurality of LEDs.

14. The digital image capture and processing system of claim 10, wherein said housing is capable of being supported within the hand of an operator.

15. The digital image capture and processing system of claim 10, wherein said housing is capable of being supported on a countertop surface.

16. The digital image capture and processing system of claim 10, wherein said 1D and/or 2D code symbols are selected from the group of 1D and/or 2D bar code symbols, PDF symbols and data matrix symbols.

17. The digital image capture and processing system of claim 10 which further comprises an input/output subsystem, disposed in said housing, for outputting processed image data, including symbol character data, to an external host system or other information receiving or responding device.

18. A digital image capture and processing system comprising:
- a housing having an imaging window;
- an area-type image formation and detection subsystem, disposed in said housing, and having image formation optics for projecting a field of view (FOV) through said imaging window and an area-type image detection array having (i) a single snap-shot mode of the operation supporting a single snap-shot image acquisition cycle during object illumination and imaging operations, and (ii) a periodic snap-shot mode of the operation supporting periodic generation of snap-shot type image acquisition cycles during object illumination and imaging operations;
- a triggering mechanism, disposed in said housing, for generating a trigger event signal to signal that an object is present in said FOV;
- an illumination subsystem, disposed in said housing, including an illumination array for producing a field of illumination within said FOV, and illuminating said object detected in said FOV, so that said illumination reflects off said object and is transmitted back through said imaging window and onto said area-type image detection array so as to (i) form a 2D digital image of said object on said area-type image detection array while operating in said single snap- shot mode of the operation, or (ii) form multiple 2D digital images of said object on said area- type image detection array while operating said periodic snap-shot mode of the operation;
- an image capturing and buffering subsystem, disposed in said housing, for capturing and buffering 2D digital images detected by said image formation and detection subsystem;
- a digital image processing subsystem, disposed in said housing, for processing one or more 2D digital images captured and buffered by said image capturing and buffering subsystem and reading one or more 1D and/or 2D code symbols graphically represented said one or more 2D digital images, and generating symbol character data representative of said read 1D and/or 2D code symbols; and
- a system control subsystem, disposed in said housing, and responsive to said trigger event signal, for controlling and/or coordinating one or more of said subsystems during object illumination and imaging operations.

19. The digital image capture and processing system of claim 18, wherein said trigger event signal is generated by a manually actuatable trigger switch integrated with said housing, for generating said triggering event signal upon an operator manually actuating said manually actuatable trigger switch, indicative of the presence of the object within said FOV.

20. The digital image capture and processing system of claim 18, which further comprises an input/output subsystem, disposed in said housing, for outputting processed image data, including symbol character data, to an external host system or other information receiving or responding device.

* * * * *